US012566099B2

(12) United States Patent
Chalofsky et al.

(10) Patent No.: US 12,566,099 B2
(45) Date of Patent: *Mar. 3, 2026

(54) AUTONOMOUS TIRE AND WHEEL BALANCER, METHOD THEREFOR AND ROBOTIC AUTOMOTIVE SERVICE SYSTEM

(71) Applicant: Automated Tire, Inc., Cleveland, OH (US)

(72) Inventors: Andy Chalofsky, Cleveland, OH (US); Josh Chalofsky, Cleveland, OH (US); Faron Schonfeld, Cleveland, OH (US); Stephen Toebes, Sunderland, MA (US); Nicholas Efthimiades, Farmingdale, NY (US); James Parker, Mansfield, MA (US)

(73) Assignee: Automated Tire, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,836

(22) Filed: Jun. 20, 2025

(65) Prior Publication Data

US 2025/0314547 A1    Oct. 9, 2025

Related U.S. Application Data

(63) Continuation of application No. 18/213,239, filed on Jun. 22, 2023.

(60) Provisional application No. 63/354,591, filed on Jun. 22, 2022.

(51) Int. Cl.
*G01M 1/28* (2006.01)
*G01M 1/04* (2006.01)

(52) U.S. Cl.
CPC .............. *G01M 1/28* (2013.01); *G01M 1/045* (2013.01)

(58) Field of Classification Search
None
See application file for complete search history.

(56) References Cited

U.S. PATENT DOCUMENTS

| | | | | |
|---|---|---|---|---|
| 2,363,316 A | 11/1944 | Hagg | | 73/457 |
| 3,078,720 A | 2/1963 | Hofmann | | 73/457 |
| 3,412,459 A | 11/1968 | Hollis | | 483/9 |

(Continued)

FOREIGN PATENT DOCUMENTS

| | | | | |
|---|---|---|---|---|
| CA | 3204143 A1 | 10/2019 | | |
| CA | 3117653 A1 | 11/2021 | | B25J 9/16 |

(Continued)

OTHER PUBLICATIONS

Heater, Brian, "*Your next tire change could be performed by a robot*", TechCrunch, Feb. 24, 2020, the whole document. Full text available at: https://techcrunch.com/2020/02/24/your-next-tire-change-could-be-performed-by-a-robot/ (last accessed on Aug. 1, 2025).

(Continued)

*Primary Examiner* — Alexander A Mercado
(74) *Attorney, Agent, or Firm* — Bodner & Bodner, PLLC; Christian P. Bodner; Gerald T. Bodner

(57) ABSTRACT

A vehicle component balancing apparatus and system for on vehicle balancing of one or more of a tire, a wheel, bearings, brake components, and vehicle components that impart vibrations to the vehicle.

30 Claims, 161 Drawing Sheets

(56) References Cited

U.S. PATENT DOCUMENTS

| | | | | |
|---|---|---|---|---|
| 3,675,495 | A | 7/1972 | MacMillan | 73/466 |
| 3,726,145 | A | 4/1973 | Bedford et al. | 73/457 |
| 3,762,225 | A | 10/1973 | Müller | 73/457 |
| 3,780,592 | A | 12/1973 | Merrilees | 73/457 |
| 3,815,425 | A | 6/1974 | Skidmore | 73/457 |
| 3,906,801 | A | 9/1975 | Butler | 73/457 |
| 3,971,426 | A | 7/1976 | West et al. | 157/1.28 |
| 3,987,338 | A | 10/1976 | Puetz | 315/241 S |
| 4,109,532 | A | 8/1978 | Donato | 73/457 |
| 4,274,287 | A | 6/1981 | Kaneda | 73/457 |
| 4,555,943 | A | 12/1985 | Ohta et al. | 73/457 |
| 4,907,452 | A | 3/1990 | Yopp | 73/457 |
| 4,956,998 | A | 9/1990 | Goebel | 73/457 |
| 5,125,298 | A | 6/1992 | Smith | 81/57.37 |
| 5,269,186 | A | 12/1993 | Yopp | 73/457 |
| 5,396,436 | A | 3/1995 | Parker et al. | 700/279 |
| 5,479,821 | A | 1/1996 | Goebel | 73/457 |
| 6,125,904 | A | 10/2000 | Kane et al. | 157/1.24 |
| 6,247,516 | B1 | 6/2001 | Sinclair | 157/1.1 |
| 6,481,083 | B1 | 11/2002 | Lawson et al. | 29/407.04 |
| 6,877,544 | B2 | 4/2005 | Kane et al. | 157/1.24 |
| 7,896,054 | B2 | 3/2011 | Bonacini | 157/1.24 |
| 8,291,958 | B2 | 10/2012 | Bartoli | 157/1.24 |
| 9,139,055 | B2 | 9/2015 | Bonacini | |
| 9,475,342 | B2 | 10/2016 | Feng | |
| 9,757,828 | B2 | 9/2017 | Komatsu et al. | |
| 10,773,550 | B1 | 9/2020 | Downey et al. | |
| 10,926,365 | B2 | 2/2021 | Wen | |
| 10,967,687 | B2 | 4/2021 | Liebetreu et al. | |
| 10,974,546 | B2 | 4/2021 | Downey et al. | |
| 11,059,325 | B2 | 7/2021 | Downey et al. | |
| 11,203,228 | B2 | 12/2021 | Mica et al. | |
| 11,332,352 | B2 | 5/2022 | Bowers et al. | |
| 11,446,826 | B2 | 9/2022 | Chalofsky et al. | |
| 11,446,958 | B2 | 9/2022 | Downey et al. | |
| 11,472,239 | B2 | 10/2022 | Wen | |
| 11,498,358 | B2 | 11/2022 | Mica et al. | |
| 11,597,233 | B2 | 3/2023 | Downey et al. | |
| 11,639,075 | B2 | 5/2023 | Downey et al. | 29/894.31 |
| 11,667,153 | B2 | 6/2023 | Darolfi et al. | 29/894.31 |
| 11,787,232 | B2 | 10/2023 | Darolfi | 29/894.31 |
| 11,787,234 | B2 | 10/2023 | Downey et al. | 29/894.31 |
| 11,861,276 | B2 | 1/2024 | Vargo et al. | |
| 11,872,685 | B2 | 1/2024 | Chalofsky et al. | |
| 11,872,841 | B2 | 1/2024 | Darolfi et al. | |
| 11,986,947 | B2 | 5/2024 | Chalofsky et al. | |
| 12,090,626 | B2 | 9/2024 | Chalofsky et al. | |
| 12,151,522 | B2 | 11/2024 | Wen | |
| 12,181,368 | B1 | 12/2024 | Buchanan et al. | |
| 2003/0000295 | A1* | 1/2003 | Fogal, Sr. | G01M 17/021 |
| | | | | 73/146 |
| 2003/0051326 | A1 | 3/2003 | Lawson et al. | 29/407.01 |
| 2003/0131947 | A1 | 7/2003 | Magnani | 157/1.26 |
| 2004/0221964 | A1 | 11/2004 | Bonacini | 157/1.28 |
| 2005/0020419 | A1 | 1/2005 | Hagmann et al. | 483/1 |
| 2007/0107183 | A1 | 5/2007 | Lawson et al. | 29/407.09 |
| 2008/0196496 | A1 | 8/2008 | Jablonski et al. | 73/462 |
| 2010/0058859 | A1 | 3/2010 | Rogalla et al. | 73/470 |
| 2011/0048649 | A1 | 3/2011 | Komatsu et al. | 157/1.35 |
| 2011/0048650 | A1 | 3/2011 | Lawson et al. | 157/16 |
| 2011/0284170 | A1 | 11/2011 | Lemser et al. | 157/1.1 |
| 2012/0073764 | A1 | 3/2012 | Lawson et al. | 157/1.1 |
| 2012/0125542 | A1 | 5/2012 | Lawson et al. | 157/1.17 |
| 2014/0174630 | A1 | 6/2014 | Donnay et al. | 156/64 |
| 2014/0238127 | A1 | 8/2014 | Lawson et al. | 73/460 |
| 2016/0290885 | A1 | 10/2016 | Straitiff et al. | |
| 2017/0106411 | A1 | 4/2017 | Peinelt et al. | |
| 2017/0334073 | A1 | 11/2017 | Hong et al. | |
| 2017/0335922 | A1 | 11/2017 | Key | |
| 2018/0037072 | A1 | 2/2018 | Yoshikawa et al. | |
| 2018/0326446 | A1 | 11/2018 | Anderson et al. | |
| 2019/0201132 | A1 | 7/2019 | Ugochuku | |
| 2019/0232737 | A1 | 8/2019 | Straitiff et al. | |
| 2019/0257387 | A1 | 8/2019 | Rogalla et al. | |
| 2020/0108659 | A1 | 4/2020 | Downey et al. | |
| 2020/0223675 | A1 | 7/2020 | Wen | |
| 2021/0094089 | A1 | 4/2021 | Shah et al. | |
| 2021/0101237 | A1 | 4/2021 | Kim et al. | |
| 2021/0114408 | A1 | 4/2021 | Darolfi | |
| 2021/0221457 | A1 | 7/2021 | Wen | |
| 2023/0052365 | A1 | 2/2023 | Vargo et al. | |
| 2023/0057819 | A1 | 2/2023 | Shah et al. | |
| 2023/0076081 | A1 | 3/2023 | Wen | |
| 2023/0130910 | A1 | 4/2023 | Downey et al. | 29/894.31 |
| 2023/0202232 | A1 | 6/2023 | Downey et al. | 29/894.31 |
| 2023/0264516 | A1 | 8/2023 | Downey et al. | 29/894.31 |
| 2023/0391032 | A1 | 12/2023 | Dollinger et al. | |
| 2023/0417616 | A1 | 12/2023 | Chalofsky et al. | |
| 2023/0417617 | A1 | 12/2023 | Chalofsky et al. | |
| 2025/0018577 | A1 | 1/2025 | Chalofsky et al. | |
| 2025/0052635 | A1 | 2/2025 | Wen | |
| 2025/0172457 | A1 | 5/2025 | Fenimore et al. | |
| 2025/0283772 | A1 | 9/2025 | Chalofsky et al. | |

FOREIGN PATENT DOCUMENTS

| | | | | |
|---|---|---|---|---|
| CA | 3186687 | A1 | 2/2022 | B60S 9/12 |
| CA | 3157942 | A1 | 4/2022 | B60B 29/00 |
| CN | 104354548 | A | 2/2015 | B60C 25/00 |
| CN | 104354548 | B | 1/2017 | B60C 25/00 |
| CN | 105946476 | B | 10/2018 | B60C 25/132 |
| CN | 209395520 | U | 9/2019 | B60C 25/132 |
| EP | 3703961 | A1 | 9/2020 | B60C 25/05 |
| EP | 3909794 | A1 | 11/2021 | B23P 19/06 |
| EP | 4045333 | A1 | 8/2022 | B60B 29/00 |
| EP | 4188863 | A1 | 6/2023 | B60S 9/12 |
| EP | 4543695 | A2 | 4/2025 | B25J 19/02 |
| JP | 2015507577 | A | 3/2015 | B60B 21/02 |
| JP | 2021191668 | A | 12/2021 | B60B 29/00 |
| KR | 20210137931 | A | 11/2021 | B25J 19/02 |
| TW | 200302787 | A | 8/2003 | B60C 25/132 |
| TW | M528903 | U | 9/2016 | B60C 25/05 |
| TW | 202146186 | A | 12/2021 | B25J 13/06 |
| WO | WO0179008 | A1 | 10/2001 | B60C 25/132 |
| WO | WO03002361 | A1 | 1/2003 | B60C 25/132 |
| WO | WO2006029041 | A2 | 3/2006 | B21K 1/20 |
| WO | WO2006029041 | A3 | 3/2006 | B23P 21/00 |
| WO | WO2019204552 | A1 | 10/2019 | B60C 25/05 |
| WO | WO2021076532 | A1 | 4/2021 | B60B 29/00 |
| WO | WO2021188307 | A1 | 9/2021 | B25B 23/04 |
| WO | WO2022026776 | A1 | 2/2022 | B60S 9/12 |
| WO | WO2023076255 | A1 | 5/2023 | B25J 13/08 |
| WO | WO2023076558 | A1 | 5/2023 | G05B 19/00 |
| WO | WO2023076559 | A1 | 5/2023 | G06N 20/00 |
| WO | WO2023250113 | A2 | 12/2023 | B60C 25/05 |

OTHER PUBLICATIONS

Angel, Kristin, "*Calculating the Location of the Center-of-Gravity Using an Accelerometer Array*", Thesis, Rochester Institute of Technology, May 29, 2019, pp. 1-93. Abstract and full text available at: https://repository.rit.edu/theses/10117/ (last accessed on Aug. 1, 2025)

Huff, et al., "*Mothership—A serpentine tread/limb hybrid marsupial robot for USAR*", 2012 IEEE International Symposium on Safety, Security, and Rescue Robotics (SSRR), Nov. 2012, pp. 1-7. Abstract and full text available at: https://ieeexplore.ieee.org/document/6523893 (last accessed on Aug. 1, 2025).

Wang, et al., "*Dynamics modeling of a mobile manipulator for wheel slip avoidance*", 2011 IEEE International Conference on Robotics and Biomimetics, Dec. 2011, pp. 1621-1626. Abstract and full text available at: https://ieeexplore.ieee.org/document/6181521 (last accessed on Aug. 1, 2025).

McGinn, et al., "*Towards the design of a new humanoid robot for domestic applications*", 2014 IEEE International Conference on Technologies for Practical Robot Applications (TePRA), Apr. 2014, pp. 1-6. Abstract and full text available at: https://ieeexplore.ieee.org/document/6869155 (last accessed on Aug. 1, 2025).

Teller, et al., "*A voice-commandable robotic forklift working alongside humans in minimally-prepared outdoor environments*", 2010 IEEE International Conference on Robotics and Automation, May

(56) References Cited

OTHER PUBLICATIONS 2010, pp. 526-533. Abstract and full text available at: https://ieeexplore.ieee.org/document/5509238 (last accessed on Aug. 1, 2025).

Abad-Manterola, et al., "*Axel rover paddle wheel design, efficiency, and sinkage on deformable terrain*", 2010 IEEE International Conference on Robotics and Automation, May 2010, pp. 2821-2827. Abstract and full text available at: https://ieeexplore.ieee.org/document/5509391 (last accessed on Aug. 1, 2025).

Shin, et al., "*A partitioned control scheme for mobile robot path tracking*", IEEE 1991 International Conference on Systems Engineering, Aug. 1991, pp. 338-342. Abstract and full text available at: https://www.researchgate.net/publication/3528083_A_partitioned_control_scheme_for_mobile_robot_path_tracking (last accessed on Aug. 1, 2025).

Beckman, et al., "*Two dimensional dynamic stability for reconfigurable robots designed to traverse rough terrain*", 2008 IEEE/RSJ International Conference on Intelligent Robots and Systems, Sep. 2008, pp. 2427-2452. Abstract and full text available at: https://ieeexplore.ieee.org/document/4650753 (last accessed on Aug. 1, 2025).

Ordonez, et al., "*COBRA: Collaborative Bot with multi-Rotor Actuation*", 2019 IEEE/RSJ International Conference on Intelligent Robots and Systems (IROS), Nov. 2019, pp. 4512-4517. Abstract and full text available at: https://ieeexplore.ieee.org/document/8968480 (last accessed on Aug. 1, 2025).

"*L88 On-vehicle 'finish balancer'*", CEMB Balancing Machines, the whole document. Full text available at: https://www.cemb.com/en/garage-equipment/188/ (publication date unknown; date retrieved: Jul. 29, 2024; last accessed: Aug. 1, 2025).

"*CEMB USA L88—On Car Vehicle Wheel / Tire Balancer*", YouTube, uploaded by CEMB USA—Garage Equipment, Nov. 24, 2014. Video available at: https://www.youtube.com/watch?v=GZbjcx4-4WA (last accessed on Aug. 1, 2025).

"*Amermac 501 Electronic Strobe Balancer*", All Tire Supply, the whole document. Full text available at: https://www.alltiresupply.com/products/electronic-strobe-balancer (publication date unknown; date retrieved: Apr. 30, 2025; last accessed: Aug. 1, 2025).

The Notification of Transmittal of the International Search Report and the Written Opinion of the International Searching Authority, or the Declaration, dated Jan. 10, 2024, which was issued by the International Searching Authority of WIPO in Applicant's related international PCT application having Serial No. PCT/US2023/026028, filed on Jun. 22, 2023.

The Written Opinion of the International Searching Authority, dated Jan. 10, 2024, which was issued by the International Searching Authority of WIPO in Applicant's related international PCT application having Serial No. PCT/US2023/026028, filed on Jun. 22, 2023.

The International Search Report, dated Jan. 10, 2024, which was issued by the International Searching Authority of WIPO in Applicant's related international PCT application having Serial No. PCT/US2023/026028, filed on Jun. 22, 2023.

A Communication Pursuant to Rule 62 EPC, dated Oct. 11, 2021, issued by the European Patent Office in Applicant's related European Patent Application No. EP21173130.2, filed on May 10, 2021.

An Extended European Search Report (Oct. 11, 2021—mailed with the Communication Pursuant to Rule 62 EPC), issued by the European Patent Office in Applicant's related European Patent Application No. EP21173130.2, filed on May 10, 2021.

A European Search Opinion (Oct. 11, 2021—mailed with the Communication Pursuant to Rule 62 EPC), issued by the European Patent Office in Applicant's related European Patent Application No. EP21173130.2, filed on May 10, 2021.

A Communication Pursuant to Article 94(3) EPC, dated Sep. 20, 2023, issued by the European Patent Office in Applicant's related European Patent Application No. EP21173130.2, filed on May 10, 2021.

A Communication Pursuant to Article 94(3) EPC, dated Nov. 22, 2024, issued by the European Patent Office in Applicant's related European Patent Application No. EP21173130.2, filed on May 10, 2021.

A Communication Pursuant to Rules 161(2) and 162 EPC, dated Jan. 29, 2025, issued by the European Patent Office in Applicant's related European Patent Application No. EP23827863.4, filed on Dec. 5, 2024.

A Japanese Office Action (in Japanese) and an English translation thereof, dated May 26, 2025, issued by the Japanese Patent Office for Applicant's related Japanese Application No. 2021-079770, filed on May 10, 2021.

A Communication Pursuant to Rule 71(3) EPC, dated Jun. 6, 2025, issued by the European Patent Office in Applicant's related European Patent Application No. EP21173130.2, filed on May 10, 2021.

A Taiwanese Office Action (in Chinese), dated Sep. 5, 2025, issued by the Taiwanese Intellectual Property Office for Applicant's related Taiwanese Patent Application No. 110116791, and a computer-generated English translation thereof.

U.S. Appl. No. 19/381,280, filed Nov. 6, 2025, Chalofsky, et al.

An Office Action (in Korean), dated Nov. 28, 2025, issued by the Ministry of Intellectual Property, Republic of Korea (MOIP), for Applicant's Korean Patent Application No. 2021-61034, and a computer-generated English translation thereof.

Waldron, "*Mobility and controllability characteristics of mobile robotic platforms*", 1985, IEEE, pp. 237-243. Abstract and full text also available at: https://ieeexplore.ieee.org/document/1087323 (last accessed on Nov. 22, 2025).

Kaffel, et al., "*An Autonomous Mobile Robot*", 1992, IEEE, pp. 790-798. And full text also available at: https://ieeexplore.ieee.org/document/637637 (last accessed on Nov. 22, 2025).

Freitas, et al., "*Terrain model-based anticipative control for articulated vehicles with low bandwidth actuators*", 2013, IEEE, pp. 382-389. And full at: https://ieeexplore.ieee.org/document/6630604 (last accessed on Nov. 22, 2025).

Staab, et al., "*Automatic Tire Changing of Large Mining Vehicles with Industrial Robots*", 2016, IEEE, pp. 1-7. And full text also available at: https://ieeexplore.ieee.org/document/7559134 (last accessed on Nov. 22, 2025).

Staab, et al., "*A Robotic Parallel Platform for Automated Tire Changing of Large Mining Vehicles*", 2014, IEEE, pp. 435-441. Abstract and full text also available at: https://ieeexplore.ieee.org/document/6840164 (last accessed on Nov. 22, 2025).

Xu, et al., "*Inter-Vehicle Dynamic Data Management and Communication Design*", 2009, IEEE, pp. 594-598. Abstract and full text also available at: https://ieeexplore.ieee.org/document/5195870 (last accessed on Nov. 22, 2025).

U.S. Appl. No. 19/415,050, filed Dec. 10, 2025, Chalofsky, et al.

\* cited by examiner

| RAIL/TRACK |
| OVERHEAD MOUNTED |
| WALL MOUNTED |
| FLOOR MOUNTED |

RAISED FEATURES

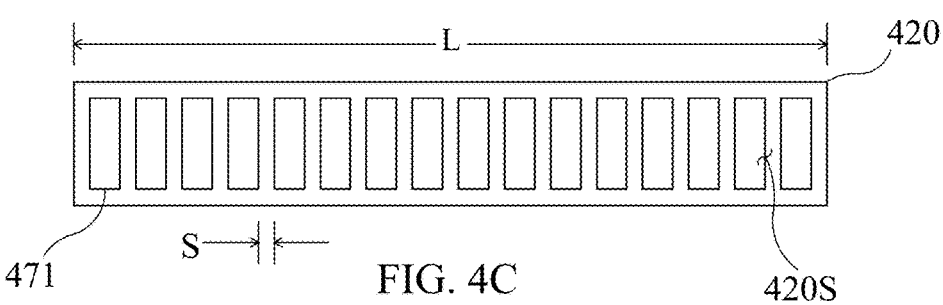
FIG. 4C
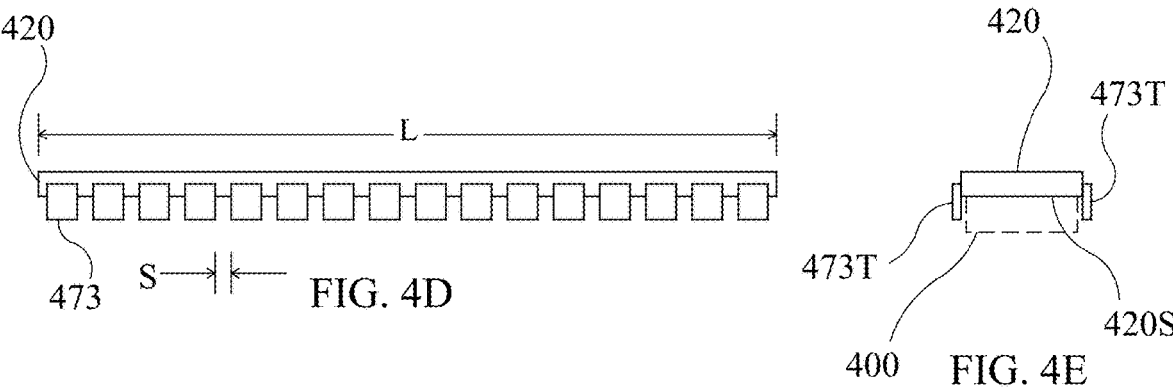
FIG. 4D
FIG. 4E
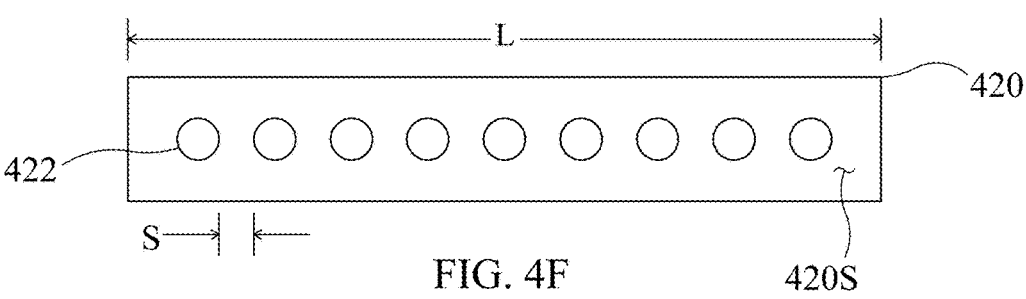
FIG. 4F

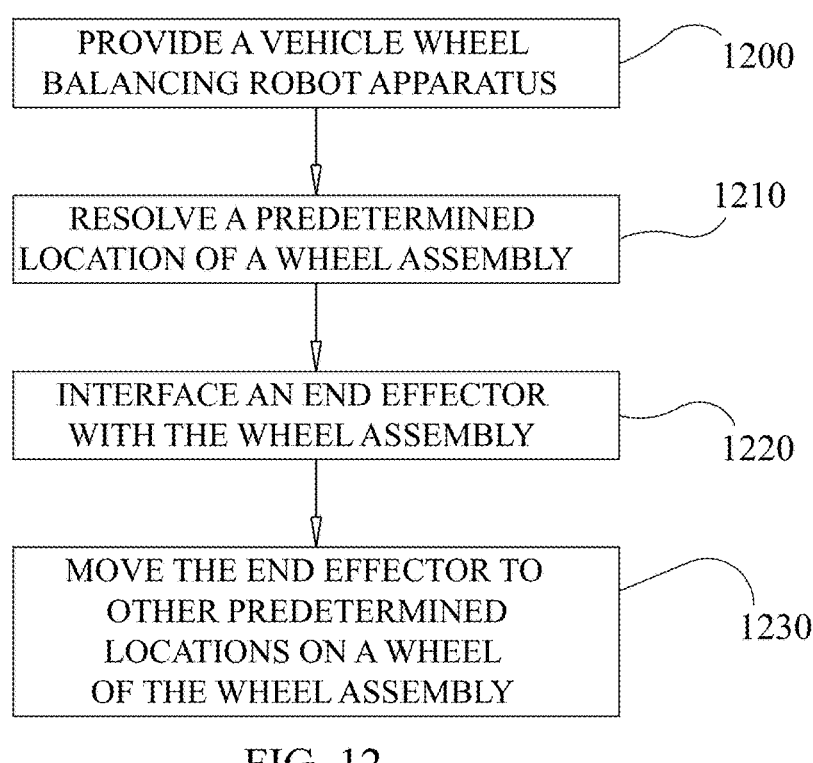

PROVIDE A VEHICLE WHEEL BALANCING ROBOT APPARATUS — 1200

RESOLVE A PREDETERMINED LOCATION OF A WHEEL ASSEMBLY — 1210

INTERFACE AN END EFFECTOR WITH THE WHEEL ASSEMBLY — 1220

MOVE THE END EFFECTOR TO OTHER PREDETERMINED LOCATIONS ON A WHEEL OF THE WHEEL ASSEMBLY — 1230

FIG. 12

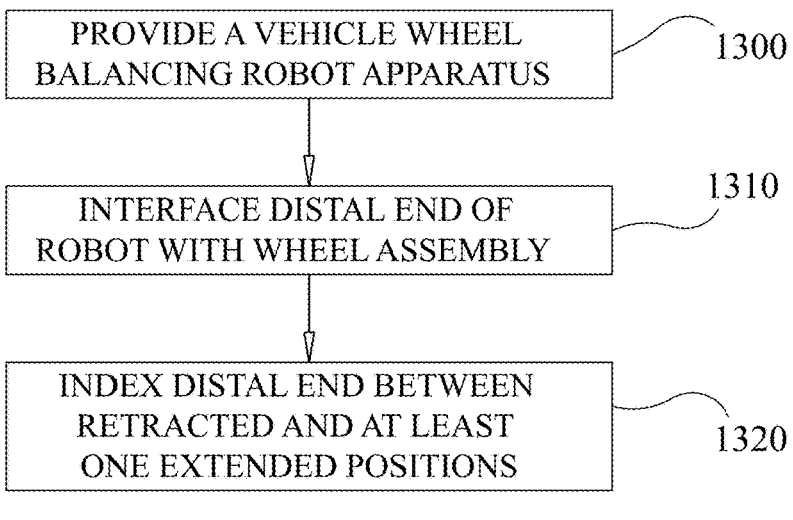

PROVIDE A VEHICLE WHEEL BALANCING ROBOT APPARATUS — 1300

INTERFACE DISTAL END OF ROBOT WITH WHEEL ASSEMBLY — 1310

INDEX DISTAL END BETWEEN RETRACTED AND AT LEAST ONE EXTENDED POSITIONS — 1320

FIG. 13

POSITION TIRE BALANCER AND
WHEEL RELATIVE TO EACH OTHER          1200

ENGAGE VIBRATION SENSOR
WITH SUSPENSION COMPONENT          1210

ROTATE WHEEL ASSEMBLY          1220

OBTAIN WHEEL BALANCE
METRICS FROM VIBRATION SENSOR          1230

DETERMINE AMOUNT OF WEIGHT
AND POSITION OF WEIGHT          1240

APPLY WEIGHT          1250

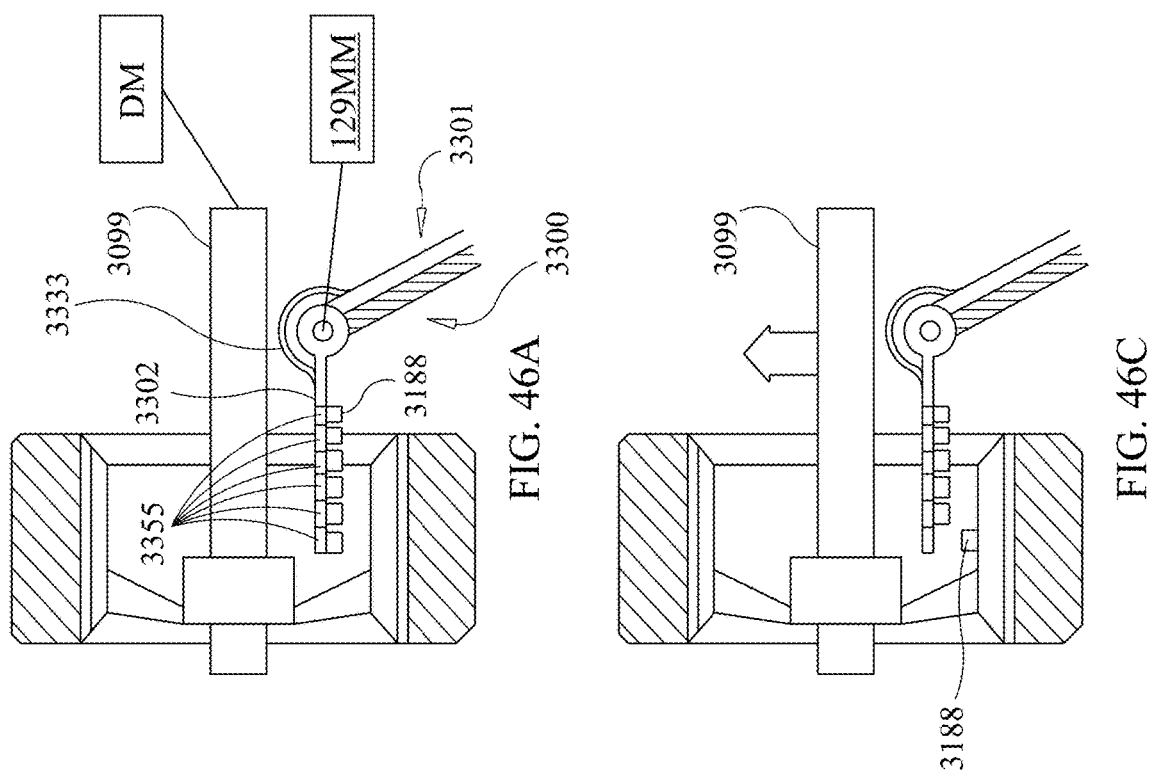
FIG. 46A
FIG. 46C
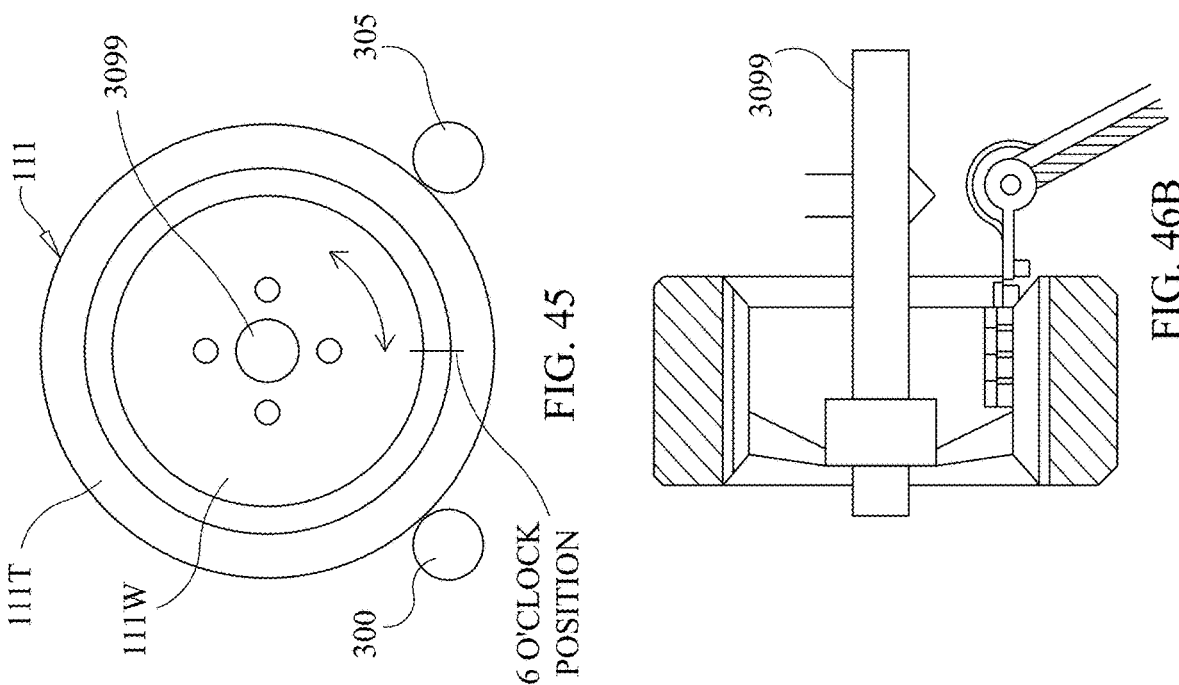
FIG. 45
FIG. 46B

| BRUSH | SUCTION CUP |
|---|---|
| MECHANICAL GRIPPER | |
| FORCED AIR | |

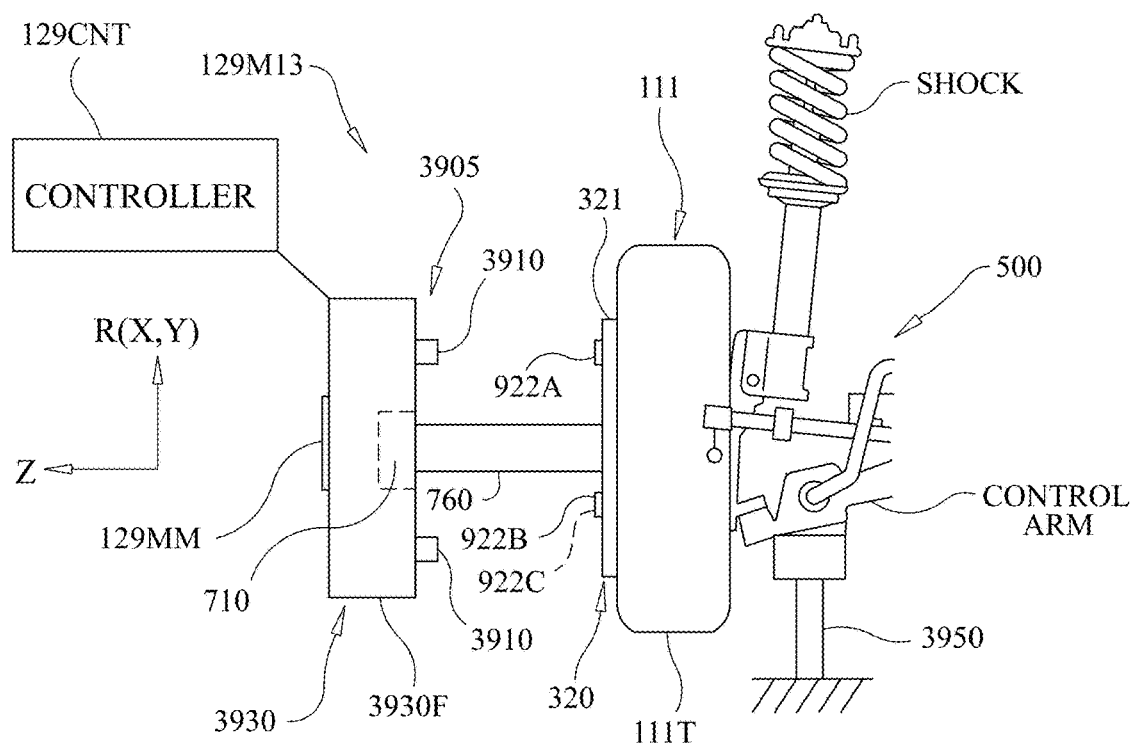
FIG. 52A
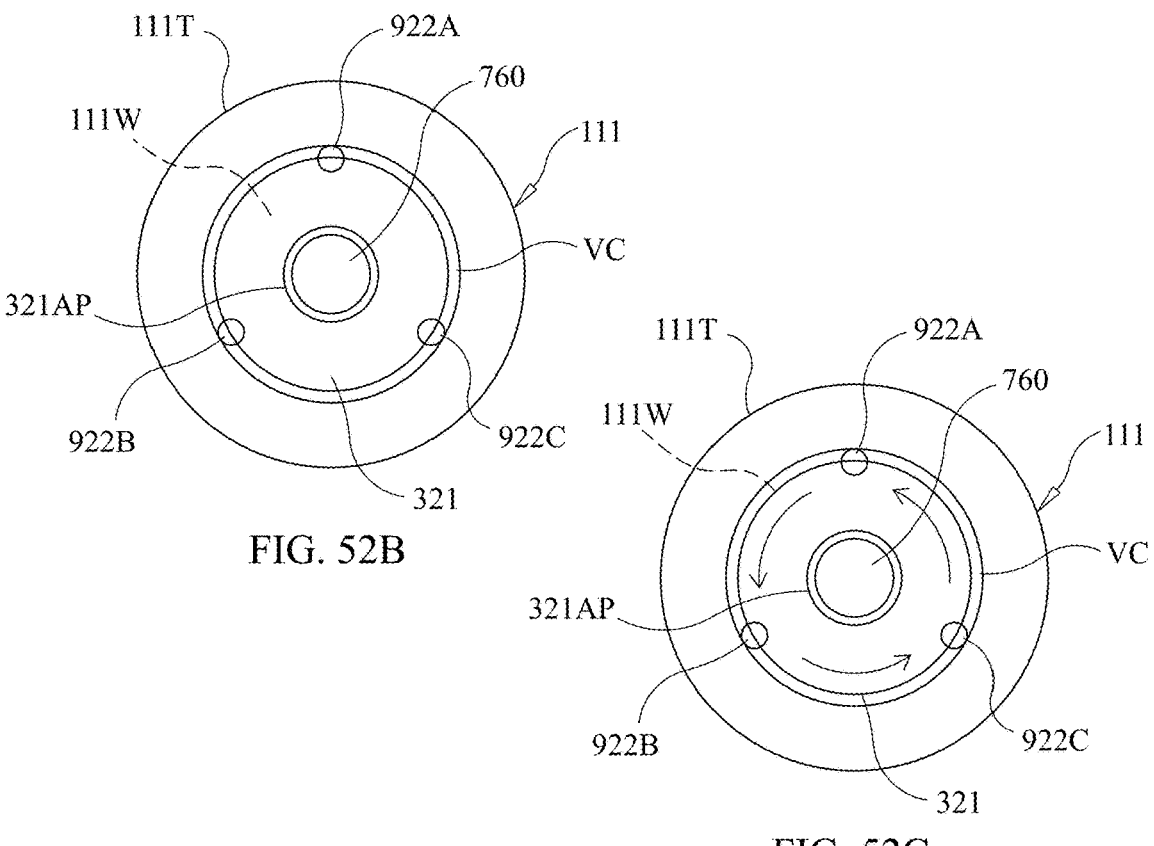
FIG. 52B
FIG. 52C

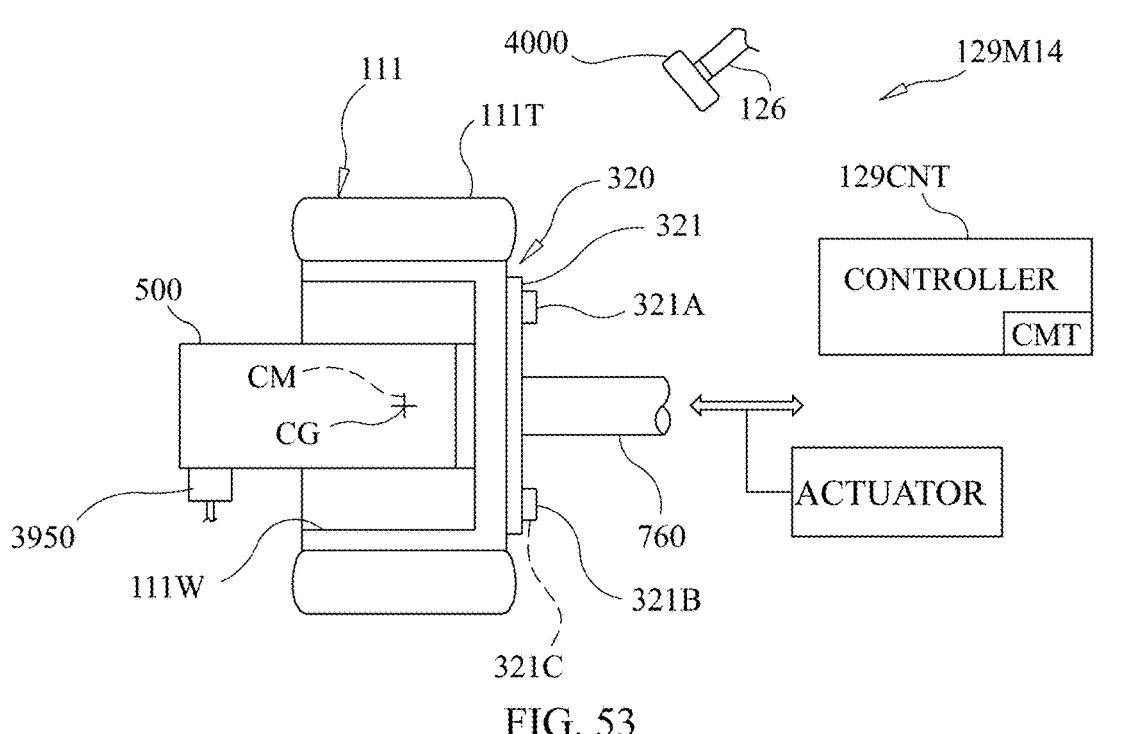
FIG. 53
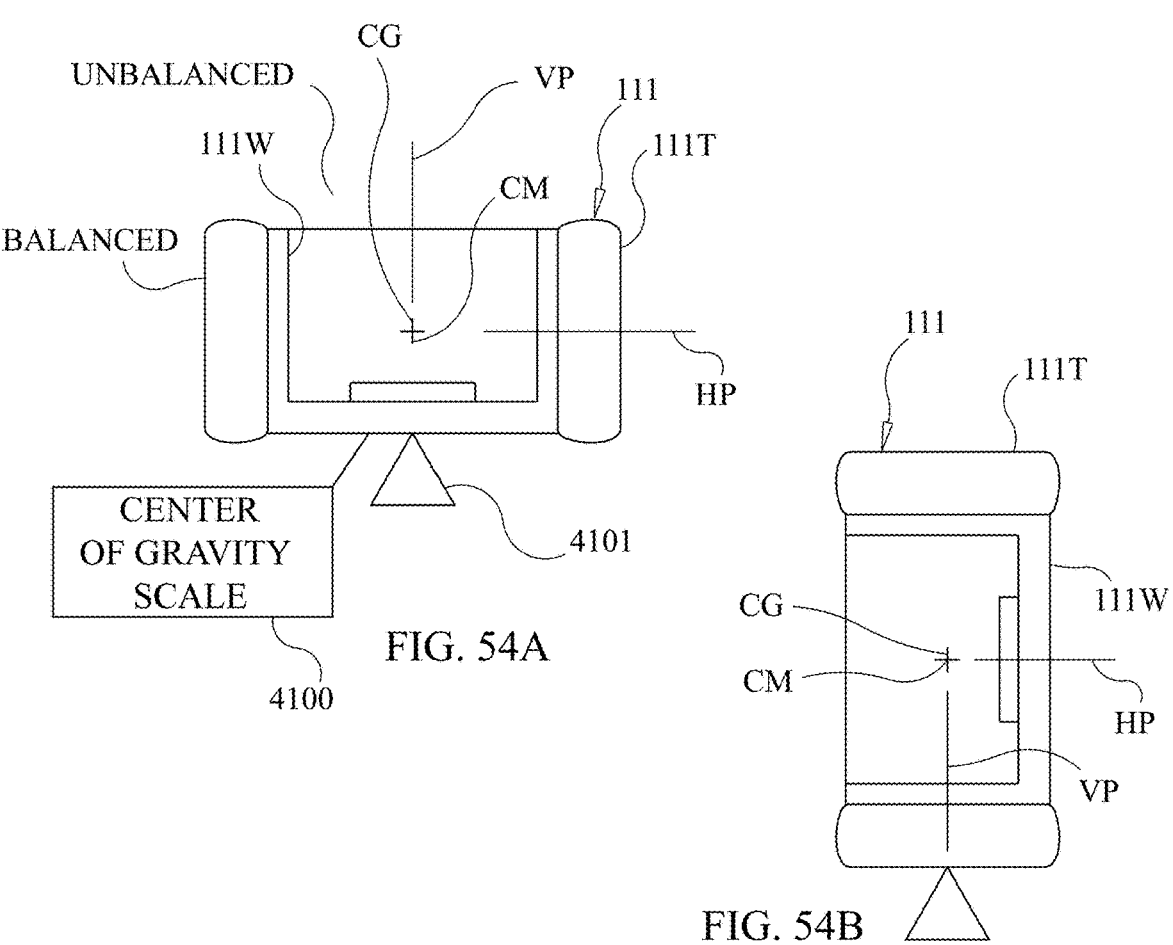
FIG. 54A
FIG. 54B

129M15

110

320

1701

3888

WCP

SLM

WCP 1701
320

3888

100A

CONTROLLER

129CNT

111R

4200

4200

2100

4299
(WLBS)

4200FR

4200RR

111FR

111RR

TRAN5A

CLU2

TRAN5B

TRAN1

TRAN3

CLU1

CLU3

TRAN2

TRAN4

TRAN5

111FL

111RL

4200FL

4200RL

111

4200

4200

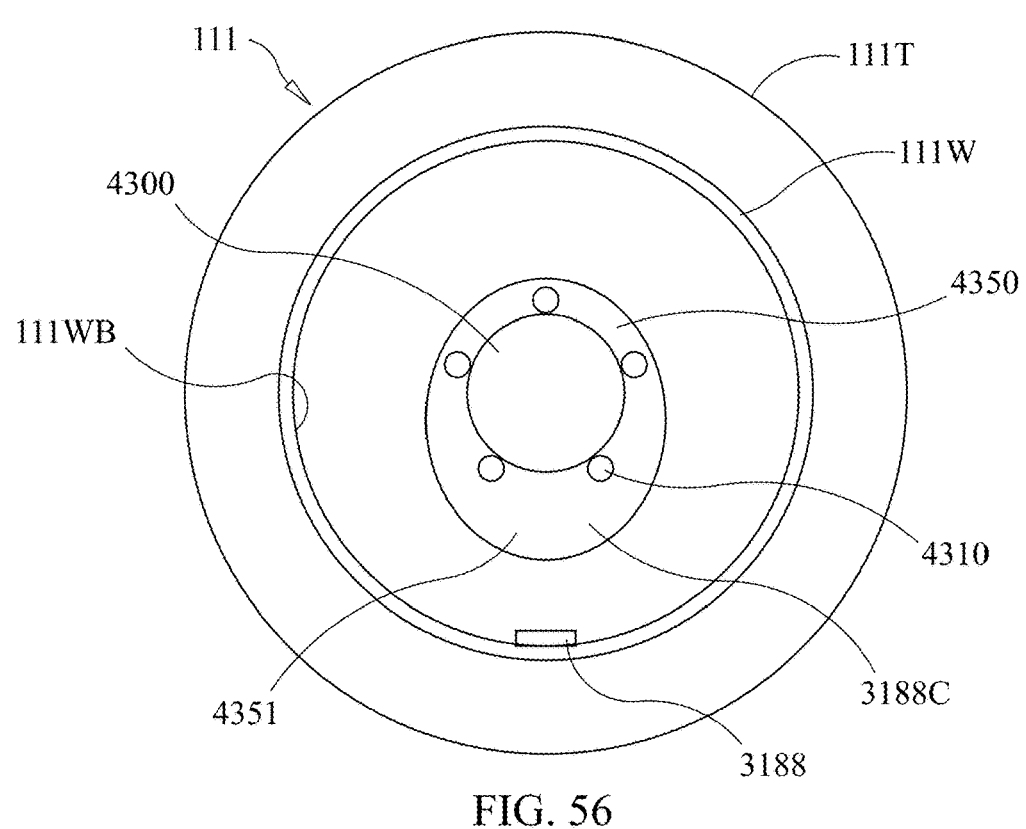
FIG. 56
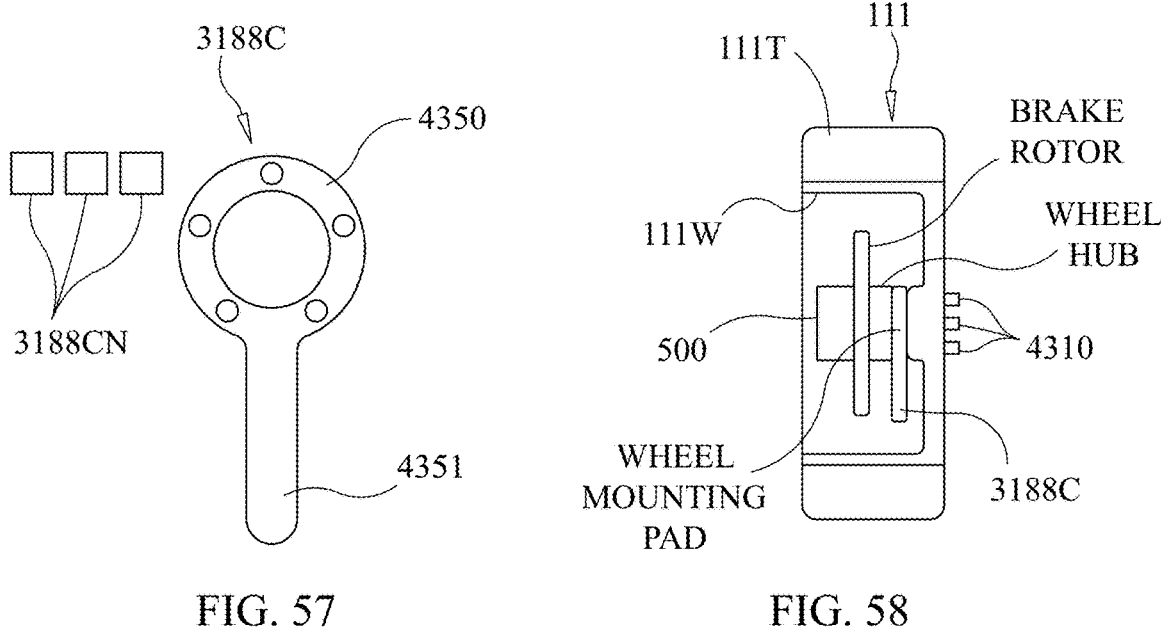
FIG. 57                    FIG. 58

2170

2171

2172

2170

2171

2172

2173

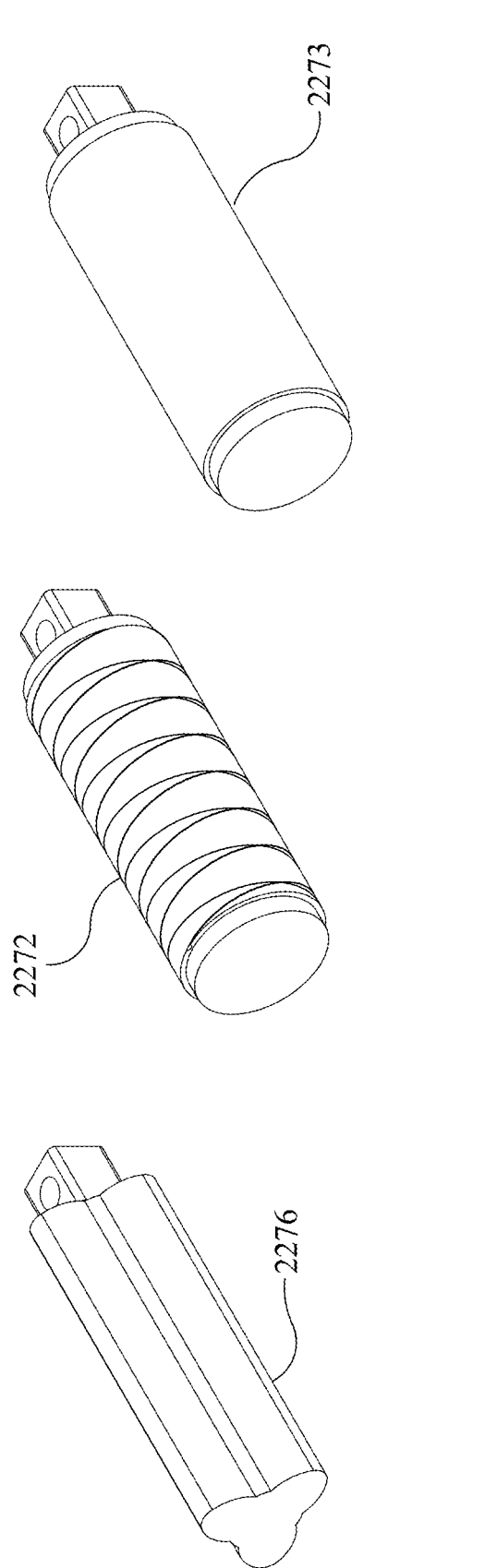
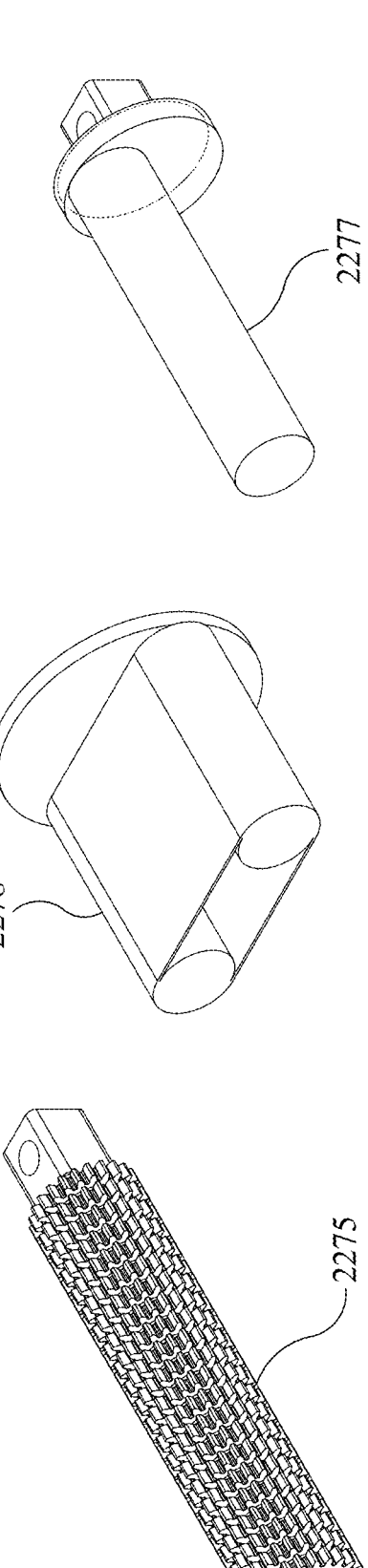
FIG. 75

2350

1610

3060

1250

Iteration #

Imbalance

SYSTEM IDENTIFICATION PROCESS

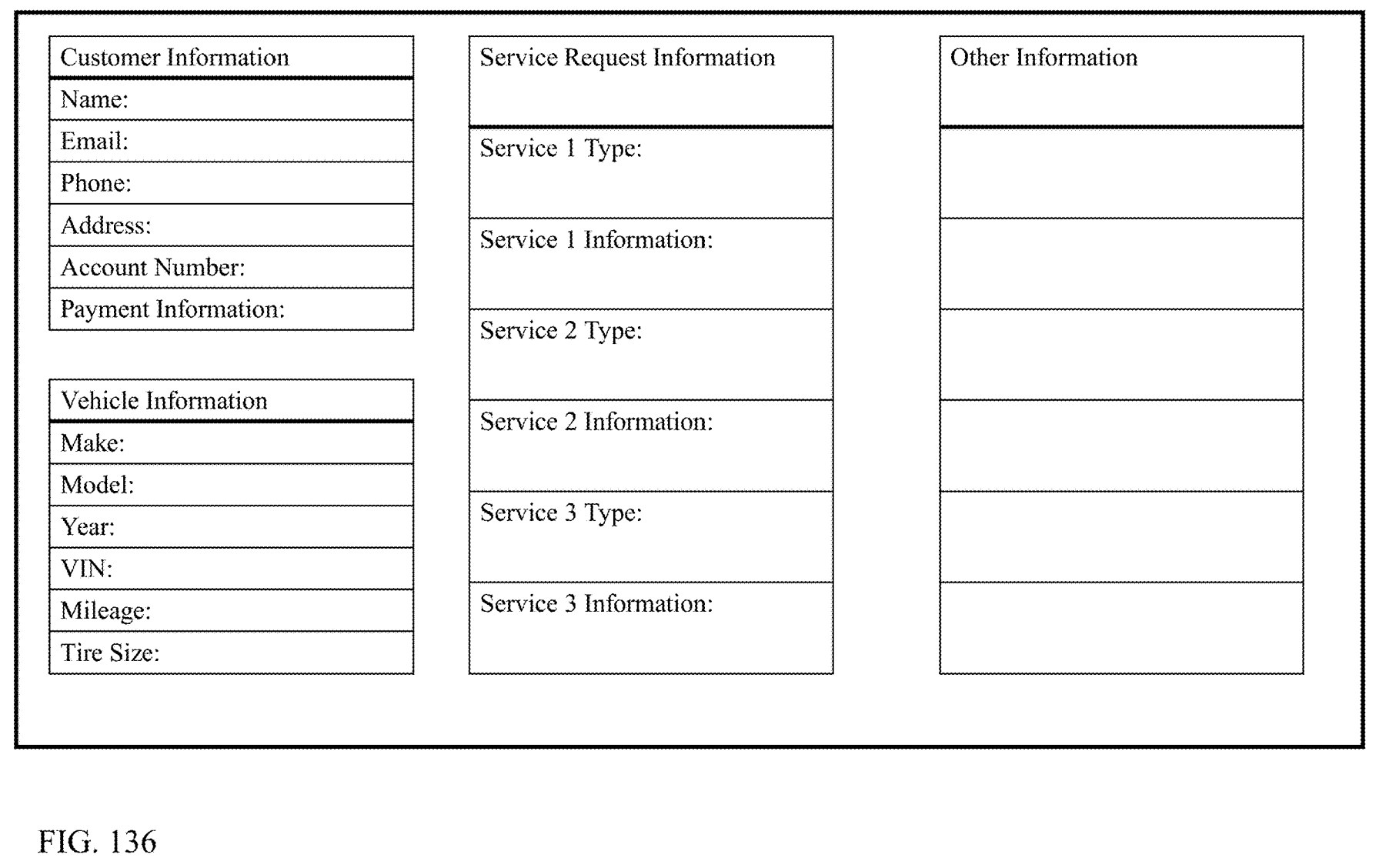

Customer Information

Name:

Email:

Phone:

Address:

Account Number:

Payment Information:

Vehicle Information

Make:

Model:

Year:

VIN:

Mileage:

Tire Size:

Service Request Information

Service 1 Type:

Service 1 Information:

Service 2 Type:

Service 2 Information:

Service 3 Type:

Service 3 Information:

Other Information

FIG. 136

AUTONOMOUS TIRE AND WHEEL BALANCER, METHOD THEREFOR AND ROBOTIC AUTOMOTIVE SERVICE SYSTEM

CROSS-REFERENCE TO RELATED APPLICATIONS

This application is a continuation of co-pending U.S. patent application Ser. No. 18/213,239, filed on Jun. 22, 2023, and entitled "Autonomous Tire And Wheel Balancer, Method Therefor And Robotic Automotive Service System", which claims the benefit of priority under 35 U.S.C. 119 and/or 35 U.S.C. 120 to U.S. Provisional Patent Application Ser. No. 63/354,591, filed on Jun. 22, 2022, and entitled "Autonomous Tire And Wheel Balancer And Method Therefor", the disclosure of each of which is hereby incorporated by reference and on which priority is hereby claimed.

BACKGROUND OF THE DISCLOSURE

Field of the Disclosure

The present disclosure generally relates to vehicle tire changing equipment, and more particularly, to automated vehicle tire changing equipment and systems.

Description of the Related Developments

Like many industries that generally rely on human labor, there is a shortage of vehicle service technicians to meet demand with respect to, for example, the automobile service industry. Even with an adequate number of employees, throughput and efficiency of an automobile service facility or center may be impacted if one of their vehicle service technicians does not show up for work.

In addition to maintaining an adequate number of vehicle service technicians, automobile service facilities also face a challenge of finding a suitably qualified technician for any given tasks. For example, senior vehicle service technicians are often too highly paid for a service facility to justify the senior vehicle service technician to perform certain types of work. Moreover, it is not uncommon for some senior vehicle service technicians to refuse work that is below their level of expertise. For example, a senior vehicle service technician may refuse to perform vehicle tire changes. This creates a problem for service facilities in that an appropriate mix of vehicle service technician skill level must generally be maintained to maximize profits and efficiently operate the service facility.

A constantly changing level of consumer demand for certain automotive services may also compound the problem of efficient service facility operation because at some points in time the service facility may have an appropriate number of vehicle service technicians with an appropriate skill level for a certain task(s), such as vehicle tire changes, while at other times that same number of vehicle service technicians may be unsuitable for fulfilling customer demand with respect to the vehicle tire changes.

Generally, depending on the size of the service facility, tire changes are performed fully manually, manually with machine assist, or in a semi-automated manner. Fully manual tire changes are labor intensive and involve the use of manual bead breakers, crowbars or mount and demount tools, tire irons, and wheel supports. The amount of labor involved with fully manual tire changes may limit the number of tire changes that can be performed by a vehicle service technician in a given amount of time. The manual with machine assist tire changes reduce the labor involved with the tire change and generally include a machine with hydraulic-powered axes of motion that assist with breaking of the tire bead as well as maneuvering of the tire bead around a flange of the wheel from or to which the tire is being removed or installed. Semi-automated tire machines reduce the labor involved with a tire change even further, thus allowing a service technician to perform more tire changes; however, these semi-automated machines generally require constant vehicle service technician presence making multiple simultaneous tire changes by a single vehicle service technician unfeasible. The number of tire changes (and vehicles processed) that can be performed with the above-noted conventional tire change apparatus/methods is generally limited by the number of machines and corresponding vehicle service technicians available to use those machines.

In addition to the tire changing process, newly installed tires require the tire/wheel assembly to be balanced. This is also typically performed by a vehicle service technician using a conventional tire balancing machine with the tire/wheel assembly off the vehicle. While tire balancing machines that balance the tire/wheel assembly with the tire/wheel assembly on the vehicle have been used in the past, all-wheel-drive and traction control systems on newer vehicles have all but eliminated these conventional methods of balancing the tire/wheel assembly with the tire/wheel assembly on the vehicle. Tire balancing beads may also be used to dynamically balance a tire/wheel assembly, where the tire balancing beads are inserted into the tire by a vehicle service technician before seating the tire bead on the wheel. In any event, each of these tire balancing methods requires the constant presence of the vehicle service technician, again limiting the number of tires that can be changed in a given time period.

In some systems, wheel weights (also referred to herein as wheel balancing weights) are applied to a wheel, located off or dismounted from of a vehicle, using robots. These robots employ a rigid end effector that includes a curved surface on which the wheel weights are held. This curved surface has a radius that matches the inside radius of a barrel of the wheel on which barrel the weight is to be affixed. To apply the wheel weight, the robot rotates the end effector so that the weight held on the curved surface contacts the barrel at one edge. The robot rotates the end effector so that the curved surface rotates relative to the barrel so that the curved surface "rolls" along the barrel applying the wheel weight to the barrel in a "rolling" manner (such as in a manner similar to a paint roller depositing paint on a surface). Here, the swinging/rotating movement of the end effector is large and while sufficient for applying a wheel weight to a wheel located off of a vehicle, such rolling on of the wheel weight is prohibitive (due to a lack of the required swing area) with the wheel located on the vehicle. In addition, the "rolling" manner in which the wheel weight is applied may not provide a constant pressure along a length of the wheel weight that may result in debonding of the wheel weight from the wheel.

The wheel weights are generally applied, e.g., for correcting dynamic balance in accordance with an "inner" and "outer" method where an inner (further away from the centerline of the vehicle) and an outer (towards a centerline of the vehicle) wheel weights are selected for respective placement adjacent the back of the wheel flange and adjacent the inner wheel lip. This contrasts with a method of selecting a single location and single weight, however, the single location and single weight method is less common in the industry. When applying dynamic balancing weights in an automated system, it is likely that there would be one or a combination of axes, which allow for a fully controlled degree-of-freedom in the axial direction of the wheel, which would allow for the single location and single weight method; however, such control may not be necessary.

With respect to automated access for placing wheel weights, many vehicles have non-standard flanges as part of the inner lip of the wheel. Without knowing the geometry of these non-standard flanges, placing a tool for installing a wheel weight inside the barrel of a wheel is difficult.

The manual tire-changing process is not as simple as removing the tire from the rim and placing a new one on. Such a process has many steps that must be followed for success, and a comparable number of tools to complete those steps. In brief, the tire wheel assembly (TWA) must be removed from the car using a lug wrench and placed on a tire changing machine, where a hub adapter is used to tighten the rim for rotation. The valve stem is removed using a tool for protection and to deflate the tire. The beads are broken using dedicated bead breaking rollers. The tire is then lubricated. A bead removal tool is inserted (often with the help of a lever) and the bead is removed. The rim itself is usually then cleaned with a scotch-brite style material by hand. The new tire is then lubed and placed onto the rim. After being pushed into position on the rim, the valve stem is inserted and the tire re-inflated.

This very brief description accounts for 14 steps and 10 tools, all being handled by an operator who is usually the lowest-trained and compensated employee in a typical mechanic shop environment. Severe limitations exist in this model from a time, safety, and risk perspective. A human operator normally takes about 1 hour to change all the tires on a vehicle (15 min per tire). In that time, the operator is near power tools and semi-automated machinery which poses a safety risk. Finally, many the tools and operations are positioned by the operator by eye. A misaligned tool can cause significant damage to expensive customer rims and tires, posing a business risk every time the operation takes place.

There are two main modes of vibration due to imbalance in the rotating assemblies of a vehicle: static and dynamic imbalance, also referred to as wheel hop and wheel wobble, respectively. Static imbalance is defined here as imbalance along a plane parallel to the wall of the TWA. Dynamic imbalance is defined here as imbalance in a plane not parallel to the wall of the TWA. Imbalance generated by the rotating assembly is often transmitted, at least in-part, to the driver of the vehicle through the suspension and steering column.

Vibration in a vehicle is undesirable for several reasons. Vibration in mechanical components of the vehicle can cause premature wear due to the mechanical stresses induced on wheel bearings, the suspension, tie rods, and more. Vibration can also increase tire wear causing increased expense in premature tire replacement. Excessive vibration may require the owner of the vehicle to perform maintenance on a more regular basis to reduce premature wear. Additionally, vibration felt by the driver during operation of the vehicle can be uncomfortable and cause fatigue and loss of concentration.

Because of the undesirability of imbalance in the vehicle, technology has been developed for balancing TWA assemblies before installing them onto the vehicle. This technology generally involves mounting the TWA on a shaft and rotating it while measuring disturbances on the shaft caused by imbalance. Weights will then be applied to the tire to counteract any measured imbalance, reducing disturbances and thus vibration to an acceptable level. A technician will then take the balanced TWA and mount it on the vehicle.

This current model of TWA balancing has several inherent risks and limitations. The first limitation is that the process is slow. A technician must remove a TWA from the vehicle, bring it to the balancing machine, run the balancing sequence, apply weights, and then bring the TWA back to the vehicle and remount it. A full TWA balancing sequence for a vehicle with four tires can take anywhere from 45 minutes to several hours depending on the speed and availability of technicians in a shop.

A second limitation in the current model is that current TWA balancing happens off the vehicle. This turns balancing of the TWA into a significantly simpler problem to solve but introduces drawbacks as it removes the dynamics of the TWA mounting hardware and vehicle from the balancing procedure. This results in a TWA that is well-balanced but is placed into a system (the vehicle) that itself has additional imbalance in the rotating assembly. As such, imbalance still exists within the system and the results can be felt by the operator.

A third limitation and risk in the process is the technician. Attrition in the workforce has led to shops having less technicians or having to hire sub-par technicians to work with tire balancing. These technicians may not be highly trained in the process, which can often result in a subpar balance. Furthermore, even the best technicians represent a time limitation: breaks, time off, conversations with coworkers, and more mean they work at less-than-optimal efficiency.

Additionally, TWAs are often heavy and require lifting. Technicians can become injured during the process or damage machines while moving TWAs or operating the balancing sequence, all of which represents significant risk to the businesses operating in the TWA balancing space.

These risks and limitations paint a clear picture of a market for an automated TWA wheel balancing machine. Such a machine can operate significantly faster than a human technician and work without time off. Furthermore, the machine is not at risk of injury like a human technician and represents significantly less business risk.

OBJECTS AND SUMMARY OF THE DISCLOSURE

It is an object of the present disclosure to provide a method for on vehicle balancing, the method comprising the steps of effecting rotation of a vehicle's tire wheel assembly about its axis of rotation, providing one or more sensors to measure the one or more imbalance signals, measuring the one or more imbalance signals with the one or more sensors, determining, based on the measurements of the one or more sensors and the magnitude of the one or more tire balancing weights, the locations on the tire wheel assembly to affix the one or more tire balancing weights to balance the one or more of the tire, the wheel, the bearings, the brake components and the vehicle components that impart vibrations to the vehicle; and affixing the one or more tire balancing weights to the determined locations on the tire wheel assembly.

It is another object of the present invention to provide an instrumented tool for performing tire servicing operations that is engageable with an end effector of a robotic system or mountable to a frame of the robotic system. The instrumented tool includes at least one actuator, a carriage, a drive that effects movement of the carriage between a first position and a second position, tooling mounted to the carriage and one or more sensors.

These and other objects, features and advantages of the present disclosure will be apparent from the following detailed description of illustrative embodiments thereof, which is to be read in connection with the accompanying drawings.

BRIEF DESCRIPTION OF THE DRAWINGS

FIG. 4C is a schematic illustration of a portion of the wheel weight installation tool of FIGS. 4A and 4B in accordance with the present disclosure;

FIGS. 4D and 4E are a schematic illustrations of a portion of the wheel weight installation tool of FIGS. 4A and 4B in accordance with the present disclosure;

FIG. 4F is a schematic illustration of a portion of the wheel weight installation tool of FIGS. 4A and 4B in accordance with the present disclosure;

FIGS. 12-15 are flow diagrams of wheel balancing methods of the automated tire changing system of FIGS. 1A and 1B in accordance with the present disclosure;

FIGS. 32A-33B are schematic illustrations of a portion of an automated tire changing system in accordance with aspects of the present disclosure;

FIG. 33 is an exemplary flow diagram of a method in accordance with aspects of the present disclosure;

FIGS. 45 and 46A-46D are schematic illustrations of a portion of an automated tire changing system in accordance with aspects of the present disclosure;

FIGS. 52A-52C are schematic illustrations of a portion of an automated tire changing system in accordance with aspects of the present disclosure;

FIG. 53 is a schematic illustration of a portion of an automated tire changing system in accordance with aspects of the present disclosure;

FIGS. 54A-54B are schematic illustrations of a portion of an automated tire changing system in accordance with aspects of the present disclosure;

FIGS. 56, 57, and 58 are schematic illustrations of a portion of an automated tire changing system in accordance with aspects of the present disclosure;

FIG. 75 is a top perspective view of several grippers formed in accordance with the present disclosure;

FIG. 121 is a flow diagram of a system identification (SID) process in accordance with the present disclosure;

FIG. 122 is a flow diagram of a method of using SID for the on-car wheel balancing process in accordance with the present disclosure;

FIG. 123 is a flow diagram of a machine learning (ML) system architecture for on-vehicle wheel balancing formed in accordance with the present disclosure;

FIG. 124 is a flow diagram of an exemplary process of wheel balancing using an ML algorithm after the development of a wheel-balancing based ML model using the process shown in FIG. 123 of the drawings in accordance with the present disclosure;

FIG. 125 is a flow diagram of a method for recovering additional training data for the ML model through customer testing in accordance with the present disclosure;

FIG. 126 shows an exemplary diagram of the contents of a typical signal acquired during the wheel balancing process in accordance with the present disclosure;

FIG. 127 illustrates a fast-Fourier transform (FFT) of an acquired signal;

FIG. 128 is top perspective view of a lift system formed in accordance with the present disclosure;

FIG. 129 is top perspective view of a lift plate system formed in accordance with the present disclosure;

FIG. 130 is top perspective view of a camera positioning system formed in accordance with the present disclosure;

FIG. 131 is a graphical illustration of operator controls formed in accordance with the present disclosure;

FIG. 132 is top perspective view of the robotic automotive service system formed in accordance with the present disclosure;

Figure 133:
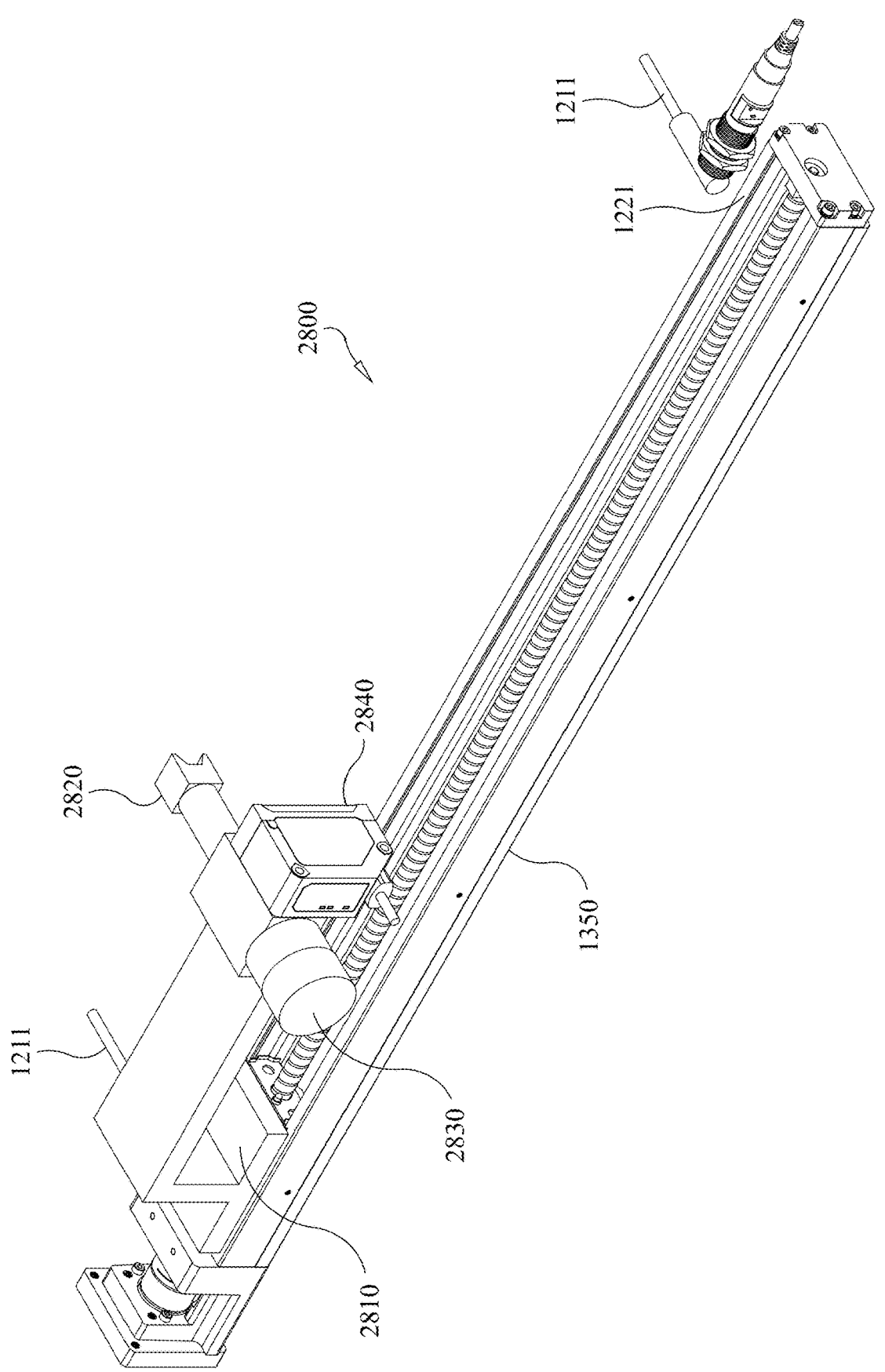
Figure 134:
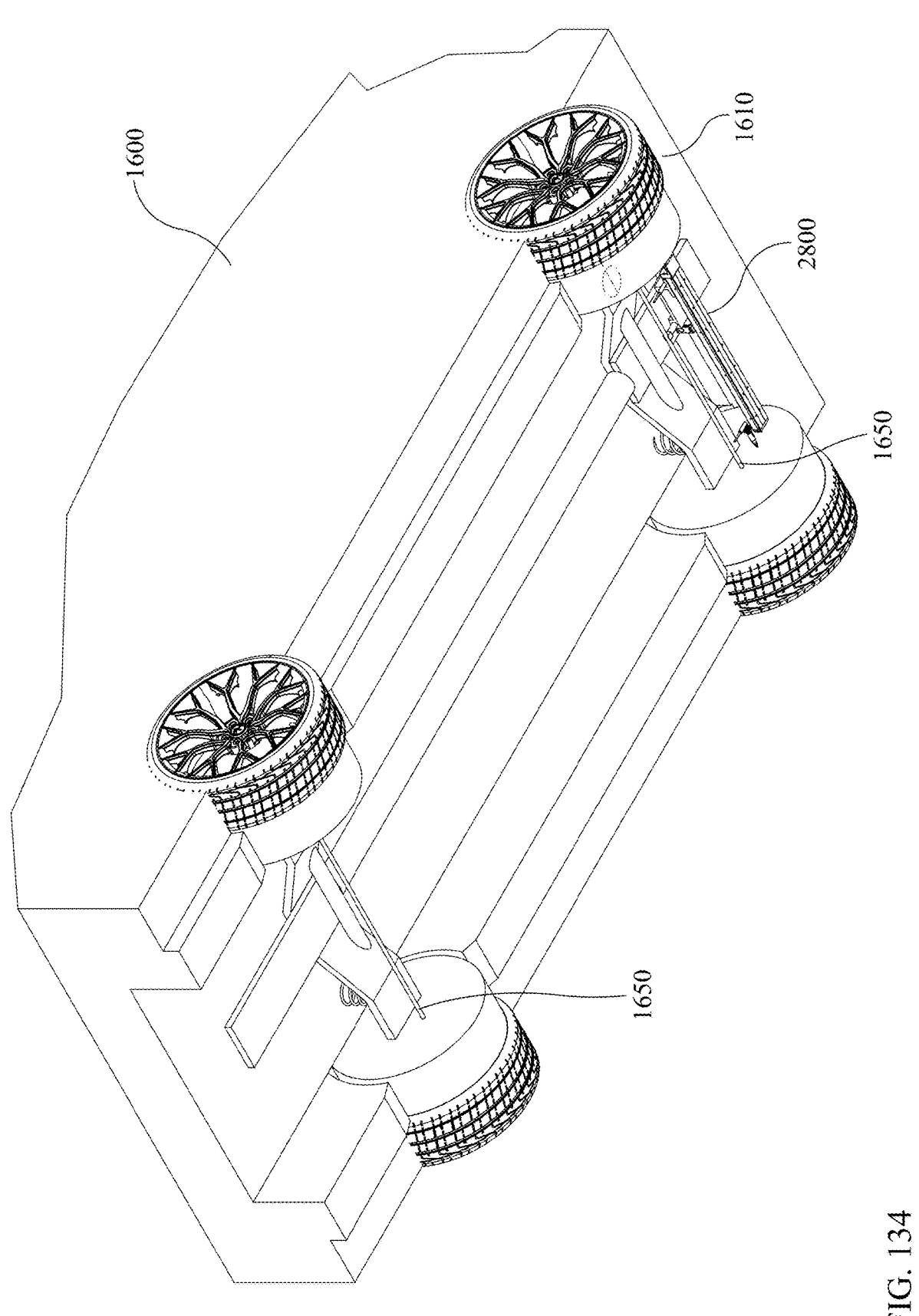
Figure 135:
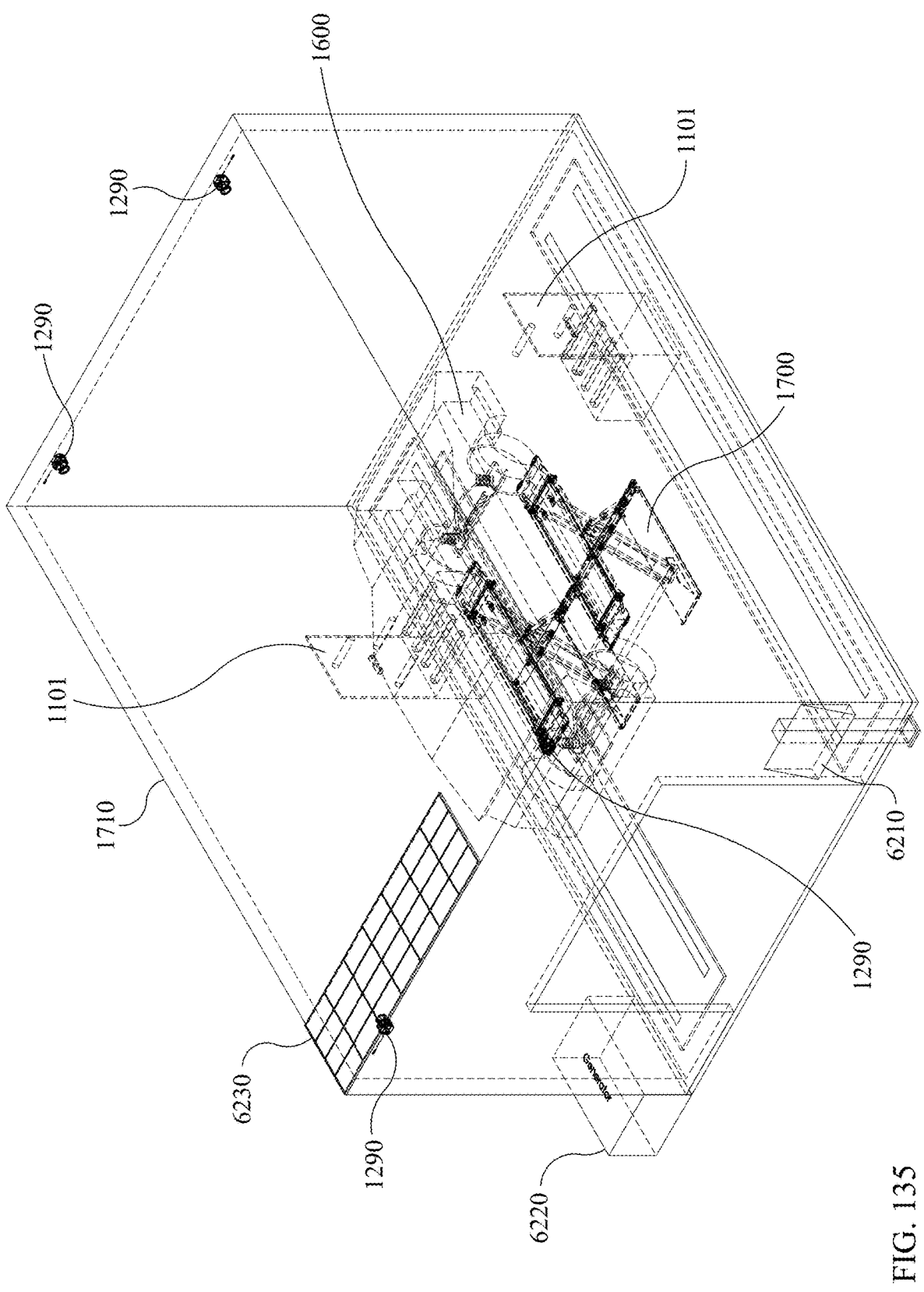
Figure 137:
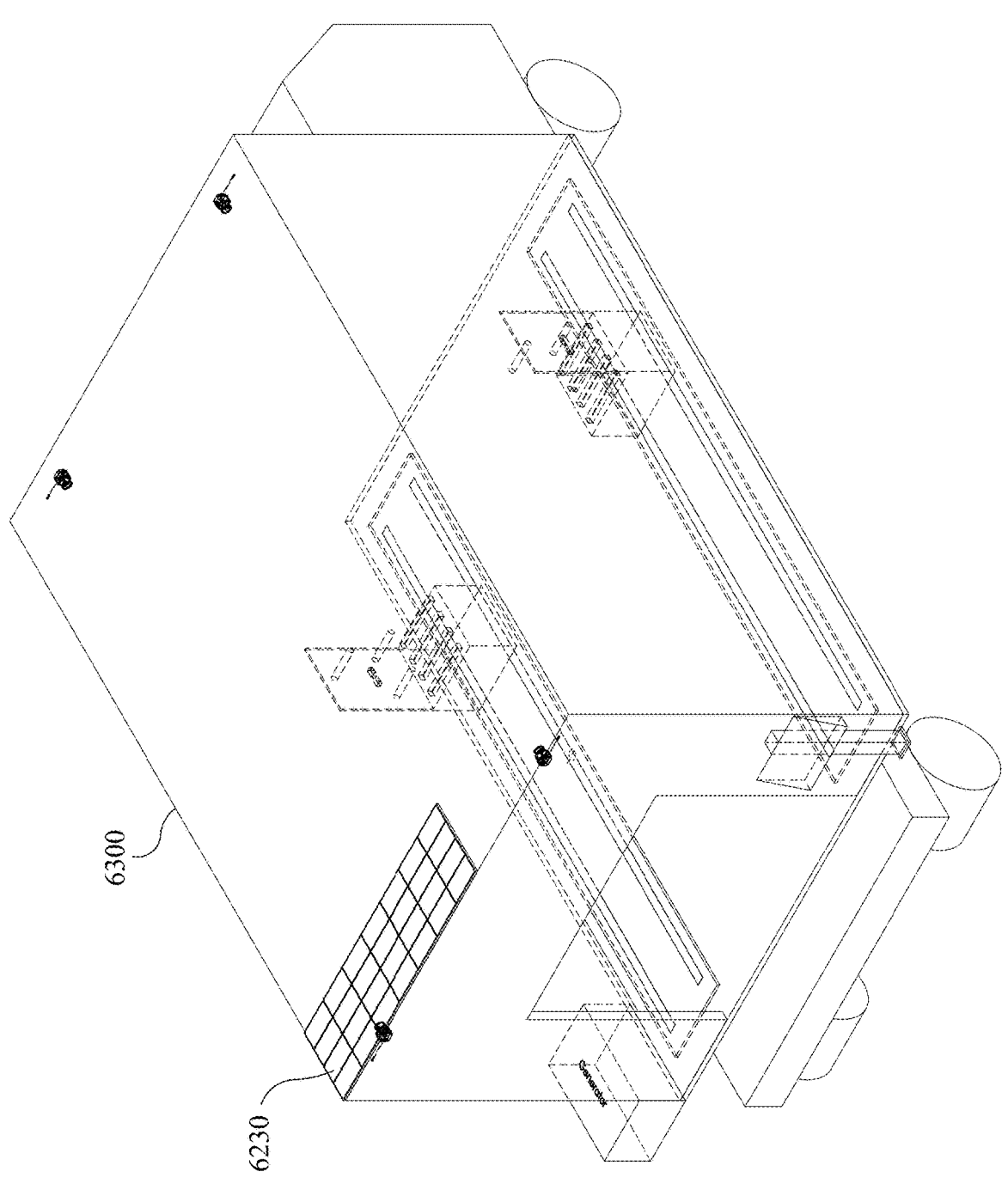
Figure 138:
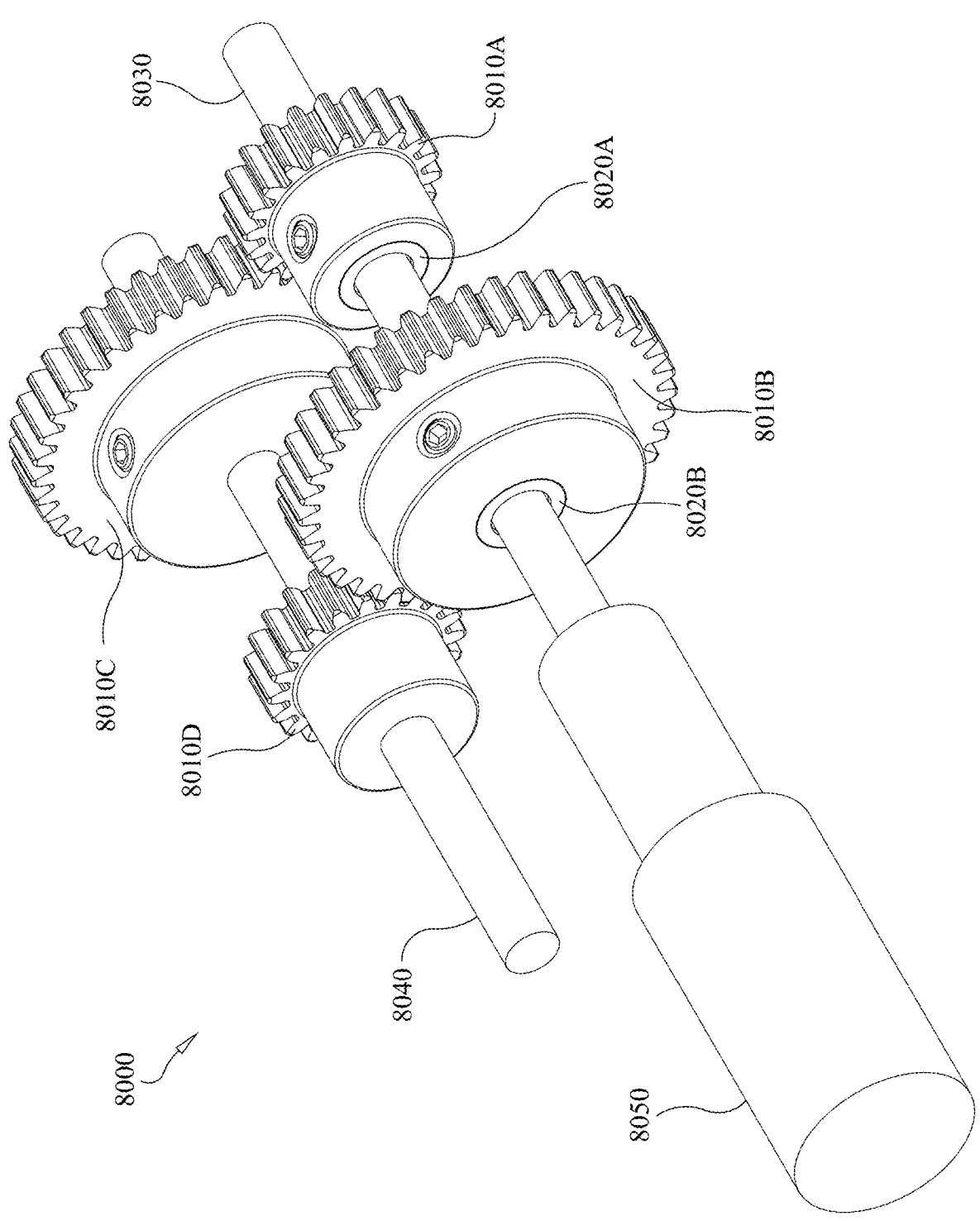
Figure 139:
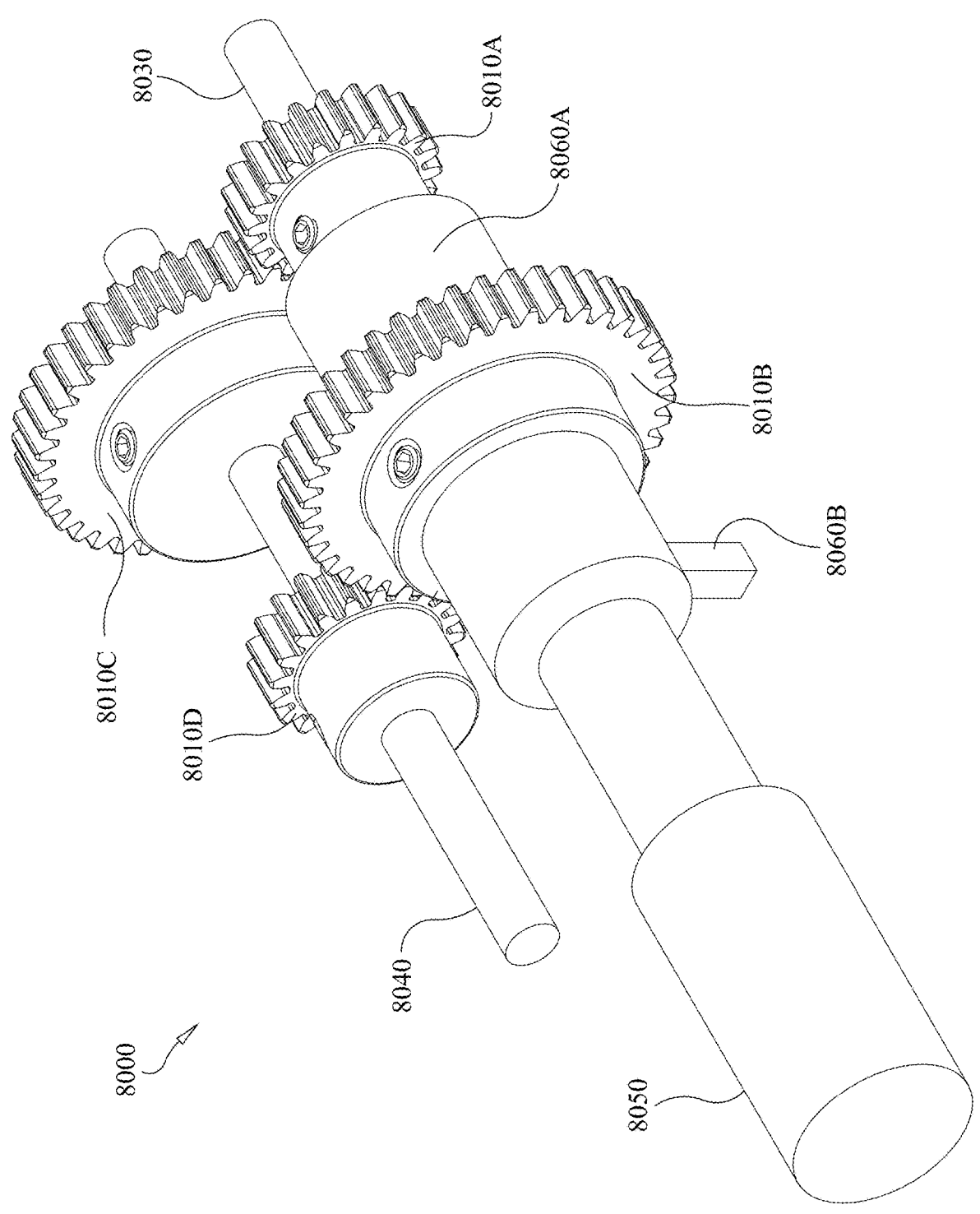
Figure 140:
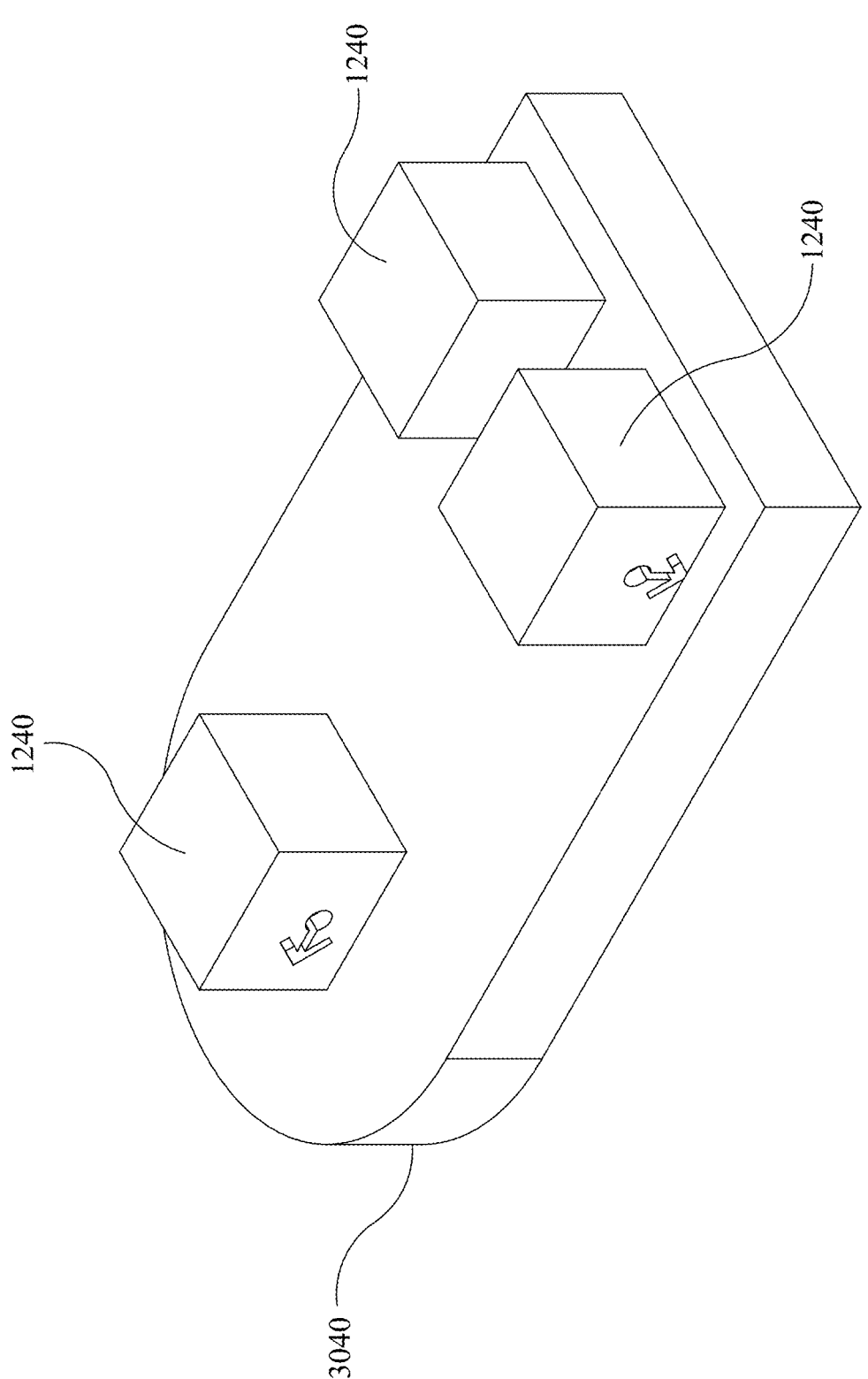
Figure 141:
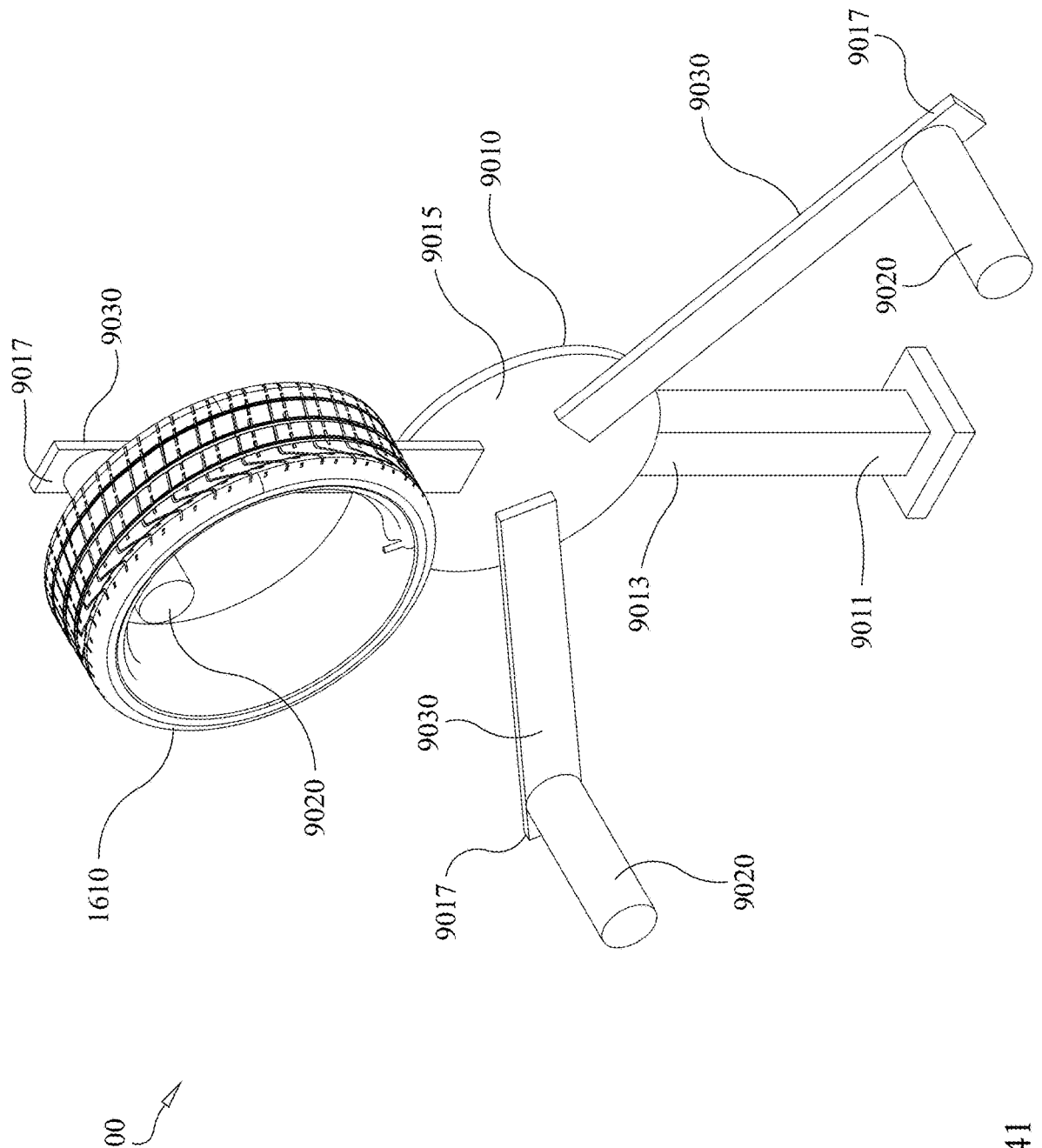
Figure 142:
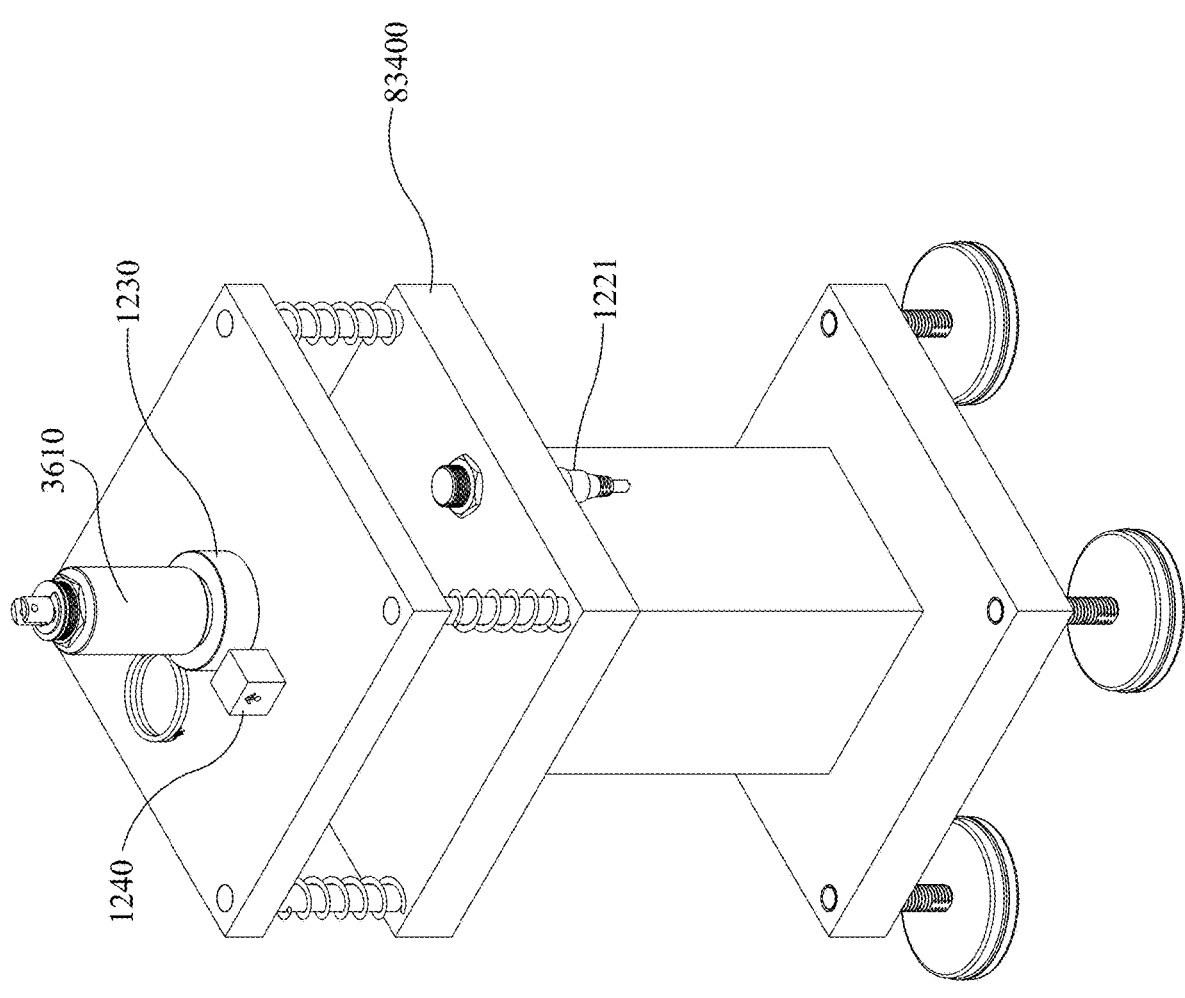
Figure 143:
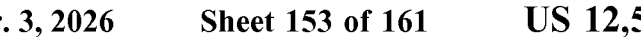
Figure 144:
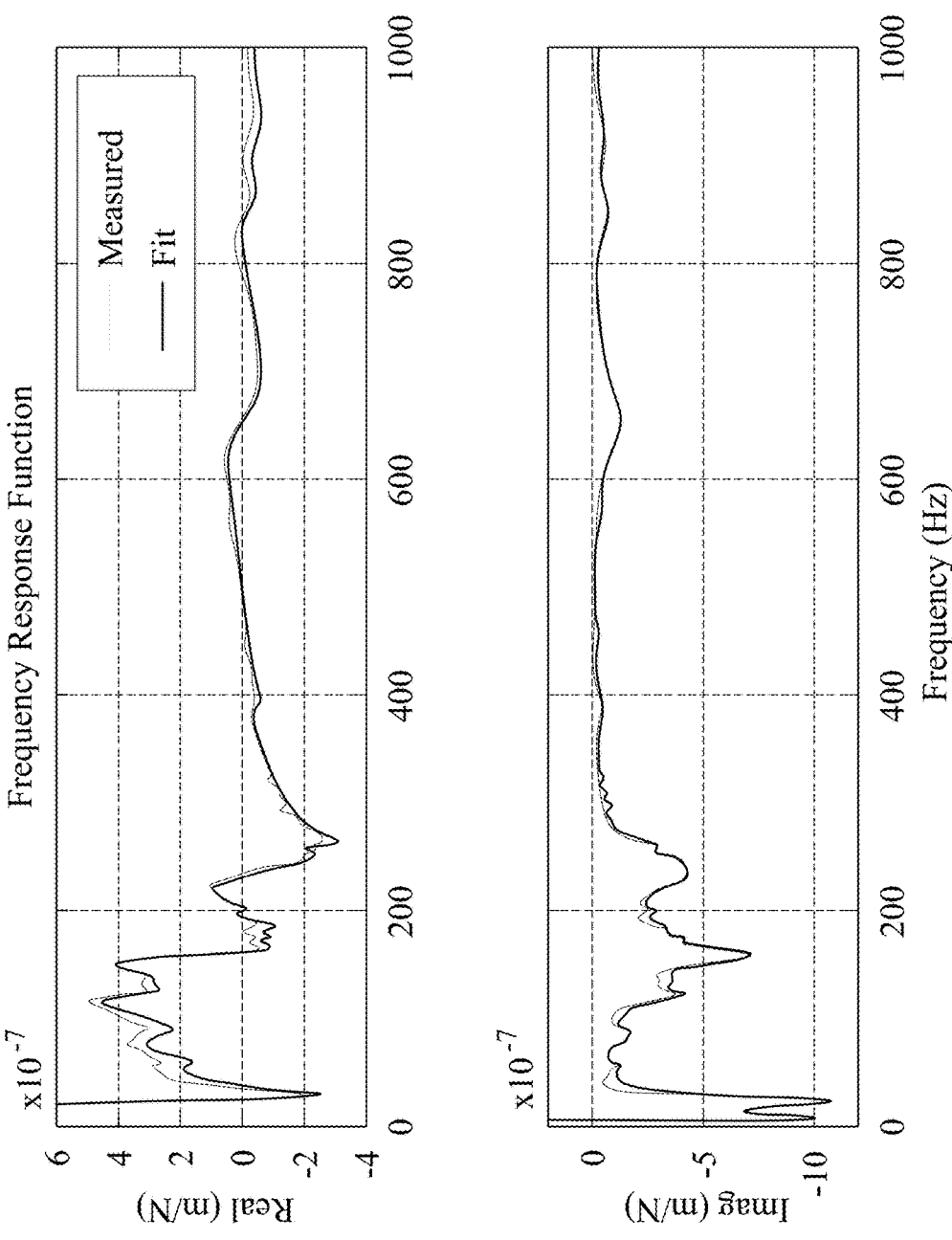
Figure 145:
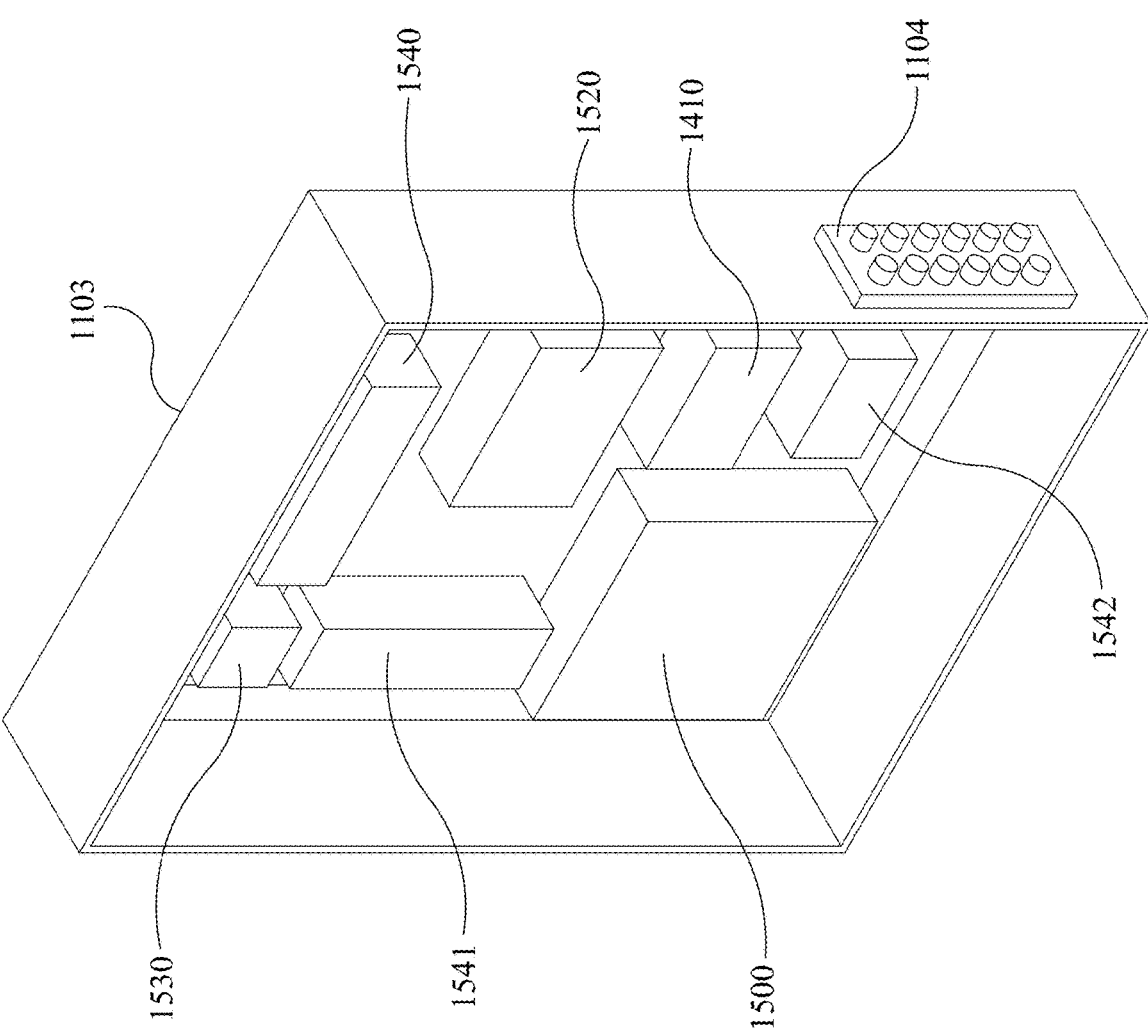
Figure 146:
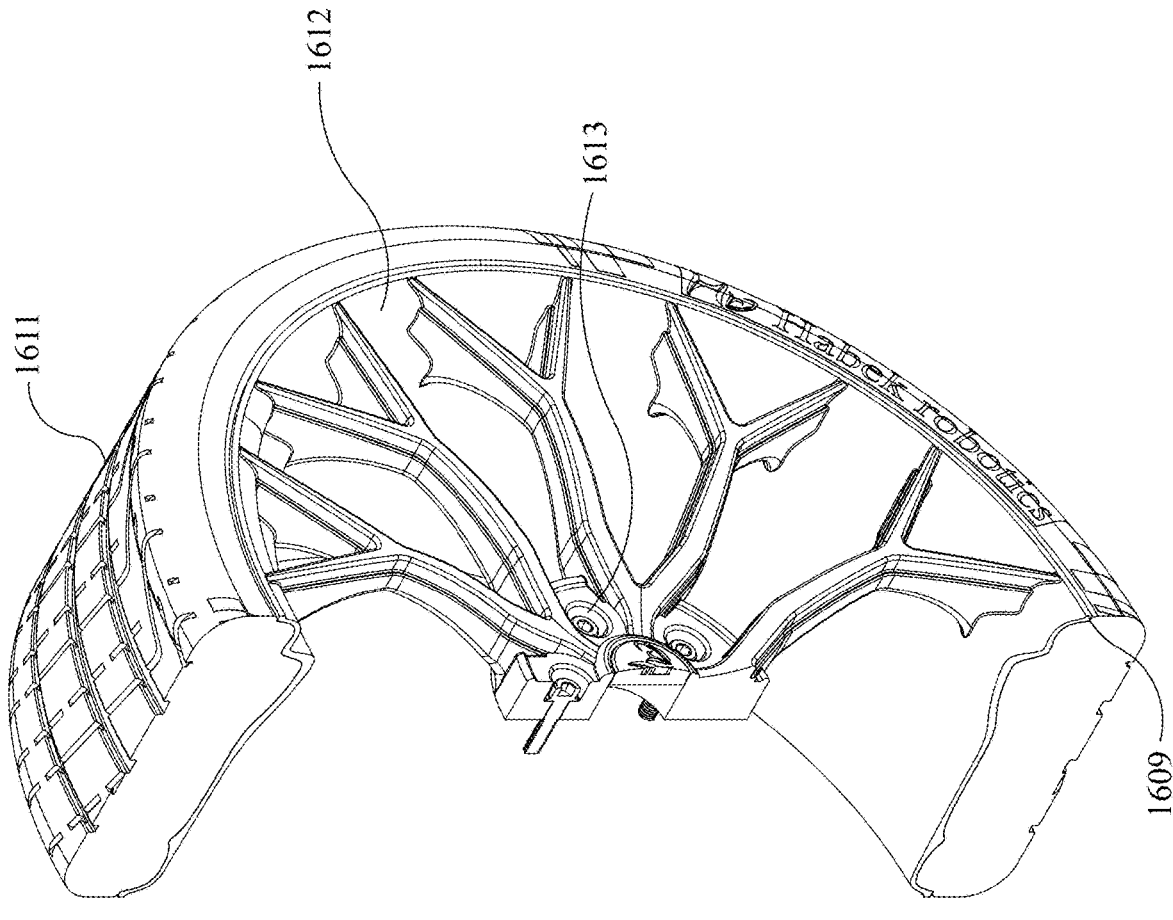
Figure 147:
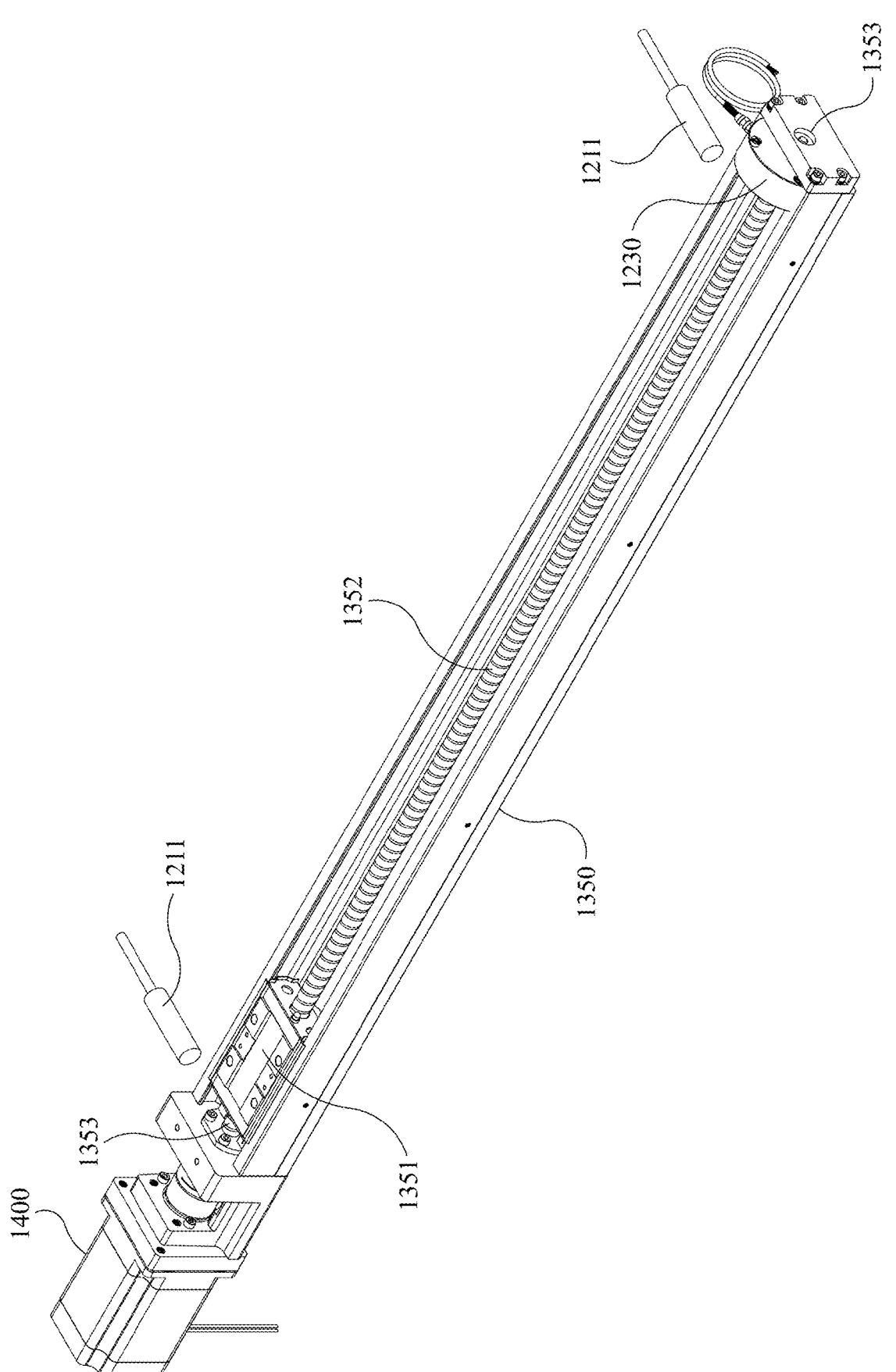
Figure 148:
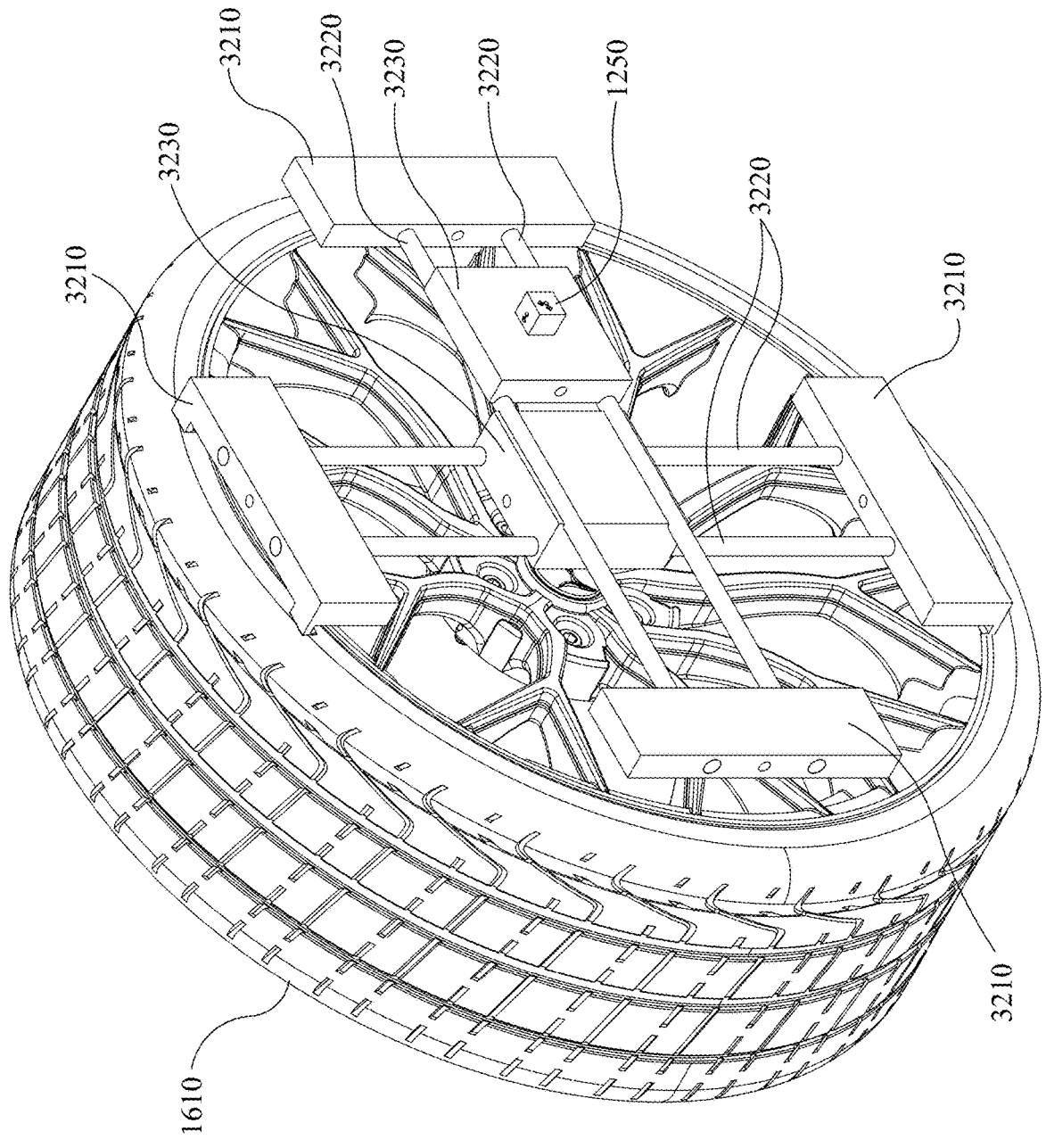
Figure 149:
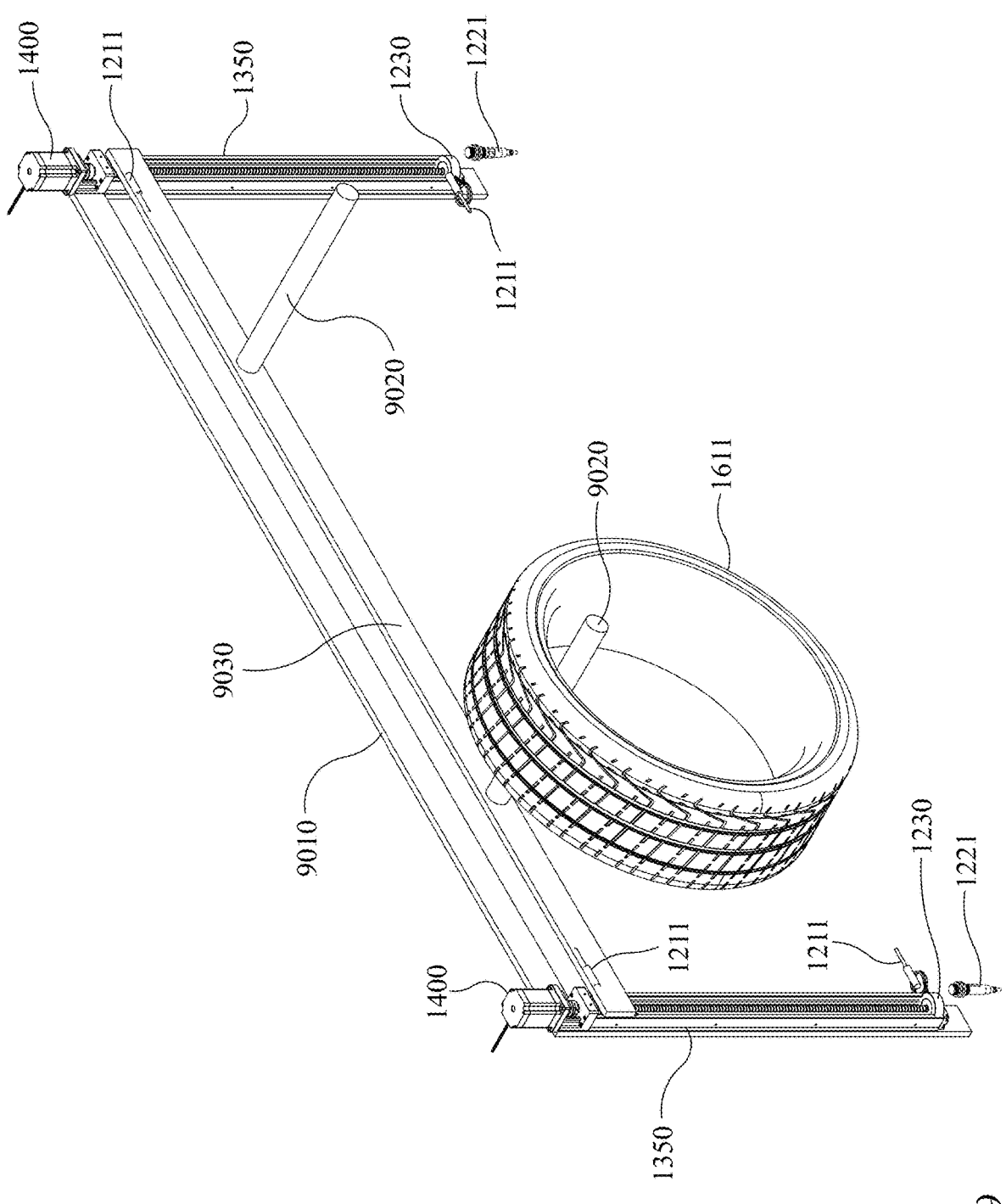
Figure 150:
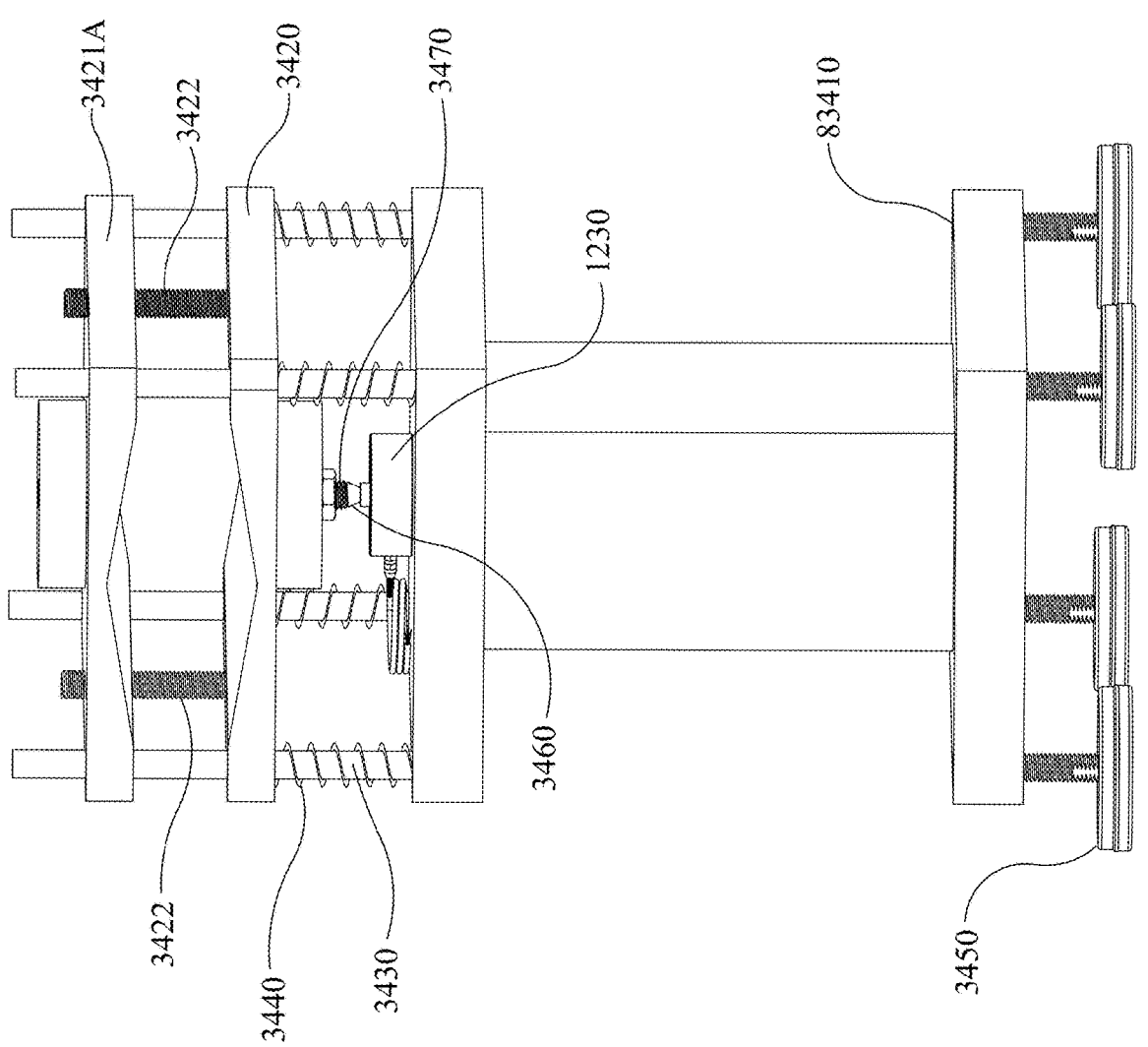
Figure 151:
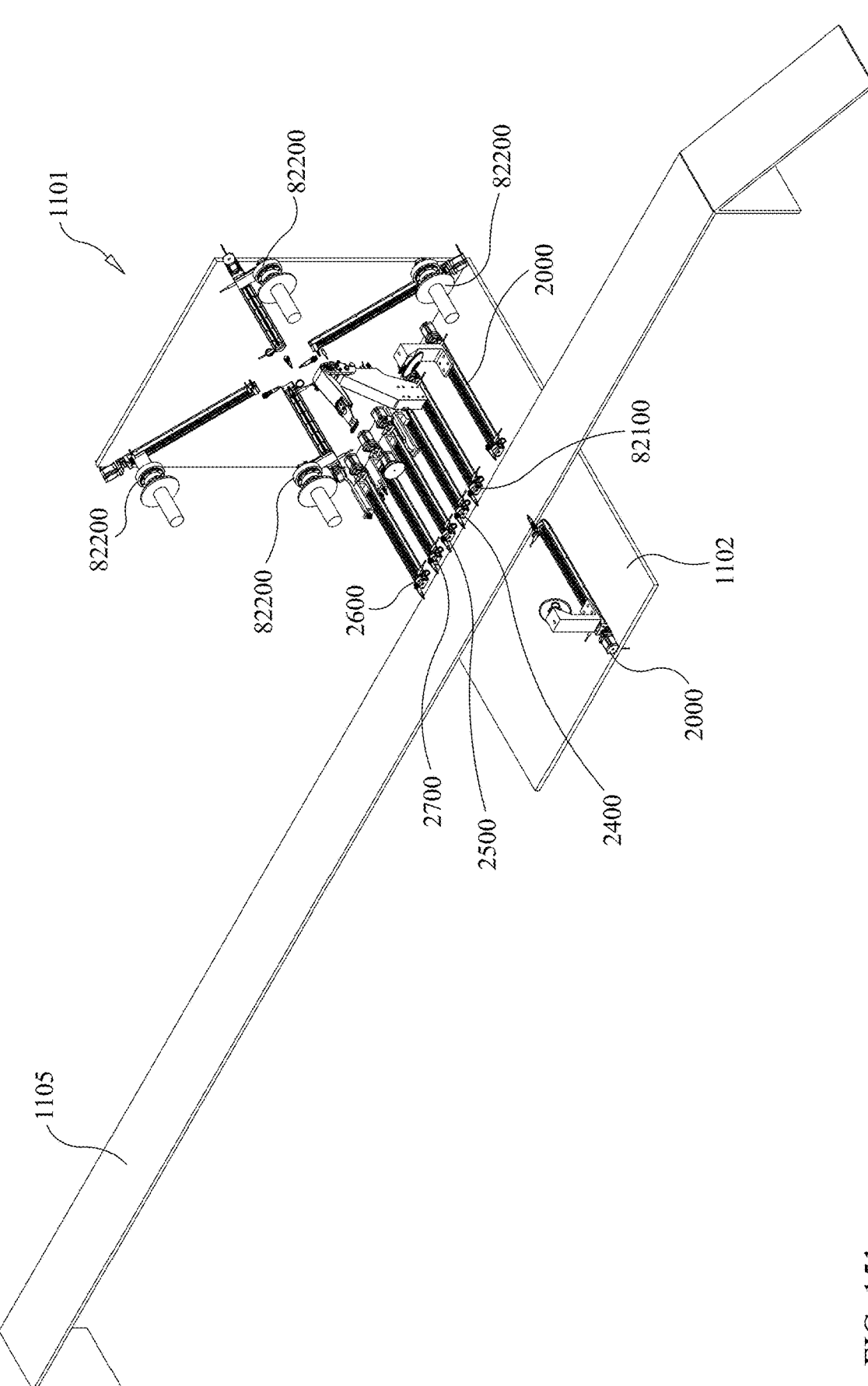

FIG. 133 is top perspective view of an alignment tool formed in accordance with the present disclosure;

FIG. 134 is a bottom perspective view of a vehicle, showing the alignment tool formed in accordance with the present disclosure thereon;

FIG. 135 is a top perspective view of a self-service station formed in accordance with the present disclosure;

FIG. 136 is a graphical illustration of an exemplary system interface formed in accordance with the present disclosure;

FIG. 137 is a top perspective view of a mobile service station formed in accordance with the present disclosure;

FIG. 138 is a top perspective view of a transmission formed in accordance with the present disclosure;

FIG. 139 is a top perspective view of another form of a transmission formed in accordance with the present disclosure;

FIG. 140 is a top perspective view of a sensor mount formed in accordance with the present disclosure;

FIG. 141 is a top perspective view of a tire handling system formed in accordance with the present disclosure;

FIG. 142 is a top perspective view of a system dynamics modeling system formed in accordance with the present disclosure;

FIG. 143 is a top perspective view of a robotic apparatus formed in accordance with the present disclosure;

FIG. 144 is graphical illustration of an exemplary frequency response curve generated by the system dynamics modeling system formed in accordance with the present disclosure;

FIG. 145 is a top perspective view of an electrical panel formed in accordance with the present disclosure;

FIG. 146 is a partial cutaway, top perspective view of a tire rim and the tire bead;

FIG. 147 is a top perspective view of a linear actuator formed in accordance with the present disclosure;

FIG. 148 is a top perspective view of another form of a gantry system formed in accordance with the present disclosure;

FIG. 149 is a top perspective view of another form of a tire handling system formed in accordance with the present disclosure;

FIG. 150 is a front perspective view of another form of a suspension support structure system formed in accordance with the present disclosure; and FIG. 151 is a top perspective view of another form of a robotic apparatus formed in accordance with the present disclosure.

DETAILED DESCRIPTION OF THE PREFERRED EMBODIMENT

Figures 1, 1A, 1B:
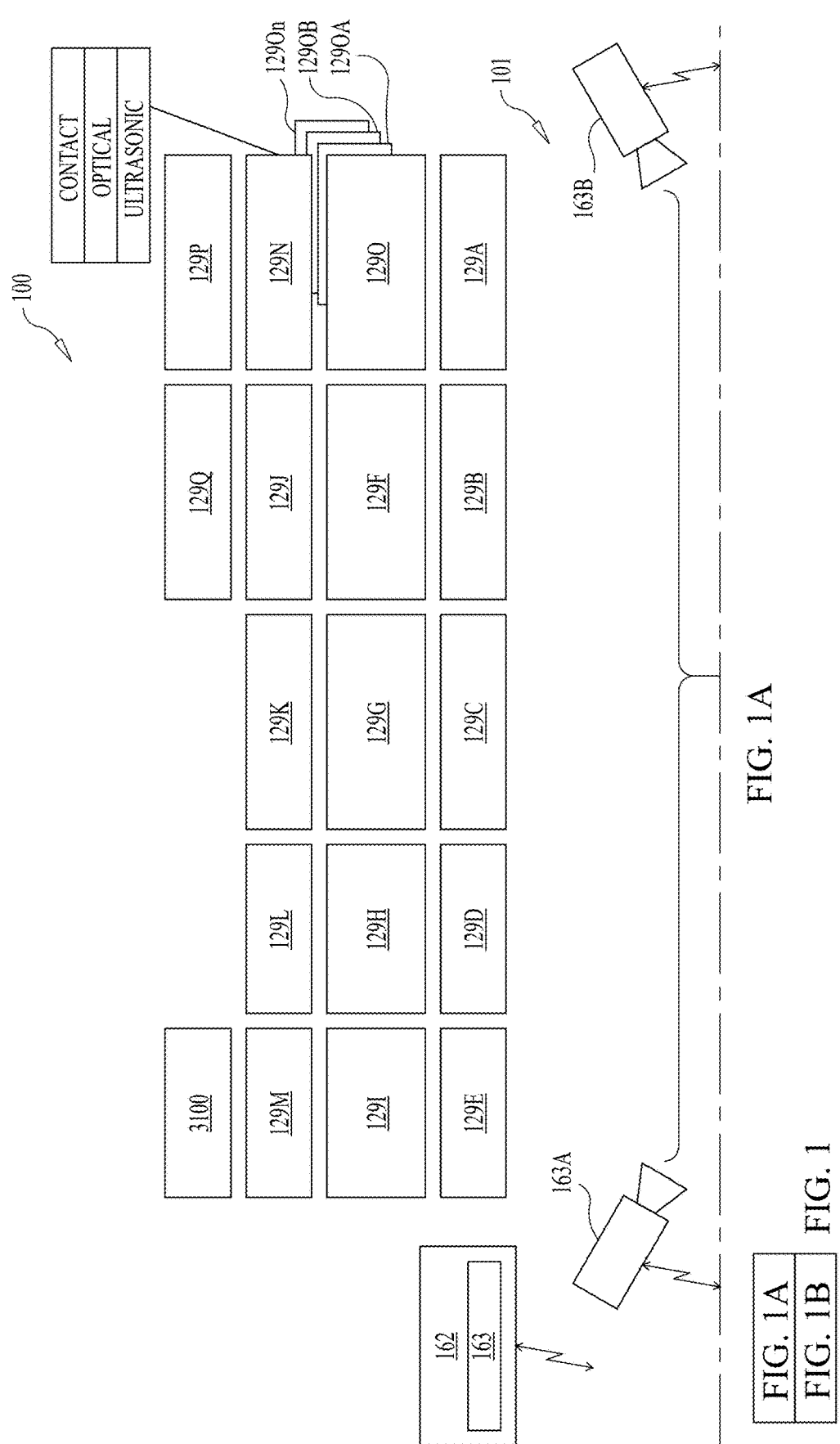
FIGS. 1A-1B are schematic illustrations of an automated tire changing system incorporating aspects of the present disclosure.
Figure 1B:
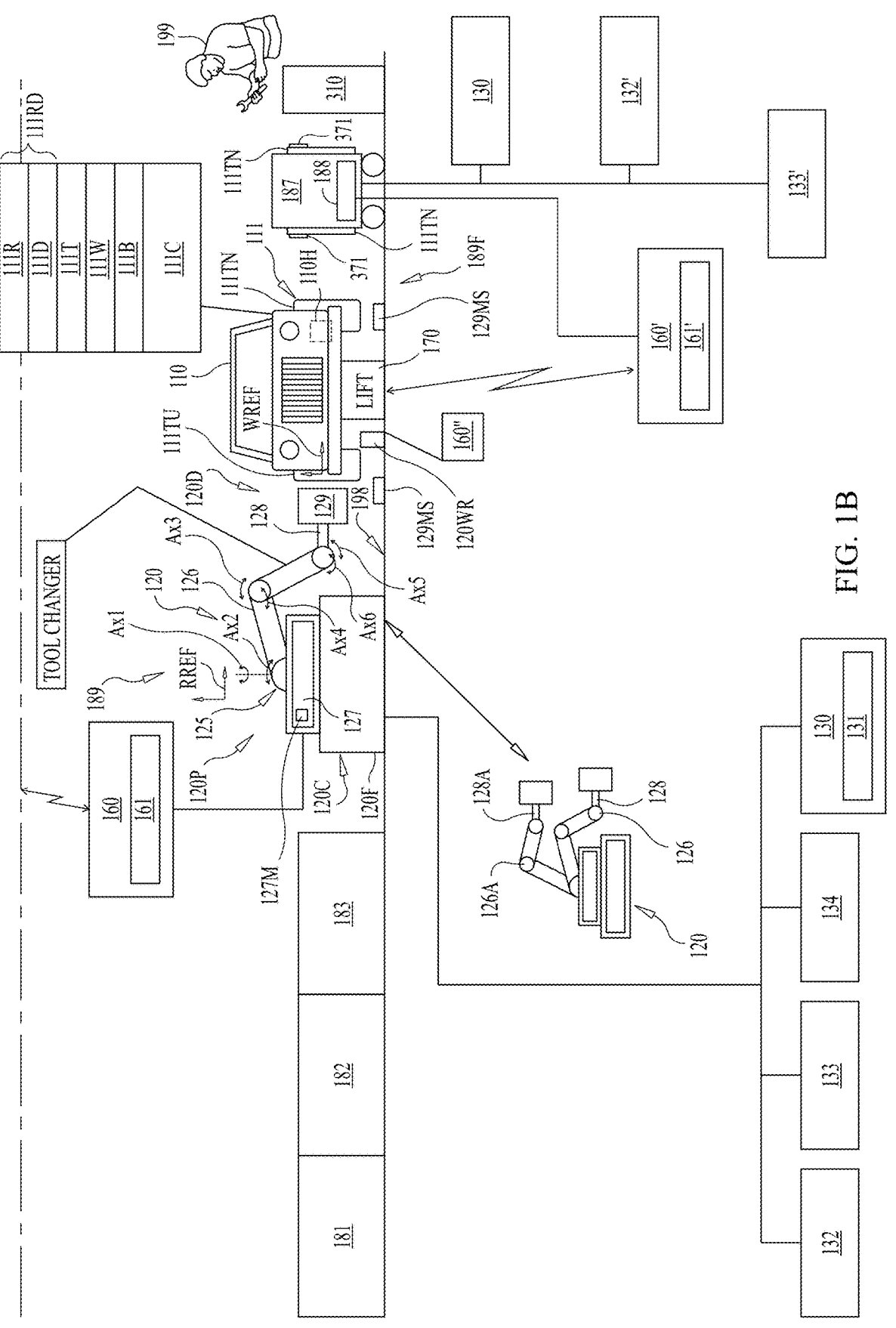

FIGS. 1A-1B illustrates an exemplary automated tire changing system 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

Referring to FIGS. 1A-1B, the aspects of the tire changing system 100 described herein automate the process of changing tires 111T on a vehicle 110 (also referred to herein as a road vehicle). As will be described herein the tire changing system 100 provides for changing tires 111T with the wheel 111W (also referred to herein as a rim or wheel rim) on (i.e., in situ) the vehicle 110 or by removing the wheel 111W from the vehicle 110. In one or more aspects, the tire changing system 100 provides for an operator of the tire changing system 100, such as a vehicle service technician 199, to select an in-situ tire change or a tire change by removing the wheel 111W from the vehicle 110. The vehicle 110 is any suitable vehicle having a wheel assembly 111 (including a tire 111T mounted on a wheel 111W, also referred to herein as a tire-wheel assembly) coupled to and removable from a wheel hub. Suitable examples of a vehicle 110 include, but are not limited to, passenger vehicles, commercial vehicles, and recreational vehicles.

The aspects of the tire changing system 100 described herein automate tasks associated with changing tires 111T on the vehicle 110. A tire change, as described herein, includes at a minimum, removal of an old or used tire 111TU from the wheel 111W and replacement of the used tire 111TU with what may be referred to as a replacement or other (new) tire 111TN that is installed on the wheel 111W in place of the removed used tire 111N. The aspects of the tire changing system 100 provides for a single vehicle service technician 199 to simultaneously monitor the changing of more than one tire on the same or different vehicles addressing the problems noted above. The aspects of the tire changing system 100 described herein generally limit vehicle service technician 199 interaction with the vehicle(s) 110 and/or tire changing apparatus (e.g., tire changing machines, tire balancers, etc.) and substantially eliminates lifting of wheel assemblies 111 by the vehicle service technician 199. This allows the vehicle service technician 199 to work in a less labor intensive environment and interact with the tire changing system 100 when necessary (e.g., such as to deliver vehicles 110 to/from the tire changing system 100, provide replacement tires 110TN or other supplies (valve stems, valve caps, lubricants, cleaning solutions, etc.) to the tire changing system 100, perform maintenance on components of the tire changing system, etc.). The aspects of the tire changing system 100 also eliminate the need to lift the vehicle 110 to heights that would be ergonomic for the vehicle service technician 199 to remove and install the wheel assembly 111 from and to the vehicle 110. Here the vehicle 110 only need be lifted (or a normal force be removed from the wheel assembly 111) to a height that the tire 111T no longer contacts a traverse surface on which the vehicle 110 was moving so that suitable clearance is provided around the tire 111T to facilitate removal of the wheel assembly 111 from the vehicle or removal of the tire 111T from the wheel 111W.

Still referring to FIGS. 1A-1B, the tire changing system 100 is configured to change one or more tires with the wheel 111W remaining on (i.e., in-situ) the vehicle 110 and/or with the wheel 111W removed from the vehicle 110. The tire changing system 100 includes at least one tire changing station 101, noting that multiple tire changing stations may be provided so that multiple vehicles 110 can be processed simultaneously by a single vehicle service technician 199. The autonomous configuration of the tire changing system 100 provides for the processing of multiple vehicles 110 by a single vehicle service technician 199 and with minimal intervention by the vehicle service technician 199 in the tire changing process. Generally, the tire changing station 101 includes a vehicle component balancing robot apparatus 189 for on vehicle balancing of one or more of a tire 111T, a wheel 111W, bearings 111B (e.g., wheel bearings), brake components 111RD (e.g., including but not limited to brake drums 111D and brake rotors 111R), and vehicle components 111C that impart, e.g., with the vehicle 110 in motion, vibrations to the vehicle 110 (e.g., such as by, but not limited to, imparting eccentric forces to a wheel hub 110H (see FIG. 1B) of the vehicle 110). The vehicle component balancing robot apparatus 189 includes a frame 189F arranged so as to connect with the vehicle 110. At least one autonomous traverse tire changing bot 120 (referred to herein for convenience as "bot 120", also referred to herein as a robot) is connected to the frame 189F. The frame 189F may be any suitable frame (e.g., a platform, surface, or otherwise) that directly or indirectly connects the bot 120 and vehicle 110 for tire changing operations. It should be understood that reference to an autonomous traverse tire changing bot 120 does not preclude inclusion of more than one autonomous traverse tire changing bot as will be described in greater detail herein. For example, some aspects of the present disclosure (see FIGS. 2A, 2B, and 2D) include more than one separate and/or independent and cooperative bots 120, cooperating to effect a tire change (though in some aspects a single robot directly effects the tire change). In some aspects, there are multiple bots 120 configured for respective tasks. For example, one bot 120 is configured for wheel assembly 111 or tire 111T removal, another bot 120 is configured for lug nut/bolt removal, or any other process of the tire change as indicated by, for example, the tools 129A-129Q described herein and described in U.S. Pat. No. 11,446,826 issued on Sep. 20, 2022 and titled "Autonomous Traverse Tire Changing Bot, Autonomous Tire Changing System, and Method Therefor," and U.S. provisional patent application No. 63/354,591 titled "Autonomous Tire and Wheel Balancer and Method Therefor" and filed on Jun. 22, 2022, the disclosures of which are incorporated herein by reference in their entireties.

As will be described herein, the bot 120 has at least one degree of freedom (such as along traverse path 299 and/or along any one or more axes of motion of the bot 120) so as to move, in the at least one degree of freedom, relative to the frame 189F. The bot 120 is configured so that the move, relative to the frame 189F in the at least one degree of freedom, resolves a predetermined location of the wheel assembly 111 relative to a reference frame RREF of the bot 120. For example, the bot 120 may be configured to employ one or more of a vision sensor, an ultrasonic sensor, and a proximity sensor (generally referred to herein as proximity sensor 129N) as described herein for resolving the predetermined location (see FIGS. 1B and 2A-2D) of the wheel assembly 111 relative to the reference frame RREF of the bot 120. The predetermined location of the wheel assembly 111 determines a frame of reference of the wheel assembly WREF relative to the reference frame RREF of the bot 120.

Figure 2A:
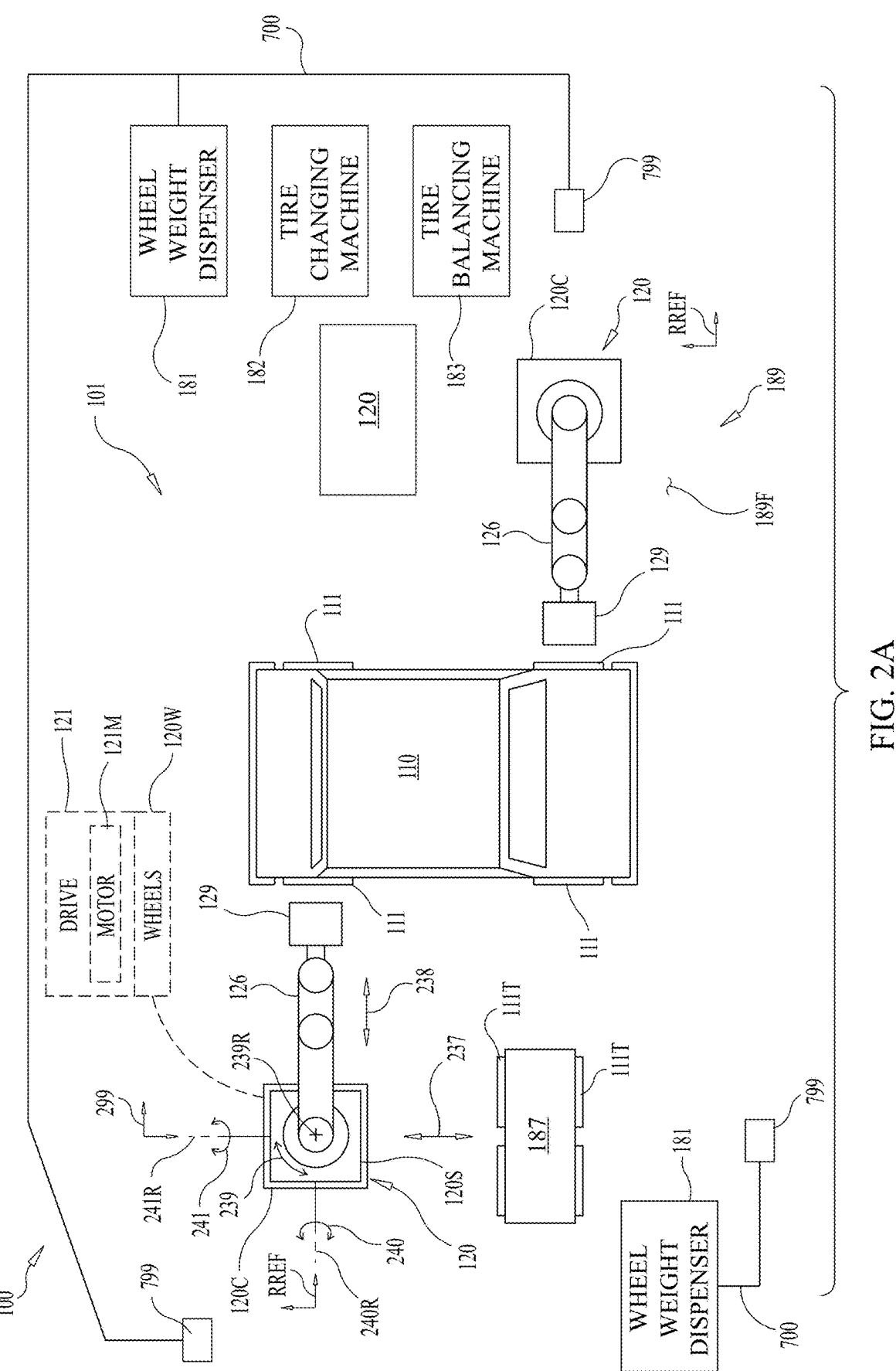
FIG. 2A is another schematic illustration of the automated tire changing system of FIGS. 1A and 1B in accordance with the present disclosure.
Figure 2B:
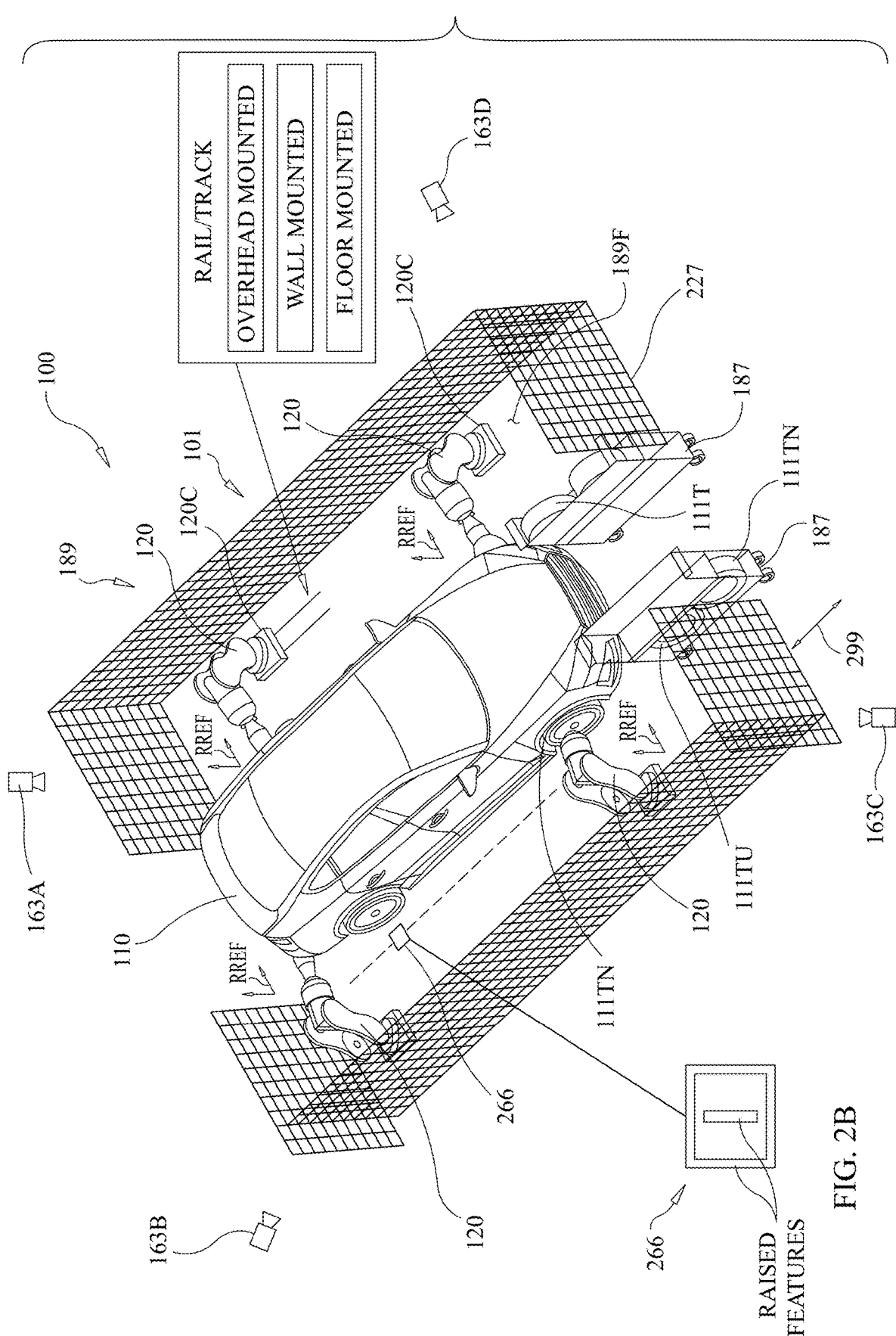
FIG. 2B is still another schematic illustration of the automated tire changing system of FIGS. 1A and 1B in accordance with the present disclosure.

Referring still to FIGS. 1A-1B, the bot 120 includes a bot frame 125 that includes or is coupled/mounted to a base or carriage 120C. In one aspect, the carriage 120C is a stationary carriage having a frame 120F that facilitates fixing the bot 120 in a stationary location at a tire changing station 101 (such as adjacent a wheel assembly 111 mounted on the vehicle 110—see FIGS. 2A-2D). In other aspects, the carriage 120C is any suitable carriage that facilitates traverse of the bot 120 as described herein. For example, as illustrated in FIG. 2A, the carriage 120C may be a wheeled carriage that includes a carriage frame 120F, wheels 120W (shown in dashed lines) supporting the carriage frame 120F, and a carriage drive section 121 (shown in dashed lines).

For exemplary purposes only, the carriage drive section 121 (whether wheeled or otherwise) includes at least one motor 121M that defines at least one degree of freedom powering at least one of the wheels 120W (or rotating a ball-screw, etc.) effecting autonomous traverse of the carriage 120C, along a traverse path 299 (see, e.g., FIGS. 2A-2D), relative to a traverse surface or a floor 198 on which the bot 120 rests in a manner similar to that described in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety. As will be described herein, the traverse path 299 along which the bot travels is in one or more aspects, a path around the entire vehicle 110 or a path around a portion of the vehicle 110, where the traverse path may depend on a number of bots 120 included in the tire changing system 100. For example, where there are two bots 120 each bot traverses along a respective side (e.g., driver or passenger side) of the vehicle 110. As another example, where there are two bots 120 on a common side of the vehicle 110 (e.g., either the driver or passenger side) each bot 120 traverses along a respective portion of the common side of the vehicle 110.

The traverse path (such as traverse path 299 in FIG. 2A) may be defined in any suitable manner, such as through non-contact bot guidance on an undeterministic travel surface (i.e., without physical constraints guiding movement of the bot 120). Where the bot 120 travels on an undeterministic travel surface the wheels 120W are configured in any suitable manner so as to provide the carriage 120C with both linear traverse and rotational movement. For example, one or more of the wheels 120W may be steerable or the wheels may be holonomic wheels (such as Mecanum wheels, Omni wheels, or poly wheels). In other aspects, traverse of the carriage 120C may be effected on (where the wheels are replaced or supplemented by) sliding elements such as rails and/or tracks, that include, but are not limited to, guide rod and sleeve bearings, or any other guide system for effecting linear traverse and/or rotational motion of the carriage 120C. The rails and/or tracks may provide for, including but not limited to, the carriage 120C being suspended or dependent from an overhead gantry or wall, with traverse of the carriage 120C in both vertical and horizontal directions (see FIG. 2B). In other aspects, the carriage 120C may be mounted on the may be mounted to the floor, mounted to any suitable traverse carriage, or may be mounted on a turret carriage configured to traverse with at least one degree of freedom.

In one or more aspects, the entire bot 120 may align itself in one or more degrees of freedom with respect to the vehicle 110, the wheel assembly 111, the wheel 111W, the tire 111T or any other component of the tire changing system 100 to perform a tire changing operation. For exemplary purposes only, a center of rotation of the tire bead breaker tool 129H (described herein) is substantially aligned with a center of rotation of the wheel assembly 111 and the plane in which the tire bead breaker tool 129H acts is set so as to be substantially parallel to the rotational axis of the wheel assembly 111. Where the carriage 120C includes steerable or holonomic wheels, this positional adjustment of the tire bead breaker tool 129H is accomplished, at least in part, by controlling the wheels for positioning the bot 120 along one or more of the following directions:

linear direction 237 extending substantially parallel to both the floor 198 and the vehicle 110 and extending lengthwise (from front to back) relative to the vehicle 110; and linear direction 238 extending substantially perpendicular to the vehicle 110 and substantially parallel to the floor 198.

The carriage 120C, whether fixed or wheeled, may also include a movement stage 120S that coupled to the frame 120F so as to move in at least direction 238 relative to the frame 120F. For example, the movement stage 120S is coupled to the frame 120F by stage guide rails having any suitable drive that provides the movement stage 120S with linear movement in direction 238. The carriage 120C may include one or more rotational couplings that couple a movement stage 120S to the frame 120F. These one or more rotational couplings include any suitable drives for moving the movement stage 120S in one or more of the following directions:

rotational direction 239 having an axis of rotation 239R extending substantially perpendicular to the floor;

rotational direction 240 having an axis of rotation 240R extending substantially parallel with the floor 198; and rotational direction 241 having an axis of rotation 241R extending substantially parallel with the floor 198.

In some aspects, a vertical drive may be provided to move the movement stage 120S (and/or the frame 120F) vertically to raise or lower the movement stage 120S (and/or the frame 120F). As such, the movement stage 120S may be provided with five or six degrees of freedom (in other aspects there may be more than six or less than five degrees of freedom) for aligning the bot 120 with respect to the vehicle 110, the wheel assembly 111, the wheel 111W, the tire 111T or any other component of the tire changing system 100 to perform a tire changing operation.

The bot frame 125 includes at least one actuator 126 (or arm which may be configured as linear extension/retraction slide, an elongated member, a rod, a linear actuator, a rotary actuator, an articulated actuator, a telescopic actuator or any suitable combination thereof) and a bot drive section 127. The at least one actuator 126 is a driven actuator that is driven so as to extend along or in the at least one degree of freedom of the bot 120 between a retracted position and an extended position, the extended position locating an (i.e., at least one) end effector 128 (and a distal end 120D at which the end effector 128 is located) of the actuator 126 proximate a wheel assembly 111. In one or more aspects, the at least one actuator 126 may be any suitable multi-axis actuator available from such manufacturers as Fanuc Robotics Company, Kuka Automation Company, and Yaskawa Electric Corporation. In one or more aspects the at least one actuator 126 has a bespoke actuator configuration with any suitable number of axes or degrees of freedom. The at least one actuator 126 (whether commercially available or bespoke) has any suitable number of degrees of freedom for effecting a tire change as described herein. For example, the at least one actuator 126 is a one axis actuator, a two axis actuator, a three axis actuator, a five axis actuator, a six axis actuator, a seven axis actuator, nine axis actuator, or an actuator with any other suitable number of axes or degrees of freedom. In one or more aspects, as described herein, the bot 120 has more than one actuator 126, 126A where, in one or more aspects, the different actuators have different numbers of axes and/or different tire changing capabilities. The actuator 126 is driven by the bot drive section 127, where the bot drive section 127 includes at least one motor 127M that defines a bot actuator degree of freedom, separate and distinct from the at least one degree of freedom powering the traverse path 299 axis of the bot 120 (e.g., the degree of freedom powering the at least one of the wheels 120W, ball screw rotation, etc.).

The actuator 126 has an end effector 128 arranged to interface the wheel assembly 111 and the bot 120 moves the end effector 128 to other predetermined locations on the wheel 111W of the wheel assembly 111, determined based on resolution of the predetermined location of the wheel assembly 111 relative to the reference frame RREF of the bot 120. The other predetermined locations on the wheel 111W are wheel balancing weight locations (see FIGS. 5A-5C) resolving imbalance of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)). As described herein, the end effector 128 interfaces the wheel assembly 111 at the other predetermined locations so as to effect a balancing solution of the one or more of the tire 111T, the wheel 111W, the bearings 111B, the brake components 111RD, and the vehicle components 111C via robotic application of wheel balancing weights 400 with the end effector 128.

The end effector 128 includes a wheel or tire engagement tool 129 disposed so that articulation of the at least one actuator 126 with the bot actuator degree of freedom effects engagement contact of the wheel or tire engagement tool 129 and a wheel 111W or a tire 111T mounted on the vehicle 110. The actuator movement axis/axes AX1-AX6 defined by movement of the at least one actuator 126 with the bot actuator degree of freedom is separate and distinct from the traverse path 299 along which the carriage 120C (in wheeled form) traverses. As described herein, the aspects of the present disclosure provide for automated control of fully dynamic pose of the carriage 120C (at least along one drive axis) of the carriage 120C) so that movement of the at least one actuator 126 (along a different drive axis than the drive axis of the carriage 120C) engages any suitable tool (such as those described herein) coupled to the end effector 128 of the at least one actuator 126 to a variably positioned wheel 111W and/or tire 111T on the vehicle 110.

Referring to FIGS. 1A-1B, in accordance with one or more aspects of the present disclosure the wheel or tire engagement tool 129 includes one or more of a wheel assembly grip 129A, a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, and a tire balancer 129M, suitable examples of which are provided in U.S. Pat. No. 11,446,826 issued on Sep. 20, 2022 and titled "Autonomous Traverse Tire Changing Bot, Autonomous Tire Changing System, and Method Therefor," and U.S. provisional patent application No. 63/354,591 titled "Autonomous Tire and Wheel Balancer and Method Therefor" and filed on Jun. 22, 2022, the disclosures of which were previously incorporated herein by reference in their entireties. In accordance with one or more aspects of the present disclosure the wheel or tire engagement tool 129 also includes a proximity sensor 129N, a wheel weight installation tool 129O, a wheel weight gripper 129P (also referred to herein as a wheel balancing weight grip), a wheel weight dispenser 129Q, and/or any other suitable tool that effects changing a tire 111T. The wheel weight installation tool 129O and wheel weight gripper 129Q each form a compliant end effector that, as described herein, interfaces the wheel assembly 111 determining a wheel or rim location (e.g., relative to a reference frame RREF of the bot 120, 120WR) of the wheel 111W of the tire wheel assembly 111 and predetermined locations (such as wheel weight locations on the wheel 111W) so as to effect a balancing solution of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)) via robotic application of wheel balancing weights 400 with the compliant end effector. In one or more aspects, the above-noted tools are stored on any suitable tool holder 134 carried by the carriage 120C or located off-board the bot 120 at a location within the tire changing station 101 that is accessible by the at least one actuator 126.

In one or more aspects, the above-noted tools are interchangeable/swappable with each other so that the end effector 128 places one and picks up another different tool for performing tire changing tasks. For example, the bot 120 includes a controller 160 that is configured to command the at least one actuator 126, based on a task to be performed, to automatically exchange one tool for another, such as through articulation of the at least one actuator 126 the end effector 128 places a tool (e.g., such as the tire bead breaker tool 129H) at the tool holder 134 and then picks another different tool from the tool holder (e.g., such as tire inflation tool 129L) for performing a subsequent step in the tire change process.

In other aspects, the bot 120 includes more than one actuator 126, 126A (two actuators are shown in FIGS. 1A-1B for exemplary purposes, but in other aspects there may be more than two actuators). Each of the more than one actuator 126, 126A has a different respective actuator movement axis (noting each actuator 126, 126A includes respective axes AX1-AX6 of articulation for exemplary purposes only), and a different respective end effector 128, 128A disposed for working on the wheel 111W or tire 111T mounted on the vehicle 110 (or off the vehicle). Here, in one or more aspects, each actuator 126, 126A holds a different one of the tools noted above (e.g., there may an actuator 126 for each tool, noting that in some aspects, the tools are also exchangeable so that one actuator 126 is common to a number of tools that are selectably coupled (such as by employing a tool changer—see FIG. 1B) to the common actuator 126, as noted above). Further, the above-noted tools are combined, in some aspects, so that a single combination tool performs several tasks. For example, in one aspect, the wheel weight dispenser 129Q, the wheel weight gripper 129P, the wheel weight installation tool 129O, and/or the proximity sensor 129N may be combined, where when combined (in any suitable combination) the proximity sensor 129N provides for one or more of the wheel weight dispenser 129Q, the wheel weight gripper 129P and/or the wheel weight installation tool 129O determining a location of the wheel assembly 111 relative to the reference frame RREF of the robot 120, 120WR. In other aspects, one or more of the wheel weight dispenser 129Q, the wheel weight gripper 129P and/or the wheel weight installation tool 129O, and the proximity sensor 129N may be combined with one or more of the wheel assembly grip 129A, the a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, a tire balancer 129M, and/or any other suitable tool that effects changing a tire 111T (noting any other combinations of the various tools may be effected and are within the scope of the present disclosure).

Figure 3:
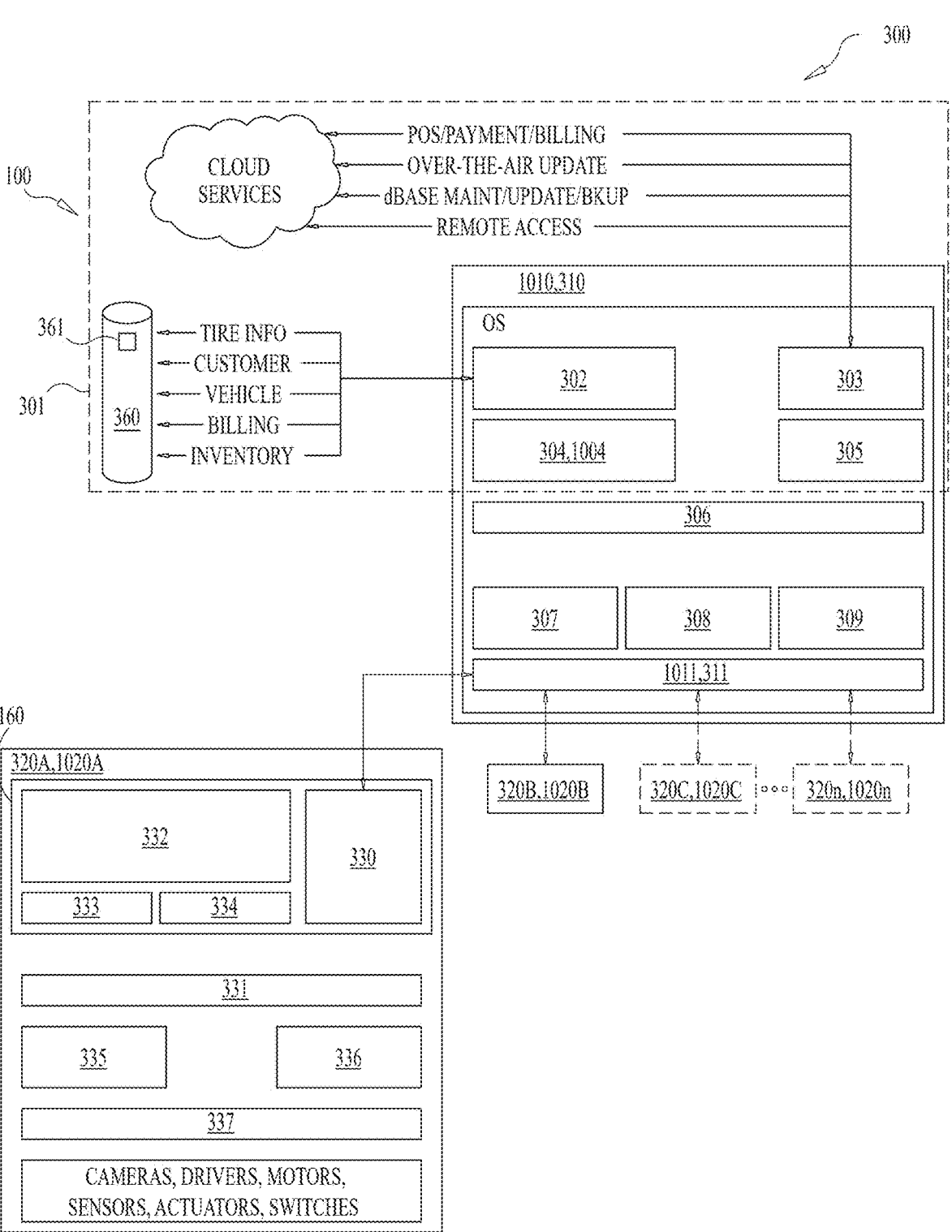
FIG. 3 is a schematic block diagram of the automated tire changing system of FIGS. 1A and 1B in accordance with the present disclosure.

The controller 160 is also configured to control the drives of the bot 120 (e.g., drives of the actuator 126 and carriage 120C that effect movement of the actuator 126 and carriage 120C as described herein) to position the carriage 120C relative to the vehicle 110, another bot 120 or other component (e.g., tire balancer, tire changing machine, cart, etc.) of the tire changing system 100. Referring also to FIG. 3, the controller 160 includes a network application interface 330 and a communication module 331 (configured as a hardware or software module) so that the bot 120 communicates with the control console 310 and/or cloud based services (e.g. such as for bot software updates). The controller 160 is programmed with process control algorithms and state machines 332 to effect the operation of the bot 120 as described herein. A motion application interface 333 and vision application interface 334 are also provided in the controller 160 so that the process control algorithms and state machines 332 interface with motion controllers 335 and vision processors 336 of the bot 120. The bot 120 includes any suitable onboard communications network 337 (such as an EtherCAT or other suitable network) that communicably couples the cameras, drives, motors, sensors, actuators, switches, etc. (as described herein) of the bot 120 to a respective motion controller 335 or vision processor 336. While the controller 160 of the bot 120 was described, it should be understood that controllers of the other tire changing system 100 devices 320A-320n are substantially similar to the controller 160.

Referring to FIGS. 1A-1B and 3 a control architecture 300 of the tire changing system 100 will be described. The control architecture of the tire changing system 100 generally includes a business and application logic portion 301, a control console 310, and one or more tire changing system devices 320A-320n (where n is an integer that denotes an upper numerical limit to the number of tire changing system devices in the tire changing system 100). The control console 310 includes any suitable processors and memory for controlling aspects of the tire changing system 100 as described herein (noting the memory is any suitable memory accessible by the processors such as a memory resident within the tire changing system 100 or a cloud based memory as described herein), and is communicably connected (e.g., wirelessly, through wires, is carried by, or remotely located) to the devices 320A-320n. The one or more tire changing system devices 320A-320n are any one or more of the devices described herein (i.e., bots 120, automated or semi-automated tire changing machines 182, automated or semi-automated tire balancing machines 183, tire storage racks/carts 187, wheel weight dispensers 181, barriers, etc.). The one or more tire changing system devices 320A-320n are in one aspect assigned to a single tire changing station 101 (such as where the service facility has a single service bay), or in other aspects, some of the tire changing system devices 320A-320n are assigned to one tire changing station 101 and other ones of the tire changing system devices 320A-320n are assigned to another tire changing station 101 (such as where the service facility has more than one service bay).

As can be seen in FIG. 3, a portion of the business and application logic portion 301 overlaps with a portion of the control console 310; however in other aspects there may not be any overlap. For exemplary purposes, a portion of the business and application logic portion 301 is resident in the control console 310. The business and application logic portion 301 is configured with any suitable operating system (OS) configured (e.g., programmed with non-transitory computer readable code executed on any suitable processor of the control console 310) to facilitate one or more of local services and cloud based services. The control console 310 includes a database access and management module 302 (which may be configured as a hardware or software module), a cloud interface module 303 (which may be configured as a hardware or software module), an operator graphical user interface 304, and an application logic module 305

(which may be configured as a hardware or software module) that are shared with the business and application logic portion 301.

The operator graphical user interface 304 is configured (e.g., programmed with non-transitory computer readable code executed any suitable processors and memory) to facilitate operator input and control (e.g., both operational control for tire changing services and administrative services (e.g., billing, software updates, database entry, billing, inventory, etc.) control) of the tire changing system 100. The database access and management module 302 is in communication with operator graphical user interface 304 and any suitable database(s) 360 and facilitates access to and storage of information including, but not limited to tire information, customer information, vehicle information, billing information, and inventory and relationships between the various information (i.e., each customer or vehicle has a respective record that includes respective tire information, respective billing information, etc.). The cloud interface module 303 is configured (e.g., programmed with non-transitory computer readable code executed any suitable processors and memory) to provide an interface between the control console and one or more cloud services. It is noted that reference to cloud services herein pertains to cloud computing which is known as the on-demand availability of computer system resources, especially data storage and computing power, without direct active management by the user and generally refers to data centers available to many users over the Internet. These cloud services include but are not limited to remote access to the tire changing system 100, point of service payment and billing, and over-the-air software updates to components of the tire changing system 100. The application logic module 305 is configured to at least interface the operator graphical user interface 304, the database access and management module 302, and the cloud interface module 303 with each other.

The control console 310 also includes a Web application interface 306, a process monitor module 307 (which may be configured as a hardware or software module), a process control module 308 (which may be configured as a hardware or software module), a device maintenance module 309 (which may be configured as a hardware or software module), and a network application interface to device module 311 (which may be configured as a hardware or software module). The Web application interface 306 is configured (e.g., programmed with non-transitory computer readable code executed any suitable processors and memory) to provide access, e.g., for the operator graphical user interface and/or other modules of the control console, to a web server and/or web browser (e.g., for accessing the cloud services). The process monitor module 307 is configured to (e.g., programmed with non-transitory computer readable code executed any suitable processors and memory) monitor (e.g., by sending data to and receiving data from the devices 320A-320n indicating a tire change process has started, has ended, or paused due to error) the tire changing process as described herein and provide feedback to the process control module 308. The process control module 308 is programmed (e.g., programmed with non-transitory computer readable code executed any suitable processors and memory) to issue commands to the devices 320A-320n controlling the process flow for a tire change so that tire change operations are performed in a predetermined sequence that may depend on the type of tire change and tire change services requested. The device maintenance module 309 is programmed (e.g., programmed with non-transitory computer readable code executed any suitable processors and memory) to monitor a health of the devices 320A-320n and provide maintenance alerts to the operator through the operator graphical user interface 304. The network application interface to device module 1011 is configured to provides a wired or wireless interface between the components of the control console and the devices 320A-320n.

In the aspect illustrated in FIGS. 1A-1B the control console 310 is disposed on the floor 198 and is remotely connected (through either a wired or wireless connection) to the devices 320A-320n. Referring to controller 160 of the bot 120, for exemplary purposes, the controller 160 (including suitable processors and memory 161 for controlling operations of the bot 120 as described herein) is in communication with the control console 310 and is communicably connected (e.g., wirelessly, through wires, is carried by, or remotely located) to the bot drives so as to effect operation of the bot 120 for wheel changing operations, and in some aspects traverse of the bot 120 along the traverse path 299 effecting dynamic positioning of the at least one actuator 126. In some aspects, the wheel changing operations employing one or more vision systems 130, 162 and respective cameras 131, 163, 163A, 163B, 163C, 163D (see also FIG. 2B) to locate to a variable position of the vehicle 110 with the wheel 111W or tire 111T mounted thereon relative to the bot 120. Suitable examples of vision systems that may be employed herein can be found in U.S. Pat. No. 11,446, 826 issued on Sep. 20, 2022 and titled "Autonomous Traverse Tire Changing Bot, Autonomous Tire Changing System, and Method Therefor," previously incorporated herein by reference in its entirety. For example, in a service facility the vehicle service technician 199 drives the vehicle 110 into a service bay. As may be realized, there is nothing to locate the vehicle 110, in the service bay, at any particular location (e.g., the vehicle may never be located in the same place twice) such as would be the case in a vehicle assembly line where the vehicle is carried by a conveyor and stopped at designated/predetermined positions (with respect to assembly automation) for assembly operations. Moreover, vehicles that are serviced in service facilities have varying wheel bases, varying wheel tracks, varying ride heights, varying camber, varying caster, etc. from vehicle to vehicle (e.g., many different makes and models of vehicles are serviced in the same service bay in any given amount of time one after the other), unlike in a vehicle assembly line where assembly operations are performed on the same make and model vehicle. As such, in service facility operations, within any given service bay (e.g., tire changing station 101), the vehicle 110 (and the components thereof) has a dynamically varying position (that changes from vehicle to vehicle, or even for the same vehicle each time that vehicle is driven into and parked within the service bay) with respect to the tools/machines within the tire changing station 101. Here, the positioning of the at least one actuator 126 relative to the variable position of the vehicle 110 with the wheel 111W or tire 111T mounted thereon is disposed so that articulation of the at least one actuator 126 engages the wheel or tire engagement tool 129 to the wheel 111W or tire 111T on the vehicle 110 in the variable position.

Figure 2C:
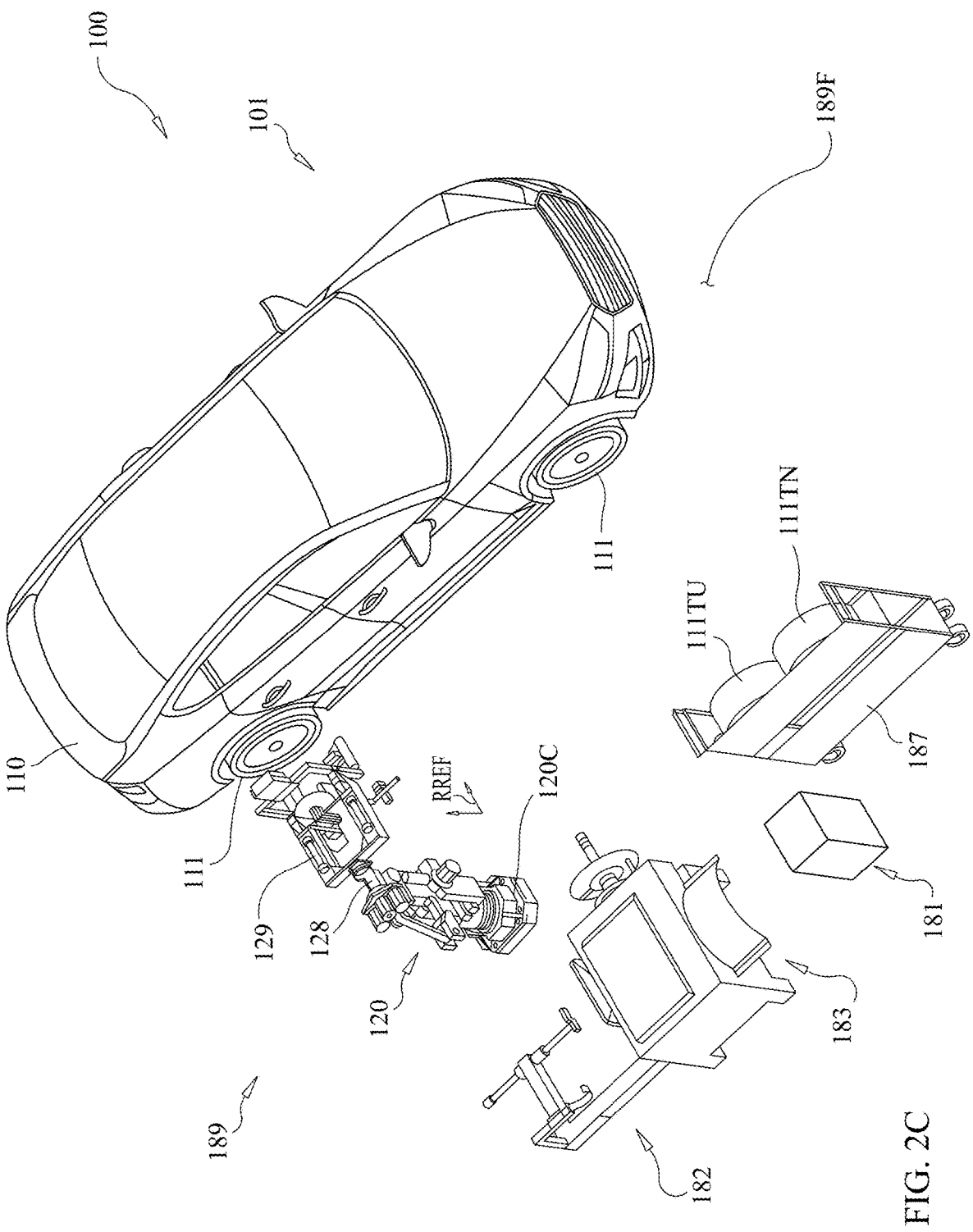
FIG. 2C is yet another schematic illustration of the automated tire changing system of FIGS. 1A and 1B in accordance with the present disclosure.
Figure 2D:
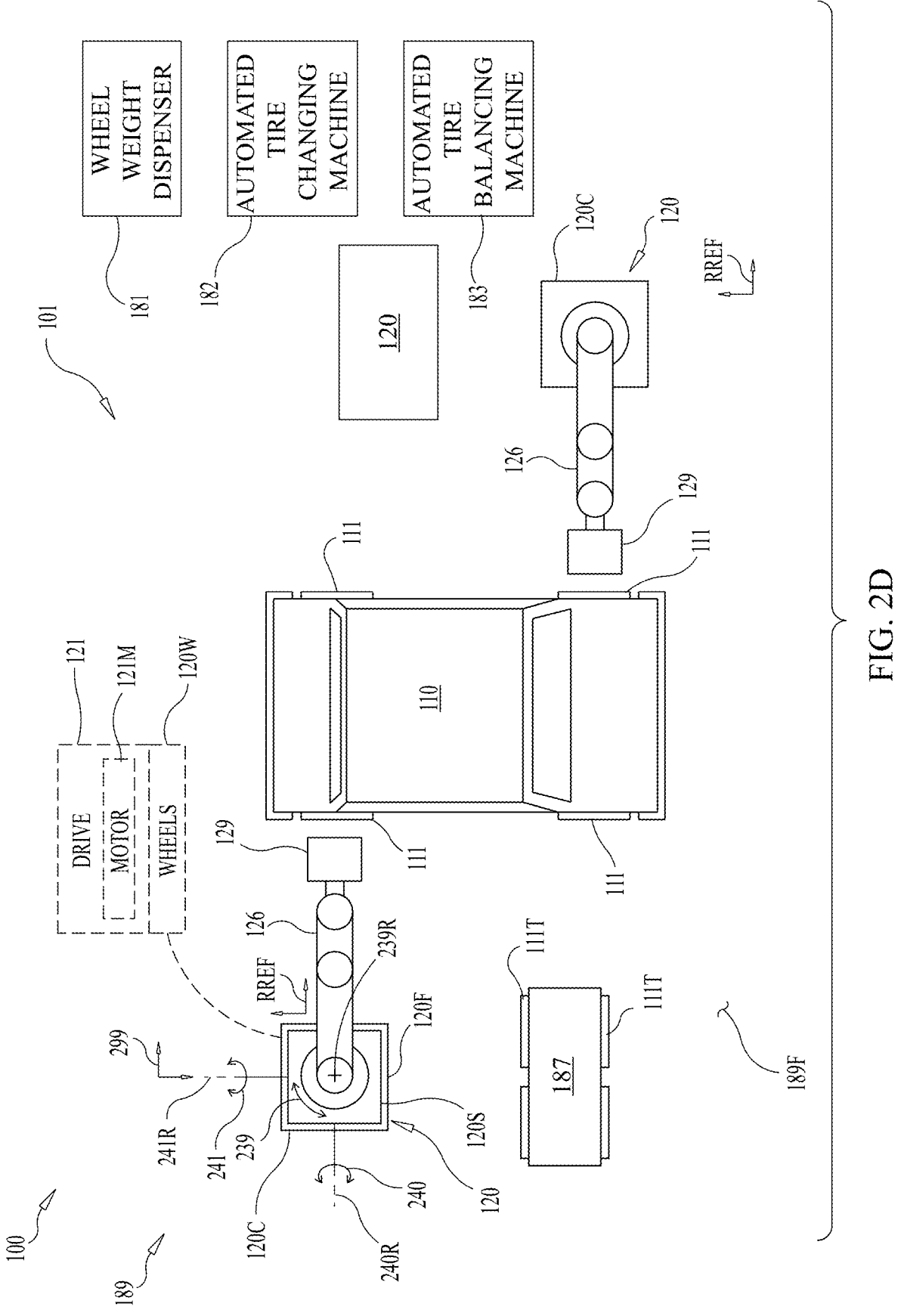
FIG. 2D is another schematic illustration of the automated tire changing system of FIGS. 1A and 1B in accordance with the present disclosure.

Referring also to FIGS. 1A-1B, in the example illustrated in FIG. 2C, the tire changing system 100 includes automated or semi-automated tire changing machine(s) 182 and automated or semi-automated tire balancing machine(s) 183 where the bot 120 is configured to remove a wheel assembly 111 from the vehicle and transport the wheel assembly 111 to the tire changing machine 182. Here, the end effector 128, with the wheel or tire engagement tool 129 coupled thereto, on articulation of the at least one actuator 126 is configured to place the wheel 111W, with the tire 111T mounted thereto, on the automated (or semi-automated) tire changing machine. In the case of removing the tire 111T from the wheel 111W, the bot end effector 128 is configured to remove the tire 111T (e.g., a used or old tire 111TU), uninstalled from the wheel 111W by the automated (or semi-automated) tire changing machine 182, from the tire changing machine 182. In the case of installing the tire 111T to the wheel 111W, the end effector 128 is configured to place another tire 111T (e.g., a replacement tire 111TN) on the automated (or semi-automated) tire changing machine 182 for installation of the other tire 111TN to the wheel 111W by the tire changing machine 182. The end effector 128, with the wheel or tire engagement tool 129 coupled thereto, on articulation of the at least one actuator 126 is configured to place the wheel 111W, with the other tire 111TN mounted thereto, on the automated (or semi-automated) tire balancing machine 183. Here, in one or more aspects, one of the robotic actuators 126, 126A picks wheels weights from a hopper and applies them to the wheel in locations identified by the tire balancing machine 183. Once balanced the wheel assembly 111 may be installed on the vehicle 110 by the bot 120.

As may be realized (and shown in FIGS. 1A-1B, 2A, and 2D) the tire changing system 100 is configured, in some aspects, to provide both in situ tire changes with the wheel 111W mounted in situ on the vehicle 110 and tire changes performed by the tire changing machine(s) 182 and tire balancing machine(s) 183 with the wheel 111W removed (i.e., located off of) the vehicle 110. The configuration of the tire changing system 100 between in-situ tire changes and tire changes with the wheel 111W removed from the vehicle may be effected through the control console 310. For example, as noted above, the vehicle service technician 199 may select an in-situ tire change and/or a tire change with the wheel 111W removed from the operator graphical user interface 304. The operator graphical user interface 304, in one aspect, is also configured to allow the vehicle service technician 199 to select which tires (e.g., passenger front, passenger rear, drive front, or drive rear) are to be changed in-situ or by removing the wheel 111W so that in-situ and removed wheel tire changes are performed on a common vehicle.

The control console 310 is also configured, such as through inputs on the operator graphical user interface 304, so that the vehicle service technician 199 selects which tire change operations are to be performed. For example, the vehicle service technician 199 may select, and the control console 310 is configured to effect such selection, a type of balancing to be performed on a tire (e.g., wheel weights, tire beads, etc.), whether a valve core is replaced, which tires are to be replaced, the make/model/size of tire to be installed, whether some tire change operations are to be performed manually or in a semi-autonomous manner, etc. In some aspects, there are pre-programmed tire change routines 361 corresponding to a respective type of vehicle (car, truck, sports car, make, model, etc.), a respective type of wheel or tire, and or a respective customer that are stored in a memory such as database 360. These pre-programmed tire change routines 1061 are selectable by the vehicle service technician 199 through, for example, the operator graphical user interface 304 and specify a tire change recipe (which tire change processes are to be performed and whether or not one or more tires are changed in-situ or changed by removing the wheel).

Referring to FIGS. 1A-1B, 2A-2C, and 5-8, in one aspect, the automated tire changing system 100 includes supply carts 187 configured to hold tires 111T, wheels 111W, and or wheel assemblies 111. In one or more aspects, one or more of the supply carts 187 are manual carts that are moved from location to location by, for example, the vehicle service technician 199. In one or more other aspects, one or more of the carts 187 is an automated cart having a cart drive section 188, where the cart includes a controller 160' and memory 161', vision system 130', positioning sensors 132', and navigation system 163', which are substantially similar to the controller 160 and memory 161, vision system 130, positioning sensors 132, and navigation system 133 of a wheeled bot 120 (noting that manual and automated carts can be used alongside each other). Here, the cart autonomously navigates throughout the tire changing station 101 in a manner substantially similar to that described above with respect to bot 120. In still other aspects, one or more of the carts 187 (such as the manual cart) is configured to be towed by a wheeled bot 120 or an automated cart to a predetermined location within the tire changing station 101.

As may be realized, the automated tire changing system 100, in one or more aspects, includes fencing or other barriers 227 (see FIG. 2B) to substantially isolate the vehicle service technician 199 from the bots 120 and automated supply carts 187 when in operation. In some aspects, the barriers 227 have any suitable interlock devices that terminate power to specific axes of motion or all axes of motion of the bot 120 (and any other automation of the tire changing system 100) upon opening a door to the barrier 227 and/or entering the barrier 227. In other aspects, the bots 120 and automated supply carts 187 are configured to collaboratively operate with the vehicle service technician 199 so as to hand off tires 111T, wheels 111W, wheel assemblies 111, etc. to/from the vehicle service technician 199.

Figure 4A:
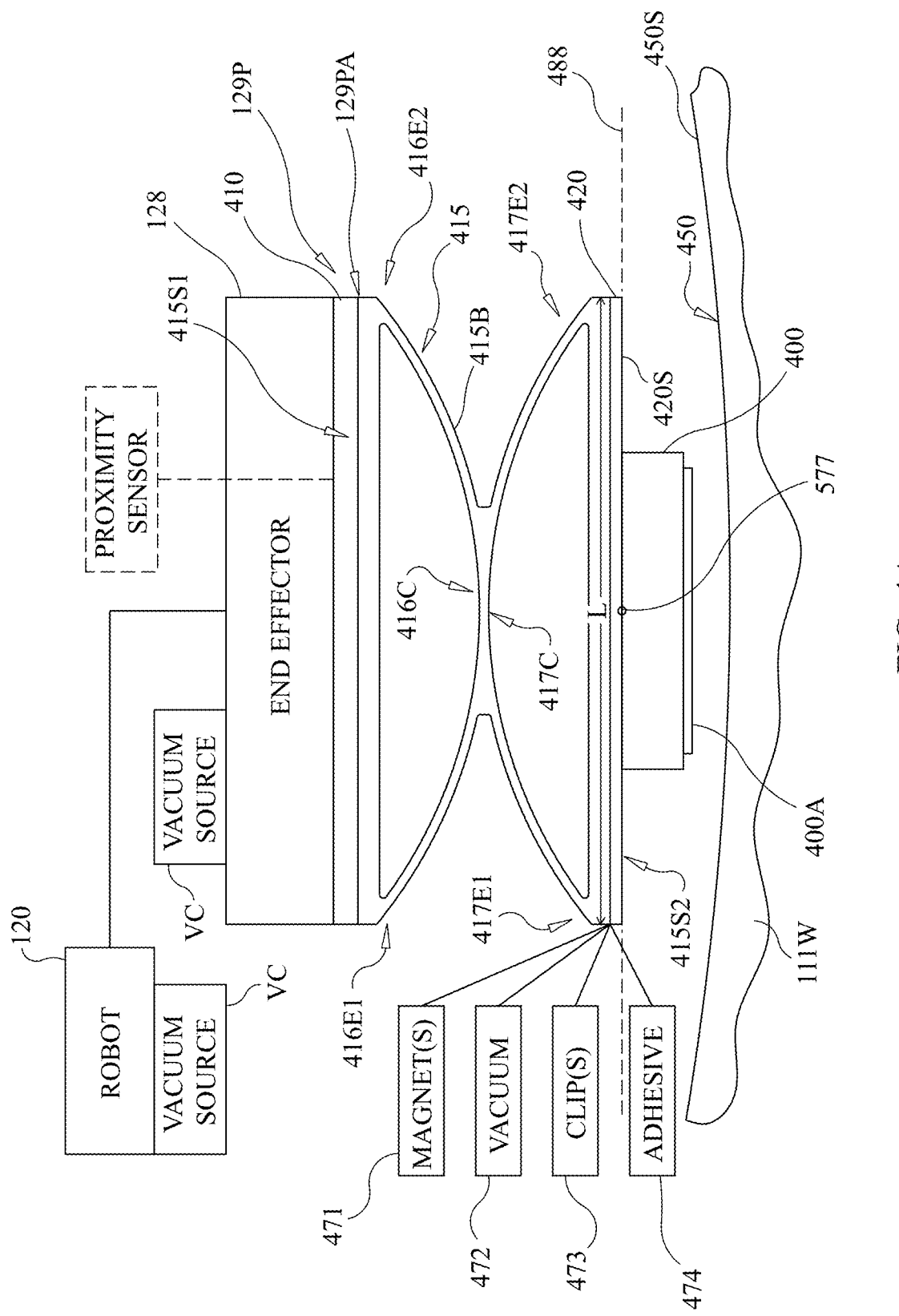
FIGS. 4A and 4B are schematic illustrations of a wheel weight installation tool of the automated tire changing system of FIGS. 1A and 1B in accordance with the present disclosure.
Figure 4B:
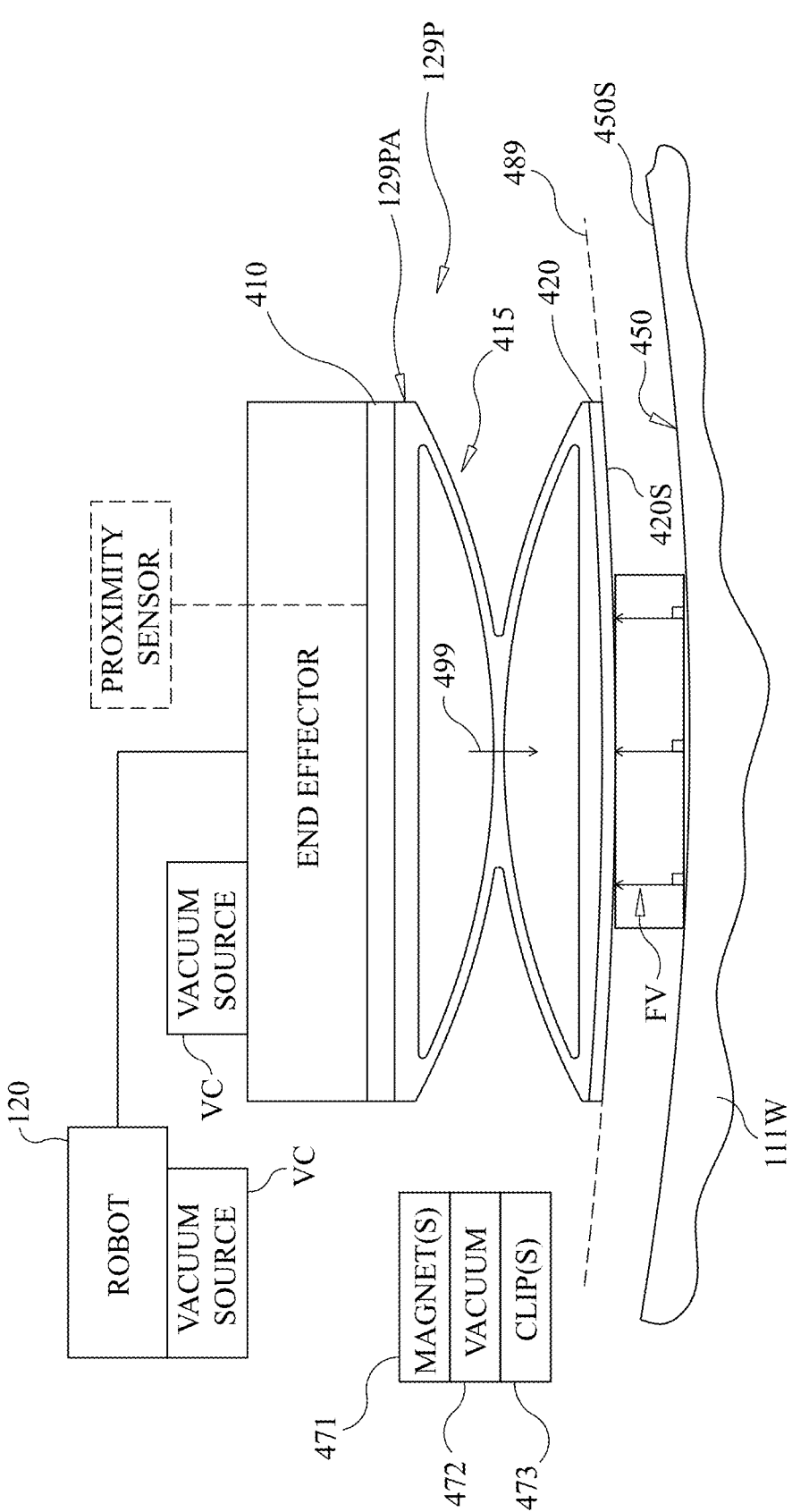
Figure 9A:
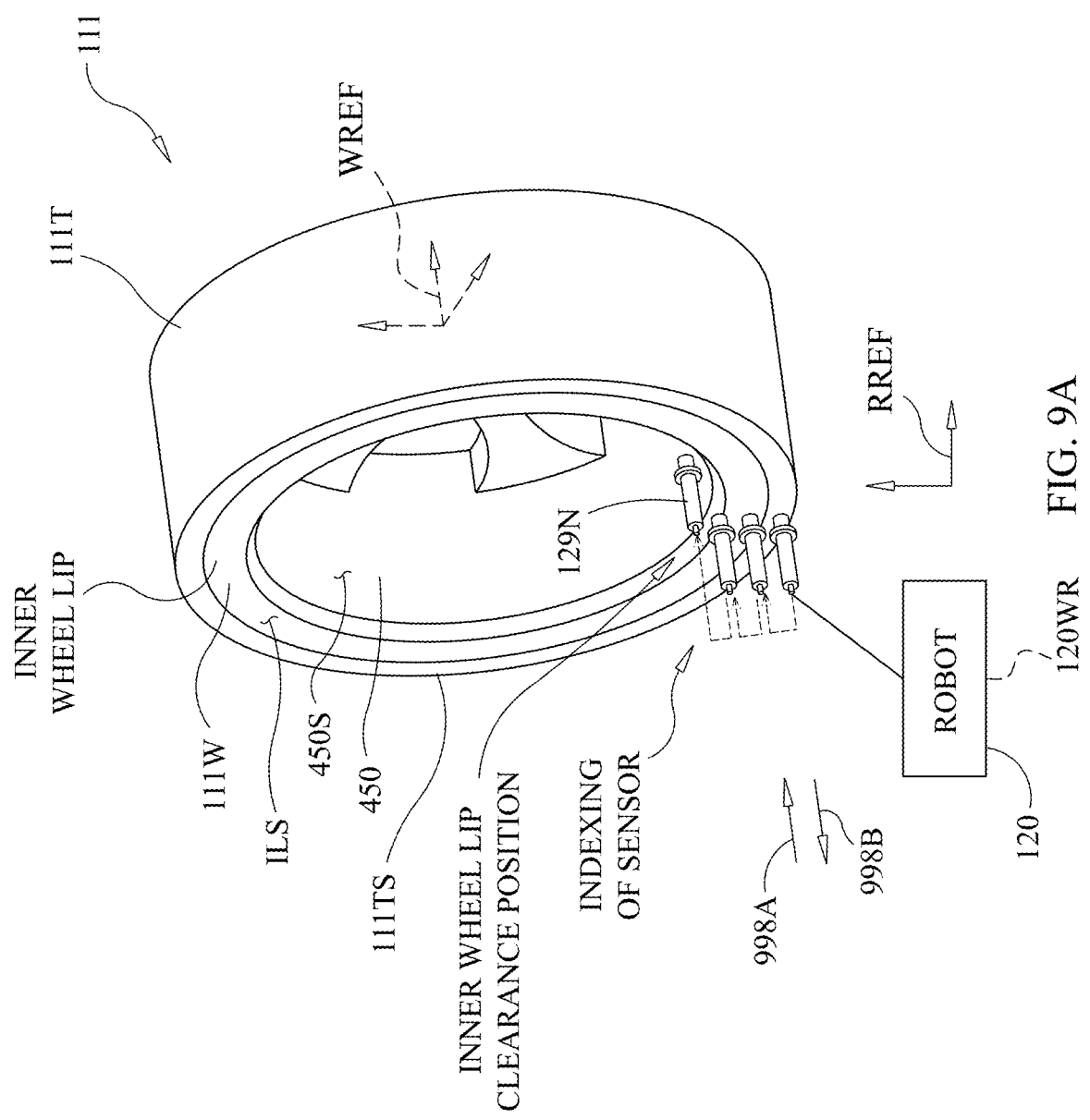
FIGS. 9A-9C are schematic illustrations of a wheel assembly proximity sensor of the automated tire changing system of FIGS. 1A and 1B in accordance with the present disclosure.
Figure 9B:
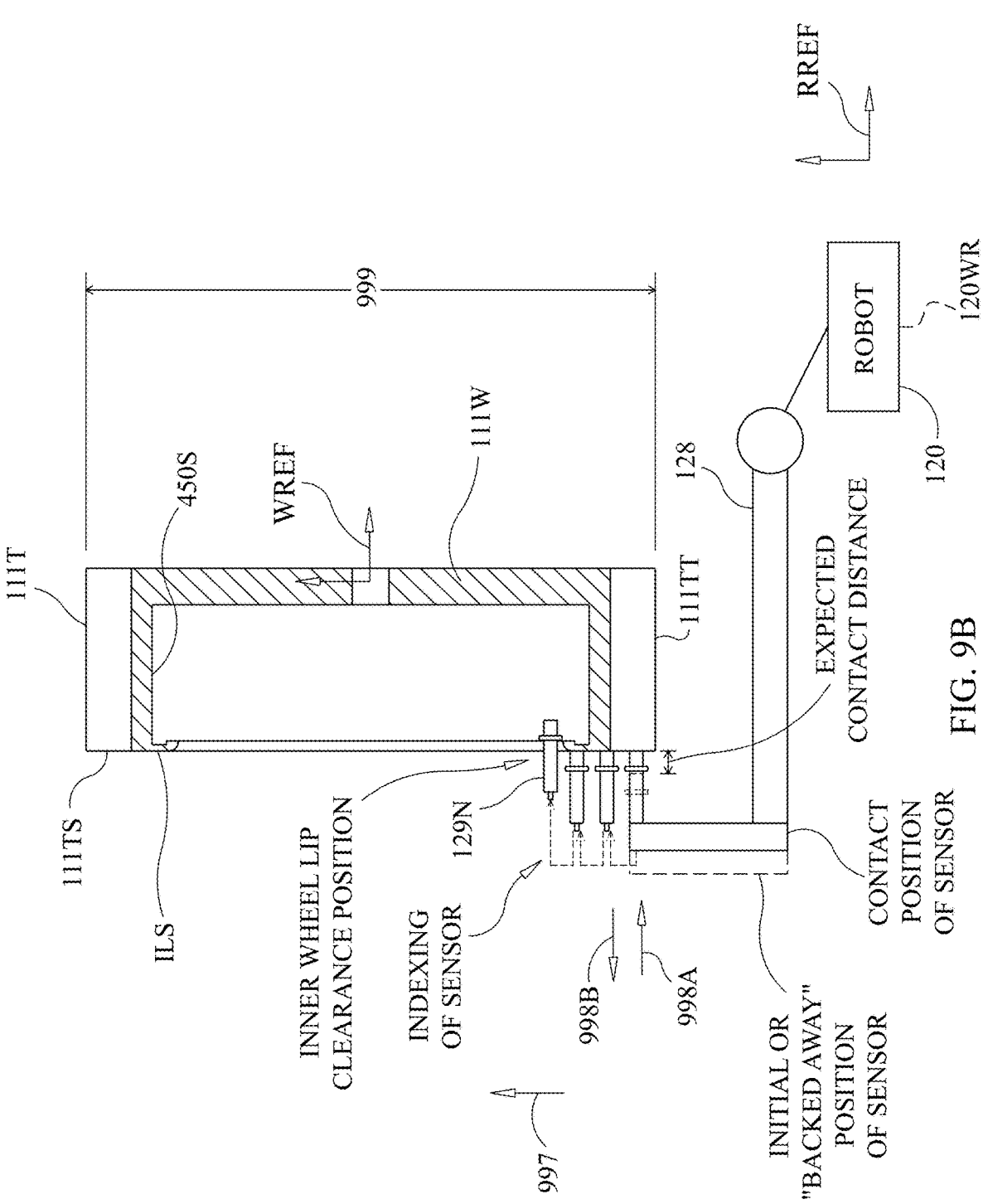
Figure 9C:
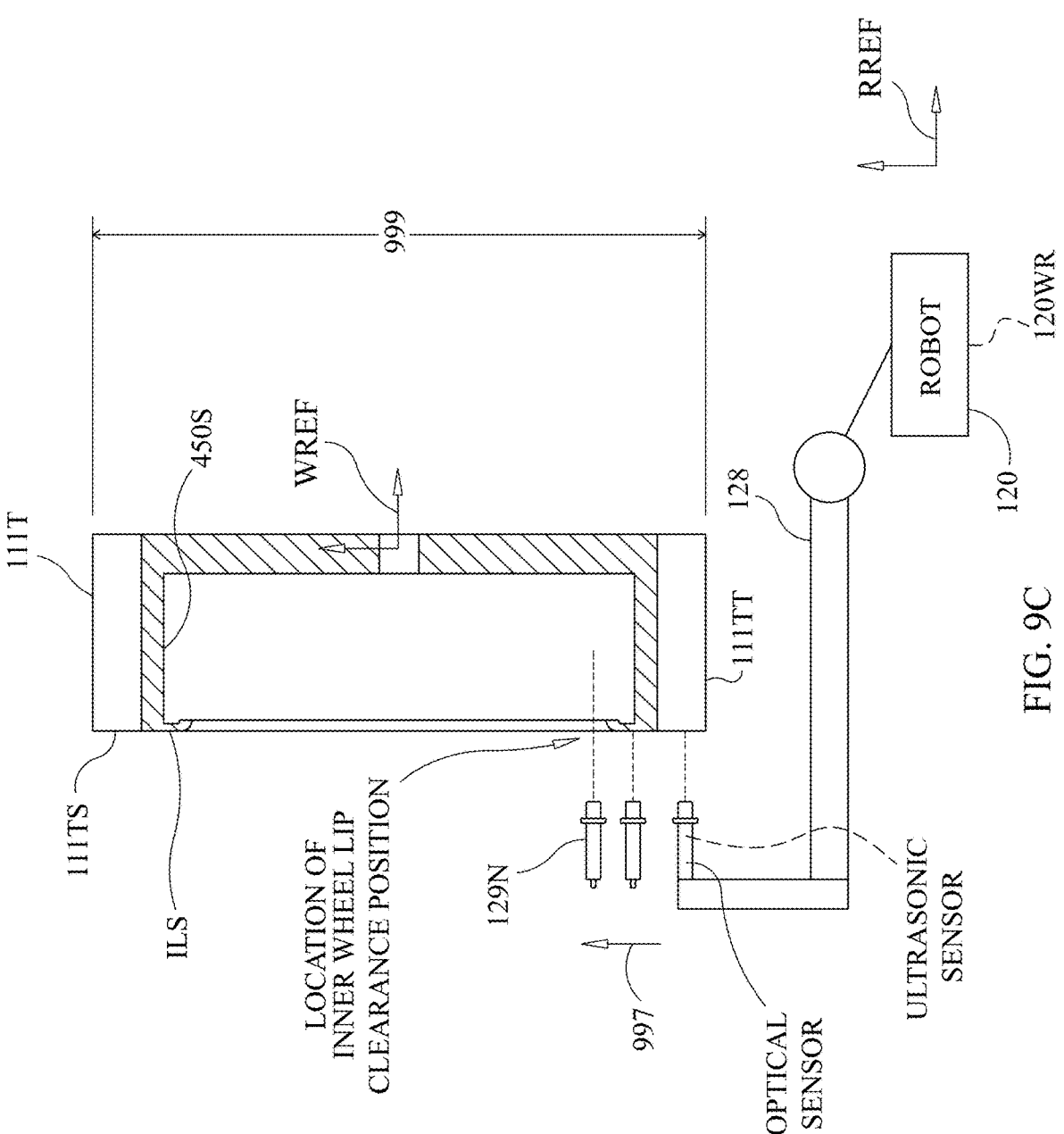

Referring to FIGS. 1, 4A, and 4B, as described herein, the automated tire changing system 100 is configured to install wheel weights 400 on a wheel 111W and/or on a wheel assembly 111 (a wheel 111W with a tire 111T mounted thereon, also referred to herein as a tire-wheel assembly) with the wheel 111W and/or wheel assembly 111 mounted on a vehicle 110. As also described herein, the robot 120 includes an end effector 128 configured to couple with the wheel weight gripper 129P (FIGS. 4A and 4B) and the wheel weight installation tool 129O (FIGS. 5A-5C), where the wheel weight gripper 129P and the wheel weight installation tool 129O are interchangeable/swappable with each other on the end effector 128 as described herein. The end effector 128 and/or the wheel weight gripper 129P and the wheel weight installation tool 129O are configured in any suitable manner (such as in a manner similar to that illustrated and described with respect to, e.g., FIGS. 5A and 9B but such illustration is only exemplary and the configuration of the end effector and/or the structural connection between the end effector and the wheel weight gripper 129P and the wheel weight installation tool 129O is not limited to what is illustrated) such that the wheel weight gripper 129P and wheel weight installation tool 129O are inserted into the barrel 450 of the wheel 111W with the wheel 111W mounted on the vehicle 110 for application of the wheel weight 400. In other aspects, the robot 120 includes sufficient articulation to reach around the wheel assembly 111/wheel 111W for inserting the wheel weight gripper 129P and wheel weight installation tool 129O into the barrel 450 for installation of a wheel weight 400 to the surface 450S of the barrel 450. In still other aspects, one or more wheel weight installation robot 120WR (see FIG. 1B) may be provided where the wheel weight installation robot is shaped and sized to travel (e.g., in manners similar to those described above with respect to robot 120) underneath the lifted vehicle 110 and access the barrel 450 of a wheel 111W for installing (or removing) wheel weights 400. The wheel weight installation robot 120WR includes a controller 120″ similar to controller 160 of robot 120, where the controllers 120, 120′, 120″ (and any other suitable controller of the automated tire changing system 100) may be communicably connected to one another so as to pass information therebetween for cooperative operation of respectively controlled components of the automated tire changing system 100.

FIGS. 4A and 4B schematically illustrate the wheel weight gripper 129P coupled to the end effector 128 (or distal end 120D which comprises the end effector 128S) of robot 120. The wheel weight gripper 129P is a conformable or conforming wheel weight gripper that includes a resilient/compliant structure that conforms, from a relaxed configuration (as illustrated in FIG. 4A—shown where the flexible grip 420 is substantially straight or planar for exemplary purposes only, but in other aspects the flexible grip may have a curved shape in the relaxed configuration), to a surface of the wheel 111W onto which the wheel weight 400, carried by the wheel weight gripper 129P, is applied. The wheel weight gripper 129P includes resiliently compliant wheel balancing weight applicator 129PA having a rigid frame or base 410, a compliant support 415 (also referred to herein as a resiliently compliant wheel balancing weight applicator), and a flexible grip 420 (also referred to herein as a wheel balancing weight grip). The rigid base 410 is configured for coupling with the end effector 128 in any suitable manner, such as in accordance with the releasable couplings of the end effector 128. In some aspects, the wheel weight gripper 129P may be a unitary one piece member, while in other aspects the components of the wheel weight gripper 129P may be coupled to each other in any suitable manner (e.g., mechanically or chemically). In still other aspects, the wheel weight gripper 129P may be integral with the end effector 128. It is noted that the configuration of the wheel weight gripper 129P described herein is exemplary and the wheel weight gripper 129P may have any suitable compliant structure for adhering wheel weights to a wheel as described herein.

The compliant support 415 has a resilient body 415B that has a first side 415S1 and a second side 415S2. The first side 415S1 is coupled to the rigid base 410 in any suitable manner (e.g., mechanical or chemical fasteners, welding, brazing, over-molding the resilient body 415B over/on the rigid base 410 (or vice versa), or any other suitable manner) so that the rigid base 410 and resilient body 415B are carried together as unit by the robot 120. The compliant support 415 is illustrated as having an opposing leaf spring or opposing bow configuration for exemplary purposes only and in other aspects has any suitable configuration that provides for conformity and flexing of the flexible grip 420. In this example, the compliant support includes a first resilient leaf or bow 416 that is coupled at its ends 416E1, 416E2 to the first side 415S1. The first leaf 416 has a crown 416C disposed between the ends 416E1, 416E2. A second resilient leaf or bow 417 has ends 417E1, 417E2 and a crown 417C disposed between the ends 417E1, 417E2. The crown 417C of the second leaf 417 is coupled to the crown 416C of the first leaf 416 so as to form the opposing leaf or opposing bow configuration. The ends 417E1, 417E2 of the second leaf 317 are coupled to the second side 415S2. In one aspect, the compliant support 415 is formed with the sides 415S1, 415S2 of any suitable resilient material (e.g., rubber, plastic, spring steel, etc.) as a single one piece unit (e.g., by molding as a single one piece unit, welding, brazing, etc.).

The flexible grip 420 is coupled to the second side 415S2 of the resilient body 415 in any suitable manner (e.g., mechanical or chemical fasteners, welding, brazing, over-molding the resilient body 415B over/on the flexible grip 420 (or vice versa), or any other suitable manner) so that the rigid base 410, the resilient body 415B, and flexible grip 420 are carried together as unit by the robot 120. The flexible grip 420 is configured to grip and hold one or more wheel weights 400 against a weight interface surface 420S of the flexible grip 420 in any suitable manner. For example, the flexible grip 420 includes one or more of adhesives 474, magnet(s) 471, vacuum grip(s) 472, and spring clips 473 (or other suitable clips) that grip the wheel weight and hold the wheel weight against the flexible grip for transport by the robot 120 and for application to a surface 450S of the barrel 450 of the wheel 111W. Where vacuum grip(s) 472 are provided, any suitable vacuum source VC is provided on the robot 120 or end effector 128 and is coupled to the vacuum grip(s) 472 such as by hoses or any other suitable conduit.

Referring also to FIG. 4C, the magnet(s) 471 of the flexible grip 420 may be segmented permanent magnets (or electromagnets) 471S arrayed along a length L of the flexible grip 420 where a spacing S between the magnets 471 allows the flexible grip 420 to bend and flex so as to conform to the surface 450S of the barrel 450. In other aspects, the flexible grip 420 may be formed of a flexible magnetic material such that magnetic properties are inherent in the flexible grip 420. Wheels weights made of ferrous material are magnetically attracted to and held by the magnet(s) 471 of the flexible grip 420.

Referring also to FIGS. 4D and 4E, in one or more aspects, two or more clips 473 are arrayed along the length L of the flexible grip 420 where a spacing S between the clips 473 allows the flexible grip 420 to bend and flex so as to conform to the surface 450S of the barrel 450. In other aspects, one clip 473 may be disposed anywhere along the length L and span any suitable portion of the length L so as to grip the wheel weight 400. Each clip 473 includes a pair of opposing tines 473T that are resilient and spaced from one another any suitable distance so that the wheel weight 400 passes between the opposing tines 473T and is held by the opposing tines 473T with a friction force between the opposing tines 473T and the wheel weight 400. The clip(s) 473 provide for gripping of wheel weights constructed with or without ferrous material.

Referring also to FIG. 4F, in one or more aspects, two or more vacuum grip(s) 472 are arrayed along the length L of the flexible grip 420 where a spacing S between the vacuum grips 472 allows the flexible grip 420 to bend and flex so as to conform to the surface 450S of the barrel 450. In other aspects, one vacuum grip may be disposed substantially midway along the length L so as to grip the wheel weight 400. Each of the vacuum grip(s) 472 are provided with a suction force sufficient to hold a wheel weight 400 regardless of whether all of the vacuum grips 472 engage the wheel weight 400. The vacuum grip(s) 473 provide for gripping of wheel weights constructed with or without ferrous material.

Referring still to FIGS. 4A and 4B, with the compliant support 415 in a relaxed state (as illustrated in FIG. 4A) the weight interface surface 420S of the flexible grip 420 is substantially flat and forms a plane 488. As the robot 120 moves the end effector 128 linearly in direction 499 to engage the surface 450S of the barrel 450 with the wheel weight gripper 129P for application of the wheel weight 400 to the surface 450S. With application of the wheel weight 400 to the surface 450S, the wheel weight 400 is pressed against the surface 450S where an array of reaction normal force vectors FV are exerted on the wheel weight 400 by the surface 450S. The substantially evenly distributed compressive force exerted between the wheel weight 400 and the surface 450S wets the surface 450S with adhesive 400A of the wheel weight 400 and/or activates the adhesive 400A (which may be a pressure sensitive adhesive) to adhere the wheel weight 400 to the surface 450S. Here, the reaction normal force vectors FV (and the corresponding force vectors exerted on the wheel weight 400 by the weight interface surface 420S) are arranged to point towards a center of the arc formed by the surface 450S of the barrel 450 such that the substantially evenly distributed compressive force exerted on the wheel weight 400 by the weight interface surface 420S and the surface 450S causes the wheel weight 400 to bend and flex in conformity with the radius of the surface 450S as shown in FIG. 4B. These same reaction normal force vectors FV cause the compliant support 415 to be compressed against the rigid base 410 where the opposing leaf spring configuration of the compliant support allows the weight interface surface 420S to bend and flex in a manner substantially similar to that of the wheel weight 400 (e.g., the weight interface surface 420S bends and flexes so as to conform with an imaginary cylinder 489 that has a radius concentric with the radius of the surface 450S) so that an array of force vectors (equal and opposite to the force vectors FV and having the same magnitudes that effect the substantially evenly distributed compressive force) are applied by the weight interface surface 420S to the wheel weight 400. The wheel weight gripper 129P allows the wheel weight 400 to contour to the surface 450S of the barrel 450 of the wheel 111W as the wheel weight 400 is pressed against the surface 450S with a substantially evenly distributed compressive force.

Referring to FIGS. 1A, 1B, and 5A-5C, the bot 120 is connected to the frame 189F at a proximal end 120P of the bot 120. The bot 120 has a distal end 120D (that comprises the end effector 128), opposite the proximal end 120P, where the distal end 120D is arranged so as to interface with the wheel assembly 111. As described herein, the bot has an actuator 126, where the actuator has a wheel weight installation tool or indexer 129O arranged to index the end effector 128, in the at least one degree of freedom of the robot 120, and position the end effector 128 at different index positions corresponding to wheel weight locations 580, 581 on the wheel 111W

In one or more aspects, the robot 120 has the wheel weight installation tool 129O that indexes the distal end 120D between a retracted position (see FIG. 5A) and at least one extended position (see FIGS. 5B and 5C), wherein in the at least one extended position the distal end 120D interfaces the wheel assembly 111 (as described herein) determining a wheel or rim location of the wheel 111W of the tire wheel assembly 111 mounted on the vehicle 110. In other aspects, the wheel weight installation tool 129O is coupled to the end effector 128 of the robot 120, for indexing the distal end 120D between a retracted position (see FIG. 5A) and at least one extended position (see FIGS. 5B and 5C). In the at least one extended position the distal end 120D interfaces the wheel assembly 111 determining a wheel or rim location of the wheel or rim 111W of the wheel assembly 111 and predetermined locations so as to effect a balancing solution of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)) via robotic application of wheel weights 400 with the end effector 128. As described herein, the wheel weight(s) 400 are applied to the surface 450S of the barrel 450. As noted above, when applying dynamic balancing weights in an automotive system, the wheel weights are most commonly placed at an inner location 580 (further away from the centerline of the vehicle adjacent the back of the wheel flange or spokes) and an outer location 581 (towards a centerline of the vehicle adjacent the inner wheel lip, e.g., about 25.4 mm (about 1 inch) from the inner wheel lip although in other aspects the outer location may be more or less than about 25.4 mm (about 1 inch)). The wheel weight installation tool 129O positions wheel weights 400 at one or more locations of the wheel 111W, including but not limited to those locations 580, 581 described above.

The wheel weight installation tool 129O includes a multi-index stage indexer 512, where each index stage has at least one index position. In the example illustrated in FIGS. 5A-5C, the multi-index stage indexer 512 includes a first stage formed by actuator 510 and a second stage formed by actuator 511; however, in other aspects there may be more than two stages. At least one stage of the multi-index stage indexer 512 has different index positions or locations (see, for example, locations 580, 581) that position the interface corresponding to wheel balancing weight locations on the wheel 111W so as to effect the balancing solution.

In some aspects, the wheel weight installation tool 129O has an index position (see FIG. 5A) that places the end effector 128 (or distal end 120D which comprises the end effector 128S) in contact with the wheel 111W determining a wheel or rim location on the wheel 111W, of the wheel assembly 111 mounted on the vehicle 110. Here, the one or more of the actuators 510, 511 include any suitable encoders or other distance determining features for determining an extension of the respective actuator. The wheel weight installation tool 129O may be positioned adjacent the side wall 111TS (inclusive of the surface ILS of the inner wheel lip) of the wheel assembly 111 and extended so that the end or tip of the wheel weight installation tool 129O contacts the side wall 111TS. The encoder or other distance sensor of the respective actuator sends a signal to the controller 160, 160" that embodies the extension distance of the respective actuator 510, 511 so that the distance 578 between a retracted position of the wheel weight installation tool 129O (see FIG. 5A) and the sidewall 111TS is known. The controller 160, 160" may employ the distance 578 when controlling extension of the actuators 510, 511 for placement of wheel weights at one or more of the wheel weight locations 580, 581, such as where the actuators have a variably controlled extension.

Figure 5A:
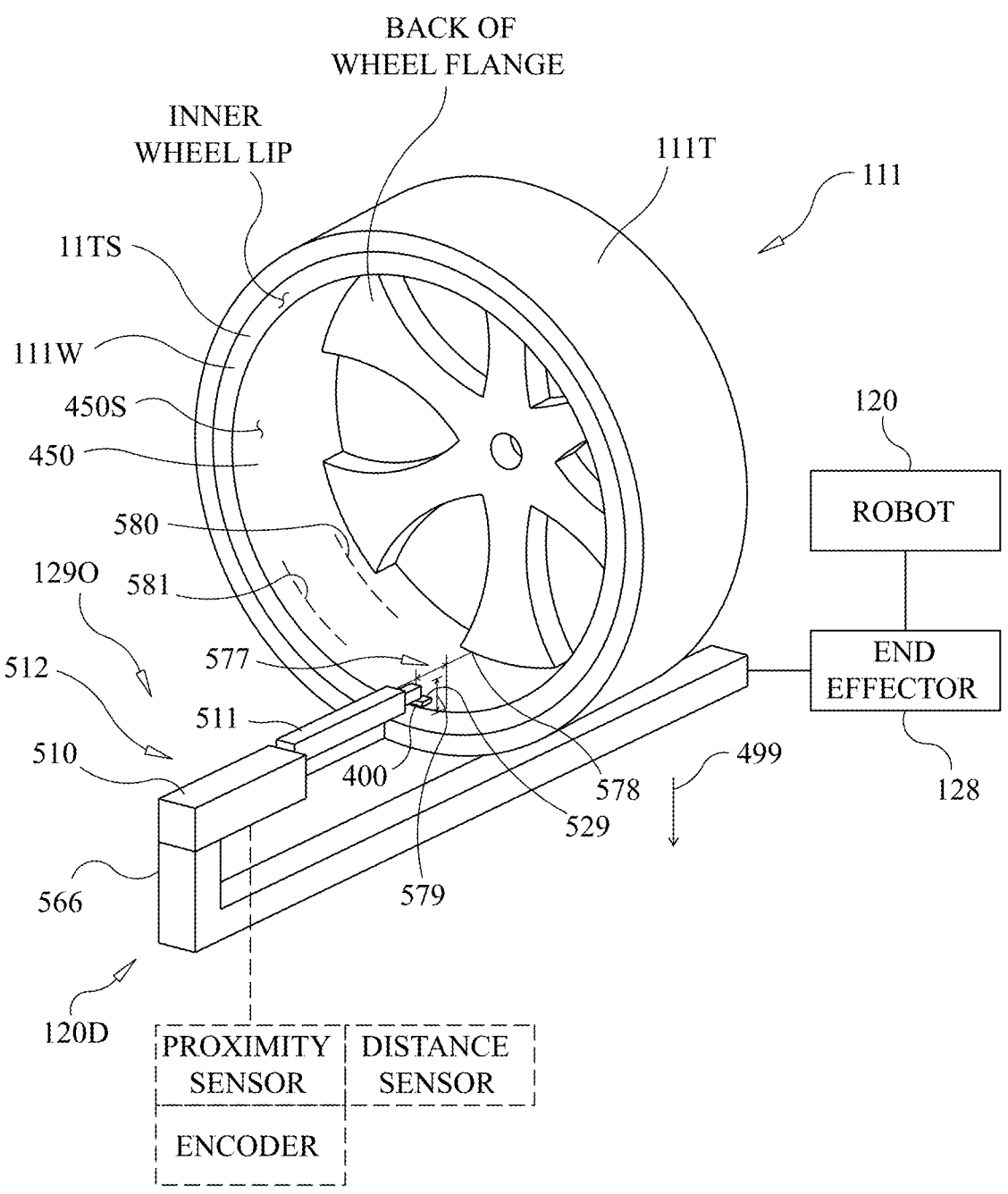
FIGS. 5A-5C are schematic illustrations of a wheel weight installation tool of the automated tire changing system of FIGS. 1A and 1B in accordance with the present disclosure.
Figure 5B:
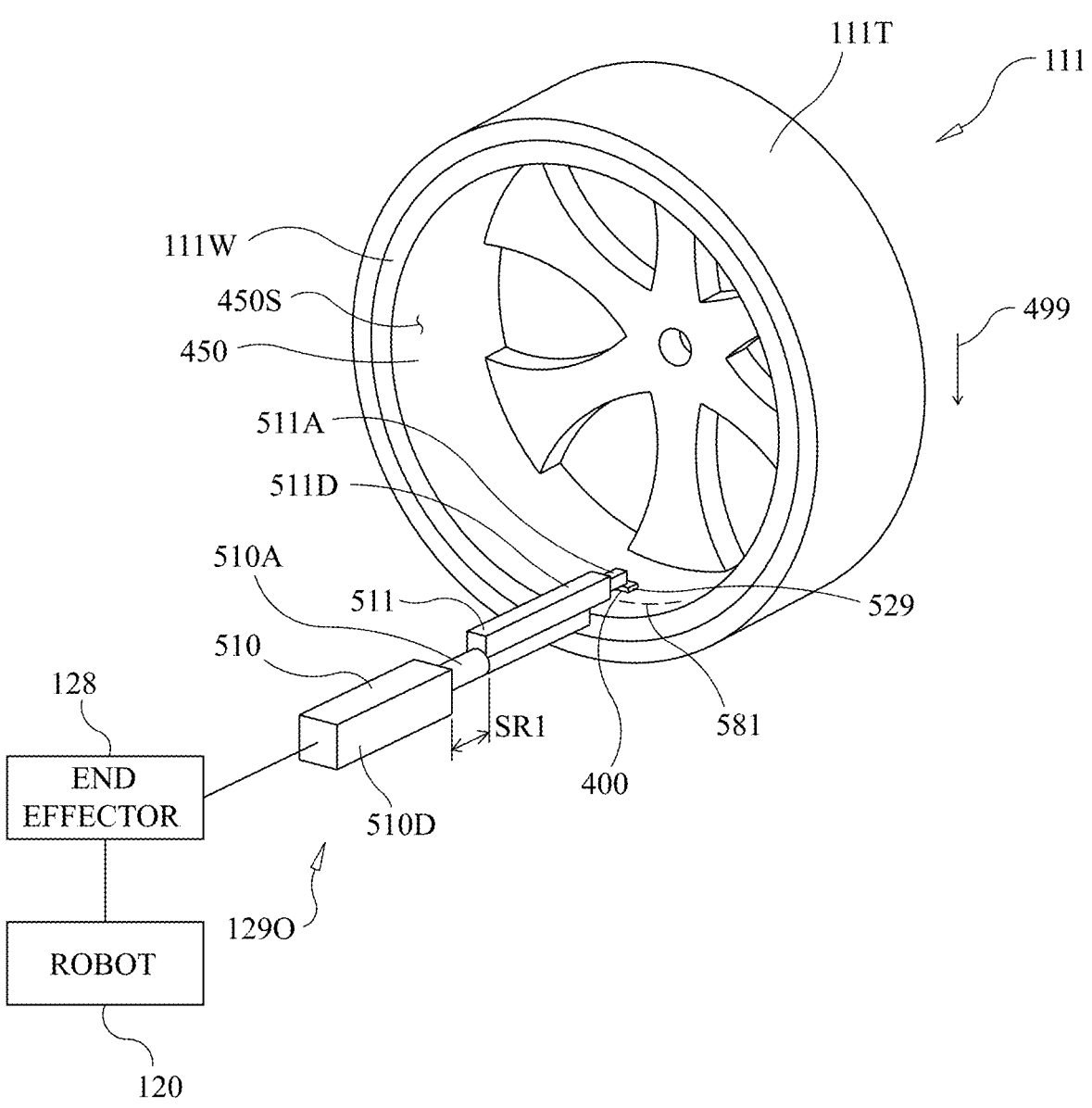
Figure 5C:
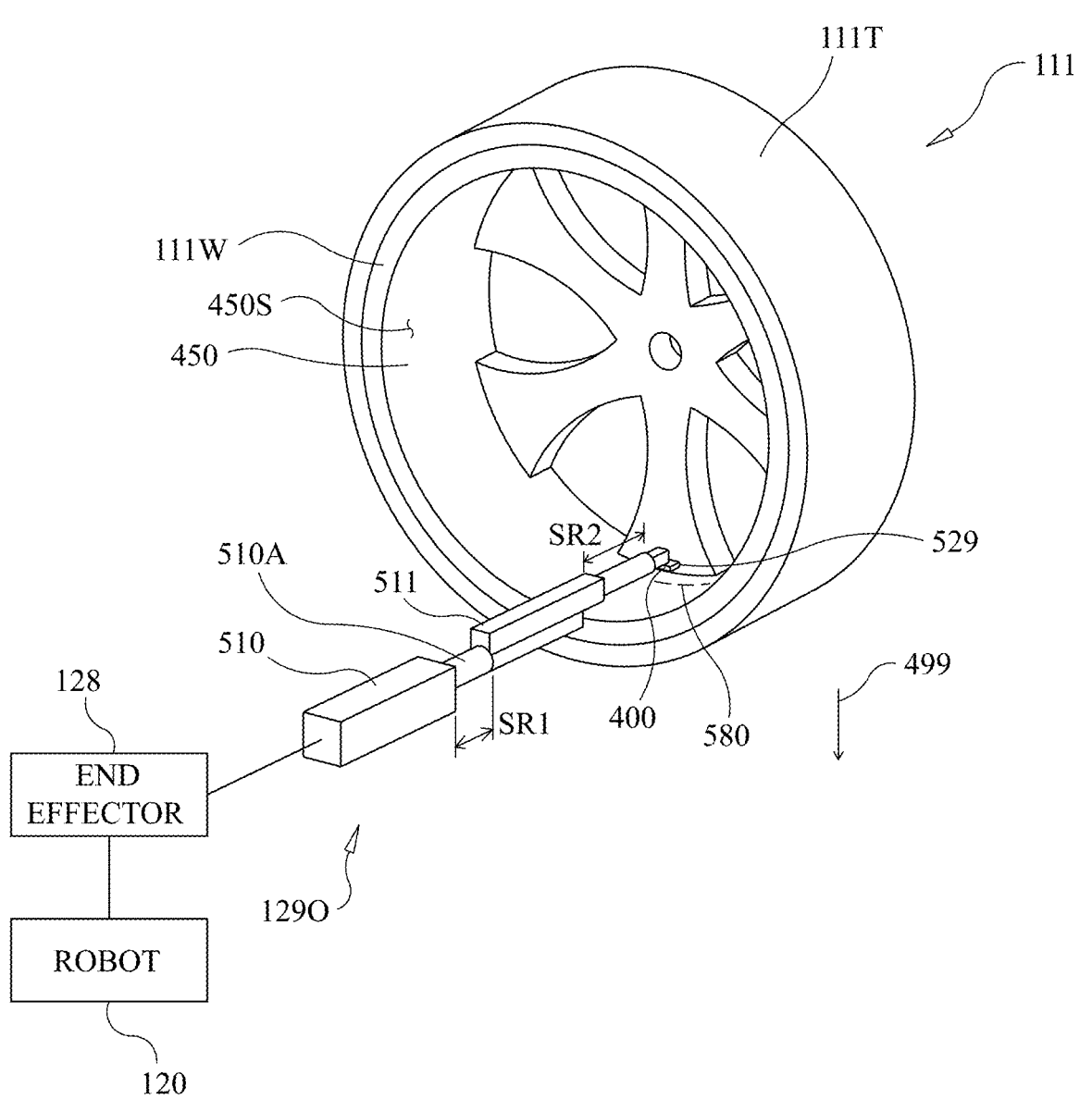

In one aspect, the multi-index stage indexer 512 positions wheel weights at one or more of the inner location 580 and the outer location 581. The multi-index stage indexer 512 is coupled to a frame 566 of the wheel weight installation tool 129O. The frame 566 has any suitable configuration for coupling with the end effector 128 and that provides for insertion of at least a portion of the wheel weight installation tool 129O into the barrel 450 (the configuration of the frame 566 illustrated in FIG. 5A is exemplary only and the frame may have any other suitable configuration). The multi-index stage indexer 512 includes serially arranged actuators 510, 511 that provide for a staged extension of the wheel weight installation tool from a retracted position (see FIG. 5A) to one or more of a first extended position (see FIG. 5B) and a second extended position (see FIG. 5C). The first extended position corresponds with placement of a wheel weight 400 at the outer location 581. The second extended position corresponds with placement of a wheel weight 400 at the inner location 580.

The actuators 510, 511 are any suitable actuators including, but not limited to, one or more of electric actuators, pneumatic actuators, hydraulic actuators, magnetic actuators, screw drives, etc. Each actuator 510, 511 includes a drive portion 510D, 511D and a driven portion 510A, 511A. The drive portion 510D of actuator 510 is coupled to the frame 566 in any suitable manner (e.g., such as mechanical and/or chemical fasteners, welding, brazing, etc.). The drive portion 511D of actuator 511 is coupled to the driven portion 510A of the actuator 510 in any suitable manner (e.g., such as mechanical and/or chemical fasteners, welding, brazing, etc.) so that the actuator 511 is carried by and moves as a unit with the driven portion 510A. A wheel weight gripper 529 (which may be substantially similar in configuration to the wheel weight gripper 129P described above) is coupled to the driven portion 511A of the actuator 511 in any suitable manner (e.g., such as mechanical and/or chemical fasteners, welding, brazing, etc.) so that the wheel weight gripper 529 moves with the driven portion 511A.

Each actuator 510, 511 has a predetermined stroke (e.g., extension amount) to effect positioning a wheel weight 400 at one of the inner location 580 and outer location 581 with the robot 120 holding the wheel weight installation tool 129O at a predetermined retracted position location (see FIG. 5A). In some aspects, the wheel weight installation tool 129O is a binary wheel weight positioning mechanism where the predetermined stroke may be mechanically limited (e.g., such as by an end of stroke hard stop or contact with the wheel 111W) for placement at one or more of the locations 580, 581; while in other aspects the predetermined stroke may be controlled such as with any suitable controller 160, 160" controlling the drive portion 510D, 511D to effect, with an encoder or distance sensors of the drive (see FIG. 5A), any suitable predetermined extension distance of one or more of the actuators 510, 511 for placing wheel weights at one or more location including, but not limited to locations 580, 581. The predetermined retracted position location may be determined in any suitable manner so that a reference location (such as reference location 577—see FIG. 5A) of the wheel weight installation tool is located a predetermined distance 578 from the inner wheel lip 578 and a predetermined distance 579 from the surface 450S of the barrel 450. The reference location 577 may be a center point of the weight interface surface 420S of the flexible grip 420 (see FIG. 4A) of the wheel weight gripper 529 or any other suitable location of the wheel weight installation tool 129O that effects placement of the wheel weight gripper 529 in a known location.

As an example, referring also to FIGS. 1A and 1B, the predetermined retracted position location of the wheel weight installation tool 129O may be determined from data obtained by the one or more of the vision systems 130, 162 of the tire changing system 100 and/or the proximity sensor 129N (the proximity sensor being combined with or employed separately from the wheel weight installation tool 129O) that effects changing of the tire(s) 111T on the vehicle 110. To effect a tire change, one or more of the vision systems 130, 162 maps one or more sides of the vehicle 110 to identify the location of each wheel assembly 111 of the vehicle 110 and identify the tire size in a manner similar to that described in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety;

while in other aspects the proximity sensor 129N is employed as described herein for localization of the wheel assembly 111. The identification of the location of each wheel assembly 111 (within the tire changing station 101) and tire size informs the controller 160, 160" of a position (e.g., the substantially vertical plane) of the inner wheel lip for each wheel assembly 111 and a (vertical or height) position of the surface 450S of the barrel 450 with respect to the robot 120 coordinate system. With the positions of the inner wheel lip and surface 450S known, the controller 160 determines, in any suitable manner, the predetermined retracted position location of the wheel weight installation tool 129O (e.g., in the robot coordinate system) based on the positions of the inner wheel lip and surface 450S.

With the wheel weight installation tool 129O in the predetermined retracted position location (see FIG. 5A), the controller 160 effects actuation of one or more of the actuators 510, 511 for placement of a wheel weight 400 at the inner location 580 and the outer location 581 or any other suitable location that resolves and provides for a balancing solution of the one or more of the tire 111T, the wheel 111W, the bearings 111B, the brake components 111RD (e.g., including, but not limited, to the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B)). Here, the wheel assembly 111 is rotated in any suitable manner (e.g., through automation or manually with the wheel assembly 111 mounted to the vehicle 110) so that the angular (with respect to tire rotation) wheel weight placement location (as determined by any suitable wheel balancer such as those described in U.S. provisional patent application No. 63/354,591 titled "Autonomous Tire and Wheel Balancer and Method Therefor" and filed on Jun. 22, 2022, the disclosure of which was previously incorporated herein by reference in its entirety) is held substantially aligned with the predetermined retracted position location of the wheel weight installation tool 129O. As one example, the wheel weight installation tool 129O may be employed with the one or more wheel weight installation robot 120WR (see FIG. 1B) while the robot 120 rotates and holds the wheel assembly 111 with, e.g., the tire balancer 129M. As another example, the wheel weight installation tool 129O may be combined with the tire balancer 129M where the tire balancer rotates the wheel assembly 111 and holds the wheel assembly 111 for installation of the wheel weight 400. In still other examples, one actuator 126 of the robot 120 may rotate and hold the wheel assembly 111 while another actuator 126A of the robot 120 (see FIG. 1B) (or another robot 120) applies the wheel weight 400. In other aspects, the robot 120 may be employed with an off-the-car tire balancing machine 183 in a manner similar to that described herein for applying a wheel weight 400 with the wheel weight installation tool 129O to a wheel assembly 111 mounted on the tire balancing machine 183.

With the wheel weight installation tool 129O disposed at the predetermined retracted position location, the driven portion 510A of the actuator 510 has a stroke SR1 (FIG. 5B) that places the wheel weight gripper 529 (and the wheel weight 400 held thereby) at the outer location 581. With the wheel weight gripper 529 (and the wheel weight 400 held thereby) at the outer location 581, the robot 120 moves the wheel weight installation tool 129O in direction 499 so that the wheel weight 400 is pressed against the surface 450S of the barrel 450 of the wheel 111W in a manner similar to that described herein to affix or otherwise bond the wheel weight 400 to the surface 450S.

With the wheel weight installation tool 129O disposed at the predetermined retracted position location, the driven portion 510A of the actuator 510 has a stroke SR1, and the driven portion 511A of the actuator 511 has a stroke SR2 (FIG. 5C), that when combined places the wheel weight gripper 529 (and the wheel weight 400 held thereby) at the inner location 580. With the wheel weight gripper 529 (and the wheel weight 400 held thereby) at the inner location 580, the robot 120 moves the wheel weight installation tool 129O in direction 499 so that the wheel weight 400 is pressed against the surface 450S of the barrel 450 of the wheel 111W in a manner similar to that described herein to affix or otherwise bond the wheel weight 400 to the surface 450S.

In one or more aspects, the wheel weight installation tool 129O provides for binary control of the wheel weight 400 position and application of wheel weights 400 at the most commonly employed wheel weight positions of standardized wheels 111W (e.g., the inner location 580 and the outer location 581 of the wheel 111W). In one aspect, the strokes SR1, SR2 of the actuators 510, 511 are such that the wheel weight 400 may be positioned at the inner location 580 and the outer location 581 within a predetermined tolerance for standardized wheels having different widths. For example, different wheel weight installation tools 129O, 129OA-129On may be provided, where each wheel weight installation tool 129O effects wheel weight installation for a respective range of wheel widths. For example, one wheel weight installation tool 129O effects wheel weight installation for wheel widths ranging from about 152.4 mm (about 6 inches) to about 228.6 (about 9 inches), another wheel weight installation tool 129O effects wheel weight installation for wheel widths ranging from about 241.3 mm (about 9.5 inches) to about 304.8 mm (about 12 inches), etc. (noting that the gradation of ranges may be any suitable gradation and those gradations provided herein are for exemplary purposes only). The strokes SR1, SR2 of the actuators 510, 511 are limited in any suitable manner such as by stops built into the respective actuators and/or through contact with the wheel 111W. In other aspects, the strokes SR1, SR2 of the actuators 510, 511 are such that the wheel weight 400 may be positioned at the inner location 580 and the outer location 581 regardless of the wheel assembly 111 build (e.g., regardless of wheel width). Here, the stroke SR1 of the actuator 510 is such that, with the wheel weight installation tool 129O disposed at the predetermined retracted position location, the wheel weight gripper 529 (and the wheel weight 400 held thereby) is positioned at the outer location 581 (about 25.4 cm (about 1 inch) from the inner wheel lip although in other aspects placement may be more or less than about 25.4 mm (about 1 inch)). The stroke SR2 of the second actuator 511 is such that extension of the driven portion 511A is stopped when the wheel weight installation tool 129O contacts the back of the wheel flange so that contact between the wheel weight installation tool 129O the back of the wheel flange locates the wheel weight gripper 529 (and the wheel weight 400 held thereby) at the inner location 580. As may be realized, the wheel weight installation tool 129O provides for binary placement of wheel weights 400 on a wheel 111W substantially without feedback, vision systems, or measurement (e.g., wheel width measurement) of the wheel 111W. In other aspects, as described herein, the wheel weight installation tool provides for placement of wheel weights are locations that include but are not limited to locations 580, 581.

Figure 6A:
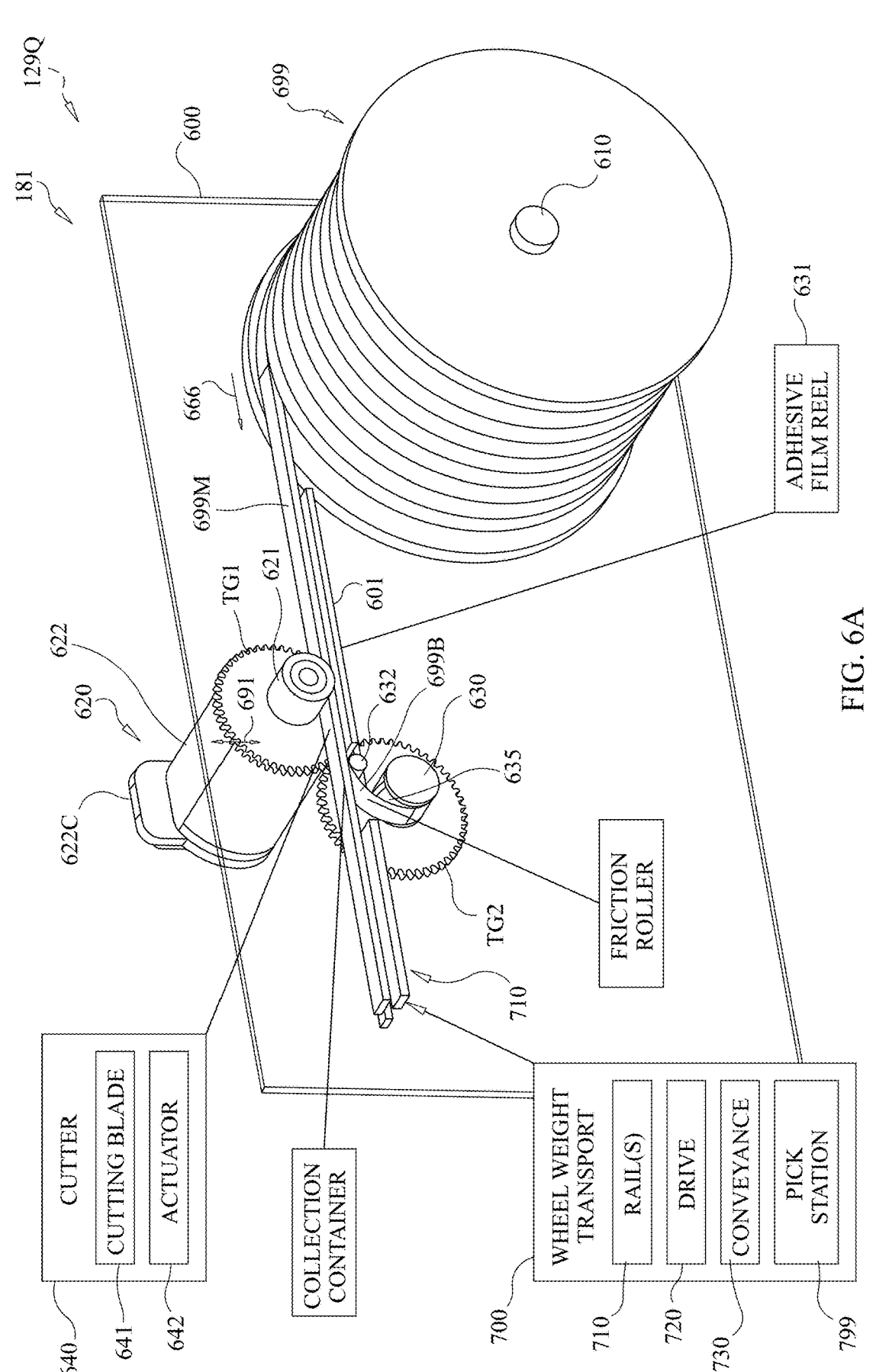
FIG. 6A is a schematic illustration of a wheel weight dispenser and wheel weight transport of the automated tire changing system of FIGS. 1A and 1B in accordance with the present disclosure.

Referring to FIGS. 1A, 1B, and 6A, wheel weights 400 are provided to the wheel weight gripper 129P and/or the wheel weight installation tool 129O by a wheel weight dispenser 129Q, 181. The wheel weight dispenser is located at any suitable location of the at least one tire changing station 101. The wheel weight dispenser may be provided as stand-alone wheel weight dispenser 181, as a tool (see wheel weight dispenser 129Q) that is coupled to the end effector 128 of a robot 120 (in any suitable manner) or carried (in any suitable manner) by a wheel weight installation robot 120WR, or integrated/combined with another tool 129A-129P.

The wheel weight dispenser 129Q, 181 includes a frame 600 having a spindle or bobbin 610 on which a roll of adhesive wheel weight(s) 699 is supported. Suitable examples of wheel weight material that may be employed with aspects of the disclosure include, but are not limited to, the 3M™ adhesive backed wheel weight rolls provided by the 3M Automotive and Aerospace Solutions Division located in Minnesota USA and the Stickpro™ adhesive wheel weight rolls provided by Plombco located in Quebec Canada.

A rail 601 is coupled to the frame so as to receive and support wheel weight material 699M unspooled from the roll of adhesive wheel weight(s) 699. A wheel weight indexer 620 is coupled to the frame 600. The wheel weight indexer 620 includes a motor 622 and a roller 621, where the motor drives rotation of the roller 621. The roller 621 is positioned on the frame 600 so as to contact the wheel weight material 699M supported on the rail 601 so that rotation of the roller 621 drives the wheel weight material 699M along the rail 601 in direction 666 and unspools the wheel weight material 699M from the roll of adhesive wheel weight(s) 699. The roller 621 has any suitable configuration for contacting and engaging the wheel weight material 699M. For example, the roller 621 may be a friction roller that is biased towards the rail 601 in any suitable manner (e.g., a spring, under the weight of the wheel weight indexer 620, etc.) and against the wheel weight material 699M for driving and unspooling the wheel weight material 699M in direction 666, while in other aspects the roller 621 and the wheel weight indexer 620 may have any suitable configuration for gripping and driving the wheel weight material 699M in direction 666.

The wheel weight dispenser 129Q, 181 also includes a cutter 640 configured to cut the wheel weight material 699M into predetermined segments corresponding to a desired amount (e.g., ounces or grams) of weight to be applied to a wheel assembly 111 for balancing of the wheel assembly 111. The cutter 640 is coupled to the frame 600 in any suitable manner and includes an actuator 642 that drives a cutting blade 641 in direction 691 for cutting the wheel weight material 699M. The cutting blade 641 is disposed adjacent the roller 621 to cut the wheel weight material 699M that is driven by and past the roller 621 as described herein.

The motor 622 includes any suitable motor controller 622C that is communicably coupled to a controller of the tire changing system 100 (such as of the robot 120, tire balancing machine 183, tire balancer 129M, etc.) so that a desired amount of weight for balancing the wheel assembly 111 (as determined by one or more of the tire balancers 129M, 183) is communicated to the motor controller 622C. The motor 622 may be a stepper motor and/or include any suitable encoders so that, with a known diameter of the roller 621, the motor controller 622C operates the motor 622 to dispense or otherwise drive a length of wheel weight material 699ML past the roller 621, where the length of wheel weight material 699ML corresponds to the desired amount of wheel weight for balancing the wheel assembly 111.

Figure 6B:
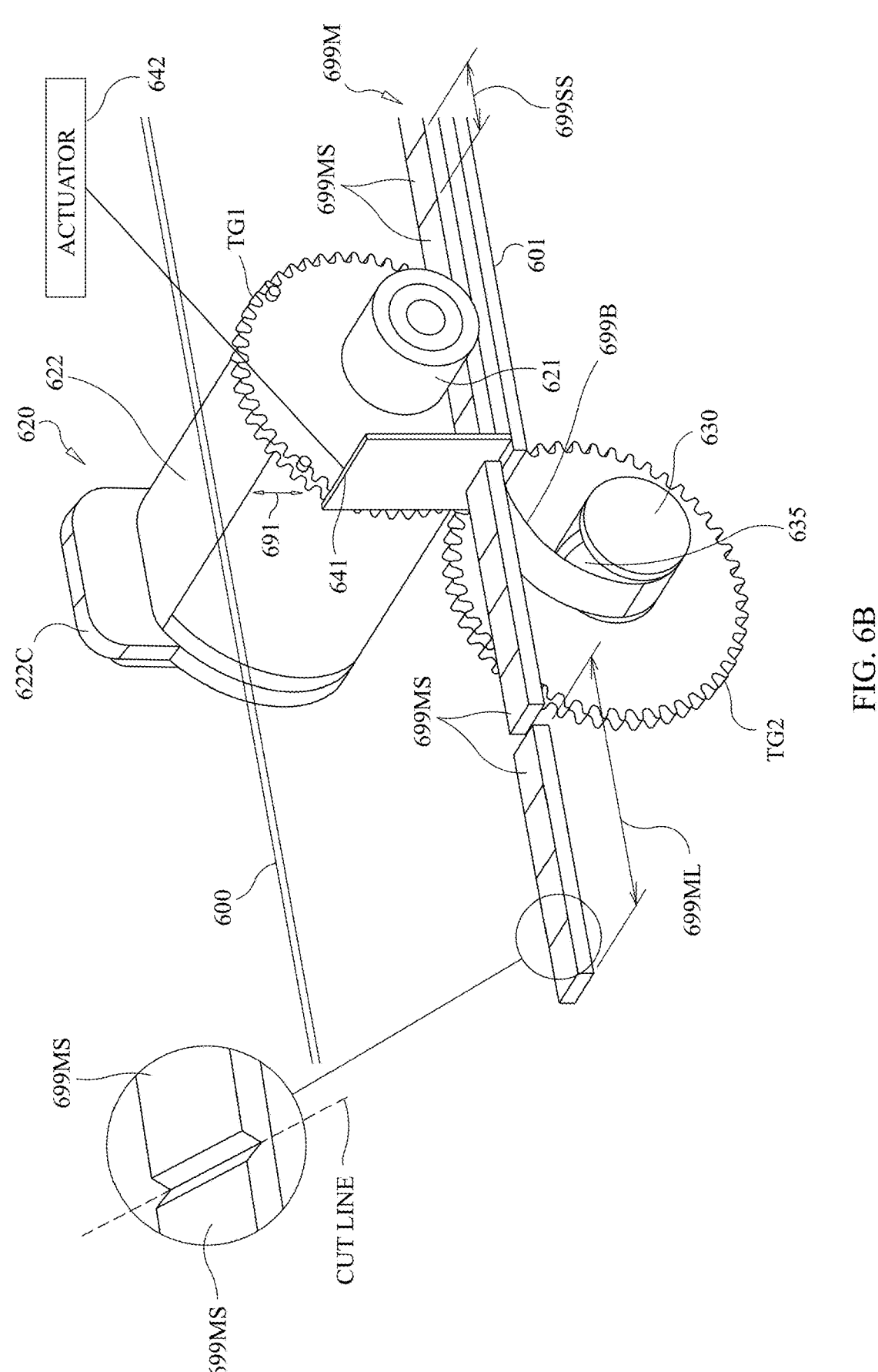
FIGS. 6B and 6C are schematic illustrations of a portion of the wheel weight dispenser of FIG. 6A in accordance with the present disclosure.
Figure 6C:
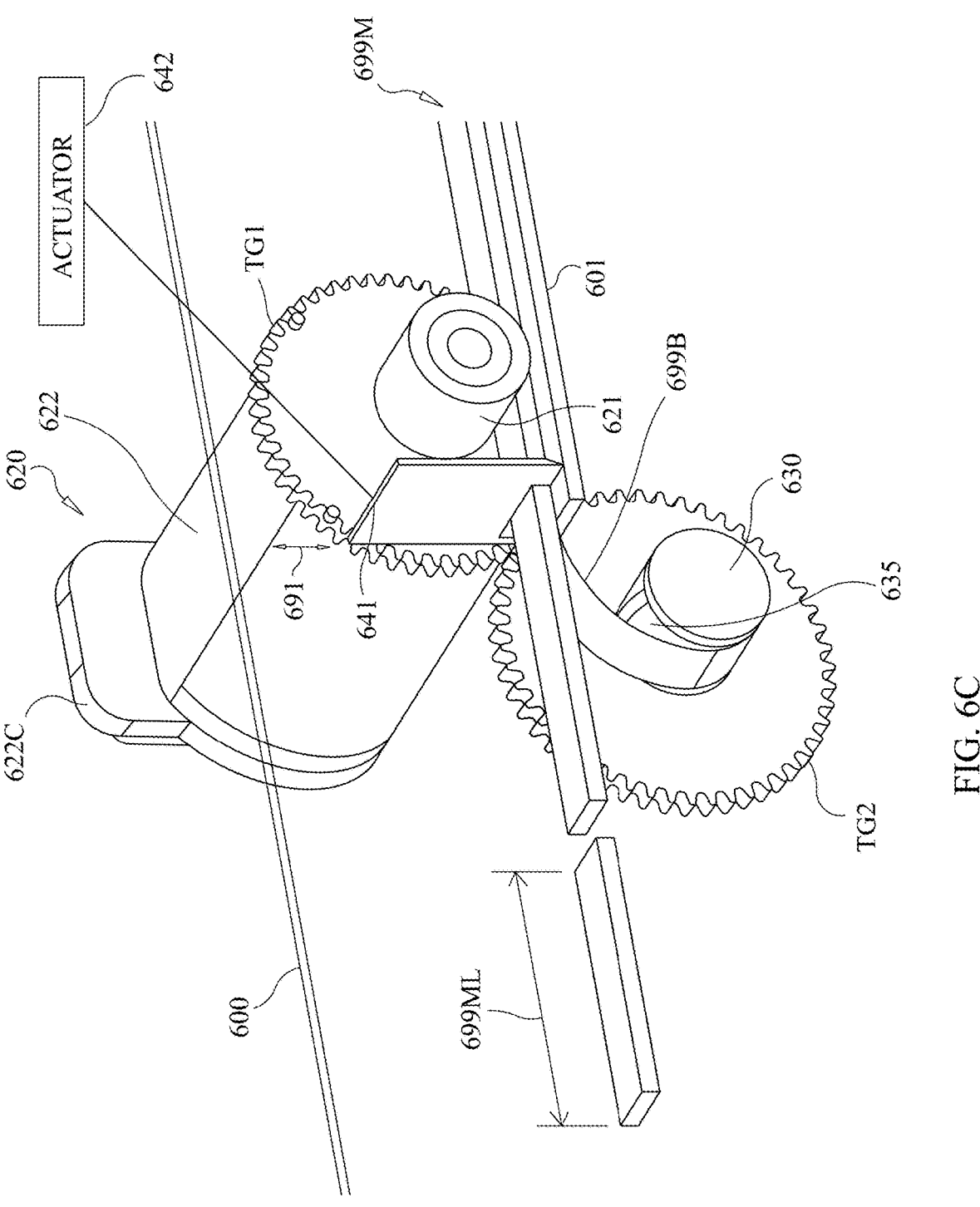

[1] Referring also to FIG. 6C, where the wheel weight material 699M is unsegmented any desired amount of wheel weight material 699M may be dispensed past the roller and cut by the cutting blade 641 to match the desired amount of wheel weight. As can be seen in FIG. 6C, unsegmented wheel weight material 699M is driven past the roller so that a predetermined length 699ML of the wheel material is located downstream (relative to the roller 621 and direction 666 of travel of the wheel weight material 699M) of the cutting blade 641. The cutting blade 641 is lowered by the actuator 642 against the rail 601 to cut the predetermined length 699ML of wheel weight material 699ML.

Referring also to FIG. 6B, where the wheel weight material 699M is segmented, each segment 699MS is of a predetermined weight common to all of the segments 699MS of the roll 699 and of a predetermined length 699SS common to all of the segments of the roll 699. The controller 622C is configured to drive the wheel weight material 699M by incremental distances substantially equal to the segment length 699SS so that a number of segments 699MS are dispensed downstream of the cutting blade 641, where the number (e.g., one or more) of segments 699MS (e.g., the predetermined length of wheel weight material 699ML) is substantially equal to the desired amount of wheel weight. Here, the incremental distance, which the wheel weight material is driven, maintains substantial alignment between the cutting blade 641 and cut lines that are scribed between and delineate one segment 699MS from another adjacent segment 699MS. With the desired number of segments 699MS disposed downstream of the cutting blade 641, the cutting blade 641 is lowered by the actuator 642 against the rail 601 to cut the predetermined length of wheel weight material 699ML.

The wheel weight dispenser 181, 129Q includes a take up spool 630 coupled to the frame 900 and configured in any suitable manner to peel the adhesive backing 699B from the wheel weight material 699M and spool the adhesive backing 699B onto a roll 635 for disposal. An adhesive film real 631 may be coupled to the frame 600 and include roller(s) 632 that press an adhesive film (e.g., unrolled from the adhesive film reel) against the adhesive backing 699B of the wheel weight material 699M so that the adhesive film adheres to the adhesive backing 699B. The adhesive film may be wound/wrapped around the roll 635 so that as the adhesive film is redirected by the roller 632 from being pressed against the wheel weight material 699M to the roll 635, the adhesive film peels a leading edge of the adhesive backing 699B from the wheel weight material 699M so as to peel the adhesive backing 699B from the wheel weight material 699M and spool the adhesive film with the adhesive backing 699B adhered thereto around the roll 635. The take up spool 630 (and the adhesive film reel) is driven in rotation by the motor 622 simultaneously with and at the substantially the same rate as the roller 621. As an example, the motor 622 includes an output on which output the roller 621 is mounted. Any suitable transmission couples the output of the motor 622 to a drive shaft of the take up spool 630. As illustrated in FIG. 6A, the transmission includes a pair of gears TG1, TG2. The gear TG1 is coupled to the output of the motor 622 and rotates as a unit with the roller 621. The gear TG2 is coupled to the drive shaft of the take up spool 630 so as to rotate as a unit with the take up spool 630. The gears TG1, TG2 are meshed with each other so that as the roller 621 rotates to drive the wheel weight material 699M in direction 666, the take up spool 630 also rotates to take up the adhesive backing 699B peeled from the wheel weight material 699M at the same rate the wheel weight material is advanced by the roller 621. While the transmission is described as including gears TG1, TG2, the transmission may have any suitable configuration (e.g., gears, belts and pulleys, chains and sprockets, etc.) that effects the simultaneous and same rate rotation of the roller 621 and take up spool 630. As may be realized, rotation of the adhesive film reel may be driven by/controlled with a gear of the above-mentioned transmission where the gear is meshed with gear TG1, meshed with the gear TG2, or driven by one or gear TG1, TG2 via an idler gear. The take up spool 630 may include any suitable tensioning device, clutch or other tensioning/slipping device that effects peeling of the adhesive backing 699B substantially without ripping/tearing the adhesive backing 699B or otherwise stopping the functioning of wheel weight dispenser. In other aspects, the adhesive backing 699B may be removed from the wheel weight material 699M with a friction-based system such as a friction roller (see FIG. 6A). In still other aspects, the adhesive backing 699B removed from the wheel weight material 699M may be directed (e.g., in any suitable manner such as by rollers, gravity, etc.) into a collection or waste container (see FIG. 6A) or is otherwise removed from the wheel weight material 699M then unmanaged.

As illustrated in FIG. 6A, the cut lengths of wheel weight material 699ML are dispensed onto a wheel weight transport 700 configured to transport the cut lengths of wheel weight material 699ML to a pick station 799 (see FIGS. 7B and 8B) accessible by the wheel weight gripper 129P and/or the wheel weight installation tool 129O. The wheel weight gripper 129P and/or the wheel weight installation tool 129O picks the cut lengths of wheel weight material 699ML from the pick station 799 for coupling the cut length of wheel weight material 699ML to a wheel 111W as described herein.

Where, the wheel weight dispenser (e.g., wheel weight dispenser 129Q) is carried by the robot 120 or wheel weight installation robot 120WR the wheel weight transport 700 and wheel weight dispenser 129Q may be coupled to the frame 566 of the wheel weight installation tool 129O so as to position the a cut length of wheel weights 699ML (referred to herein as a wheel weight 400) at the retracted position of the wheel weight gripper 529 (here, another degree of freedom may be provided on the wheel weight dispenser to provide relative movement between the wheel weight gripper 529 and a wheel weight 400 disposed at the pick station 799 and effect picking of the wheel weight 400 by the wheel weight gripper 529 from the pick station 799). In other aspects, the wheel weight dispenser and wheel weight transport 700 may be carried by one robot 120 or robot actuator 126 while the wheel weight gripper 129P or wheel weight installation tool 129O is carried by another robot 120 or robot actuator 126A so that the pick station 799 is accessible by the wheel weight gripper 129P or wheel weight installation tool 129O.

Where a stationary wheel weight dispenser (e.g., wheel weight dispenser 181) is employed, the wheel weight transport 700 may receive the wheel weight 400 from the wheel weight dispenser 181 and transport the wheel weight 400 to any suitable location of the tire changing station 101 that is accessible by the wheel weight gripper 129P and/or the wheel weight installation tool 129O. The wheel weight transport 700 may be configured so that a single wheel weight dispenser 181 provides wheel weights to (i.e., is common to) multiple pick stations 799 (see FIG. 799) or a single pick station. There may be one or more wheel weight dispenser(s) 181 (see FIG. 2A) where each wheel weight dispenser feeds a respective wheel weight transport 700 having one or more pick stations 799.

Referring to FIGS. 1A, 1B, 6A, 7A-7F, and 8A-8C, the wheel weight transport 700 includes rail(s) 710, a conveyance 730, a drive 720, and the pick station 799. In the example illustrated, the rail(s) 710 may include opposing rails 710A, 710B each having a weight support surface 711. The rails 710A, 710B may or may not include a respective weight guide surface 712. The rails 710A, 710B are spaced apart from each other by any suitable distance or gap 770 so as to support the wheel weight 400 but span the adhesive 699A (see FIG. 7C). In other aspects, there may be a single rail 710C (see FIG. 8C) that may or may not include weight guide surfaces 712. The wheel weight 400 slides along the rails 710A, 710B, 710C in sliding contact with the rails 710A, 710B, 710C or the wheel weight 400 may be disposed on a platen 400P that slides along the rail(s) and on which the wheel weight 400 is carried. In some aspects, the adhesive backing 699B may be stripped from the adhesive 699A of the wheel weight 400 (in a manner similar to that described above with respect to the FIGS. 6A-6C) at a pick station 799 of the wheel weight transport 700 (e.g., the pick station includes the adhesive film reel 631 roller 632, spool 630, and roll 635); while in other aspects, the adhesive backing 699B is stripped from the adhesive 699A of the wheel weight 400 prior to conveyance of the wheel weight 400 by the wheel weight transport 700 as described herein with respect to FIGS. 6A-6C. Where the wheel weight is conveyed with the adhesive backing 699B removed, the adhesive 699A may be disposed in a gap 770 between the rails 710A, 710B or a above/within a recess 770A of the platen 400P.

The rails 710A, 710B, 710C may have one or more of linear portions (see FIG. 7A) and curved portions (see FIG. 7D) that transport the wheel weight 400 to any suitable location of the tire changing station 101. In one aspect, the weight guide surface 712 of the rails 710A, 710B maintains alignment of the wheel weight 400 (and platen 400P where the wheel weight 400 is disposed on the platen 400P for transport) with the direction of travel 666 along the rails 710A, 710B (e.g., the wheel weight 400 is aligned so that the wheel weight 400 and/or platen 400P travels with its longitudinal axis substantially aligned with the direction of travel, where the longitudinal axis is generally a longest length of the weight and/or platen). In another aspect, one or more of the rails 710A, 710B include a respective array of magnets 710AR that are arrayed along the length of the respective rail 710A, 710B or is constructed of a magnetic material so that a magnetic coupling between one or more of the rails 710A, 710B and one or more of the wheel weight 400 and platen 400P maintains alignment of the wheel weight 400 with the direction of travel 666. In still other aspects, one or more of the rails 710A, 710B includes both the weight guide surface 712 and the array of magnets 710AR/magnetic material where a combination of contact between the wheel weight 400 and or platen 400P and the weight guide surface 712 and the magnetic coupling between the wheel weight 400 and/or platen 400P and the rail(s) 710A, 710B maintains alignment of the wheel weight 400 and/or platen 400P with the direction of travel 666. In other aspects, the platen 400P includes a magnet where the wheel weight 400 is aligned to the platen 400P via the magnet and the platen 400P is mechanically aligned to the rails 710A, 710B. In still other aspects, the wheel weight 400 may be mechanically aligned to the rails 710A, 710B in any suitable manner, such as by clips, slots, etc.

The conveyance 730 is any suitable conveyance configured to convey the wheel weight 400 along the rails 710A, 710B. The conveyance 730 may be for example, a belt 730B, a chain 730C, or any other suitable conveyance. Where the conveyance is a belt 730 or chain 730C the belt 730B may be an articulated belt having articulated links 730AL (see FIG. 7D) that configured the belt 730B to round corners formed by the curved portions of the rails 710A, 710B. The conveyance 730 is driven by any suitable drive 720 (including a motor and suitable transmission such as gears, sprockets, pulleys etc.). As another example, the conveyance 730 may be a linear motor 730M (which has an integral drive). The linear motor includes an electromagnetic driver track 730EMT and a carrier 730EMC. The carrier 730EMC may form the platen 400P (or otherwise drive the platen 400P) on which the wheel weight 400 is carried and may be magnetically levitated by and driven along the electromagnetic driver track 730EMT, while in other aspects, the carrier 730EMC (forming the platen 400P or otherwise driving the platen 400P as described herein) travels on rails and is driven by and along the electromagnetic driver track 730EMT.

In one or more aspects, the conveyance includes one or more of drive tabs 730T (see FIGS. 7A, 7B, 7D, 7E, and 7F) that engage and push the wheel weight 400 and/or platen 400P along the rail(s) 710A, 710B, 710C with movement of the conveyance 730 in direction 777. In other aspects, the conveyance includes magnetic portions 730M that form a magnetic coupling with the wheel weight 400 and/or platen 400P, where the magnetic coupling pulls the wheel weight 400 and/or platen 400P along the rail(s) 710A, 710B, 710C with movement of the conveyance 730 in direction 777. In still other aspects, the conveyance may include both tabs 730T and magnetic portions 730M that complement each other to push and/or pull the wheel weight 400 and/or platen 400P along the rail(s) 710A, 710B, 710C.

Figure 7A:
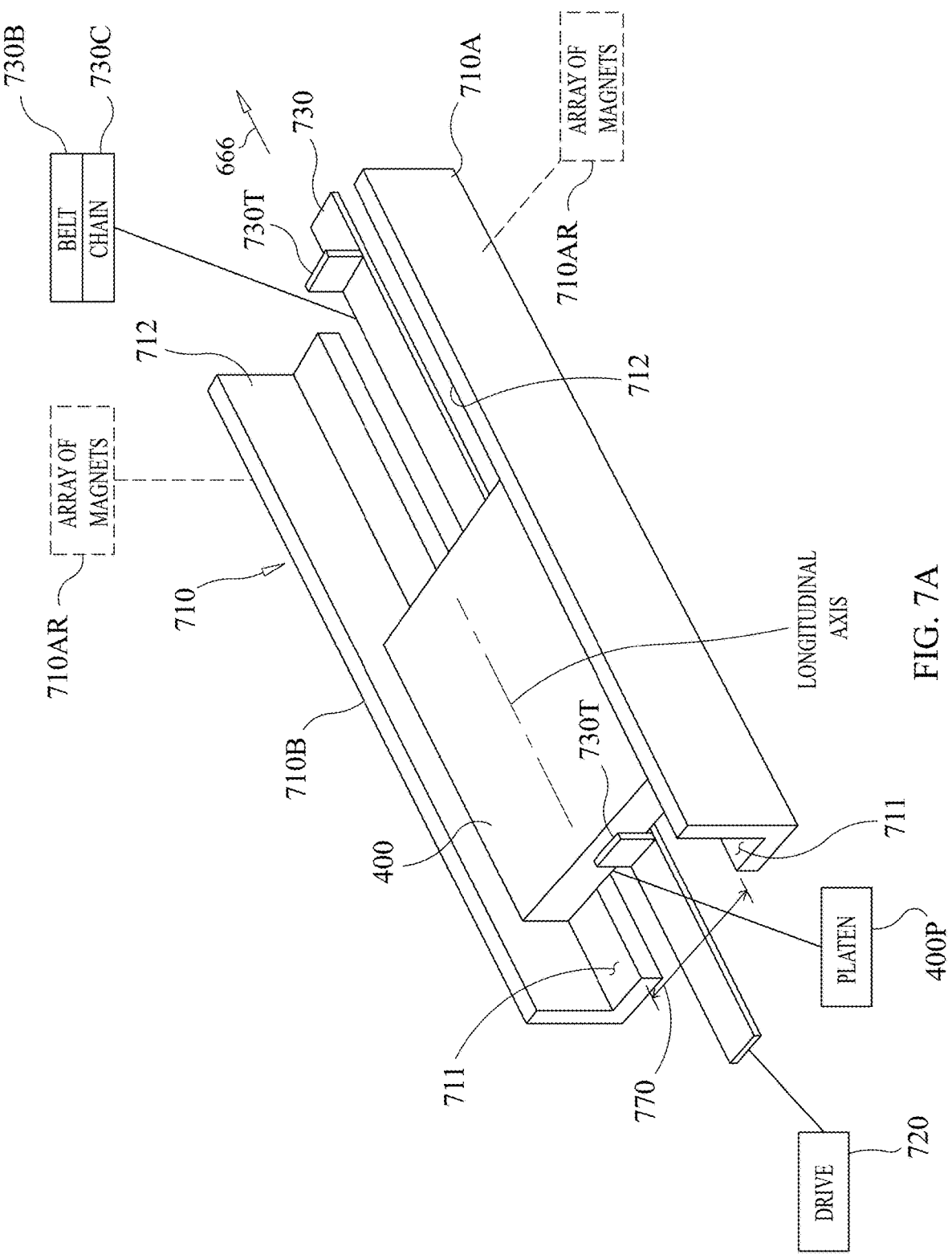
FIGS. 7A-7F are schematic illustrations of portions of the wheel weight transport of FIG. 6A in accordance with the present disclosure.
Figure 7B:
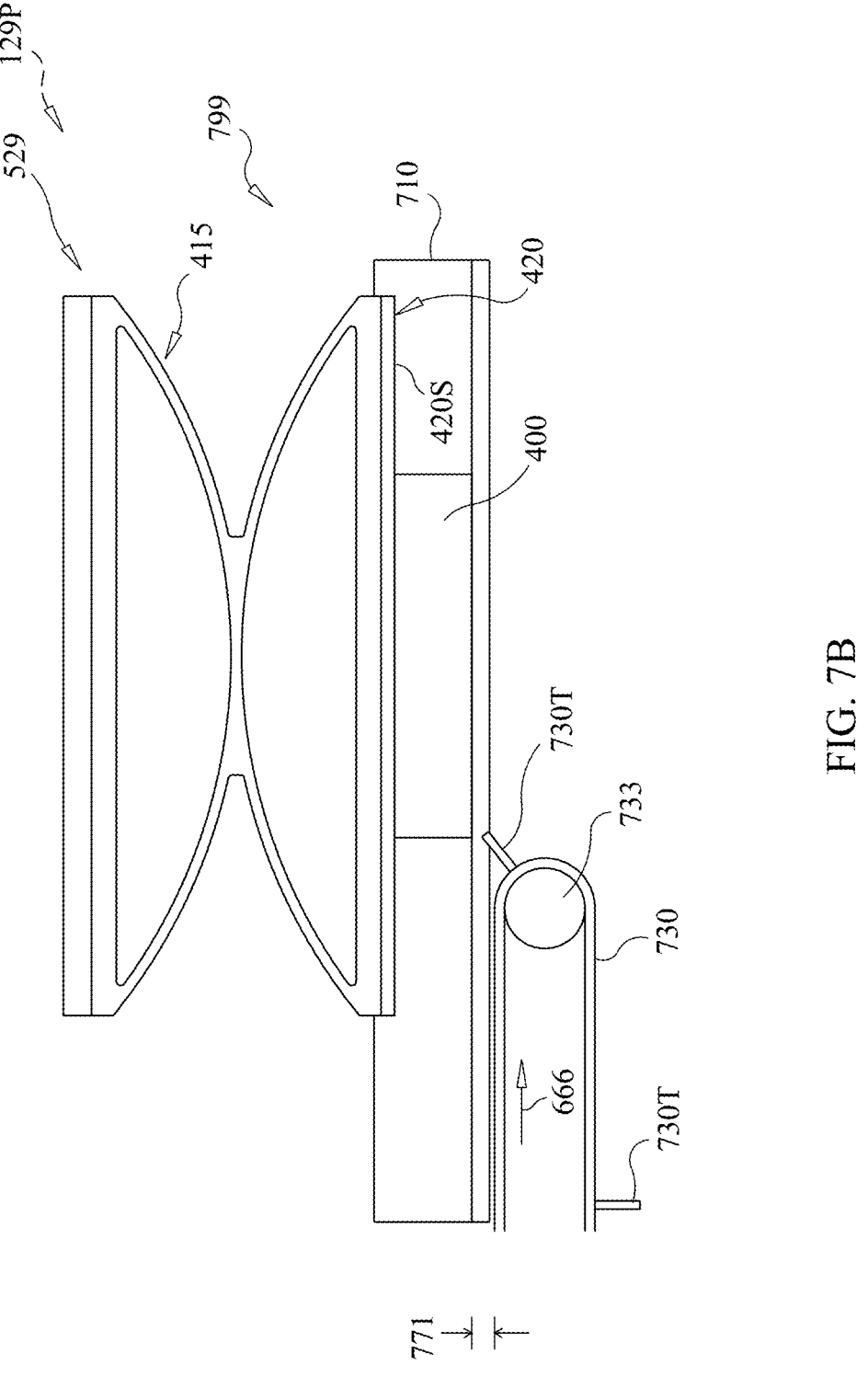
Figure 7C:
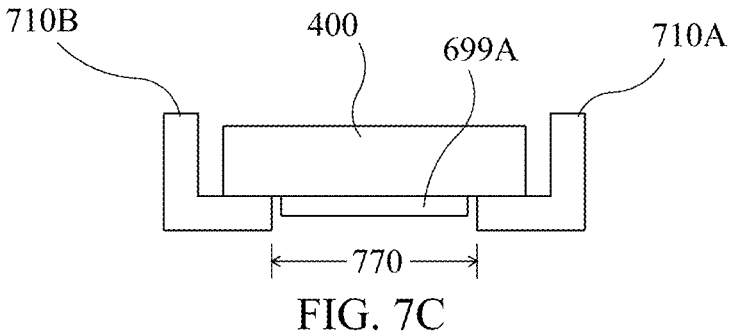
Figure 7D:
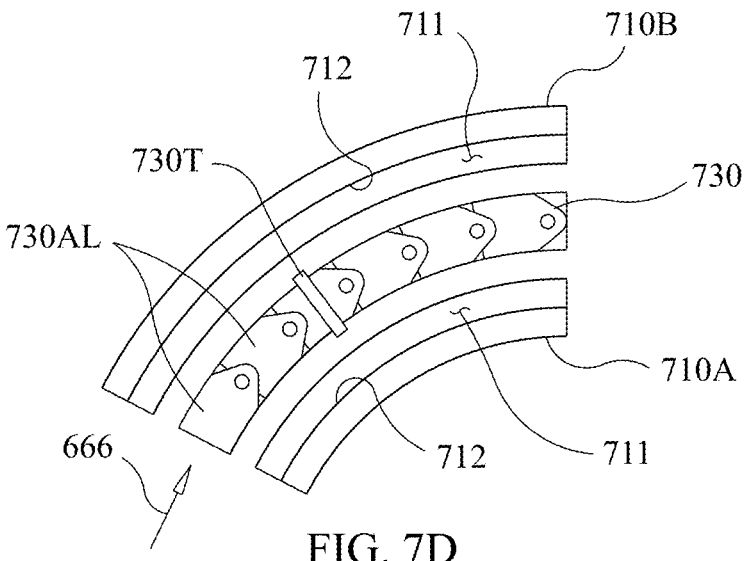
Figure 7E:
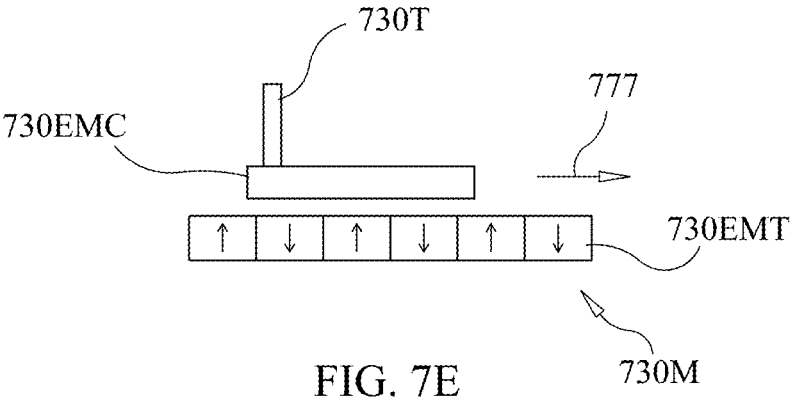
Figure 7F:
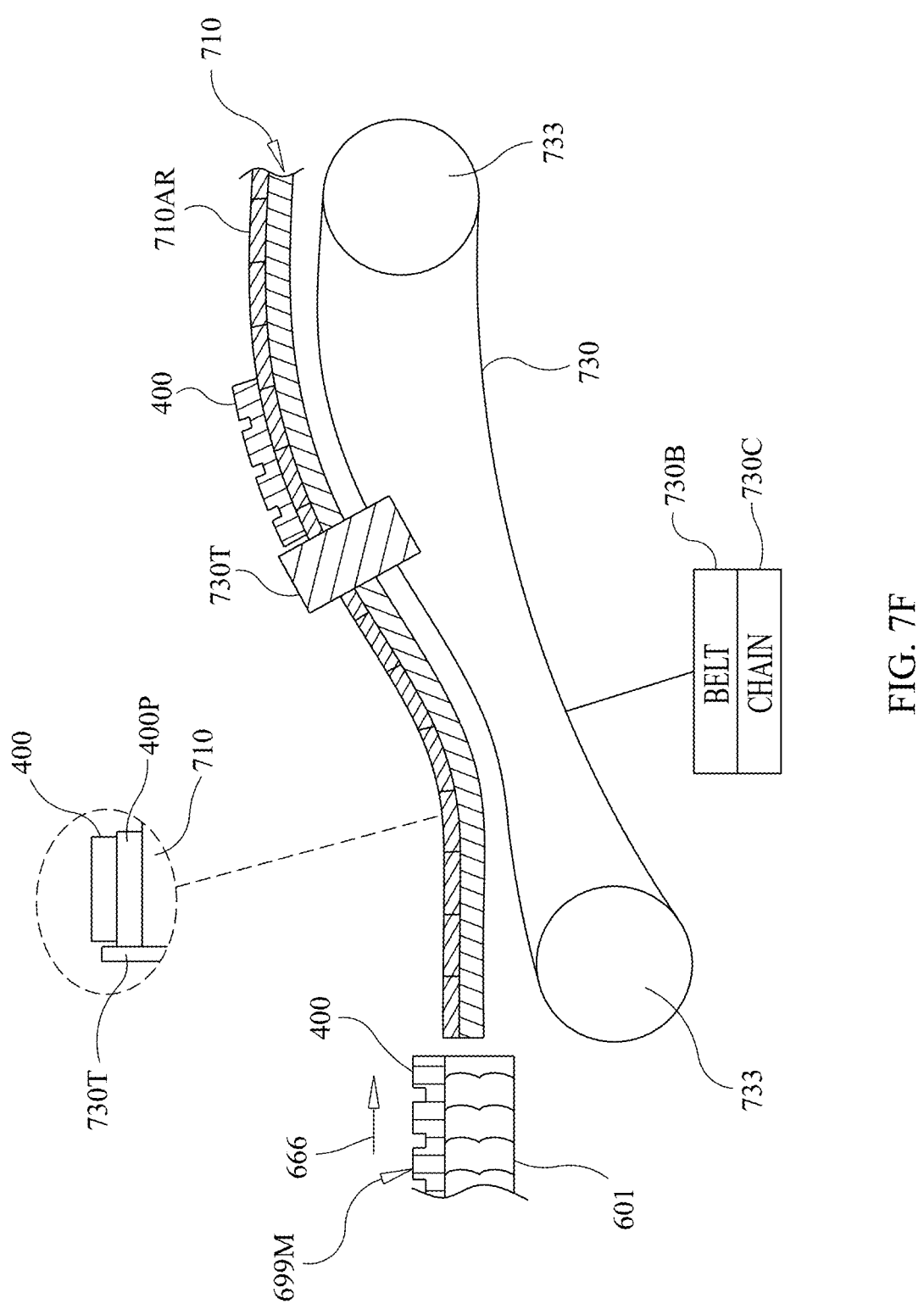
Figure 8A:
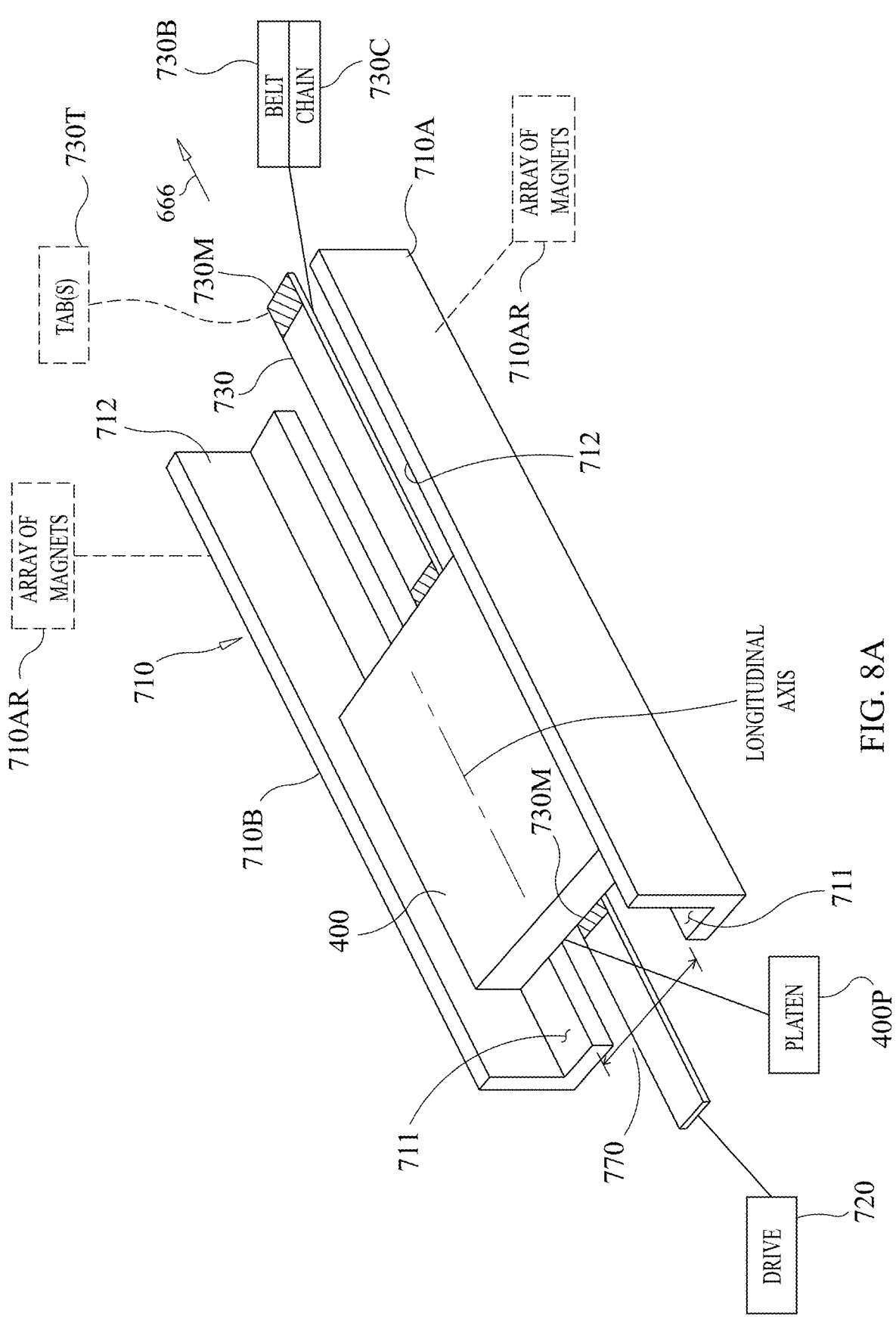
FIGS. 8A-8C are schematic illustrations of portions of the wheel weight transport of FIG. 6A in accordance with the present disclosure.
Figure 8B:
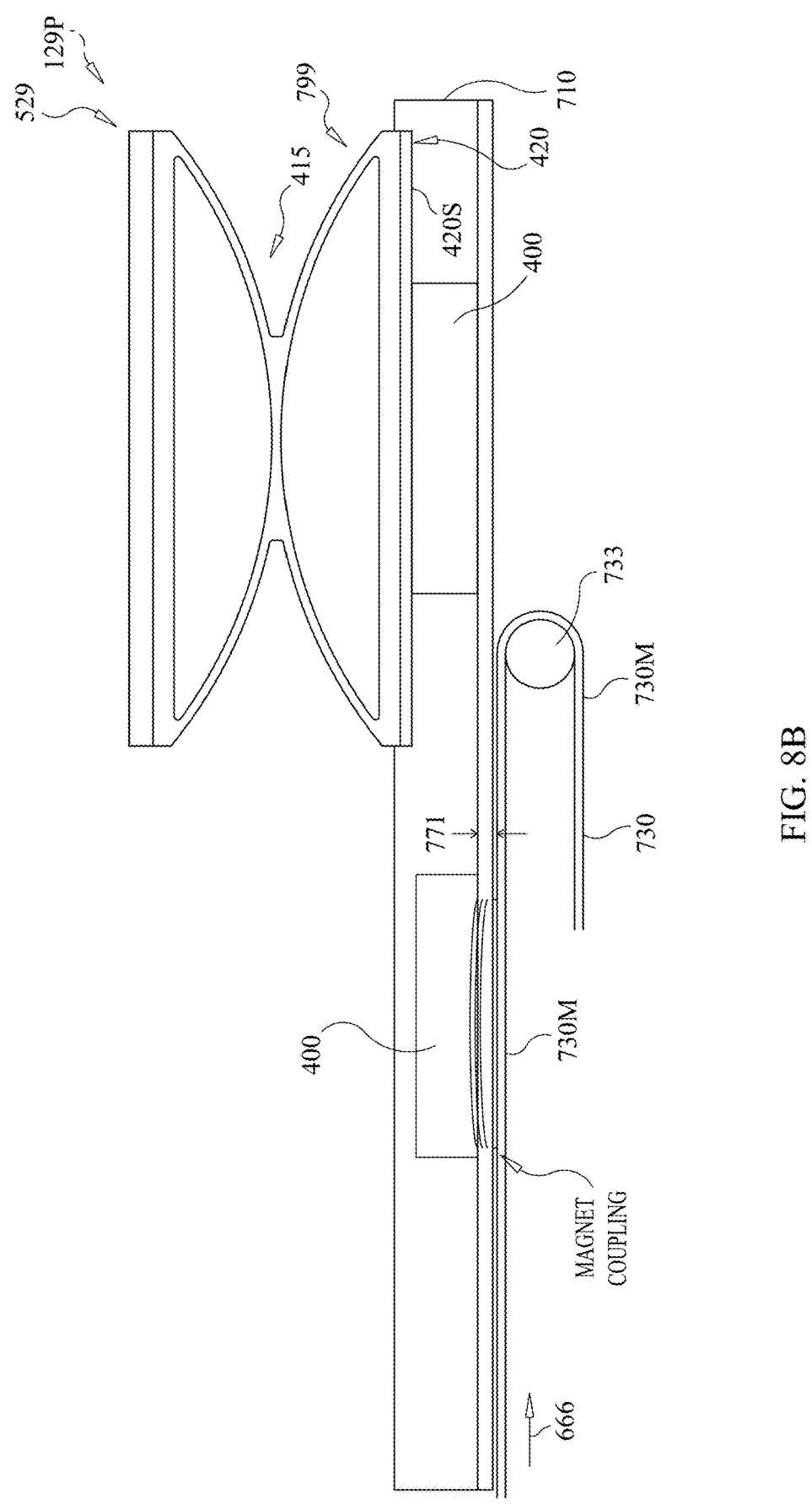
Figure 8C:
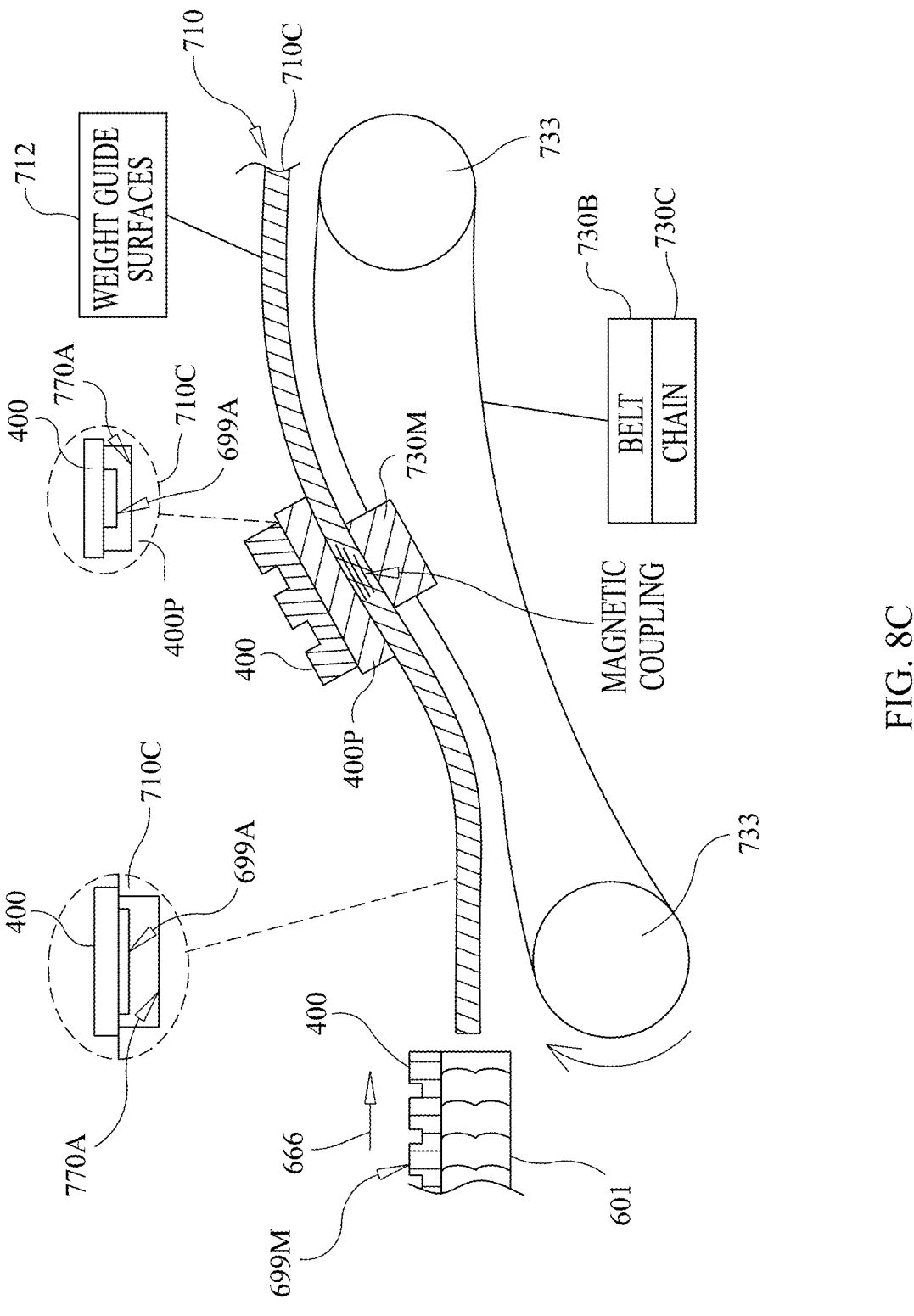

The pick station 799 is formed by a portion of the rail(s) 710A, 710B, 710C downstream from a terminus of the conveyance 730 (see FIGS. 7B and 8B). The conveyance 730 an "endless" conveyance (see FIGS. 7B, 7F, 8B, and 8C) that recirculates itself to convey one or more wheel weights 400 to the pick station 799. In the example illustrated, the conveyance 730 is redirected for recirculation by one or more rollers 733 (or a sprocket, pulley, etc.) where, as the tab 730T and/or magnetic portion 730M travels around the roller 733 the tab 730T and/or magnetic portion 730M disengages from the wheel weight so that the wheel weight 400 is positioned at the pick station 799.

Figure 10:
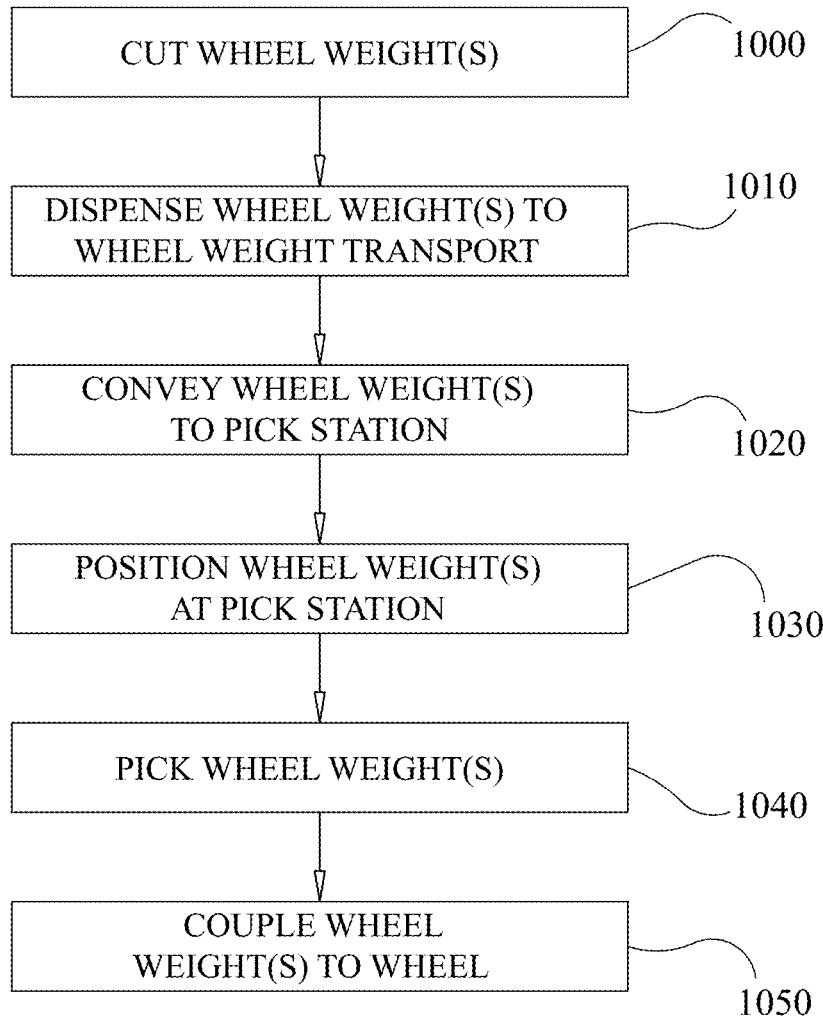
FIG. 10 is a flow diagram of a wheel weight installation method of the automated tire changing system of FIGS. 1A and 1B in accordance with the present disclosure.

In operation, referring also to FIG. 10, the wheel weight dispenser 181, 129Q cuts a length of wheel weights 699ML in accordance with a desired amount of wheel weights to effect balancing a wheel assembly (FIG. 10, Block 1000). The wheel weight dispenser 1181, 129Q pushes the cut length of wheel weights 699ML (e.g., the wheel weight 400 is dispensed) onto the rails 710 (FIG. 10, Block 1010). With the conveyance 730 being driven by the drive 720, a tab 730T and/or magnetic portion 730M couples with the wheel weight 400 and conveys the wheel weight along the rails 710 to the pick station 799 (FIG. 10, Block 1020). At the pick station 799, the tab 730T and/or magnetic portion 730M disengages/decouples from the wheel weight 400 effecting positioning of the wheel weight 400 at the pick station 799 (FIG. 10, Block 1030). The wheel weight 400 is picked from the pick station 799 (FIG. 10, Block 1040) by the wheel weight gripper 129P or the wheel weight installation tool 129O in the manner described herein and the wheel weight 400 is affixed/coupled to the surface 450S of the barrel 450 of the wheel 111W (FIG. 10, Block 1050) as described herein.

Referring to FIGS. 1A, 1B, 9A, 9B, and 9C, the proximity sensor 129N is coupled to the end effector 128 of the robot 120, 120WR in any suitable manner so that the proximity sensor 129N is positioned to interface with the surfaces of the wheel assembly 111W closest to the centerline of the vehicle such as the surface ILS of the inner wheel lip and the sidewall 111TS of the tire 111T, although in other aspects the proximity sensor may interface with any suitable surface(s) of the wheel assembly 111. The proximity sensor 129N is any suitable sensor including, but not limited to, one or more of a contact sensor (such as a limit switch or other suitable contact sensor), optical sensor, and ultrasonic sensor, where the proximity sensor (via movement of the bot 120) resolves the predetermined location of the tire-wheel assembly relative to the reference frame RREF of the bot 120.

As described above and in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety, the position and diameter of the tire 111T may be known to the controller 160 from one or more of the vision systems 130, 162. Here, the one or more vision systems 130, 162 may be employed in combination with the proximity sensor to resolve the predetermined location of the tire-wheel assembly relative to the reference frame RREF of the bot 120, the one or more vision systems 130, 162 alone may be employed to resolve the predetermined location of the tire-wheel assembly relative to the reference frame RREF of the bot 120, or the proximity sensor 129N alone may be employed to resolve the predetermined location of the tire-wheel assembly relative to the reference frame RREF of the bot 120.

Where the proximity sensor 129N is employed to, at least in part, resolve the predetermined location of the tire-wheel assembly relative to the reference frame RREF of the bot 120 the proximity sensor 129N is moved by the bot 120 in one or more degrees of freedom so as to sense or otherwise detect the vehicle 110.

With reference to the proximity sensor 129N being an optical sensor, the optical sensor may be a line scan sensor, a camera, a beam sensor or any other suitable optical sensor. The optical sensor may be moved to detect one or more predetermined features of the vehicle 110 (such as bumpers, wheel wells, etc.) that effect localization of a wheel assembly 111.

In some aspects, datum features 266 may be attached (such as by an operator) to the vehicle 110 or to the frame 189F adjacent the vehicle at predetermined locations relative to the vehicle 110, where the datum features resolve a location of the wheel assembly 111 relative to the reference frame RREF of the bot 120. As an example, where the proximity sensor is a line scan or beam sensor, one or more datum features 266 may be placed (with a vertical or horizontal orientation depending on the structural configuration of the proximity sensor 129N mount to the bot 120) in any suitable manner along a line that has a known position relative to the reference frame RREF of the bot 120 (see FIG. 2B). The datum features 266 may be placed adjacent (e.g., substantially aligned with a center of) a wheel assembly 111, and the bot 120 moves the proximity sensor 129N along the line so as to detect the datum feature 266. The datum feature includes any suitable pattern (e.g., optical pattern, raised features, etc.) that is detected by the optical sensor, where when the pattern is detected the bot 120 (via the controller 160, 160") correlates the location of the datum feature 266 (and the wheel assembly 111 to which the datum feature is aligned) to the reference frame RREF of the bot 120. Knowing the location of the wheel assembly 111 along the traverse path 299 (via detection of the datum feature 266), the bot 120 may move the beam sensor to a position so as to sense the wheel assembly 111 and move the beam sensor in direction 997 from adjacent a (floor) surface of the frame 189F towards the wheel assembly 111 to resolve the location of the wheel assembly 111 relative to the reference frame RREF (see FIG. 9C). As may be realized, the bot 120 may scan (vertically as in FIG. 9C) in one or more locations along the line to determine a low point of the wheel assembly 111) using any suitable geometric algorithms.

Where the sensor is a camera, the bot 120 may move the camera along a side of the vehicle 110 where any suitable vision algorithms (e.g., of controller 160, 160") are employed to detect the wheel assembly 111 and resolve the location of the wheel assembly relative to the reference frame RREF of the bot 120.

With reference to the proximity sensor 129N being a sonic sensor, the sonic sensor may be employed in a manner similar to that of the line scan or beam sensor noted above. As may be realized, vertical and/or horizontal scanning of the wheel assembly 111 with the ultrasonic or optical sensors determines a location (e.g., the bounds) of the inner wheel lip and the location of the barrel 450 of the wheel 111W (see FIG. 9C)

With reference to the proximity sensor 129N being a contact sensor, the bot 120 may probe the workspace of the tire changing station 101 with the bot 120 moving the proximity sensor 129N so as to detect the vehicle 110 via contact between the proximity sensor 129N and the vehicle 110. The bot 120 may be configured (e.g., via controller 160, 160") to detect, via probing, one or more corners of the vehicle 110, where the location of the wheel assembly 111 is resolved by employing known dimensions of the vehicle 110 (e.g., stored any suitable memory accessible by controller 160, 160") and the location of the corner of the vehicle as detected in the reference frame RREF of the bot 120.

Figure 11:
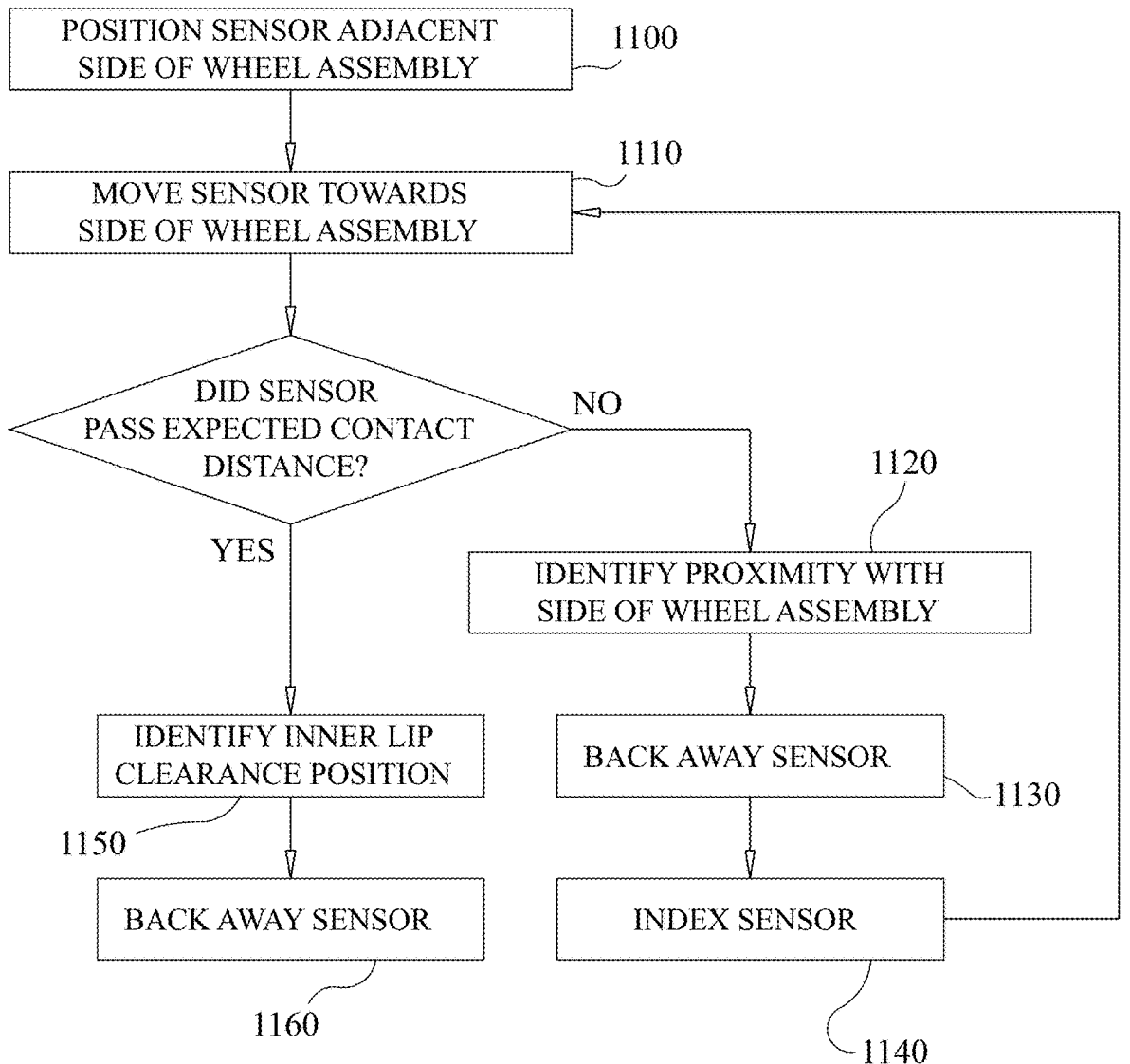
FIG. 11 is a flow diagram of a wheel assembly sensing method of the automated tire changing system of FIGS. 1A and 1B in accordance with the present disclosure.

Referring to FIGS. 1A, 1B, 9A, 9B, and 11, based on the position and diameter information of the tire 111T (as determined in any suitable manner such as those described herein by one or more of the vision system 130, 162 and the (optical, ultrasonic, and/or contact) proximity sensor), an exemplary inner wheel lip localization will be described with respect to the proximity sensor 129N including a contact sensor. The inner wheel lip localization effects determination of an open location of the wheel 111W into which the end effector 128 extends to affix a wheel weight 400 to the wheel 111W. The robot 120, 120WR (under control of controller 160, 160") positions the proximity sensor 129N adjacent the side wall 111TS of the tire 111T (FIG. 11, Block 1100) and is iteratively moved into an out of contact with the wheel assembly 111W in what may be referred to as limit-switch homing method. For example, with the proximity sensor 129N positioned adjacent the side wall 111TS (e.g., inside a diameter 999 of the tire 111T and adjacent the tire tread 111TT—see FIG. 9B), the robot 120, 120WR moves the proximity sensor 129N towards the side wall 111TS (e.g., towards the side of the wheel assembly 111) in direction 998A (FIG. 11, Block 1110). When the proximity sensor 129N contacts the side wall 111TS of the tire 111, the proximity sensor 129N sends a signal to the controller 160 (or any other suitable controller including, but not limited to, controller 160"), where the signal embodies or otherwise indicates a proximity of the proximity sensor 129N (e.g., in this example substantial contact) with the side wall 111TS (FIG. 11, Block 1120). With contact being made between the proximity sensor 129N and the side wall 111TS, the robot 120, 120WR moves (e.g., "backs away") the proximity sensor 129N (FIG. 11, Block 1130) a predetermined distance (e.g., about 5 mm (about 0.2 inches) or more or less than about 5 mm (about 0.2 inches)) in direction 998B away from the side wall 111TS.

With the proximity sensor 129N backed away from the side wall 111TS, the robot 120, 120WR indexes the proximity sensor 129N in direction 997 (towards a center of the tire 111T) by a predetermined distance (e.g., about 5 mm (about 0.2 inches) or more or less than about 5 mm (about 0.2 inches)) (FIG. 11, Block 1140). Blocks 1110-1140 of FIG. 11 are repeated until the proximity sensor 129N is moved past (as determined by the controller 160, 160" from data obtained from any suitable encoders of the robot 120, 120WR or as determined in any other suitable manner) an expected contact distance (e.g., the proximity sensor 129N iteratively contacts the wheel assembly 111 (including the side wall 111TS and surface ILS of the inner wheel lip) along a substantially radial line in direction 997 until the proximity sensor moves in direction 997 past the surface ILS and into the barrel 450 of the wheel 111W. The expected contact distance may be determined, by the controller 160, 160" from data obtained from any suitable encoders of the robot 120, 120WR (or in any other suitable manner), as the distance the proximity sensor 129N is moved in the initial approach (FIG. 11, Block 1110) to contact the side wall 111TS. The expected contact distance may have a predetermined tolerance (e.g., a tolerance of about +/−5 mm (about +/−0.2 inches) or a tolerance greater or less than about +/−5 mm (about +/−0.2 inches)) to account for variations in the side wall 111TS and transitions between the side wall 111TS and the surface ILS.

An inner lip clearance position is identified (FIG. 11, Block 1150) by the controller 160, 160" in the robot 120, 120WR coordinate system as the location in direction 997 which the proximity sensor 129N moved past the expected contact distance. The inner lip clearance position is the location in direction 997 at which the robot 120, 120WR may insert the wheel weight gripper 129P or wheel weight installation tool 129O into the barrel 450 substantially without obstruction from the wheel 111W and/or tire 111T for applying a wheel weight 400 to the wheel 111W or wheel assembly 111. The proximity sensor 129N is backed away from the wheel assembly 111 (FIG. 11, Block 1160) so that the wheel weight 400 may be installed.

Referring to FIGS. 1A-9C and 12 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. In accordance with the method, a vehicle component balancing robot apparatus 189 for on vehicle balancing of the one or more of the tire 111T, the wheel 111W, the bearings 111B, the brake components 111RD, and the vehicle components 111C is provided (FIG. 12, Block 1200). The vehicle component balancing robot apparatus 189 has a frame 189F, as described herein, arranged so as to connect with the vehicle 110. A predetermined location of the tire-wheel assembly relative to a reference frame of the bot 120 is resolved (FIG. 12, Block 1210) by moving the bot 120 relative to the frame 189F in at least one degree of freedom (as described herein), where the robot is connected to the frame 189F (such as by the rails or wheels described herein) and has the at least one degree of freedom (such as along traverse path 299 and/or along any one or more axes of motion of the bot 120). The end effector 128 of the bot 120 is interfaced with the wheel assembly 111 (FIG. 12, Block 1220) and the bot 120 moves the end effector to other predetermined locations (such as, for example, the wheel weight installation locations described herein) on the wheel 111W of the wheel assembly 111 (FIG. 12, Block 1230), where the other predetermined locations are determined based on resolution of the predetermined location of the wheel assembly 111 relative to a reference frame RREF of the bot 120.

Referring to FIGS. 1A-9C and 13 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C (FIG. 13, Block 1300), where the vehicle component balancing robot apparatus 189 has a frame 189F arranged so as to connect with the vehicle 110. A distal end 120D of a robot 120, of the vehicle component balancing robot apparatus 189, is interfaced with the wheel assembly 111 (FIG. 13, Block 1310), where the robot 120 is connected to the frame 189F at a proximal end 120P of the robot 120, the proximal end 120P being opposite the distal end 120D. The distal end 120D is indexed, with an indexer (also referred to as a wheel weigh installation tool) 129O of the robot 120, between a retracted position (see FIG. 5A) and at least one extended position (see FIGS. 5B and 5C) (FIG. 13, Block 1320), wherein in the at least one extended position the distal end 120D interfaces the wheel assembly 111 determining a rim or wheel location of the wheel 111W of the wheel assembly 111 mounted on the vehicle 110.

Figure 14:
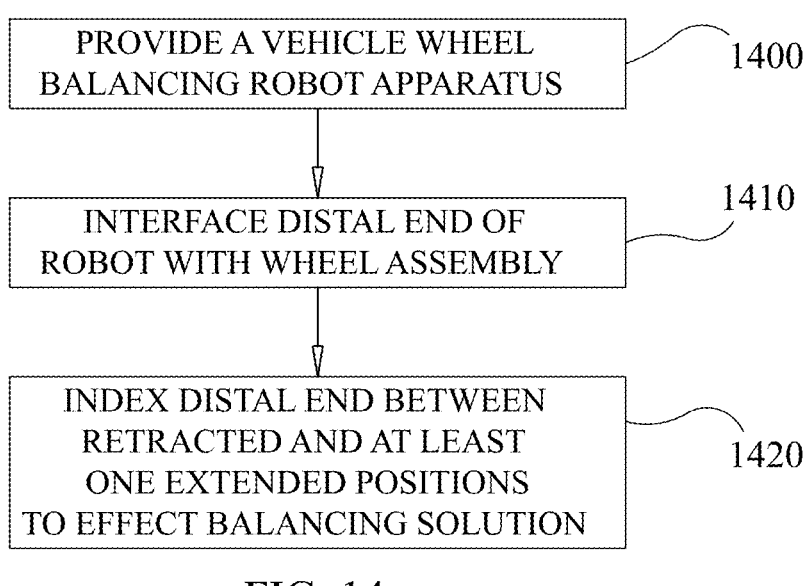

Referring to FIGS. 1A-9C and 14 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C that impart, e.g., with the vehicle 110 in motion, vibrations to the vehicle 110 (e.g., such as by, but not limited to, imparting eccentric forces to a wheel hub 110H (see FIG. 1B)) (FIG. 14, Block 1400), where the vehicle component balancing robot apparatus 189 has a frame 189F arranged so as to connect with the vehicle 110. A distal end 120D of a robot 120 (of the vehicle component balancing robot apparatus 189) is indexed with the wheel assembly 111 (FIG. 14, Block 1410), where the robot 120 is connected to the frame 189F at a proximal end 120P of the robot, the proximal end 120P being opposite the distal end 120D. The distal end 120D is indexed, with an indexer of the robot, between a retracted position (see FIG. 5A) and at least one extended position (see FIGS. 5B and 5C), wherein in the at least one extended position the distal end 120D interfaces the wheel assembly 111 determining a wheel or rim location of the wheel or rim 111W of the wheel assembly 111 and predetermined locations (such as wheel weigh locations) so as to effect a balancing solution of the one or more of the tire 111T, the wheel 111W, the bearings 111B, the brake components 111RD, and the vehicle components 111C via robotic application of wheel balancing weights 400 with the distal end 120D (FIG. 14, Block 1420).

Figure 15:
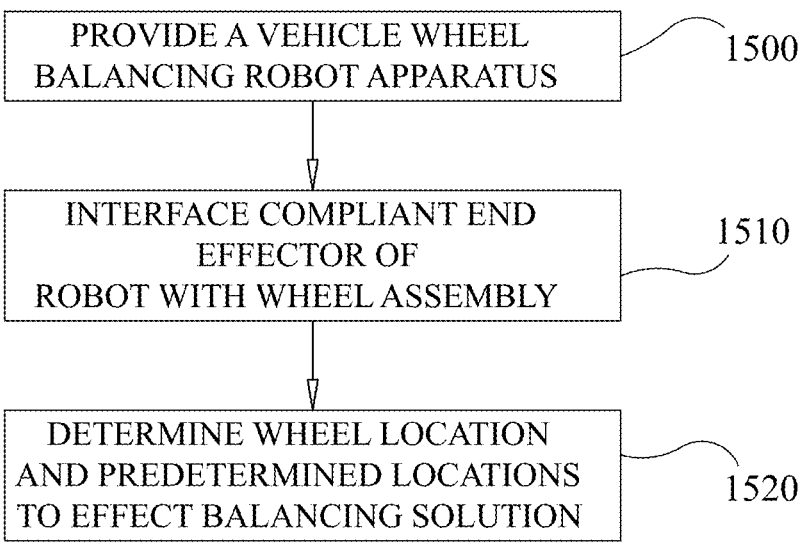

Referring to FIGS. 1A-9C and 15 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C (FIG. 15, Block 1500), the vehicle component balancing robot apparatus 189 having a frame 189F arranged so as to connect with the vehicle 110. A compliant end effector (such as wheel weight gripper 129P or wheel weight installation tool 129O), of a robot 120 (of the vehicle component balancing robot apparatus 189), is interfaced with the wheel assembly 111 (FIG. 15, Block 1510), where the robot 120 is connected to the frame 189F at a proximal end 120P of the robot 120, and the compliant end effector is disposed opposite the proximal end 120P. The method includes determining, with the compliant end effector interfacing the wheel assembly 111, a rim or wheel location of the wheel or rim 111W of the wheel assembly 111 and predetermined locations (such as wheel weight locations) so as to effect a balancing solution of the one or more of the tire 111T, the wheel 111W, the bearings 111B, the brake components 111RD, and the vehicle components 111C via robotic application of wheel balancing weights 400 with the compliant end effector (FIG. 15, Block 1520).

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus includes: a frame arranged so as to connect with the vehicle; and a robot connected to the frame, the robot having at least one degree of freedom so as to move, in the at least one degree of freedom, relative to the frame, and is configured so that the move, relative to the frame in the at least one degree of freedom, resolves a predetermined location of a tire-wheel assembly of the vehicle relative to a reference frame of the robot; wherein the robot has at least one end effector arranged to interface the tire-wheel assembly and the robot moves the at least one end effector to other predetermined locations on a wheel rim of the tire-wheel assembly, determined based on resolution of the predetermined location of the tire-wheel assembly relative to the reference frame of the robot.

In accordance with one or more aspects of the present disclosure, the predetermined location determines a frame of reference of the tire-wheel assembly relative to the reference frame of the robot.

In accordance with one or more aspects of the present disclosure, the other predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one end effector interfaces the tire-wheel assembly at the other predetermined locations so as to effect a balancing solution of one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator, driven so as to extend in the at least one degree of freedom between a retracted position and an extended position, the extended position locating the at least one end effector proximate the tire-wheel assembly.

In accordance with one or more aspects of the present disclosure, the actuator has an indexer arranged to index the at least one end effector, in the at least one degree of freedom, and position the at least one end effector at different index positions corresponding to wheel balancing weight locations on the wheel rim.

In accordance with one or more aspects of the present disclosure, the indexer has an index position that places the at least one end effector in contact with the wheel rim determining a rim location on the wheel rim, of the tire-wheel assembly mounted on the vehicle.

In accordance with one or more aspects of the present disclosure, the at least one end effector has a wheel balancing weight grip, and a resiliently compliant wheel balancing weight applicator.

In accordance with one or more aspects of the present disclosure, the at least one end effector includes an indexer that effects placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having at least a first extension position and a second extension position.

In accordance with one or more aspects of the present disclosure, the wheel balancing weight installation tool includes a conforming wheel balancing weight gripper that conforms, from a relaxed configuration, to a contour of a surface of the wheel rim onto which the wheel balancing weight is applied.

In accordance with one or more aspects of the present disclosure, the at least one end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes one or more sensors configured to resolve the predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the vehicle component balancing robot apparatus further includes a wheel balancing weight dispenser connected to the frame.

In accordance with one or more aspects of the present disclosure, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method includes: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; resolving a predetermined location of a tire-wheel assembly of the vehicle relative to a reference frame of a robot by moving the robot relative to the frame in at least one degree of freedom, where the robot is connected to the frame and has the at least one degree of freedom; interfacing at least one end effector of the robot with the tire-wheel assembly; and moving, with the robot, the at least one end effector to other predetermined locations on a wheel rim of the tire-wheel assembly, determined based on resolution of the predetermined location of the tire-wheel assembly relative to a reference frame of the robot.

In accordance with one or more aspects of the present disclosure, the predetermined location determines a frame of reference of the tire-wheel assembly relative to the reference frame of the robot.

In accordance with one or more aspects of the present disclosure, the other predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one end effector interfaces the tire-wheel assembly at the other predetermined locations so as to effect a balancing solution of the one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator that is driven so as to extend in the at least one degree of freedom between a retracted position and an extended position, the extended position locating the at least one end effector proximate the tire-wheel assembly.

In accordance with one or more aspects of the present disclosure, the actuator has an indexer that indexed the at least one end effector, in the at least one degree of freedom, and position the at least one end effector at different index positions corresponding to wheel balancing weight locations on the wheel rim.

In accordance with one or more aspects of the present disclosure, the indexer has an index position that places the at least one end effector in contact with the wheel rim determining a rim location on the wheel rim, of the tire-wheel assembly mounted on the vehicle.

In accordance with one or more aspects of the present disclosure, the at least one end effector has a wheel balancing weight grip, and a resiliently compliant wheel balancing weight applicator.

In accordance with one or more aspects of the present disclosure, the method further includes, with an indexer of the at least one end effector, placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the wheel balancing weight is applied with a conforming wheel balancing weight gripper of the wheel balancing weight installation tool, where the conforming wheel balancing weight gripper conforms, from a relaxed configuration, to a contour of a surface of the wheel rim onto which the wheel balancing weight is applied.

In accordance with one or more aspects of the present disclosure, the wheel balancing weight is applied with a conforming wheel balancing weight gripper of the at least one end effector that conforms, from a relaxed configuration, to a contour of a surface of the wheel rim onto which the wheel balancing weight is applied.

In accordance with one or more aspects of the present disclosure, the conforming wheel balancing weight gripper includes a flexible grip that grips and holds a wheel balancing weight.

In accordance with one or more aspects of the present disclosure, the flexible grip holds the wheel balancing weight with one or more of magnets, vacuum grips, and clips of the flexible grip.

In accordance with one or more aspects of the present disclosure, the method further includes resolving the predetermined location of the tire-wheel assembly relative to the reference frame of the robot with one or more sensors of the vehicle component balancing robot apparatus.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one end effector, the method further comprising moving, with the robot, the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, the method further comprising moving, with the robot, the proximity sensor to iteratively contact a side of the tire-wheel assembly and effect determination of an open location of the wheel into which the at least one end effector extends to affix a wheel weight to the wheel.

In accordance with one or more aspects of the present disclosure, a wheel balancing weight dispenser is connected to the frame for dispensing wheel weights to the robot.

In accordance with one or more aspects of the present disclosure, the wheel balancing weight dispenser has a wheel weight transport that conveys and positions wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights prior to or after transport of the wheel weights on the wheel weight transport.

In accordance with one or more aspects of the present disclosure, the wheel balancing weight dispenser includes an automated weight-measuring roller and a cutting blade, method further comprises unrolling and indexing, with the automated weight-measuring roller, a predetermined amount of weight past the cutting blade and cutting, with the cutting blade, the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, the wheel balancing weight dispenser removes the adhesive backing from the wheel balancing weights prior to or after cutting of the predetermined amount of weight.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has a distal end, opposite the proximal end, the distal end being arranged so as to interface with a tire-wheel assembly of the vehicle; wherein the robot has an indexer that indexes the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect the balancing solution.

In accordance with one or more aspects of the present disclosure, the robot has at least one degree of freedom and is configured to move the distal end in the one degree of freedom relative to the frame so that the move resolves another predetermined location of the tire-wheel assembly relative to a reference frame of the robot; and the distal end is arranged to interface the tire-wheel assembly and the robot moves the distal end to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer arranged to index the distal end, in the at least one degree of freedom, and position the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method comprising: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; and interfacing a distal end of a robot with a tire-wheel assembly of the vehicle, where the robot is connected to the frame at a proximal end of the robot, opposite the distal end; indexing, with an indexer of the robot, the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect the balancing solution.

In accordance with one or more aspects of the present disclosure, the robot has at least one degree of freedom and moves the distal end in the one degree of freedom relative to the frame so that the move resolves another predetermined location of the tire-wheel assembly relative to a reference frame of the robot; and the distal end is arranged to interface the tire-wheel assembly and the robot moves the distal end to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer and indexes the distal end, in the at least one degree of freedom, and positions the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the method further includes resolving, with one or more sensors, the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the method further includes, with a wheel balancing weight dispenser connected to the frame where the wheel balancing weight dispenser includes a wheel weight transport, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the wheel balancing weight dispenser includes an automated weight-measuring roller and a cutting blade, where the automated weight-measuring roller unrolls and indexes a predetermined amount of weight past the cutting blade and the cutting blade cuts the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has a distal end, opposite the proximal end, the distal end being arranged so as to interface with a tire-wheel assembly of the vehicle; wherein the robot has an indexer that indexes the distal end between a retracted position and at least one extended position, wherein in the at least one extended position the distal end interfaces the tire-wheel assembly determining a rim location of the wheel rim of the tire wheel assembly mounted on the vehicle.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect a balancing solution of the one or more of the tire, the wheel, the bearings, the brake components, and the vehicle components that impart vibrations to the vehicle.

In accordance with one or more aspects of the present disclosure, the distal end interfaces the tire-wheel assembly so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer arranged to index the distal end, in the at least one degree of freedom, and position the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method includes: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; interfacing a distal end of a robot with a tire-wheel assembly of the vehicle, where the robot is connected to the frame at a proximal end of the robot, opposite the distal end; and indexing, with an indexer of the robot, the distal end between a retracted position and at least one extended position, wherein in the at least one extended position the distal end interfaces the tire-wheel assembly determining a rim location of the wheel rim of the tire wheel assembly mounted on the vehicle.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect a balancing solution of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer and indexes the distal end, in the at least one degree of freedom, and positions the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the method further includes resolving, with one or more sensors, the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the method further includes, with a wheel balancing weight dispenser connected to the frame where the wheel balancing weight dispenser includes a wheel weight transport, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the wheel balancing weight dispenser includes an automated weight-measuring roller and a cutting blade, where the automated weight-measuring roller unrolls and indexes a predetermined amount of weight past the cutting blade and the cutting blade cuts the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has at least one compliant end effector, opposite the proximal end, the at least one compliant end effector being arranged so as to interface with a tire-wheel assembly of the vehicle; wherein the at least one compliant end effector interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the at least one compliant end effector comprises an indexer that indexes the at least one compliant end effector between a retracted position and at least one extended position.

In accordance with one or more aspects of the present disclosure, the indexer is a multi-stage indexer and at least one index stage has different index positions that position the interface corresponding to wheel balancing weight locations on the wheel rim so as to effect the balancing solution.

In accordance with one or more aspects of the present disclosure, the robot has an actuator that has the indexer arranged to index the at least one compliant end effector, in at least one degree of freedom, and position the at least one compliant end effector at different index positions corresponding to wheel balancing weight locations on the wheel rim.

In accordance with one or more aspects of the present disclosure, the indexer has an index position that places the at least one compliant end effector in contact with the wheel rim determining a rim location on the wheel rim, of the tire-wheel assembly mounted on the vehicle.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the robot has at least one degree of freedom and is configured to move the at least one compliant end effector in the one degree of freedom relative to the frame so that the move resolves another predetermined location of the tire-wheel assembly relative to a reference frame of the robot; and the at least one compliant end effector is arranged to interface the tire-wheel assembly and the robot moves the at least one compliant end effector to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one compliant end effector interfaces the tire-wheel assembly at the predetermined locations so as to effect the balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an open location of the wheel into which the at least one compliant end effector extends to affix a wheel weight to the wheel.

In accordance with one or more aspects of the present disclosure, the robot has a driven actuator, the driven actuator has the at least one compliant end effector and the actuator is driven so as to extend in at least one degree of freedom of the robot between a retracted position and an extended position, the extended position locating the at least one compliant end effector proximate the tire-wheel assembly.

In accordance with one or more aspects of the present disclosure, the at least one compliant end effector has a wheel balancing weight grip, and a resiliently compliant wheel balancing weight applicator.

In accordance with one or more aspects of the present disclosure, the at least one compliant end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method comprising: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; interfacing at least one compliant end effector of a robot with a tire-wheel assembly of the vehicle, the robot being connected to the frame at a proximal end of the robot, and the at least one compliant end effector is disposed opposite the proximal end; and determining, with the at least one compliant end effector interfacing the tire-wheel assembly, a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the method further includes, with an indexer of the at least one compliant end effector, indexing the at least one compliant end effector between a retracted position and at least one extended position.

In accordance with one or more aspects of the present disclosure, the indexer is a multi-stage indexer and at least one index stage has different index positions that position the interface corresponding to wheel balancing weight locations on the wheel rim so as to effect the balancing solution.

In accordance with one or more aspects of the present disclosure, the robot has an actuator that has the indexer arranged to index the at least one compliant end effector, in at least one degree of freedom, and position the at least one compliant end effector at different index positions corresponding to wheel balancing weight locations on the wheel rim.

In accordance with one or more aspects of the present disclosure, the method further includes, with an index position of the indexer, placing the at least one compliant end effector in contact with the wheel rim determining a rim location on the wheel rim, of the tire-wheel assembly mounted on the vehicle.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the robot has at least one degree of freedom and moves the at least one compliant end effector in the one degree of freedom relative to the frame so that the move resolves another predetermined location of the tire-wheel assembly relative to a reference frame of the robot; and the at least one compliant end effector interfaces the tire-wheel assembly and the robot moves the at least one compliant end effector to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one compliant end effector interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the method further includes, with one or more sensors, resolving the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an open location of the wheel into which the at least one compliant end effector extends to affix a wheel weight to the wheel.

In accordance with one or more aspects of the present disclosure, the robot has a driven actuator, the driven actuator has the at least one compliant end effector and the actuator is driven so as to extend in at least one degree of freedom of the robot between a retracted position and an extended position, the extended position locating the at least one compliant end effector proximate the tire-wheel assembly.

In accordance with one or more aspects of the present disclosure, the at least one compliant end effector has a wheel balancing weight grip, and a resiliently compliant wheel balancing weight applicator.

In accordance with one or more aspects of the present disclosure, the at least one compliant end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip that grips and holds a wheel balancing weight.

In accordance with one or more aspects of the present disclosure, the flexible grip includes one or more of magnets, vacuum grips, and clips.

In accordance with one or more aspects of the present disclosure, the method further includes, with a wheel weight transport of a wheel balancing weight dispenser connected to the frame, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the method further includes, with an automated weight-measuring roller and a cutting blade of the wheel balancing weight dispenser, unrolling and indexing a predetermined amount of weight past the cutting blade and cutting the predetermined amount of weight to form a wheel balancing weight of a predetermined weight that resolves imbalance of the one or more of the tire, the wheel, the bearings, the brake components, and the vehicle components that impart vibrations to the vehicle.

Figures 16A, 16B, 16C, 16D:
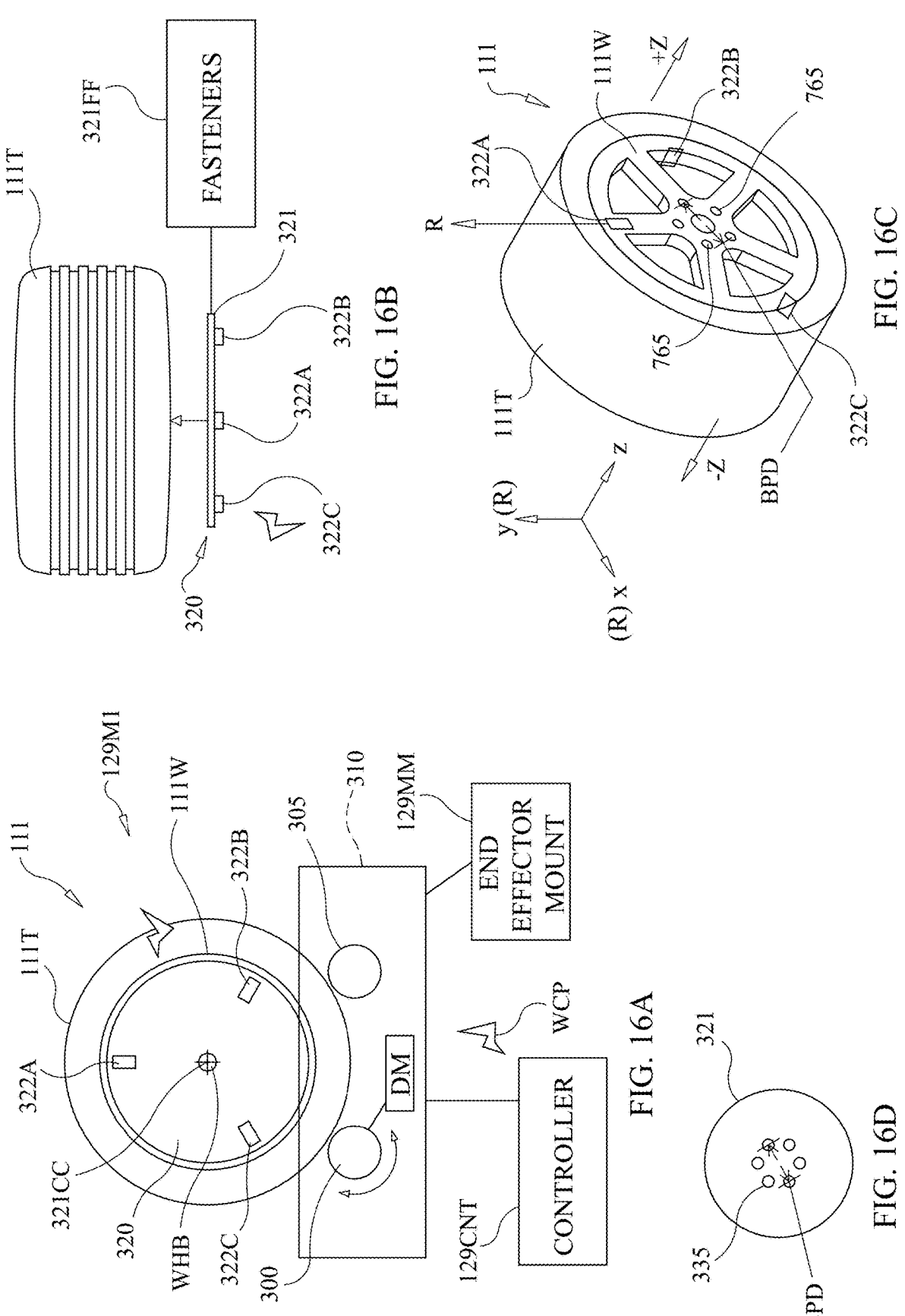
FIGS. 16A-16D are schematic illustrations of a portion of an automated tire changing system in accordance with aspects of the present disclosure.
Figure 20A:
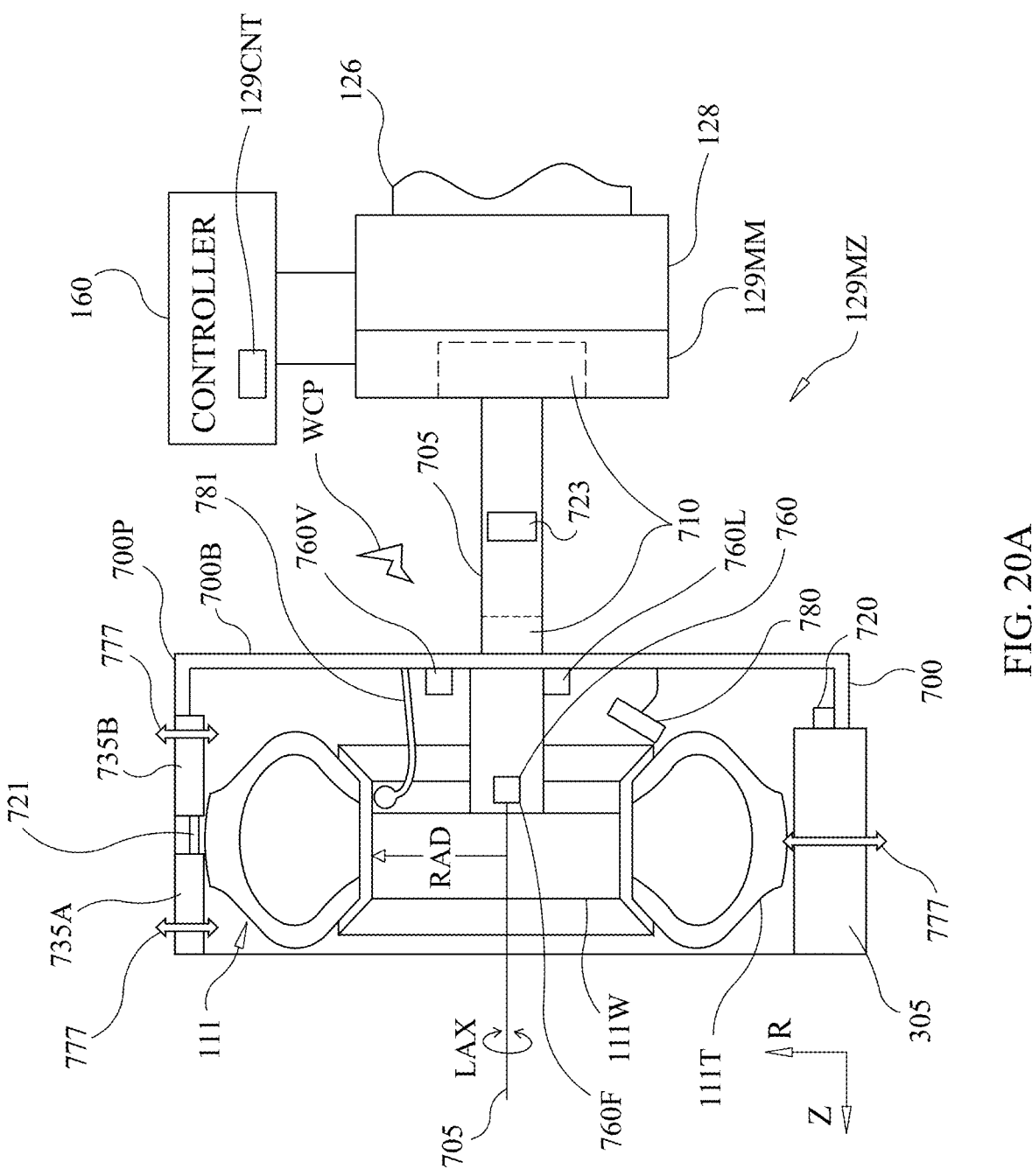
FIGS. 20A-20D are schematic illustrations of a portion of an automated tire changing system in accordance with aspects of the present disclosure.

Referring to FIGS. 16A and 20A, for exemplary purposes, the tire balancer 129M has any suitable configuration for balancing the wheel assembly 111. For non-limiting exemplary purposes only, tire balancer 129M includes an end effector mount 129MM that couples the tire balancer 129M to the end effector 128 of the at least one robotic arm 126 (see FIG. 20A). The tire balancer 129M is configured to balance the tire 111T and the wheel 111W assembly 111 with the tire 111T and wheel 111W (i.e., wheel assembly 111) spinning at wheel operating speeds of about 60 mph or greater (in other aspects the operating speeds may be less than about 60 mph) so as to effect dynamic balancing or road force balancing of the wheel assembly 111. In one aspect, the tire balancer 129M is configured to balance the wheel assembly 111 off of the vehicle 110 and may be substantially similar to a conventional tire balancer but carried by the at least one robotic arm 126; while in other aspects, the tire balancer 129M is configured to balance the wheel assembly 111 on or in situ the vehicle 110 and includes rollers (e.g., a drive roller 300 configured to spin the wheel assembly 111 about a respective wheel hub of the vehicle 110 and a road force roller 305 configured to apply a simulated road force to the tire 111T with the wheel assembly 111 spinning. At least the drive roller 300 drives rotation of the wheel assembly 111 for determining where to place wheel weights 3188 (see, e.g., FIGS. 44A and 56). The wheel weights 3188 are applied to the wheel 111W in any suitable manner such as with a wheel weight dispenser (such as one of the robotic arm 126, 126A that picks wheels weights from a hopper and applies them to the wheel in locations identified by the tire balancer 129M) to place the wheels weights onto the wheel 111W. In other aspects the tire balancer 129M has any suitable configuration and/or components for balancing the wheel assembly 111.

Still referring to FIG. 16A and also to FIGS. 16B-16C a tire balancer 129M1 is illustrated. The tire balancer 129M1 is configured as a dynamic tire balancer that includes a frame 310, a drive roller 300 mounted to the frame 310, and a road force roller 310 mounted to the frame 310. A suitable drive motor(s) DM are mounted to the frame for driving rotation of the drive roller 300 to effect rotation/spinning of the wheel assembly 111. As described above, the frame 310 includes an end effector mount 129MM that couples the frame 129M1 to the end effector 128 of the at least one robotic arm 126. The robot arm 126 is configured to move the drive roller 300 and road force roller 305 into contact with the tire 111T. The robot arm 126, in one aspect, includes any suitable force feedback sensors (pressure sensors, current sensors, etc.) for detecting an amount of force applied by robot arm 126 on the tire 111T by the drive roller 300 and road force roller 305; while in other aspects the motors are provided to raise/move the drive roller 300 and the road force roller 305 relative to the frame 310 and into substantial contact with the tire 111T, where force feedback sensors are coupled to the frame 310, the drive roller 300, and the road force roller 305 for detecting a force exerted on the tire by the drive roller 300 and road force roller 305.

The tire balancer 129M1 may include a remote motion detection module 320 that includes a mounting plate 321 and motion sensors 322A, 322B, 322C. The mounting plate 321 is configured in any suitable manner, such as with fasteners 321FF (e.g., clips, magnets, spring or crank tension rods, etc.), to couple with the wheel 111W so that a center 321CC of the mounting plate 321 is substantially coaxial with a center of rotation WHB of the wheel assembly 111. The mounting plate 321 may include sockets 335 that have are equal in number to and have the same pattern diameter SPD as the lugs 765 of the wheel 111W to which the mounting plate 321 is coupled. The sockets 335 are configured to frictionally engage the lugs 765 to effect centering of the mounting plate 321 with respect to the wheel 111W. In some aspects, the frictional coupling of the sockets 335 with the lugs 765 retains the mounting plate 321 on the wheel assembly 111 during balancing of the wheel assembly 111; while in other aspects, the frictional engagement between the sockets 335 and lugs 765 at least in part retains (e.g., supplemented by other retaining means such as the clips, magnets, tension rods, etc.) the mounting plate 321 on the wheel assembly 111 during balancing of the wheel assembly. The mounting plate 321 is, in one aspect, configured to couple with the outer face of the wheel 111W (i.e., opposite the wheel hub of the vehicle 110) so that coupling and uncoupling of the mounting plate 321 to the wheel 111W is substantially unobstructed.

The motion sensors 322A, 322B, 322C are coupled to the mounting plate 321 in any suitable arrangement so that the remote motion detection module 320 is rotationally balanced and the balancing of the wheel assembly 111 is unaffected by the presence of the remote motion detection module 320 on the wheel assembly 111. In this aspect, there are three motion sensors 322A, 322B, 322C where each motion sensor is an accelerometer; however, in other aspects there may be any suitable type and number of motion sensors. Here, at least one of the motion sensors 322A, 322B, 322C is arranged on the mounting plate 321 and is configured to detect radial accelerations R (e.g., up and down vibrations or "hop") of the wheel assembly 111 (see FIG. 16C). At least one of the motion sensors 322A, 322B, 322C is arranged on the mounting plate 321 and is configured to detect positive axial accelerations +Z (relative to the wheel hub/spindle to which the wheel assembly 111 is coupled) of the wheel assembly 111 (see FIG. 16C). At least one of the motion sensors 322A, 322B, 322C is arranged on the mounting plate 321 and is configured to detect negative axial accelerations −Z (relative to the wheel hub/spindle to which the wheel assembly 111 is coupled) of the wheel assembly 111 (see FIG. 16C). The positive and negative axial accelerations may be referred to as "wobble" (e.g., sideways motion) of the wheel assembly 111. In other aspects, one or more of the motion sensors 322A, 322B, 322C may be a multi-axis sensors configured to detect any suitable combination of the radial accelerations R, the positive axial accelerations +z, and the negative axial accelerations −Z. In still other aspects, a single multi-axis motion sensor is provided to detect the radial accelerations R, the positive axial accelerations +z, and the negative axial accelerations −Z while inert weights are provided on the mounting plate 321 to balance the weight of the single multi-axis motion sensor.

The motion sensors 322A, 322B, 322C are configured as wireless motion sensors that communication with any suitable wheel balancer controller 129CNT. The motions sensors 322A, 322B, 322C communicate sensor signals that embody the detected accelerations to the controller 129CNT over any suitable wireless communication protocol/connection WCP, including but not limited to Bluetooth®, Zigbee®, cellular, Wi-Fi, or any other long or short range communication protocol. In one aspect, the controller 129CNT is coupled to the frame 310 and is in communication with one or more of a device 1020A-1020n controller 160 (e.g., such as a bot 120 controller, a wheel weight dispenser/applicator controller, etc.) and the control console 1010; while in other aspects the controller 129CNT is integral to a device controller 160 (see FIG. 20A) or the control console 1010 so as to communicate with other components of the tire changing system 100 (e.g., the tire balancer 129M, wheel weight dispenser/applicator, operator GUI 1004, etc.) to effect balancing of the wheel assembly 111 as described herein.

Figure 30B:
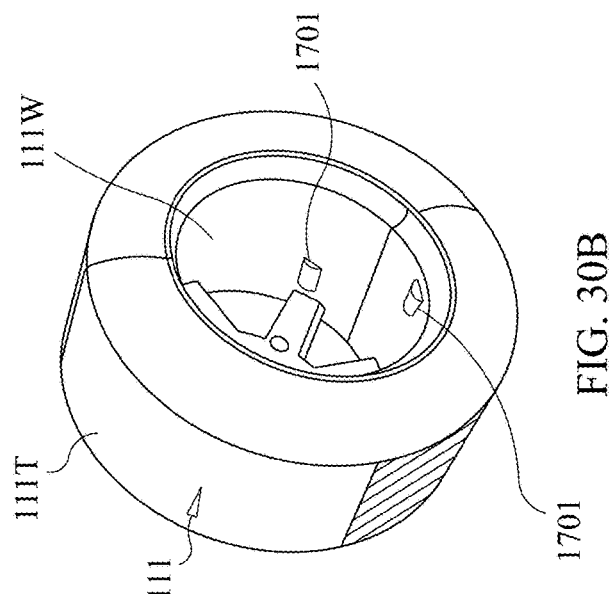
FIGS. 30A-30D are schematic illustrations of a portion of an automated tire changing system in accordance with aspects of the present disclosure.
Figure 30A:
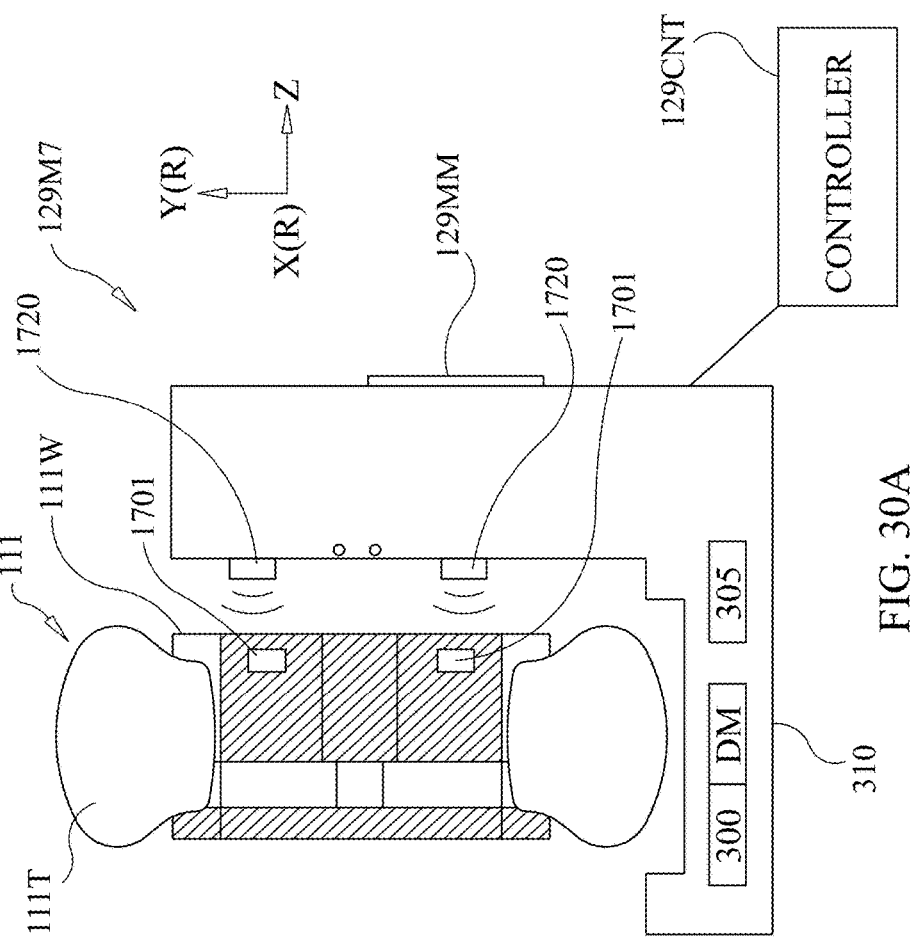
Figures 30C, 30D:
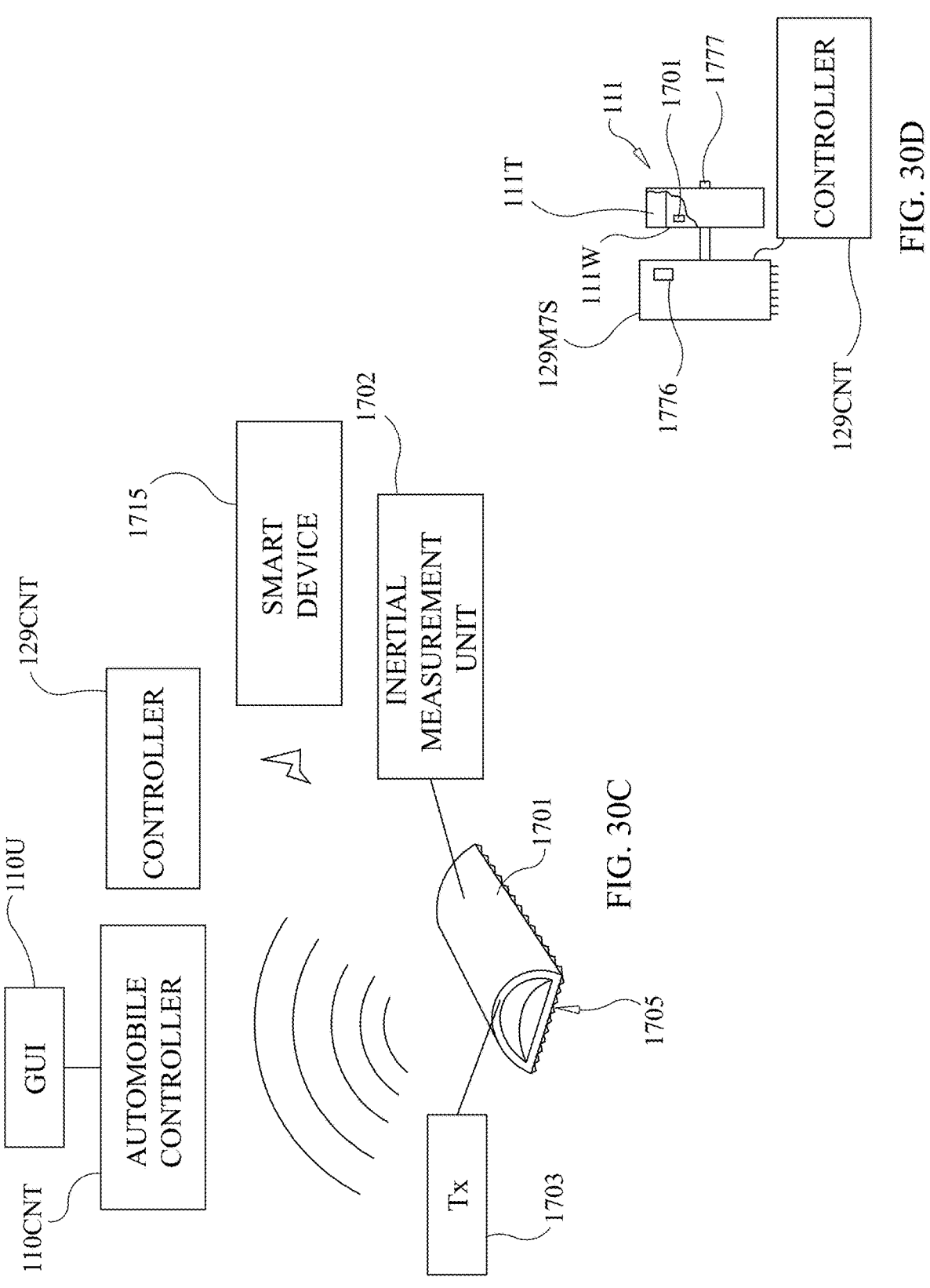
Figure 35:
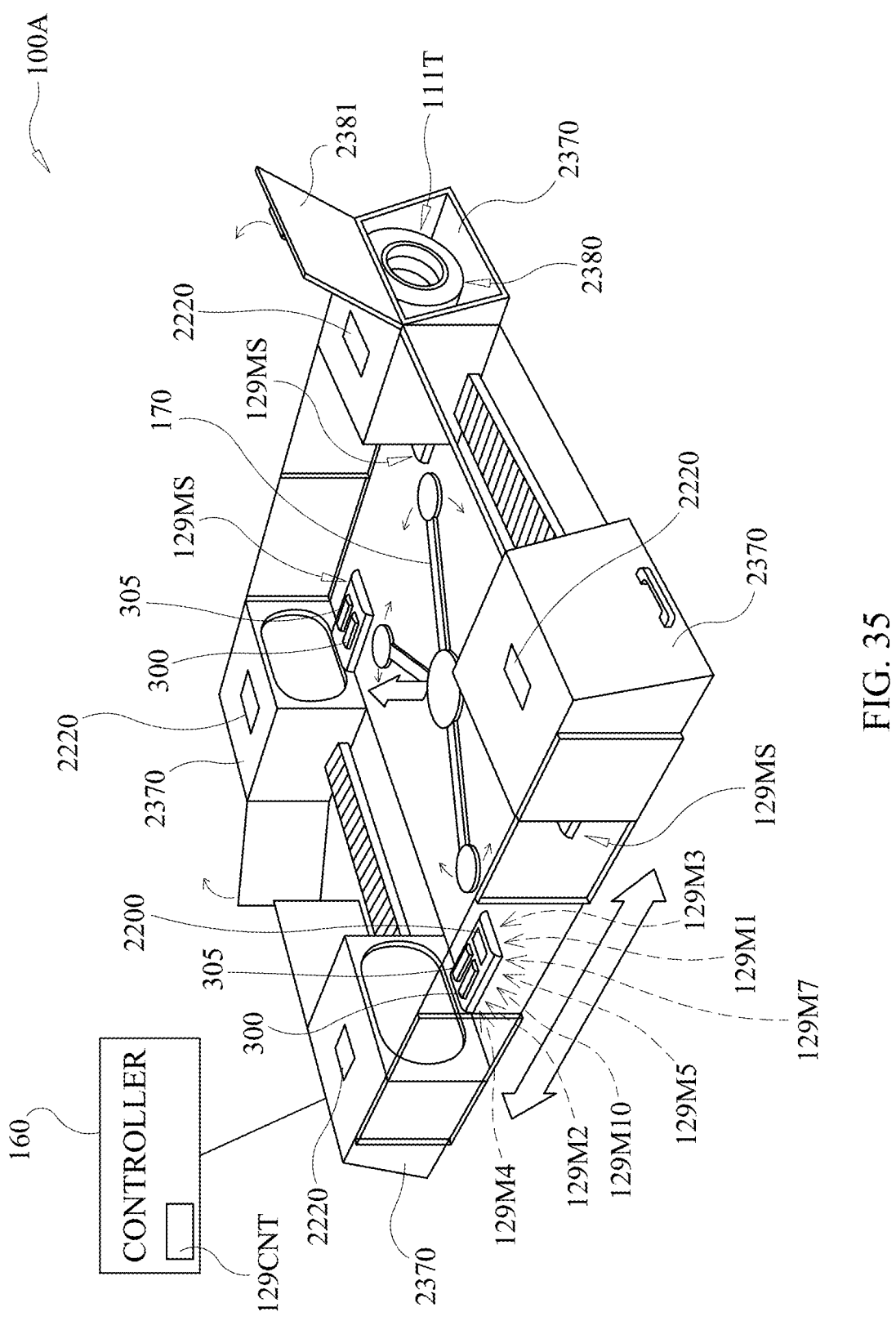
FIG. 35 is schematic illustrations of an automated tire changing system incorporating aspects of the present disclosure.

While the tire balancer 129M1 was described above, as having an end effector mount 129MM for coupling the tire balancer 129M1 to the at least one robotic arm 126, in other aspects, the tire balancer 129M1 may be a stand-alone floor unit (substantially similar to that shown and described herein with respect to FIG. 30D) or the tire balancer 129M1 may be a component of tire changing system 100, 100A (see FIGS. 1A, 1B and 35) where the vehicle 110 is driven into the alignment cell and onto the tire balancer 129M1 (which is generally referred to in FIGS. 1 and 35 as tire balancer 129MS).

Figures 17A, 17B, 18, 19:
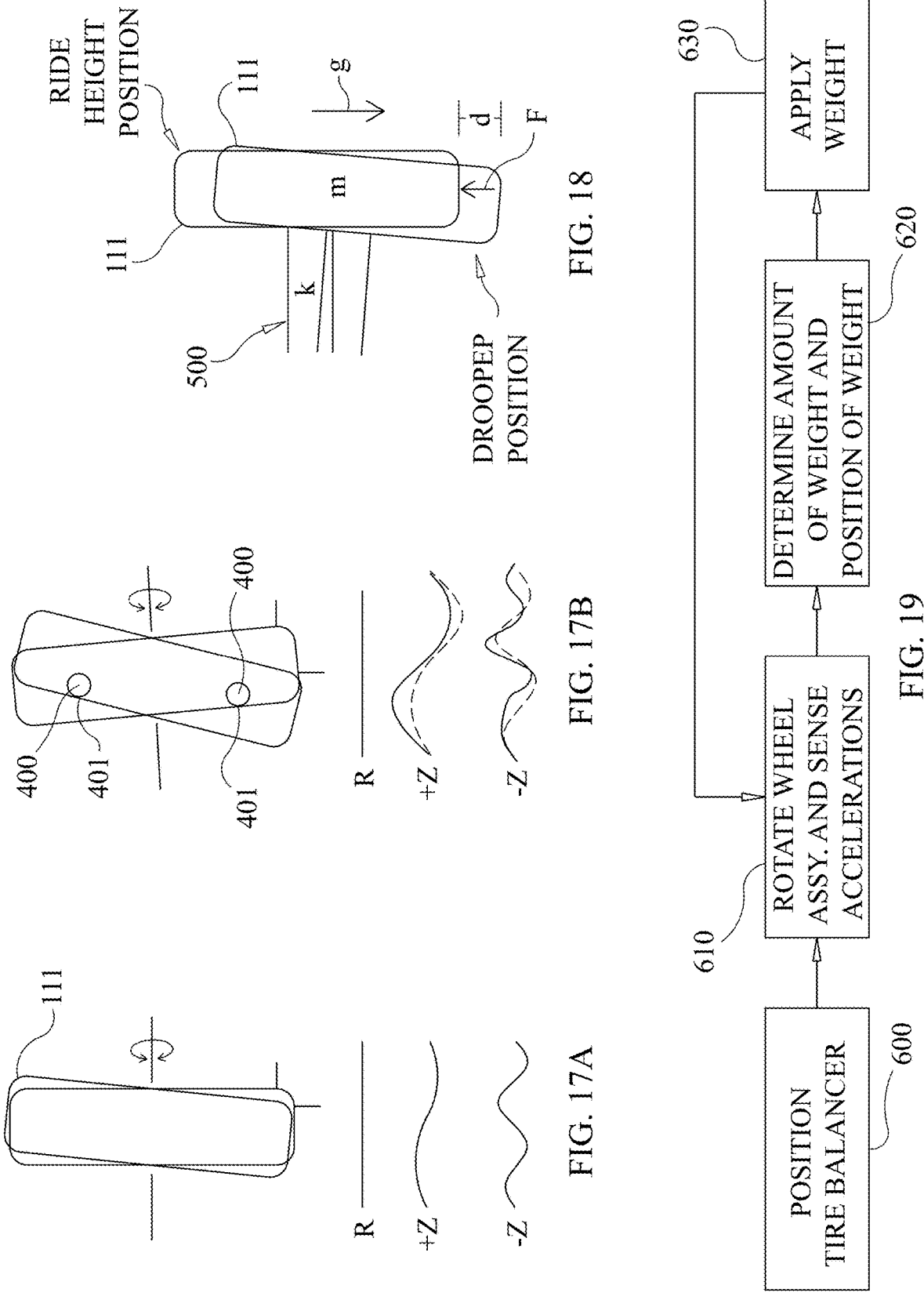
FIGS. 17A, 17B, and 18 are schematic illustrations of dynamic responses of a wheel in accordance with aspects of the present disclosure.
FIG. 19 is an exemplary flow diagram of a method in accordance with aspects of the present disclosure.

Referring to FIGS. 16A-19, in operation the tire balancer 129M1 is positioned relative to the wheel assembly 111 (with the wheel assembly 111 in situ the vehicle 110) in any suitable manner (FIG. 19, Block 600), such as by the at least one robotic arm 126 so that the drive roller 300 and road force roller 305 are in substantial contact with the tire 111T. The controller 129CNT operates the drive motor(s) DM so that the drive roller 300 drivingly rotates the wheel assembly 111 with the drive force roller 305 applying a simulated road force to the wheel assembly 111. The wheel assembly 111 is rotated and one or more of the radial accelerations R, positive axial accelerations +Z, and negative axial accelerations −Z are detected by the motion sensor(s) 322A, 322B, 322C (FIG. 19, Block 610).

An amount of weight and a position of the weight is determined based on the detected accelerations (FIG. 19, Block 620). For example, in one aspect, the wheel assembly 111 is initially spun without wheel weights applied to obtain baseline accelerations, such as illustrated in FIG. 17A. A known mass 400 is applied to the wheel assembly 111 at a known location 401 relative to the balancing planes R (X, Y), Z (see FIG. 16C). The wheel assembly is spun with the known mass 400 applied and the accelerations are detected (see FIG. 17B) and compared with the baseline accelerations in any suitable manner to determine the amount and location of weight to be applied to the wheel assembly 111 for balancing the wheel assembly. In another aspect, the amount of weight for balancing the wheel assembly 111 is determined by measuring a mass m of the wheel assembly 111 while lifting the wheel assembly 111 (e.g., from a drooped position—i.e., with the vehicle 110 lifted off of the ground and the vehicle suspension components 500 fully relaxed/drooped down) based on a deflection d of the wheel assembly from the drooped position, assuming a steady spring constant k of the vehicle suspension components 500; noting that the spring constant k can be determined by measuring the force F required to lift the wheel assembly 111 from the dropped position back to a ride height position (i.e., a position of the wheel as determined by the vehicle suspension components 500 with the vehicle 110 resting with all wheels on the ground) where:

$$F = -mg/d \text{ and} \qquad \text{[eq. 1]}$$

$$E = (k \times d^2)/2 \qquad \text{[eq. 2]}$$

where E is the spring potential energy and g is the force of gravity. The location of the weight may be determined by application of the determined weight to the wheel 111W, spinning the wheel, and measuring the accelerations in a manner similar to that noted above. In other aspects, the amount of weight and location of the weight may be determined in any suitable manner.

With the amount of weight and the position of the weight determined the weight is applied to the wheel 111W (FIG. 19, Block 630) in any suitable manner (e.g., with automated equipment or manually), such as described herein.

Figure 20D:
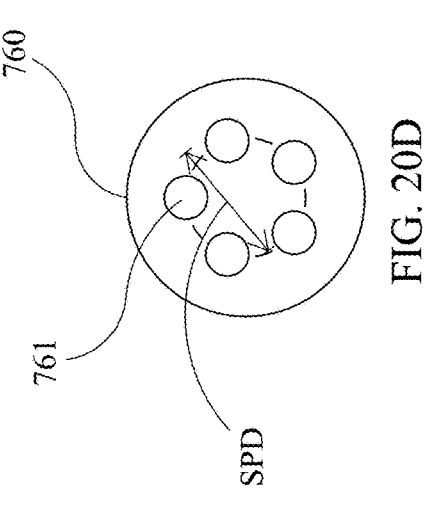
Figure 20B:
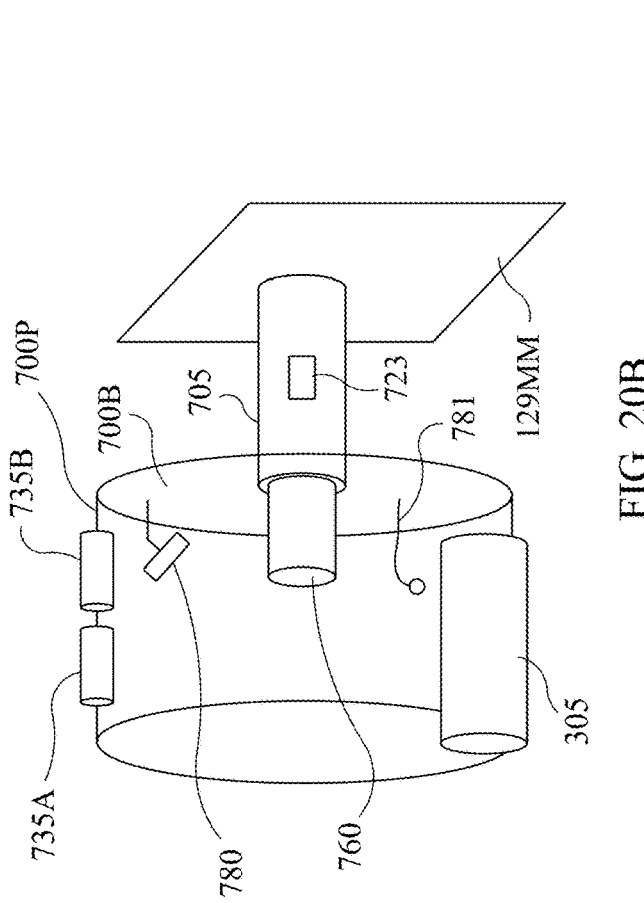
Figure 20C:
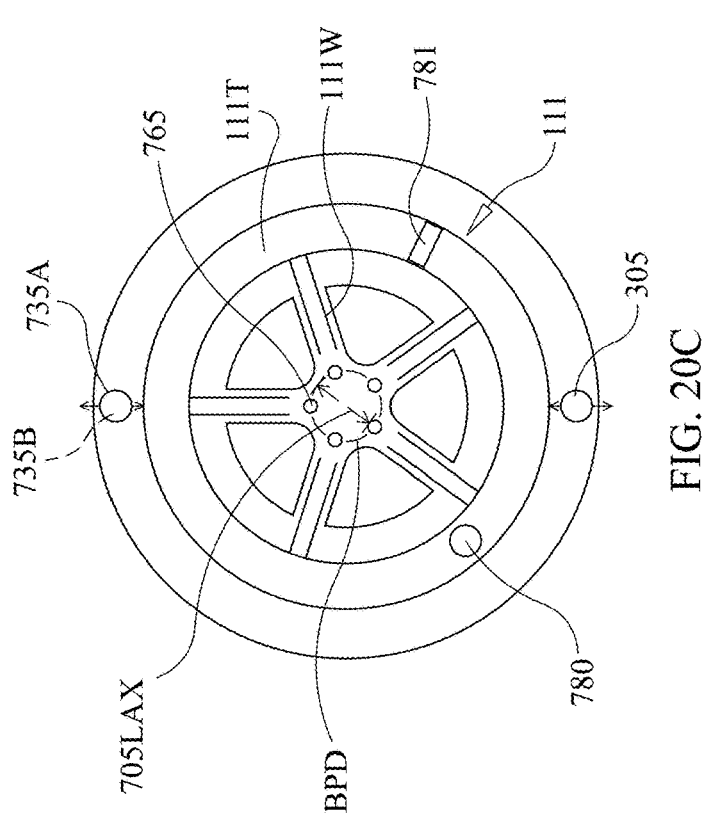

Referring to FIGS. 20A-20C, a wheel balancer 129M2 is illustrated. The wheel balancer 129M2 is coupled to the end effector 128 of the at least one robotic arm 126 with an end effector mount 129MM in a manner similar to that described above. In this aspect, the wheel balancer 129M2 includes a wheel shroud or housing 700 that is coupled to the end effector mount 129MM by a shaft 705. The wheel shroud 700 has the form of an open top can or cup that includes a base 700B, to which the shaft 705 is coupled, and a peripheral wall 700B that extends from the base 700B in a direction opposite the shaft 705. The end effector mount 129MM includes any suitable drive motor 710 that is coupled to and drives the shaft 705 (and the wheel shroud 700 coupled thereto) about a longitudinal axis 705LAX of the shaft 705; while in other aspects, the motor 710 may be located between the shaft 705 and the wheel shroud 700 so that the shaft 705 is rotationally fixed to the end effector mount 129MM and the wheel shroud 700 is driven in rotation, by the motor 710 relative to the shaft 705.

The wheel shroud 700 includes a road force roller 305 that is coupled to the peripheral wall 700P of the wheel shroud 700 so as to be movable in a radial direction 777. The wheel shroud 700 includes any suitable motor 720 that is configured to move the road force roller 305 in the radial direction 777 so that the road force roller 305 selectively engages and disengages the tire 111T.

The wheel shroud 700 may also include one or more dynamic balance rollers 735A, 735B that are coupled to the peripheral wall 700P of the wheel shroud 700 so as to be movable in a radial direction 777. The wheel shroud 700 includes any suitable motor 721 that is configured to move the one or more dynamic balance rollers 735A, 735B in the radial direction 777 so that the one or more dynamic balance rollers 735A, 735B selectively engage and disengage the tire 111T.

Where the one or more dynamic balance rollers 735A, 735B are provided with the road force roller 305, the one or more dynamic balance rollers 735A, 735B and the road force roller 305 are independently deployable for engagement with the tire 111T to provide for road force balancing of the wheel assembly 111, dynamical balancing of the wheel assembly, or both (a combination of) road force balancing and dynamic balancing.

The wheel shroud 700 includes a centering protrusion 760 that extends from base 700P and is substantially coaxial (i.e., extends along the longitudinal axis 705LAX) with the shaft 705. The centering protrusion 760 has any suitable configuration for engaging the wheel 111W, to center the wheel assembly 111 within the wheel shroud 700 or to center the wheel shroud 700 with the wheel assembly 111 (e.g., the center of the wheel 111W is substantially aligned/coaxial with the shaft 705 longitudinal axis 705LAX). For example, referring also to FIG. 20D, the centering protrusion 760 includes sockets 761 arranged in a pattern that substantially matches the lug 765 pattern of the wheel 111W. The sockets 761 have a socket pattern (e.g., socket number and socket-pattern diameter SPD) and are configured to engage the lugs 765 and center the wheel assembly 111 with the wheel shroud 700 as noted above. The centering protrusion 760 (or a socket portion thereof) may be removable from the base 700B and interchangeable with other centering protrusions 760 (or socket portions). Each interchangeable centering protrusion 760 corresponds with a different lug 765 pattern (e.g., lug number and bolt-pattern diameter BPD) so that the tire balancer 129M2 may be employed with different wheels 111W having different lug 765 patterns corresponding to a socket pattern of a respective one of the interchangeable centering protrusions 760.

The centering protrusion 760 may be coupled to the base 700B so as to rotate relative to the base. The rotatable coupling between the base 700B and the centering protrusion 760 provides for centering of the wheel shroud 700 relative to the wheel assembly 111 while allowing rotation of the wheel shroud 700 with the wheel assembly 111 remaining rotationally stationary/fixed. A releasable lock 760L may be coupled to the base 700P to selectively lock rotation of the centering protrusion 760 to the base 700P so that the wheel shroud 700 and the centering protrusion 760 rotate as a unit for engaging the centering protrusion 760 with the lugs 765 and so that the wheel shroud 700 rotates independent of the centering protrusion 760. The tire balancer 760 may include a vision system 760V that images the wheel lug 765 pattern and a fiducial 760F of the centering protrusion 760 (the fiducial 760F having a known relationship relative to the socket pattern) and is configured to effect an aligning rotation of the wheel shroud 700 (and the centering protrusion) so that the centering protrusion 760 engages the lugs 765. In other aspects, alignment of the centering protrusion 760 with the lugs 765 (or any other suitable portion of the wheel 111W) may be effected in any suitable manner for centering the wheel shroud 700 relative to the wheel assembly 111 or vice versa.

The tire balancer 129M2 includes one or more sensors to effect balancing of the wheel assembly 111. For example, one or more force sensors 723 are disposed on the shaft 705 to detect deflections of the wheel shroud 700 as the wheel shroud rotates around the wheel assembly. The one or more force sensors 723 may be any suitable force sensor(s) including but not limited to torque cells and/or strain gauges. The one or more force sensors 723 are in communication with the controller 129CNT in any suitable manner (such as through the wireless protocol/connection WCP) where the controller is configured to (e.g., with any suitable non-transitory program code) determine an amount of movement, in one or more of the radial R, +Z, and −Z directions, of the wheel assembly 111 based on contact of the wheel assembly 111 with one or more of the road force roller 305 and the one or more dynamic balance rollers 735A, 735B.

The wheel balancer 129M2 may also include one or more of a wheel lateral runout sensor 780 and a wheel radial runout sensor 781. The wheel lateral runout sensor 780 is any suitable sensors (optical, contact, capacitive, etc.) that is coupled to the base 700B and is positioned to detect the amount of sideways motion (lateral runout or the amount of "wobble") in of the wheel 111W (and/or tire 111T) as the wheel shroud 700 rotates around the wheel assembly 111. The wheel radial runout sensor 781 is any suitable sensors (optical, contact, capacitive, etc.) that is coupled to the base 700B and is positioned to detect a radius RAD of the wheel 111W (and/or tire 111T) for effecting a determination as to whether the radius of the wheel 111W (and/or tire 111T) is not consistent from the wheel 111W center of rotation to any given point on the rim (this radial out of round condition causes the wheel assembly to vibrate up and down or "hop" as the wheel assembly 111 spins on, e.g., a road surface). The one or more of the wheel lateral runout sensor 780 and the wheel radial runout sensor 781 are connected to (i.e., in communication with) the controller 129CNT in any suitable manner (such as through the wireless protocol/connection WCP) where the controller is configured to (e.g., with any suitable non-transitory program code) determine one or more of the lateral and radial runout of the wheel 111W based on sensor data from the one or more of the wheel lateral runout sensor 780 and the wheel radial runout sensor 781.

As may be realized, the components of the tire balancer 129M2 coupled to the wheel shroud 700 are positioned relative to each other, with or without suitable counterweighting) so that the wheel shroud 700 is rotationally balanced. Rotationally balancing the wheel shroud 700 effects balancing of the wheel assembly 111 substantially without undue influence from (i.e., independent of) variations in dynamic loading that may otherwise result from rotating the wheel shroud 700 relative to the wheel assembly 111.

The controller 129CNT is configured to determine an amount of weight to be applied to the wheel assembly 111 and a location of the weight on the wheel 111W so that with the weight applied to the wheel 111W the wheel assembly is balanced. In one aspect, the amount of and position of the weight is determined based on sensor data from the one or more force sensor 723; while in other aspects, the amount of and position of the weight is determined based on the sensor data from the one or more force sensor 723 and at least one of the one or more of the wheel lateral runout sensor 780 and the wheel radial runout sensor 781.

While the tire balancer 129M2 was described above, as having an end effector mount 129MM for coupling the tire balancer 129M1 to the at least one robotic arm 126, in other aspects, the tire balancer 129M2 may be a stand-alone floor unit (substantially similar to that shown and described herein with respect to FIG. 30D) or the tire balancer 129M2 may be a component of tire changing system 100, 100A (see FIGS. 1A, 1B and 35) where the vehicle 110 is driven into the alignment cell and onto the tire balancer 129M2 (which is generally referred to in FIGS. 1 and 35 as tire balancer 129MS).

Figure 21:
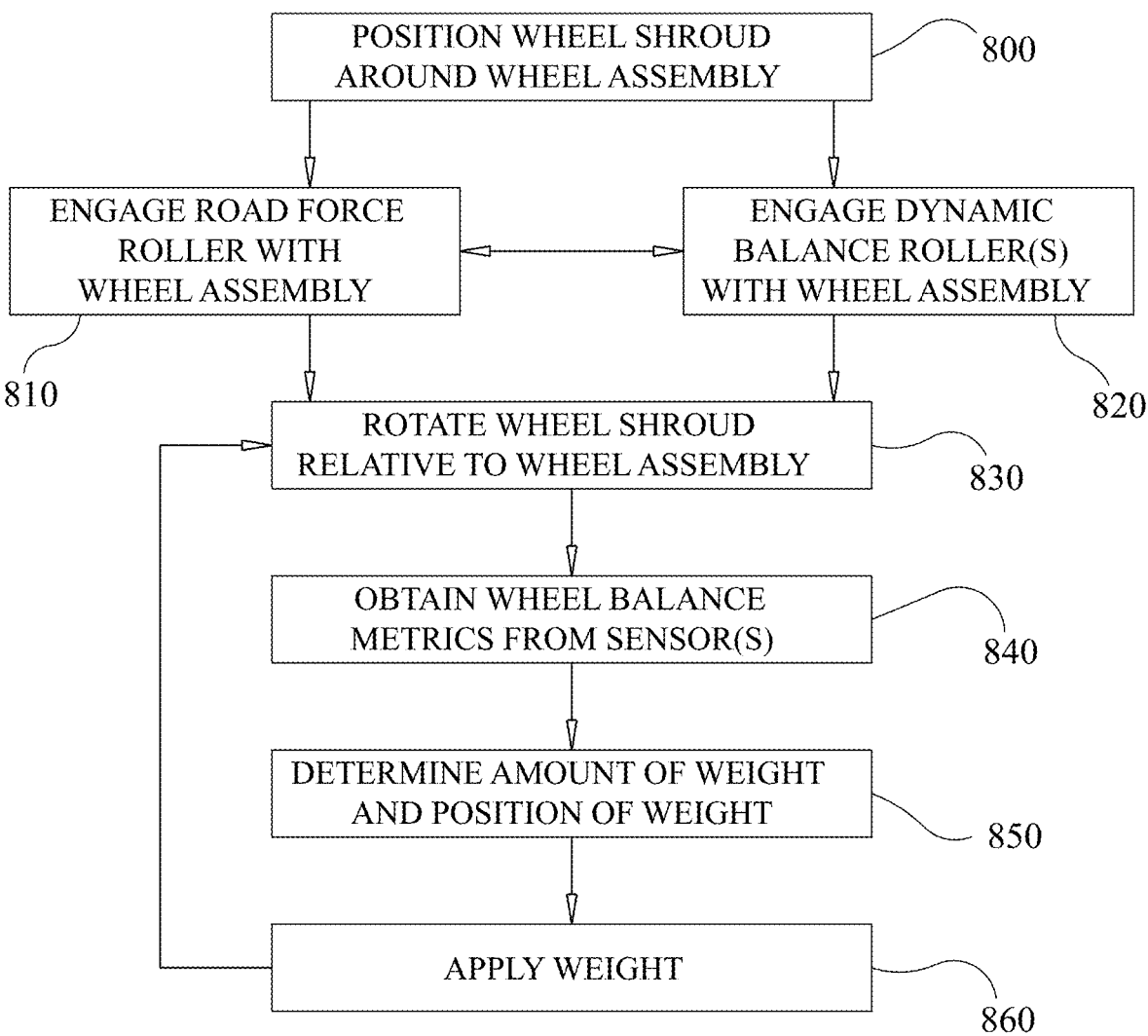
FIG. 21 is an exemplary flow diagram of a method in accordance with aspects of the present disclosure.

Still referring to FIGS. 20A-20D and also to FIG. 21, an exemplary operation of the tire balancer 129M2 will be described. The at least one robotic arm 126 positions the wheel shroud 700 around the wheel assembly 111, with the wheel assembly in situ the vehicle 110 (FIG. 21, Block 800)

so that the centering protrusion 760 engages the lugs 765 and the wheel shroud 700 is substantially centered with respect to the wheel assembly 111. One or more of the road force roller 305 and dynamic balance rollers 735A, 735B are moved radially, by their respective motors 720, 721, so as to engage (e.g., substantially contact) the tire 111T (FIG. 21, Block 810 and/or FIG. 21, Block 820). The wheel shroud 700 is rotated, by the motor 710, relative to the wheel assembly (FIG. 21, Block 830) and the wheel balance metrics (e.g., one or more of the radial runout, lateral runout, and shaft deflections) are obtained from the sensors (e.g., respective ones of the force sensor 723, the radial runout sensor 781, and lateral runout sensor 780) (FIG. 21, Block 840). The amount of weight to be coupled to the wheel 111W and the location of weight to be coupled to the wheel are determined (FIG. 21, Block 850) by the controller 129CNT in any suitable manner, where the weight is coupled to the wheel assembly (FIG. 21, Block 860) in any suitable manner (such as by a human operator or automation) so that the wheel assembly 111 is balanced.

Figure 22A:
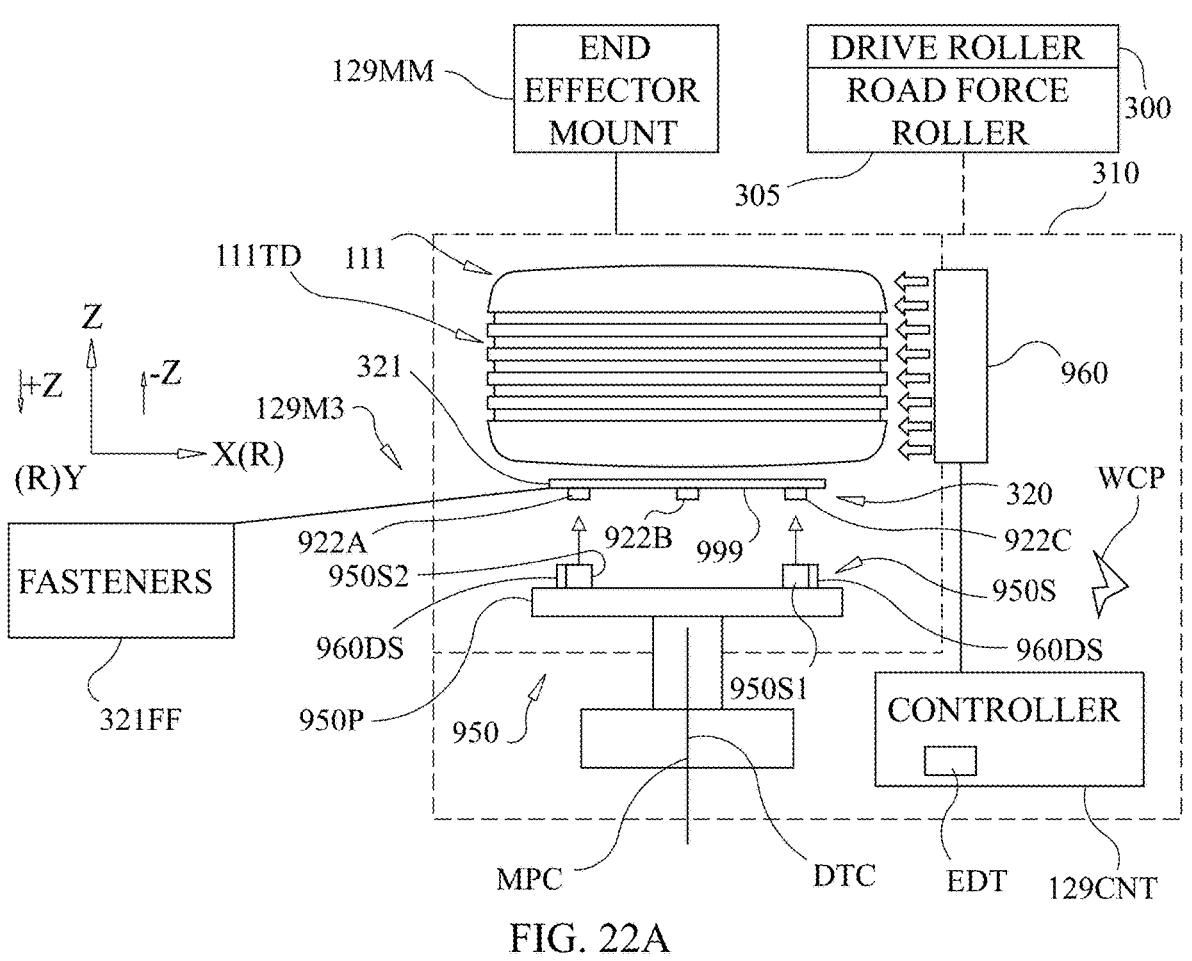
FIGS. 22A-22B are schematic illustrations of a portion of an automated tire changing system in accordance with aspects of the present disclosure.
Figure 22B:
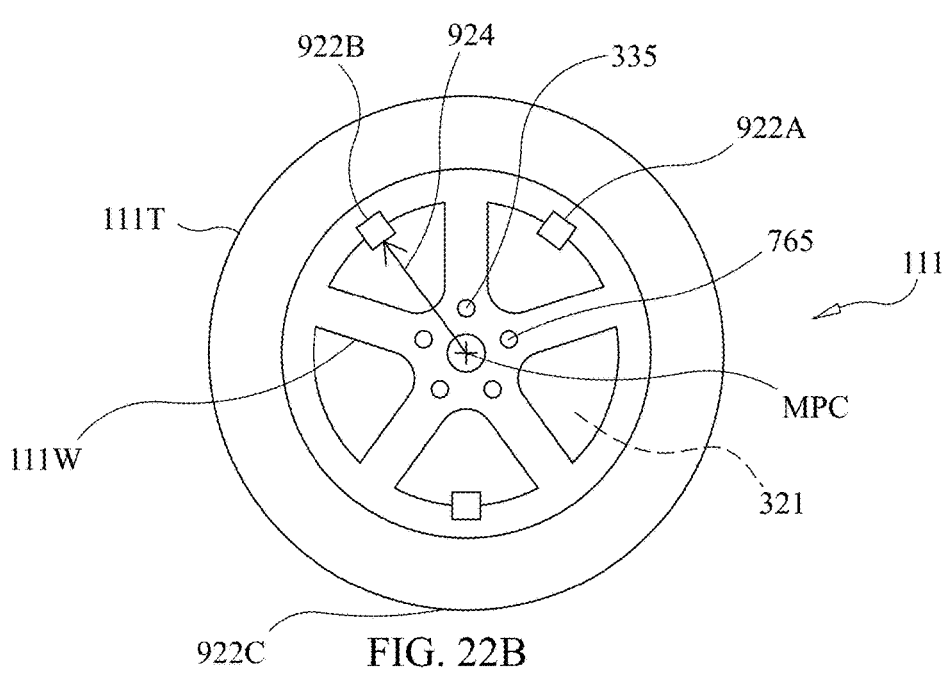

Referring now to FIGS. 22A and 22B, a tire balancer 129M3 is illustrated. The tire balancer may be substantially similar to tire balancer 129M1; however, in this aspect the tire balancer 129M3 employs passive fiducials 821A, 821B, 821C on the mounting plate 321 (of the remote motion detection module 320) and one or more detectors 950, 960 on the frame 310. The passive fiducials 922A, 922B, 922C are arranged on the mounting plate 321 in a manner similar to that described above with respect to motion sensors 322A, 322B, 322C. The passive fiducials 922A, 922B, 922C may be any suitable fiducial configured to be sensed by an optical, capacitive, and/or inductive sensor. For example, the passive fiducials 922A, 922B, 922C may be reflectors and/or metallic pads that extend or otherwise protrude from the sensed face 999; however, in other aspects the passive fiducials may be recessed at least partially within the mounting plate 321 so as to be substantially flush with or protrude from the sensed face 999; while in still other aspects, the passive fiducials may be stickers (having minimal thickness) that are adhered to the sensed face 999 in any suitable manner.

[2] The detectors 950 are mounted to a detector mount 950P that is coupled to the frame 310 so as to face the sensed face 999 of the mounting plate 321 with the mounting plate 321 coupled to the wheel assembly 111 and with the frame 310 positioned relative to the wheel assembly 111 to effect rotation of the wheel assembly 111. The detectors 950 include one or more optical sensor, capacitive sensor, inductive sensor, and/or any other suitable sensor (collectively referred to herein as sensors 950S) configured to detect the passive fiducials 922A, 922B, 922C.

Each passive fiducial 922A, 922B, 922C is positioned on the mounting plate 321 at a predetermined radial distance 924 from a center MPC of the mounting plate 321. With the mounting plate 321 coupled to the wheel assembly 111 and with the frame 310 positioned relative to the wheel assembly 111 to effect rotation of the wheel assembly 111, a center DTC of the detectors 950 is substantially aligned (e.g., coaxial) with the center MPC of the mounting plate 321. The sensors 950S (two sensors 950S1, 950S1 are shown for illustrative purposes) are arranged to be the distance 924 from the center DTC so as to be radially aligned with the passive fiducials 922A, 922B, 922C.

The detectors 950 and the mounting plate 321 are configured to detect wheel hop (e.g., up and down vibration) during balancing of the wheel assembly 111. The detectors are coupled to the controller over any suitable wireless communication protocol/connection WCP so as to transmit sensor data to the controller for determining an amount of wheel hop.

The detectors 960 include at least one optical sensor such as laser scanners, vision systems (e.g., cameras), diffuse sensors, reflective sensors, through-beams sensors or any other suitable sensor for sensing the tire 111T. The detectors 960 are coupled to the frame 310 so as to face the tread 111TD of the tire 111T and have a width that is greater than the width of the tire 111T so as to detect lateral (e.g., +Z and/or −Z) movement of the tire 111T as the tire is spun by the drive roller 300. In other aspects, a distance sensor 960DS, such as a laser distance sensor, the capacitive sensor, and/or the inductive sensor (noting the distance sensors may be integral with or the same as the detectors 950S in the case of capacitive and inductive sensors) may be coupled to the detector mount 950P so that the lateral movement of the wheel assembly 111 is detected by the interface between the distance sensor 960DS and the sensed faced 999 and/or passive fiducials 922A, 922B, 922C of the mounting plate 321.

While the tire balancer 129M3 was described above, as having an end effector mount 129MM for coupling the tire balancer 129M3 to the at least one robotic arm 126, in other aspects, the tire balancer 129M3 may be a stand-alone floor unit (substantially similar to that shown and described herein with respect to FIG. 30D) or the tire balancer 129M3 may be a component of tire changing system 100, 100A (see FIGS. 1A, 1B and 35) where the vehicle 110 is driven into the alignment cell and onto the tire balancer 129M3 (which is generally referred to in FIGS. 1 and 35 as tire balancer 129MS).

Still referring to FIGS. 22A and 22B and also to 10, an exemplary operation of the tire balancer 129M3 will be described. The tire balancer 129M3 is positioned relative to the wheel assembly 111 (with the wheel assembly 111 in situ the vehicle 110) in any suitable manner (FIG. 23, Block 200), such as by the at least one robotic arm 126 so that the drive roller 300 and road force roller 305 are in substantial contact with the tire 111T. The controller 129CNT operates the drive motor(s) DM to that the drive roller 300 drivingly rotates the wheel assembly 111 (FIG. 23, Block 210) with the drive force roller 305 applying a simulated road force to the wheel assembly 111.

Figure 23:
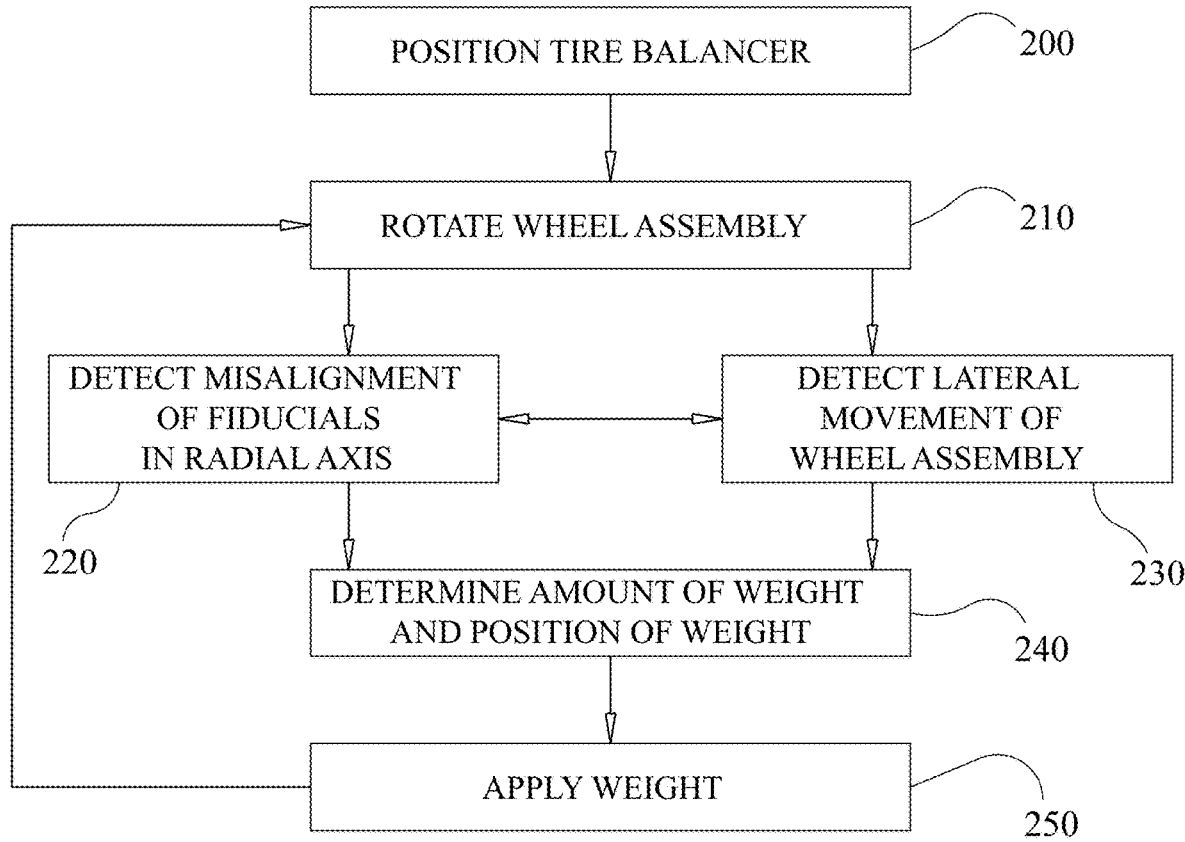
FIG. 23 is an exemplary flow diagram of a method in accordance with aspects of the present disclosure.

With the wheel assembly 111 rotating the detectors 950 detect fiducial misalignment between the detectors 950 and the fiducials in the radial acceleration R direction (FIG. 23, Block 220). The detectors send sensor signals, embodying the fiducial alignment data, to the controller 129CNT.

With the wheel assembly 111 rotating the detectors 960 detect lateral movement of the tire 111T (and the wheel assembly 111), relative to the detectors 960, in the axial acceleration direction (e.g., +Z and/or −Z directions) (FIG. 23, Block 220). The detectors 960 send sensor signals, embodying the lateral movement data, to the controller 129CNT.

An amount of weight and a position of the weight is determined based on the detected fiducial misalignment and/or the detected lateral movement (FIG. 23, Block 240). For example, the controller 129CNT includes an empirically derived table EDT that correlates amounts of weights and positions of those weights on the wheel assembly 111 to the detected fiducial misalignment and/or the detected lateral movement. There may be an empirically derived table EDT for each different tire 111T and wheel 111W combinations such that based on the detected fiducial misalignment and/or the detected lateral movement and the tire/wheel combination the controller 129CNT searches the empirically derived tables EDT to determine from the corresponding empirically derived table EDT the amount and position of the weights to be affixed to the wheel assembly 111. In other aspects, the amount and position of the weights to be affixed to the wheel assembly 111 may be determined in any suitable manner such as analytically as a function of detected axial and radial movement of the wheel assembly 111 or a wheel assembly weight distribution (e.g., as determined by the detected axial and radial movement of the wheel assembly 111 knowing the material properties and sizes of the tire and wheel).

With the amount of weight and the position of the weight determined the weight is applied to the wheel 111W (FIG. 23, Block 250) in any suitable manner (e.g., with automated equipment or manually), such as described herein.

Figure 24:
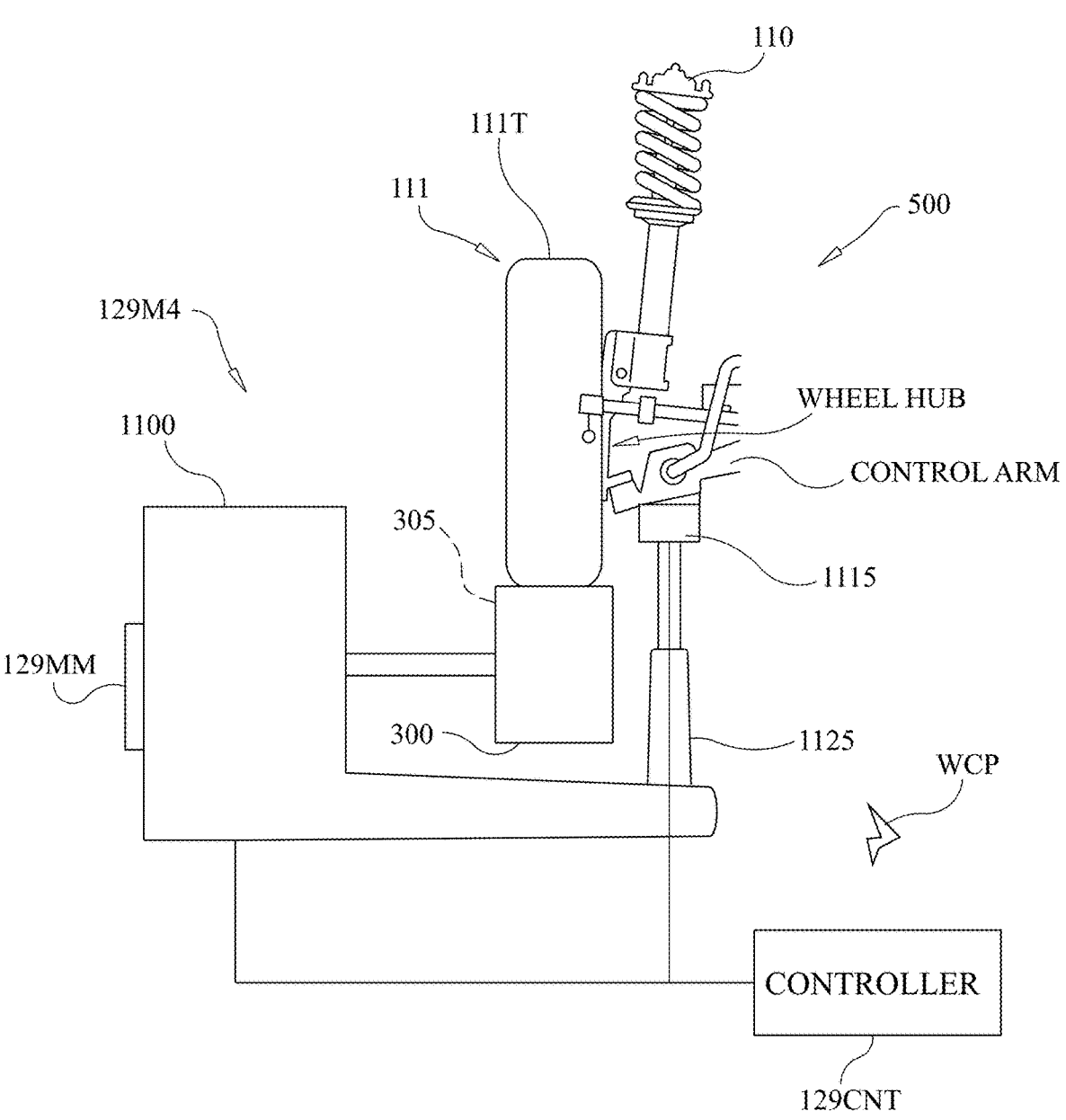
FIG. 24 is schematic illustrations of a portion of an automated tire changing system in accordance with aspects of the present disclosure.

Referring to FIG. 24, a tire balancer 129M4 is illustrated. The tire balancer 129M4 includes a frame 1100 that is in one aspect configured with an end effector mount 129MM for coupling with the robotic arm 126; while in other aspects the frame 1100 is configured for placement on a floor of a tire changing station (such as shown in FIG. 35). The frame 1100 may be substantially similar to frame 310 and include at least a drive roller 300 and its corresponding drive motor DM. The frame 1100 may also include a road force roller 305.

Any suitable vibration sensor 1115 is coupled to the frame 1100. The vibration sensor 1115 may be one or more accelerometers, a non-contact optical displacement sensor, or any other suitable sensor configured to sense vibrations of the wheel assembly 111 and/or vehicle suspension components 500 and send signals embodying the detected vibrations to the controller 129CNT over a wired or wireless connection/protocol WCP. The vibration sensor 1115 may be coupled to the frame 1100 in any suitable manner, such as by a lift 1125 that raises and lowers the vibration sensor 1115 relative to the frame. The lift 1125, under control of controller 129CNT, is raised to place the vibration sensor in contact with, for example, the any suitable portion of the vehicle suspension components 500 (e.g., such as a control arm). The lift 1125 and/or vibration sensor 1115 may include any suitable contact, optical, capacitive, resistive, etc. sensor configured to detect contact between the vibration sensor 1115 and the vehicle suspension components 500 so as to signals to the controller with respect to stopping travel of the lift once contact is made.

The vibration sensor 1115 includes any suitable magnets, clamps, etc. that engage the vehicle suspension components 500 to hold the vibration sensor 1115 to the vehicle suspension components 500. In one aspect, the vibration sensor 1115 may be releasable from the lift, such that with the vibration sensor 1115 is held contact with the vehicle suspension components 500 (e.g., via magnet, clamp, etc.), the vibration sensor 1115 is automatically disengaged from the lift 1125 and the lift 1125 is lowered so as not to dampen any vibration caused by wheel assembly imbalance; in other aspects, the lift 115 may have a spring rate/force sufficient to raise the vibration sensor 1115 into contact with the vehicle suspension components 500 but such spring rate/force is negligible with respect to vibration induced by wheel assembly imbalance. In other aspects the vibration sensor 1115 may be manually coupled to the vehicle suspension components 500 in any suitable manner (e.g., magnetically, mechanical fasteners/clamps, etc.).

Figure 25:
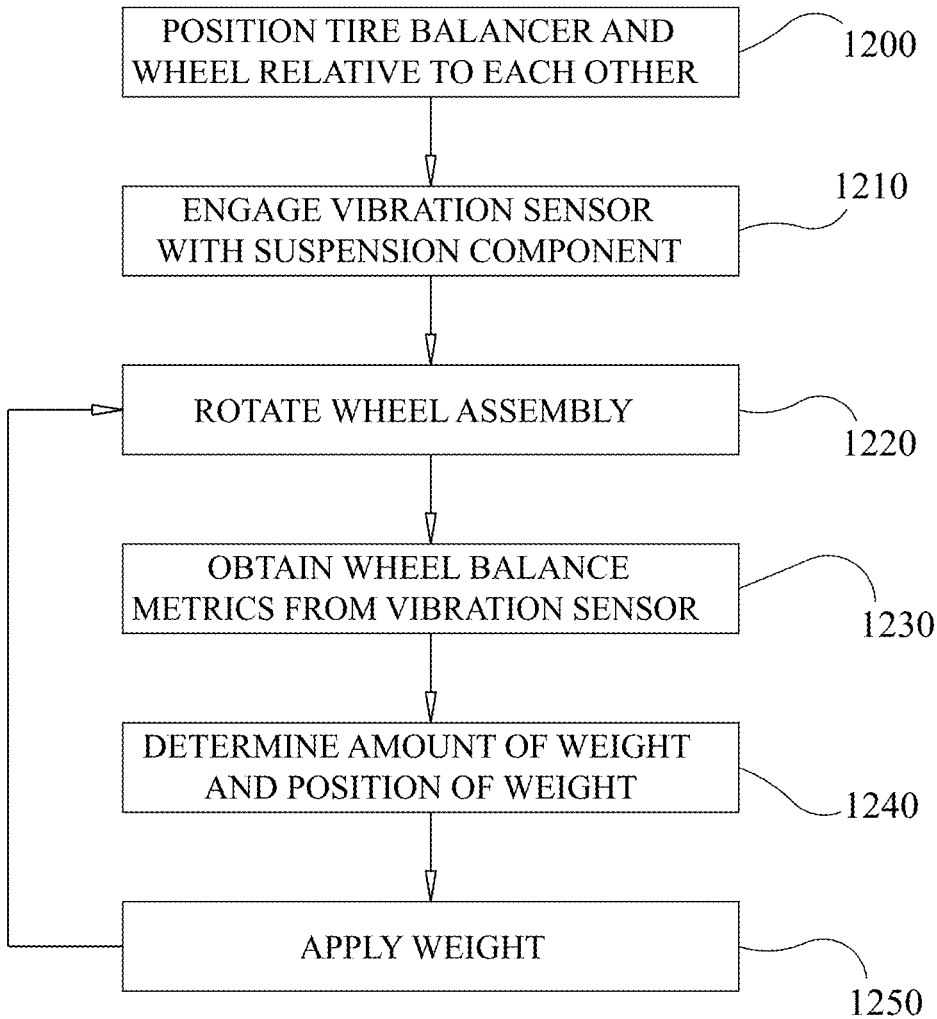
FIG. 25 is an exemplary flow diagram of a method in accordance with aspects of the present disclosure.

Still referring to FIG. 24, and also to FIG. 25, in operation the tire balancer 129M4 and the wheel assembly 111 are positioned relative to one another (FIG. 25, Block 1200). In one aspect, the robotic arm positions the tire balancer

129M4 relative to the wheel assembly 111 such as with the vehicle 110 on a lift 170; while in other aspects, the vehicle 110 is driven onto the rollers 300, 305 of the tire balancer 129M4.

The vibration sensor 1115 is engaged with the vehicle suspension components 500 (FIG. 25, Block 1210) in the manner described above. The wheel assembly 111 is rotated (e.g., by the drive roller 300) (FIG. 25, Block 1220) and wheel balance metrics are obtained at least in part from the vibration sensor (FIG. 25, Block 1230), e.g., the vibration sensor 1115 senses vibrations in the vehicle suspension components 500 that are indicative of wheel assembly 111 imbalance. The vibration sensor 1115 sends signals to the controller 129CNT embodying the wheel balance metrics and the controller 129CNT is configured to determine, based on the wheel balance metrics (e.g., including vibrations, wheel rotation position, etc.) an amount of wheel weight and a position of the wheel weight 3188 (see, e.g., FIGS. 44A and 56) on the wheel 111W (FIG. 25, Block 1240) to effect balancing of the wheel assembly 111. The wheel weight 3188 may be applied (FIG. 25, Block 1250) with any suitable automation or manually.

Figures 26A, 26B:
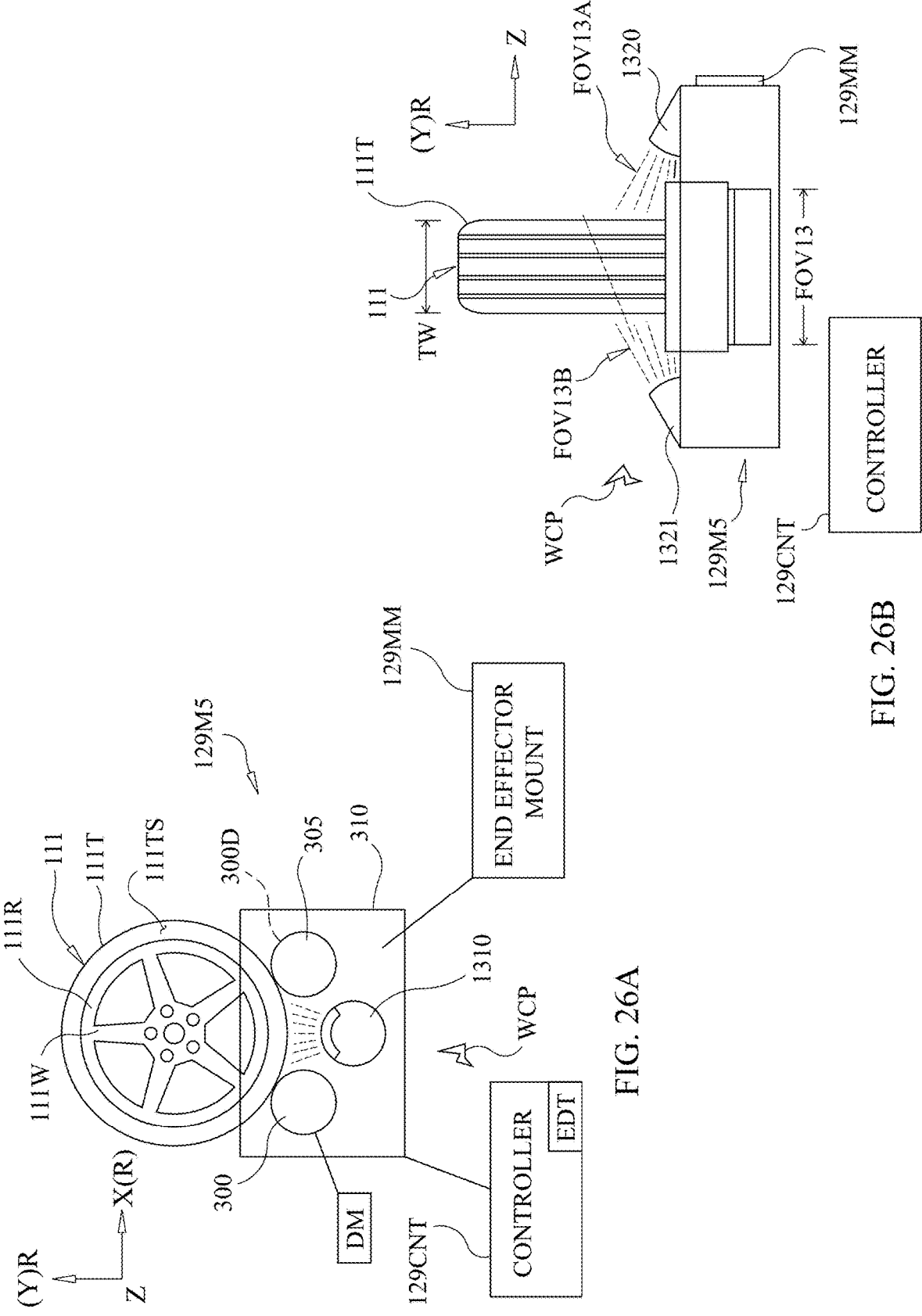
FIGS. 26A-26C are schematic illustrations of a portion of an automated tire changing system in accordance with aspects of the present disclosure.
Figure 26C:
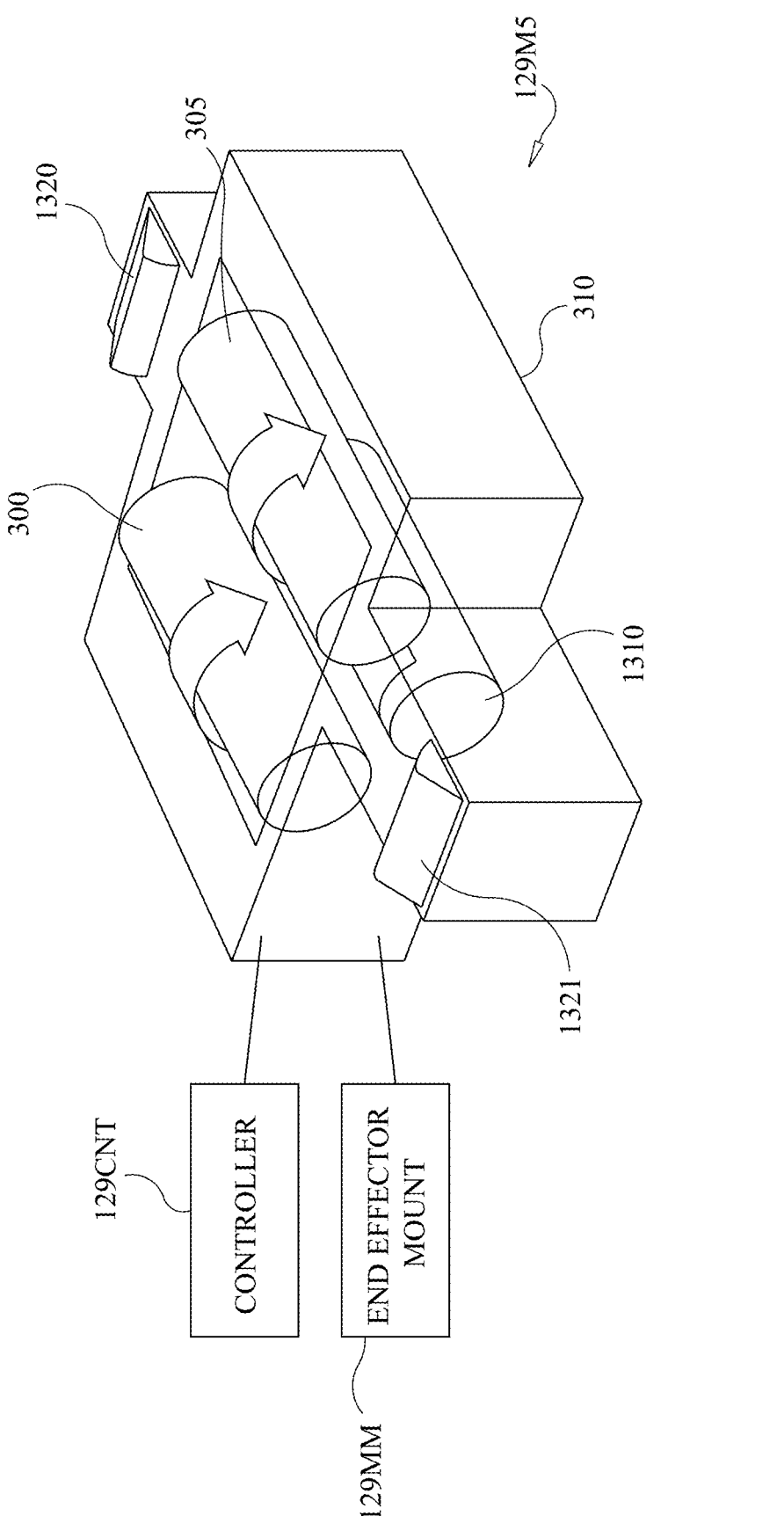

Referring to FIGS. 26A-26C, a tire balancer 129M5 is illustrated. The tire balancer 129M5 may be substantially similar to tire balancer 129M1; however in this aspect the tire balancer 129M5 employs an optical sensing system (e.g., that includes one or more of an optical runout sensor 1310 and at least one optical point sensor 1320, 1321) to detect one or more of high and low points of radial runout of the wheel assembly 111, radial runout of the wheel assembly 111, and lateral runout of the wheel assembly 111. While the tire balancer 129M5 is illustrated as having drive roller 300 and road force roller 305, in other aspects, tire balancer 129M5 may include an idle (non-driven) roller 300D in place of the drive force roller 305, or in other aspects, the rollers may form or be part of a dynamometer.

The tire balancer 129M5 includes optical scanner 1310. The optical runout sensor 1310 is configured to detect both radial runout and lateral runout of the wheel assembly 111; while in other aspects, there may be separate optical scanners for respectively detecting the radial runout and lateral runout. For exemplary purposes, the optical runout sensor 1310 may be any suitable three-dimensional scanner including, but not limited to, LIDAR (light detection and ranging), ViDAR (video or visual detection and ranging), and time-of-flight cameras. The optical runout sensor 1310 is coupled to the frame 310 in any suitable manner so as to be disposed beneath the tire 111T with the wheel assembly 111 disposed on the rollers 300, 305. In one aspect, the optical runout sensor 1310 is disposed substantially between the rollers 300, 305 but in other aspects may be positioned at any suitable location on the frame 310 so as to image the thread (e.g., tire width) of the tire 111T. The optical runout sensor 1310 has a width (or field of view) FOV13 that is greater than the width TW of the tire. The optical runout sensor 1310 provides detection signals (both ranging and position signals) to the controller 129CNT and the controller 219CNT is configured to determine (based on the detection signals) the radial and lateral runout of the wheel assembly 111.

The tire balancer 129M5 includes one or more optical point sensors 1320, 1321 that are coupled to the frame 310 in any suitable locations so as to image at least one lateral side of the wheel assembly 111. For example, optical point sensor 1320 is disposed on one lateral side of the wheel assembly 111 while optical point sensor 1321 is disposed on the opposite lateral side of the wheel assembly 111 (see FIG. 26B); while in other aspect, there may be but one optical point sensor located on the frame 310 so as to be positioned on but one lateral side of the wheel assembly. Each of the optical point sensors 1320, 1321 has a field of view FOV13A, FOV13B that is shaped and sized to as to image or otherwise detect a sidewall 111TS of the tire 111T and at least a rim 111R of the wheel 111W. Each of the optical point sensors 1320, 1321 provides detection signals to the controller 129CNT and the controller 219CNT is configured to determine (based on the detection signals) the high and low points of the radial runout of the wheel assembly 111.

The optical runout sensor 1310 and the one or more optical point sensors 1320, 1321 are communicably connected to the controller 129CNT in any suitable manner, such as through a wireless connection (such as wireless communication protocol WCP) and/or a wired connection.

While the tire balancer 129M5 was described above, as having an end effector mount 129MM for coupling the tire balancer 129M5 to the at least one robotic arm 126, in other aspects, the tire balancer 129M5 may be a stand-alone floor unit (substantially similar to that shown and described herein with respect to FIG. 30D) or the tire balancer 129M5 may be a component of tire changing system 100, 100A (see FIGS. 1A, 1B and 35) where the vehicle 110 is driven into the alignment cell and onto the tire balancer 129M5 (which is generally referred to in FIGS. 1 and 35 as tire balancer 129MS).

Still referring to FIGS. 26A-26C and also to FIG. 27, an exemplary operation of the tire balancer 129M5 will be described. The tire balancer 129M5 is positioned relative to the wheel assembly 111 or vice versa (with the wheel assembly 111 in situ the vehicle 110) in any suitable manner (FIG. 27, Block 1400), such as by the at least one robotic arm 126 so that the drive roller 300 and road force roller 305 are in substantial contact with the tire 111T. In other aspects, the tire balancer 129M5 may be a component of tire changing system 100, 100A (see FIGS. 1A, 1B and 35) where the vehicle 110 is driven into the alignment cell and onto the tire balancer 129M5. The controller 129CNT operates the drive motor(s) DM so that the drive roller 300 drivingly rotates the wheel assembly 111 (FIG. 27, Block 1410) with the drive force roller 305 applying a simulated road force to the wheel assembly 111.

Figure 27:
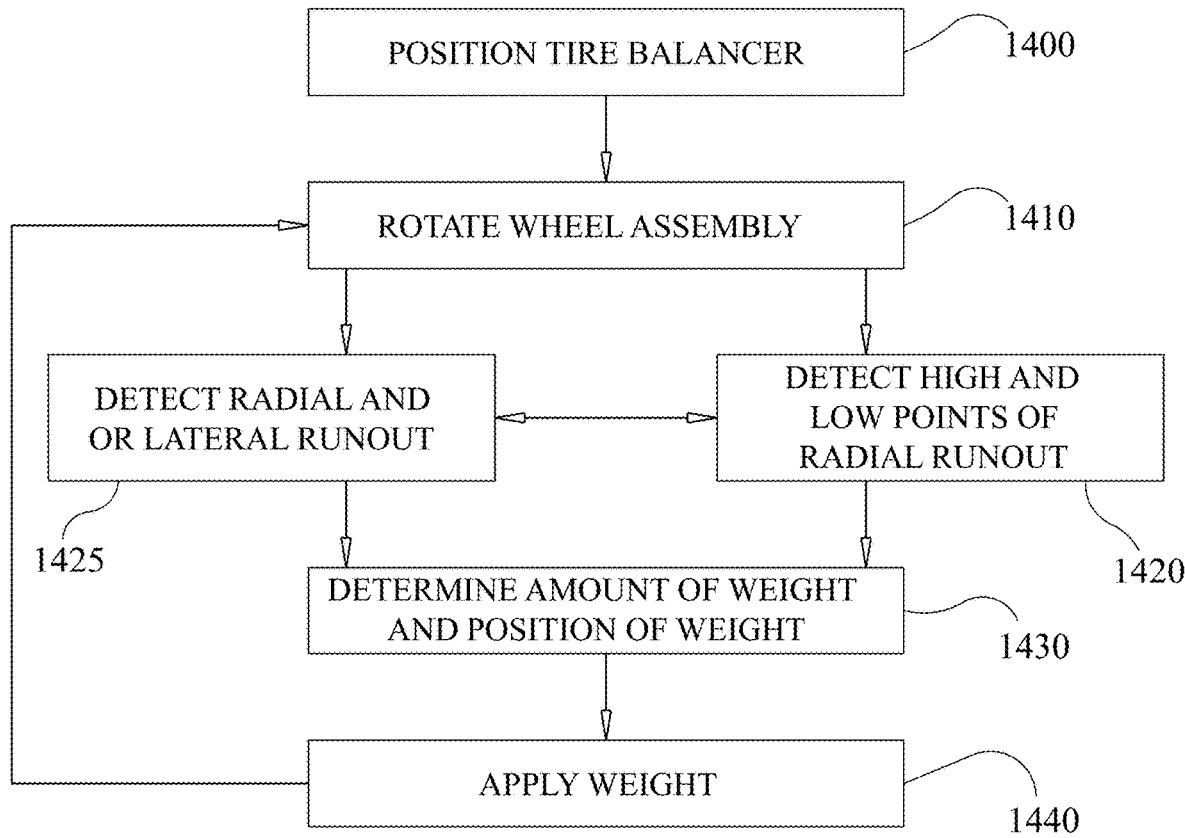
FIG. 27 is an exemplary flow diagram of a method in accordance with aspects of the present disclosure.

With the wheel assembly 111 rotating the optical runout sensor 1310 detects movement of the wheel assembly 111 in one or more of the radial acceleration R direction and the axial acceleration direction (e.g., +Z and/or −Z directions) (FIG. 27, Block 1425). The optical runout sensor 1310 sends sensor signals, embodying data corresponding to the detected movement of the wheel assembly 111 in the radial and axial acceleration directions, to the controller 129CNT.

With the wheel assembly 111 rotating the at least one optical point sensor 1320, 1321 detect(s) the high and low points of the radial runout of the wheel assembly 111 (FIG. 27, Block 1420). The at least one optical point sensor 1320, 1321 send sensor signals, embodying the high and low point data, to the controller 129CNT.

An amount of weight and a position of the weight is determined based on the movement of the wheel assembly 111 in the radial and axial acceleration directions and/or the high and low point data (FIG. 27, Block 1430). For example, the controller 129CNT includes an empirically derived table EDT that correlates amounts of weights and positions of those weights on the wheel assembly 111 to the detected movement of the wheel assembly 111 in the radial and axial acceleration directions and/or the detected high and low point data. There may be an empirically derived table EDT for each different tire 111T and wheel 111W combinations such that based on the tire/wheel combination and the detected movement of the wheel assembly 111 in the radial and axial acceleration directions and/or the detected high and low point data the controller 129CNT searches the empirically derived tables EDT to determine from the corresponding empirically derived table EDT the amount and position of the weights to be affixed to the wheel assembly 111. In other aspects, the amount and position of the weights to be affixed to the wheel assembly 111 may be determined in any suitable manner such as analytically as a function of the detected movement of the wheel assembly 111 in the radial and axial acceleration directions and/or the detected high and low point data knowing the material properties and sizes of the tire and wheel.

With the amount of weight and the position of the weight determined the weight is applied to the wheel 111W (FIG. 27, Block 1440) in any suitable manner (e.g., with automated equipment or manually), such as described herein.

Figure 28A:
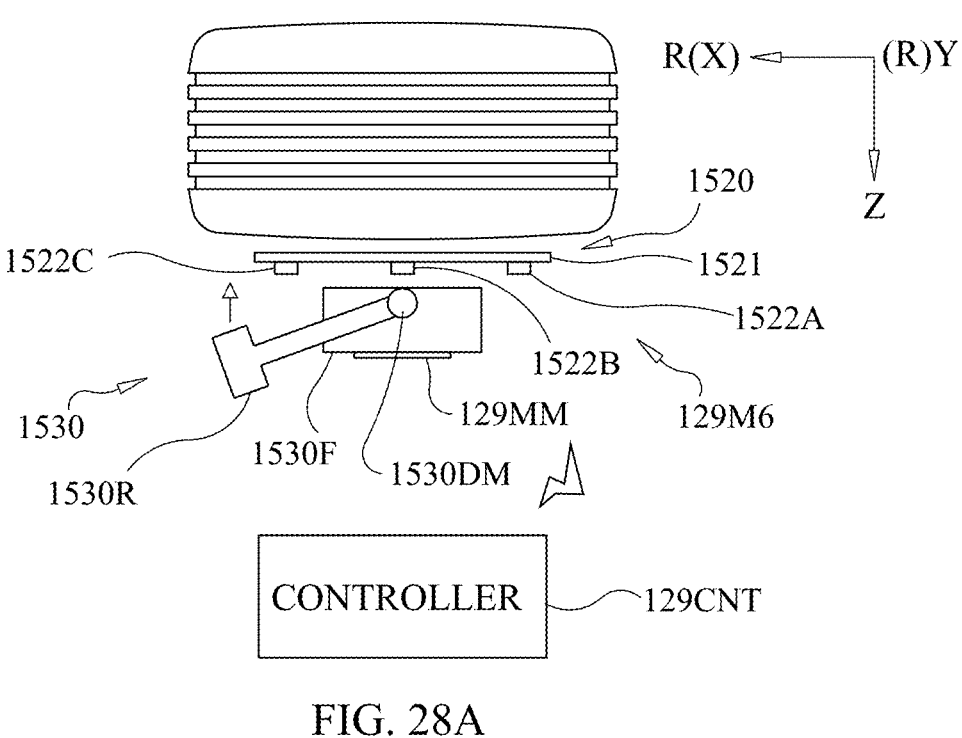
FIGS. 28A-28B are schematic illustrations of a portion of an automated tire changing system in accordance with aspects of the present disclosure.
Figure 28B:
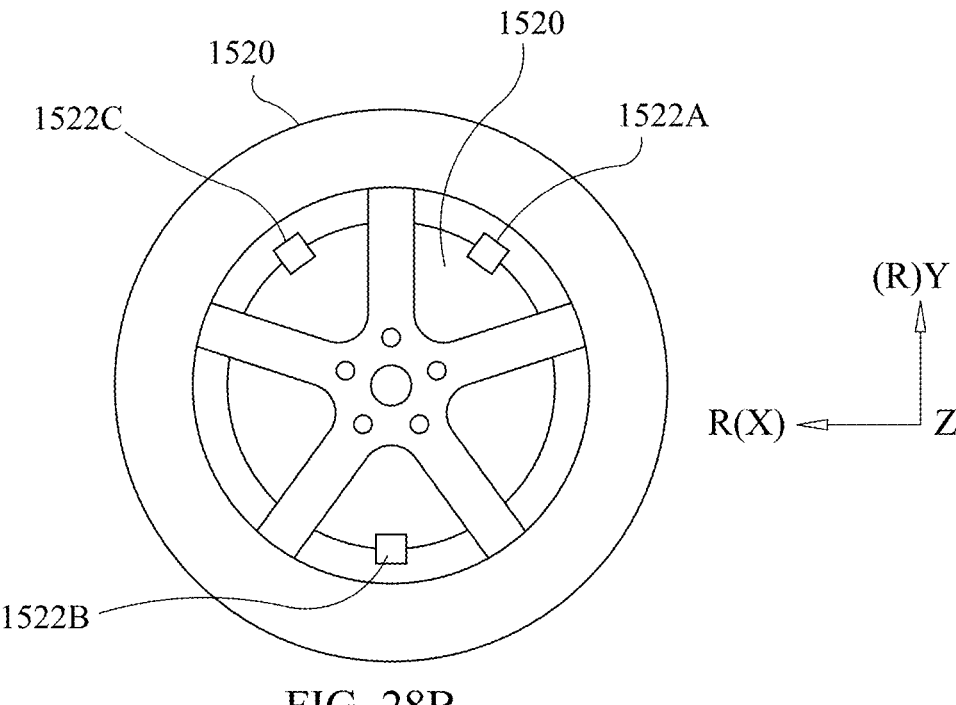

Referring to FIGS. 28A and 28B a tire balancer 129M6 is illustrated. The tire balancer 129M6 includes a remote motion detection module 1520 and a vibration inducing member 1530. The remote motion detection module 1520 may be substantially similar to the remote motion detection module 320 described herein and includes a mounting plate 1521 to which motion sensors 1522A, 1522B, 1522C are coupled. The motion sensors 1522A, 1522B, 1522C are substantially similar to motion sensors 320A, 320B, 320C described herein. For example, the motion sensors 1522A, 1522B, 1522C may each include a three-dimensional motion sensor configured to detect accelerations in at least one radial direction R (e.g., one of X and Y) and in the +/−Z direction.

The vibration inducing member 1530 includes a frame 153OF that includes an end effector mount 129MM for coupling the vibration inducing member 1530 to the robotic arm 126. In other aspects, the vibration inducing member 1530 may be stationary/fixed at any suitable location of a tire changing station (see FIGS. 1B and 35) that provides for the vibration inducing member 1530 inducing vibration to the wheel assembly 111. The vibration inducing member 1530 is any suitable actuator that includes a drive 1530DM and an impactor 1530R (e.g., hammer, rod, etc.). The drive 1530DM is configured to effect a striking movement of the impactor 1530R (one or more of a rotary motion and linear motion) against the wheel 111W (or the tire 111T) for inducing vibration of the wheel assembly 111. The impinger 1530R is configured to induce vibration in the wheel 111W without leaving marks on the wheel (e.g., the portion of the impactor 1530R striking the wheel 111W includes a nonmarking pad that interfaces with the wheel 111W).

The controller 129CNT is communicably coupled to the motion sensors 1522A, 1522B, 1522C so that with the wheel 111W struck by the impactor 1530R, the motion sensors 1522A, 1522B, 1522C sense vibrations of the wheel 111W and send signals to the controller 129CNT embodying those vibrations. Where the tire assembly is balanced the vibrations (e.g., frequency) of the wheel 111W sensed by the different motion sensors 1522A, 1522B, 1522C may be substantially similar. Where the tire assembly is imbalanced the vibrations (e.g., frequency) of the wheel 111W sensed by the different motion sensors 1522A, 1522B, 1522C may be different. The controller 129CNT is configured to analyze the different frequencies from the different motion sensors 1522A, 1522B, 1522C and determine an amount of weight and location of weight to be applied to the wheel 111W to effect balancing of the wheel assembly 111 (and e.g., make the vibration frequencies sensed by the different sensors 1522A, 1522B, 1522C substantially the same).

Figure 29:
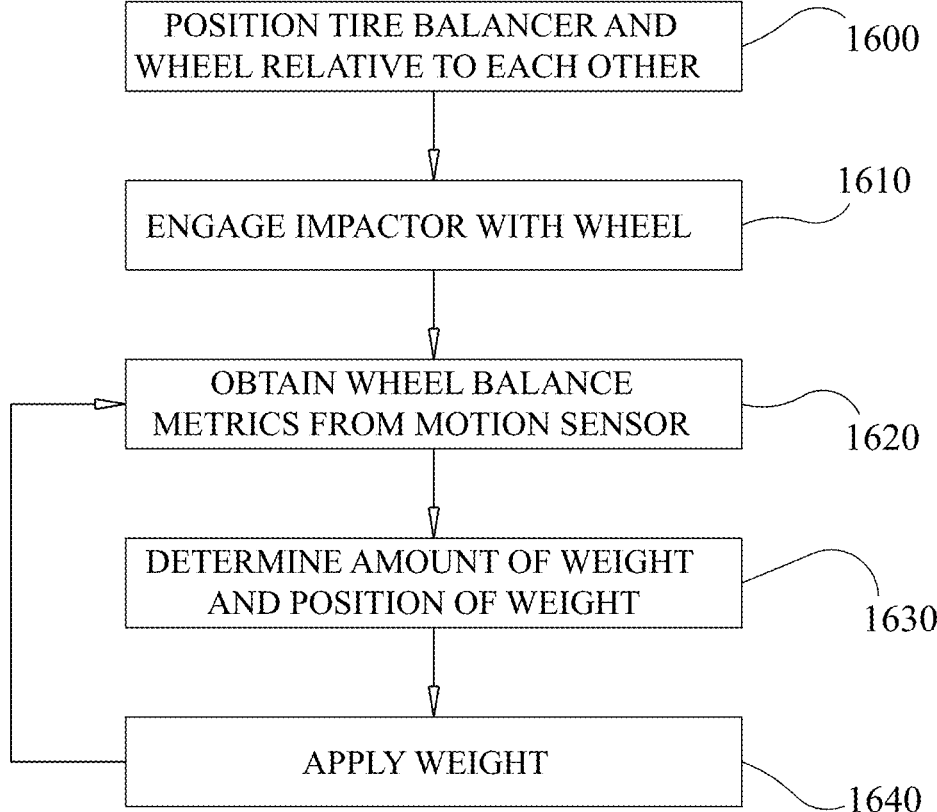
FIG. 29 is an exemplary flow diagram of a method in accordance with aspects of the present disclosure.

Referring to FIGS. 28A, 28B and 16, in operation the tire balancer 129M6 and the wheel assembly 111 are positioned relative to one another (FIG. 29, Block 1600). In one aspect, the robotic arm positions the tire balancer 129M6 relative to the wheel assembly 111 such as with the vehicle 110 on a lift 170; while in other aspects, the vehicle 110 is driven to a tire changing station (such as those described herein) to position the wheel assembly 111 relative to the tire balancer 129M6; while in still other aspects, the tire balancer may be a module unit (e.g., cart) that is positioned adjacent the wheel assembly 111.

The controller 129CNT operates the drive 1530DM so that the impactor 1530R is driven to strike the wheel 111W (or tire 111T) (FIG. 29, Block 1610) and induce vibration of the wheel assembly 111. Wheel balance metrics (e.g., vibrational frequencies) are obtained by the controller 129CNT from the motion sensors 1522A, 1522B, 1522C (FIG. 29, Block 1620) and the controller 129CNT determines an amount of wheel weight and position of the wheel weight 3188 (FIG. 29, Block 1630; see also, e.g., FIGS. 44A and 56), based on the detected vibrational characteristics of the wheel assembly 111, to effect balancing of the wheel assembly. The wheel weight 3188 may be applied to the wheel 111W in any suitable manner such as manually and/or with automation.

Referring to FIGS. 30A-30C, a tire balancer 129M7 is illustrated. The tire balancer 129M7 includes a frame 310, a drive roller 300, a road force roller 305, and drive motors that are substantially similar to any one or more of tire balancers 129M1, 129M2, 129M3, and 129M5; however, in this aspect one or more sensors for detecting imbalances of the wheel assembly 111 are integrated into the wheel weights 1701. For example, each wheel weight 1701 include an adhesive backing 1705 configured to adhere the wheel weight 1701 to the wheel 111W. The wheel weight 1701 also includes an inertial measurement unit 1702 integrally formed therewith so that the wheel weight 1701 itself detects the radial accelerations R (e.g., up and down vibrations or "hop") and both the positive axial accelerations +Z and negative axial accelerations −Z (e.g., sideways motion or "wobble") of the wheel assembly 111. The inertial measurement unit 1702 includes any suitable sensors for detecting the radial and axial accelerations, where such sensors include but are not limited to accelerometers, gyroscopes, or any other suitable sensor, one or more of which may be a Micro Electro Mechanical System (MEMS) sensor.

The wheel weight 1701 includes a wireless transmitter 1703 configured to communicate with the controller 129CNT wirelessly over wireless communication protocol/connection WCP. For example, the tire balancer 129M7 includes receivers 1720 that are configured to receive radial and axial acceleration data and transmit that data to the controller 129CNT. The controller 129CNT is configured to determine, based on the radial and axial acceleration data from the wheel weights 1701 an imbalance of a respective wheel assembly 111 and identify a change in position of the weight(s) 1701 and/or an amount of weight needed to balance the wheel assembly 111.

The wireless transmitter 1703 may be configured to communicate with the receivers 1720 over a wireless communication protocol/connection WCP that is the same as and has the same frequency as, for example, the TPMS sensors of the automobile on which the wheel assembly 111 is mounted. With the wheel weight 1701 communicating over the TPMS sensor frequency and protocol, the wheel weight

1701 is configured to send radial and axial acceleration data to the automobile computer 110CNT (e.g., during operation of the automobile on a road or other surface) where the automobile computer 110CNT is configured to determine, based on the radial and axial acceleration data from the wheel weights 1701 an imbalance of a respective wheel assembly 111 and alert an operator of the vehicle of the imbalance through any suitable user interface 110U of the automobile 110. In other aspects, the transmitter 1703 of the wheel weights 1701 is configured to communicate with a smart device 1715 (e.g., phone, tablet, etc.) where any imbalances detected for a respective wheel assembly 111 are communicated to an operator of the vehicle through the smart device 1715.

While the tire balancer 129M7 was described above, as having an end effector mount 129MM for coupling the tire balancer 129M7 to the at least one robotic arm 126, in other aspects, the tire balancer 129M7 may be a stand-alone floor unit 129M7S (see FIG. 30D) or the tire balancer 129M7 may be a component of tire changing system 100, 100A (see FIGS. 1A, 1B and 35) where the vehicle 110 is driven into the alignment cell and onto the tire balancer 129M5 (which is generally referred to in FIGS. 1 and 35 as tire balancer 129MS). For example, the tire balancer 129M7S includes a shaft 1777 to which the wheel 111W/wheel assembly 111 is coupled. A drive motor 1776 rotates the shaft 1777 (and the wheel 111W/wheel assembly 111) to effect balancing of the wheel assembly 111 as described herein.

Figure 31:
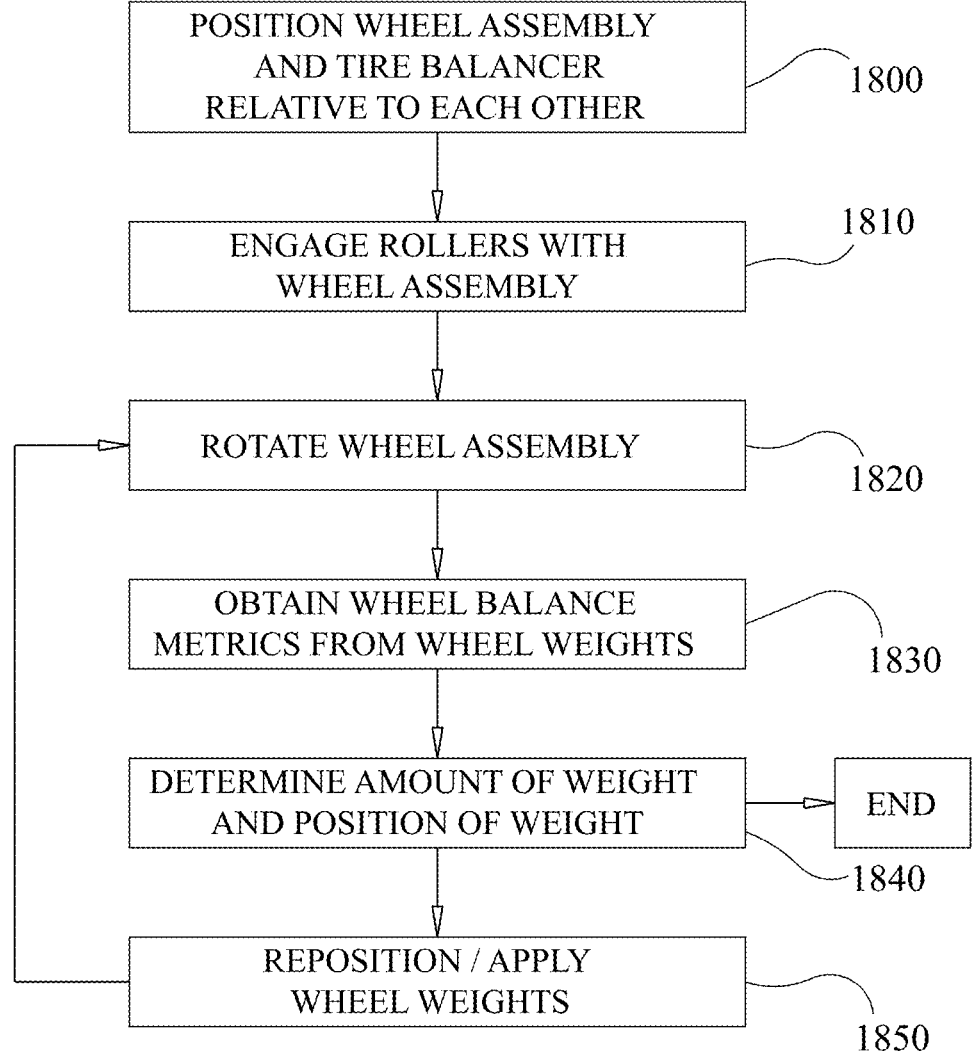
FIG. 31 is an exemplary flow diagram of a method in accordance with aspects of the present disclosure.

In operation, still referring to FIGS. 30A-30C and also to FIG. 31, the at least one robotic arm 126 positions the tire balancer 129M7 relative to the wheel assembly 111, with the wheel assembly in situ the vehicle 110; or the vehicle is driven to position the wheel assembly 111 relative to the tire balancer 129M7 (FIG. 31, Block 1800). The drive roller 300 and the road force roller 305 (and in some aspects dynamic balance rollers similar to those described herein) are moved radially, by their respective motors (substantially similar to motors 720, 721 described above), so as to engage (e.g., substantially contact) the tire 111T (FIG. 31, Block 1810). The drive roller 300 is rotated, by the motor DM, so as to rotate the wheel assembly (FIG. 31, Block 820) and wheel balance metrics (e.g., one or more of the radial runout and lateral runout) are obtained from the inertial measurement units 1702 of the respective wheel weights 1701 that are applied to the wheel 111W (FIG. 31, Block 1830).

The amount of weight to be coupled to the wheel 111W and the location of weight to be coupled to the wheel are determined (FIG. 31, Block 1840) by the controller 129CNT in any suitable manner (such as in a manner similar to that described herein). Where the location and weight determination results indicate the wheel assembly is balanced (e.g., the amount of weight and location of the wheel weights 1701 result in a balanced wheel assembly 111) the balancing procedure ends and the wheel weights 1701 remain on the wheel 111W (e.g., where in some aspects the wheel weights 1701 communicate with the automobile computer 110CNT to provide wheel assembly balance information to the user of the automobile as described herein). In other aspects, the wheel weights 1701 may be removed and replaced with conventional wheel weights 3188 (see, e.g., FIGS. 44A and 56) having the same mass and location as wheel weights 1701 removed from the wheel 111W. Where the location and weight determination results indicate the wheel assembly is not balanced one or more of repositioning of the wheel weights 1701, increasing an amount of wheel weights 1701, and decreasing an amount of wheel weights 1701 is effected based on the weight and position determination (FIG. 31, Block 1840), in any suitable manner (such as by a human operator or automation). With the wheel weights repositioned and/or the amount of wheel weights changed, Blocks 1820-1850 are repeated until the position and weight determination indicates the wheel assembly is balanced.

Referring now to FIGS. 32A-32C and 33, the high point of radial runout (referred to herein as the high point) 1900 of the tire 111T and the low point of radial runout (referred to herein as the low point) 1901 may be determined prior to balancing the wheel assembly 111 in the manners described herein. For example, a portion of a tire balancer 129M8, which may be incorporated with any one or more of the tire balancers described herein, is employed for determining (and is configured to determine, with the controller 129CNT) the high point 1900 and low point 1901 of the tire 111T and wheel 111W so that the respective high point 1900 and low point 1901 of the tire 111T and wheel 111W are positioned relative to each other when the tire 111T is mounted to the wheel 111W in a manner that may decrease/minimize the amount of weight added to the wheel assembly 111 and to effect balancing of the wheel assembly 111.

To determine the high point 190 of the tire 111T, the tire 111T is mounted to a temporary wheel 111TW (FIG. 33, Block 2000) having a known (i.e., controlled/calibrated) diameter. The temporary wheel 111TW is also balanced so that rotation of the temporary wheel 111TW, with the tire 111T mounted thereto, does not influence the determination of the high point 1900 of the tire. The location of the high point of the tire 111T is determined (FIG. 33, Block 2010) as described below. The determination of the high point 1900 location on the tire 111T may be effected off of the vehicle by any of the tire balancers 129M described herein (such as where the tire balancers are stand-alone units); while in other aspects, the temporary wheel 111TW may be mounted to the vehicle 110 and the at least one robotic arm 126 may position the tire balancer 129M for determining the high point 1900 of the tire in situ the vehicle 110. The drive roller 300 and road force roller 305 of the tire balancer 129M engage the tire 111T, the tire 111T is spun, and the radial runout is measured using any suitable sensors, such as those described herein. The location of the tire 111T having the greatest runout (e.g., the greatest distance from a center TWC of the temporary wheel 111TW) is determined by the controller 129CNT to be the high point 1900 of the tire. The high point 1900 is marked (FIG. 33, Block 2020) on the tire (e.g., with a sticker, marker, or in any other suitable manner) and the tire 111T is removed from the temporary wheel 111TW.

Figure 33:
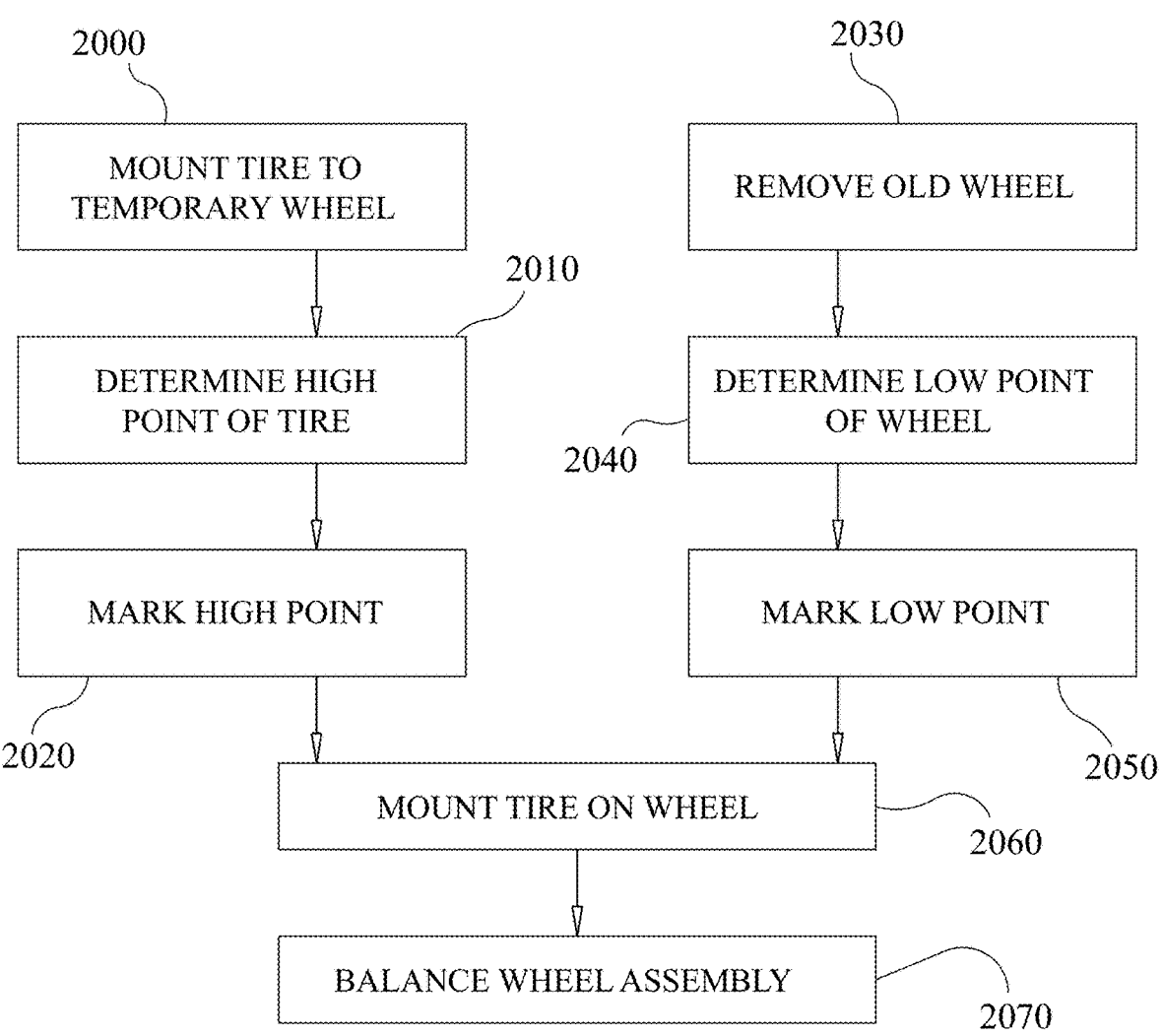

The low point 1901 of the wheel 111W may be determined with the wheel 111W in situ the vehicle 110 or with the wheel 111W removed from the vehicle 110. To determine the low point 1901 of the wheel 111W, the old tire (if replacing a tire) is removed from the wheel 111W (FIG. 33, Block 2030). Here, a low point determining apparatus 1950 is employed to determine the low point of the wheel 111W (FIG. 33, Block 2040). The low point determining apparatus 1950 may be substantially similar to the tire balancer 129M. The low point determining apparatus 1950 may be coupled to and carried by the at least one robot arm 126 or the low point determining apparatus 1950 may be a stand-alone unit. The low point determining apparatus 1950 includes a drive roller 300 (driven by drive motor DM) and a secondary roller 300S (such as the road force roller 305 or idle (non-driven) roller 300D). The drive roller 300 and secondary roller 300S are moveably coupled to the frame 310 in any suitable manner so as to be biased against the wheel 111W with the wheel 111W and low point determining apparatus 1950 positioned relative to each other for determining the low point of the wheel 111W. The low point determining apparatus 1920 includes one or more deflection sensors 1970 for determining the deflection of one or more of the drive roller 300 and secondary roller 300S relative to, for example, the frame 310 with the wheel rotating. The deflection sensor(s) 1970 send signals, to the controller 129CNT, that embody an amount of deflection of the one or more of the drive roller 300 and secondary roller 300S, where the controller 129CNT is configured to determine the low point 1901 (e.g., the point on the wheel 111W with the smallest distance DLW from a center WWC of the wheel 111W) of the wheel 111W based on the deflection data from the deflection sensor(s) 1970. The low point 1901 of the wheel 111W may be marked (FIG. 33, Block 2050) in any suitable manner, such as with a sticker, marker, etc.

Figures 32A, 32B:
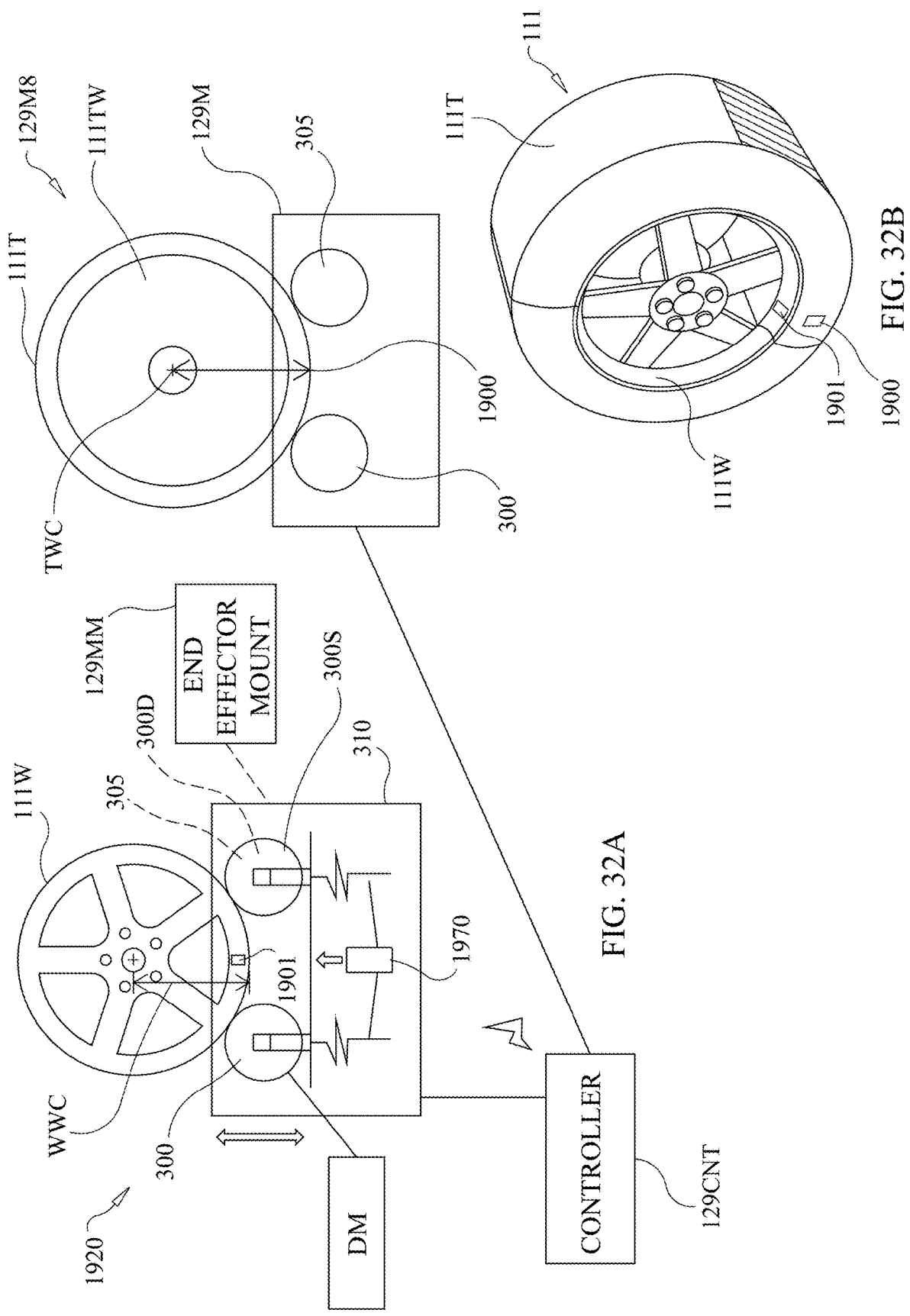

The determination of the low point 1901 and high point 1900 may be determined substantially simultaneously or one before the other. With the high point 1900 and low point 1901 determined the tire 111T is mounted to the wheel 111W (FIG. 33, Block 2060) in any suitable manner (such as automatically with the tire mount/dismount tool 129E (optical sensors may be employed by the tool 129E to align the high and low points) or manually) so that the low point 1901 and high point 1900 are aligned with each other as illustrated in FIG. 32B. The wheel assembly 111 is balanced (FIG. 33, Block 2070) in the manner described herein, where the balancing is effected by any one of the tire balancers 129M described herein.

Figure 34:
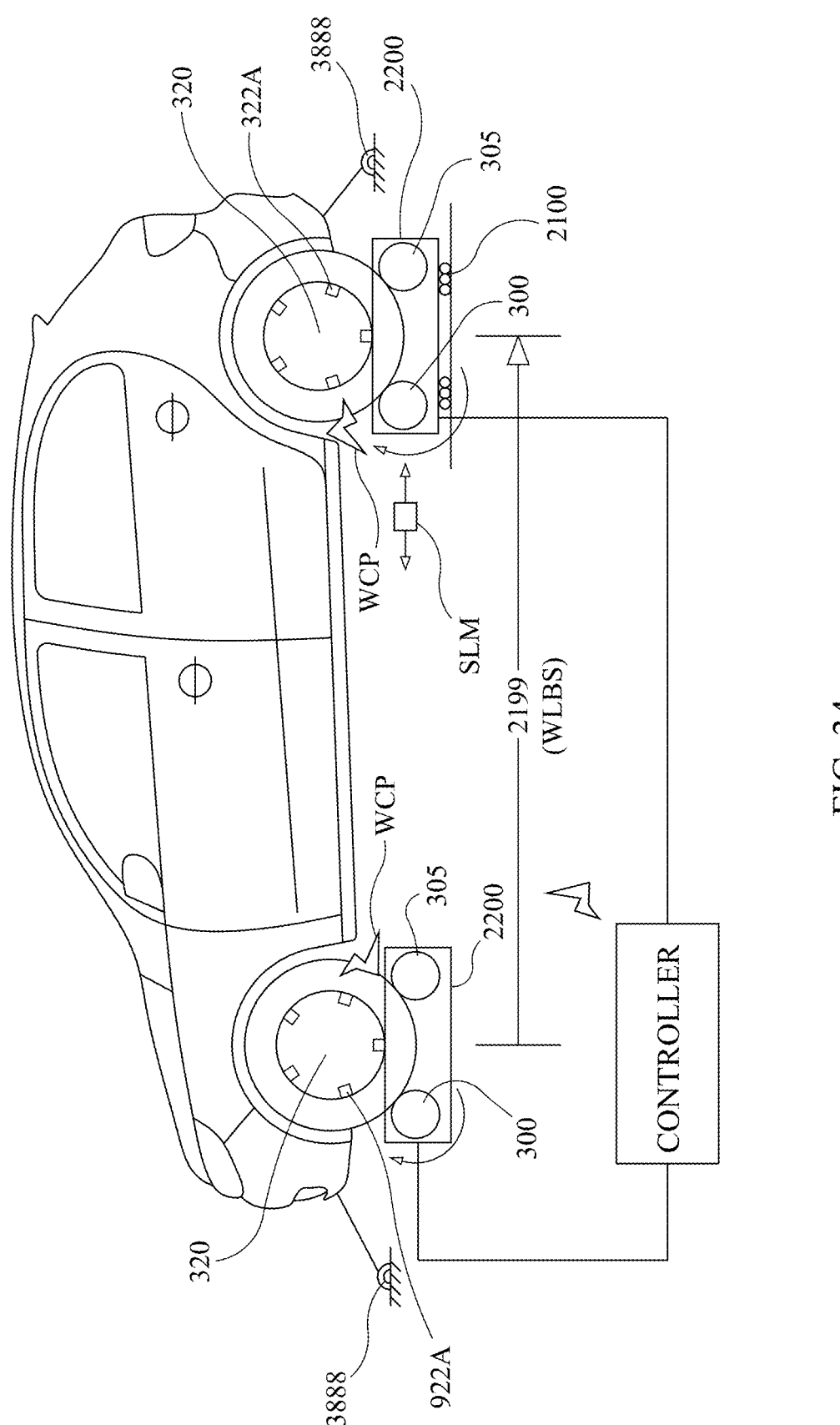
FIG. 34 is a schematic illustration of a portion of an automated tire changing system in accordance with aspects of the present disclosure.
Figure 36:
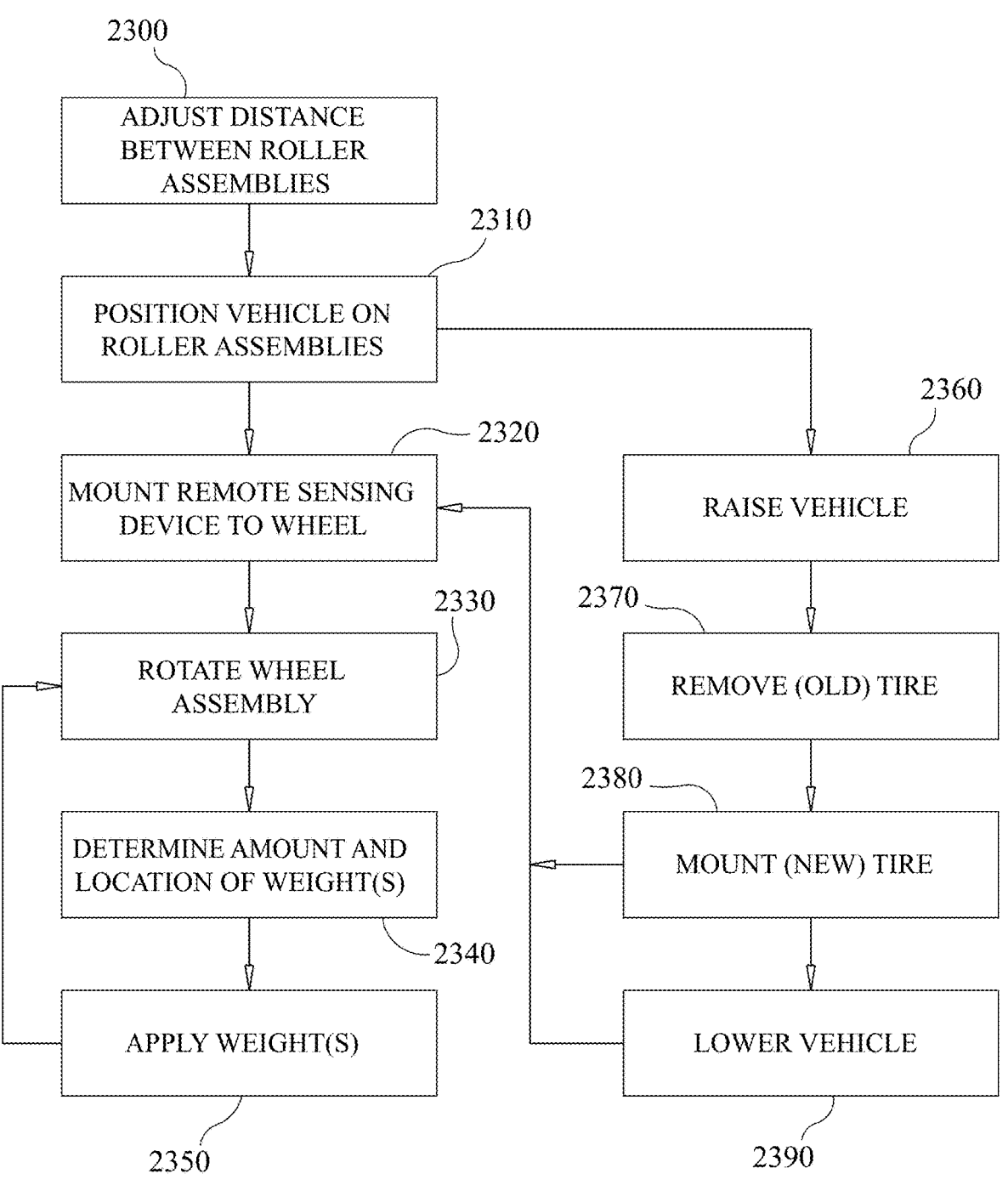
FIG. 36 is an exemplary flow diagram of a method in accordance with aspects of the present disclosure.

Referring to FIGS. 34 and 35, aspects of the above-described tire balancers 129M1-129M7 (generally illustrated as tire balancers 129MS, one or more of which may include the portion of the tire balancer 129M8) may be employed with floor mounted roller systems, where two or more wheels of the vehicle 110 are disposed on the roller systems so that two or more of the wheel assemblies 111 of the vehicle 110 are substantially simultaneously balanced under simulated real-world conditions. For example, the tire changing system 100A (see also tire changing system 100 in FIGS. 1A and 1B) includes floor mounted roller assemblies 2200 (one for each wheel assembly 111 of the vehicle 110). Each roller assembly 2200 includes a drive roller 300 and a road force roller 305 in a manner similar to that described herein. The roller assemblies 2200 corresponding to an axle(s) (e.g., front and/or rear) of the vehicle 110 may be mounted on a slide 2100 so that the distance 2199 between the roller assemblies 2200 corresponding to the different axle(s) of the vehicle 110 may be adjusted according to a wheel base WLBS of the vehicle 110 (FIG. 36, Block 2300). The slide 2100 may be coupled to and driven by any suitable motor SLM under control of the controller 129CNT to effect adjustment of the distance 2199 depending on the vehicle 110 wheelbase WLBS. The vehicle 110 is driven onto the roller assemblies 2200 (FIG. 36, Block 2310) and a remote/wireless sensing device (e.g., one of the remote motion detection module 320 (either employing the passive fiducials 922A-922C or the motion sensors 322A-322C) and the wheel weights 1701) are affixed to each wheel 111W (FIG. 36, Block 2320). The drive rollers 300 of each roller assembly 2200 drive/spin the respective wheel assembly 111 (FIG. 36, Block 2330) to replicate actual/real-world driving conditions (e.g., travel of the vehicle 110 along a roadway) and so that two or more of the wheel assemblies are substantially simultaneously assessed for imbalance. Each of the roller assemblies 2200 includes receivers for receiving sensor data from the remote motion detection modules 320 and/or wheel weights 1701; or, in other aspects, the sensor data from the remote motion detection modules 320 and/or wheel weights 1701 is sent to and received by the controller 129CNT. The controller 129CNT is configured to determine the amount of wheel weight and location of the wheel weight for each wheel assembly 111 (FIG. 36, Block 2340) based on the respective sensor data from the respective remote motion detection module 320 in the manner(s) described herein. The wheel weight(s) 3188 (see, e.g., FIGS. 44A and 56) or wheel weights 1701 are applied to and/or relocated on the respective wheels 111W (FIG. 36, Block 2350) to effect balancing of each wheel assembly 111 in the manner(s) described herein.

Still referring to FIG. 35, the tire changing system 100A includes a tire exchange cabinet 2370 adjacent each roller assembly 2200. Each tire exchange cabinet includes any suitable tire exchange robot 2220 (such as tire changing bot 120 described herein). The tire exchange cabinet 2370 includes a tire exchange position/location 2380 that is accessible through a door 2381 at which tire exchange position a human operator exchanges old and new tires with the respective tire exchange robot 2220. For example, the vehicle 110 is driven onto the roller assemblies 2200 (FIG. 36, Block 2310). The lift 170 raises the vehicle 110 (FIG. 36, Block 2360) and the old tire 111T is removed from the wheel 111W by the tire exchange robot 2220 (FIG. 36, Block 2370), where the wheel 111W remains in situ the vehicle 110. The tire exchange robot 2220 places the old wheel at the tire exchange position 2380. The human operator opens the door 2381, removes the old tire from the tire exchange position, places a new tire at the tire exchange position 2380, and closes the door 2381. The tire exchange robot 2220 picks the new tire from the tire exchange position 2380 and mounts the new tire to the wheel 111W (FIG. 36, Block 2380). The vehicle 110 is lowered (FIG. 36, Block 2390) onto the roller assemblies 2200 and the wheel assemblies 111 are balanced in the manner(s) described herein.

While the tire changing system 100A was described employing the remote sensing devices, in other aspects, any of the tire balancers described herein may be employed in the tire changing system 100A. It is also noted that the tire changing system 100A may facilitate balancing tires of an all-wheel-drive vehicle under simulated real-world driving conditions as all four wheels are driven at the same time.

Figure 37:
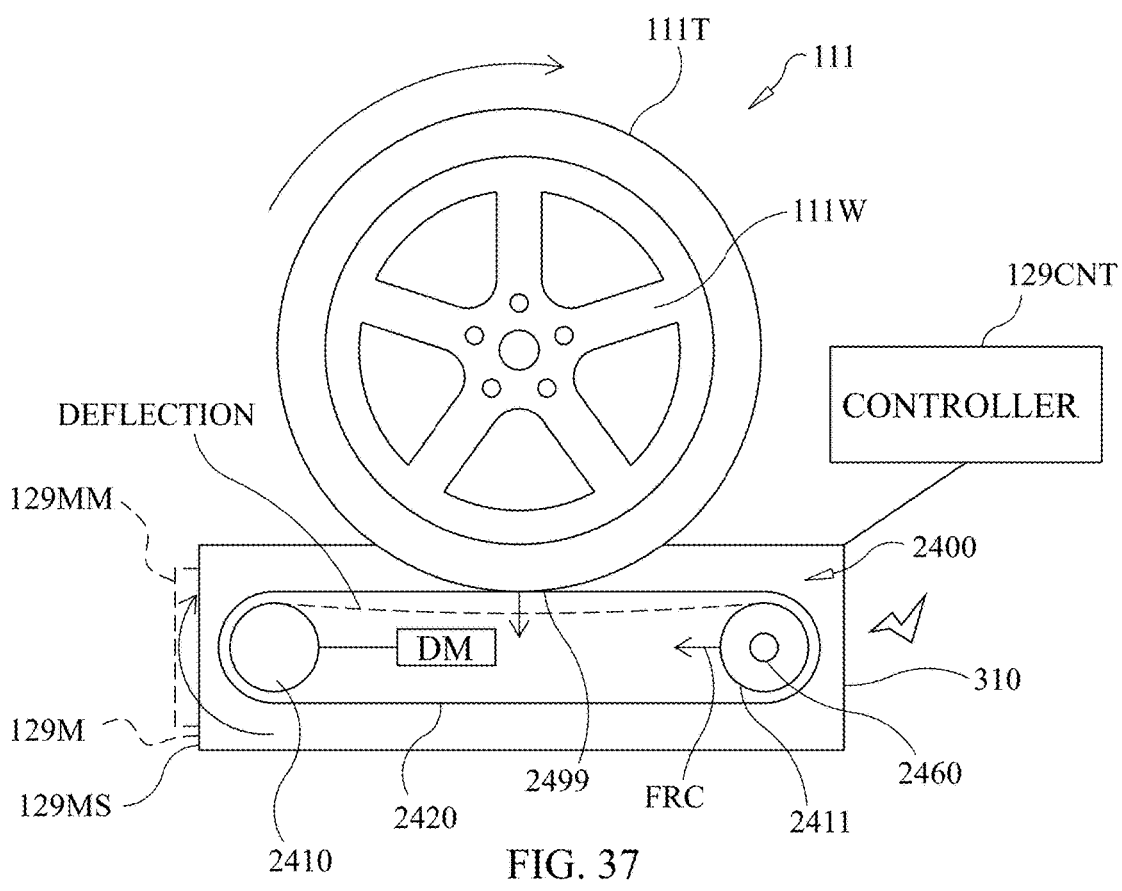
FIG. 37 is a schematic illustration of a portion of an automated tire changing system in accordance with aspects of the present disclosure.

Referring now to FIG. 37, the tire balancers described herein (generally referred to as tire balancer 129M) may include a belt type road force tire driving mechanism 2400. For example, the pulleys 2410, 2411 are mounted to the frame 310 in any suitable manner. Pulley 2410 is a drive pulley that is driven in rotation by any suitable drive motor DM. The pulley 2411 is an idler or driven pulley. An endless/conveyor belt 2420 is wrapped around the pulleys 2410 and is driven around the pulleys by the driven rotation of the pulley 2410. The endless belt 2420 engages the pulleys 2410, 2411 in any suitable manner, such as with a toothed engagement so that slippage between the endless belt 2420 and the pulleys 2410, 2411 is minimized or substantially eliminated. Any suitable force sensor 2460 (such as a strain gauge) is coupled to shaft of the pulley 2411 (or the mount between the pulley 2411 and the frame 310) so that the force sensor 2460 measures, e.g., strain, on the pulley shaft or mount with the belt 2420 deflected under loading of the wheel assembly. Here, the deflection of the belt 2420 (and the tension caused by the deflection) exerts a force FRC on the force sensor 2460.

The amount of deflection 2499 of the belt 2420 changes as the wheel assembly 111 rotates due to the high and low points of radial runout of the wheel assembly (e.g., highest deflection/force as determined by the force sensor 2460 indicates a wheel assembly high point and a lowest deflection/force as determined by the force sensor 2460 indicates a wheel assembly low point). The controller 129CNT is configured to determine the high and low points of the wheel assembly 111 based on the sensor signals from the force sensor 2460. The angular positions of the high and low points relative to the wheel assembly 111 (i.e., where along the perimeter of the wheel assembly 111 the high and low points are located) may be determined by correlating, with the controller 129CNT, a rotation position of drive roller 2410 (as determined by any suitable encoders/sensors and/or stain gauge data) with the rotational angle of the wheel assembly 111 with the tire 11T engaged with (e.g., in substantial contact with) the belt 2460.

Figure 38A:
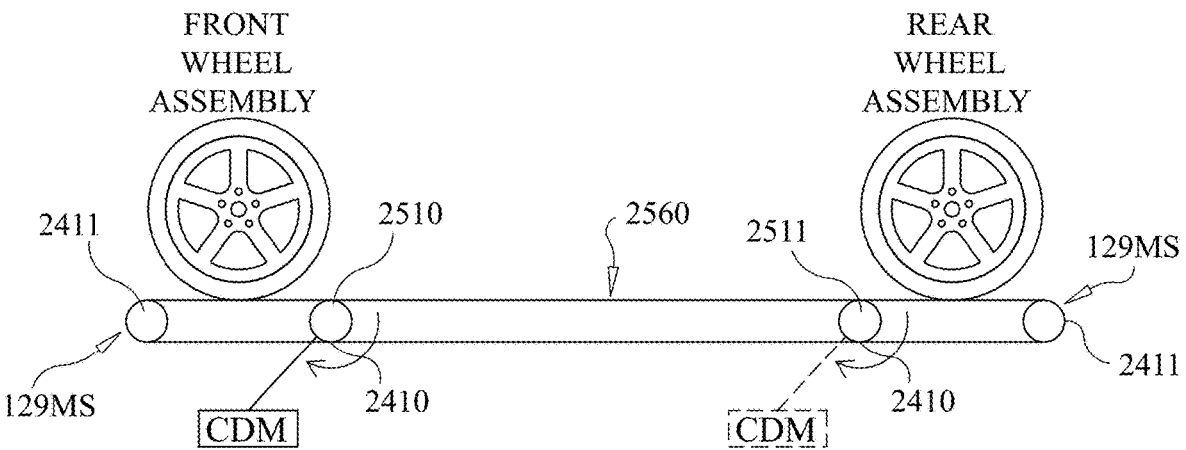
FIGS. 38A-38B are schematic illustrations of a portion of an automated tire changing system in accordance with aspects of the present disclosure.
Figure 38B:
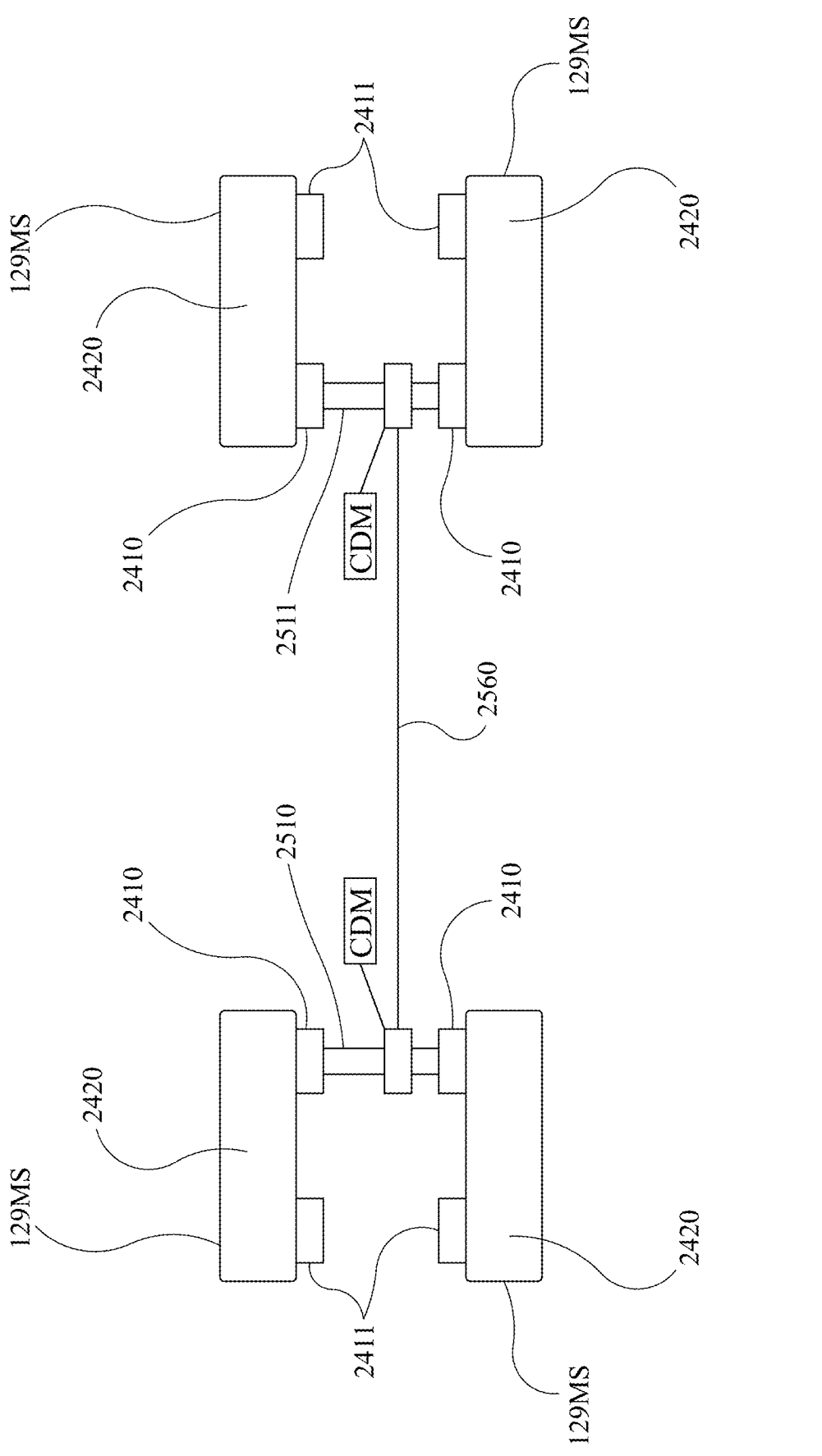

Referring also to FIGS. 38A and 38B, it is noted that the belt type road force tire driving mechanism 2400 for each of the tire balancers 129MS (see, e.g., FIGS. 1A, 1B, and 35) may be coupled so as to be driven substantially simultaneously by a common motor CDM. Driving the (e.g., four) tire balancers 129M with a common drive motor CDM provides for substantial simultaneously balancing the four tire assemblies of an all-wheel-drive vehicle. For example, the drive pulleys 2410 of the tire balancers 129M corresponding to the front and/or rear wheels of a vehicle are coupled by a drive shaft 2510, 2511 so that the common drive motor CDM drives the tire balancers 129M corresponding to both front wheels or both rear wheels. A drive system 2560 (e.g., belt and pulley, chain and sprocket, or other suitable drive system) couples the drive pulleys 2410 of the tire balancers 129M corresponding to the front wheels of the vehicle with the drive pulleys 2410 of the tire balancers 129M corresponding to the rear wheels of the vehicle. Here, the drive systems 2560 couples the four drive pulleys 2410 to the common drive motor CDM so that the common drive motor CDM simultaneously drives the belts 2420 of the four tire balancers 129M at substantially the same rate.

Figure 39A:
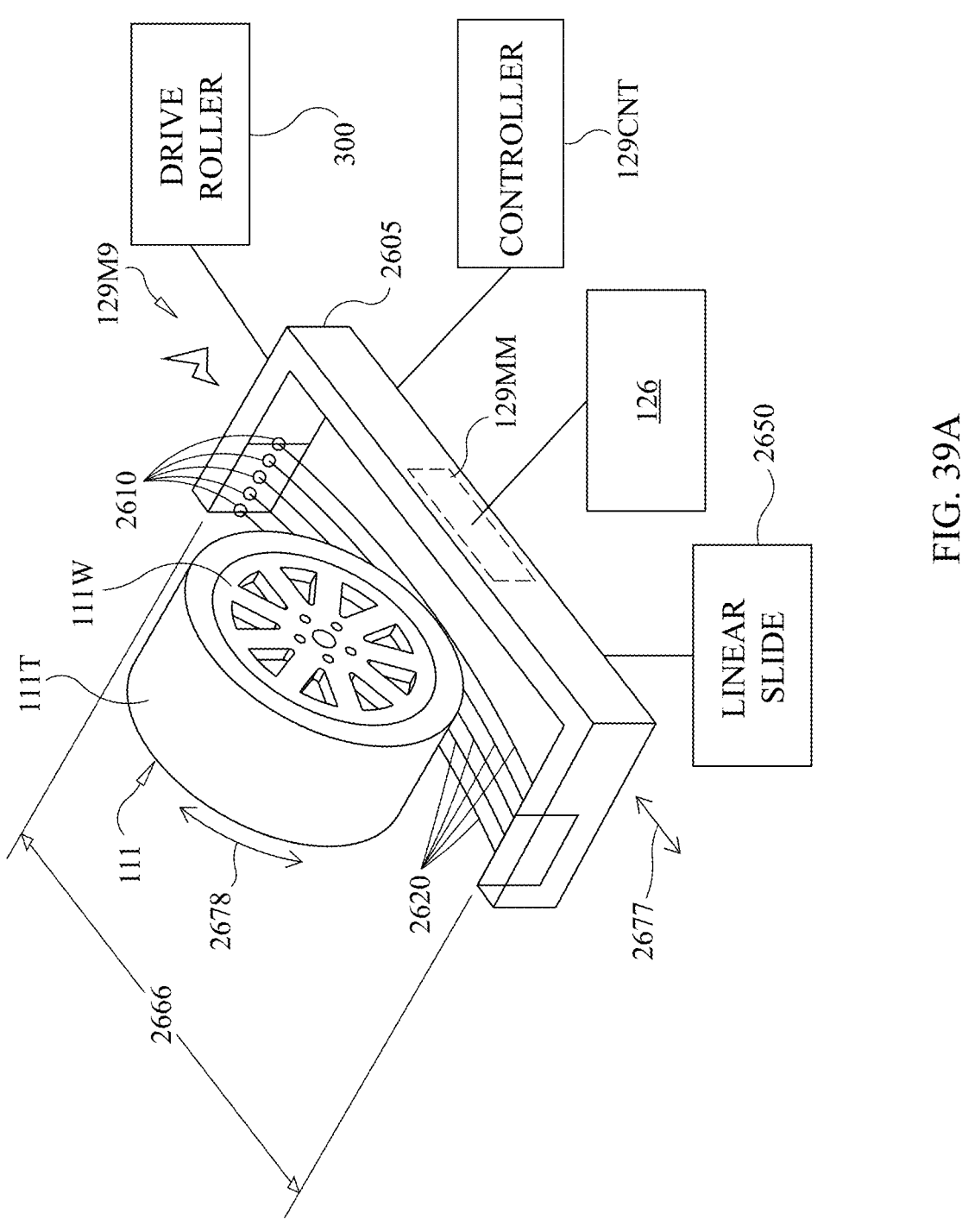
FIGS. 39A-39D are schematic illustrations of a portion of an automated tire changing system in accordance with aspects of the present disclosure.
Figures 39B, 39C, 39D:
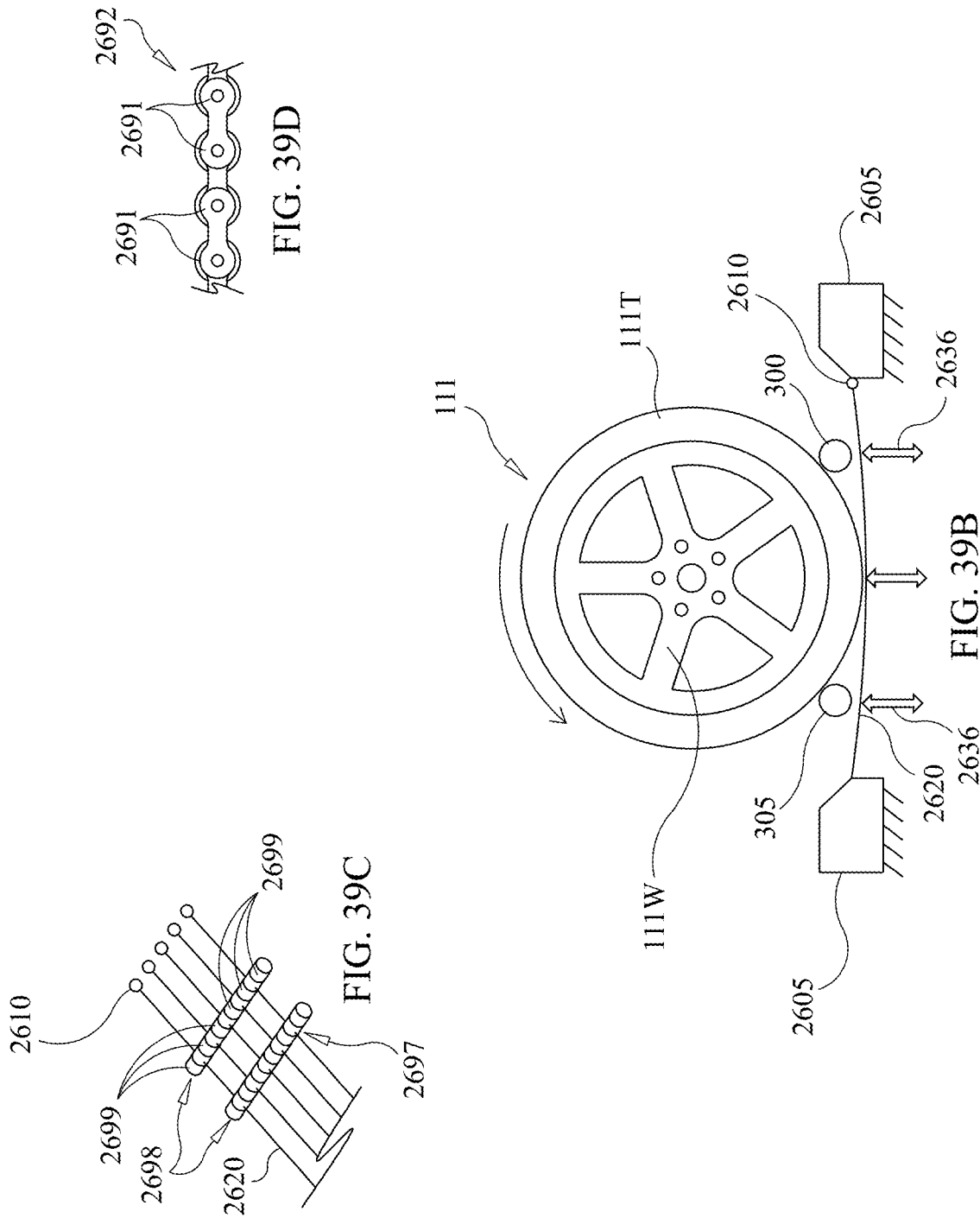

Referring to FIGS. 39A-39C a tire balancer 129M9 will be described. The tire balancer 129M9 includes a frame 2605, at least one tension member 2620, and at least one force gauge 2610. The frame 2605 has any suitable shape (e.g., a channel shape, a U shape, etc.) and/or include any suitable features (e.g., stanchions, rails, etc.) such that one end of the at least one tension member 2620 is coupled substantially directly to the frame 2605 at or adjacent one end the frame 2605 and the other end of the at least one tension member is coupled to the frame 2605 by the at least one force gauge 2610 at or adjacent the other end of the frame 2605.

The at least one tension member 2620 is any suitable tension member configured to engage the tire 111T. For example, the at least one tension member 2620 may be one or more of a belt, cable, thin strand or wire, chain, etc. The at least one tension member 2620 includes anti-friction properties (e.g., rollers, coatings, surface finish, etc.) that provide for slipping of the tire 111T across or along the at least one tension member 2620 substantially without spinning of the tire 111T (e.g., about the wheel hub of the vehicle 110) generating pulling/pushing forces along a length of the at least one tension member 2620. While five tension members 2620 are illustrated in FIG. 39A, in other aspects there may be more or less than five tension members 2620.

The at least one force gauge 2610 is communicably coupled to the controller 129CNT (e.g., by a wired or wireless connection/protocol WCP) so as to transmit signals to the controller 129CNT that embody force detected by the at least one force gauge 2610. The at least one force gauge 2610 is any suitable force gauge such as a strain gauge, cable tension transducer, or any other suitable load cell configured to detect/measure changes in tension of the at least one tension member 2620. Here, a force gauge 2610 is provided for each of the tension members 2620; however in other aspects one force gauge 2610 may be coupled to more than one tension member 2620.

In one aspect the frame 2605 includes an end effector mount 129MM configured to couple the tire balancer 129M9 to the robotic arm 126; while in other aspects, the frame 2605 is coupled to a linear slide 2650, while in still other aspects, the frame 2605 may be stationarily fixed to a floor (e.g., such as of any tire changing station described herein). With the tire balancer 129M9 coupled to the robotic arm 126, the robotic arm 126 positions the tire balancer 129M9 relative to the wheel assembly so that the tire seats against the at least one tension member 2620 so as to register any suitable predetermined tension/force on the at least one force gauge 2610 (e.g., preload the at least one tension member 2620 with the wheel assembly 111). The wheel assembly 111 is rotated/spun relative to the at least one tension member 2620 (such as by any suitable drive roller such as those describe herein, and which drive roller may be mounted to the frame 2605, or in any suitable manner) so that as the wheel rotates/spins about the wheel hub of the vehicle 110 and relative to the at least one tension member 2620 high and low points of the wheel assembly and/or imbalance of the wheel assembly causes deflection (e.g., a change in tension as detected by the at least one force gauge 2610) of the at least one tension member 2620. The at least one force gauge 2610 sends tension detection signals to the controller 129CNT where the controller is configured to determine a location where on the tire the high points, low points, and imbalance exist. It is noted that the location of the tire the high points, low points, and imbalance exist may be timed with the force gauge 2610 signals via sensors/encoders located on the drive roller 300 (and/or the drive roller drive) such that the controller 129CNT employs the sensors signals from the drive roller 300 and the force gauge 2610 to determine the location of and amount of imbalance, etc. of the wheel assembly 111.

The wheel assembly 111 may be rotated relative to the tension members 2620 by one or more of holding the frame 2605 stationary and rotating/spinning the wheel assembly 111 about the wheel hub of the vehicle 110 (e.g., with drive roller 300 or in any suitable manner) in direction 2678 against the tension members 2620 and by moving the frame 2605 in direction 2677 so that the tension members 2620 at least in part cause (e.g., alone or in conjunction with the drive roller 300) rotation of the wheel assembly 111 in direction 2678.

Where the frame 2605 is moved to, the robot arm 126 or linear slide 2650 may move the frame 2605 in direction 2677 so that the tension members 2620, in substantial contact with/preloaded by the tire 111T, cause the tire to rotate in direction 2678. The frame 2605 and the at least one tension member 2620 have any suitable length 2666 so that as the frame 2605 is moved in direction 2677 the at least one tension member 2620 has a length sufficient to cause at least one full rotation of the wheel assembly 111 about an axis of rotation (such as the wheel hub of vehicle 110) of the wheel assembly 111.

Where the frame 2605 remains stationary, and the wheel assembly 111 is rotated in direction 2678 the at least one tension member 2620 may include any suitable friction reducing/anti-friction properties such as those described above. As a further example, the at least one tension member 2620 may have a hollow core and surface perforations through which lubricant (e.g., water or other friction reducing fluid) is flowed (e.g., pumped) to reduce friction between the at least one tension member 2620 and the tire 111T. In other aspects, rollers 2698 may be coupled to the at least one tension member 2620 (see FIG. 39C) where the roller has a non-rotating portion 2697 (e.g., coupled to the at least one tension member 2620) and a roller portion 2699 rotatably coupled to the non-rotating portion 2697. The tire 111T contacts the roller portion 2699 with the wheel assembly 111 engaged with the at least one tension member 2620. In still other aspects, such as where the at least one tension member 2620 is a chain (see FIG. 39D), the chain rollers 2691 may have a diameter such that the rollers 2691 protrude above the chain links so that the rollers contact the tire 111T to reduce friction between the at least one tension member 2620 and the tire 111T.

Still referring to FIG. 39B, where the frame 2605 is fixed in place, such as to a floor of a tire changing system (such as those described herein), the vehicle 110 may be driven onto the at least one tension member 2620. The wheel assembly 111 is rotated relative to the at least one tension member 2620 by the drive roller 300 or in any other suitable manner. Here, the drive roller 300 (and road force roller 305) may be moved in direction 2636 to contact the tire 111T such that the tire 111T remains in contact with the at least one tension member 2620 to maintain the predetermined tension on the at least one force gauge 2610; while in other aspects the at least one tension member 2620 is positioned relative to vertically stationary drive and road force rollers 300, 305 such that as the vehicle 110 drives onto the drive and road force rollers 300, 305 the tire 111T deflects the at least one tension member 2620 to effect the predetermined tension on the at least one force gauge 2610 with the wheel assembly 111 being supported by the drive and road force rollers 300, 305; while in still other aspects, the at least one tension member 2620 provides the road force (e.g., in lieu of the road force roller 305) such that the wheel assembly 111 (and vehicle 110) is supported by the at least one tension member 2620 and drive roller 300. Friction between the tire 111T and the at least one tension member 2620 may be reduced in the manner described above.

Figure 40A:
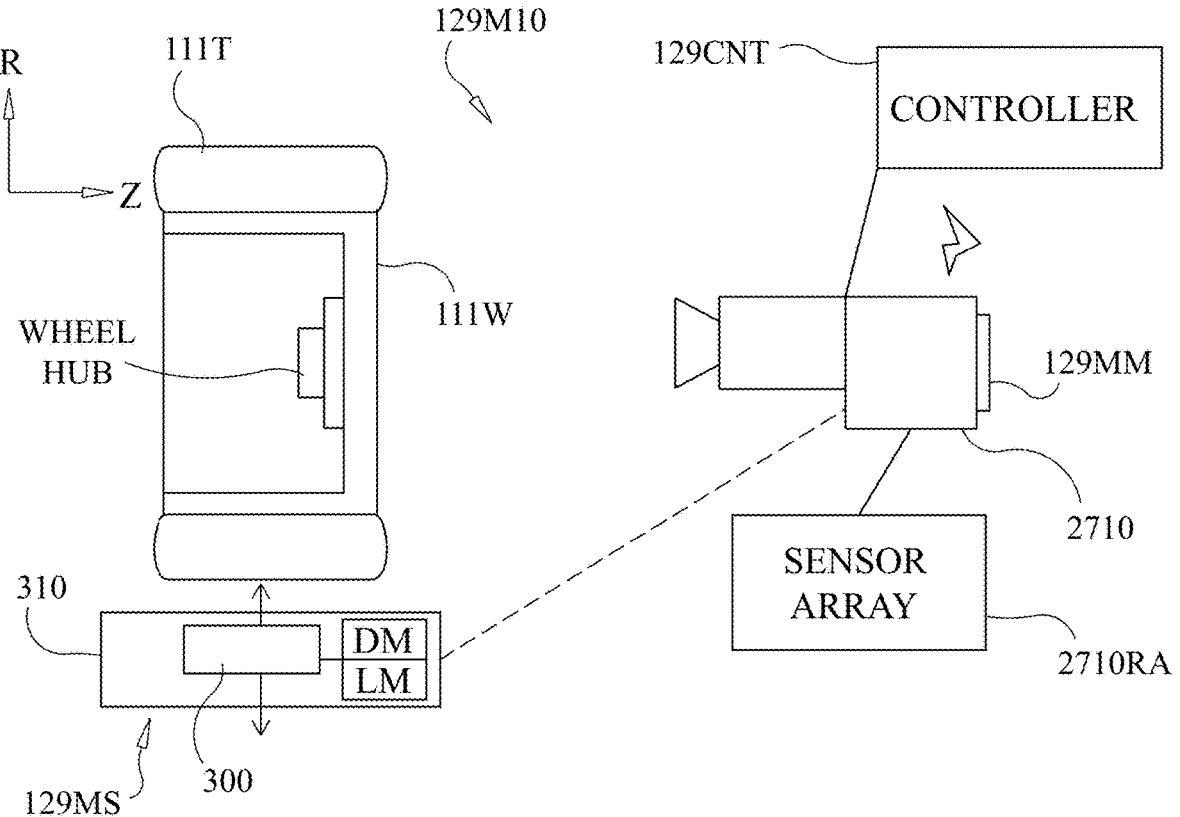
FIGS. 40A-40C are schematic illustrations of a portion of an automated tire changing system in accordance with aspects of the present disclosure.
Figure 40C:
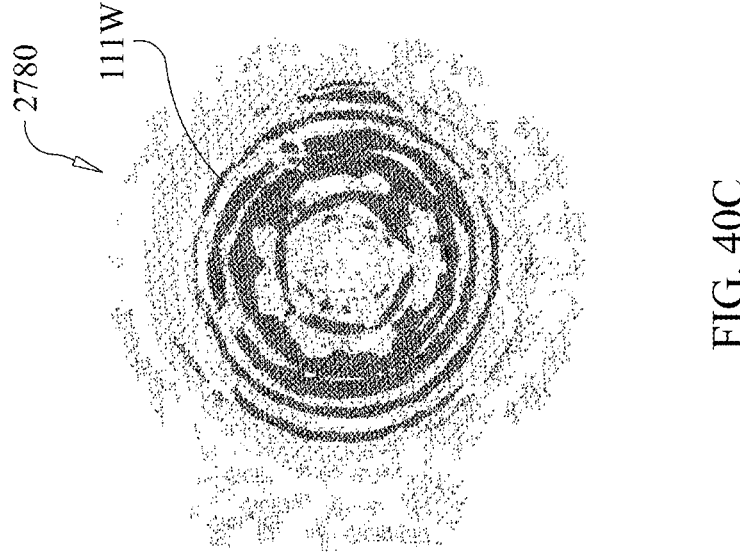
Figure 40B:
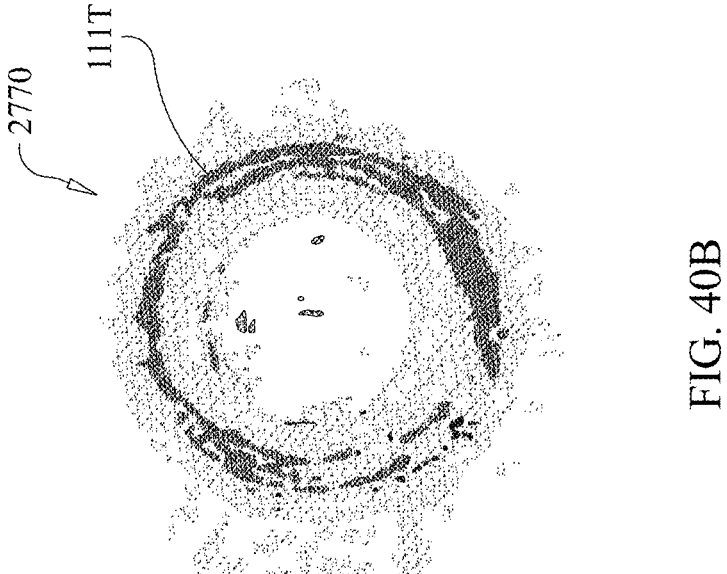

Referring to FIGS. 40A-40C a tire balancer 129M10 will be described. The tire balancer 129M10 may be referred to as an orbital scanning balancer that electromagnetically or sonically scans the wheel assembly 111 (or a portion thereof, e.g., the tire 111 and/or wheel 111W) to detect anomalies of/in the wheel assembly 111 (e.g., slipped belting of the tire, foreign objects lodged in the tire, defective tire pressure monitoring system sensors, damaged wheels, etc.). Balancing of the wheel assembly may also be effected with any suitable image analysis programmed into the controller 129CNT, where the images/video captured by the sonic and/or electromagnetic sensor is analyzed to determine radial and/or lateral runout of the tire assembly 111.

In a manner similar to that described above, the tire balancer 129M10 may be incorporated into either one of tire changing systems 100, 100A. For example, the tire balancer 129M10 includes a frame 310 that includes the drive roller 300 (or in other aspects, a belt as described with respect to FIGS. 37 and 38A-38B) in a manner similar to that described above. A road force roller 305 may also be provided on the frame to effect road force balancing of the wheel assembly 111 (supplemental to balancing of the wheel assembly 111 with the orbital scanning).

One or more electromagnetic and/or sonic sensors 2710 is coupled to, integral to, or otherwise mounted on the frame 310 in any suitable manner so that the frame and one or more electromagnetic and/or sonic sensors 2710 are carried by the robotic arm 126 via the end effector mount 129MM; or in other aspects, the one or more electromagnetic and/or sonic sensors 2710 are fixed at predetermined positions within the tire changing system 100, 100A; or in still other aspects the one or more electromagnetic and/or sonic sensors 2710 are carried by the robotic arm 126 via the end effector mount 129MM so as to move relative to a stationary the frame 310 and the wheel assembly 111. The one or more electromagnetic and/or sonic sensors 2710 include, but are not limited to, one or more of an ultrasonic sensor/transducer, an X-ray scanner, a computerized tomography scanner, three-dimensional millimeter wave imaging scanner, a three-dimensional imager, or any other suitable sensor configured to effect anomaly detection and balancing of the wheel assembly 111. For example, anomalies may include increased or decreased thickness of tire walls/tread (e.g., compared to other areas of the tire wall/tread), increased or decreased tire belt density, wheel chips/gouges, etc. With the controller 129CNT being programmed with material properties of the tire 111T and wheel 111W, and with the size (e.g., volume) and location of the anomaly determined from the orbital scanning, the controller 129CNT is configured to determine a mass (e.g., a missing mass/void or an increase in mass) of the anomaly. Based on a missing mass, the controller 129CNT may indicate placement of a wheel weight 3188 (see, e.g., FIGS. 44A and 56) having substantially the same mass as the missing mass to be placed on the wheel 111W at or adjacent the location of the missing mass. Based on an increased in mass, the controller 129CNT may indicate placement of a wheel weight 3188 having substantially the same mass as the increased mass to be placed on the wheel 111W at a location opposite the location of the increased mass. Wobble of the wheel assembly 111 (e.g., in the Z direction) may be determined by the controller 129CNT based on the three-dimensional distance sensing inherent to the one or more electromagnetic and/or sonic sensors 2710.

As described above, in some aspects, the frame 310 includes an end effector mount 129MM that couples the tire balancer 129M10 to the robotic arm 126 so that the robotic arm 126 positions the tire balancer 129M10 relative to the wheel assembly 111, with the wheel assembly in situ the vehicle 110, in a manner similar to that described herein; while in other aspects, the frame 310 of the tire balancer 129M10 is stationarily mounted as part of the tire changing system 100 (see FIG. 1B, where the frame 310 and drive roller 300 of tire balancer 129M10 is generally illustrated as tire balancer 129MS) with the one or more electromagnetic and/or sonic sensors 2710 being carried by the robotic arm 126; while in still other aspects, both the frame 310 and one or more electromagnetic and/or sonic sensors 2710 are stationarily mounted as part of the tire changing system 100A (see FIG. 35).

Figure 41:
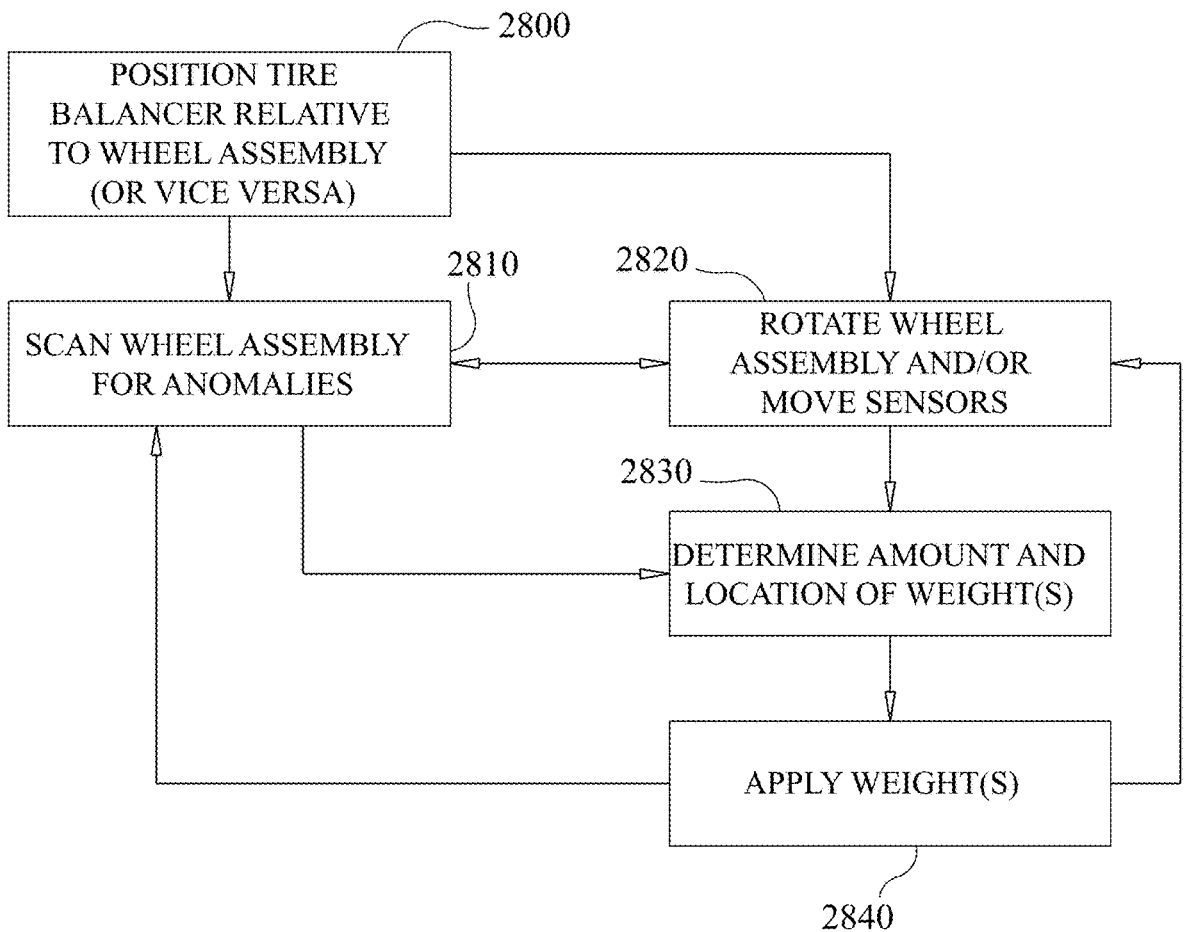
FIG. 41 is an exemplary flow diagram of a method in accordance with aspects of the present disclosure.

In operation, the tire balancer 129M10 is positioned relative to wheel assembly 111 or vice versa (FIG. 41, Block 2800). Positioning the wheel assembly 111 relative to the tire balancer 129M10 includes positioning one or more electromagnetic and/or sonic sensors 2710 relative to the wheel assembly 111, or vice versa, to image the wheel assembly 111 substantially in its entirety (such as where a field of view of the sensor is configured to image the entire wheel assembly 111 or where the one or more electromagnetic and/or sonic sensors 2710 includes a sensor array 2710RA having a combined field of view for imaging the entire wheel assembly 111); or positioning the wheel assembly 111 relative to the tire balancer 129M10 includes positioning one or more electromagnetic and/or sonic sensors 2710 relative to the wheel assembly 111, or vice versa, to image at least a portion thereof (which with the tire spun about the wheel hub each portion of the wheel assembly 111 is sequentially imaged by the one or more electromagnetic and/or sonic sensors 2710 to capture a composite image of the wheel assembly 111 in its entirety). In some aspects, for example, the robotic arm 126, with the tire balancer 129M10 coupled thereto, positions the tire balancer 129M10 relative to the wheel assembly 111. In other aspects, the robotic arm 126, with the one or more electromagnetic and/or sonic sensors 2710 coupled thereto, positions the one or more electromagnetic and/or sonic sensors 2710 relative to the wheel assembly 111. In other aspects, the vehicle 110 is driven into the tire changing system 100A to position the wheel assembly 111 relative to the one or more electromagnetic and/or sonic sensors 2710 of the tire balancer 129M10. Where more than one of the one or more electromagnetic and/or sonic sensors 2710 are employed, the electromagnetic and/or sonic sensors 2710 may be positioned relative to the wheel assembly 111 in a manner substantially similar to that illustrated in FIGS. 26A-26C with respect to the sensors 1310, 1320, 1321 or in any other suitable sensor array 2710RA.

The controller 129CNT effects with the one or more electromagnetic and/or sonic sensor 2710 the scanning of the wheel assembly 111, the wheel 111W, and/or the tire 111T (FIG. 41, Block 2810). It is noted that the vehicle 110 is positioned on the lift 170 so that the wheel assembly 111 is unloaded as the one or more electromagnetic and/or sonic sensors 2710 scan the wheel assembly 111 so that wheel loading does not affect orbital scanning and anomaly detection. The controller 129CNT includes any suitable non-transitory image analysis algorithms so that the controller 129CNT is configured to detect one or more of the above-noted anomalies through analysis of the scanned images of the wheel assembly 111, the wheel 111W, and/or the tire 111T. An exemplary scanned image 2770 of the tire 111T is provided in FIG. 40B while an exemplary scanned image 2780 of the wheel 111W is provided in FIG. 40C. Anomaly detection may be effected with the wheel assembly 111 rotationally fixed.

Where the wheel assembly 111 is rotated to effect scanning of the wheel assembly 111 in its entirety (such as where only a portion of the wheel assembly is in a field of view of the one or more electromagnetic and/or sonic sensors 2710), the frame 310 includes any suitable lift drive LM (e.g., jack screw, air bag, linear actuator, etc.) that raises and lowers the drive roller 300 to selectively engage and rotate the tire 111T so that different portions of the wheel assembly 111 are presented in the field of view of one or more electromagnetic and/or sonic sensors 2710 and/or in contact with a sonic sensor/transducer of the one or more electromagnetic and/or sonic sensors 2710. The drive roller 300 is disengaged from the tire 111T by the lift drive LM for scanning of the wheel assembly with the one or more electromagnetic and/or sonic sensors 2710. It is noted that the different images may be stitched together in any suitable manner, such as by rotating the tire by an amount that is less than an area of the sensor field of view (e.g., so that different images include common features used to match/stich the different images with each other). To rotate the wheel assembly 111 the controller 129CNT actuates the drive motor DM (and the drive roller 300 driven thereby) to effect rotation of the wheel assembly 111 (FIG. 41, Block 2820).

As noted above, in some aspects the wheel is rotated to and/or the sensors are moved (such as by the robotic arm 126) determine anomalies present in the wheel assembly 111

(FIG. 41, Block 2820); while in other aspects the anomalies are detected with the wheel rotationally stationary. The controller determines the amount and location of weights to be affixed to the wheel assembly 111 (FIG. 41, Block 2830) in the manner described above where a mass of the anomaly or anomalies is/are determined and an amount and location of the wheel weights 3188 (see, e.g., FIGS. 44A and 56) is/are selected based on the anomaly mass/location determinations. The wheel weight(s) 3188 are applied to the wheel 111W (FIG. 41, Block 2840) through automation or manually.

As noted above, a supplemental dynamic and/or road force balance of the wheel assembly may be performed to verify the balancing of the wheel assembly obtained with the orbital scanning. For example, in a manner similar to that described above, the wheel assembly 111 is rotated with the wheel weights 3188 (as determined by the orbital scanning) attached where the electromagnetic and/or sonic sensor 2710 scans the rotating wheel assembly 111 to obtain a baseline image/video (noting that the scanning is a three-dimensional scanning that provides for acceleration detections in both the lateral and radial runout directions) corresponding to a baseline runout (radial and/or lateral). Where the baseline runout is out of tolerance the wheel assembly 111 may be scanned again (FIG. 41, Block 2810) to verify/modify balance of the wheel assembly 111 and/or the balance of the wheel assembly 111 may be modified by rotating (e.g., by the drive roller 300 engaged or not engaged to road force roller 305) the wheel assembly for a dynamic balance and/or road force balance in a manner similar to those described herein.

Figures 50A, 50B, 50C:
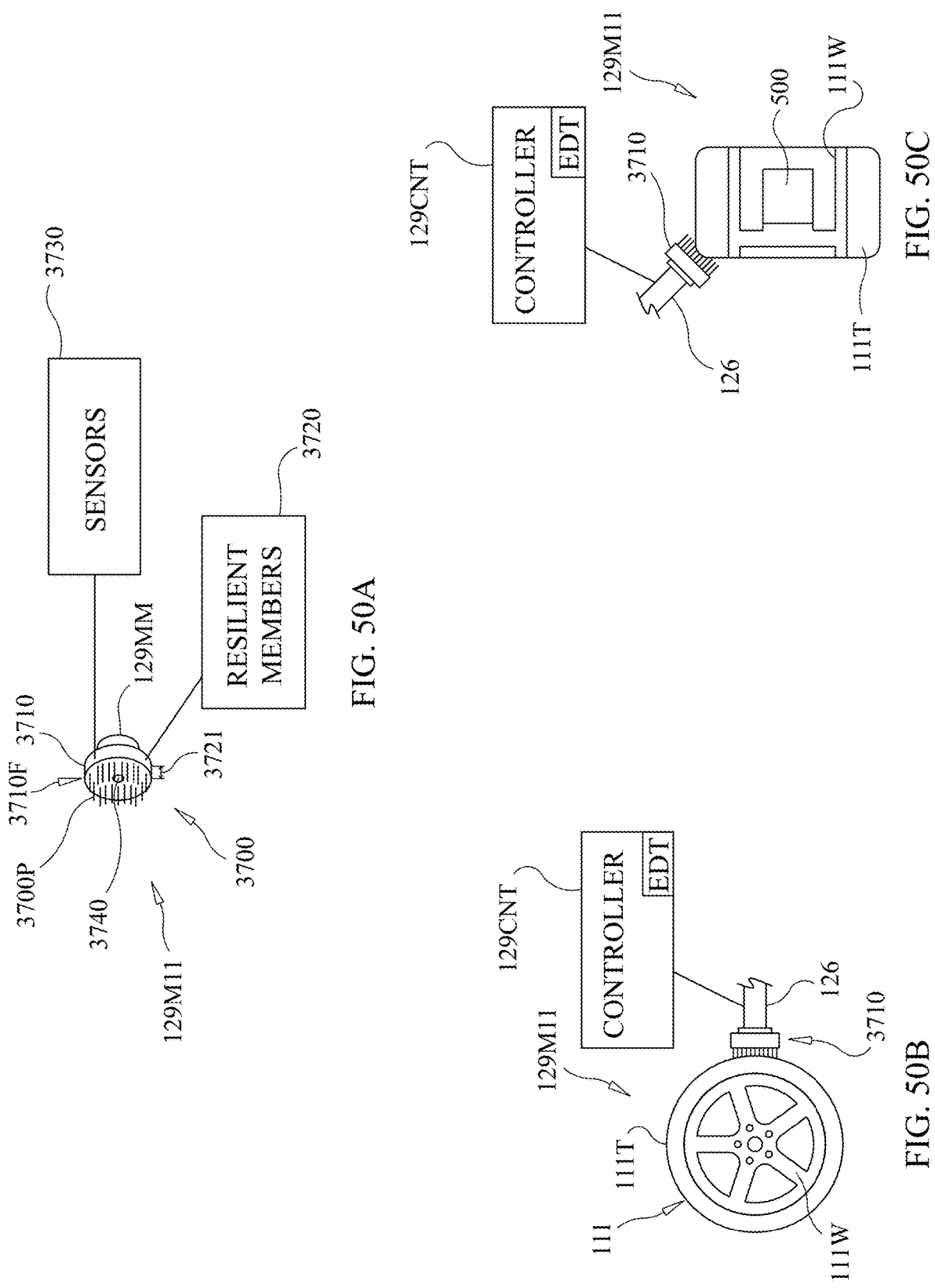
FIGS. 50A-50C are schematic illustrations of a portion of an automated tire changing system in accordance with aspects of the present disclosure.

Referring to FIGS. 50A-50C, a tire balancer 129M11 will be described. The tire balancer 129M11 may be referred to as a probe balancer and includes a touch probe 3710 that includes an end effector mount 129MM for coupling the touch probe 3710 to the robotic arm 126 or any other suitable actuator configured to move the touch probe 370 relative to the wheel assembly 111 for determining a contour of the wheel assembly 111. The touch probe 3710 is shaped and sized so that (and the actuator includes a suitable number of degrees of freedom and is sized to effect) the touch probe 3710 may be moved around and/or between the vehicle suspension components 500 (inclusive of brakes, rotors, etc., i.e., with the vehicle 110 lifted off of the ground by the lift 170 and the vehicle suspension components 500 fully relaxed/drooped down) for contacting the wheel 111W and tire 111 as described herein.

The touch probe 3710 includes an array of tactile pins 3700 where each pin 3700P in the array of tactile pins 3700 is movably coupled to a housing 3710F of the touch probe 3710. Each pin 3700P is biased by a respective resilient member 3720 so that the pin 3700P protrudes from the housing 371OF by a predetermined distance 3721. The touch probe 3710 includes sensors 3730 that detect an amount of movement of the pins 3700P (e.g., relative to the predetermined distance or an amount the pin moves into the housing 3410F), such as with the pins 3700P pressed against an object. Each pin 3700P is movable into and out of the housing 371OF independent of each other pin 3700P so that with the pins 3700P pressed against the object a surface contour of the object is determined from sensors 3730 detecting the amount of movement of each pin 3700P relative to each other pin 3700P.

In operation, the touch probe 3710 is moved relative to the wheel assembly 111 (which is held stationary) so that the array of tactile pins 3700 of the touch probe 3710 are pressed into contact with the wheel assembly 111. As each pin 3700P is moved into the housing 3710F by the contact between the pins 3700P and the wheel assembly 111, the sensors 3730 register/detect an amount of movement of the pins 3700P and communicate the sensor data embodying the amounts of movement to the controller 129CNT. The touch probe 3710 is moved to different locations of the wheel assembly 111, contacting the wheel assembly 111, so that a surface contour data of at least a portion of the wheel assembly is obtained and communicated to the controller 129CNT. A distance between the housing 3710F of touch probe 3710 and the wheel assembly 111 with the pins 3700P in contact with the wheel assembly may be maintained at any suitable distance (e.g., as determined by any suitable proximity sensor 3740 including but not limited to optical and sonic proximity sensors) so that as the touch probe 3710 is moved to contact different portions of the wheel assembly 111, the distance the pins 3700P are moved relative to the housing 3710F at one portion of the wheel assembly 111 are correlated to the distance the pins 3700P are moved relative to the housing 371OF at each other portion of the wheel assembly 111.

The controller 129CNT is configured to combine the surface contour data from the sensors 3730 in any suitable manner (e.g., such as by correlating movement of the robotic arm 126 with the sensor data and/or by matching detected surface features where there is overlap between the different portions of the wheel assembly 111 contacted by the touch probe 3710). The controller 129CNT, based on the combined surface contour data, is configured to generate a three-dimensional model 111VM (see FIG. 42C) of at least a portion of the wheel assembly 111 for determining one or more of high and low points of the wheel 111W, tire 111T and runout of the wheel assembly in the radial R and axial Z directions. The controller 129CNT includes any suitable image processing programming configured to analyze the three-dimensional model of the wheel assembly 111 to effect determination of the one or more of high and low points of the wheel 111W, tire 111T and runout of the wheel assembly in the radial R and axial Z directions.

An amount of weight and a position of the weight may be determined by the controller 129CNT based on the determination of the one or more of high and low points of the wheel 111W, tire 111T and runout of the wheel assembly in the radial R and axial Z directions. For example, the controller 129CNT includes an empirically derived table EDT that correlates amounts of weights and positions of those weights on the wheel assembly 111 to the determined one or more of the high and low points of the wheel 111W, the high and low points of the tire 111T, and runout of the wheel assembly in the radial R and axial Z directions. There may be an empirically derived table EDT for each different tire 111T and wheel 111W combinations such that based on the determined one or more of the high and low points of the wheel 111W, the high and low points of the tire 111T, and runout of the wheel assembly in the radial R and axial Z directions and the tire/wheel combination the controller 129CNT searches the empirically derived tables EDT to determine from the corresponding empirically derived table EDT the amount and position of the weights to be affixed to the wheel assembly 111. In other aspects, the amount and position of the weights to be affixed to the wheel assembly 111 may be determined in any suitable manner such as analytically as a function of the determined one or more of the high and low points of the wheel 111W, the high and low points of the tire 111T, and runout of the wheel assembly in the radial R and axial Z directions or a wheel assembly weight distribution (e.g., as determined by the determined one or more of the high and low points of the wheel 111W, the high and low points of the tire 111T, and runout of the wheel assembly in the radial R and axial Z directions knowing the material properties and sizes of the tire and wheel).

Figures 42A, 42B, 42C:
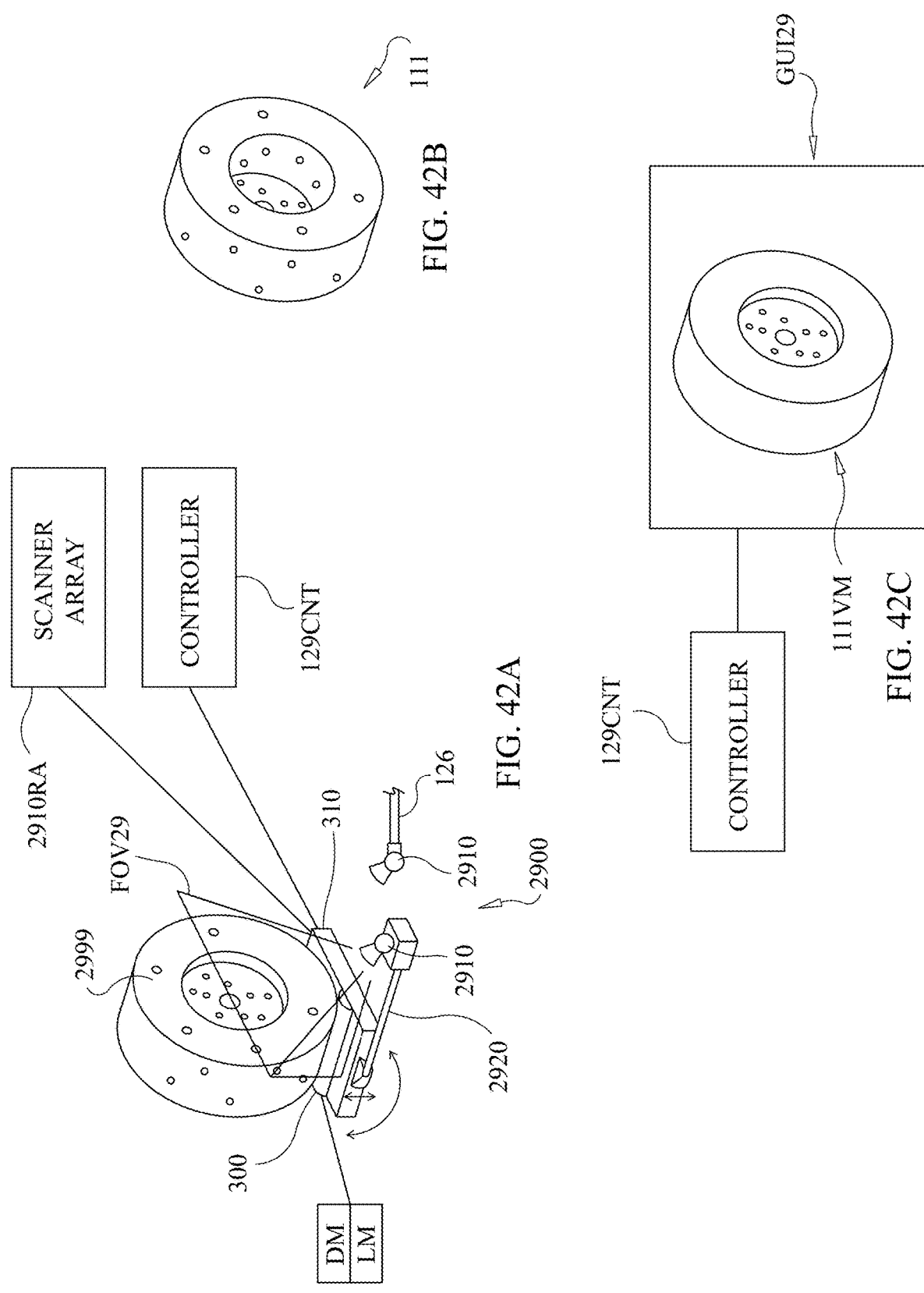
FIGS. 42A-42C are schematic illustrations of a portion of an automated tire changing system in accordance with aspects of the present disclosure.

Referring to FIGS. 42A-42C one or more of the tire balancers described herein (inclusive of the robotic arm mounted tire balancers, generally 129M, 129MS, and the stand alone tire balancers, generally 183) may include a scanning system that models the wheel assembly 111 in three dimensions so that the high and low points of the wheel assembly 111 (or a portion thereof, e.g., the wheel 111W and/or tire 111T) are determined from the three-dimensional model of the wheel assembly 111 (or the portion thereof). The generation of three dimensional model of the wheel assembly 111 is effected with the wheel assembly 111 located in situ (i.e., installed on) the vehicle. For example, a scanner 2910 may be movably mounted to the frame 310 (e.g., via any suitable actuators or robotic arms) so that the scanner 2910 may be automatically driven/moved in one or more directions/degrees of freedom, e.g., under control of the controller 129CNT, to scan one or more of both lateral sides of the wheel assembly 111 and the tread of the tire 111T, one lateral side of the wheel assembly 111 and the tread, one later side of the wheel assembly 111, the tread of the tire 111T, and both lateral sides of the wheel assembly 111. While scanner 2910 is illustrated in the FIG. 42A as being movably mounted to the frame 310, in other aspects, as described herein, the scanner 2910 may be mounted to the robotic arm 126 (in a manner similar to that described herein with respect to FIGS. 50A-50C) and/or or provided in a scanner array 2910RA (e.g., with more than one scanner 2910 positioned in a manner similar to that illustrated in FIGS. 26A-26C or in any other suitable arrangement) for substantially simultaneous scanning of the lateral sides and tread of the wheel assembly 111.

The scanner 2910 is an optical scanner such as a blue light three-dimensional scanner, a structure light scanner, or any other suitable three-dimensional scanner/distance sensor. The scanner 2910 has a field of view FOV29 that extends over at least a portion of the wheel assembly 111. In one aspect the field of view FOV29 is shaped and sized so as to image at least an entire lateral side of the wheel assembly 111 with the wheel assembly remaining rotationally fixed (i.e., the wheel does not rotate); while in other aspects, the field of view FOV29 is shaped and sized so as to image a portion of the side wall such that with the wheel rotated the scanner 2910 captures images of different portions of the at least the lateral side of the wheel 111 where the different images of the different portions of the lateral side wall are stitched together in any suitable manner (e.g., with any suitable image analysis algorithm of the controller 129CNT, to form an image of at least the entire lateral side of the wheel 111. Where a scanner array 2910RA is provided, each scanner in the scanner array 2910RA is similar to scanner 2910. Each scanner in the scanner array 2910RA includes a respective field of view (which may overlap a field of view of at least one other scanner) where the respective fields of view provide images that are stitched together in a manner similar to that described herein to form the three-dimensional model of the wheel assembly 111.

To effect stitching of the different images, any suitable targets 2999 are randomly affixed to the wheel assembly 111 and the controller 129CNT is configured to align the different images to each other employing the detected targets 2999 as markers for aligning the different images with each other. The random placement of the targets 2999 forms, in effect, a unique arrangement of targets that are matched between the different images using the image processing software to form a composite image/model (e.g., the three-dimensional model 111VM of the wheel assembly 111). The targets 2999 are affixed to both lateral sides and the tread of the wheel assembly 111 so that as the wheel assembly 2999 is rotated and the scanner 2910 moves relative to the frame from one lateral side of the wheel assembly to the other lateral side of the wheel assembly, the entirety of the wheel assembly is scanned and different images captured by the scanner are stitched together to form the three-dimensional model 111VM of the wheel assembly 111. In other aspects, such as where the scanner array 2910RA is provided, there may be more than one scanner 2910 (e.g., a scanner on each side of the wheel assembly and one scanner adjacent the tread (e.g., in a manner similar to that illustrated in FIGS. 26A-26C) so that different images from the different scanners are stitched together by the controller 129CNT to form the three-dimensional model 111VM of the wheel assembly 111.

It is noted that the wheel assembly 111 may be rotated in any suitable manner to effect scanning of the wheel assembly 111. For example, the drive roller 300 may be provided to selectively engage the tire 111T for rotating the wheel assembly 111. As described herein, the frame 310 includes the lift drive that moves the drive roller 300 into contact with the tire 111T (e.g., to rotate the wheel assembly 111) and moves the drive roller 300 away from the tire 111 (e.g., such as when the wheel assembly is scanned so that the wheel assembly is unloaded during scanning). In other aspects, the scanner 2910 may be coupled to the robotic arm 126 so that the scanner 2910 moves relative to the wheel assembly 111 to effect scanning of the wheel assembly with or without rotation of the wheel assembly 111 (as described herein). With the scanner 2910 moved by the robotic arm 126, scanning of the wheel assembly 111 may be substantially continuous so that the three dimensional model 111VM is generated from the substantially continuous scan (e.g., stitching of images may be avoided).

The three-dimensional model 111VM of the wheel assembly 111 may be displayed on any suitable user interface GUI 29 of the tire changing system 100, 100A and the controller 129CNT may determine, with any suitable image analysis, one or more of high and low points of the wheel 111W, high and low points of the tire 111T, and runout of the wheel assembly in the radial R and axial Z directions based on the three-dimensional model 111VM. In a manner similar to that described herein, the amount of weight and a position of the weight may be determined by the controller 129CNT based on the determination of the one or more of high and low points of the wheel 111W, tire 111T and runout of the wheel assembly in the radial R and axial Z directions. For example, the controller 129CNT includes an empirically derived table EDT that correlates amounts of weights and positions of those weights on the wheel assembly 111 to the determined one or more of the high and low points of the wheel 111W, the high and low points of the tire 111T, and runout of the wheel assembly in the radial R and axial Z directions. There may be an empirically derived table EDT for each different tire 111T and wheel 111W combinations such that based on the determined one or more of the high and low points of the wheel 111W, the high and low points of the tire 111T, and runout of the wheel assembly in the radial R and axial Z directions and the tire/wheel combination the controller 129CNT searches the empirically derived tables EDT to determine from the corresponding empirically derived table EDT the amount and position of the weights to be affixed to the wheel assembly 111. In other aspects, the amount and position of the weights to be affixed to the wheel assembly 111 may be determined in any suitable manner such as analytically as a function of the determined one or more of the high and low points of the wheel 111W, the high and low points of the tire 111T, and runout of the wheel assembly in the radial R and axial Z directions or a wheel assembly weight distribution (e.g., as determined by the determined one or more of the high and low points of the wheel 111W, the high and low points of the tire 111T, and runout of the wheel assembly in the radial R and axial Z directions knowing the material properties and sizes of the tire and wheel).

Figure 43A:
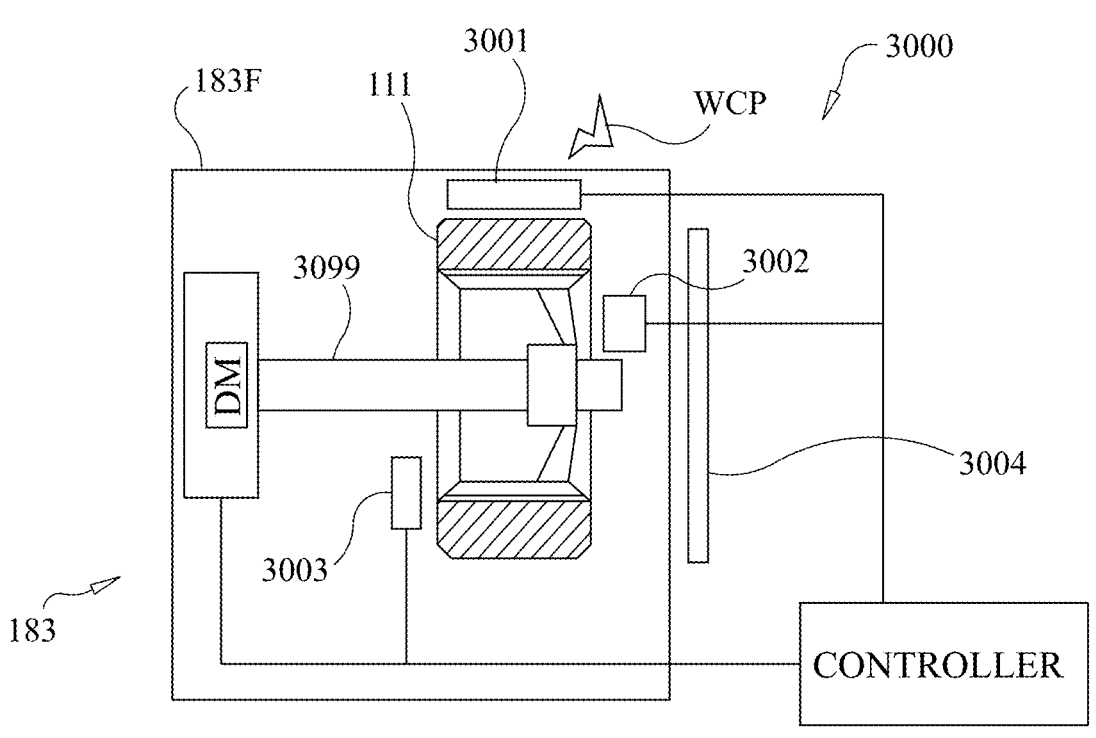
FIGS. 43A-43B are schematic illustrations of a portion of an automated tire changing system in accordance with aspects of the present disclosure.
Figure 43B:
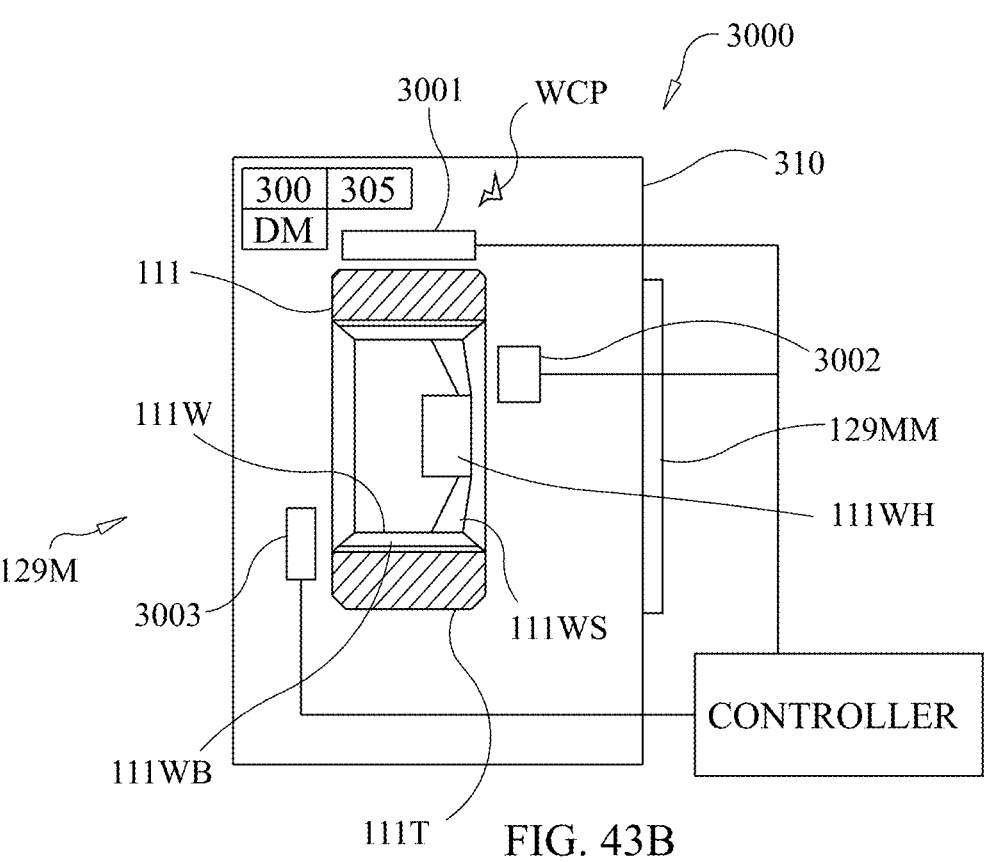

Referring to FIGS. 43A-43B one or more of the tire balancers described herein (inclusive of the robotic arm mounted tire balancers, generally 129M, 129MS, and the stand alone tire balancers, generally 183) may include a sonic scanning system 3000 that effects detection of one or more of axial (e.g., along the Z direction) and radial (e.g., along the Y and X directions) anomalies of the wheel assembly 111 (or any of the components thereof). In this example, the tire balancer 183, 129M, 129MS includes one or more ultrasonic sensors 3001-3003 (e.g., such as a phased array sensor or any other suitable sonic sensor) coupled to the frame 310, 183F in any suitable manner so that a least a portion of the wheel assembly 111 is within a field of view of the one or more ultrasonic sensors 3001-3003. For example, the ultrasonic sensors 3001-3003 are positioned on the frame so that sensor 3001 detects a side view of the tire and barrel/drum 111WB of the wheel 111W; sensor 3002 detects a side view of the wheel hub 111WH and spokes/center disc 111WS; and sensor 3001 detects an end view of the tire 111T (e.g., the tire tread) and barrel 111WB. While three ultrasonic sensors 3001-3003 are illustrated in FIGS. 43A-43B, in other aspects, there may be more or less than three ultrasonic sensors positioned to detect any suitable portions of the wheel assembly 111. As may be realized, the wheel assembly 111 may be rotated by the drive roller 300 of tire balancer 129M, 129MS or a suitable drive shaft 3099 of tire balancer 183 to effect scanning of the wheel assembly 111 with the sonic scanning system 3000

The ultrasonic sensors 3001-3003 are coupled to the controller 129CNT in any suitable manner (e.g., a wired connection or a wireless connection). The controller 129CNT is configured to operate the ultrasonic sensors, in any suitable manner, to obtain three-dimensional images/models and/or two-dimensional images of the wheel assembly 111. The controller 129CNT includes any suitable image analysis algorithms that effects detection of anomalies in the wheel assembly 111 from the obtained three-dimensional images and/or two-dimensional images of the wheel assembly 111. As described herein, anomalies may include increased or decreased thickness of tire walls/tread (e.g., compared to other areas of the tire wall/tread), increased or decreased tire belt density, wheel chips/gouges, etc. With the controller 129CNT being programmed with material properties of the tire 111T and wheel 111W, and with the size (e.g., volume) and location of the anomaly determined from the orbital scanning, the controller 129CNT is configured to determine a mass (e.g., a missing mass/void or an increase in mass) of the anomaly. Based on a missing mass, the controller 129CNT may indicate placement of a wheel weight 3188 (see, e.g., FIGS. 44A and 56) having substantially the same mass as the missing mass to be placed on the wheel 111W at or adjacent the location of the missing mass. Based on an increased in mass, the controller 129CNT may indicate placement of a wheel weight 3188 having substantially the same mass as the increased mass to be placed on the wheel 111W at a location opposite the location of the increased mass. Wobble of the wheel assembly 111 (e.g., in the Z direction) may be determined by the controller 129CNT based on the three-dimensional distance sensing inherent to the ultrasonic sensors 3001-3003 (and ultrasonic sensor 3004 described below).

In other aspects, an ultrasonic sensor 3004 may be provided that is shaped and sized so as to have a field of view that is large enough to view an entirety of the wheel assembly 111 (e.g., view the entire tire sidewall and face of the wheel). Here, a complete three-dimensional image/model of the wheel assembly 111 may be generated by the controller 129CNT, whereas three dimensional images/models of the wheel assembly may only include the portions of the wheel assembly included in the respective fields of view of the ultrasonic sensors 3001-3003.

Figure 51A:
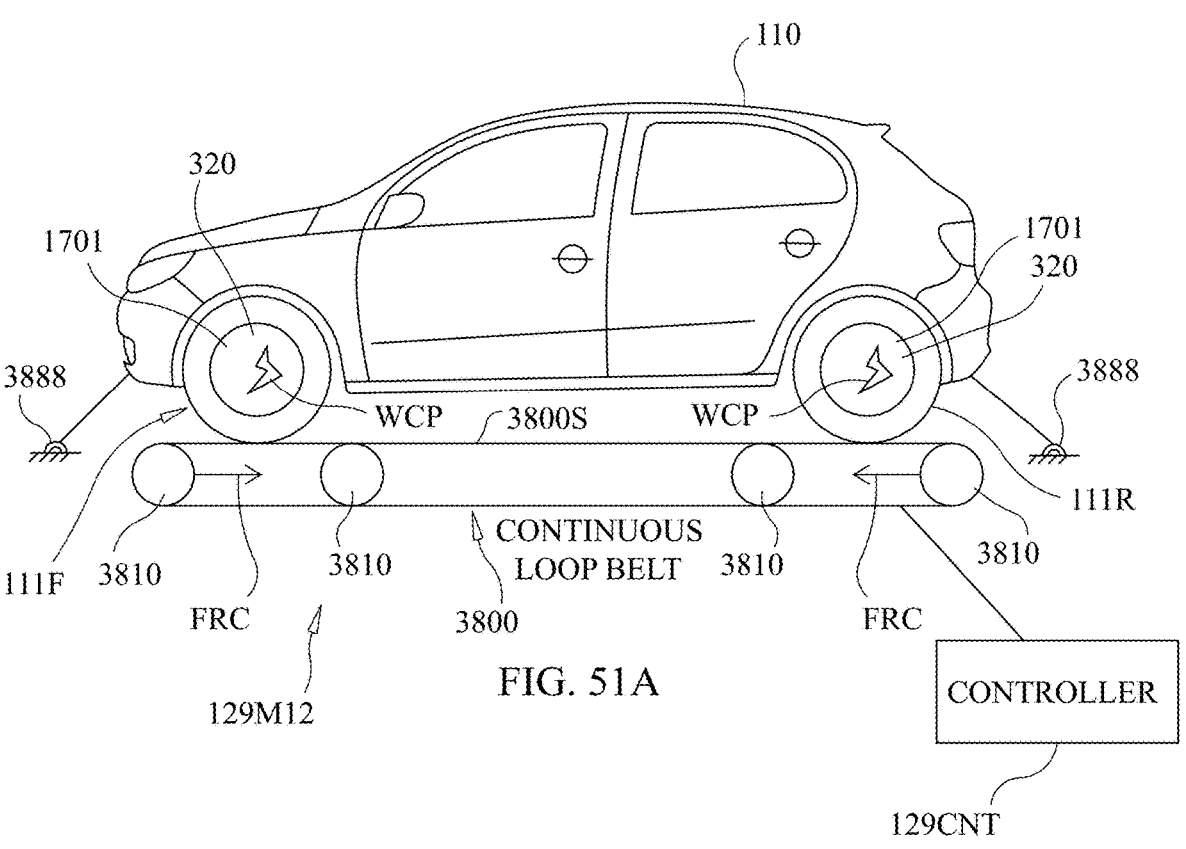
FIGS. 51A-51B are schematic illustrations of a portion of an automated tire changing system in accordance with aspects of the present disclosure.
Figure 51B:
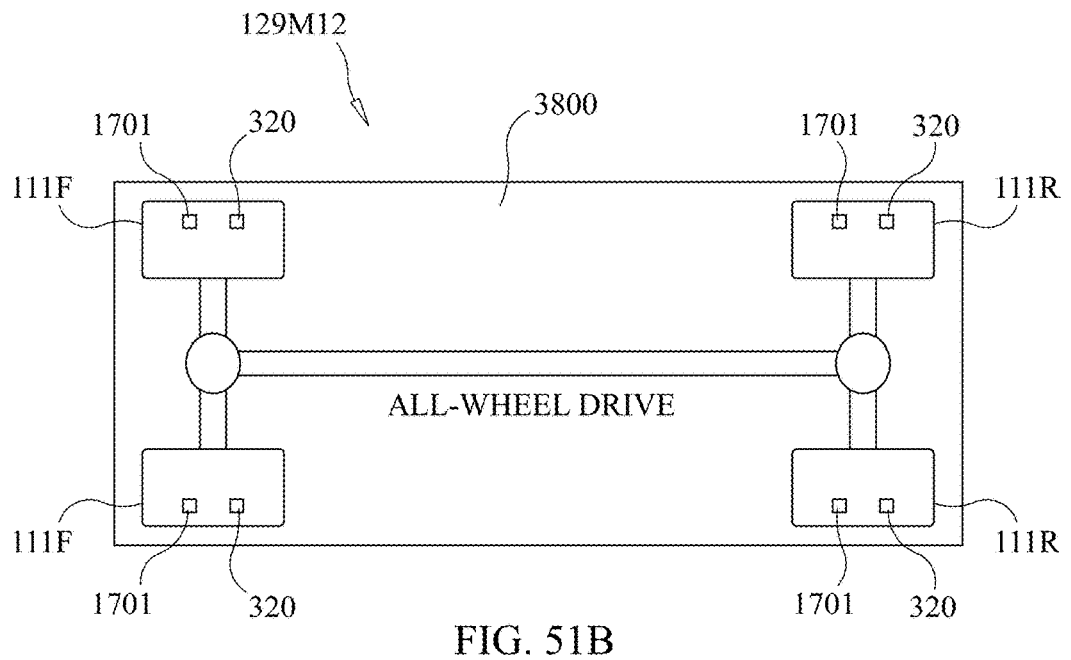

Referring to FIGS. 51A and 51B tire balancer 129M12 is illustrated. The tire balancer 129M12 provides for substantially simultaneous determination of tire imbalance for each wheel assembly 111 of a front-wheel drive, rear-wheel drive, or all-wheel drive vehicle. The tire balancer 129M12 includes at least one continuous loop belt 3800 that has a riding surface 3800S supported by more than one idler roller 3810. The vehicle 110 is driven onto the riding surface 3800S such that the vehicle is supported by the continuous loop belt 3800. The continuous loop belt is illustrated as a single belt in FIG. 43B on which all four wheel assemblies 111 (e.g., front wheel assemblies 111F and rear wheel assemblies 111R) are supported; however, in other aspects, there may be more than one continuous loop belt (such as illustrated in FIGS. 38A and 38B). Where more than one continuous loop belt is provided, rotation of each continuous loop belt is coupled to the rotation of each other continuous loop belt by any suitable transmission/drive system (e.g., such as drive system 2560) so that each continuous loop belt rotates substantially simultaneously with and at the same rate as each other continuous loop belt.

The continuous loop belt 3800 simulates a driving/riding surface on which the vehicle 110 travels where the vehicle moves under its own power. For example, the vehicle 110 is driven onto the continuous loop belt, such as at or adjacent a tire changing system 100, 100A. The vehicle 110 is secured to any suitable fixed location(s) of or adjacent the tire changing system 100, 100A so that the vehicle 110 is held stationary. For example, anchors 3888 are provided adjacent the continuous loop belt 3800 and the vehicle 110 is tethered to the anchors 3888 in any suitable manner (in a similar manner a vehicle is tethered to an automotive dynamometer) so that as power is applied to one or more of the vehicle wheel assemblies 111R, 111F (e.g., by the vehicle motor/engine), the wheels assemblies 111R, 111F cause the continuous loop belt 3800 to rotate about the rollers 3810. As may be realized, the driving of the continuous loop belt 3800 (common to all wheel assemblies 111R, 111F of the vehicle 111) by one or more wheel assemblies 111r, 111F causes non-powered wheels 111R, 111F to rotate at the same speed at substantially the same time, or where all wheel assemblies 111R, 111F are powered the common continuous loop belt 3800 provides for all-wheel drive vehicle operation. As may also be realized, resistance (e.g., opposing the drive force of the wheel assemblies 111R, 111F) may be provided to the continuous loop belt 3800 by one or more of the rollers 3810 to simulate travel of the vehicle along a roadway.

To determine/detect one or more of radial accelerations R of each wheel assembly 111 and axial accelerations Z (relative to the wheel hub/spindle to which the wheel assembly 111 is coupled) of each wheel assembly 111 the remote motion detection module 320 and/or the wheel weights 1701 may be affixed to each wheel assembly 111R, 111F in the manner described herein. The vehicle 110 is operated to provide motive force to at least one wheel assembly 111R, 111F to effect rotation of all of the wheel assemblies 111R, 111F of the vehicle 110 supported by/on the continuous loop belt 3800. Wheel balance metrics (e.g., one or more of the radial runout and lateral runout) are obtained for each wheel assembly 111R, 111F, as described herein, by the controller 129CNT from the inertial measurement units 1702 of the respective wheel weights 1701 and/or from the sensors of the respective remote detection module 320 applied/coupled to the respective wheel assembly 111R, 111F. The amount of weight to be coupled to the respective wheel 111W and the location of weight to be coupled to the respective wheel are determined by the controller 129CNT in any suitable manner (such as in a manner similar to that described herein with respect to FIGS. 16A-19 and 30A-31).

In other aspects, the riding surface 3800S may be formed by, e.g., a facility floor, test track, etc. of known ride quality (e.g., known flatness), where the known ride quality is configured such that with the vehicle travelling on and over the riding surface, effects of the riding surface on the wheel assemblies with respect to wheel accelerations in the radial R and axial Z directions is negligible. Here, the vehicle travels along the riding surface with the remote motion detection module 320 and/or the wheel weights 1701 may be affixed to each wheel assembly 111R, 111F. Wheel balance metrics (e.g., one or more of the radial runout and lateral runout) are obtained for each wheel assembly 111R, 111F, as described herein, by the controller 129CNT from the inertial measurement units 1702 of the respective wheel weights 1701 and/or from the sensors of the respective remote detection module 320 applied/coupled to the respective wheel assembly 111R, 111F. The amount of weight to be coupled to the respective wheel 111W and the location of weight to be coupled to the respective wheel are determined by the controller 129CNT in any suitable manner (such as in a manner similar to that described herein with respect to FIGS. 16A-19 and 30A-31).

In still other aspects, deflection of the support surface 3800S between the rollers 3810, e.g., forward and aft of each wheel assembly 111R, 111F supported by the continuous loop belt 3800 may be employed to determine the wheel balance metrics for balancing the wheels assemblies 111R, 111F in a manner substantially similar to that described above with respect to FIGS. 37-38B. However, in this aspect the continuous loop belt is driven in rotation under motive force of the vehicle 110 wheel assemblies rather than a drive motor DM driving the rollers (see FIGS. 37-38B).

Figures 55A, 55B, 55C:
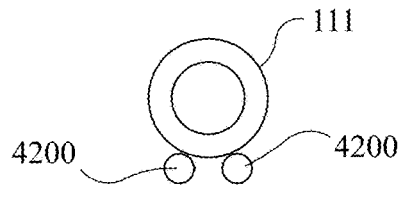
FIGS. 55A-55C are schematic illustrations of a portion of an automated tire changing system in accordance with aspects of the present disclosure.

Referring to FIGS. 55A and 55B tire balancer 129M15 is illustrated. The tire balancer 129M15 provides for substantially simultaneous determination of tire imbalance for each wheel assembly 111 of a front-wheel drive, rear-wheel drive, or all-wheel drive vehicle. The tire balancer 129M15 includes passive rollers 4200 and remote motion detection module 320 (as described herein) and/or wheel weights 1701 (as described herein). The passive rollers 4200 includes a passive roller 4200FR, 4200FL, 4200RR, 4200RL each of which corresponds to and is configured to support a respective wheel assembly 111FR, 111FL, 111RR, 111RR of the vehicle 110. The passive rollers 4200 are not driven by a motor so as to cause rotation of the respective wheel assembly 111, rather it is motive force from the wheel assembly (e.g., via the vehicle motor/engine) that causes rotation of the passive roller 4200. In some aspects, the passive rollers 4200 may be configured to provide rolling resistance (e.g., against the motive force of the wheel assembly) to the drive wheels of the vehicle 110.

In a manner similar to that described herein with respect to FIG. 34, the rollers corresponding to the front and/or rear wheel assemblies of the vehicle 110 may be movable. For example, the passive rollers 4200 corresponding to an axle (s) (e.g., front and/or rear) of the vehicle 110 may be mounted on a slide 2100 so that the distance 4299 between the front passive rollers 4200FR, 4200FL (corresponding to the front wheel assemblies 111FR, 111FL) and the rear passive rollers 4200RR, 420RLF (corresponding to the rear wheel assemblies 111RR, 111RL) may be adjusted (prior to driving the vehicle onto the passive rollers 4200) according to a wheel base WLBS of the vehicle 110. The slide 2100 may be coupled to and driven by any suitable motor SLM under control of the controller 129CNT to effect adjustment of the distance 4299 depending on the vehicle 110 wheelbase WLBS.

The passive rollers 4200FR, 4200FL, 4200RR, 4200RL may be selectively coupled to each other depending on a drive train configuration (e.g., front-wheel drive, rear-wheel drive, all-wheel drive) of the vehicle 110 so that substantially simultaneous balancing of the driven and non-driven wheel assemblies is effected. For example, the tire balancer 129M15 includes any suitable transmissions TRAN1-TRAN5 (e.g., shafts) and clutches/differentials CLU1-CLU3 that selectively couple one passive roller to another passive roller. For example, the front passive rollers 4200FR, 4200FL are coupled to each other by, for example, transmissions TRAN1, TRAN2 and a differential CLU1 (such as a conventional automobile differential) that allows the passive rollers 4200FR, 4200FL to rotate at different speeds. The rear passive rollers 4200RR, 4200RL are coupled to each other by, for example, transmissions TRAN3, TRAN4 an differential CLU3 (such as a conventional automobile differential) that allows the passive rollers 4200RR, 4200RL to rotate at different speeds. Each differential CLU1, CLU3 is coupled to a respective portion TRANSA, TRAN5B of transmission TRAN5. The portions TRANSA, TRANSB are selectively coupled to each other by clutch CLU2. Here, the passive rollers 4200 may be configured for an all-wheel drive by disengaging clutch CLU2 so that each wheel assembly 111 drivingly rotates a respective passive roller 4200. The passive rollers 4200 may be configured for a front or rear wheel drive vehicle by engaging clutch CLU2 so that, with for example a front-wheel drive vehicle, at least one of the front passive rollers 4200FR, 4200FL drives rotation of both rear passive rollers 4200RR, 4200RL; and with for example a rear-wheel drive vehicle, both of the front passive rollers 4200FR, 4200FL are driven by rotation of at least one rear passive roller 4200RR, 4200RL. To effect rotation of both front passive rollers by the at least one rear passive roller, the differential CLU1 may include a clutch that selectively locks the differential (e.g., a locking differential) so that both the front passive rollers are driven. Similarly, to effect rotation of both rear passive rollers by the at least one front passive roller, the differential CLU3 may include a clutch that selectively locks the differential so that both the rear passive rollers are driven. The selections of engaging/disengaging the clutch CLU2 and engaging/disengaging the clutch of the differentials CL1, CLU3 may be made by an operator of the tire changing station, through the controller 129CNT based on the vehicle 110 drive train. The controller 129CNT may also be programmed to engage/disengage the clutch CLU2 and lock/unlock the differentials CLU1, CLU3 to accommodate any suitable all-wheel drive system including, but not limited to, asymmetric or symmetric all-wheel drive.

The passive rollers 4200 simulate a driving/riding surface on which the vehicle 110 travels where the vehicle moves under its own power. For example, as noted above, the passive rollers 4200 are configured as drive on/off rollers/ modules that may be integrated into a floor of a tire changing system 100, 100A in a manner similar to that illustrated in FIG. 35. The vehicle 110 is driven onto the passive rollers 4200, such as at or adjacent a tire changing system 100, 100A. The vehicle 110 is secured to any suitable fixed location(s) of or adjacent the tire changing system 100, 100A so that the vehicle 110 is held stationary. For example, anchors 3888 are provided adjacent the continuous loop belt 3800 and the vehicle 110 is tethered to the anchors 3888 in any suitable manner (in a similar manner a vehicle is tethered to an automotive dynamometer) so that as power is applied to one or more of the vehicle wheel assemblies 111FR, 111FL, 111RR, 111RL (e.g., by the vehicle motor/ engine), the wheel assemblies 111FR, 111FL, 111RR, 111RL cause the respective passive roller 4200FR, 4200FL, 4200RR, 4200RL to rotate.

To determine/detect one or more of radial accelerations R of each wheel assembly 111 and axial accelerations Z (relative to the wheel hub/spindle to which the wheel assembly 111 is coupled) of each wheel assembly 111 the remote motion detection module 320 and/or the wheel weights 1701 may be affixed to each wheel assembly 111FR, 111FL, 111RR, 111RL in the manner described herein. The vehicle 110 is operated to provide motive force to at least one wheel assembly 111FR, 111FL, 111RR, 111RL. Wheel balance metrics (e.g., one or more of the radial runout and lateral runout) are obtained for each wheel assembly 111FR, 111FL, 111RR, 111RL, as described herein, by the controller 129CNT from the inertial measurement units 1702 of the respective wheel weights 1701 and/or from the sensors of the respective remote detection module 320 applied/coupled to the respective wheel assembly 111FR, 111FL, 111RR, 111RL. The amount of weight to be coupled to the respective wheel 111W and the location of weight to be coupled to the respective wheel are determined by the controller 129CNT in any suitable manner (such as in a manner similar to that described herein with respect to FIGS. 16A-19 and 30A-31).

Referring to FIGS. 52A-52C tire balancer 129M13 is illustrated. Here, the tire balancer includes a remote motion detection module 320, a wheel assembly spin unit 3930, and a vision system 3905. The remote motion detection module 320 is substantially similar to that described herein with respect to FIG. 22 and includes the passive fiducials 922A, 922B, 922C. The wheel assembly spin unit 3930 is substantially similar to that described above with respect to FIG. 20A and includes the centering protrusion 760 and the motor 710 for rotating the centering protrusion 760. Here, the mounting plate 321 of the remote motion detection module 320 includes a central aperture 321AP configured so that the centering protrusion 760 passes through the central aperture 321AP to engage the wheel 111W in the manner described herein. The vision system 3905 includes one or more optical sensors 3910 (e.g., any suitable cameras) coupled to a housing/frame 3930F of the wheel assembly spin unit 3930. The housing 393OF includes an end effector mount 129MM so that the housing 3930 may be coupled to the robotic arm 126; while in other aspects the tire balancer 129M13 may be stationarily fixed at a tire changing system 100, 100A, where the wheel assembly is rotated by a floor mounted roller 300 or the centering protrusion 760 (e.g., where the centering protrusion 760 may be coupled to a linear actuator to move axially for engaging and disengaging the wheel assembly 111).

In operation of the tire balancer 129M13, the vehicle suspension components 500 are substantially immobilized, such as by compressing a shock of the suspension components 500 against a suspension restraint 3950 (e.g., jack stand, jack, lift, etc.) that engages, for example, a control arm of the suspension components 500. The shock is compressed a suitable amount such that movement of the suspension components caused by rotation of the wheel assembly 111 is negligible with respect to balancing of the wheel assembly 111.

The remote motion detection module 320 is coupled to the wheel assembly 111 in the manner described herein and the centering protrusion 760 is engaged with the wheel 111W in the manner described herein. The vision system 3905 images the wheel assembly at least the fiducials 922A-922C of the remote motion detection module 320 coupled to the wheel assembly 111 with the wheel assembly 111 held rotationally stationary (i.e., a "still" image—see FIG. 52B). The vision system 3905 communicates signals from the one or more optical sensors 3910 to the controller 1219CNT that embody the still image(s) of at least the fiducials 922A-922C. The centering protrusion 760 is driven in rotation by the motor 710 so that the wheel assembly 111, and the remote motion detection module 320 coupled to the wheel assembly 111, is/are rotated (in other aspects, the wheel assembly 111 may be rotated in any suitable manner such as with the roller 300). With the wheel assembly 111 rotating the image system 3905 images at least the fiducials 922A-922C (i.e., a "dynamic" image—see FIG. 52C). The vision system 3905 communicates signals from the one or more optical sensors 3910 to the controller 1219CNT that embody the dynamic image(s) of at least the fiducials 922A-922C. The controller 129CNT is configured to correlate the still image(s) with the dynamic image(s) in any suitable manner to determine one or more of the radial R and axial Z accelerations/runout of the wheel assembly. For example, the fiducials 922A-922C in the still image have a predetermined pattern are placed along a virtual circle VC having a predetermined diameter. The fiducials 922A-922C may also have different shapes and/or colors so that one fiducial is distinguished from another fiducial in the images obtained with the optical sensor(s) 3910. The controller 129CNT is configured to compare the locations of the different fiducials 922A-922C (and/or the virtual circle VC on which the fiducials are arranged) as obtained from any suitable number of dynamic images with the locations of the fiducials 922A-922C (and/ or the virtual circle VC on which the fiducials are arranged) in the still image(s) to determine radial R accelerations of the wheel assembly. The controller 129CNT may also be configured to perform any suitable image analysis (e.g., a pixel by pixel analysis), e.g., such as a Doppler shift analysis, to determine whether the fiducials are moving towards or away from the optical sensors 3910 in the Z direction and based on the Doppler shift the controller 129CNT determines the axial X accelerations of the wheel assembly 111. In other aspects, the radial R and axial Z accelerations may be determined in any suitable manner from the obtained still and dynamic images.

In a manner similar to that described herein, the controller 129CNT may determine an amount of wheel weight and a location of the wheel weight 3188 (see, e.g., FIGS. 44A and 56) with an empirically derived table EDT stored in a memory of the controller 129CNT that correlates the amount and position of the wheel weight 3188 with the determined radial R and axial Z accelerations of the wheel assembly 111.

Referring to FIGS. 53, 54A, and 54B the tire changing stations described herein may be configured to balance a wheel assembly 111 by determining a center of gravity and/or center of mass of the wheel assembly 111 and applying wheel weights 3188 (see, e.g., FIGS. 44A and 56) to the wheel assembly so that the center of mass is disposed at a predetermined location of the wheel assembly.

The predetermined center of mass may be empirically derived for each tire/wheel combination and stored in a table CMT accessible by the controller 129CNT and/or a human operator of the tire changing system 100, 100A. Referring to FIG. 53, the tire balancer 129M14 is illustrated. The tire balancer 129M14 may be substantially similar to that illustrated in FIGS. 50A-50C; however, in this aspect the robotic arm 126 carries at least one laser triangulation sensor 4000 that is configured to measure the center of mass of a rotating body (such as the wheel assembly 111 spun by the centering protrusion in the manner described herein with respect to FIGS. 20A-20D and 52A). A suitable example of a laser triangulation sensor 4000 is manufactured by Acuity Laser, a division of Schmitt Industries, Inc. of Portland, Oregon USA. The robotic arm 126 (or other suitable actuator positions the at least one laser triangulation sensor 4000 relative to the wheel assembly 111, the wheel assembly is spun by, for example, centering protrusion 760 or in any other suitable manner such as roller 300), and the center of mass is measured by the at least one laser triangulation sensor 4000 and controller 129CNT. The suspension components 500 may be substantially immobilized by the suspension restraint 3950 in the manner described herein with respect to FIG. 52A. The centering protrusion 760 (or roller 300) may be mounted to a linear slide so that with the wheel assembly 111 spinning the centering protrusion 760 (or roller 300) may be disengaged from the wheel assembly 111 to allow the wheel assembly to spin freely or "free wheel" with the at least one laser triangulation sensor 4000 sensing the wheel assembly. The controller 129CNT is configured to determine the center of mass CM based on the signals/data provided by the at least one laser triangulation sensor 4000.

The tire balancer 129M14 may also include a remote motion detection module 320 substantially similar to that illustrated in FIGS. 16A-16D; however, the mounting plate 321 includes the central aperture 321AP illustrated in FIGS. 52A-52C to allow engagement of the centering protrusion 760 with the wheel assembly 111. The remote motion detection module 320 and the at least one laser triangulation sensor 4000 may be used in combination or separately. Here, remote motion detection module 320 is coupled to the wheel assembly 111 (e.g., in the manner described herein), the wheel is spun in the manner described above, and the motion sensors 322A, 322B, 322C detect the radial and axial accelerations of the wheel assembly 111. The suspension components 500 may be substantially immobilized by the suspension restraint 3950 in the manner described herein with respect to FIG. 52A. The centering protrusion 760 (or roller 300) may be mounted to a linear slide so that with the wheel assembly 111 spinning the centering protrusion 760 (or roller 300) may be disengaged from the wheel assembly 111 to allow the wheel assembly to spin freely or "free wheel" with the at least one laser triangulation sensor 4000 sensing the wheel assembly. In other aspects, the wheel assembly 11 may be impacted, such as in the manner described herein with respect to FIGS. 28A and 28B where the motion in the wheel assembly 111 induced by the impact is employed to determine the center of gravity. The controller 129CNT is configured to determine the center of gravity CG of the wheel assembly 111 based on the data from the motion sensors 322A, 322B, 322C. A suitable manner in which the center of gravity CG may be determined by the controller 129CNT can be found in "Calculating the location of the Center-of-Gravity Using an Accelerometer Array" by Kristin Angel, Rochester Institute of Technology, RIT Scholar Works, Thesis, May 29, 2019, the disclosure of which is incorporated herein by reference in its entirety. In other aspects, the center of mass/gravity may be determined in any suitable manner. The controller 129CNT may determine the amount of weight to be applied to the wheel assembly 111 and the location of the weight on the wheel assembly 111 based on the determined center of gravity/ mass and an expected location of the center of gravity/mass. For example, the controller 129CNT may include a center of mass/gravity table CMT that includes empirically derived expected locations for the center of mass/gravity for different tire and wheel combinations. The controller 129CNT may compare the expected locations for the center of mass/gravity with the determined locations for the center of mass/gravity and determine in any suitable manner a mass (e.g., wheel weight 3188, see, e.g., FIGS. 44A and 56) and placement of the mass on the wheel assembly that moves the center of mass/gravity from the determined location to the expected location (e.g., if the determined location and expected locations do not substantially match within a predetermined tolerance). The wheel weight is applied to the wheel assembly 111 at the location prescribed by the controller 129CNT in any suitable manner, such as those described herein.

Referring to FIGS. 54A and 54B, the center of mass/ gravity may also be determined with the wheel assembly 111 off of the vehicle. For example, the wheel assembly 111 may be placed on a center of gravity scale 4100 (a suitable example of which is available from Loadstar® Sensors of Fremont California, USA) or any suitable balance fixture 4101 on which the wheel assembly may be balanced. The center of gravity scale 4100 is configured to automatically determine the center of gravity of the wheel assembly 111 and wheel weights 3188 (see, e.g., FIGS. 44A and 56) may be affixed to the wheel assembly (e.g., according to the table CMT) to move the center of gravity to the expected position for the given tire and wheel combination. The balance fixture 4101 is configured to support the wheel assembly 111 at a location corresponding to the expected center of gravity so that the wheel assembly 111 (when unbalanced) tilts relative to the horizontal and/or vertical planes HP, VP. Wheel weights 3188 (see, e.g., FIGS. 44A and 56) may be affixed to the wheel assembly 111 so that the wheel assembly 111 is aligned with the horizontal and/or vertical planes HP, VP as illustrated in FIGS. 54A and 54B. As may be realized, the center of gravity of the wheel assembly may be assessed with the wheel assembly in the horizontal orientation (see FIG. 54A) and the vertical orientation (see FIG. 54B).

Figure 59:
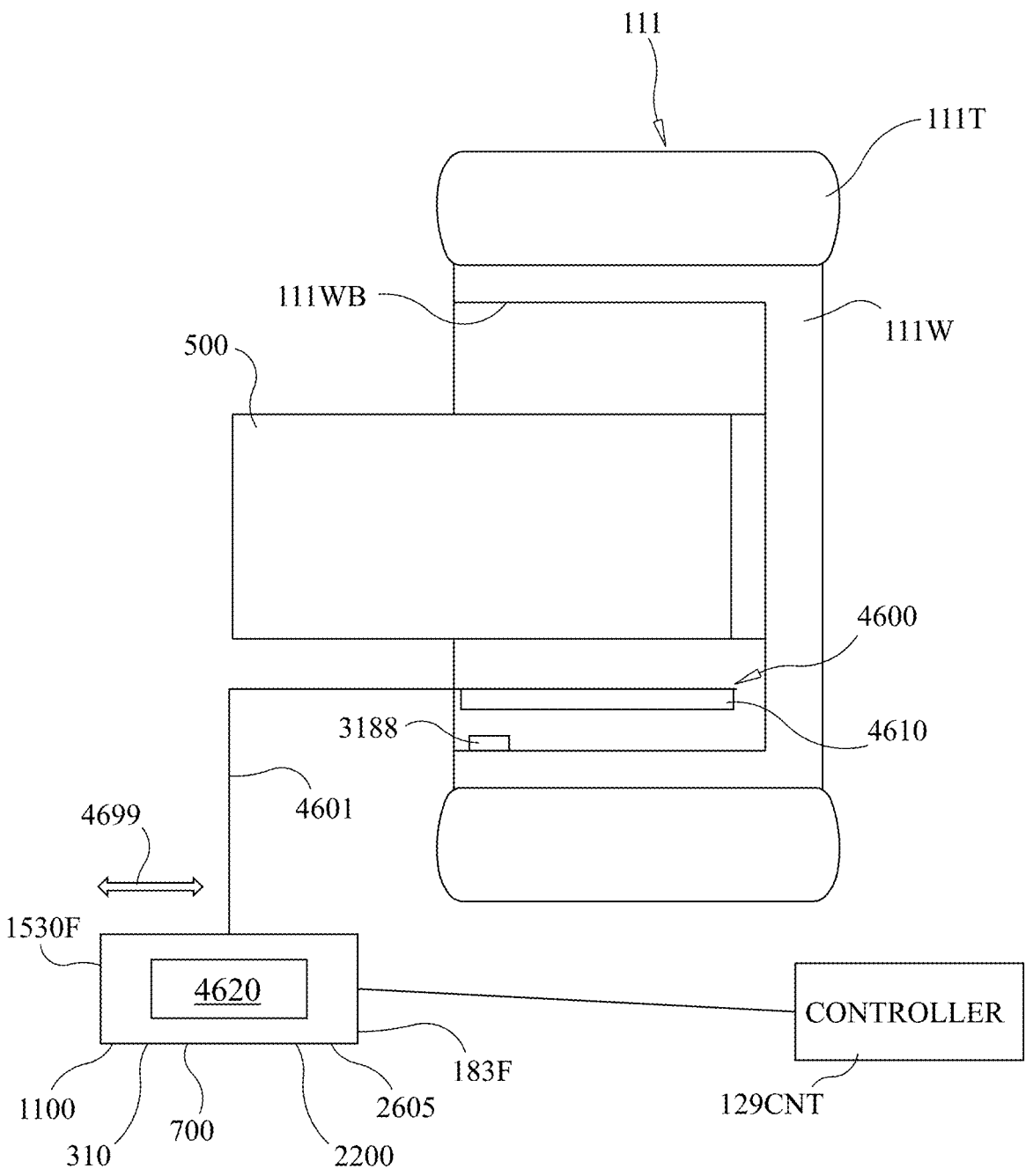
FIG. 59 is a schematic illustration of a portion of an automated tire changing system in accordance with aspects of the present disclosure.

Referring to FIG. 59, the tire balancers described herein may include a wheel weight location sensor 4600 that is configured one or more of detect a location of a wheel weight 3188 affixed to the wheel 111W and indicate a location of the wheel 111W to place a wheel weight 3188. For example, the wheel weight location sensor 4600 includes a sensor arm 4601 that is disposed on the tire balancer so that at least a portion of the sensor arm 4601 is positioned for insertion within the wheel barrel 111WB, between the suspension components 500 and the wheel barrel 111WB. The sensor arm 4601 may be movable in direction 4699 so that the portion of the sensor arm 4601 is inserted and removed from wheel barrel 111WB in any suitable manner, such as with any suitable actuator 4620 controlled by, for example, controller 129CNT. The sensor arm 4601 includes a laser scanner 4610 that is shaped and sized so as to scan at least the wheel barrel 111WB and detect the location of any wheel weights 3188 affixed to the wheel 111W. As may be realized, the sensor arm 4601 (such as where the wheel weight location sensor 4600 is mounted to the wheel shroud 700) and/or the wheel assembly 111 is rotated to effect scanning of the wheel barrel 111W. As described herein, the rotational angle of the wheel assembly 111 relative to the laser scanner 4610 may be provided to/determined by the controller 129CNT with encoders of the drive motors DM, 710 and data signals received from the laser scanner 4610. Here, the wheel assembly 111 may be rotated to a determined rotational angle (as determined with the detection of a wheel weight 3188 by the laser scanner 4610) to position the wheel weight 3188 relative to a wheel weight removal tool (as described herein) for removal of the wheel weight. For installation of a wheel weight, such as by an operator, the laser scanner may cast a laser line on the wheel 111W and the wheel may be rotated to a determined rotational angle such that the laser line marks the installation location of the wheel weight 3188.

Referring to FIGS. 45 and 46A-46D the tire changing system 100, 100A includes wheel weight applicator tool 3300. The wheel weight applicator tool 3300 is described herein with respect to employment of the wheel weight applicator tool 3300 with tire balancing machine 180, but in other aspects, the wheel weight applicator tool 3300 may be coupled to the robotic arm 126 (FIG. 1B) or tire exchanging robot 2220 (FIG. 35) and employed to apply wheel weights to the wheel 111W with the wheel 111W in situ the vehicle 110 in tire changing system 100 and/or tire changing system 100A.

The wheel weight applicator tool 3300 includes an articulated arm 3301 to which an applicator 3302 is coupled. The articulated arm 3301 may be a part of the tire balancing machine 183, the robotic arm 126, or a part of the tire exchange robot 2220. Where the articulated arm 3301 is the robotic arm 126, the applicator 3302 includes the end effector mount 129MM for coupling the applicator 3302 to the robotic arm 126. The applicator 3302 is flexible (e.g., comprises resiliently coupled segments 3355) so as to conform to a contour of the wheel barrel 111WB (see FIG. 46B). The applicator 3302 is configured to hold at least one wheel weight 3188 in any suitable manner. For example, the applicator 3302 includes a vacuum grip 3333 configured to selectively activate and deactivate suction at each of the segments 3355 for selectively holding and releasing a respective wheel weight 3318.

The wheel weights 3188 may be adhesive wheel weights such that prior to application of one or more of the wheel weights 3188 to the wheel 111W by the applicator 3302 the release liner 3188L is removed in any suitable manner (such as with a brush, suction cup, mechanical gripper, forced air, etc. that peels the adhesive liner 3188L from the wheel weight 3188) to expose the adhesive of the wheel weight 3188.

Here, the position and amount of wheel weight 3188 to be affixed to the wheel assembly 111 is determined as described herein using any of the tire balancers 183, 129M, 129MS described herein. The controller 129CNT controls the tire balancer and the wheel weight applicator tool 3300 to effect affixing the one or more wheel weights 3188 to the wheel 111W. For example, the drive roller 300 rotates the wheel assembly 111 so that a predetermined position of the wheel 111W at which the wheel weight is to be applied is located at, for example, the 6 o'clock position (or at any other suitable position depending on the position of the applicator 3302 relative to the wheel 111W or vice versa). Rotational positioning of the wheel 111W may be effected with any suitable sensors, such as those described herein, and/or with any suitable encoders of the drive motor DM of tire balancer shaft 3099. The release liner 3188L is removed from one or more of the wheel weights 3188 held by the applicator 3302 and the applicator 3302 positions the one or more wheel weights 3188 relative to the wheel 111W. The articulate arm 3301 moves the applicator 3302 relative to the wheel 111W so that the one or more wheel weights 3188 are pressed against the wheel at the predetermined location of the wheel 111W. The one or more wheel weights 3188 is selectively released by the controller 129CNT (e.g., by stopping, e.g., the vacuum of a segment(s) 3355 holding the one or more wheel weight 3188) and the articulate arm 3301 moves the applicator 3302 away from the wheel 111W leaving the one or more wheel weights 3188 affixed to the wheel 111W.

Figure 47:
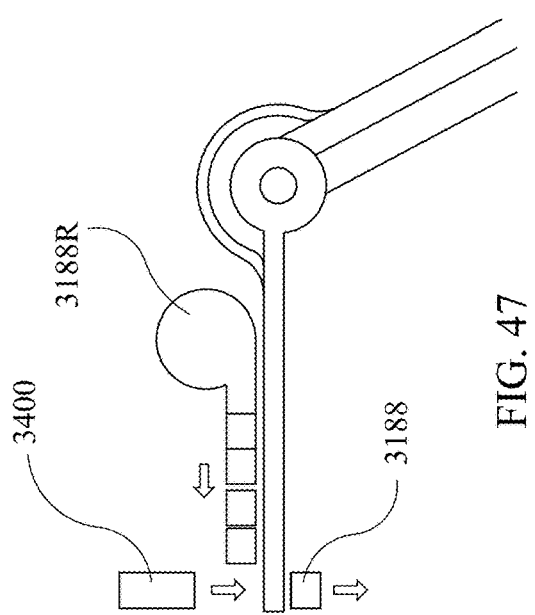
FIG. 47 is a schematic illustration of a portion of an automated tire changing system in accordance with aspects of the present disclosure.
Figure 46D:
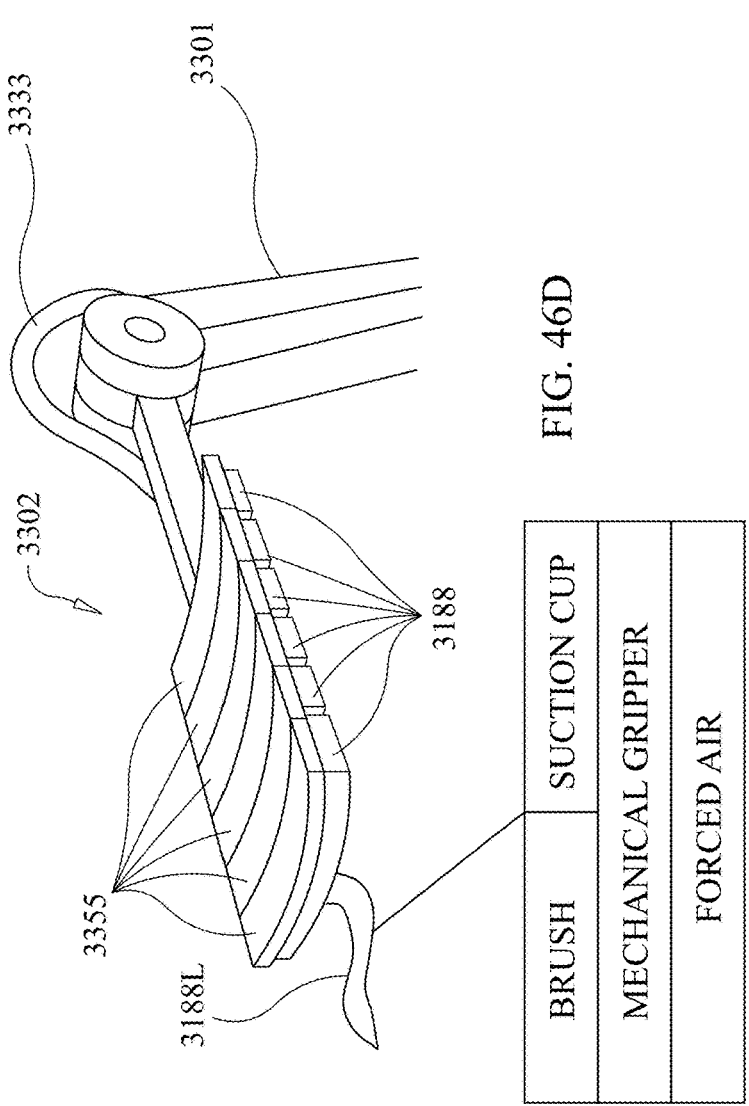

In other aspects, referring also to FIG. 47, the wheel weights may be provided, for application by the application 3302, from a roll or reel of wheel weights 3188R. The roll of wheel weights is mounted to the applicator 3302 in any suitable manner and includes any suitable drives for unrolling the wheel weights 3188 for application to the wheel 111W. Here, the roll 3188R may be configured such that there is no release liner that needs to be removed from the wheel weights 3188 (e.g., one surface of the wheel weights may function as a release liner in a manner similar to that of a roll of tape); while in other aspects, the release liner may be removed from the wheels weights 3188 in any suitable manner (e.g., forced air, a peeling knife, a driven spool (take up reel) that pulls the release liner off and rolls removed released liner on the spool, etc.) as the wheel weights 3188 are unrolled. The applicator 3302 includes a punch or press 3400 that pushes one or more wheel weights 3188 from the unrolled wheel weights 3188, off of the applicator 3302 and onto the wheel 111W for affixing the one or more wheel weights 3188 at the predetermined position of the wheel 111W.

Referring to FIG. 56, it is noted that while the wheel weights 3188 are described herein as being applied to the wheel 111W (e.g., at the wheel barrel 111WB; see FIG. 46B), the wheel weights 3188 may be configured as a center mass or ballast 3188C that is mounted on the wheel assembly axle or hub 4300 in any suitable manner. For example, referring also to FIG. 57, the center mass 3188C may be configured as an eccentric plate having any suitable shape (examples of which are illustrated in FIGS. 56 and 57) that includes a central mounting portion 4350 and an eccentric mass portion 4351. In the examples illustrated the center mass 3188C is configured as a plate that is disposed between the wheel 111W mounting pad and the wheel hub. The central mounting portion 4350 includes apertures 4350A through which the wheel studs 4310 pass. Tightening of the lug nuts to secure the wheel assembly 111 to the wheel hub also secures the center mass 3188C to the wheel assembly 111 so to rotate with the wheel assembly 111. In other aspects the central mass 3188C may be secured or otherwise affixed to the wheel assembly 111, wheel hub, and/or drive axle in any suitable manner (e.g., such as clamps, snaps, straps, etc.). The center mass 3188C may be selected from a number of different center masses 3188CN each having a different balancing characteristic (e.g., different eccentric mass, different shape so as to position the eccentric mass at a desired location, etc.).

Figure 44B:
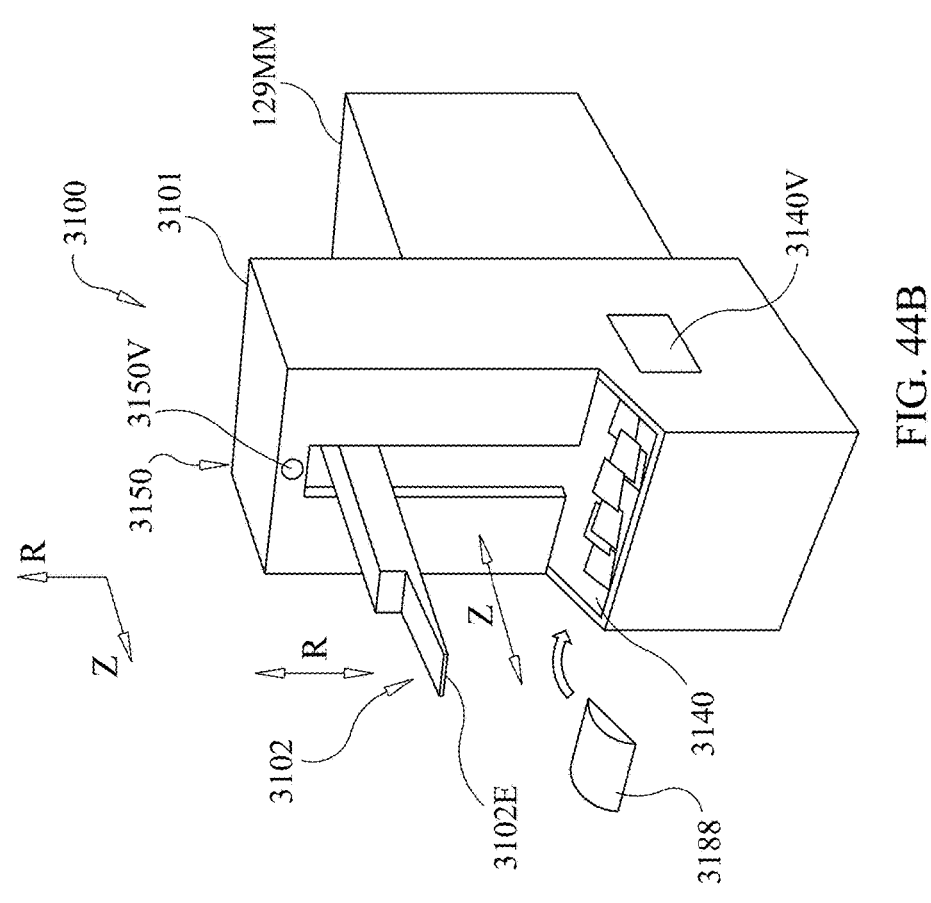
FIGS. 44A-44B are schematic illustrations of a portion of an automated tire changing system in accordance with aspects of the present disclosure.
Figure 44A:
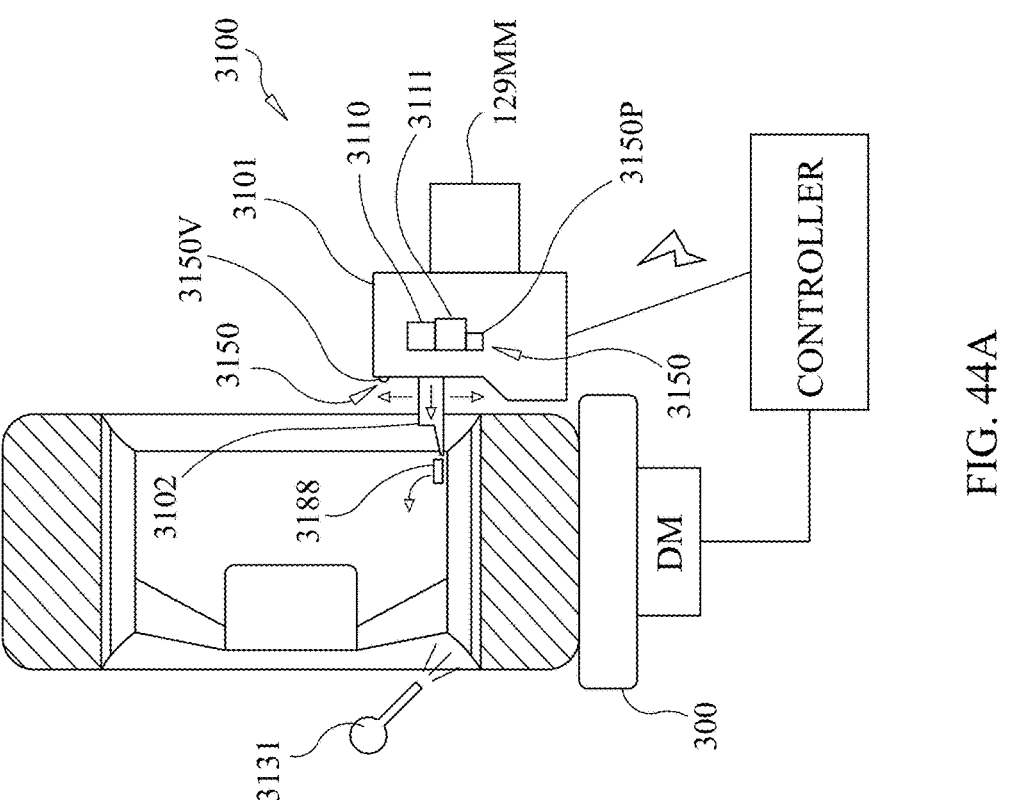

Referring to FIGS. 44A and 44B the tire changing system 100, 100A includes wheel weight removal tool 3100. The wheel weight removal tool 3100 includes an end effector mount 129MM for coupling the wheel weight removal tool 3100 to the robotic arm 126. In other aspects, the wheel weight removal tool 3100 may be mounted at a fixed location adjacent a respective wheel balancer 129MS of tire changing system 100A.

The wheel weight removal tool 3100 includes a frame 3101 to which the end effector mount 129MM is coupled such as in tire changing system 100; while in other aspects the frame 3101 effects spatially fixing the location (e.g., mounting to the floor or other stationary structure) of the wheel weight removal tool 3100 such as in the tire changing system 100A. The wheel weight removal tool 3100 includes an end effector or arm 3102 that is movably mounted to the frame 3101 so as to move in at least two degrees of freedom. For example, two or more drive motors 3110, 3111 are coupled to the frame and the arm 3102. The drive motor 3110 moves the arm 3102 in the radial direction R (e.g., with respect to the wheel assembly 111) and the drive motor 3111 moves the arm 3102 in the axial or Z direction (e.g., with respect to the wheel assembly 111). The drive motors 3110, 3111 are coupled to the controller 129CNT so that the controller 129CNT effects movement of the arm 3102 with the drive motors 3110, 3111.

The wheel weight removal tool 3100 is in communication with the controller 129CNT so that the controller 129CNT operates the arm 3102 in conjunction with the drive roller 300 so that the drive roller 300 rotates the wheel assembly 111 to position (e.g., substantially align) the wheel weight 3188 relative to the arm 3102. For example, where the wheel weight removal tool is positioned substantially at the 6 o'clock position (see FIG. 44A) relative to the wheel assembly, the controller may operate the drive roller 300 to position a wheel weight 3188 (that is affixed to the wheel 111W) substantially at the 6 o'clock position. Alignment of the arm 3102 and the wheel weight 3188 may be effected with any suitable position sensor 3150, such as a vision sensor 3150V or pressure sensor 3150P, coupled to controller 129CNT. The position sensor 3150 may be mounted to the frame 3101 or at any other suitable location so that the arm 3102 and a portion of the wheel 111W adjacent the arm 3102 is within a field of view of the vision sensor 3150V or so that contact between the arm 3102 and the wheel 111W is detected so as to position the arm 3102 relative to the wheel in the radial direction R. The wheel 111W rotates via the drive roller 300 under control of the controller 129CNT so that the wheel weight 3188 enters the field of view of the vision sensor 3150V and is detected by vision sensor 3150. The controller 129CNT stops rotation of the wheel 111W with the wheel weight 3188 in alignment with the arm 3102 based an image analysis of the signals from the position sensor 3150. In other aspects pressure sensor 3150P is configured to detect contact between the arm 3102 and the wheel weight 3188 as the wheel 111W is rotated. In still other aspects, any suitable capacitive, inductive, etc. sensors may be used to position the wheel weight 3188 relative to the arm 3102.

With the wheel weight 3188 aligned with the arm 3102, the controller 129CNT extends the arm 3102 in the Z direction so that the arm 3102 engages the wheel weight 3188. The arm 3102 includes a tapered end 3102E that in one aspect, is inserted (e.g., which may include movement of the arm 3102 in the radial direction R and employment of the position sensor 3150 to position the tapered end 3102E) between the wheel weight 3188 and wheel 111W so that the arm 3102 severs/cuts the adhesive between the wheel weight 3188 and the wheel 111W and pries (via movement of the arm 3102 in one or more of directions R, Z) the wheel weight 3188 from the wheel 111W; while in other aspects the arm 3102 is driven in the Z direction so that the tapered end 3102E (constructed of a material harder than the wheel weight material) is driven at least partially into the wheel weight 3188 (typically made of a soft material) so that movement of the arm in one or more directions R, Z peals, pulls, or pushes the wheel weight 3188 off of the wheel 111W. As may be realized, the wheel weight removal tool 3100 may be positioned (e.g., by the robotic arm 126 or stationarily mounted) at any suitable location (e.g., clocking position such as 12 o'clock, 3 o'clock, etc.) relative to the wheel assembly that effects removal of the wheel weight 3188 as described herein.

The wheel weight removal tool 3100 includes a waste bin 3140 into which the removed wheel weights are inserted. In one aspect the removed wheel weights 3188 may be inserted into the waste bin 3140 by suction (e.g., a vacuum source 3140V of the wheel weight removal tool 3100) or in any other suitable manner (such as by compressed air source 3131, brushes, etc.).

Figure 48:
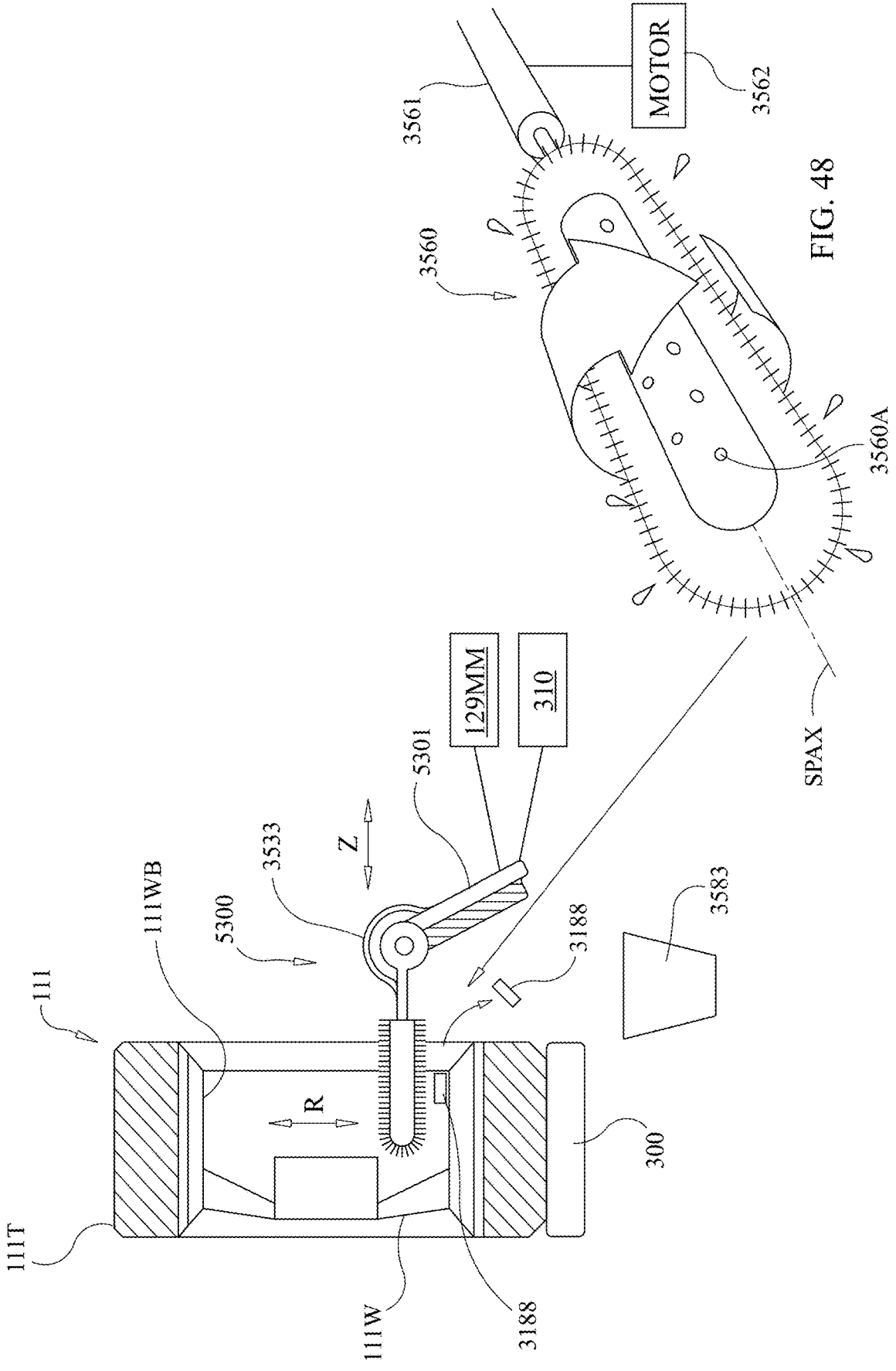
FIG. 48 is a schematic illustration of a portion of an automated tire changing system in accordance with aspects of the present disclosure.

Referring to FIG. 48 the tire balancers describe herein may include a wheel cleaning/wheel weight removal system 5300 that may be carried by the robotic arm 126 (e.g., as a stand-alone end of arm tool or mounted to the frame 310 of a tire balancer carried by the robotic arm 126) or mounted at a fixed location adjacent a tire exchange location of the tire changing system 100, 100A. The wheel cleaning/wheel weight removal system 5300 includes a rotating brush 3560 mounted to an articulate arm 5301 (which as noted above may be in some aspects the robotic arm 126). The articulated arm 5301 includes a spindle 3561 to which the brush 3560 is rotatably coupled. The spindle 3561 includes a motor 3562 configured to rotate the brush 2650 about a spindle axis SPAX; while in other aspects the motor 2562 may be located at any suitable location (such as within arm 5301) and coupled to the brush 3560 by any suitable transmission for rotating the brush 2650 about the spindle axis SPAX.

Any suitable fluid conduit 3533 (e.g., flexible hose or tube) may be provided where the fluid conduit 3533 supplies cleaning fluid/solvent to the brush 3560 through the spindle 3561. For example, the spindle 3561 may be hollow such that the fluid conduit 3533 supplies the cleaning fluid/solvent to the brush through the spindle 3561. The brush 3560 includes apertures 3560A (e.g., at the brush core) through which the cleaning fluid/solvent exits the spindle 3561 to wet the bristles of the brush 3560.

The brush 3560 is configured to at least strip a wheel weight 3188 from the wheel 111W. For example, the brush 3560 includes bristles having a stiffness or configuration (e.g., hooked bristles) sufficient to grip a wheel weight 3188 affixed to the wheel 111A and strip or otherwise remove the wheel weight 3188 from the wheel 111W. In other aspects, the wheel weight 3188 may be removed from the wheel 111W by a combination of the brush 3560 and the (scraper) arm 3102.

The removed wheel weight 3188 may be directed away from the wheel 111W by the brush 3560 towards any suitable collection receptacle 3583.

The articulated arm 5301 is configured for at least two degree of freedom movement (e.g., such as in the Z direction and the R direction) where the articulated arm moves in the Z direction to align the brush 3560 with at least part of the barrel 111WB of the wheel 111W, and moves the brush 3560 into contact with the barrel 111WB of the wheel 111W. The tire assembly 111 is rotated by, for example, drive roller 300 to move the wheel weights towards and through the brush 3560. Here, the drive roller 300 is operated by the controller 129CNT so that the wheel assembly 111 rotates a full rotation to clean the barrel 111WB and remove any wheel weights 3188; while in other aspects, any suitable vision sensors may be employed to identify a location of the wheel weight(s) and the drive roller 300 may be operated by the controller 129CNT to position the wheel weights for removal by the brush 3560.

The cleaning fluid/solvent may be configured to remove brake dust and other debris from the wheel. In some aspects, the cleaning fluid/solvent may also be configured to soften/dissolve the adhesive holding the wheel weight 3188 to the wheel 111W to help facilitate removal of the wheel weight 3188 by the brush 3560 and to, with the brush 3560, clean the adhesive from the wheel 111W.

Figure 49:
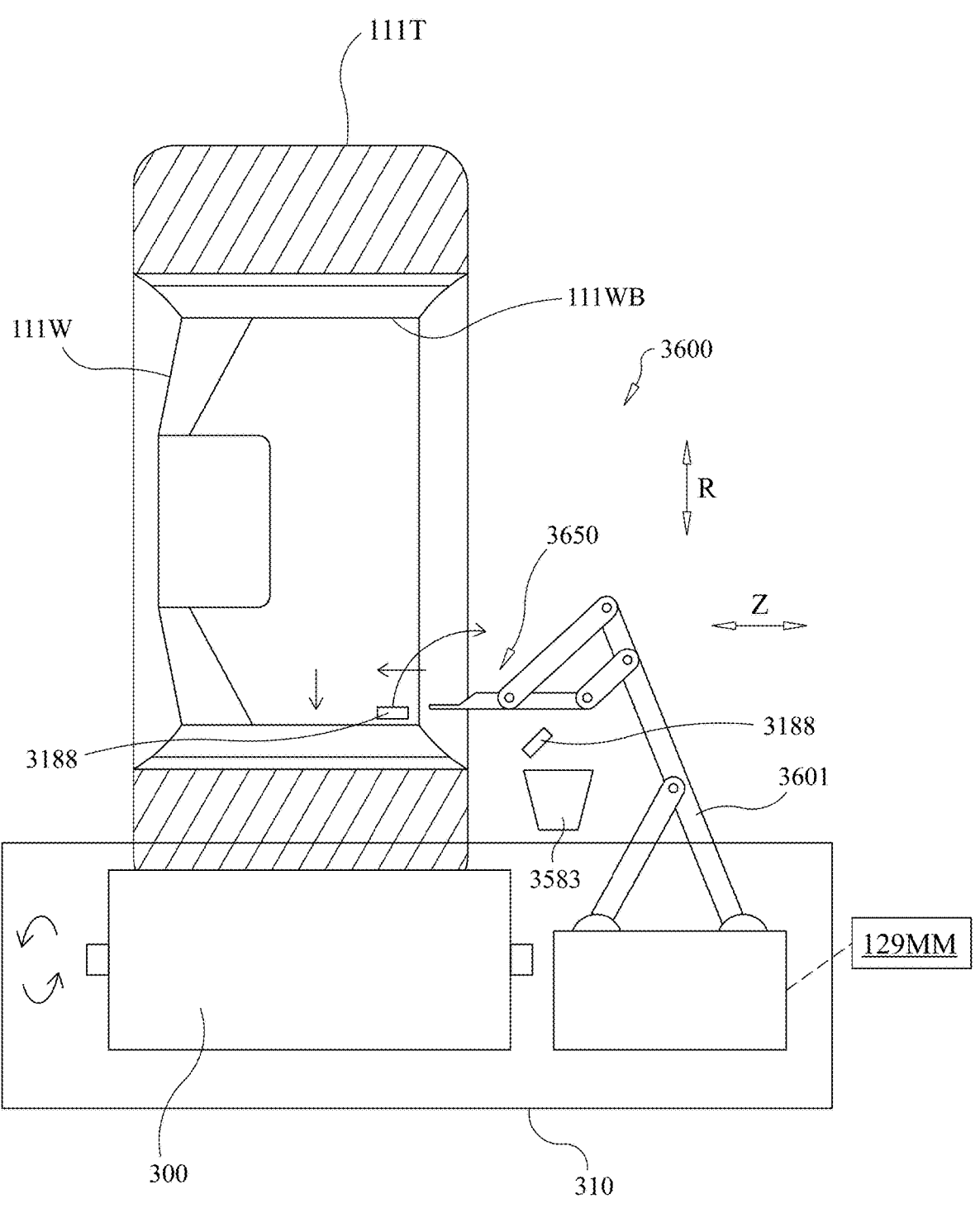
FIG. 49 is a schematic illustration of a portion of an automated tire changing system in accordance with aspects of the present disclosure.

Referring to FIG. 49 the tire balancers describe herein may include a wheel weight removal system 3600 that may be carried by the robotic arm 126 (e.g., as a stand-alone end of arm tool or mounted to the frame 310 of a tire balancer carried by the robotic arm 126) or mounted at a fixed location adjacent a tire exchange location of the tire changing system 100, 100A. The wheel weight removal system 3600 includes an articulated arm 3601 that includes an end effector or spatula 3650. In this example the articulated arm includes arm links that provide at least two degrees of freedom, such as in the Z and R directions so as to position the spatula 3560 substantially against the barrel 111WB of the wheel 111W. The drive roller 300, under control of the controller 129CNT, rotates the wheel assembly 111 so that the wheel weight rotates past the spatula 3650. With rotation of the wheel assembly, the spatula 3560 is inserted between the barrel 111WB and the wheel weight 3188, severing the adhesive bond between the wheel weight 3188 and the wheel The removed wheel weight 3188 may be directed by the spatula 3650 to any suitable collection receptacle 3583.

Figure 60:
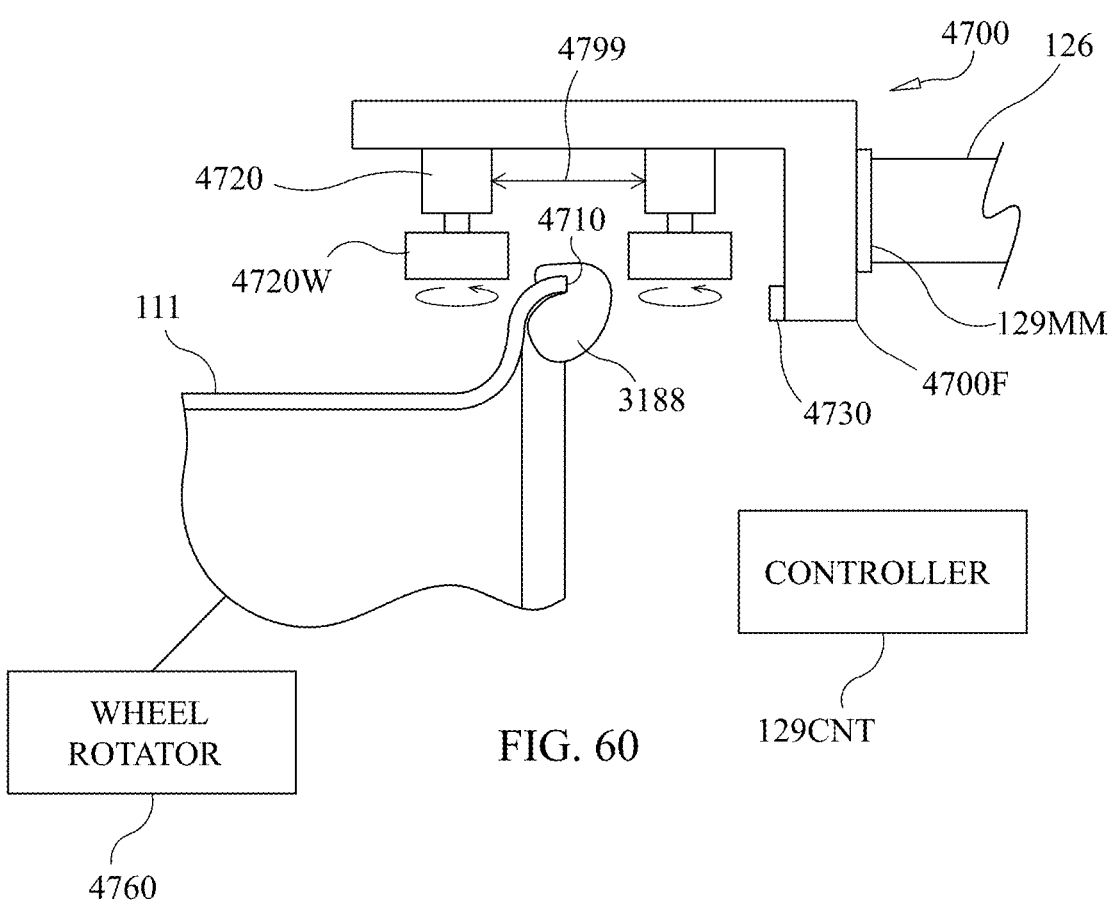
FIG. 60 is a schematic illustration of a portion of an automated tire changing system in accordance with aspects of the present disclosure.

Referring to FIG. 60, the tire balancers and/or tire changing systems 100, 100A described herein may include wheel weight removal tool 4700. The wheel weight removal tool 4700 includes a frame 4700F. The frame 4700F include end effector mount 129MM for coupling the wheel weight removal tool 4700 to, for example, the robotic arm 126 or any other suitable actuator configured to position the wheel weight removal tool relative to a wheel (the wheel being disposed in situ the vehicle or off the vehicle). The wheel weight removal tool 4700 include at least one grinder 4720 mounted to the frame 4700F and at least one wheel lip detection sensor 4730 (e.g., laser scanner, proximity sensor, vision sensor, etc.). The at least one grinder 4720 may be movably coupled to the frame 4700F for movement in direction 4799 (e.g., by any suitable actuator); while in other aspects, the at least one grinder 4720 is stationarily fixed to the frame 4700F. Here, with the tire 111T removed from the wheel 111W, the robotic arm 126 (or other actuator) scans the wheel to detect a position of the lip 4710 (e.g., in the coordinate system of the robot). The controller 129CNT, knowing the angular rotational position of the wheel weight (as described herein) rotates the wheel 111W with the wheel rotator 4760 (generically representative of the wheel rotation means described herein, e.g., rollers, centering protrusions, etc.) and/or the robotic arm 126 moves the wheel weight removal tool 4700 relative to the wheel to position the wheel weight 3188 and the wheel weight removal tool 4700 relative to each other. The at least one grinder 4720 includes a grinder wheel 4720W that is positioned so that as the grinder 4720 is moved in direction 4799 (either by the actuator coupled to the frame 4700F or by movement of the robotic arm) the grinding wheel grinds the wheel weight 3188 off of the wheel 111W substantially without contacting the lip 4710 of the wheel 111W.

Figure 61:
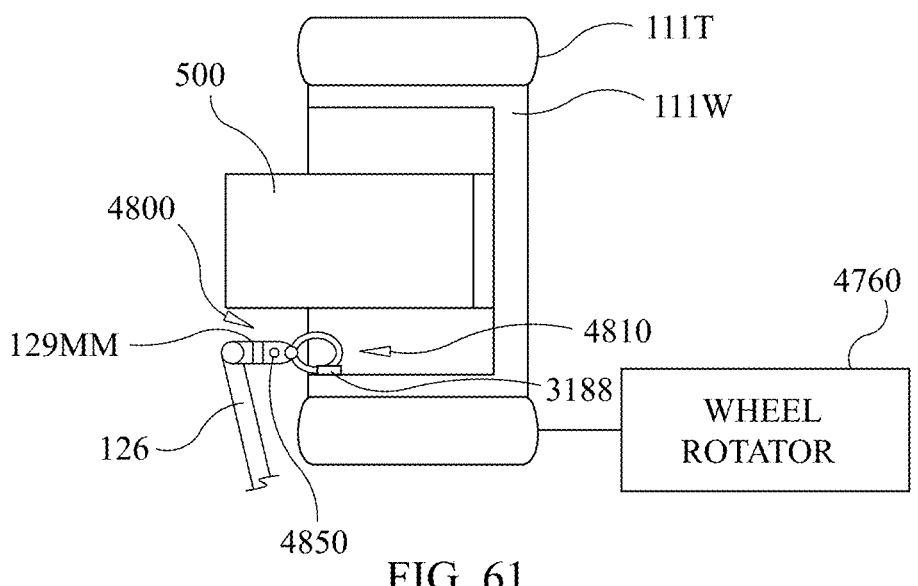
FIG. 61 is a schematic illustration of a portion of an automated tire changing system in accordance with aspects of the present disclosure.

Referring to FIG. 61, the tire balancers and/or tire changing systems 100, 100A described herein may include wheel weight removal tool 4800. The wheel weight removal tool 4700 includes a gripper 4810 that is coupled to the robotic arm 126 (or other suitable actuator) by end effector mount 129MM. The robotic arm 126 or any other suitable actuator is configured to position the gripper 4810 relative to a wheel (the wheel being disposed in situ the vehicle or off the vehicle) so as to clamp/grip the wheel weight 3188 for removal (e.g., pulling) of the wheel weight 3188 from the wheel 111W. The controller 129CNT, knowing the angular rotational position of the wheel weight (as described herein) rotates the wheel 111W with the wheel rotator 4760 (generically representative of the wheel rotation means described herein, e.g., rollers, centering protrusions, etc.) and/or the robotic arm 126 moves the gripper 4810 relative to the wheel 111W to position the wheel weight 3188 and the gripper 4810 relative to each other. In some aspects a vision sensor 4850 may be included in the wheel weight removal tool 4800 for effecting, at least in part, positioning of the gripper 4810 relative to the wheel weight 3188. The gripper 4810 includes any suitable clamping jaws, fingers, etc. configured to engage and stably hold the wheel weight 3188. The robotic arm 126 is moved, with the wheel weight gripped by the gripper 4810, so that the wheel weight 3188 is pulled or otherwise removed from the wheel 111W.

In accordance with one or more aspects of the present disclosure, a tire changing system is provided. The tire changing system includes a robotic end effector configured to effect rotation of a wheel assembly about a wheel hub with the wheel assembly in situ the vehicle; a remote motion detection module configured to couple with the wheel assembly so as to rotate as a unit with the wheel assembly and detect radial and axial accelerations of the wheel assembly; and a controller in communication with the remote motion detection module, the controller being configured to determine an amount of wheel balance weight, based on the detected radial and axial accelerations, that effects balancing of the wheel assembly.

As described above and as shown in FIG. 143 of the drawings, in one form, the bot 120, also referred to hereinafter as a robotic apparatus 1101, includes a plurality of actuators 126, each of which holds, or is a component of, a different one of the tools described above and below. In one form, the linear actuators 126 can be actuated independently or simultaneously, allowing for multiple tools to be independently controlled and assist in an operation at once.

The robotic apparatus 1101 is movable in the same fashion as described above with respect to the movement of the bot 120. For example, the robotic apparatus 1101 may be moveable along a traverse path (such as traverse path 299 in FIG. 2A) via wheels 120W, sliding elements such as rails and/or tracks, that include, but are not limited to, guide rod and sleeve bearings, or any other guide system for effecting linear traverse and/or rotational motion of the carriage 120C.

Alternatively, as shown in FIG. 151 of the drawings, the robotic apparatus 1101 may be mounted to a ramp 1105 via fasteners or welding of the frame 1102 to the ramp 1105. The ramp 1105 is configured such that a vehicle 1600 may drive onto it. The vehicle 1600 may then be positioned over a commercial lift 1700 or other lifting structure for lifting above the ramp 1105 or may sit on the ramp 1105 for subsequent operations, the nature and order of which are similar to the preferred embodiment of the robotic apparatus 1101. The robotic apparatus 1101 shown in FIG. 151 contains linear actuators 1350 (not shown) which allow it to traverse longitudinally and transversally along the ramp 1105.

More specifically, the robotic apparatus 1101 includes a frame 1102 onto which the components, tooling and electronics of the robotic apparatus 1101 are mounted. The tooling that is mounted on the robotic apparatus 1101 may include, for example, the tire bead breaker tool 129H, also referred to hereinafter as a bead breaker system 2000, the tire mounting/dismounting tool 129E, also referred to hereinafter as a bead tool system 82100, the tire deflation tool 129, the tire inflation tool 129L, an inflation tool system 2401, one or more gripper systems 82200, the wheel cleaning tool 129I, also referred to hereinafter as a cleaning tool system 2500, a lubrication tool system 2600, a valve stem tool system 2700, an alignment tool system 2800 and one or more gripper systems 82200. The collection of tools on the robotic apparatus 1101 is henceforth referred to as "tooling" for description purposes.

The actuators 126, which may be linear actuators 1350, are mounted to the frame 1102 of the robotic apparatus 1101, preferably using fasteners in mounting holes provided by the manufacturer on the linear actuator 1350. An exemplary linear actuator 1350 formed in accordance with the present invention, which is shown in FIG. 147 of the drawings, preferably comprises a rotatable ball screw 1352 and a block carriage 1351 that is mechanically engaged with the ball screw 1352. Although the linear actuator 1350 preferably comprises a ball screw 1352, it is envisioned to be within the scope of the present invention to use any sufficient mechanism for producing linear motion, such as a screw, lead screw, linear motor, pneumatic or hydraulic cylinder, rack and pinion, work gear, gear drive, or other mechanism. As will be described in greater detail in the forthcoming paragraphs, the tooling is mounted to the block carriage 1351 of the linear actuators to effect linear motion of the tooling along the axial length of the linear actuator 1350.

More specifically, the linear actuator 1350 includes a housing having a first axial end, a second axial end situated opposite the first axial end and a pair of oppositely disposed side walls that are spaced apart from one another and extend between the first axial end and the second axial end of the housing. The pair of oppositely disposed side walls defines an open channel within the housing that extends between the first axial end and the second axial end of the housing. Each of the oppositely disposed side walls preferably includes a guide track that is formed on or in an inner surface thereof and extends at least partially along the axial length of the housing.

The rotatable ball screw 1352 includes a first axial end, a second axial end disposed opposite the first axial end and a threaded outer surface. The rotatable ball screw 1352 is at least partially situated within the open channel in the housing such that the first axial end of the ball screw 1352 is in proximity to the first axial end of the housing and the second axial end of the ball screw 1352 is in proximity to the second axial end of the housing. Preferably, the rotatable ball screw 1352 is retained within housing by linear actuator bearings 1353 that are situated at the first axial end and the second axial end of the housing.

The block carriage 1351 is formed as a generally rectangular member and includes a top wall, a bottom wall situated opposite the top wall, a first side wall, a second side wall, a third side wall and a fourth side wall, each of the side walls extending between the top wall and the bottom wall, the first side wall being disposed opposite to the third side wall and the second side wall being disposed opposite to the fourth side wall. The second side wall and the fourth side wall of the block carriage 1351 include at least one guide member. The block carriage 1351 is at least partially situated within the open channel in the housing and each guide member is at least partially received within a guide track in a respective one of the oppositely disposed side walls of the housing. The block carriage 1351 further includes a threaded bore that extends along the axial length of the carriage 1351 between the first side wall and the third side wall of the carriage 1351. The threaded bore has a thread pattern that corresponds to the threaded outer surface of the rotatable ball screw 1352 so that at least a portion of the rotatable ball screw 1352 can be received therein and so that, upon rotation of the rotatable ball screw 1352, the block carriage 1351 is selectively movable at least partially along the axial length of the rotatable ball screw 1352, between the first axial end and the second axial end thereof, and, as such, is also selectively movable at least partially between the first axial end and the second axial end of the housing of the linear actuator 1350.

As described above, the tooling is mounted to the block carriage 1351. More specifically, the block carriage 1351 preferably includes one or more threaded connections that are situated on the top wall thereof or that extend at least partially between the top wall and the bottom wall of the carriage into the thickness thereof. The tooling is preferably mounted to the block carriage 1351 by aligning one or more corresponding connections that are situated on the tooling with the threaded connections on the block carriage 1351 and engaging the connections with one another with fasteners (e.g., threaded bolts, screws or connectors, etc.). Accordingly, the tooling may readily be mounted and removed from the linear actuators 1350 of the robotic apparatus 1101. This enables the tooling of the robotic apparatus 1101 to be easily maintainable and replaceable without disassembling the robotic apparatus 1101 or adjacent tooling. This feature also enables the production of the robotic apparatus 1101 to be modularized in which tooling subassemblies are built and fastened to the robotic apparatus 1101 individually and easily. Additionally, this feature enables easy in-field maintenance in which tooling modules may be removed or replaced from the robotic apparatus 1101 without disassembling other aspects of the system. Furthermore, this feature enables the robotic apparatus 1101 to be easily modified or upgradeable such that, when developed, old tools may be easily removed and new tooling or new versions of existing tooling may be fastened to the robotic apparatus 1101.

The linear actuators 1350 are driven by motors 1400, such as stepper motors, AC motors, DC motors, pneumatic motors or hydraulic motors. More specifically, again making reference to FIG. 147 of the drawings, the motor 1400 may be mounted to the linear actuator, preferably to the first axial end of the housing thereof, and mechanically coupled to the rotatable ball screw 1352. The motor 1400 may also mount onto the linear actuators 1350 using built-in mounting points based on standard (e.g., NEMA) motor profile face plates. Alternatively, the motor 1400 may be mounted using a mounting bracket to the frame 1102 of the robotic apparatus 1101 and connected to the linear actuator 1350 input via a shaft coupler or other suitable method. The motor 1400 rotates the ball screw 1352 of the linear actuator 1350 to selectively advance or retract the block carriage 1351, as well as the tooling attached thereto, along the axial length of the linear actuator.

The linear actuator 1350 preferably further includes a distance sensor 1221, such as an encoder, linear encoder, or linear potentiometer for gauging travel distance. The distance sensor 1221 is preferably mounted onto the block carriage 1351 of the linear actuator 1350. The distance sensor 1221 is configured to measure the distance between the carriage 1351 of the linear actuator 1350 and the TWA 1610. Alternatively, the distance sensor 1221 may be configured to measure the distance between the carriage of the linear actuator 1350 and a point on the frame 1102 of the robotic apparatus 1101. The distance sensor 1221 may also be mounted onto a fixed point on the frame 1102 of the robotic apparatus 1102 and configured to sense the distance from the fixed point to the carriage 1351 of the linear actuator 1350. Furthermore, the distance sensor 1221 may be mounted to a portion of the housing of the linear actuator to measure the distance between the block carriage 1351, as well as the tooling mounted thereto, and the location on the housing where the distance sensor 1221 is mounted.

The linear actuator 1350 may also include one or more limit sensors, such as a limit switch or a proximity sensor 1211, for detecting when the block carriage 1351 and/or the tooling mounted thereto has reached the bounds of its travel (e.g., the bounds of the travel of the carriage 1351 and/or tooling mounted thereto along the axial length of the ball screw 1352). More specifically, the one or more proximity sensors 1211 mounted on the linear actuator 1350 are configured to sense the presence of the carriage 1351 on the linear actuator 1350 as the carriage 1351 passes in front of the proximity sensor 1211. The proximity sensors 1211 are preferably mounted at opposite ends of the linear actuator 1350 and spaced to sense when the carriage 1351 reaches either end of its travel range.

The linear actuator 1350 or the tooling attached to the linear actuator 1350 may further include a load cell 1230 for sensing the force applied by the linear actuator 1350. The particular mounting of the load cell 1230 to either the tooling or the linear actuator 1350 changes depending on the specific tooling attached to the linear actuator 1350, but the load cell 1230 generally will be mounted such that force from the end effector of the tooling must pass through the load cell 1230 before reaching the ball screw 1352. Preferably, the load cell 1230 is fastened to one end of the linear actuator 1350 such that thrust from the ball screw 1352 passes through the load cell 1230 before it reaches the linear actuator bearings 1353.

As describe above and as shown in the figures, in any usage of the linear actuator 1350, load cells 1230 may be placed in line with the ball screw 1352 such that the load cell 1230 senses the linear force applied by the ball screw 1352 to the carriage block 1351. Each load cell generates a signal that may be used for general load sensing of the tooling or equipment mounted to the linear actuator 1350 for the purpose of monitoring equipment for overloads, monitoring operating loads against expected operating loads, or for any other purpose. The signal from the load cell 1350 may be used to sense and control the loads applied by the tooling or equipment mounted on the linear actuator 1350 to a workpiece, such as the TWA 1610. The signal from the load cell 1350 may also be used to monitor for collisions between tooling, equipment, and workpieces such as the TWA 1610. The load cells may be in electrical communication with either the controller 160 or with an input/output module 1541 inside an electrical panel 1103 of the robotic apparatus 1101 via connectors 1104, or both, and may communicate measurement signals thereto.

The distance sensor 1221 and proximity sensors 1211 are preferably in electrical communication either the controller 160 or with an input/output module 1541 inside an electrical panel 1103 of the robotic apparatus 1101 via connectors 1104, or both, and may communicate measurement signals thereto.

In a preferred embodiment, the tools may include at least two linear actuators 1350 for linear motion in two axes, such as axial to the tire wheel assembly 1610 and radial to the TWA 1610. In alternative embodiments, the tooling may have more axes of motion or less axes of motion, including no axes of motion, in which case generally the robotic apparatus 1101 could itself have axes of motion that provide the necessary degrees of freedom for the tooling to operate.

As described above, the tooling of the robotic apparatus 1101 may be mounted to the linear actuators 1350.

Now making reference to FIGS. 63-65 and 146 of the drawings, the bead breaker system 2000 formed in accordance with the present invention preferably comprises a linear actuator 1350, a bead breaker structure 2010 and bead breaker disc 2020. The bead breaker structure 2010 includes a proximal end and a distal end situated opposite the proximal end. The proximal end of the bead breaker structure 2010 is mounted to carriage 1351 of the linear actuator 1350. The bead breaker disc 2020 is preferably rotatably attached to the distal end of the bead breaker structure 2010.

More specifically, the bead breaker structure 2010 preferably includes a bore situated in proximity to the distal end thereof that extends at least partially therethrough. The bead breaker disc 2020 includes a central bore that extends at least partially through the thickness thereof. A fastener or other connector is insertable through the central bore of the bead breaker disc 2020 into the bore in the bead breaker structure to rotatably attach the bead breaker disc 2020 to the bead breaker structure 2010 such that the bead breaker disc 2020 is axially constrained to the bead breaker structure 2010, but free to rotate about the axis of the bore in the bead breaker structure 2010. The axis of rotation of the bead breaker disc 2020 can be any angle relative to the axis of motion of the linear actuator 1350, but preferably could be between 25-45 degrees downwards. The bead breaker disc 2020 may further include a bearing or bushing capable of withstanding radial loads and allowing for smoother rotation about the disc bore.

As also described above, the bead breaker tool 129H, which is also embodied herein as the bead breaker system 2000, is used, in part, to manipulate the TWA 1610 and remove the tire 1611 from the rim 1612. FIG. 146 of the drawings illustrates a tire rim 1612 and the tire bead 1609. The bead 1609 is the location at which an inflated tire 1611 contacts the rim 1612 and creates a pressure seal. During the bead breaking process, the bead breaker disc 2020 is pressed axially into the tire 1611 in such a way to push the tire 1611 further into the rim 1612 and away from the bead 1609 and cause the seal to be broken, allowing the tire 1611 to later be stretched over the rim 1612 and removed. This process may require high force, such as 2 kN, to fully unseat the tire 1611 from the bead 1609 due to factors such as friction, adhesion, and corrosion of the tire 1611 to the bead 1609. Once the connection between bead 1609 and tire 1611 has been broken, the bead breaker disc 2020 is retracted away from the TWA 1610 using the linear actuator 1350.

Preferably, the bead breaker disc 2020 is of sufficient strength and rigidity such that when it engages the tire 1611 of the TWA 1610, that it does not deform substantially and is able to apply enough force to break the bead of the TWA 1610, such as 2 kN. The linear actuator 1350 is of sufficient strength and rigidity to actuate the bead breaker structure 2010 with enough force to break the bead on the TWA 1610.

Figure 63:
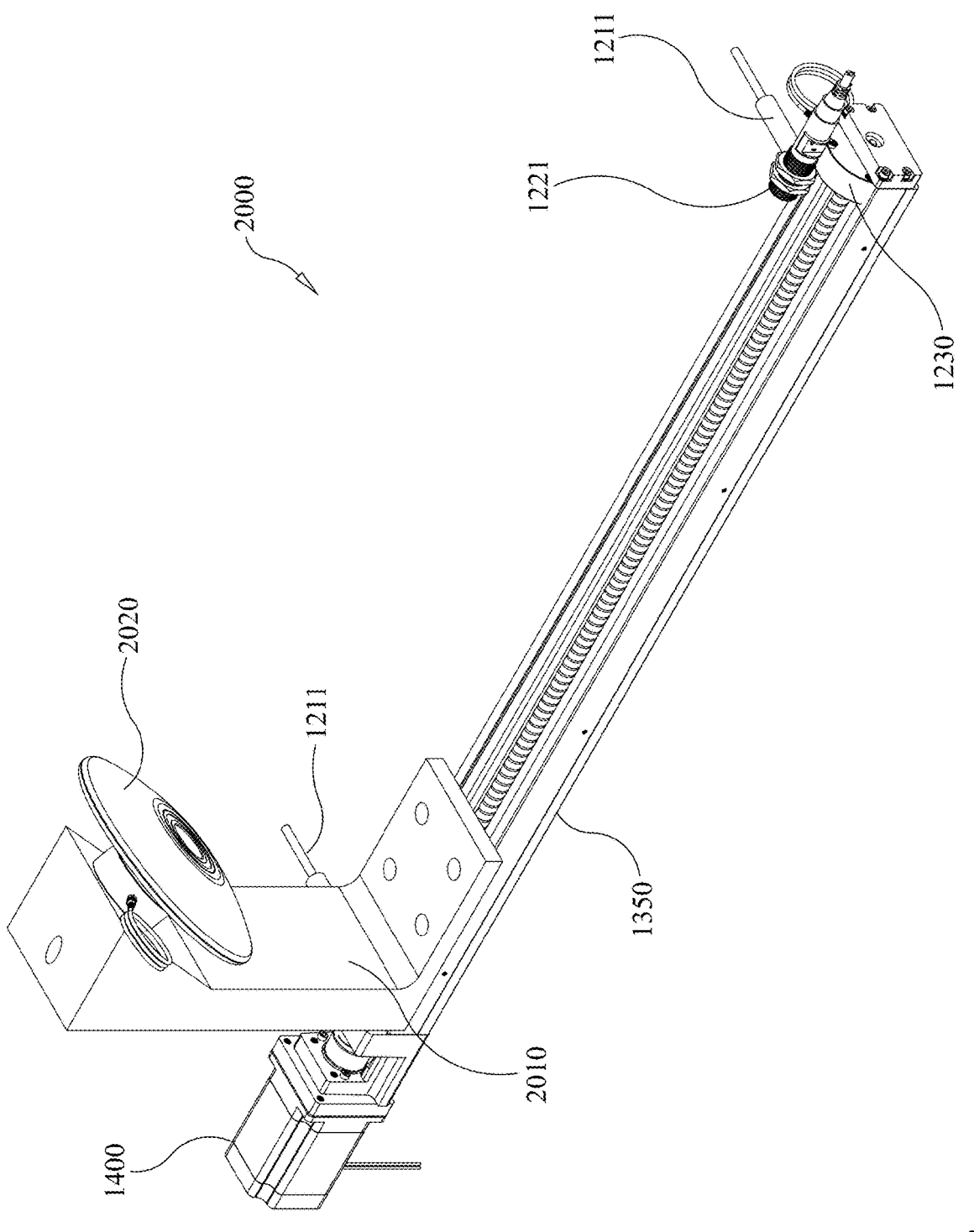
FIG. 63 is a front perspective view of a bead breaker system formed in accordance with the present disclosure.
Figure 64:
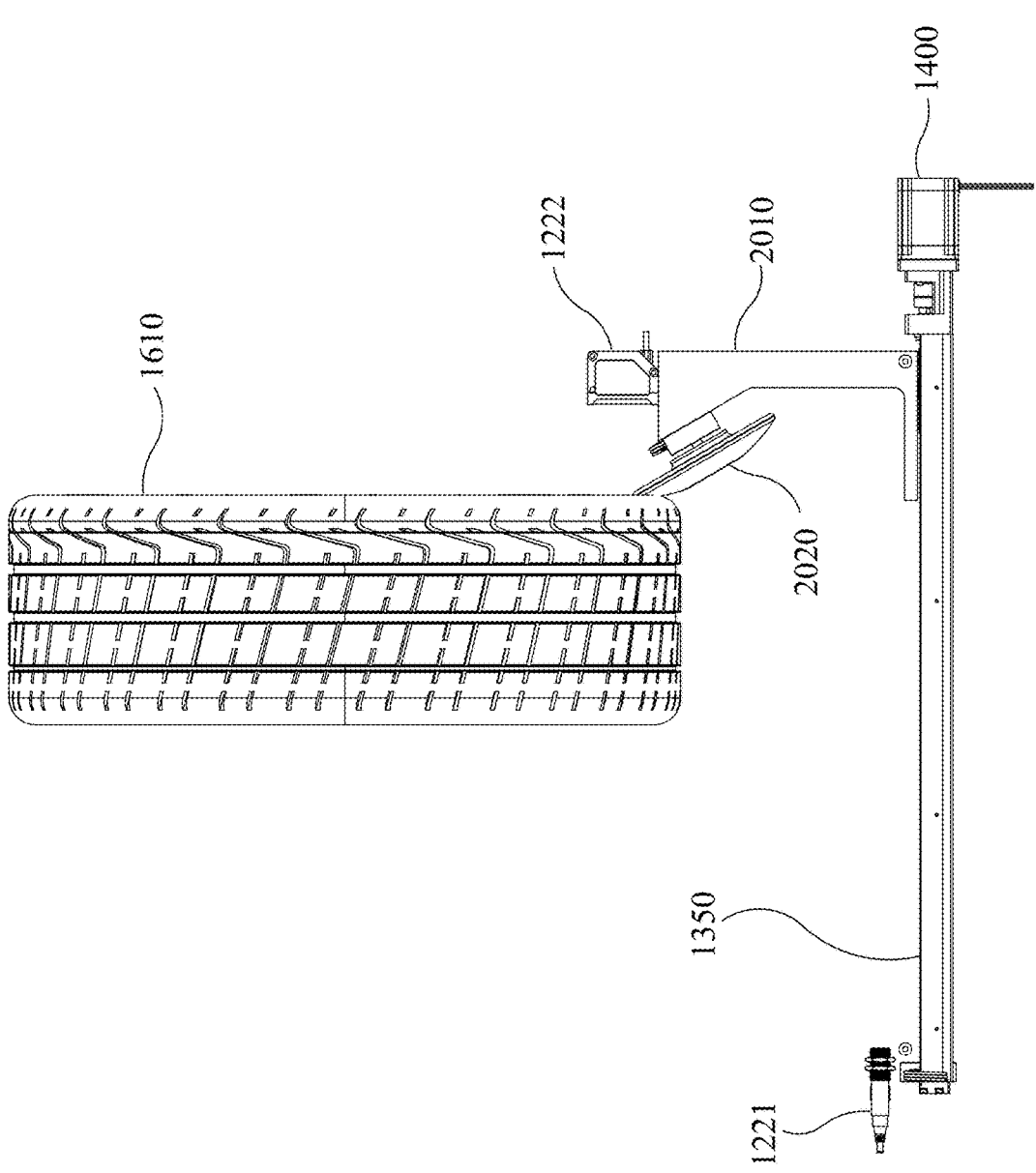
FIG. 64 is a left elevational view of the bead breaker system formed in accordance with the present disclosure.

As can be seen in FIGS. 63 and 64 of the drawings, the bead breaker system 2000 preferably includes a distance sensor 1221, a position sensor 1222, one or more load cells 1230 and proximity sensors 1211. The distance sensor 1221 is configured such that it adequately measures the distance between the TWA 1610 and the contact point that the bead breaker disc 2020 makes with the TWA 1610. This information can be used to position the bead breaker system 2000 relative to the TWA 1610.

Figure 65:
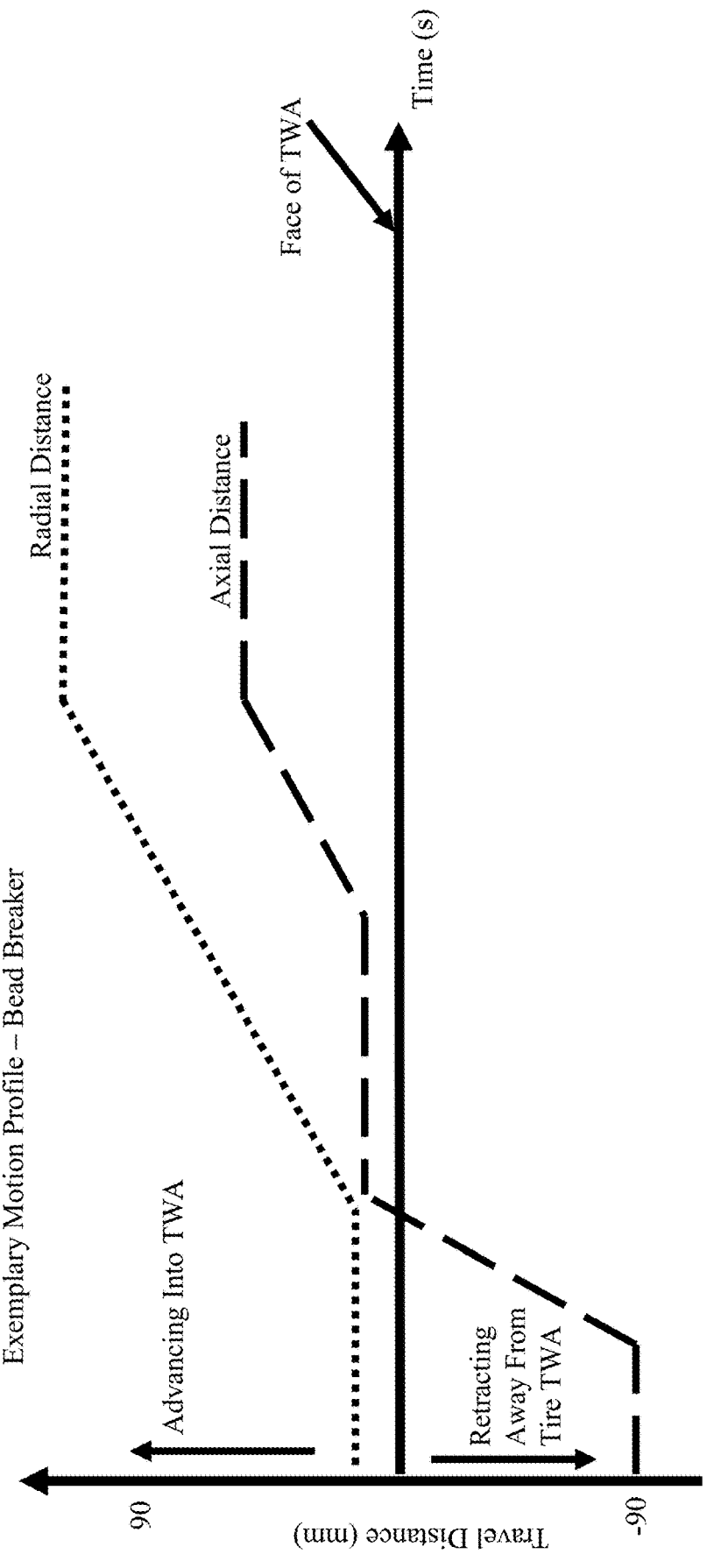
FIG. 65 is a graphical motion profile of an exemplary bead breaking maneuver in accordance with the present disclosure.

The motion profile of an exemplary bead breaking maneuver is shown in FIG. 65 of the drawings. The information provided by the position sensor 1221 on the linear actuator 1350 can be used to determine the distance the bead breaker system 2000 has advanced into the TWA 1610, which is a measure of the "bead breaking distance". When retracting the bead breaker system 2000 after a bead breaking maneuver, the distance sensor 1221 may be used to determine the "pull-back" of the bead on the TWA 1610, where the pull-back is defined as the distance the bead rebounds from the bead breaking distance.

The combination of the measurements of bead breaking distance and pull-back are used to determine whether a bead breaking maneuver has been successful. Preferably, the success of the maneuver could be that the "final break distance" is equal to the difference between the bead breaking distance and the pull-back, where a successful bead breaking maneuver might have a final break distance between 50-100 mm depending on the tire, as illustrated in the following formula:

final break distance=bead breaking distance−pullback

Nevertheless, it is also envisioned to be within the scope of the invention to utilize other techniques to determine successful maneuvers and final breaking distance.

In addition to distance measurements, the load cells 1230 can be used to measure the load on the bead breaker system 2000 to determine when minimum loads or overloads have been reached and to supplement the distance sensor 1221 in measuring when a bead has been successfully broken. In one form, a load cell 1230 is affixed to the bead breaker structure 2010 and positioned between the bead breaker disk 2020 and bead breaker structure 2010 such that the axial load experienced by the bead breaker disk 2020 is transmitted to the load cell 1230. The load cells 1230 are powered by the electrical cabinet 1103 and communicate with the programmable logic controller 1540. Alternatively or in combination, the load cells 1230 may be in electrical communication with the controller 160.

Now referencing FIGS. 66-68 and 69-71 of the drawings, the bead tool system 82100 formed in accordance with the present invention preferably comprises a linear actuator 1350, a bead tool structure 2110, a bead tool linkage 2120, a bead tool arm 2130 and a bead tool end effector 2170. The bead tool structure 2110 includes a proximal end 5022 and a distal end 5024 situated opposite the proximal end 5022. The proximal end 5022 of the bead tool structure 2110 is mounted to the block carriage 1351 of the linear actuator 1350. The bead tool arm 2130 is preferably hingedly or pivotally joined to the bead tool structure 2110 by the bead tool linkage 2120, which is interposed therebetween.

As described above, the bead tool linkage 2120 is interposed between and connects the bead tool structure 2110 and the bead tool arm 2130 and acts as a rotational linkage between the bead tool structure 2110 and the bead tool arm 2130. More specifically, the bead tool arm 2130 includes a proximal end 5004 and an oppositely disposed distal end 5006. The bead tool linkage 2120 includes a first end 5008, a second end 85010 disposed opposite to the first end 5008 and a pair of side walls 5012 that are spaced apart from one another and extend between the first end 5008 and the second end 85010. The bead tool linkage 2120 further includes a first bore 5014 that extends at least partially between the side walls 5015 in proximity to the second end 85010 of the linkage 2120 and a second bore 5016 that extends at least partially between the side walls 5012 in proximity to the first end 5008 of the linkage 2120. The second bore 5016 in the bead tool linkage 2120 is preferably aligned with a corresponding bore 5018 formed in bead tool structure 2110 in proximity to the distal end 5024 thereof. The first bore 5014 in the bead tool linkage 2120 is preferably aligned with a corresponding bore 85020 that is formed in the bead tool arm 2130 in proximity to the proximal end 5004 thereof. Pins or fasteners 5026, 5028 are inserted through the respective aligned bores to join the bead tool structure 2110, the linkage 2120 and the bead tool arm 2130 to one another.

Figure 66:
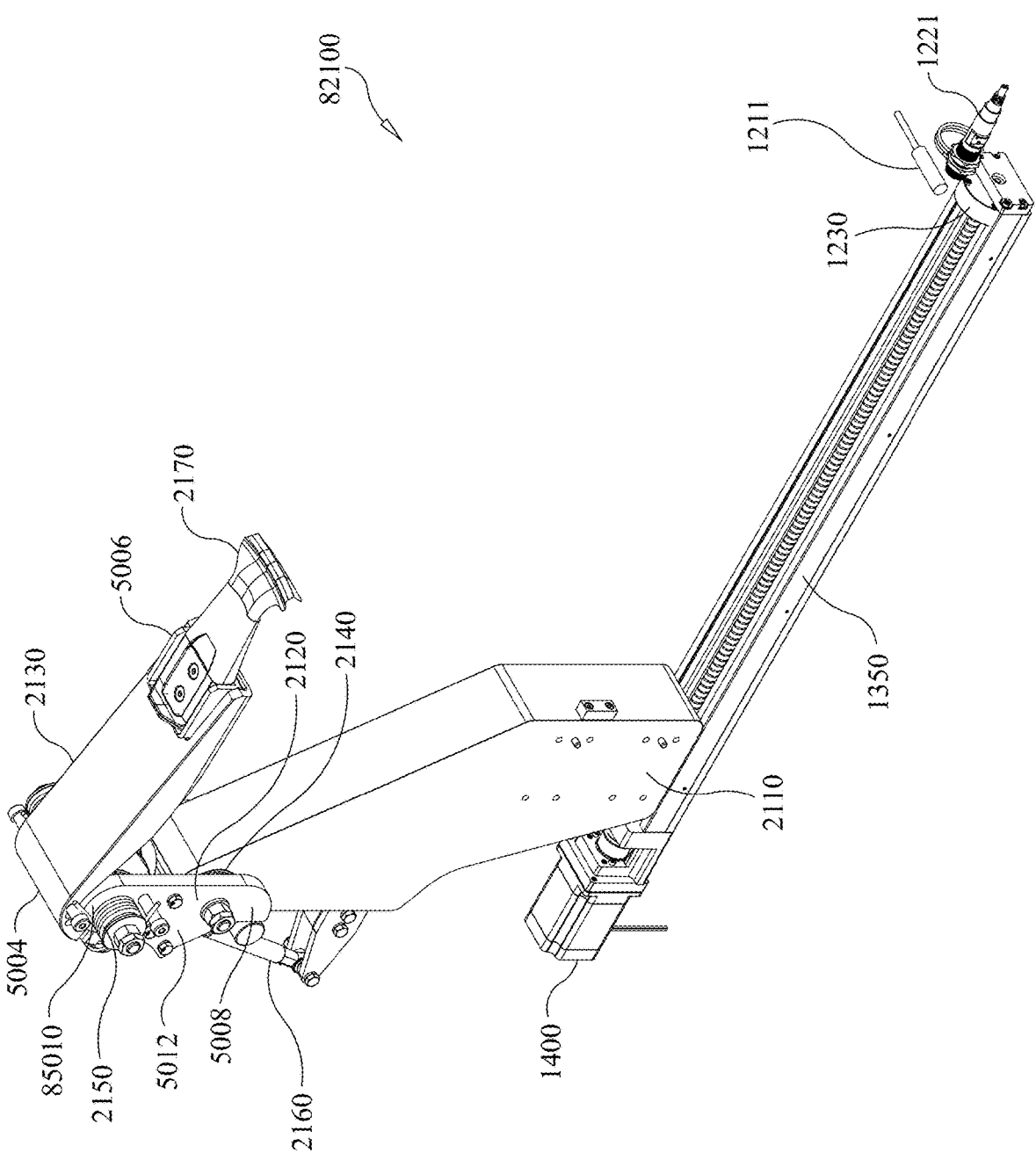
FIG. 66 is a top perspective view of a bead tool system formed in accordance with the present disclosure.
Figure 67:
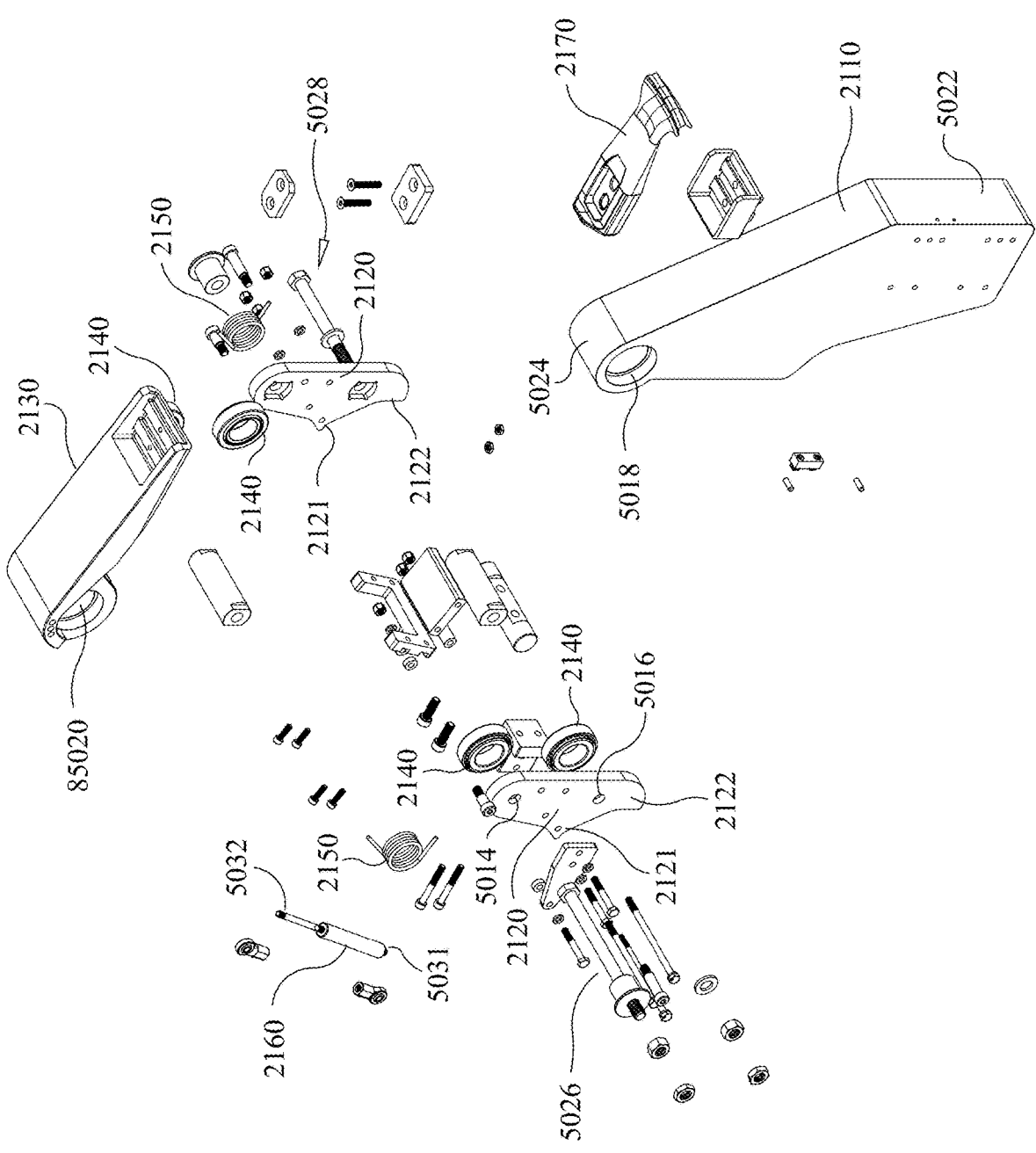
FIG. 67 is an exploded, top perspective view of the bead tool system formed in accordance with the present disclosure.

The bead tool linkage 2120 preferably further comprises bead tool bearings 2140 that are situated between the side walls 5012 of the linkage 2120 and the bead tool structure 2110, as well as between the side walls 5012 of the linkage 2120 and the bead tool arm 2130. More specifically, as can be seen in FIGS. 66 and 67 of the drawings, one set of bearings 2140 is aligned with the second bore 5016 in the bead tool linkage 2120 and the bore 5018 formed in bead tool structure 2110 in proximity to the distal end 5024 thereof, such that the pin or fastener 5028 may be inserted therethrough. A second set of bearings 2140 is aligned with the first bore 5014 in the bead tool linkage 2120 and the bore 85020 formed in the bead tool arm 2130 such that the pin or fastener 5026 may be inserted therethrough. Accordingly, the bead tool structure 2110 and bead tool arm 2130 are freely rotatable about the axis of the bearings 2140.

The bead tool system 82100 may further include one or more arm springs 2150 and a link spring 2160. The arm springs 2150 are configured to hold the bead tool arm 2130 from collapsing due to the force of gravity. The link spring 2160 is configured to hold the bead tool linkage 2120 from collapsing due to the force of gravity. Both the arm springs 2150 and the link spring 2160 are also configured to provide a particular motion profile of the bead tool linkage 2120 in response to the de-beading process. The arm springs 2150 and link spring 2160 are both connected to the bead tool linkage 2120 by pins or fasteners. The link spring 2160 is also connected to the bead tool structure 2110 by pins or fasteners and produces a linear force between the bead tool linkage 2120 and the bead tool structure 2110. More specifically, as can be seen in FIG. 67 of the drawings, in one form, the link spring 2160 includes a first end 5031 and an oppositely disposed second end 5032. The first end 5031 of the link spring 2160 is connected to the bead tool structure 2110 and the second end 5032 of the link spring 2160 is connected to the bead tool linkage 2120.

The arm springs 2150 contain spring legs which are constrained against pins in the bead tool linkage 2120 and the bead tool arm 2130, producing a torsional load between them. The arm springs 2150 and link spring 2160 may be compression springs, torsional springs, gas springs, wave springs, Belville springs, or any sufficiently elastic configuration. Furthermore, the arm springs 2150 and link spring 2160 may be made of any sufficiently elastic material but would preferably be made of spring steel. The bead tool system 82100 preferably includes an upper hard stop 2121 and lower hard stop 21202, which limit the motion of the bead tool linkage 2120 and bead tool arm 2130 by providing a rigid surface that prevents motion of the bead tool linkage 2120 beyond those surfaces. Basically, the upper hard stop 2121 bounds the rotation of the bead tool linkage 2120 clockwise such that the bead tool arm 2130 lifts relative to the bead tool structure 2110, and vice-versa for the lower hard stop 2122.

Figure 68:
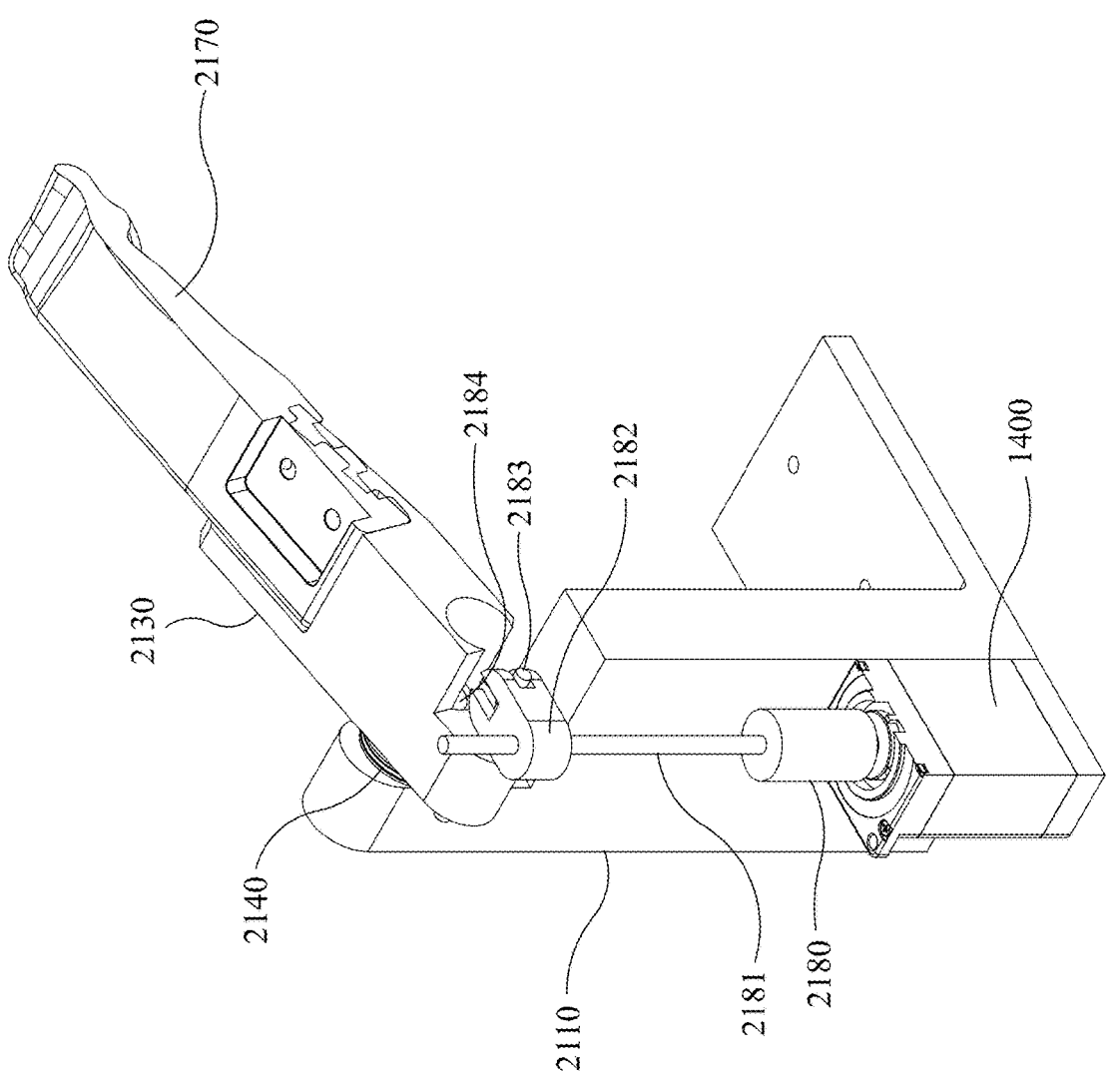
FIG. 68 is a top perspective view of an alternative form of a bead tool system formed in accordance with the present disclosure.

An alternative form of the bead tool system 82100, wherein the angle of the bead tool arm 2130 is actively controlled by a motor, is shown in FIG. 68 of the drawings. As can be seen in FIG. 68 of the drawings, a motor 1400 is mounted to the bead tool structure 2110. The motor 1400 communicates with and is controlled by the electrical panel 1103 and/or the controller 160. A bead tool coupling 2180 couples the position of the shaft of the motor 1400 to the bead tool ball screw 2181 such that rotation of the motor 1400 shaft causes rotation of the bead tool ball screw 2181. A bead tool control link 2182 is mounted on the bead tool ball screw 2181 such that rotation of the bead tool ball screw 2181 causes a linear motion of the bead tool control link 2182 along the axis of the bead tool ball screw 2181. A pivot pin 2184 passes through a fixed bore in the bead tool structure 2110. The bead tool arm 2130 contains a bore through which the bead tool pivot pin 2184 passes through, allowing the bead tool arm 2130 to rotate around the axis of the bead tool pivot pin 2184 relative to the bead tool structure 2110. The bead tool control pin 2183 passes through another bore in the bead tool arm 2130 located rearward of the bead tool pivot pin 2184. The bead tool pivot pin 2184 passes through the bead tool bearings 2140. The sides of the bead tool arm 2130 rotate between the bead tool bearings 2140.

The bead tool control link 2182 has a fork feature through which the bead tool control pin 2183 passes. The fork feature controls the location of the bead tool control pin 2183 in the axis of the bead tool ball screw 2181 while allowing it to move relate to the bead tool control link 2182 in the other two principal directions. As the bead tool control link 2182 is moved up, it forces the bead tool control pin 2183 to move up as well, causing the bead tool arm 2130 to rotate clockwise on the bead tool pivot pin 2184, affecting a downwards motion of the tip of the bead tool end effector 2170. In this way, the angle of the bead tool end effector 2170 may be controlled by the motion of the motor 1400. Distance sensors 1221 may be used in combination with the known location of the bead tool pivot pin 2184 to calculate the angle of the bead tool arm 2130. Alternatively, rotary encoders, angle sensors, or any other suitable sensor may be used. The motor 1400, bead tool ball screw 2181, and bead tool coupling 2180 may be replaced with a linear actuator 1350.

The bead tool end effector 2170 is preferably mechanically coupled to the distal end of the bead tool arm 2130; however, the bead tool end effector 2170 may also be formed as an integral part of the bead tool arm 2130. The bead tool end effector 2170 is sufficiently strong and rigid to not deform substantially when contacting the rim or rubber of the TWA 1610. The linear actuator 1350 is of sufficient strength and rigidity to actuate the bead tool system 82100 with enough force to deform the tire in the TWA 1610.

Figure 69:
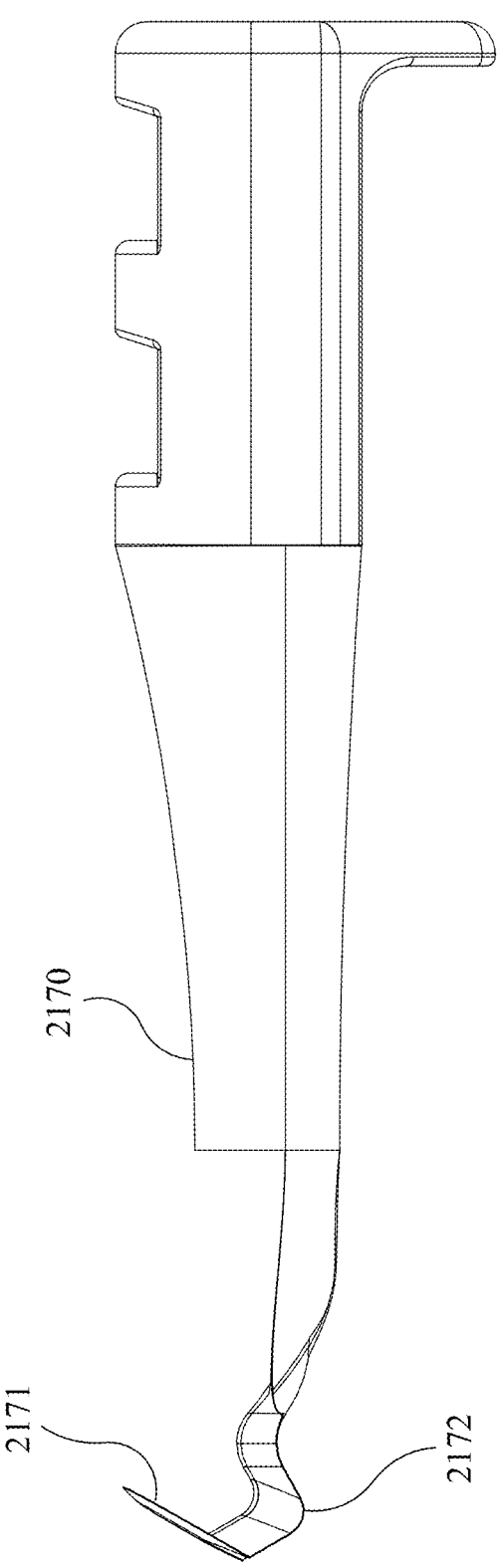
FIG. 69 is a left elevational view of a bead tool end effector formed in accordance with the present disclosure.

As can be seen in FIG. 69 of the drawings, bead tool end effector 2170 includes an upper hook 2171 and lower hook 2172. The upper hook 2171 may be used for aligning with the rim of the TWA 1610. The lower hook 2172 may be used for hooking the edge or bead of the tire in the TWA 1610 and to manipulate the bead outside the face of the rim to facilitate removal of the front bead of the tire from the rim.

Figure 70:
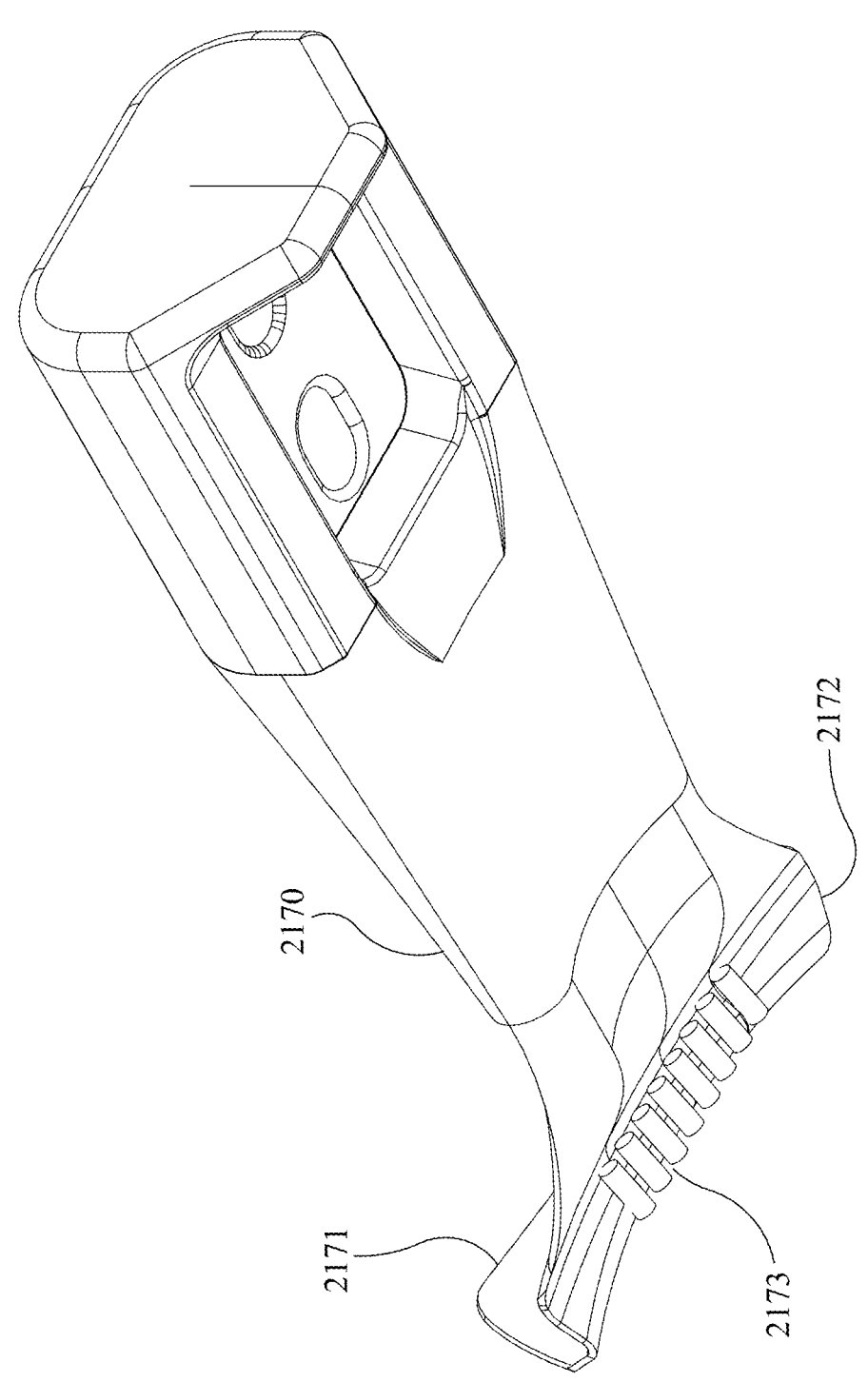
FIG. 70 is a bottom perspective view of the bead tool end effector formed in accordance with the present disclosure.

FIG. 70 of the drawings shows another form of the bead tool end effector 2170. A major drawback of traditional bead tools is the significant amount of sliding friction they create between the tire 1611 and the bead tool end effector 2170. To remedy this problem, the bead tool end effector 2170 may include bead tool rollers 2173 which are free to rotate relative to the bead tool end effector 2170. The bead tool rollers 2173 are ideally available as commercial off-the-shelf roller bearings that are fastened to the bead tool end effector 2170 using pins. The bead tool rollers 2173 introduce a rolling element between the tire 1611, rim 1612, and the bead tool end effector 2170, reducing the overall friction of the system. This reduction reduces the drive torque required to rotate the TWA 1610 relative to the bead tool end effector 2170, reduces the loading on the bead tool end effector 2170, and aids in bead removal.

It is also envisioned to be within the scope of the present invention to form the bead tool rollers 2173 as balls, rollers, ball bearings, or roller bearings. In the case of cylindrical rolling elements, pins and pockets in the bead tool end effector 2170 may be used to join the bead tool end effector 2170 to the bead tool rollers 2173. In the case of spherical rolling elements, pockets, detents, and peens may be used. The bead tool rollers 2173 may also be made of a low friction material or be coated in a low friction material. In an alternative form, the rollers 2173 may be stationary, fixed to the bead tool end effector 2170, or integrated into the bead tool end effector 2170 as a single part.

The bead tool system 82100 preferably further includes a distance sensor 1221, one or more load cells 1230 and one or more proximity sensors 1211. The distance sensor 1221 is configured to adequately measure the distance between the TWA 1610 and the contact point of the bead tool end effector 2170 with the TWA 1610. This information can be used to position the bead tool system 1100 in 3D space with respect to the coordinate frame of the TWA 1610. The point of contact between the bead tool end effector 2170 and the TWA 1610 is formed by the tip of the bead tool end effector 2170 and a circle with a diameter slightly, such as 5 mm, larger than the circle formed by circle where the tire 1611 and rim 1612 meet on the face of the TWA 1610.

In addition to distance measurements, the load cells 1230 can be used to measure the load on the robotic bead tool system 82100 to determine when minimum loads or overloads have been reached and to supplement the distance sensor 1221 in measuring success in the various bead removal process steps. Overload/minimum load measurements are done by comparing the current load on the load cell 1230 to pre-set values. Using load cells 1230 to measure successful bead removal is done by comparing the geometry of the load-insertion distance curve to a "control curve" which includes a "bead removal" datum that can be referenced to the measured curve to determine if this point has been reached in the current process.

Figure 71:
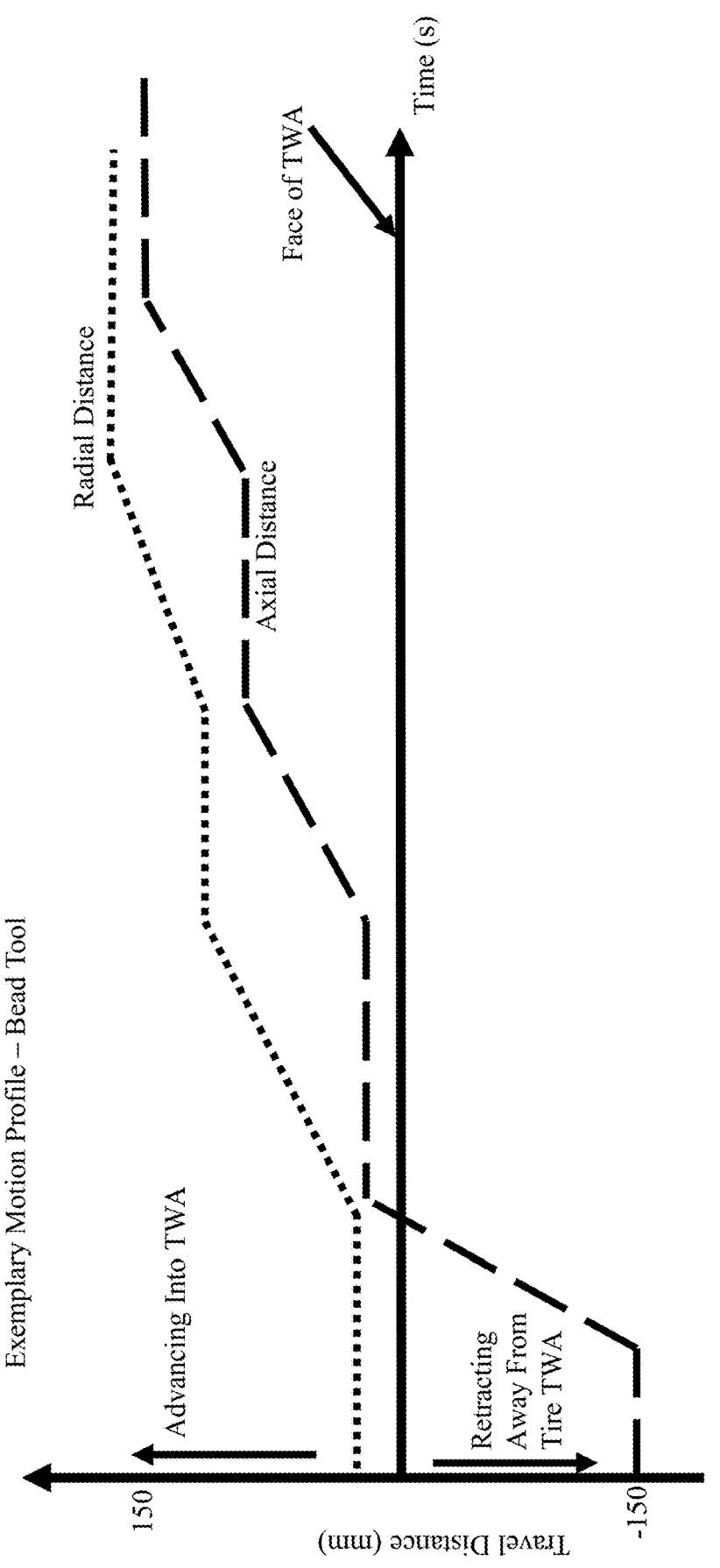
FIG. 71 is a graphical motion profile of an exemplary bead removal maneuver in accordance with the present disclosure.

An exemplary motion profile for the insertion of the bead tool end effector 2170 during the bead removal operation performed by the bead tool system 82100 is shown in FIG. 71 of the drawings. The information provided by the distance sensor 1221 on the linear actuator 1350 can be used to determine the distance the bead tool system 82100 has advanced into the TWA 1610, which is a measure of the "tool insertion distance" and can be used to determine when the bead tool end effector 2170 has inserted itself past the bead. This determination is made by comparing the tool insertion distance to the expected bead depth of the TWA 1610 being worked on, when the insertion distance is greater than the expected bead depth, plus some margin.

When retracting the bead tool system 82100 to initiate pulling the bead of the tire over the rim, the distance sensor 1221 may be used to determine the "overlap" of the bead on the TWA 1610, where the overlap is defined as the distance past the front of the rim that the bead travels. This is helpful in determining whether the bead has been pulled far enough past the rim to initiate the next step in the bead removal process.

In the motion profile shown in FIG. 71 of the drawings, the bead tool first presses against the face of the TWA 1610 axially until the bead tool depresses the tire 1611 and forms a gap between the tire 1611 and rim 1612. The tool then moves in alternating steps of radial motion towards the center of the TWA 1610 and axial motion into the TWA 1610 to widen the gap between tire 1611 and rim 1612. At the final step of axial travel, the lower hook 2172 passes over the lip of the tire 1611, which snaps into the hook 2172 and causes it to become latched to the bead tool end effector 2172. At this point, the bead tool end effector 2172 may be retracted from the TWA 1610 using the linear actuator 1350, stretching the edge of the tire 1611 over the rim 1612 and beginning the bead removal process.

Preferably, the bead tool system 82100 is fully autonomous; however, the bead tool system 82100 may also be operated manually or semi-autonomously. For example, the bead tool system 82100 may be operated by hand, via a wired or remote panel on-site, via teleoperation, or by any other means.

Figure 81:
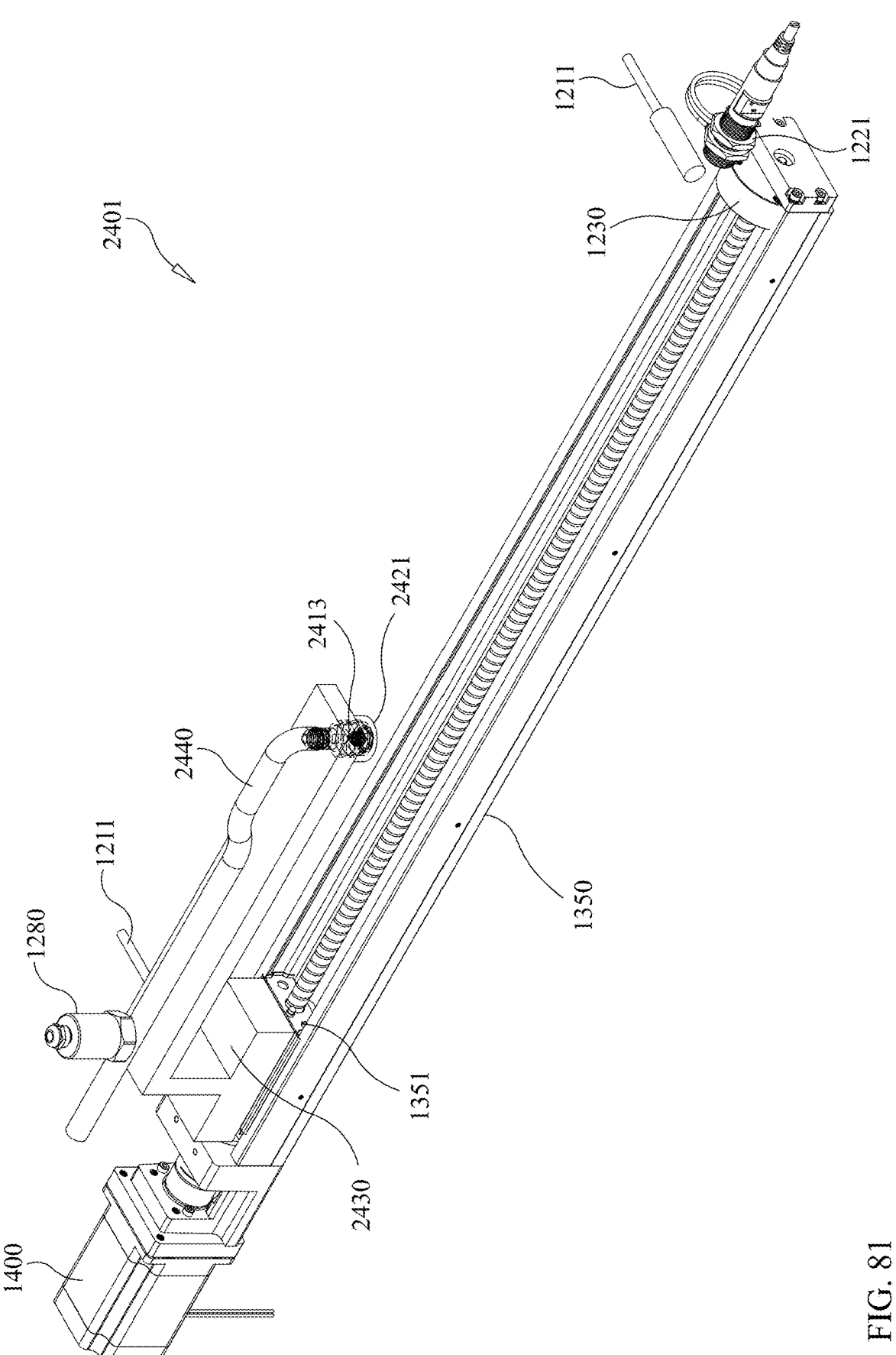
FIG. 81 is a top perspective view of an inflation tool system formed in accordance with the present disclosure.
Figure 82:
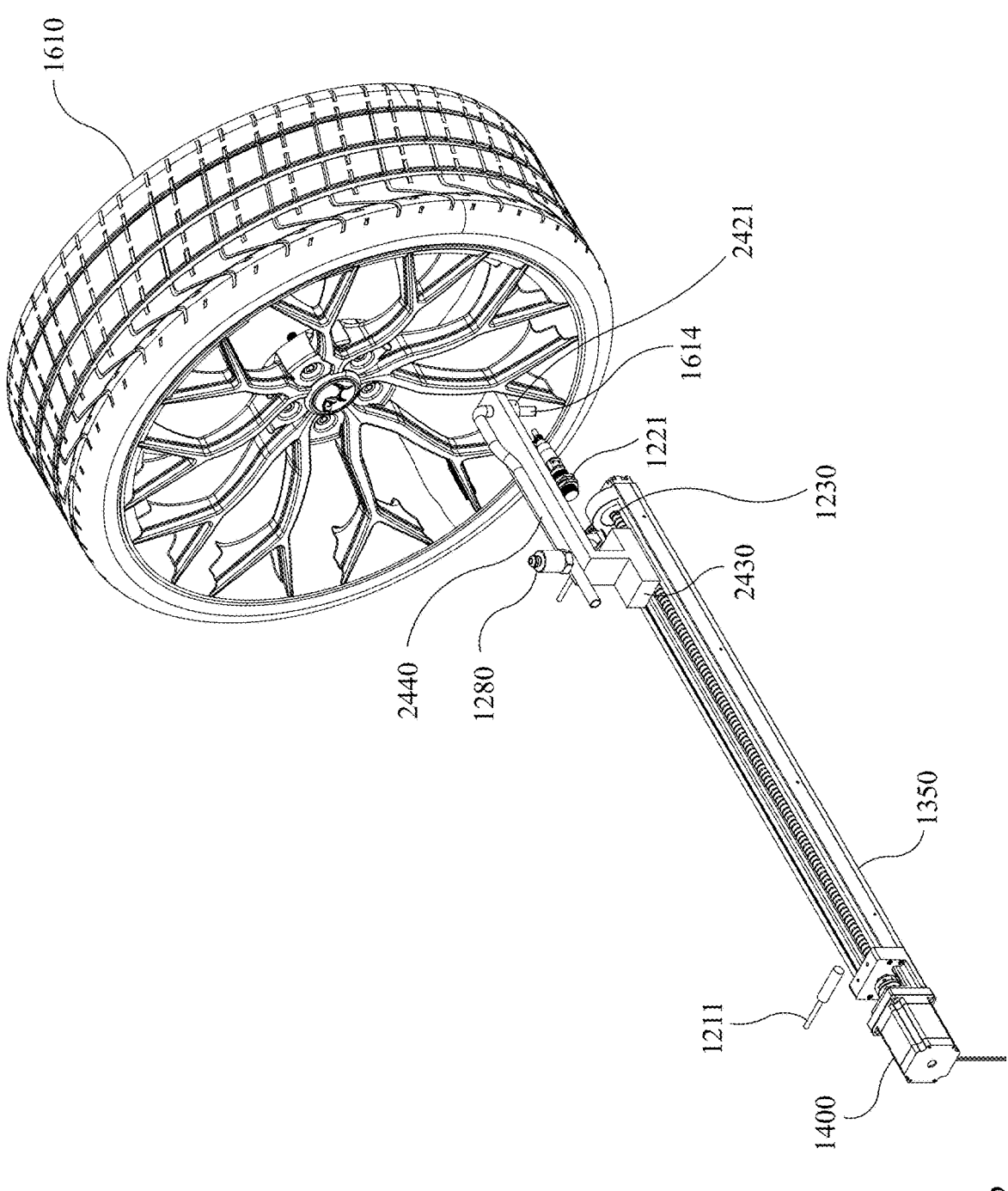
FIG. 82 is a top perspective view of the inflation tool system formed in accordance with the present disclosure, showing the inflation tool system mated with the valve stem of the TWA.
Figure 83:
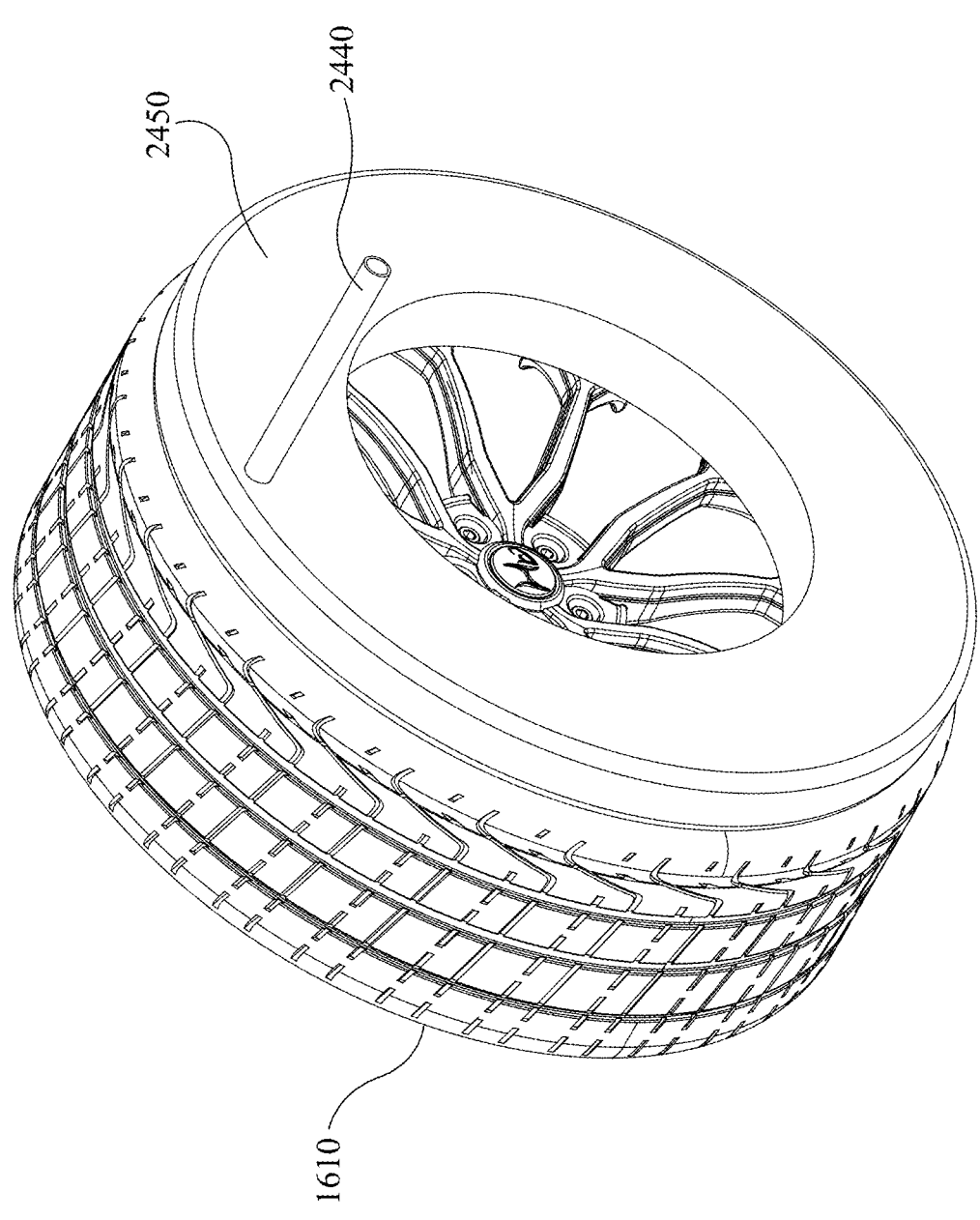
FIG. 83 is a top perspective view of an annular seal formed in accordance with the present disclosure.

Now referencing FIGS. 81-83 of the drawings, the inflation tool system 2401 formed in accordance with the present invention preferably includes an inflation valve 2413, an inflation arm 2430, an airline 2440 having a generally cylindrical side wall that defines an internal bore, a pressure sensor 1280 and a linear actuator 1350. The inflation arm 2430 includes a first end and a second end situated opposite the proximal end. The first end of the inflation arm 2430 is mounted to the block carriage 1351 of the linear actuator 1350.

The airline 2440 includes a first axial end and a second axial end disposed opposite to the first axial end. Preferably, the first axial end of the airline 2440 is connected to a pneumatic air source via a connector, such as an industrial quick connect valve or pneumatic manifold, as is standard in industry. Even more preferably, the airline 2440 is connected to an industrial quick connect fitting on the robotic apparatus 1101, which may be connected to an existing airline or air compressor in the location of use. The inflation valve 2413 is connected to the second axial end of the airline 2440 and is in fluid communication with the internal bore of the airline 2440. An inflation valve seal 2421 may be fitted onto or around the inflation valve 2413 to facilitate sealing against surfaces, such as the valve stem 1614 of the TWA 1610. The inflation valve 2413 is sized to fit over the valve stem of a TWA 1610. The inflation valve 2413 and airline 2440 are able to withstand a continuous pressure adequate for fast tire inflation, such as 50 PSI-gauge. The inflation valve 2413 and airline 2440 are attached to the inflation arm 2430 in such a way that the airline 2440 doesn't crimp or bend in response to movement in the inflation arm 2430.

As described above, the inflation arm 2430 is attached to and moveable by the linear actuator 1350 such that the inflation valve 2413 can be selectively positioned over the valve stem 1614 of the TWA 1610. As will be described in greater detail in the forthcoming paragraphs, the gripper system 82200 is able to move the tire axially perpendicular to the motion of the inflation arm 2430. Once the inflation arm 2430 is located axially relative to the TWA 1610 such that the inflation valve 2413 is positioned over the valve stem 1614, the gripper system 82200 is able to shift the tire up to press the inflation valve 2413 over the valve stem 1614 such that a seal is formed around the valve stem 1614, allowing for filling of the valve stem 1614 and thus the tire 1611. After a seal is formed between the valve stem 1614 and the inflation valve 2413, pressurized air from pneumatic air source is allowed to flow into the seal from a typical control valve (not shown). The pressurized air forms a pressurized environment inside the seal, forcing air into the valve stem 1614 and thus, the tire, thereby inflating it. In another form, the inflation valve 2413 may clamp, align or mate with the valve stem 1614, rather than sealing over it. In yet another form, as shown in FIG. 83 of the drawings, an annular seal 2450 seals a portion or the entirety of the surface of the tire that the valve stem 1614 protrudes from, whereby the entire space inside the annular seal 2450 may be pressurized to fill the TWA 1610. The inflation arm 2430 is preferably formed to be sufficiently strong and rigid to withstand the force required to seal the inflation valve 2413 without excessive deflection or yielding.

The pressure sensor 1280 is preferably connected to the inflation valve 2413 or the airline 2440 and is configured to measure the internal pressure in the tire via the inflation valve 2413 and the airline 2440. For example, the pressure sensor 1280 may measure the pressure within the internal bore of the airline 2440, which is in fluid communication with the inflation valve 2413 and valve stem 1614 connected thereto, that is, when the inflation valve 2413 is sealed to the valve stem 1614. The pressure sensor 1280 is preferably in electrical communication with either the controller 160 or the input/output module 1541 of the robotic apparatus 1101 such that measurements taken by the pressure sensor 1280 can be communicated thereto and processed.

The inflation tool system 2401 may further include a distance sensor 1221, which can be used with the inflation arm 2430 to determine the distance from the inflation valve 2413 to the TWA 1610 or valve stem 1614 for the purpose of aiding in sealing the inflation valve 2413. The inflation tool system 2401 may also include a load cell 1230, which may be used to measure the load on the inflation valve 2413 to ensure a seal is achieved using force feedback. Preferably, the inflation tool system 2401 is fully autonomous; however, the inflation tool system 2401 may also be operated manually or semi-autonomously. For example, the inflation tool system 2401 may be operated by hand, via a wired or remote panel on-site, via teleoperation or by any other means.

Figure 84:
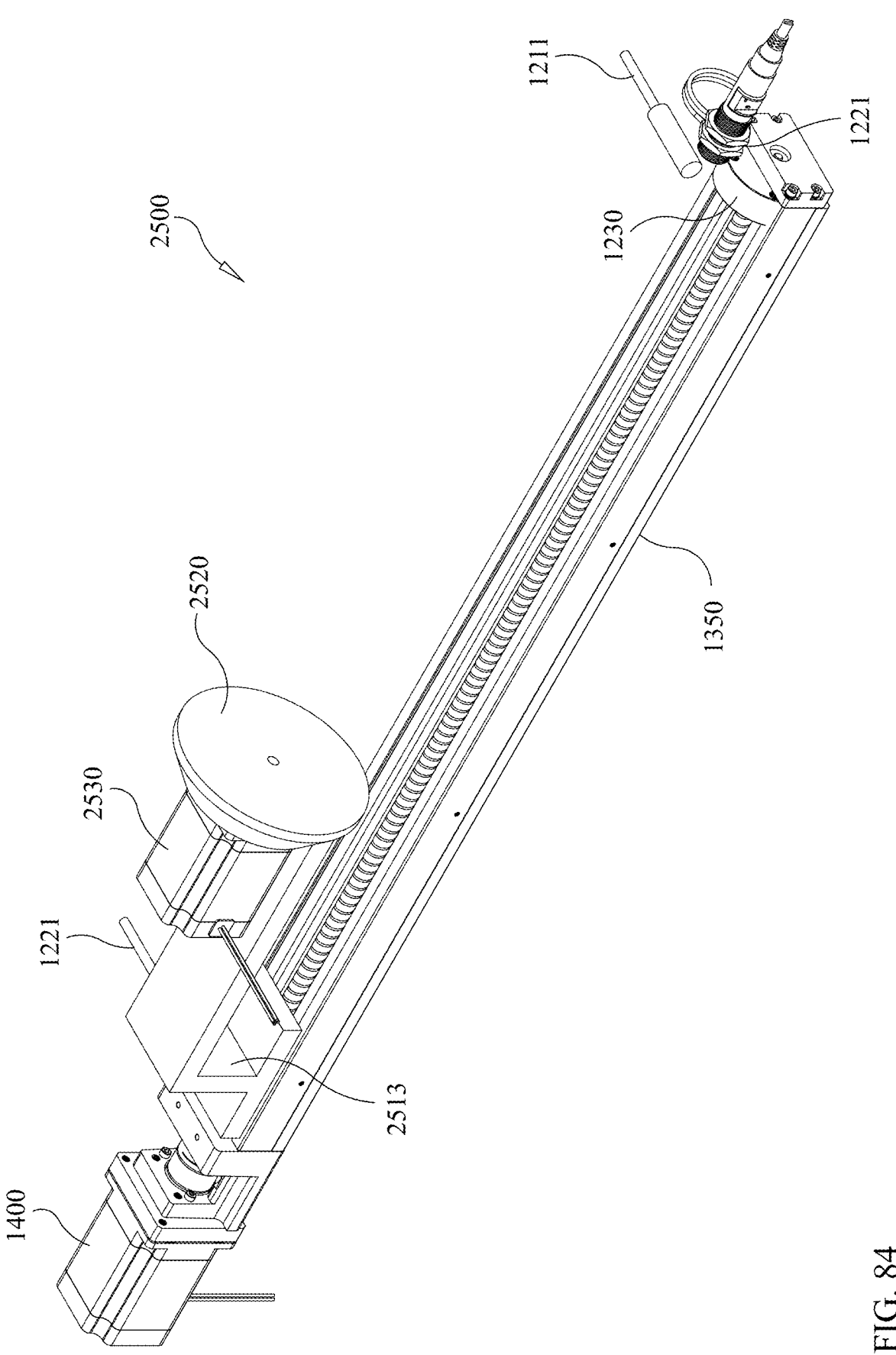
FIG. 84 is a top perspective view of a cleaning tool system formed in accordance with the present disclosure.

Now referencing FIG. 84 of the drawings, the cleaning tool system 2500 formed in accordance with the present invention comprises a cleaning arm 2513, a cleaning end effector 2520, a cleaning drive system 2530 and a linear actuator 1350. More specifically, the cleaning arm has a first end and an oppositely disposed second end. The first end is mounted to the block carriage 1351 of the linear actuator 1350. The cleaning drive system 2530 is mounted to a portion of the second end of the cleaning arm 2513. As will be explained in greater detail in the forthcoming paragraph, the cleaning end effector 2520 is mechanically coupled to the cleaning drive system 2530 via an output shaft and is driven, preferably rotatably driven, by the cleaning drive system 2530.

The cleaning drive system 2530 is preferably a rotational drive, such as a direct drive motor, a belt drive system, a gear drive or other type of rotary drive. Nevertheless, the cleaning drive system 2530 may also include any suitable reciprocating drive, such as a cam follower or a rack and pinion. The cleaning drive system 2530 is used to produce relative motion between the cleaning end effector 2520 and the TWA 1610. The output shaft of the cleaning drive system 2530 is ideally attached directly to the cleaning end effector 2520 such that motion from the output shaft of the cleaning drive system 2530 directly actuates the cleaning end effector 2520. The relative motion of the cleaning end effector 2520 to the TWA 1610 produces a cleaning effect on debris and corrosion on the TWA 1610 via a scraping, rubbing, dissolving, adhesion, abrasion, or other action sufficient to remove the debris and corrosion from the surface. Alternatively, the relative motion between the cleaning end effector 2520 and the TWA 1610 may be produced via motion of the cleaning arm 2513. The cleaning end effector 2520 may be formed as a wire wheel, a sanding wheel, a buffing wheel, a wax applicator, a solvent wheel, a brush or any other end effector that has a structure that is capable of cleaning debris and/or corrosion off the TWA 1610.

The cleaning tool system 2500 may further include a distance sensor 1221 for sensing the distance between the cleaning end effector 2520 and the TWA 1610, and a load cell 1230 for sensing the force the cleaning end effector 2520 is applying to the TWA 1610. Preferably, the cleaning tool system 2500 is fully autonomous; however, the cleaning tool system 2500 may also be operated manually or semi-autonomously. For example, the cleaning tool system 2500 may be operated by hand, via a wired or remote panel on-site, via teleoperation or by any other means.

Figure 85:
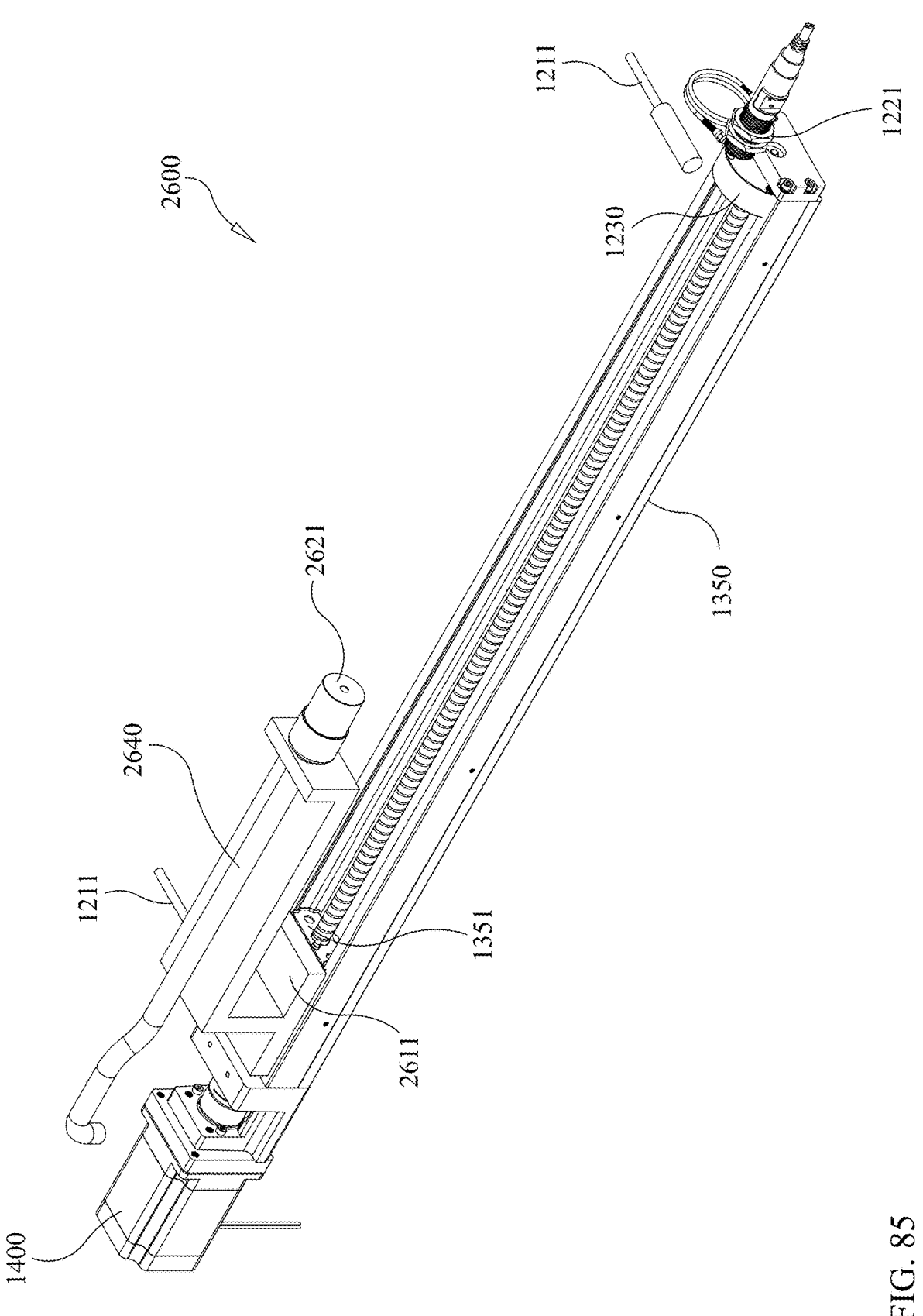
FIG. 85 is a top perspective view of a lubrication tool system formed in accordance with the present disclosure.
Figure 86:
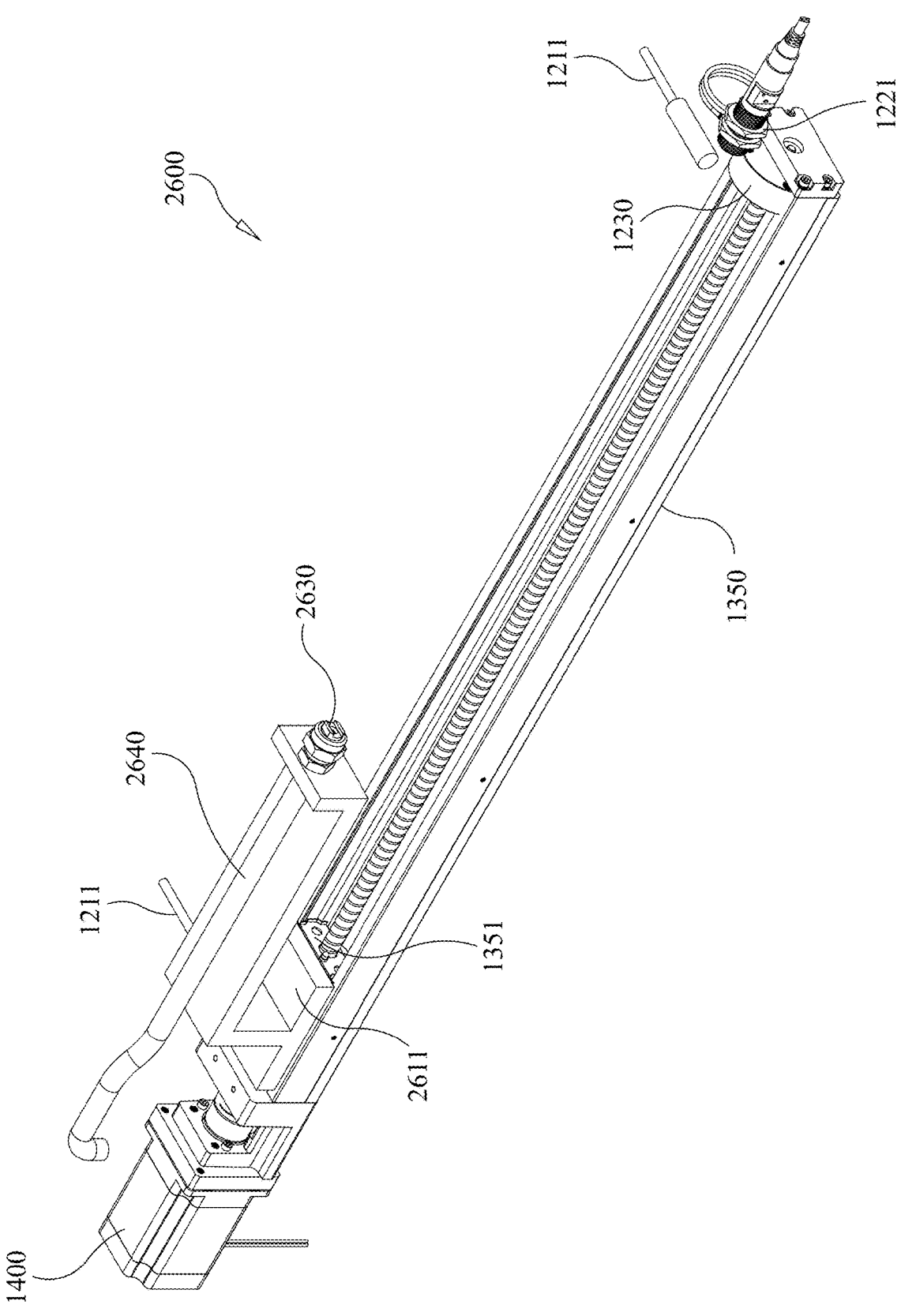
FIG. 86 is a top perspective view of a lubrication tool system with a lubricant spray head formed in accordance with the present disclosure.

Now referencing FIGS. 85 and 86 of the drawings, the lubrication tool system 2600 formed in accordance with the present invention comprises a lubrication arm 2611, a lubrication end effector 2621 or a lubricant spray head 2630, a lubrication line 2640 having a generally cylindrical side wall that defines an internal bore and a linear actuator 1350. The lubrication arm 2611 includes a first end and an oppositely disposed second end. The first end of the lubrication arm 2611 is mounted to the block carriage 1351 of the linear actuator 1350 such that the lubrication arm 2611 is selectively moveable by the linear actuator 1350.

The lubrication line 2640 includes a first axial end and a second axial end disposed opposite to the first axial end. Preferably, the first axial end of the lubrication line 2640 is connected to a lubrication source (not shown), such as a reservoir or a lubricant manifold, via a connector, such as an industrial quick connect fitting, which also may be situated on the robotic apparatus 1101.

As shown in FIG. 85 of the drawings, the lubrication end effector 2621 is mounted to a portion of the second end of the lubrication arm 2611. The lubrication end effector 2621 is connected to the second axial end of the lubrication line 2640 and is in fluid communication with the internal bore of the lubrication line 2640. Again, the lubrication arm 2611 is also mounted to the block carriage 1351 of the linear actuator 1350. As such, the lubrication end effector 2621 is also selectively movable by the linear actuator 1350. The lubrication end effector 2621 is preferably formed as a lubricant brush; however, the lubrication end effector 2621 may also be a lubrication wheel, a stick of lubrication or any other commercial lubrication tool or lubricating method. The lubrication end effector 2621 is pushed or placed against the TWA 1610 in the locations in which lubrication is desired. Alternatively, the lubrication end effector 2621 may move relative to the TWA 1610 or vice versa to apply lubrication along a path on the TWA 1610.

Alternatively, as shown in FIG. 86 of the drawings, the lubricant spray head 2630 is mounted to a portion of the second end of the lubrication arm 2611. The lubricant spray head 2630 is connected to the second axial end of the lubrication line 2640 and is in fluid communication with the internal bore of the lubrication line 2640. Again, the lubrication arm 2611 is also mounted to the block carriage 1351 of the linear actuator 1350. As such, the lubricant spray head 2630 is also selectively movable by the linear actuator 1350. The lubricant spray head 2630 is placed in the location on the TWA 1610 in which lubrication is desired and the lubricant spray head 2630 is actuated to apply a spray of lubricant to the location. Alternatively, the lubricant spray head 2630 may move relative to the TWA 1610 or vice versa to spray lubrication along a path on the TWA 1610.

The lubrication tool system 2600 may further include a distance sensor 1221 to sense the distance between the lubrication end effector 2621 and the TWA 1610 or the distance between the lubricant spray head 2630 and the TWA 1610. As described above, the distance sensor may be mounted to the lubrication arm 2611, the lubrication end effector 2621 or the lubricant spray head 2630. Alternatively, as also described above, the distance sensor 1221 may be mounted to a portion of the housing of the linear actuator 1350.

The lubrication end effector 2621 shown in FIG. 85 of the drawings may also be instrumented with a load cell 1230 to sense the force applied by the lubrication end effector 2621 against the TWA 1610. Preferably, the lubrication tool system 2600 is fully autonomous; however, the lubrication tool system 2600 may also be operated manually or semi-autonomously. For example, the lubrication tool system 2600 may be operated by hand, via a wired or remote panel on-site, via teleoperation or by any other means.

Figure 87:
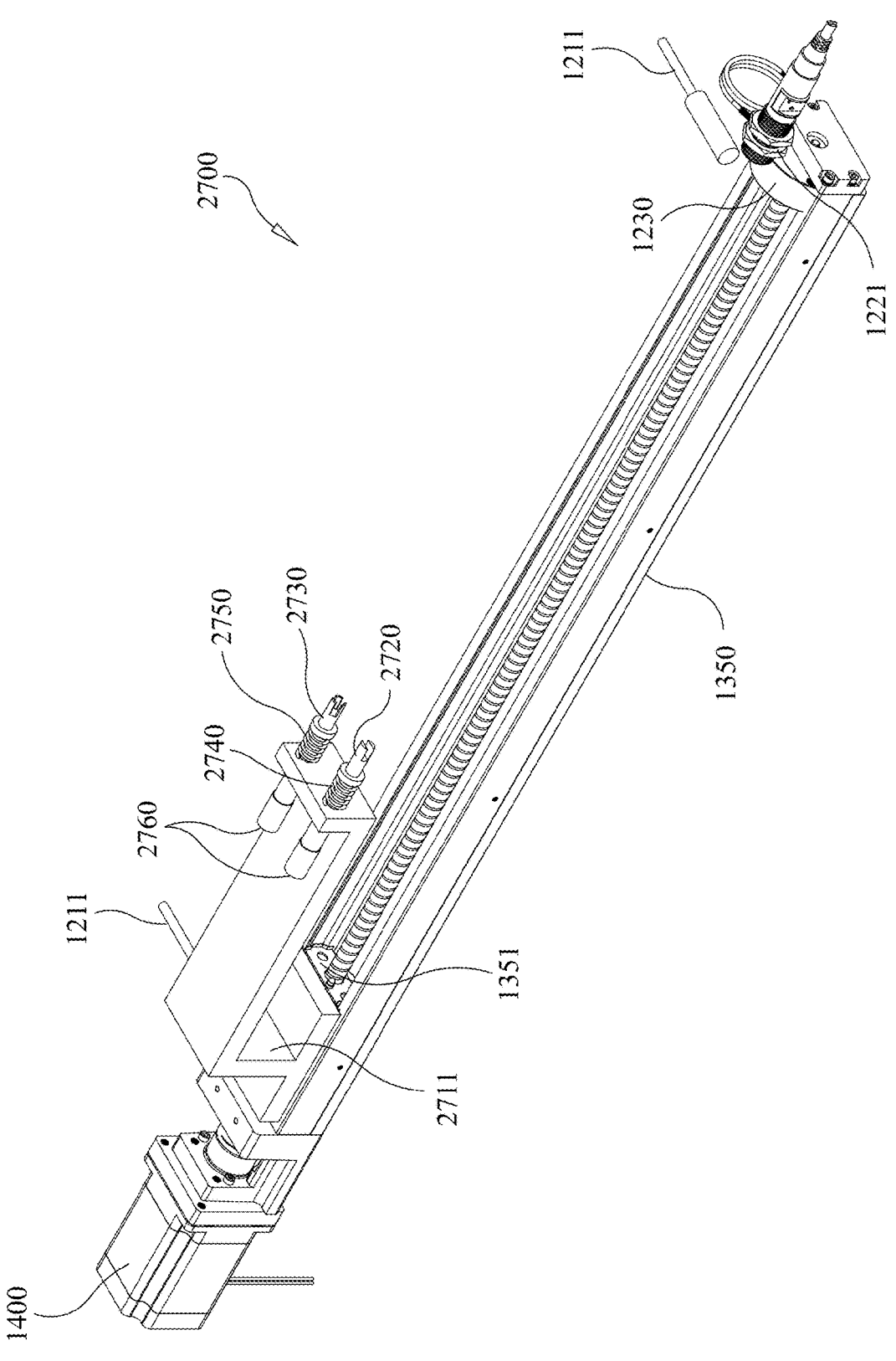
FIG. 87 is a top perspective view of a valve tool system formed in accordance with the present disclosure.

Now making reference to FIG. 87 of the drawings, the valve tool system 2700 formed in accordance with the present invention comprises a valve tool arm 2711, a stem driver 2720, a cap driver 2730, a stem driver spring 2740, a cap driver spring 2750, valve stem rotary drives 2760 and a linear actuator 1350. The valve tool arm 2711 includes a first end and an oppositely disposed second end. The first end of the valve tool arm 2711 is mounted to the block carriage 1351 of the linear actuator 1350 such that the valve tool arm 2711 is selectively moveable by the linear actuator 1350. The stem driver 2720, the cap driver 2730 and the valve stem rotary drives 2760 are preferably mounted to a portion of the second end of the valve tool arm 2711. Accordingly, the valve tool arm 2711, as well as the stem driver 2720 and the cap driver 2730 mounted thereto, are selectively movable by the linear actuator 1350 relative to the TWA 1610.

The stem driver 2720 has a tip which is contoured to interface with standard valve stems. The stem driver 2720 is backed by stem driver spring 2740 to spring-load it against the valve stem. The stem driver spring 2740 gives the stem driver 2720 play against the valve stem and allows it to unscrew or screw the valve stem by applying even pressure during the linear move associated unscrewing or screwing in the valve stem. The stem driver 2720 is mechanically coupled to one valve stem rotary drive 2760 via an output shaft of the valve stem rotary drive 2760 and is driven, preferably rotatably driven, by the valve stem rotary drive 2760 (i.e., the stem driver 2720 is rotated by the valve stem rotary drive 2760). The valve stem rotary drive 2760 is preferably a direct drive motor, but may be powered by a belt drive, a gear drive or other type of rotary drive.

The cap driver 2730 is designed to grasp the cap of a valve stem at one or more points. The cap driver 2730 is backed by the cap driver spring 2750 to spring-load it against the valve cap. The cap driver spring 2750 gives the cap driver 2730 play against the valve cap and allows it to unscrew or screw the valve cap by applying even pressure during the linear move associated with the unscrewing or screwing in of the valve cap. The cap driver 2730 is mechanically coupled to one valve stem rotary drive 2760 via an output shaft of the valve stem rotary drive 2760 and is driven, preferably rotatably driven, by the valve stem rotary drive 2760 (i.e., the cap driver 2730 is rotated by the valve stem rotary drive 2760). The valve stem rotary drive 2760 is preferably a direct drive motor, but may be powered by a belt drive, a gear drive or other type of rotary drive.

Preferably, the valve tool system 2700 is fully autonomous; however, the valve tool system 2700 may also be operated manually or semi-autonomously. For example, the valve tool system 2700 may be operated by hand, via a wired or remote panel on-site, via teleoperation or by any other means.

Now referencing FIGS. 133 and 134 of the drawings, the alignment tool 2800 formed in accordance with the present invention preferably comprises an alignment end effector 2820, an alignment arm 2810, an alignment drive system 2830, alignment tool sensors 2840 and a linear actuator 1350. The alignment arm 2810 includes a first end and an oppositely disposed second end. The first end of the alignment arm 2810 is mounted to the block carriage 1351 of the linear actuator 1350 such that the alignment arm 2810 is selectively moveable by the linear actuator 1350. The alignment end effector 2820, the alignment drive system 2830 and the alignment tool sensors 2840 are preferably mounted to a portion of the second end of the alignment arm 2810. Accordingly, the alignment arm 2810, as well as the alignment end effector 2820, the alignment drive system 2830 and the alignment tool sensors 2840 mounted thereto, are selectively movable by the linear actuator 1350 relative to the TWA 1610.

The alignment end effector 2820 is mechanically coupled to alignment drive system 2830 via an output shaft of the alignment drive system 2830 and is driven, preferably rotatably driven, by the alignment drive system 2830 (i.e., alignment end effector 2820 is rotated by the alignment drive system 2830). The alignment end effector 2820 is configured to interface with an alignment screw 1650 and, when driven by the alignment drive system 2830, rotate the alignment screw 1650 to adjust the alignment of the TWAs 1610 of the vehicle 1600. More specifically, as can be seen in FIG. 134 of the drawings, the alignment tool 2800 is engageable with the alignment screw 1650 installed on the vehicle. As described above, the alignment end effector 2820 of the alignment tool 2800 interfaces with the alignment screw 1650 and is selectively rotatable by the alignment drive system 2830, which causes the alignment screw 1650 that is interfaced with the alignment end effector 2820 to be correspondingly rotated. By rotating the alignment screw 1650, the alignment of the associated TWA 1610 may be adjusted.

The alignment tool sensor 2840 is preferably a position sensor that can sense the position of the alignment screw 1650 or TWA 1610. The alignment tool sensor 2840 and alignment drive system 2830 are powered by and communicate with the electrical panel 1103 of the robotic apparatus 1101 and/or the control unit 160.

It is envisioned to be within the scope of the present invention to have the alignment end effector 2820 of the alignment tool 2800 be driven by an off-tool drive system rather than the alignment drive system 2830. It is also envisioned to be within the scope of the present invention to use multiple linear actuators 1350 to move the components of the alignment tool 2800 relative to the TWA 1610.

Preferably, the alignment tool 2800 is fully autonomous; however, the alignment tool 2800 may also be operated manually or semi-autonomously. For example, the alignment tool 2800 may be operated by hand, via a wired or remote panel on-site, via teleoperation or by any other means. As mentioned above, like the other tooling, the alignment tool 2800 may be mounted to the frame 1102 of the robotic apparatus 1101 or may be used independently and selectively mated to the end effector 128 of a particular bot 120.

FIGS. 72-80 and 143 of the drawings show several embodiments of a tire gripper system 82200 formed in accordance with the present invention. The tire gripper system 82200 is used to manipulate the TWA 1610. For example, the gripper system 82200 may be used to stabilize the TWA 1610 and to effect rotation of the TWA 1610 to perform a particular tire servicing procedure. In one form, the tire gripper system 82200 includes a plurality of grippers 2270, one or more of which is driven by a gripper drive system 2260 to effect rotation of the TWA 1610. In another form, the tire gripper system includes a rotatable turntable 2360 onto which a plurality of grippers 2270 are mounted. In yet another form, the tire gripper system includes a face gripper 2300 that is engageable with the hub of the TWA 1610 and is driven by a gripper drive system 2260 to effect rotation of the TWA 1610.

Figure 72:
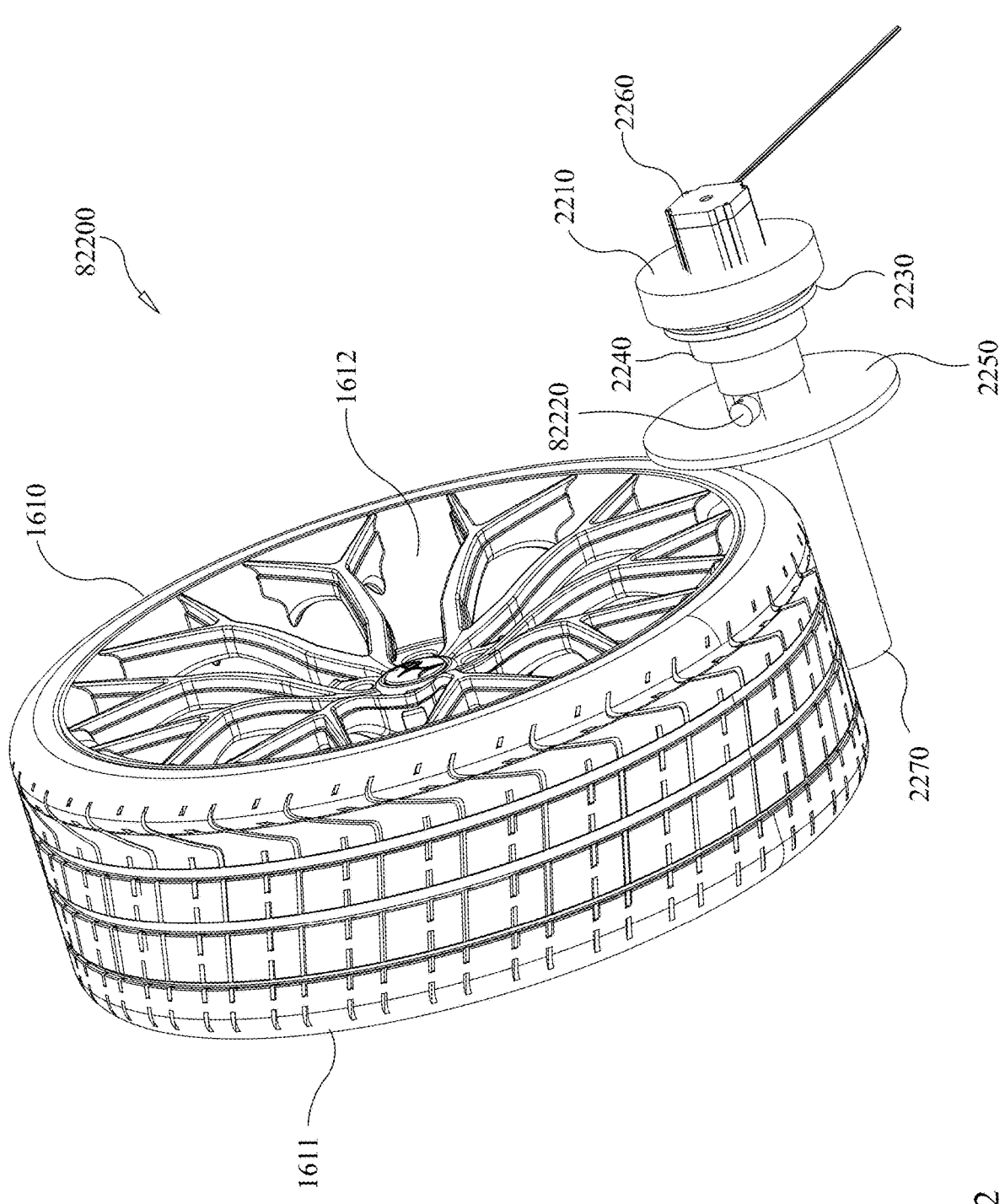
FIG. 72 is a bottom perspective view of a gripper system formed in accordance with the present disclosure, showing the gripper system adjacent to a TWA.
Figure 73:
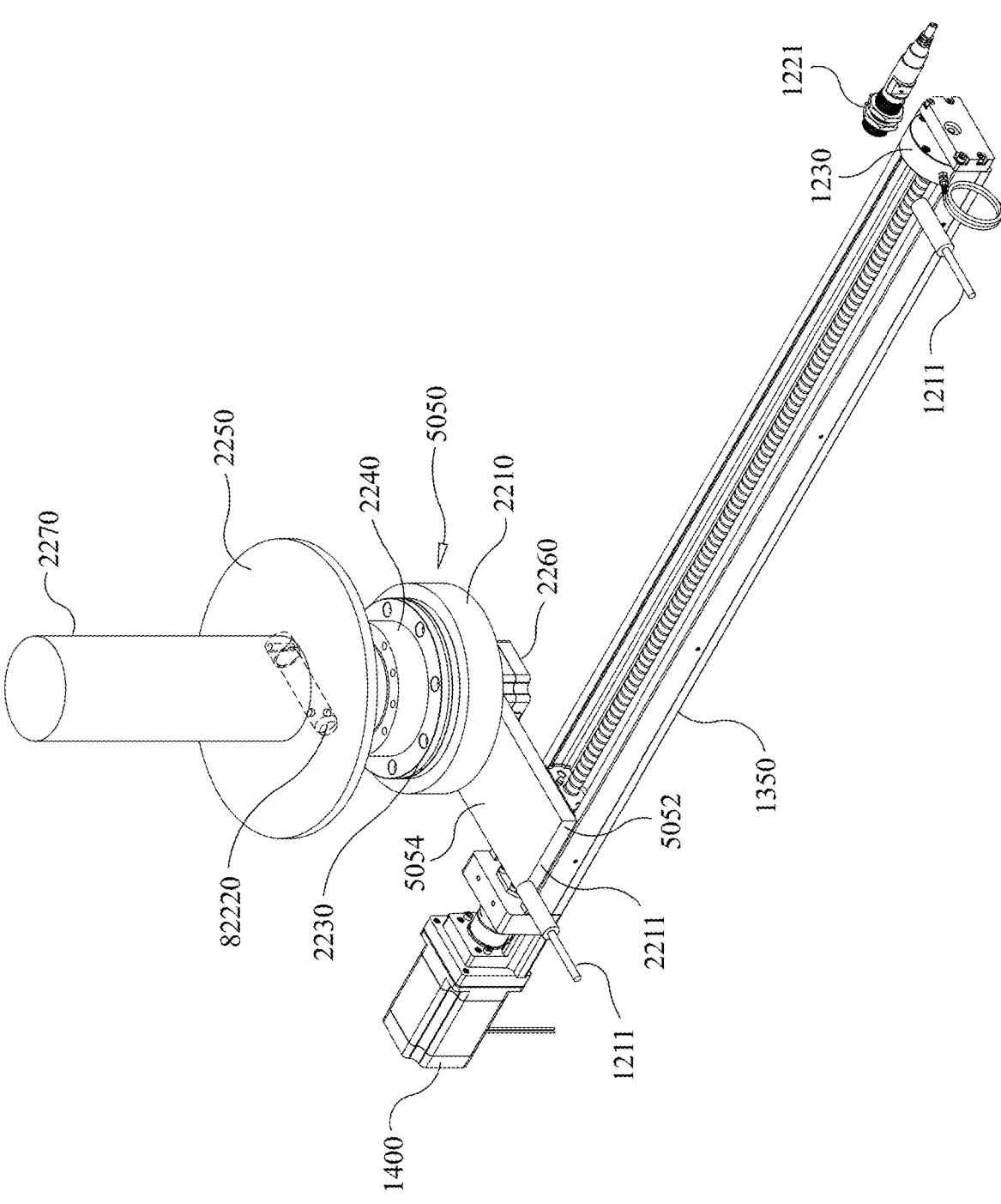
FIG. 73 is a top perspective view of the gripper system formed in accordance with the present disclosure.
Figure 74:
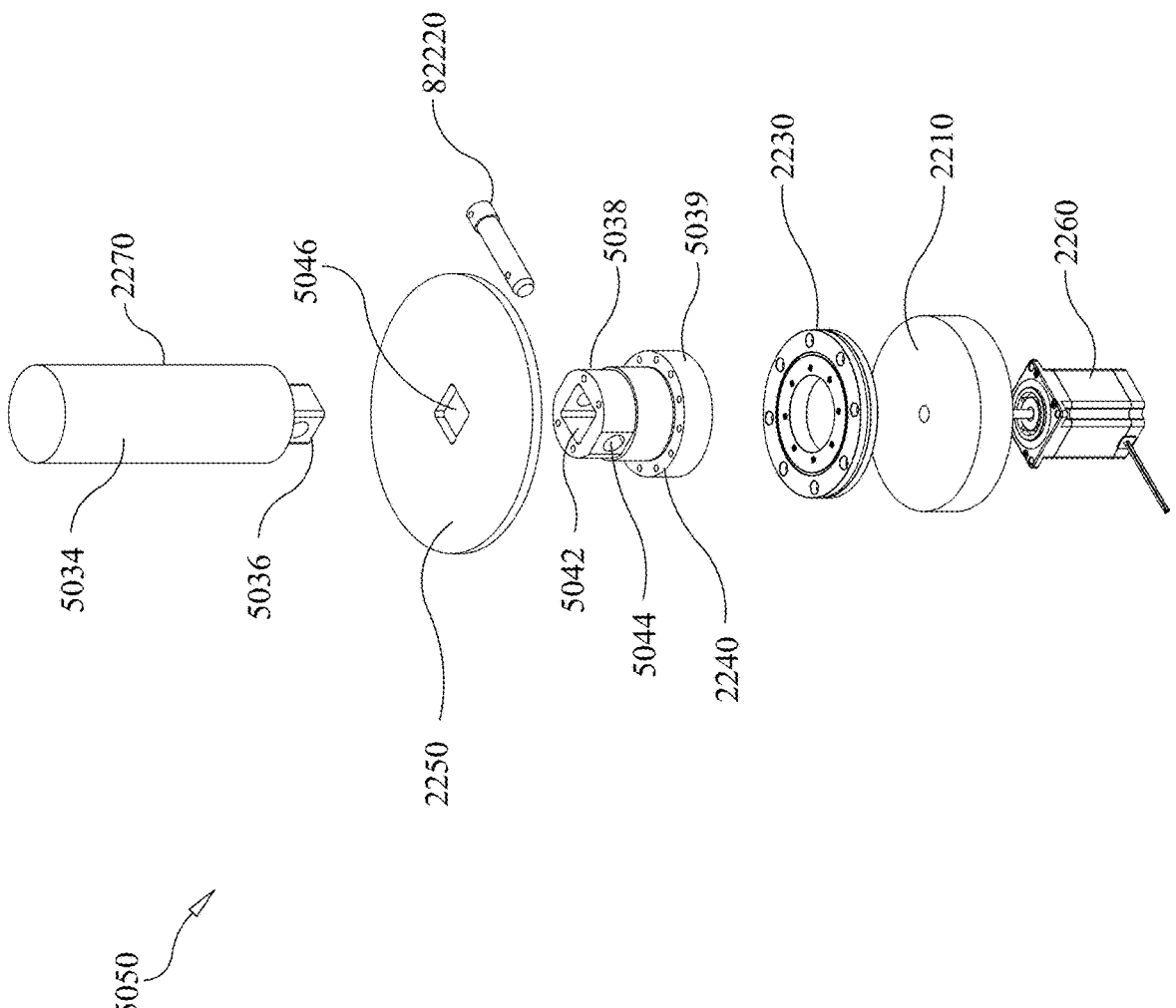
FIG. 74 is an exploded, top perspective view of the gripper system formed in accordance with the present disclosure.

As described above, in accordance with one form of the present invention, the tire gripper system 82200 includes one or more grippers 2270, at least one of which is driven by a gripper drive system 2260 to effect rotation of the TWA 1610. More specifically, as can be seen in FIGS. 72-74 of the drawings, in one form, the gripper 2270 is mountable to a drive assembly 5050 comprising a gripper base 2210, a gripper pin 82220, a gripper flange 2250, a gripper drive system 2260, a gripper bearing 2230 and a gripper pulley 2240. In one form, the gripper 2270 includes a first end 5034 and a second end 5036 disposed opposite to the first end 5034. The second end 5036 of the gripper 2270 is engageable with the gripper pulley 2240. The gripper pulley 2240 is generally formed as a cylindrical member having a first end 5038 and an oppositely disposed second end 5039. The first end 5038 of the gripper pulley 2240 includes a recessed slot 5042 that extends axially inwardly therefrom. The slot 5042 has a shape that generally conforms to the shape of the second end 5036 of the gripper 2270 so that the second end 5036 of the gripper 2270 may be at least partially received therein. Preferably the slot 5042 and the second end of the 5036 of the gripper 2270 have a rectangular cross-sectional shape; however, the slot 5042 and the second end of the 5036 of the gripper 2270 may be formed with other cross-sectional shapes, such as hexagonal, spline shaped or round Alternatively, a rectangular shaped "peg" may be machined onto the second end 5036 of the gripper 2270, which may be received in the slot 5042 in the pulley 2240.

The gripper pulley 2240 further includes a bore 5044 that is situated at the first end 5038 thereof and extends radially inwardly through the thickness of the pulley 2240 into the slot 5042. The gripper flange 2250 is formed as a generally cylindrical member having a centrally located bore 5046 that extends through the thickness thereof. The bore 5046 has a shape that generally conforms to the shape of the second end 5036 of the gripper 2270 so that the second end 5036 of the gripper 2270 may be at least partially inserted therethrough.

As can be seen in FIG. 74 of the drawings, the second end 5036 of the gripper 2270 is aligned with each of the bore 5046 in the gripper flange 2250 and the slot 5042 in the first end 5038 of the gripper pulley 2240, and is inserted through the bore 5046 in the gripper flange 2250 and into the slot 5042 in the first end 5038 of the gripper pulley 2240. The gripper pin 82220 is inserted through the bore 5044 in the gripper pulley 2240 and engages the second end 5036 of the gripper 2270 that is situated in the slot 5042, thereby joining the gripper 2270, gripper flange 2250 and gripper pulley 2240 together and retaining the second end 5036 of the gripper 2270 in the slot 5042. Nevertheless, it is also envisioned to be within the scope of the present invention to utilize other structures and techniques to retain the gripper 2270 in the gripper pulley 2240 and/or join the gripper 2270 to the gripper pulley 2240, such as a retaining ring, a shaft collar, a peen, an adhesive, a knurl, press-fit, shrink fitting, a magnet or an electromagnet.

The gripper pulley 2240 is mounted, joined, fastened or otherwise affixed to the gripper bearing 2230, preferably with fasteners. Similarly, the gripper bearing 2230 is mounted, joined, fastened or otherwise affixed to the gripper base 2210 with fasteners. In one form, as shown in FIG. 74 of the drawings, the gripper drive system 2260 drives the gripper pulley 2240 directly. More specifically, the shaft 5048 of the gripper drive system 2260 may be directly connected to the gripper base 2210. Nevertheless, in other forms, a belt (not shown) may be used to drive the gripper pulley 2240 so that the gripper drive system 2260 can be offset from the drive assembly 5050, in particular, from the gripper pulley 2240 of the drive assembly 5050. Furthermore, a gear drive, a hydraulic motor, a pneumatic motor or any other system that produces rotation may be used to rotational drive the gripper 2270. Even furthermore, multiple grippers 2270 may be controlled, moved and driven by the same gripper drive system 2260, gripper pulley 2240, and other components.

The gripper flange 2250 serves as a backstop for the TWA 1610. More specifically, during some tire servicing operations, once the tire 1611 is removed from the rim 1612, the tire 1611 can become flexible due to the lack of tension on it. This lack of tension can cause the grippers 2270 to have difficulty retaining the tire 1611 axially. The gripper flange 2250 provides a backstop which stops the tire 1611 from advancing axially past that point, allowing for more reliable locating and manipulation of the tire 1611.

As can be seen in FIGS. 73 and 143 of the drawings, the gripper 2270 and drive assembly 5050 are mounted to a gripper mounting plate 2211. More specifically, the gripper mounting plate 2211 includes a proximal end 5052 and an oppositely disposed distal end 5054. Preferably, the drive assembly 5050 is mounted to the gripper mounting plate 2211 in proximity to the distal end 5054 thereof and the proximal end 5052 of the gripper mounting plate 2211 is mounted to the block carriage 1351 of a linear actuator 1350. Accordingly, linear movement of the carriage block 1351 results in movement of the gripper mounting plate 2211 and thus, the drive assembly 5050 and gripper 2270 attached thereto.

The gripper system 82200 may also include load cells 1230, which are installed thereon, in particular, on one or more of the components of the linear actuator 1350, the gripper 2270, the drive assembly 5050 or the mounting plate 2211, to measure the compressive force of the gripper 2270 on the TWA 1610 and facilitate proper compression and torque transfer. The gripper system 82200 may further include distance sensors 1221, which are installed thereon, in particular, on one or more of the components of the linear actuator 1350, the gripper 2270, the drive assembly 5050 or the mounting plate 2211, to measure the distance of the grippers 2270 to the TWA 1610 and/or the distance from the gripper system 82200 to other aspects or components of the robotic automotive service system 1100 formed in accordance with the present invention.

As can be seen in FIG. 143 of the drawings, the robotic apparatus 1101 may include three grippers 2270, each of which is driven by a respective gripper drive system 2260. More specifically, as described above, each of the linear actuators 1350 that are coupled to the drive assembly 5050 of a respective rotationally driven gripper 2270 is mounted to the frame 1102 of the robotic apparatus 1101. The linear actuators 1350 are configured on the gripper system 82200, which is mounted to the frame 1102 of the robotic apparatus 1101, to provide linear movement in the radial direction of the TWA 1610. The gripper 2270 is designed to contact the TWA 1610 such that rotation of the gripper 2270 causes the TWA 1610 be correspondingly rotated. The motion of the linear actuator 1350 allows the gripper system 82200 to drive the gripper 2270 into closer or farther contact with the TWA 1610.

As can be seen in FIG. 143 of the drawings, the robotic apparatus 1101 may include one or more grippers 2270, at least one of which is driven by a gripper drive system 2260 to effect rotational movement of the gripper 2270 and rotate the TWA 1610. Preferably, the robotic apparatus 1101 includes three grippers 2270, each of which is rotationally driven by a respective gripper drive system 2260 that is mechanically coupled thereto. In addition to driving rotation of the TWA 1610, the gripper system 82200 can be used to manipulate the TWA 1610 position and orientation. Again, with reference to FIG. 143 of the drawings, some non-exclusionary examples of manipulation are as follows:

(1) By tilting the gripper system 82200 forward or backwards, the TWA 1610 may also be tilted. Alternatively, this motion allows the grippers 2270 of the gripper system 82200 to approach the TWA 1610 off-angle.

(2) By moving all the grippers 2270 of the gripper system 82200 in one direction an equal amount, the TWA 1610 position can be manipulated the same amount. For instance, moving all the grippers 2270 of the gripper system 82200 to the right 100 mm in the image would shift the center of the TWA 1610 to the right 100 mm.

(3) By moving the gripper 2270 of the gripper system 82200 asymmetrically, the TWA 1610 position can be adjusted relative to the center point between all the grippers 2270 of the gripper system 82200. For example, moving the upper gripper inwards and the lower grippers outwards would move the center of the TWA 1610 downwards.

(4) Moving the center of the TWA 1610 relative to the center point between all the grippers 2270 of the gripper system 82200 allows for non-concentric rotation of the TWA 1610 relative to that point.

Figure 79:
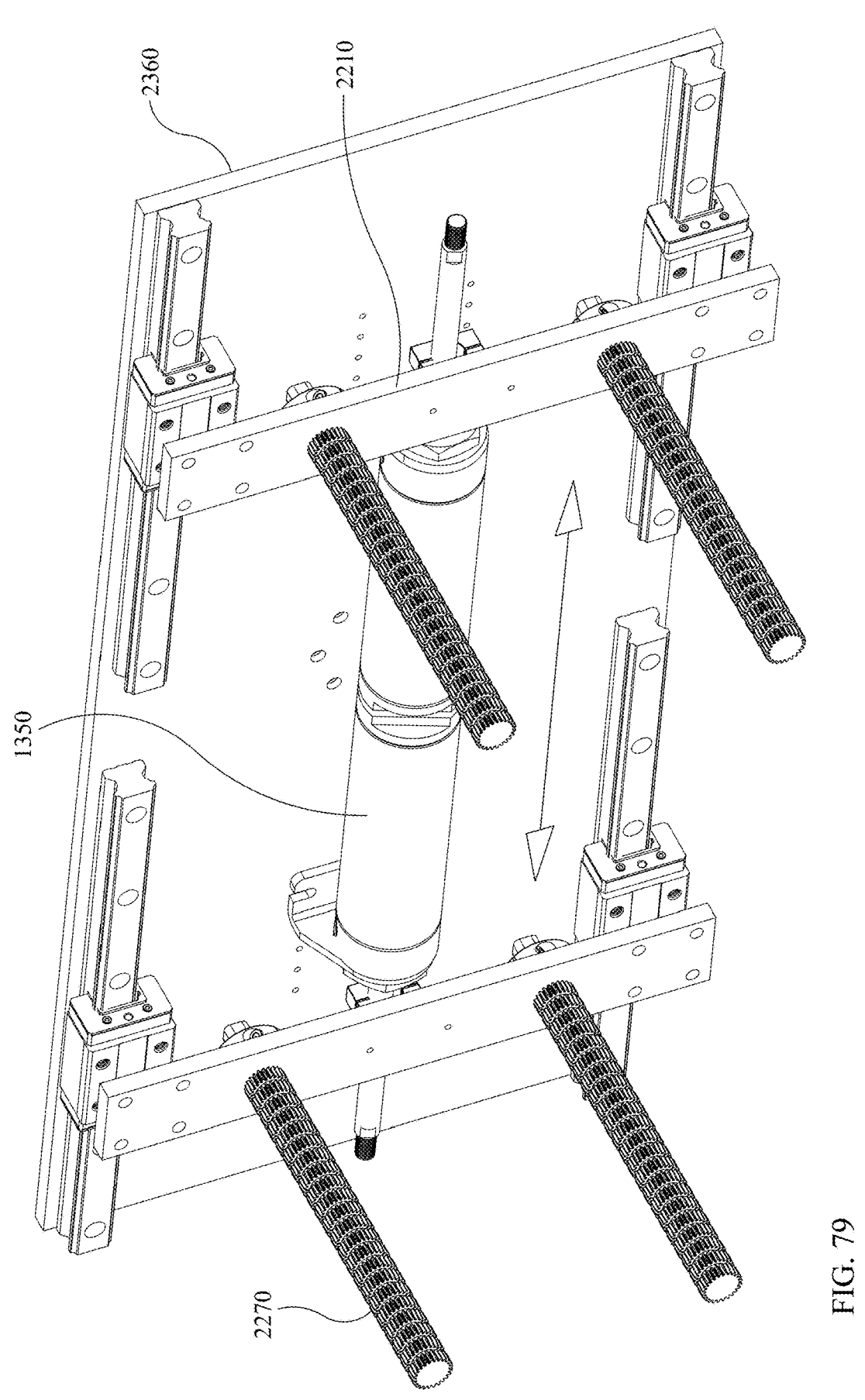
FIG. 79 is a front perspective view of a turntable of the gripper system formed in accordance with the present disclosure.

As also described above, in accordance with another form of the present invention, the tire gripper system 82200 includes a rotatable turntable 2360 to which a plurality of grippers 2270 are connected. More specifically, as can be seen in FIG. 79 of the drawings, a plurality of grippers 2270, which are preferably stationary and non-rotational (i.e., the grippers 2270 are fixed from rotating along their own longitudinal axes), are affixed to a first gripper base 2210A and a second gripper base 2210B. Each of the first gripper base 2210A and the second gripper base 2210B is engaged with one or more elongated tracks situated on the turntable 2360 and is reciprocatingly movable thereon. A first linear actuator 1350A and a second linear actuator 1350B, each of which is preferably a pneumatic linear actuator that includes a cylindrical housing and a rod that is selectively extendable therefrom and retractable therein upon the application of pneumatic force from a pneumatic air source (not shown), are mounted to the turntable 2360. The rods of the linear actuators 1350A, 1350B are mechanically coupled to a respective one of the first and second gripper bases 2210A, 2210B. The linear actuators 1350A, 1350B drive the gripper bases 2210A, 2210B, as well as the grippers 2270 attached thereto, inwardly and outwardly relative to one another along the tracks to grip and release the TWA 1610. The movement of the linear actuators cause the grippers 2270 to be pressed into the tire 1611, ideally causing some deformation of the tire 1611 around the gripper 2270. As long as the grippers 2270 are held against the tire 1611 of the TWA 1610 and not retracted therefrom, they produce a positive drive contact patch on the TWA 1610, allowing the gripper turntable 2360 to rotate the TWA 1610.

Figure 80:
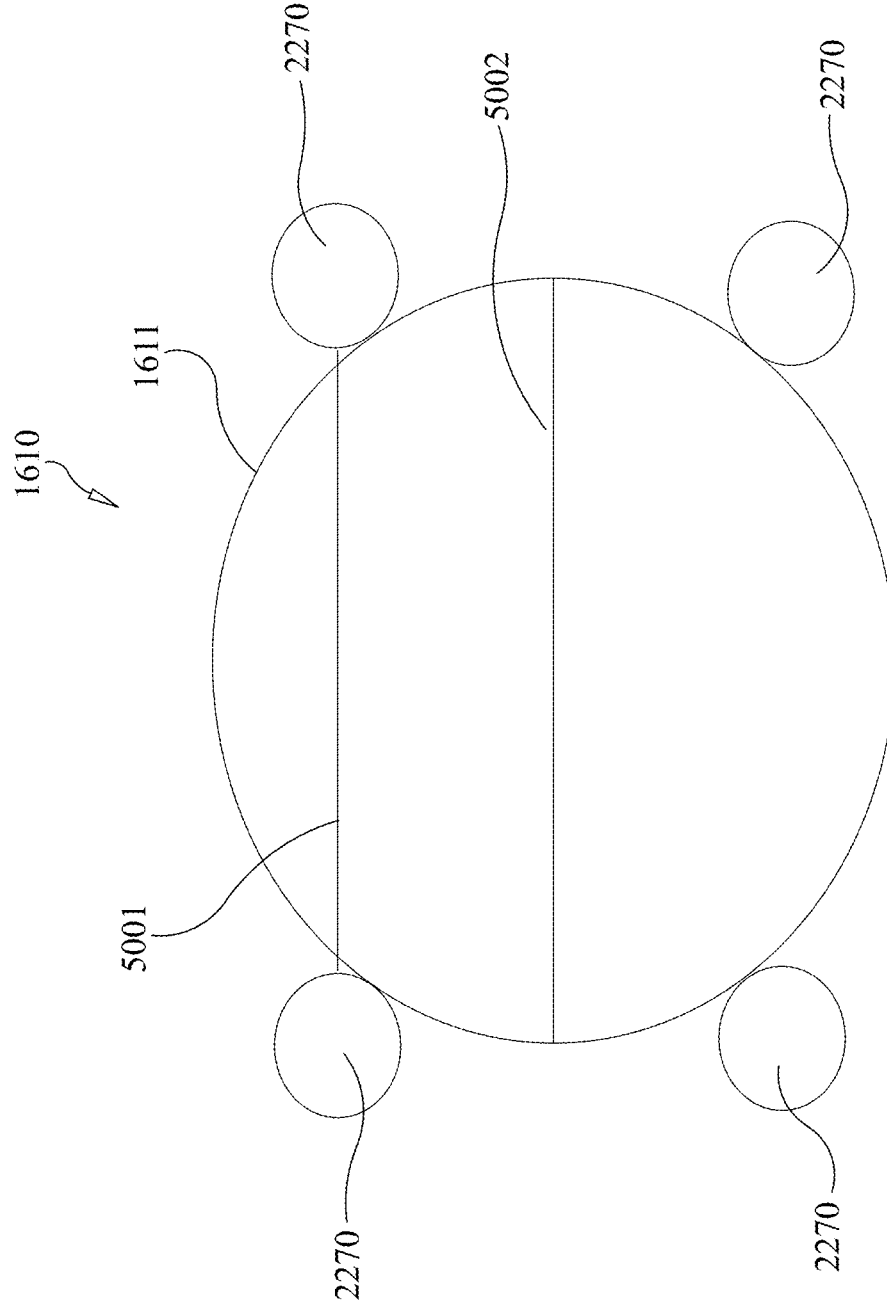
FIG. 80 is a front elevational view of the TWA, illustrating the relative dimensions thereof.

As can be seen in FIG. 80 of the drawings, preferably, the grippers 2270 are spaced apart from one another on the first and second gripper bases 2210A, 2210B such that, when the TWA 1610 is gripped by the gripper system 82200, the grippers 2270 are situated on opposite sides of the diameter 5002 of the tire 1611, the diameter 5002 of the tire 1611 being the longest chord between any two points on the circumference of the tire 1611. The distance 5001 between any two grippers 2270 is preferably less than the diameter 5002 of the tire 1611.

As the TWA 1610 is rotated by the gripper turntable 2360, a force which acts in a direction opposite to the direction of rotation of the gripper turntable 2360 (a "reverse force" is generated by various objects and components. For example, if the TWA 1610 is on the vehicle, the transmission of the vehicle generates a force that acts in a direction that is opposite to direction of rotation of the gripper turntable 2360 and TWA 1611 gripped thereby. Similarly, various tooling that is engaged with portions of the TWA 1610 creates a similar "reverse force". As the TWA 1610 is rotated by the gripper turntable 2360, due to the positioning of the grippers 2270 on opposite sides of the diameter 5002 of the tire 1611, at least some of the grippers 2270 (e.g., half of the grippers 2270 if four grippers 2270 mounted to the turntable 2360) act against the reverse force and are further driven against the tire 1611 in a direction of increasing chord length of the tire 1611 (i.e., towards the diameter 5002 of the tire 1611). This increases the grip of the grippers 2270 against the tire 1611 as the gripper turntable 2360 rotates the TWA 1610. In comparison, the grip of the grippers 2270 against the tire 1611 generally decreases as the distance 5001 between any two grippers 2270 increases towards the diameter 5002 of the tire (e.g., the grippers 2270 are situated closer to the diameter 5002 of the tire 1611).

Some tire servicing procedures and tooling require the TWA 1610 be rotated at least one full turn (i.e., a complete revolution of 360 degrees). While it is possible for the gripper turntable 2360 to rotate the TWA 1610 in a full rotation (i.e., 360 degrees or greater) to accomplish a particular tire servicing procedure, to reduce the size of the travel path of the grippers 2270, for example, on the robotic apparatus, the rotation action may follow a pattern by which the grippers 2270 grip the TWA 1610, the gripper turntable 2360 rotates the TWA 1610 for a partial rotation, such as 10 degrees, the grippers 2270 release the TWA 1610, the gripper turntable 2360 rotates in an opposite direction back to its starting position. This pattern may be repeated until the TWA 1610 has been rotated by the amount required for the particular tire servicing procedure.

Preferably, the gripper turntable 2360 is mounted to a bearing (not shown) which is in turn mounted to the frame 1102 of the robotic apparatus 1101 such that it may rotate about the centerline of the bearing. A motor 1400 is mechanically coupled to the turntable 2360 to effect rotation thereof.

Figure 76:
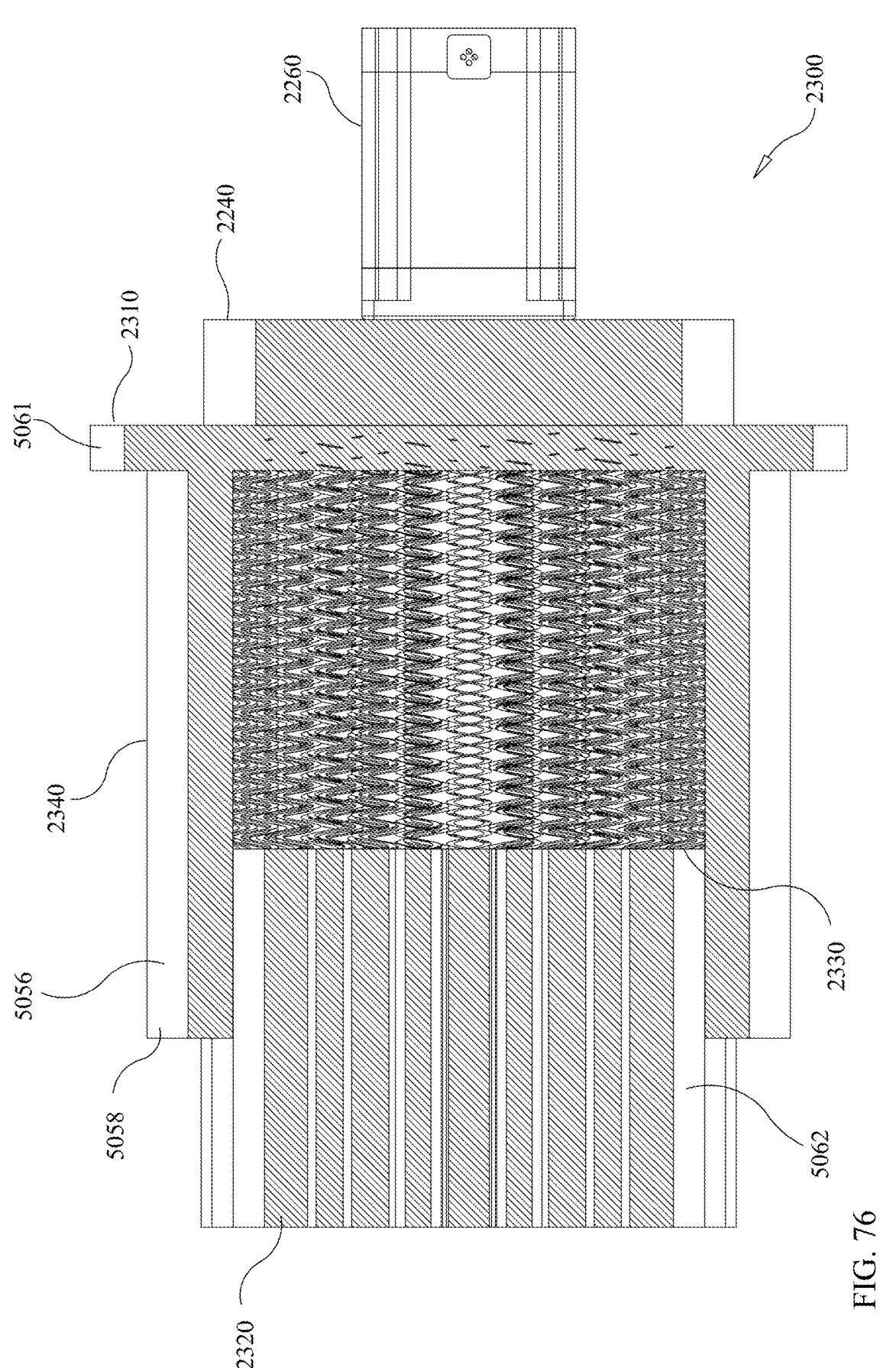
FIG. 76 is a cross-sectional, left elevational view of a face gripper formed in accordance with the present disclosure.

As also described above, in accordance with yet another form of the present invention, the tire gripper system 82200 includes a face gripper 2300 that is engageable with the hub of the TWA 1610 and is driven by a gripper drive system 2260 to effect rotation of the TWA 1610. More specifically, as can be seen in FIG. 76 of the drawings, the face gripper 2300 preferably includes a face gripper pin housing 2340 having a first end 5058, an oppositely disposed second end 5061, a generally cylindrical side wall 5056 that extends between the first end 5058 and the second end 5061. The first end of the face gripper pin housing 2340 is preferably open. A face gripper back plate 2310 extends between the side wall 5056 in proximity to the second end 5061 of the face gripper pin housing 2340 and at least partially closes the second end 5061 of the face gripper pin housing 2340. In an alternative embodiment, rather than being formed as an integral part of the face gripper pin housing 2340, the back plate 2310 may be mounted to the pin housing 2340 using fasteners. A pulley 2240 is preferably mounted to the back plate 2310 using fasteners. The pulley 2240 is mechanically coupled to a gripper drive system 2260 and rotatably driven thereby to effect rotational movement of the face gripper 2300. The cylindrical side wall 5056 and the face gripper back plate 2310 define a cavity 5062 in which a plurality of face gripper pins 2320 and a plurality of face gripper pin springs 2330 are situated.

More specifically, the face gripper pins 2320 and face gripper pin springs 2330 are packed inside the cavity 5062 of the pin housing 2340. The number of face gripper pins 2320 and face gripper pin springs 2330 may be variable, but in general, should be as large as possible while still allowing for free movement of the components within the cavity 5062. The face gripper back plate 2310 closes the back of the face gripper pin housing 2340 (i.e., the second end 5061).

The face gripper pins 2320 are attached to the face gripper pin springs 2330 in such a way that the face gripper pin springs 2330 tend to push or bias the face gripper pins 2320 axially, at least partially out of the first end 5058 of the pin housing 2340. The face gripper pin springs 2330 are attached at the back to the face gripper pin housing 2340. The attachment between the face gripper pins 2320 and face gripper pin springs 2330 and pin housing 2340 is such that the face gripper pins 2320 cannot pull away from the face gripper pin springs 2330, which cannot pull away from the pin housing 2340, such that the face gripper pins 2320 cannot be pushed completely out of the pin housing 2340.

Each face gripper pin 2320 and its corresponding face gripper pin spring 2330 can move axially and independently from other face gripper pins 2320 and their respective pin spring 2330. As one or more face gripper pins 2320 advance into an object, such as the lug nuts 1613 of the TWA 1610, they are depressed (i.e., pushed inwardly towards the back of the housing 2340), while the face gripper pins 2320 that have not contacted an object stay in position axially. In this way, the packed face gripper pins 2320 roughly conform to the shape of the tire component that the face gripper 2300 is being advanced into and/or against. The resolution that the face gripper pins 2320 can conform to is related to the number and size of the face gripper pins 2320. When depressed, the face gripper pins 2320 experience a restoring force by the face gripper pin springs 2330 which tends to push the face gripper pins 2320 out and towards the object and/or component depressing them, such that when the object is removed or the face gripper system 2300 is retracted, the face gripper pin springs 2330 restore the face gripper pins 2320 to their original position, in which they at least partially extend axially from the first end 5058 of the pin housing 2340.

Figure 77:
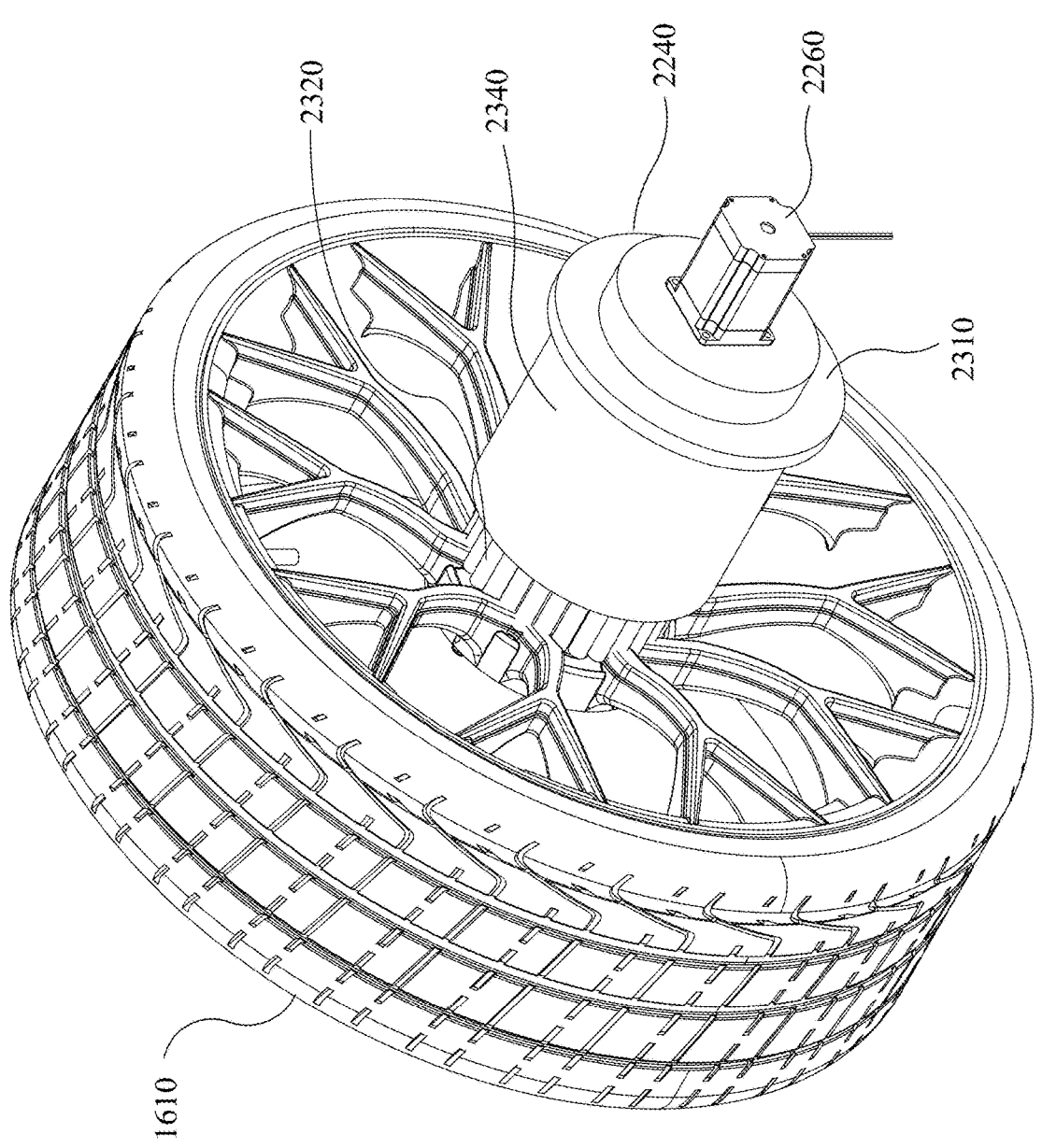
FIG. 77 is a front perspective view of the face gripper formed in accordance with the present disclosure, showing the face gripper engaged with the TWA.

As can be seen in FIG. 77 of the drawings, the face gripper 2300 interfaces with the TWA 1610 by gripping the TWA 1610 by the lug positions of the rim. More specifically, the face gripper 2300 is actuated axially such that the face gripper pins 2320 push against the face of the rim. As face gripper 2300 is actuated farther, the face gripper pins 2320 that are not lined up with the lug positions are compressed into the face gripper pin springs 2330, while the face gripper pins 2320 that are aligned with the lug positions are able to continue moving axially into the lug positions and engaged therewith.

Once the face gripper pins 2320 are engaged with the lug positions, the gripper drive system 2260 can rotate the face gripper pin housing 2340, which pushes the face gripper pins 2320 radially into the walls of the lug positions, applying torque to the TWA 1610 and aiding in the rotation of the TWA 1610.

In an alternate embodiment of the face gripper 2300, the face gripper pins 2320 may drive torque into the TWA 1610 by engaging any space, face, edge, point or suitable feature on a component of the TWA 1610 or vehicle, such as the rim spokes.

In another alternate embodiment of the face gripper 2300, the face gripper pins 2320 may instead be a compliant component which may deform axially as needed to line up with the driven surface, face, edge or point. The face gripper pins 2320 may also be any component or shape suitable for driving torque, such as spherical balls or square keys. The face gripper pins 2320 may also be replaced with a hydraulic or pneumatic system capable of engaging with the driven surface, face, edge or point.

Figure 78:
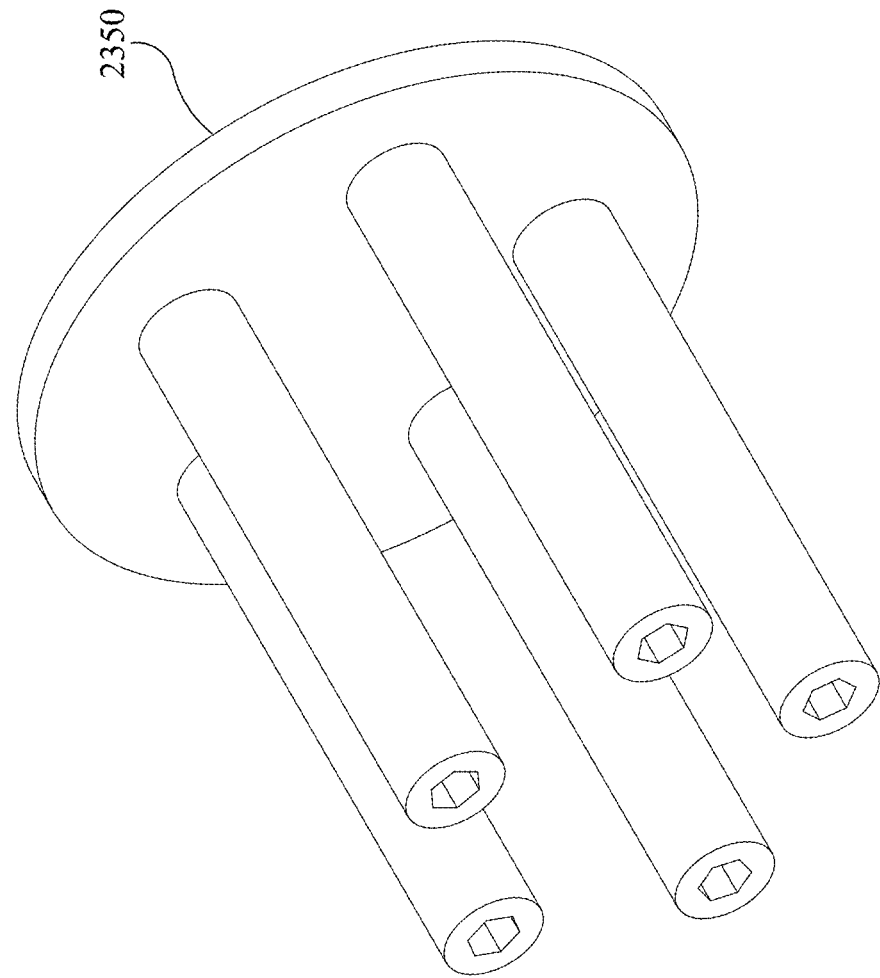
FIG. 78 is a front perspective view of a lug-nut gripper formed in accordance with the present disclosure.

In yet another form, the tire gripper system 82200 may include a lug nut gripper 2350, as shown in FIG. 78 of the drawings, that is mechanically coupled to and rotatable by a gripper drive system 2260. The lug-nut gripper 2350 interfaces with the lug nuts 1613 or the cavity in the rim 1612 of the TWA 1610 that the lug nuts 1613 generally resides in, such that when the lug-nut gripper 2350 is rotated via the gripper drive system 2260, the TWA 1610 is rotated as well. The lug nut gripper 2350 may be mounted to the frame 1102 of the robotic apparatus 1101 or may be selectively engageable with the end effector 128 of a particular bot 120.

The gripper 2270 may comprise structure and/or surface coatings that optimize attributes, such as friction, torque transfer, aesthetics, or mass or to reduce damage to the TWA 1610. More specifically, one difficulty of gripping the TWA 1610 via the tire 1611 is that, after deflation, the tire 1611 becomes relatively flexible in the radial direction (towards the center of the tire 1611). As such, it can be difficult to produce enough force in the radial direction on the tire 1611 to provide sufficient torque for rotating the tire 1611 or TWA 1610 via friction alone, as exemplified by the following equation:

$$\text{Torque} = \text{Normal Force} * \text{Friction Coefficient} * \text{tire radius}$$

One solution is to increase the friction coefficient between the gripper 2270 and the TWA 1610 (particularly between the gripper 2270 and the tire 1611 of the TWA 1610) to decrease the normal force required to produce high torque. Various exemplary grippers 2270 that may be used to remedy or overcome the above-mentioned obstacle are shown in FIG. 75 of the drawings. For example, the gripper 2270 may be formed as bare metal gripper, a rubber-coated gripper 2272, a tungsten carbide (or similar) coated gripper 2273, a coated gripper 2274 (e.g., the gripper is coated with adhesive or sandpaper, etc.), a toothed gripper 2275, a lobed Geneva gripper 2276, a cam-style gripper 2277, a track belt gripper 2278.

The lobed Geneva gripper 2276 drives torque into the tire 1611 by using the deformation of the tire 1611 to produce a positive drive contact point between the lobed Geneva gripper 2276 and the tire 1611. Every rotation of the lobed Geneva gripper 2276 advances the tire 1611 not through pure friction, but through this positive contact. The cam-style gripper 2277 drives torque into the tire 1611 by using the deformation of the tire 1611 to produce a positive drive contact point between the cam-style gripper 2277 and the tire 1611. Every rotation of the cam-style gripper 2277 advances the tire 1611 not through pure friction, but through this positive contact. The toothed gripper 2275 drives torque into the tire 1611 by using the deformation of the tire 1611 to produce a positive drive contact point between the toothed gripper 2275 and the tire 1611. Every rotation of the toothed gripper 2275 advances the tire 1611 not through pure friction, but through this positive contact. Additionally, the teeth of the toothed gripper 2275 tend to produce and grip many small "micro-deformations" in the tire 1611 to produce additional positive contact and tend to use the tread of the tire 1611 to produce positive contact.

Preferably, the tire gripper system 82200 is fully autonomous; however, the tire gripper system 82200 may also be operated manually or semi-autonomously. For example, the tire gripper system 82200 may be operated by hand, via a wired or remote panel on-site, via teleoperation or by any other means.

Figure 62:
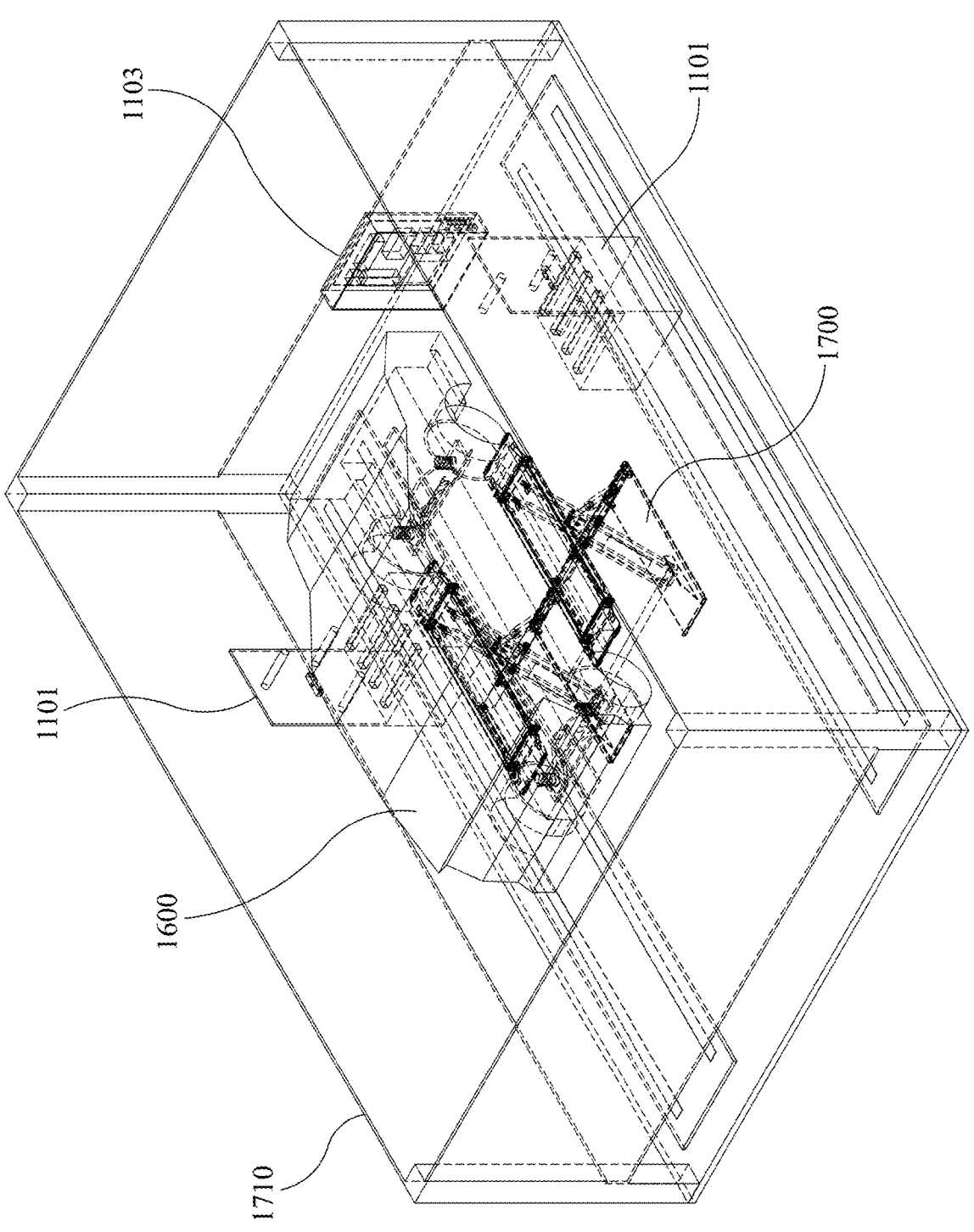
FIG. 62 is a top perspective view of a robotic automotive service system formed in accordance with the present disclosure.
Figure 132:
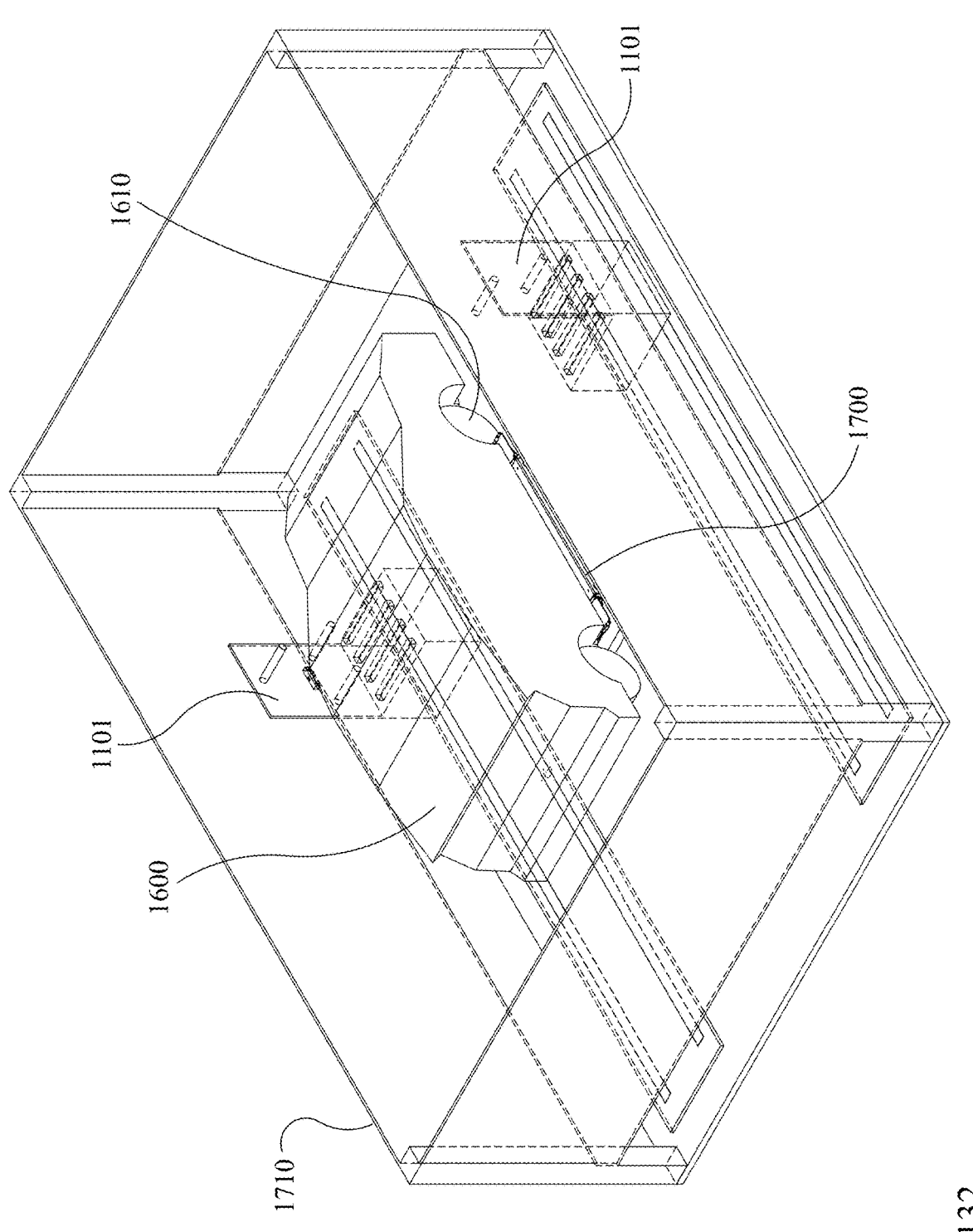

A robotic automotive service system 1100 formed in accordance with the present invention is generally shown in FIGS. 62, 132 and 135 of the drawings. The robotic automotive service system 1100 includes one or more robotic apparatus 1101 that may be used to perform tire servicing procedures/operations. In a preferred embodiment, the robotic automotive service system 1100 contains at least two robotic apparatus 1101, one each for the driver and passenger side of the vehicle 1600. As described above, the robotic apparatus 1101 contains a frame 1102 which houses components, tooling, and electronics of the robotic apparatus 1101.

The robotic automotive service system 1100 further includes one or more electrical panels 1103 for housing electronics such as a computer 1500, a data acquisition system 1510, embedded circuit boards 1523, a processor 1530, a programmable logic controller 1540, a motor controller 1410, an input/output module 1541 and safety module 1542; however, it is also envisioned to be within the scope of the present invention to have the electrical panel be formed as a component of the robotic apparatus 1101.

A preferred form of the electrical panel 1103 is shown in FIG. 145 of the drawings. The electrical panel 1103 is preferably mounted to the robotic apparatus 1101 such that it translates with the robotic apparatus 1101; however, the electrical panel 1103 may also be stationary and mounted at a particular location. The electrical panel 1103 contains input and output connectors 1104 for connecting the electronics it houses to various systems and components of the robotic apparatus, which include: communications and power connectors from motor controllers 1410 to motors 1400; communications and power connectors from the data acquisition system 1510 to the balancing system 3000; communications and power connectors from the input/output module 1541 to sensors 1200 such as the proximity sensor 1211, distance sensors 1221, one or more load cells 1230, a multi-axis accelerometer 1250, pressure sensor 1280; other sensors 1200 used on the robotic apparatus 1101; communications and power connectors from the vision system 1300 to the programmable logic controller 1540 or computer 1500; communications and power connectors from the programmable logic controller 1540 to the computer 1500; and communications and power connectors from the operator interface 1910, the customer interface 1900 and the operator controls 5210 to the computer 1500. Motors 1400, sensors 1200 such as proximity sensors 1211 and distance sensors 1221, and the vision system 1300 are powered via connectors 1104 from the electrical panel 1103.

The robotic apparatus 1101 of the robotic automotive service system 1100 may include a series of tooling, such as a bead breaker system 2000, a bead tool system 82100, a series of gripper systems 2200, an inflation tool system 2401, a cleaning tool system 2500, a lubrication tool system 2600, a valve stem tool system 2700 and an alignment tool system 2800, each of which was described in above. The collection of tools on the robotic apparatus 1101 is henceforth referred to as "tooling" for description purposes. As mentioned above, a plurality of tools or "tooling" may be mounted to the frame 1102 of the robotic apparatus 1101 or the specific tooling may be selectively mounted to the end effector 128 of one or more bots 120.

The robotic automotive service system 1100 is preferably capable of and configured to be fully autonomous so as to perform various tire servicing procedures/operations without human intervention; however, the robotic automotive service system 1100 may also be operated manually or semi-autonomously. In the fully-autonomous embodiment, the robotic automotive service system 1100 obtains information about the required service information a via the customer interface 1900 and operator interface 1910. The system 1100 obtains information about the vehicle 1600 and environment via onboard sensors 1200 and a vision system 1300, the signals of which are fed back to the electrical panel 1103 where they are distributed to the programmable logic controller 1540, data acquisition system 1510, and control computer 1500. The computer 1500 synthesizes the service information, vehicle information, and environment information into actionable movements and actions for the robotic apparatus 1101 to perform to fulfill the required service conditions. Fully-autonomous refers to the ability of the robotic automotive service system 1100 to complete the service steps, including obtaining any relevant information throughout the process, without human intervention once it has received the initial inputs from the operator.

In a preferred embodiment of the invention, in fully-autonomous mode, each individual tool on the robotic apparatus 1101 is also fully autonomous.

Semi-autonomous operation refers to the ability of the robotic automotive service system 1100 to complete the service steps with intermittent input from an operator. In semi-autonomous operation, individual tools on the robotic apparatus 1101 may be fully autonomous, semi-autonomous, manual, or a mix of any and each.

Manual operation refers to the ability of the robotic automotive service system 1100 to complete the service steps while being controlled by an operator. In manual operation, one or more of the tools on the robotic apparatus 1101 are controlled manually by an operator.

Service information obtained by the system 1100 may include the type of service being performed (e.g., tire change, passenger rear tire), the make, model, and year of the vehicle, the type of tire being removed and installed, and other relevant information. Vehicle information obtained by the system 1100 may include vehicle position and orientation on the lift, condition and size of the tire to be changed, and overall vehicle condition. Throughout the process, additional information may include the position of the system and tooling relative to the vehicle. Environmental information obtained by the system 1100 may include verifying that no humans are within the work area, that the appropriate tire 1611 has been loaded into the system for replacement, and that there are no obstructions preventing the system 1100 from fulfilling its service.

The robotic automotive service system 1100 may be operated by hand, via a wired or remote panel on-site, via teleoperation, or by any other means. When operated by hand, one or more axes on the robotic apparatus 1101 of the robotic automotive service system 1100 are physically actuated by an operator via hand or a hand or handheld power tool. When operated via wired communication, the robotic automotive service system 1100 may communicate and be controlled via a wired connection to the electrical panel 1103, a computer 1500, or other control device accessible by an operator. When controlled via wired connection, any appropriate communication protocol may be used, such as CANOpen, SPI, or I2C. When operated via wireless communication, the robotic automotive service system 1100 may include a wireless gateway and be able to communicate and be controlled via a wireless connection to a wireless gateway to the electrical panel 1103, a computer 1500, or other control device accessible by an operator. Such wireless communication may use Bluetooth standard IEEE 802.15.1, WiFi standard IEEE 802.11, or other appropriate wireless protocols.

The robotic automotive service system 1100 formed in accordance with the present invention may further include and utilize a lift, a lift system 5000 or a lift plate system 5100, a tire handling system 9000, a camera positioning system 5200, a balancing system 3000, an accelerometer 1240, 1250 or other sensor, a gantry balancing system 3200, a roller system 83300, a suspension support structure system 83400, a vision system 1300, a system dynamics modeling system 3600 and the wheel balancing methods and algorithms described herein, each of which will be described in greater detail in the forthcoming paragraphs, and each of which may also be used separately from and independently of the robotic automotive service system 1100 and the other components thereof.

Figure 128:
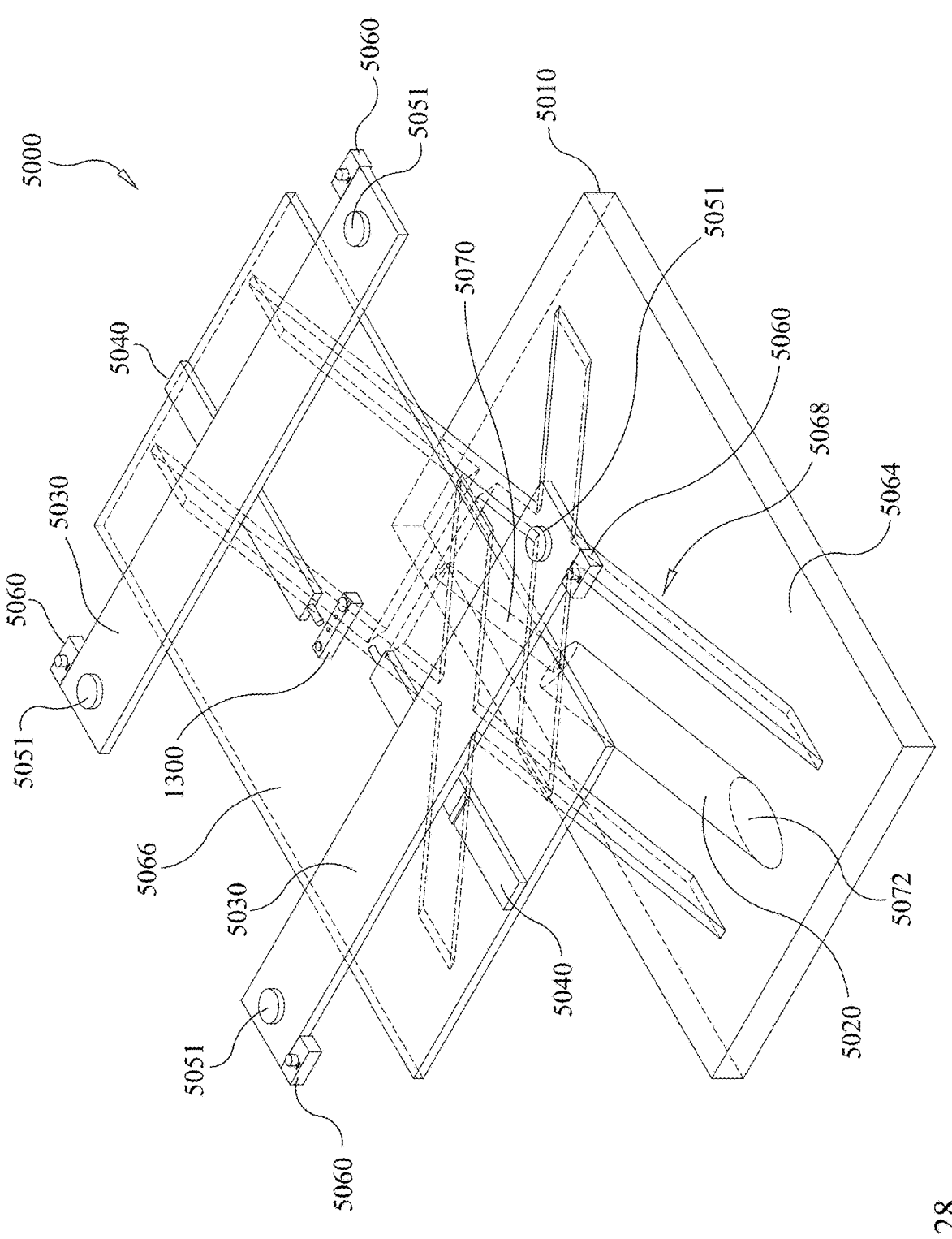

Making reference to FIG. 128 of the drawings, the lift system 5000, which is also referenced above as a lift 170, preferably comprises a lift structure 5010, a lift actuator 5020, lift arms 5030, arm actuators 5040, lift pads 5051, lift sensors 5060 and a vision system 1300. The lift structure includes a base 5064, which is preferably situated on the ground, an arm plate 5066 and a lifting mechanism 5068. The lifting mechanism 5068 is interposed between and mechanically coupled to the base 5064 and the arm plate 5066. The lifting mechanism 5068 includes a lift actuator 5020 that is mechanically coupled to a portion thereof. The lift actuator 5020, which is preferably formed as a linear actuator and is selectively moveable between at least a first position and a second position, the first position corresponding to a retracted position in which the rod 5070 of the lift actuator is retracted within a cylinder housing 5072 of the lift actuator, and the second position corresponding to an extended position in which the rod of the lift actuator is extended from the cylinder housing of the lift actuator. The lift actuator 5020 may be selectively moved from the first position to the second position to raise the arm plate 5066 outwardly relative to the base 5064. Similarly, the lift actuator 5020 may be selectively moved from the second position to the first position to lower the arm plate 5066 inwardly relative to the base 5064.

Preferably each lift arm 5030 is mechanically coupled to a respective arm actuator 5040. Each arm actuator 5040 is mounted to the arm plate 5066. The arm actuators 5040 are preferably linear actuators that are selectively moveable between at least a first position and a second position such that they can move the arm lift arms 5030 towards and away from each. The lift arms 5030 preferably have a sufficient range of movement that enables them to reach the lift points on a variety of vehicles 1600, such as a bounding box of 2.3 m by 6.1 m. The lift sensors 5060 and the lift pads 5051 are preferably mounted to the lift arms 5030. The lift sensors 5060 may be load cells 1230, distance sensors 1221 and/or proximity sensors 1211, which can detect the force of lifting, distance lifted, and trigger the limits of motion, respectively. In the case of lifting force, the lift sensors are load cells 1230 which are placed in-line with the lift arms 5030 and sense the force applied by the lift arms 5030. In an alternative embodiment, the load cells 1230 may be placed in line with the lift pads 5051 to sense the force applied by the lift pads 5051.

Preferably, the lift structure 5010 and lift pads 5051 are strong enough to lift a vehicle 1600. The lift pads 5051 may be formed of a material, such as urethane, that will not damage or scratch the vehicle when the lift pads 5051 come in contact with it. As mentioned above, while the lift actuator 5020 and the arm actuators 5040 are preferably linear actuators, such actuators may also be made of motors, ball screws, pneumatic cylinders, hydraulic cylinders, lead screws, rack and pinions, pulley drives, gear drives or any other suitable actuator technology.

In a preferred embodiment, the lift actuator 5020 and arm actuators 5040 contain sensors for detecting the actuation force, actuation distance, and limits of actuation such as load cells 1230, distance sensors 1221, and proximity sensors 1211, respectively. Load cells 1230 may be placed in line with the actuator arms 5030 or lift pads 5051. Distance sensors 1221 may be placed on the base 5064 of the lift structure 5010 and sense the distance from that point to the bottom of the lift arms 5030 or vice versa. Proximity sensors 1211 may be placed at the limits of motion on the lift actuator 5020. Preferably, the vision system 1300 can see the underside of the vehicle 1600 and detect viable lift points thereon. The vision system 1300 preferably has a suitable range of focus to see the underside of the vehicle 1600 when not lifted and when lifted, such as from 25 mm to 230 mm. The processor 1530 is capable of reading and interpreting the data acquired by the lift sensors 5060 and vision system 1300.

In operation, the lift system 5000 can scan the underside of the vehicle 1600 before lifting. The vision system 1300 can be used to find suitable lift points on the vehicle. Suitable lift points can be chosen based on manufacturer-recommended lift points, structural analysis based on the vision system 1300 input and processor calculations, machine learning, teaching by the operator, manual positioning by the operator, or by any other means. Once suitable lift points are chosen, the arm actuators 5040 can actuate to position the lift arms 5030 such that the lift pads 5051 are directly underneath the lift points. Once the lift pads 5051 are appropriately positioned, the lift actuator 5020 can actuate to apply force to the lift points via the lift pads 5051 and begin lifting the vehicle 1600.

During lifting, the lift sensors 5060 can monitor the lift system 5000 for force, speed, and distance to ensure that the lifting process is safe. This includes keeping the load below the safe limit, the distance between the safe movement limits, and the speed and acceleration within safe limits of the lift system 5000. These limits can be set by the operator, shop, or manufacturer, and can be set absolutely or based on the vehicle 1600 being lifted.

Preferably, the lift system 5000 is fully autonomous; however, the lift system 5000 may also be operated manually or semi-autonomously. For example, the lift system 5000 may be operated by hand, via a wired or remote panel on-site, via teleoperation or by any other means.

Figure 129:
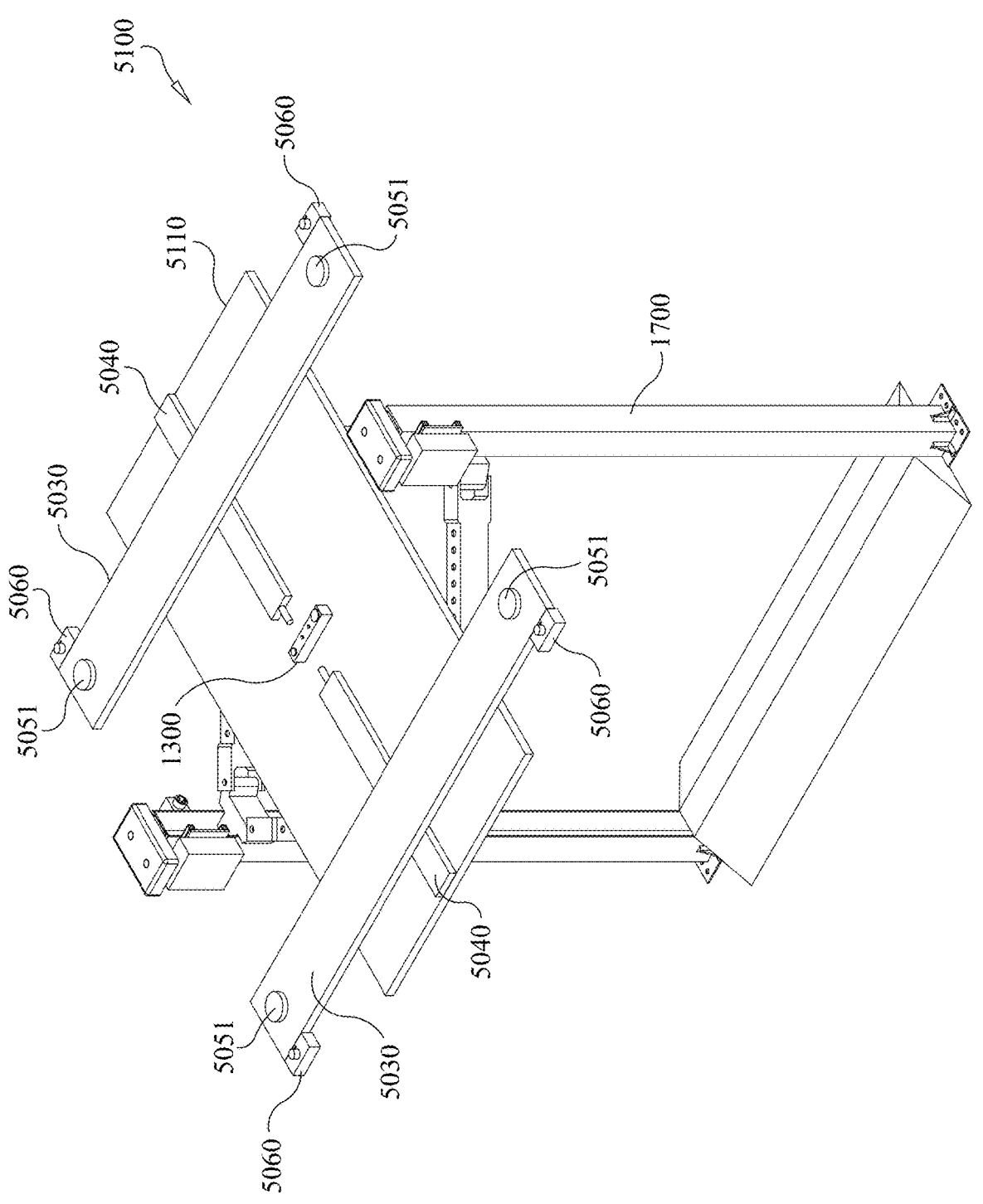

Making reference to FIG. 129 of the drawings, a lift plate system 5100 may include many of the components of the lift system 5000 described above, which may be adapted to be used with an existing, non-autonomous, commercial lift 1700. More specifically, the lift plate system 5100 preferably comprises a commercial lift 1700, a control adapter 5120, lift arms 5030, arm actuators 5040, lift pads 5051, lift sensors 5060, a vision system 1300 and a processor 1530.

The lift plate structure 5110 is preferably formed as a rigid metal plate that spans the lift points of a commercial lift 1700. The lift plate structure 5110 is ideally mounted rigidly and securely to an appropriate location on the commercial lift 1700. In the case of a commercial lift 1700 with a wide top structure such as a scissor lift, the lift plate structure 5110 may be mounted directly onto the wide top structure.

Preferably each lift arm 5030 is mechanically coupled to a respective arm actuator 5040. Each arm actuator 5040 is mounted to lift plate structure 5110. The arm actuators 5040 are preferably formed as electric motors that are connected to guided ball screws; however, the arm actuators 5040 may alternatively be formed as pneumatic cylinders, hydraulic cylinders, lead screws, rack and pinions, pulley drives, gear drives or any other suitable actuator technology. Preferably, arm actuators 5040 are selectively moveable between at least a first position and a second position such that they can move the arm lift arms 5030 towards and away from each. Generally, the lift arms 5030 are mounted onto the lift plate structure 5110 via the arm actuators 5040 such that the actuating the arm actuators 5040 allow the lift arms 5030 to traverse the width and length of the lift plate structure 5110 for positioning the lift pads 5051 underneath the vehicle 1600. The lift arms 5030 preferably have a sufficient range of movement that enables them to reach the lift points on a variety of vehicles 1600, such as a bounding box of 2.3 m by 6.1 m. The lift sensors 5060 and the lift pads 5051 are preferably mounted to the lift arms 5030. The lift sensors 5060 may be load cells 1230, distance sensors 1221 and/or proximity sensors 1211, which can detect the force of lifting, distance lifted, and trigger the limits of motion, respectively.

In the case of lifting force, the lift sensors are load cells 1230 which are placed in-line with the lift arms 5030 and sense the force applied by the lift arms 5030. In an alternative embodiment, the load cells 1230 may be placed in line with the lift pads 5051 to sense the force applied by the lift pads 5051.

Preferably, the lift plate structure 5110 and lift pads 5051 are strong enough to lift a vehicle 1600, which may weigh up to 15,000 lbs. The lift pads 5051 may be formed of a material, such as urethane, that will not damage or scratch the vehicle when the lift pads 5051 come in contact with it.

Preferably, the arm actuators 5040 contain sensors for detecting the actuation force, actuation distance, and limits of actuation such as load cells 1230, distance sensors 1221, and proximity sensors 1211 respectively. Load cells 1230 may be placed in line with the actuator arms 5030 or lift pads 5051. Preferably, the vision system 1300 can see the underside of the vehicle 1600 and detect viable lift points thereon.

The vision system 1300 preferably has a suitable range of focus to see the underside of the vehicle 1600 when not lifted and when lifted, such as from 25 mm to 230 mm. The processor 1530 is capable of reading and interpreting the data acquired by the lift sensors 5060 and vision system 1300.

With suitable commercial lifts 1700, the control adapter 5120 is designed to interface with the controls of the commercial lift 1700 to control the actuation of the commercial lift 1700. Due to the variety in commercial lift controls, the control adapter 5120 may not always be compatible with the commercial lift 1700, in which case the native actuation controls for the commercial lift 1700 must be used.

Once the lift pads 5051 are appropriately positioned, the control adapter 5120 can command the commercial lift 1700 to actuate, applying force to the lift points via the lift pads 5051 and begin lifting the vehicle 1600. Alternatively, where the control adapter 5120 is not compatible with the commercial lift 1700, manual control of the lift actuation must be performed.

In operation, the lift system 5100 can scan the underside of the vehicle 1600 before lifting. The vision system 1300 can be used to find suitable lift points on the vehicle. Suitable lift points can be chosen based on manufacturer-recommended lift points, structural analysis based on the vision system 1300 input and processor calculations, machine learning, teaching by the operator, manual positioning by the operator, or by any other means. Once suitable lift points are chosen, the arm actuators 5040 can actuate to position the lift arms 5030 such that the lift pads 5051 are directly underneath the lift points.

During lifting, lift sensors 5060, which may include load cells 1230, distance sensors 1221, and proximity sensors 1211 can monitor the autonomous lift plate 5100 for force, speed, and distance to ensure that the lifting process is safe. This includes keeping the load below the safe limit, the distance between the safe movement limits, and the speed and acceleration within safe limits of the lift system 5100. These limits can be set by the operator, shop, or manufacturer, and can be set absolutely or based on the vehicle 1600 being lifted.

Preferably, the lift system 5100 is fully autonomous; however, the lift system 5100 may also be operated manually by the operator. In this case, the benefits of the autonomous lift plate 5100 over traditional systems are that it is more ergonomic, faster to position the lift pads 5051, and safer, as the operator isn't required to be underneath the vehicle 1600 at any time.

Now making reference to FIG. 141 of the drawings, in one form, the tire handling system 9000 preferably comprises a tire handling stand 9010, a mounting flange 9015, one or more tire handling arms 9030 and one or more tire handling grippers 9020. More specifically, the tire handling stand 9010 includes a proximal end 9011 and an oppositely disposed distal end 9013. A mounting flange 9015 is preferably rotatably mounted to the distal end 9013 of the tire handling stand 9010. The one or more tire handling arms 9030 are mounted to the mounting flange 9015 and extend outwardly therefrom. Each of the tire handling grippers 9020 is mounted to a free end 9017 of a respective one of the tire handling arms 9030 such that they move with the tire handling arm 9030 as the mounting flange 9015 is rotated. The tire handling system 9000 may further comprise a rotational drive, such as a motor 1400 (not shown), which may be mechanically coupled to the mounting flange 9015 to drive the rotatably drive the mounting flange 9015 and the arms 9030 and grippers 9020 connected thereto. The motor 1400 may be mounted to the stand 9010. The tire handling arm 9030 may also be translated linearly by a linear drive, such as a linear actuator 1350 (not shown), which is mounted on the tire stand 9010. For example, the linear actuator may be interposed between the handling arm 9030 and the mounting flange 9015.

The actuators of the tire handling arm 9030 and the motor 1400 may be actuated and controlled so that tire handling grippers 9020 may present a tire to the robotic apparatus 1101 in a way that allows for transfer of the tire from the tire handling system 9000 to robotic apparatus 1101. In a preferred form, both the robotic apparatus 1101 and tire handling system 9000 communicate with and are powered by the electrical panel 1103 via connectors 1104. The computer 1500 or PLC 1540 is able to compute the relative positions of the robotic apparatus 1101 and tire handling system 9000 using the known geometry of the systems and sensor feedback such as from distance sensors 1221 mounted on the robotic apparatus 1101. The tire handling arms 9030 and the motor 1400 may be actuated as previously described to present the tire 1611 to the center point between the various gripper systems 2200 on the robotic apparatus 1101 such that the gripper systems 2200 may be actuated to grip the tire 1611 and remove it from the tire handling gripper 9020. The reverse is true—the tire handling arms 9030 may be actuated as previously described to present an empty tire handling gripper 9020 to the robotic apparatus 1101 such that the gripper systems 2200 of the robotic apparatus 1101 are able to be actuated to release a tire 1611 while aligned with the empty tire handling gripper 9020 such that the tire 1611 is captured or constrained by the tire handling gripper 9020. After either unloading or loading a tire 1611 from the tire handling system 9000 onto the robotic apparatus 1101, the tire handling arms 9030 may be actuated such that they do not obstruct normal operation of the robotic apparatus 1101.

The tire handling system 9000 is preferably designed to interface with the robotic automotive service system 1100 or the robotic apparatus 1101 thereof. In the preferred embodiment, the tire handling system 9000 is mounted to the robotic apparatus 1101. In this regard, the stand 9010 of the tire handling system 9000 is mounted onto the frame 1102 of the robotic apparatus 1101 via welding or fasteners, and is therefore constrained such that when the robotic apparatus 1101 and thus, frame 1102 moves, the tire handling stand 9010 moves with it. In an alternative embodiment of the tire handling system 9000, the tire handling stand 9010 is designed to be mounted to the floor. In yet another alternative embodiment of the tire handling system 9000, the tire handling stand 9010 is designed to be mounted overhead of the robotic apparatus 1101 on the frame 1102.

In one form, the tire handling grippers 9020 are round and designed to grip the tire on the outside diameter at one or more locations. One or more of the gripper systems 2200 also be mounted to the mounting flange 9015 or tire handling arms 9030 in the manner describe above with respect to the operation of the gripper systems 2200. In other forms, the tire handling grippers 9020 may grip the tire on the inside diameter using a gripper system 82200 or similar which actuates radially outward from the center point of the tire 1611 such that when the tire handling grippers 9020 contact the inside diameter of the tire 1611 they produce tension that keeps the tire 1611 constrained.

In alternative embodiments, the tire handling grippers 9020 grip the face of the tire, or at any other point sufficient to grip the tire using a gripper system 82200 or similar, as previously described. In alternative embodiments, the tire handling grippers 9020 may be elliptical, hook shaped, flat, or any other shape or build for adequately handling a tire. In other alternate embodiments, the tire handling arm 9030 may be a single bar, a robotic arm, a series of linear actuators, or any other component or assembly sufficient to mount and/or manipulate the tire handling grippers 9020.

An alternate embodiment of the tire handling system 9000, in which the tire handling arm 9030 is a single bar mounted on a tire handling stand 9010 designed to be mounted upright on the frame of the robotic apparatus 1101, is shown in FIG. 149 of the drawings. As can be seen in FIG. 149 of the drawings, the tire 1611 is suspended on one tire handling gripper 9020. A second, unencumbered tire handling gripper 9020 is ready to accept a new or old tire from the robotic apparatus 1101. In an alternate embodiment of the invention shown in FIG. 149, the tire handling stand 9010 may be mounted overhead of the robotic apparatus 1101 from the ceiling, an enclosure, or an external mounting frame. In yet another alternate embodiment of the invention shown in FIG. 149, the tire handling stand 9010 may be free-standing or bolted into the floor or other stable surface in a location accessible by the robotic apparatus 1101.

Figure 88:
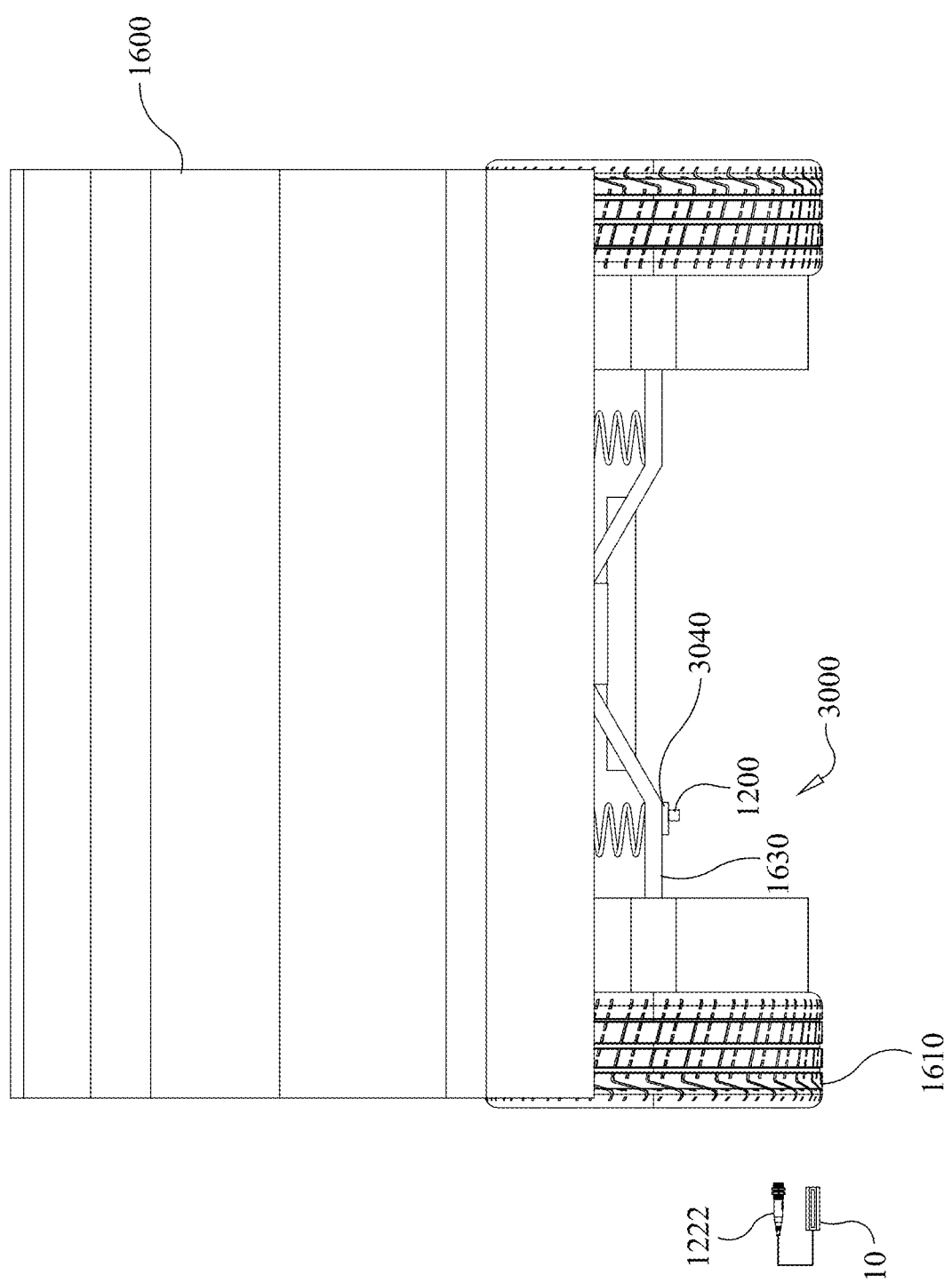
FIG. 88 is a rear elevational view of a balancing system formed in accordance with the present disclosure.

Now making reference to FIG. 88 of the drawings, a balancing system 3000 formed in accordance with one aspect of the present invention preferably comprises at least one sensor 1200, a sensor mount 3040, a data acquisition device (DAQ) 1510 and a position sensor 1222. Embedded circuitry, a computer, an oscilloscope, or any device sufficient to capture a signal from the sensor 1200 may also be used instead of the DAQ 1510.

The position sensor 1222 may be an encoder, laser tachometer or other sensor capable of sensing the angular position of an object either directly or indirectly. Preferably, as shown in FIG. 88 of the drawings, the position sensor 1222 tracks the angular position of the TWA 1610 as it rotates about its axis of rotation. The angular position is determined by assigning "0-degree angle" to a datum line on the TWA 1610 (not a physical line, mathematical construct only) and then measuring the angular position of that datum line relative to a fixed line, such as a horizontal line.

Figure 89:
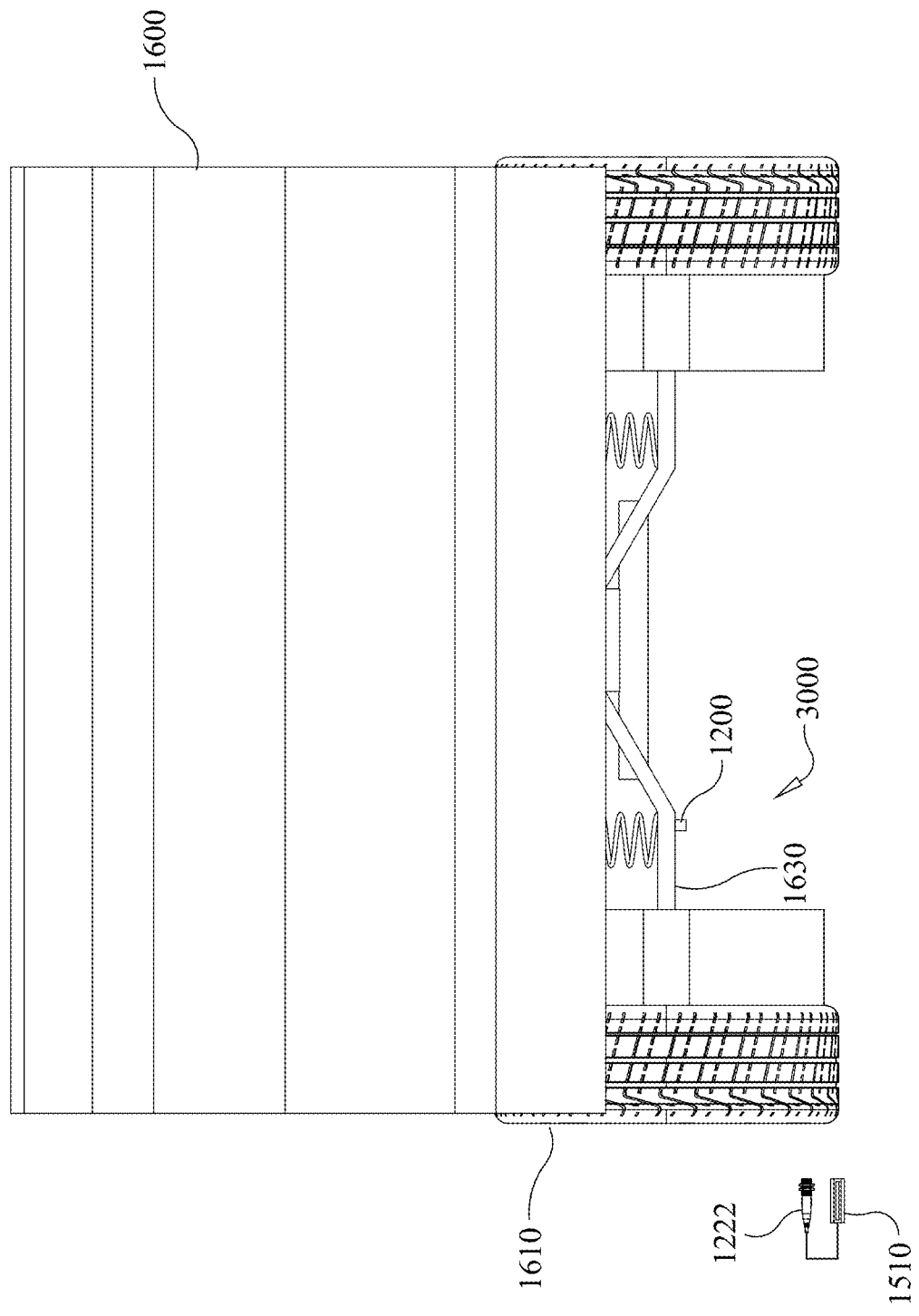
FIG. 89 is a rear elevational view of another form of the balancing system formed in accordance with the present disclosure.

The sensor 1200 may be installed on a sensor mount 3040, which is then installed on the vehicle 1600. Alternatively, as shown in FIG. 89 of the drawings, the sensor 1200 may be installed directly on the vehicle 1600 without the addition of a sensor mount 3040. For example, the sensor 1200 may be formed as an integrated assembly of sensor 1200 and sensor mount 3040. The sensor 1200 may also consist of a sensor mount 3040 which contains sensors or sensor circuitry to the effect of integrating a sensor 1200 and sensor mount 3040 into a single component. Furthermore, the sensor 1200 and sensor mount 3040 may be manufactured as a single unit.

Generally, the sensor 1200 is installed on the vehicle 1600 and connected to the DAQ 1510, which serves to acquire and log signals from the sensor 1200 during operation of the system. During operation, the TWA 1610 and associated rotational assembly, which includes any components on the vehicle 1600 which rotate as the TWA 1610 rotates, such as the vehicle rotor, wheel bearings, and hub assembly, is rotated. Imbalance manifests in the system in one or more modes: mass imbalance, non-concentricity imbalance, driveline imbalance, or another mode. The sensor 1200 detects such imbalance signals and transmit them to the DAQ 1510, from which post processing or further transmission of the data can occur.

FIGS. 88 and 89 of the drawings show an on-car balancing system. The balancing system 3000 formed in accordance with one aspect of the present invention is in the ability to detect imbalance while the TWA 1610 is on the vehicle 1600. Balancing the TWA 1610 alone using off-vehicle balancing systems compensates only for mass imbalance of the rotational components. Once the TWA 1610 is placed back on the vehicle 1600, other modes of imbalance (driveline, non-concentricity) can occur, resulting in additional imbalance in the system.

Figures 90, 91:
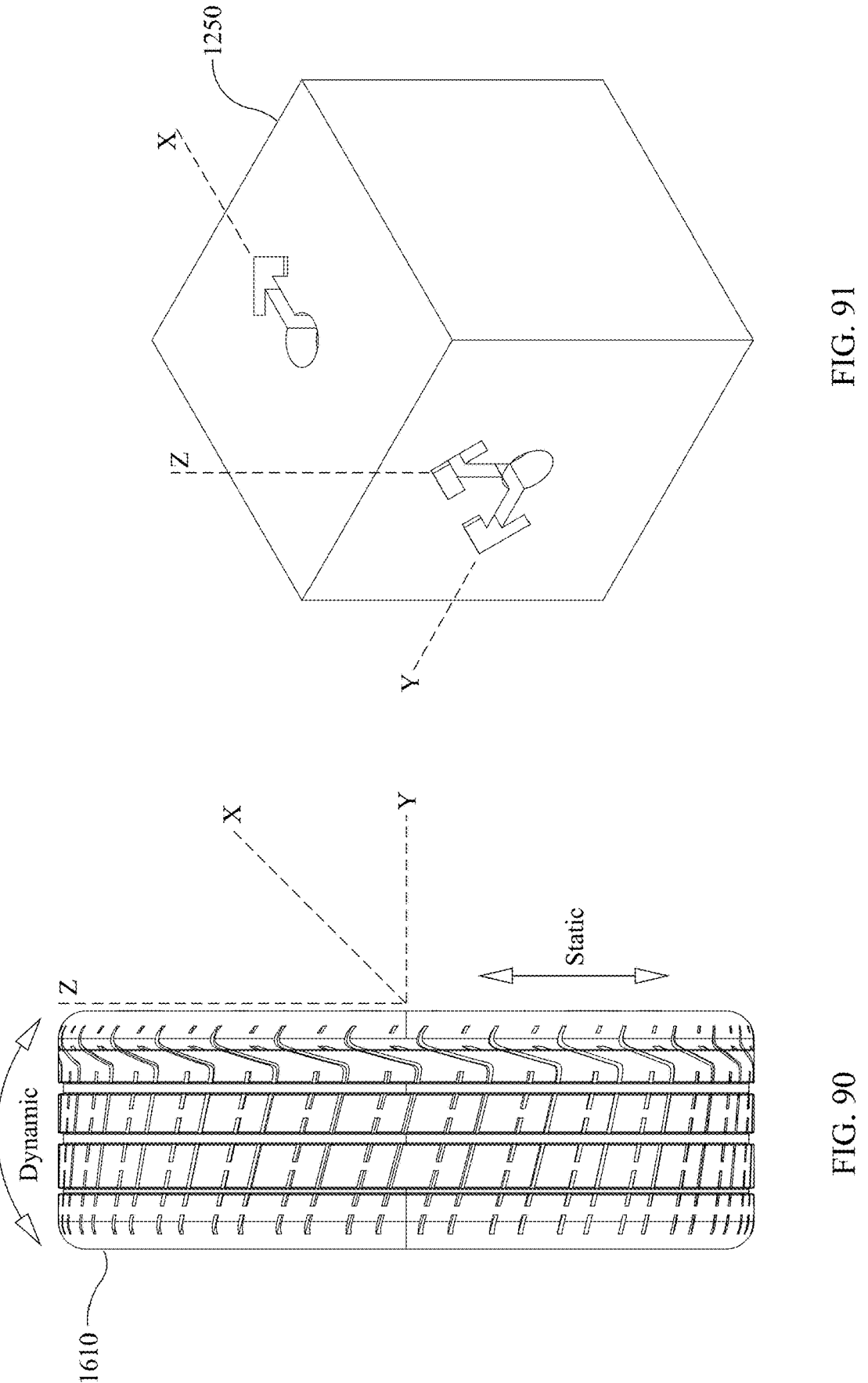
FIG. 90 is an illustration of the TWA, showing a set of principal axes and an imbalance thereof.
FIG. 91 is a top perspective view of a multi-axis accelerometer formed in accordance with the present disclosure.

FIG. 90 of the drawings illustrates a typical imbalance in the TWA 1610 with a set of principal axes shown. Imbalance in the X-Z plane perpendicular to the rotational axis of the TWA 1610 is often called "static imbalance" and results in "wheel hop" where the imbalance force attempts to lift the TWA 1610 off the surface of the road along the Z-Axis. Imbalance out-of-plane of the X-Z plane is often called "dynamic imbalance" and results in "wheel wobble", where the imbalance forces result in a moment reaction that attempts to twist the TWA 1610 about the X-axis. Preferably, the axes of sensitivity of a given sensor 1200 are aligned in the direction of static and dynamic imbalance, which generally results in a larger imbalance signal which can aid in the mitigation of the imbalance.

Preferably, the balancing system 3000 is fully autonomous; however, the balancing system 3000 may also be operated manually or semi-autonomously. For example, the balancing system 3000 may be operated by hand, via a wired or remote panel on-site, via teleoperation or by any other means.

The balancing system 3000 may be a component of the robotic automotive service system 1100 formed in accordance with the present invention, as well as used independently therefrom. Furthermore, the balancing system 3000 may be utilized in combination with one or more of the other systems, apparatus and algorithms described herein, such as the roller system 83300 and robotic apparatus 1101.

A system dynamics modeling system 3600 formed in accordance with one aspect of the present invention is shown in FIG. 142 of the drawings. The system dynamics modeling system 3600 may be used with the balancing system 3000, as well as the other systems, apparatus and algorithms described herein, to aid in balancing. The system dynamics modeling system 3600 preferably comprises an impulse generator 3610, a distance sensor 1221, such as a linear variable differential transformer, a single-axis accelerometer 1240 and a load cell 1230. Other sensor packages may be used in the system dynamics modeling system 3600.

The impulse generator 3610 may be a solenoid, motor, hammer, pendulum or any other device which can generate a relatively fast impulse against the vehicle 1600. For example, the impulse generator 3610 may be formed as a solenoid which strikes the vehicle suspension 3630 for 100 milliseconds. The impulse generator 3610 is powered by the electrical panel 1103 and is preferably controlled by the PLC 1540.

In one form, the system dynamics modeling system 3600 is mounted to the suspension support structure system 83400, as shown in FIG. 142 of the drawings; however, the system dynamics modeling system 3600 may also be mounted components of the other systems and apparatus described herein. The single-axis accelerometer 1240 is preferably mounted such that it measures the acceleration of the suspension 1630 in response to the impulse produced by the impulse generator 3610. The distance sensor 1221 is mounted such that it measures the movement of the suspension 1630 in response to the impulse produced by the impulse generator 3610. Preferably, the distance sensor 1221 is mounted to either the floor or the suspension support structure system 83400 underneath the suspension 1630 and facing upwards such that the distance sensor 1221 measures the distance from the face of the distance sensor 1221 to the suspension 1630. In a preferred embodiment, the load cell 1230 is mounted such that it measures the load produced by the impulse generator 3610.

After the impulse is generated and measured, and the response of the vehicle 1600 is measured, an estimated or actual model of the dynamics of the vehicle 1600 may be produced. This model may be generated using modal analysis, system identification, machine learning, or any other suitable method. Preferably, the impulse response is used to generate the system model. In alternative embodiments, the step response, ramp response, other physics phenomenon, or a combination of several, may be used. The response data may be acquired by a sensor 1200, such as a multi-axis accelerometer 1250, load cell 1230, distance sensor 1221, or a combination of multiple sensors.

In an impulse response frequency model, a known force is applied for a known short time (as short as possible) to the system, and the response (usually displacement or acceleration) is detected and recorded. Frequency analysis of the response illustrates the parameters of the system. These parameters can be used in physics models such as the standard "2nd-order spring mass damper" model or in novel physics models. This method is similar for other response tests such as a step response (constant step input). Frequency response analysis is the method by which frequencies of the mechanical response of the system to the input (in this case impulse force) are plotted against the strength of that response.

Parameters of the system model can be varied and depend on the resolution required, complexity of the system, and many other factors. Furthermore, it is typical of system models to evolve as they are used and as new or more data is acquired. The preferred system parameters are a mass "m" of the suspension 1630 and other moving parts affected by imbalance, the spring constants "$k_{1-n}$" of any detectable springs in the system (manufactured springs or elastic members), and dampening coefficients "$c_{1-n}$" of any detectable dampeners in the system (manufactured dampeners, elastic, or viscous members).

Once the model of the dynamics of the vehicle 1600 is generated, the model may be used to aid in balancing a TWA 1610, for predictive maintenance on the vehicle 1600, or for any other purpose. A model represents a simplified version of the system dynamics. For exemplary purposes, the model may aid balancing by comparing the measured imbalance signal by the balancing system 3000 and comparing it to simulated results in the system model, the potential imbalance magnitude and location may be back calculated. The system dynamics modeling system 3600 may be used to generate a catalog of dynamic models of various vehicles 3600 for later use (such as in a look-up table). The system dynamics modeling system 3600 may also be used real-time on a larger system. Generally, the output mathematical model of the system identification process will be in either a state-space or transfer function representation, as exemplified below:

$$\text{Transfer Function: } \frac{Y(s)}{X(s)} = \frac{G(s)}{1 + G(s)H(s)}$$

$$\text{State–Space Model: } \dot{x} = Ax + Bu \quad y = Cx + Du$$

An exemplary frequency response curve generated by the system dynamics modeling system 3600 is shown in FIG. 144 of the drawings. Modal analysis can be used to determine the dynamics of the system for use with balancing systems or for any other purpose.

Preferably, the system dynamics modeling system 3600 is fully autonomous; however, the system dynamics modeling system 3600 may also be operated manually or semi-autonomously. For example, the system dynamics modeling system 3600 may be operated by hand, via a wired or remote panel on-site, via teleoperation or by any other means.

The system dynamics modeling system 3600 may be a component of the robotic automotive service system 1100 formed in accordance with the present invention, as well as used independently therefrom. Furthermore, the system dynamics modeling system 3600 may be utilized in combination with one or more of the other systems, apparatus and algorithms described herein, such as the roller system 83300 and robotic apparatus 1101.

Figure 111:
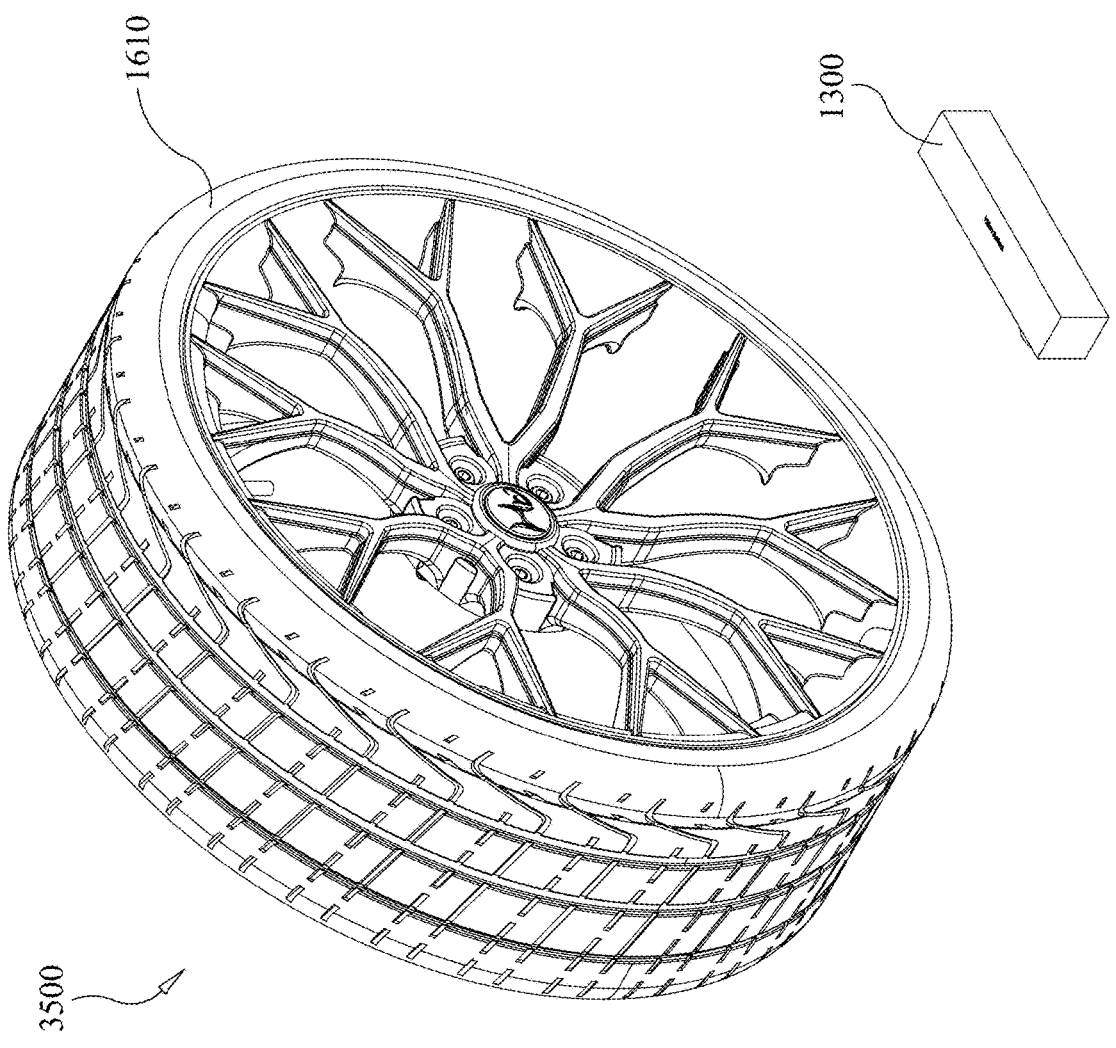
FIG. 111 is front perspective view of a vision-based balancing system formed in accordance with the present disclosure.

Now making reference to FIG. 111 of the drawings, a vision-based balancing system 3500 formed in accordance with one aspect of the present invention preferably comprises vision system 1300. The vision system 1300 includes one or more vision-base sensors, such as an analog camera, structured light, LiDAR, or an IR sensor or array.

The vision system 1300 is roughly aligned with the face of the TWA 1610. As the TWA 1610 is rotated, for example, by the roller system 83300 or the robotic apparatus 1101, the vision system 1300 detects any change in position or orientation of the center of rotation, which corresponds to an imbalance. In the preferred embodiment of the present invention, an analog camera is utilized and the change in position described above is detected by analyzing the camera feed to detect the centerline of the TWA 1610 relative to the vision system over time. Similarly, the change in orientation is detected by analyzing the camera feed to detect the inner and outer diameters of the TWA 1610 and calculating their shift over time, which, if the vision system 1300 is stationary would represent a shift in orientation, the value of which can be calculated using rudimentary geometry and trigonometric functions. Nevertheless, similar methods may be used when the other sensors referenced above are utilized by the vision system 1300. For example, a LiDAR sensor can be used to detect the center position as previously described. LiDAR can measure depth directly and thus detect a change in orientation by directly measuring the relative distance from the top to bottom and left to right edges of the tire, at which point rudimentary trigonometric functions may be used to calculate the orientation. A processor or controller calculates the magnitude and orientation of the imbalance detected by the vision system 1300 and determines the proper actions to be taken for balancing (e.g., the magnitude and locations of the wheel weights to be added).

Figure 112:
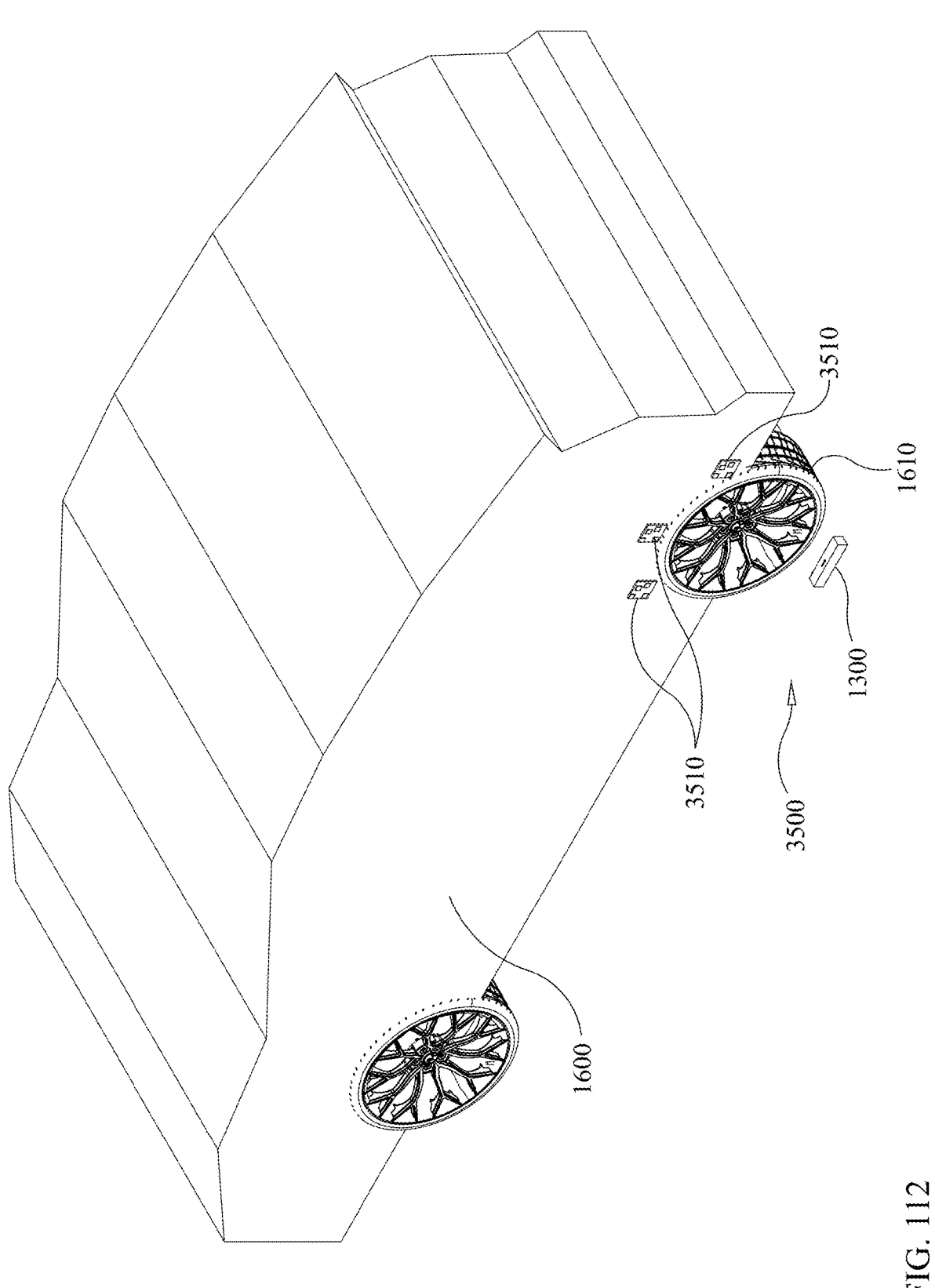
FIG. 112 is top perspective view of the vision-based balancing system formed in accordance with the present disclosure, showing fiducials on the vehicle.

The accuracy of the vision system 1300 can be supplemented using fiducials 3510 on the vehicle 1600 or TWA 1610, as shown in FIG. 112 of the drawings. The fiducials 3510 provide a known reference captured by the vision system 1300 and can be used to calculate distances, orientation, and other features within the image or point cloud captured by the vision system 1300 for use in calibration or measurement.

Figure 113:
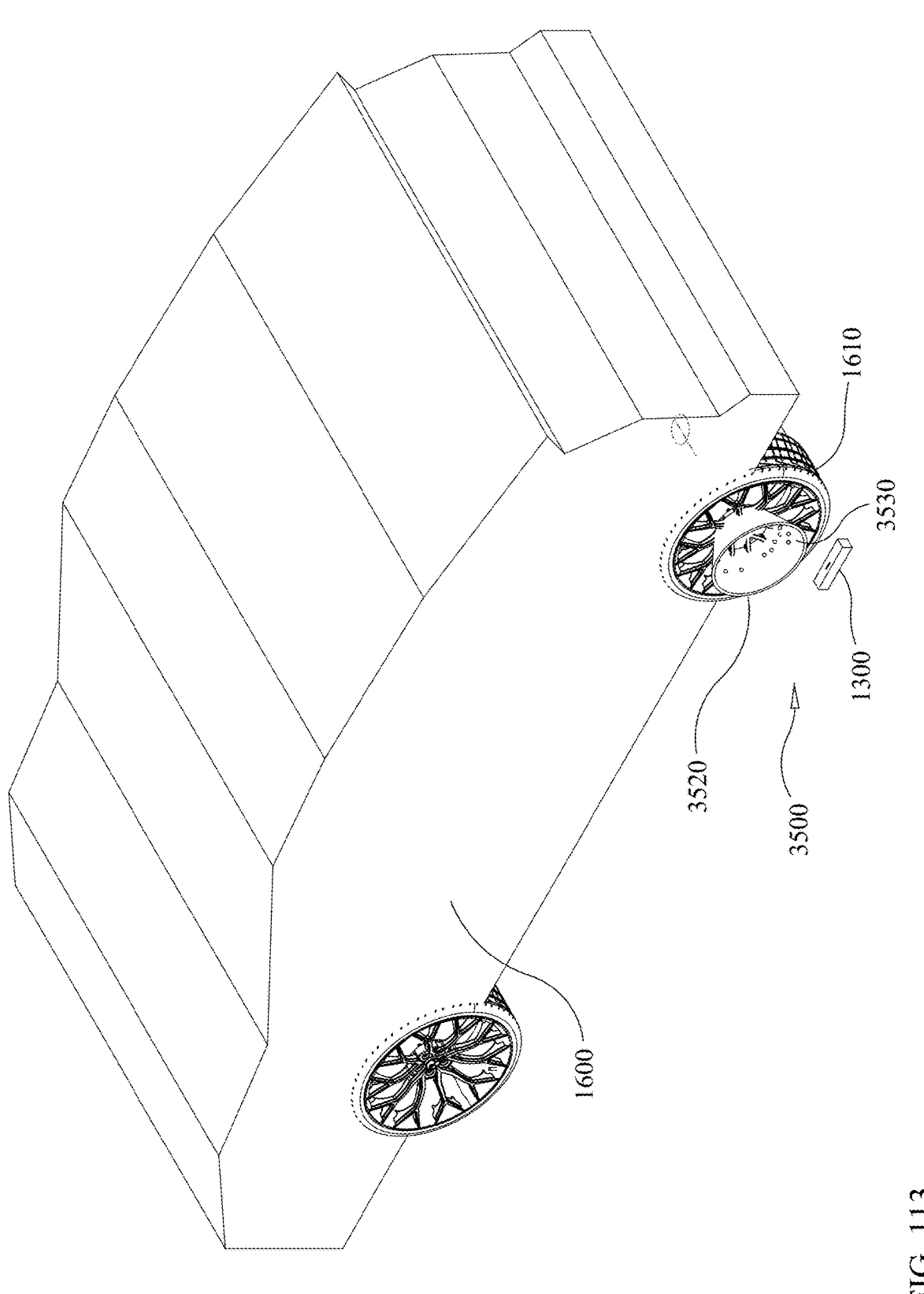
FIG. 113 is top perspective view of another form of the vision-based balancing system formed in accordance with the present disclosure.

An alternative embodiment of the vision-based balancing system 3500 formed in accordance with the present invention is shown in FIG. 113 of the drawings. As can be seen in FIG. 113 of the drawings, the vision-based balancing system 3500 may further include a hollow cone 3520 that is placed on or coupled to the TWA 1610 and beads 3530. The hollow cone 3520 preferably has a circular or triangular profile; however, the cone 3520 may also have other geometric profiles. The cone 3520 may further include ribs, divets or other features that allow for the beads 3530 to rest in during operation.

The beads 3530, which have a known mass, are placed in the cone 3520. As the TWA 1610 is spinning, the beads 3530 have a tendency, due to friction, normal force, inertia, and other principles of physics, to come to rest at the location in the cone 3520 which would tend to balance the TWA 1610. During operation (e.g., spinning) the vision system 1300 takes a scan of the distribution of the beads 3530 inside the cone 3520. Doing so allows for the calculation of the total mass distribution of the beads 3530 and thus, the calculation of the location and magnitude of the resultant mass necessary to balance the TWA 1610, which by definition also allows for the calculation of the location and magnitude of the initial imbalance in the TWA 1610.

More specifically, the vision system 1300 of the vision-based balancing system 3500 scans the cone 3520 and, the vision-based balancing system 3500, using a computer 1500 or processor 1530, differentiates empty parts of the cone 3520 to those with beads 3530 in it. The vision system can similarly detect the location of the beads 3530 in three dimensions. Again, the beads 3530 are all of a known mass. Using mathematical processes such as, for example, vectoral addition, the resultant mass and location of the beads 3530 may be calculated. This resultant mass is the representation of the mass and locations of all the beads 3530 at a single point in space. This resultant mass represents the magnitude of the mass and the inverse of the location of the resultant imbalance mass in the TWA 1610 and rotating assembly 1620.

Now making reference to FIG. 91 of the drawings, a sensor 1200 formed in accordance with one form of the present invention comprises a multi-axis accelerometer 1250 having three axes. The multi-axis accelerometer 1250 is preferably configured such that all three axes are distinct and orthogonal. Furthermore, the multi-axis accelerometer 1250 preferably has a sensitivity capable of detecting imbalance signals representative of a small mass imbalance (such as 3.5 grams), an effective range which allows it to detect imbalance signals representative of small to large mass imbalances (such as 3.5 grams to 225 grams), and a sampling frequency which allows it to detect signals which manifest relatively quickly (such as 9000 Hz). The multi-axis accelerometer 1250 may be electrically connected to the DAQ 1510 via a wired connection or wireless connection.

Figure 98:
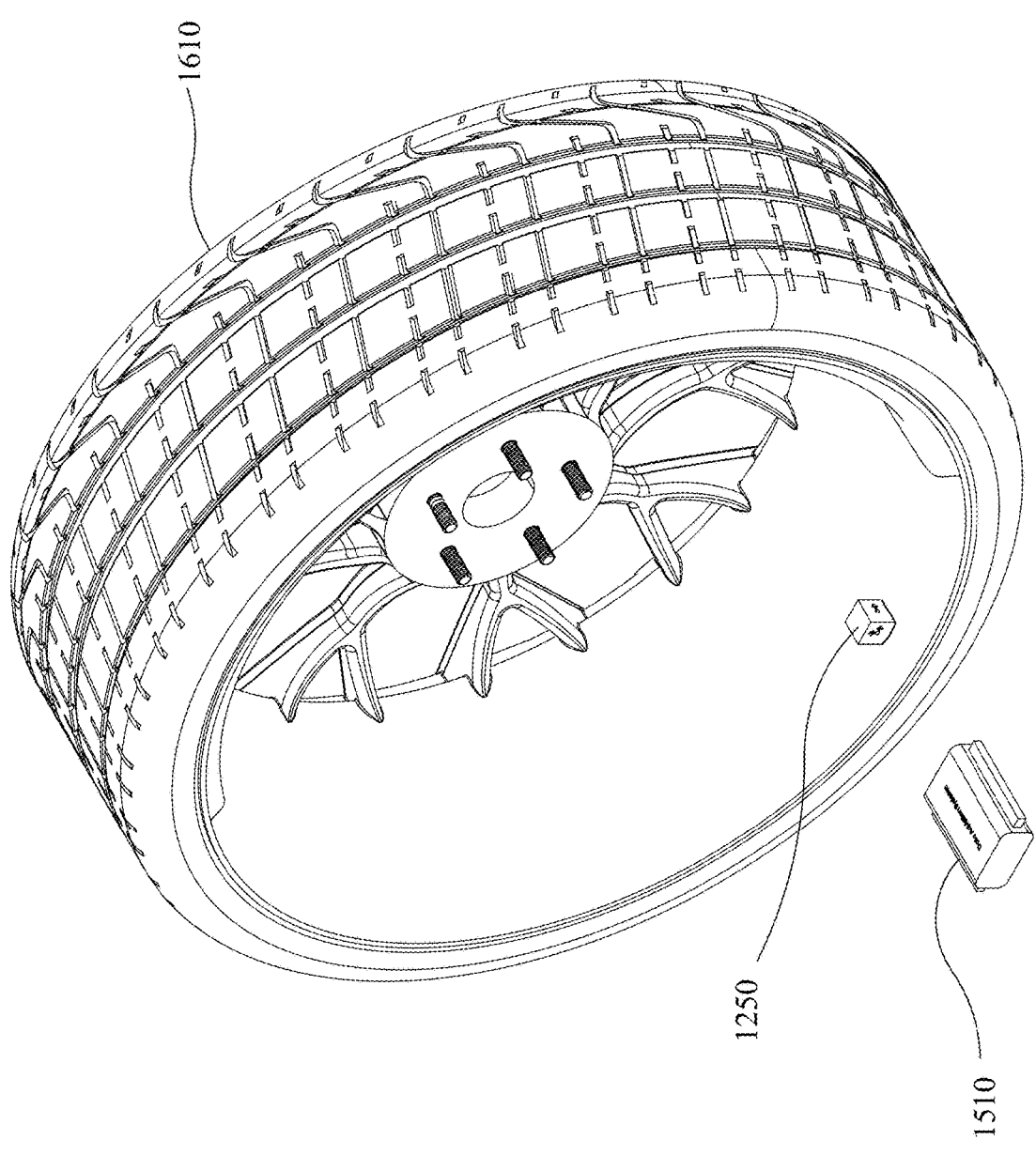
FIG. 98 is a top, rear perspective view of a TWA, showing the multi-axis accelerometer formed in accordance with the present disclosure mounted thereto and in communication with a DAQ.

As can be seen in FIG. 98 of the drawings, the sensor 1200 comprising the multi-axis accelerometer 1250 may be mounted directly on the TWA 1610 of the vehicle with by any sufficiently strong mounting means, such as magnets or adhesive. As shown in FIG. 98 of the drawings, where the multi-axis accelerometer 1250 is mounted directly on the TWA 1610, the preferred orientation of the multi-axis accelerometer 1250 is such that its principle axes are aligned with the principle axes of the TWA 1610. In another form, the axes of the multi-axis accelerometer 1250 may be aligned with the axes of imbalance in the TWA 1610, as shown in FIG. 54 of the drawings. As the TWA 1610 is rotated, any generated imbalance signals would be detected by the multi-axis accelerometer 1250 in greater strength when these axes are aligned.

Figure 95:
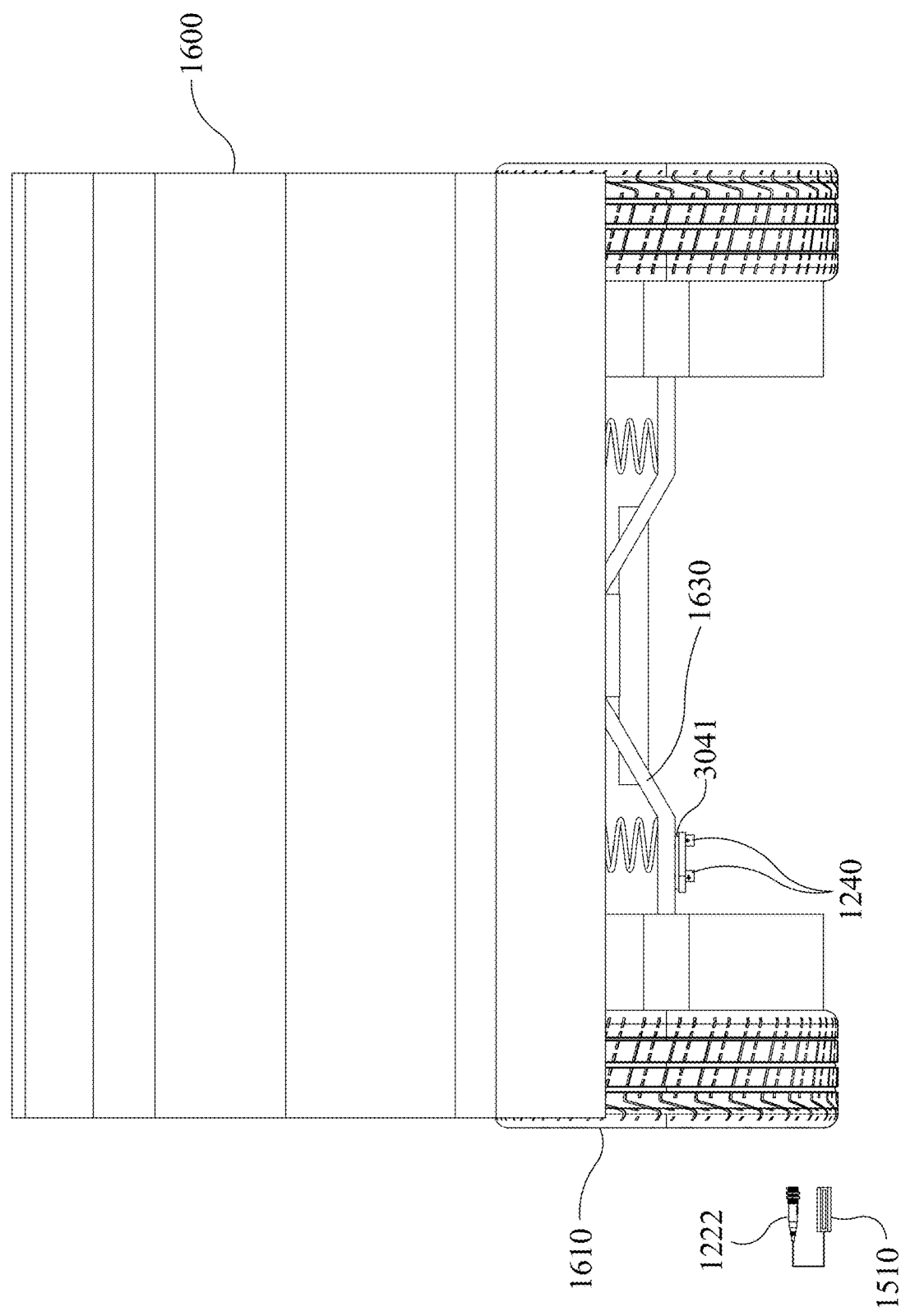
FIG. 95 is a rear elevational view of the balancing system formed in accordance with the present disclosure, showing single-axis accelerometers and a sensor mount formed in accordance with the present disclosure attached to a vehicle.

In another form of the present invention, the sensor 1200 may comprise one or more single-axis accelerometers 1240, but preferably comprises at least two single-axis accelerometers 1240. An exemplary sensor 1200 that comprises three single-axis accelerometers is shown in FIG. 140 of the drawings. More specifically, as can be seen in FIG. 140 of the drawings, which shows a preferred orientation for the sensor mount 3040 and single-axis accelerometers 1240, the three single-axis accelerometers 1240 are oriented orthogonal to each other on the sensor mount 3040 and the sensor mount 3040 is oriented such that one single-axis accelerometer's 1240 axis is parallel with the rotational axis of the TWA 1610 and one single-axis accelerometer's 1240 axis is parallel to the plane of the wall of the TWA 1610 and in the direction, most closely aligned with gravitational acceleration. The third single-axis accelerometer's 1240 axis is aligned orthogonal to the previous two axes. FIG. 95 of the drawings shows the sensor 1200 with three single-axis accelerometers described above mounted to the suspension 1630 of a vehicle 1600 via a sensor mount 3040 having magnets 3041 attached thereto (due to the orientation of the sensor 1200 and sensor mount 3040 on the suspension 1630, one of the three single-axis accelerometers is hidden from view).

Figures 96, 97:
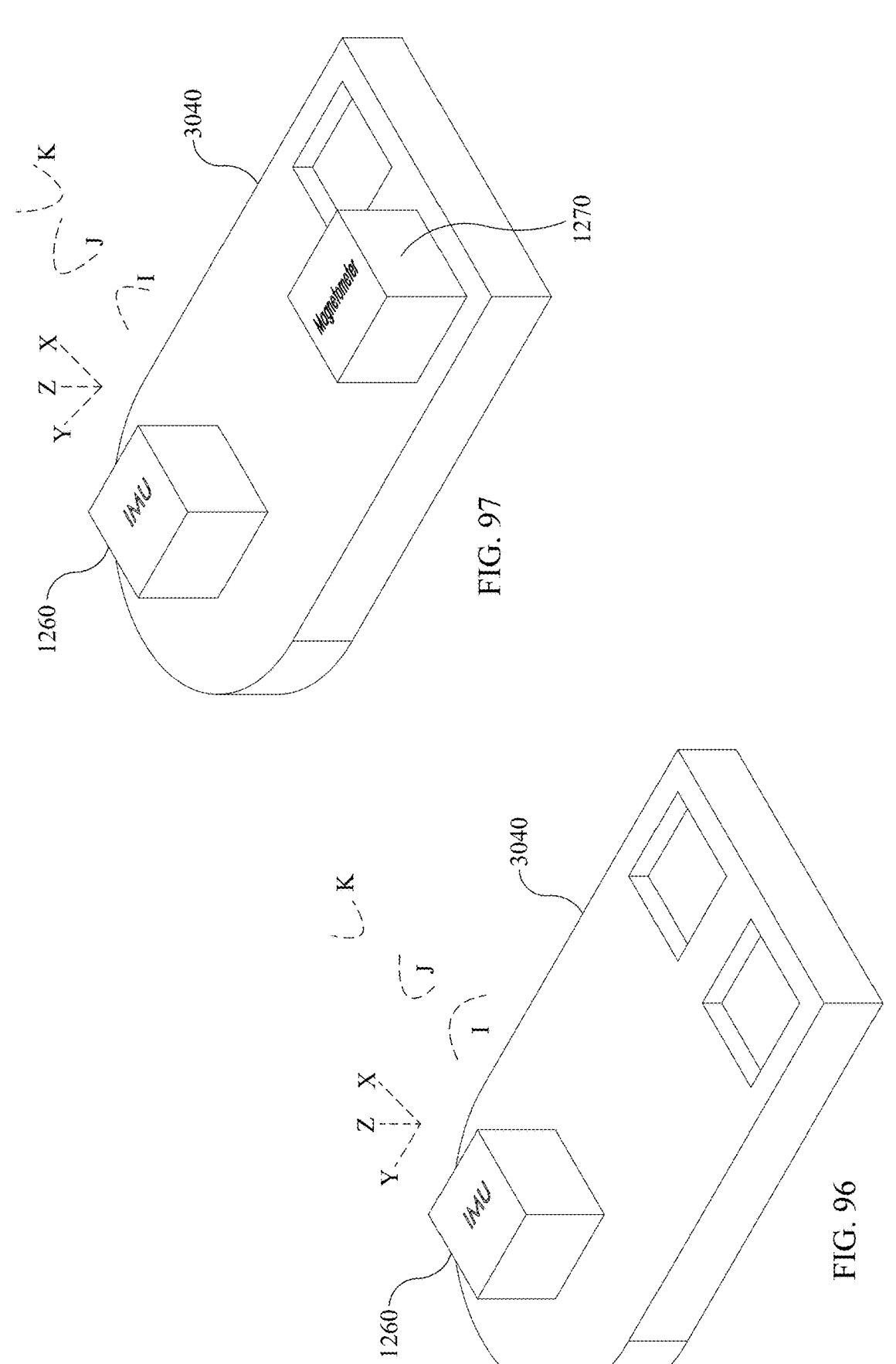
FIG. 96 is a top perspective view of another form of a sensor mount formed in accordance with the present disclosure, showing an IMU thereon.
FIG. 97 is a top perspective view of the sensor mount illustrated in FIG. 96, showing an IMU and a magnetometer thereon.

As shown in FIG. 96 of the drawings, the sensor 1200 may further comprise an inertial measurement unit (IMU) 1260. The IMU contains multiple linear accelerometers and a gyroscope capable of measuring changes in orientation via angular acceleration. Accordingly, the IMU 1260 may replace or supplement other accelerometer(s), such as the single-axis accelerometers 1240 and the axis accelerometer 1250, and a magnetometer 1270 on the sensor 1200. For example, as shown in FIG. 96 of the drawings, the accelerometers 1240, 1250 may be replaced with the inertial measurement unit IMU 1260. The IMU 1260 aids in the orienting of the sensor mount 3040 or sensor 1200. The IMU 1260 gyroscope may be used to identify or aid in the orientation of the sensor mount 3040 or sensor 1200. The IMU 1260 can also be used to quantify and compensate mathematically for changes in the orientation of the sensor mount 3040 or sensor 1200 during operation by detecting angular velocity associated with a change in orientation.

As shown in FIG. 97 of the drawings, the sensor 1200 may further comprise a magnetometer 1270. The magnetometer 1270 aids in the orienting of the sensor mount 3040 and/or the sensor 1200. The magnetometer 1270 can also be used to quantify and compensate mathematically for changes in the orientation of the sensor mount 3040 or sensors 1200 during operation by detecting changes in magnetometer 1270 orientation associated with a change in orientation of the sensor mount 3040. The magnetometer 1270 axis is affected by magnetic fields (i.e., magnetic north or any interfering fields strong-enough to deflect it). By aligning two readings, the magnetometer 1270 axis orientation with the magnetometer 1270 parallel to one axis of the TWA 1610, and the magnetometer 1270 axis orientation with the sensor mount 3040 installed, the sensor 1200 axes may be aligned with the axes of the TWA 1610 for a preferred installation. The magnetometer 1270 may used in combination with one or more accelerometers 1240, 1250 and/or IMUs 1260 on the sensor 1200.

Figure 92:
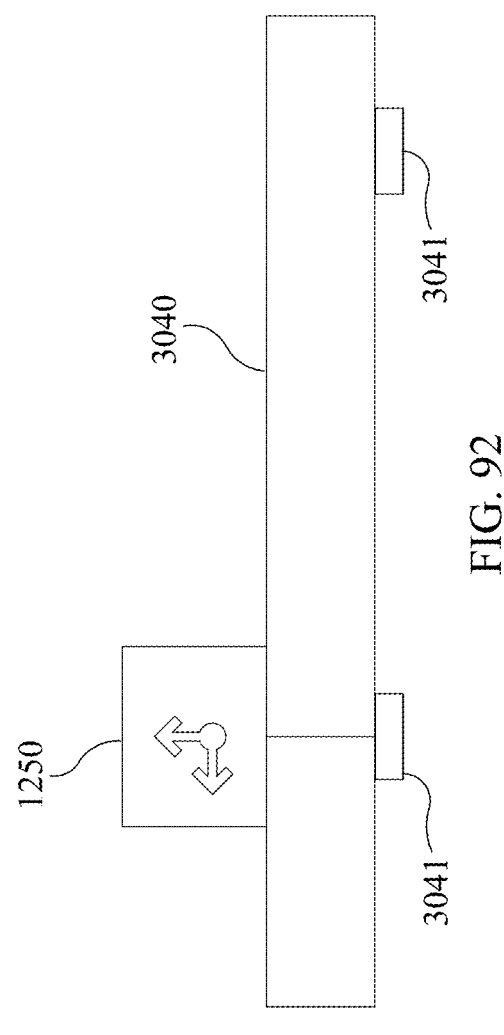
FIG. 92 is a top plan view of a sensor mount formed in accordance with the present disclosure.
Figure 94:
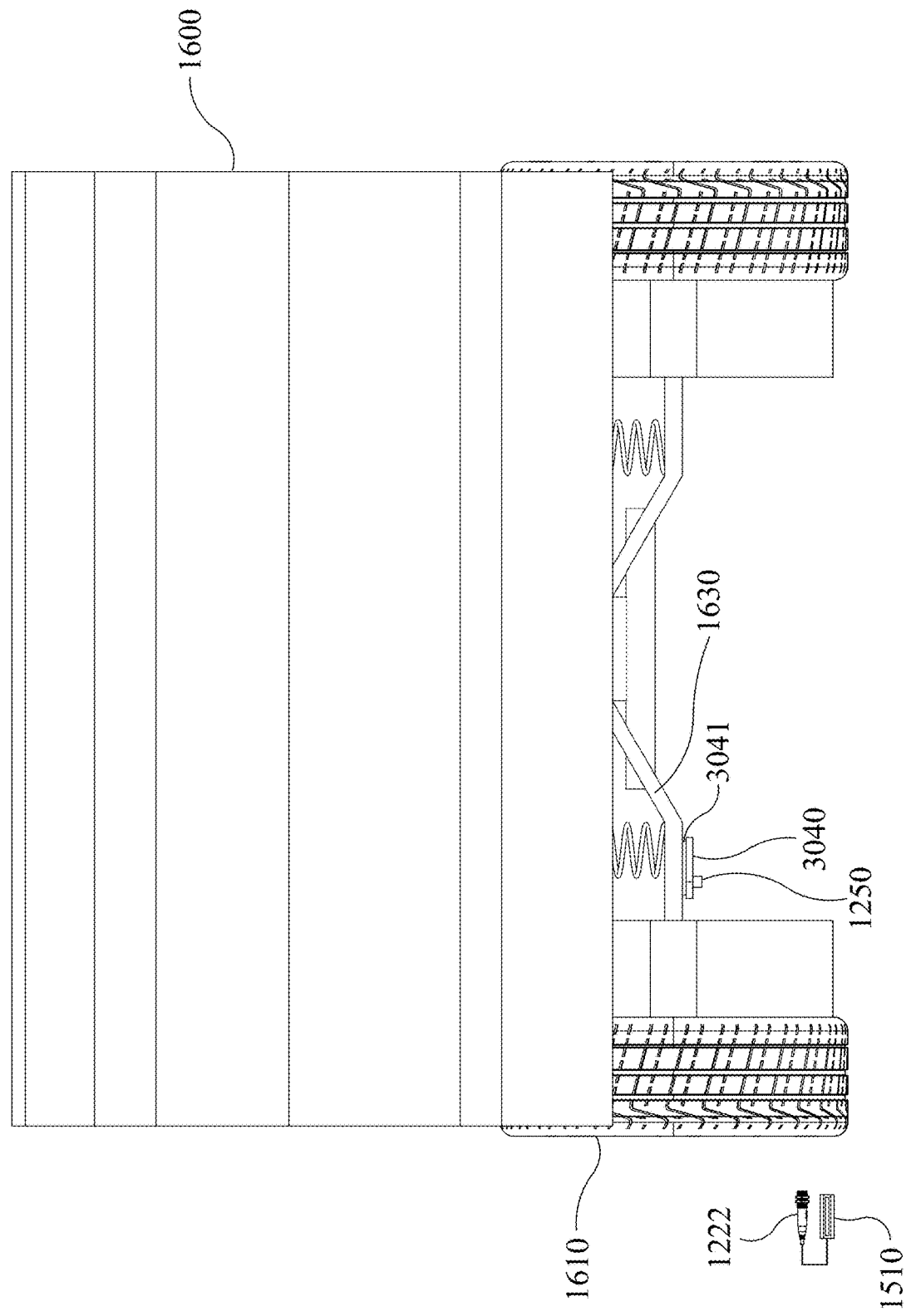
FIG. 94 is a rear elevational view of the balancing system formed in accordance with the present disclosure, showing the multi-axis accelerometer and sensor mount formed in accordance with the present disclosure attached to a vehicle.

As can be seen in FIG. 92 of the drawings, the sensor 1200 may further comprise a sensor mount 3040 onto which the single-axis accelerometer(s) 1240, the multi-axis accelerometer(s) 1250, the IMU 1260 and or the magnetometer 1270 may be affixed. The sensor mount 3040 includes at least one magnet 3041 which enables it to be affixed to magnetic components of a vehicle 1600, such as the suspension 1630, as shown in FIG. 54 of the drawings. Alternatively, or in combination, the sensor mount 3040 may be mounted to a vehicle 1600, a component of the vehicle or another structure using adhesive, straps, ties, electromagnets, screws, pins, clamps, clips, or other means.

Figure 93:
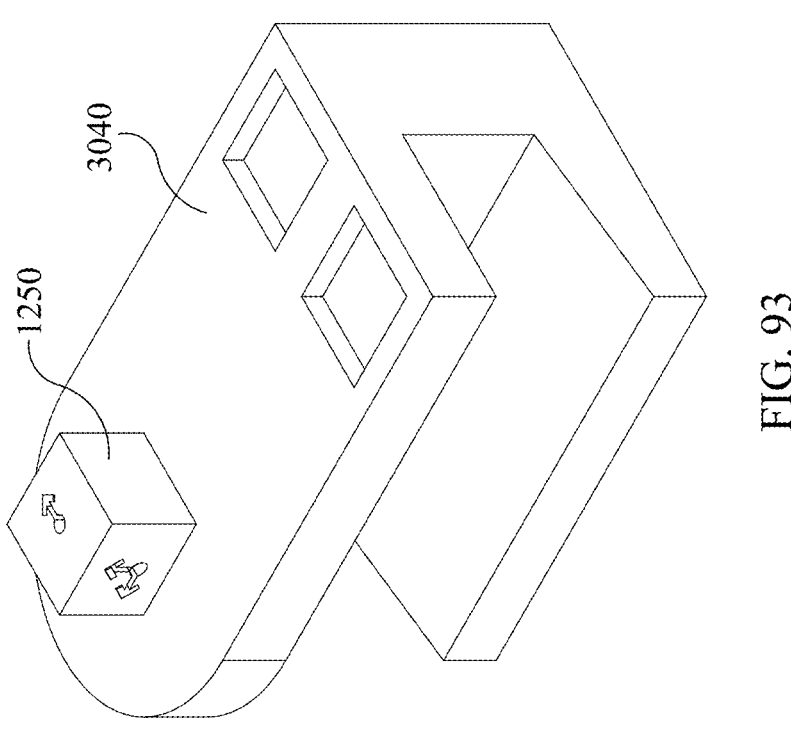
FIG. 93 is a top perspective view of another form of a sensor mount formed in accordance with the present disclosure.

The sensor mount 3040 may be formed in a variety of different geometries or shapes, depending on the mounting application. More specifically, as can be seen in FIG. 93 of the drawings, the sensor mount 3040 may be formed with a tapered hook-like geometry which allows it to be hooked onto the suspension 1630 and thereby mounted without any additional mounting features. Once hooked, the sensor mount 3040 may be pushed against the suspension in such a way to engage the taper in the hook, affixing the sensor mount 3040 to the suspension 1630 with friction. The mounting pad may be removed by reversing this process.

Other geometries and methods similar to those shown in FIG. 93 of the drawings exist which allow the sensor mount 3040 to be affixed to the vehicle 1600 without additional mounting features, such as a detent or lever which can affix the sensor mount 3040 to the suspension. The described embodiment should not be taken to be an exclusive means of doing so. Similarly, other geometries and methods like those in FIG. 93 of the drawings exist which allow the sensor mount 3040 to be removed to the vehicle 1600 with or without features, such as a detent or lever that can be depressed to remove the sensor mount 3040. The described embodiment should not be taken to be an exclusive means of doing so.

The multi-axis accelerometer 1250 may be powered and communicate with the DAQ 1510 wirelessly or with wires, as generally shown in FIG. 98 of the drawings. Similarly, each of the single-axis accelerometer 1240, the IMU 1260 and the magnetometer 1270 may be powered and communicate with the DAQ 1510 wirelessly or with wires. Each of the single-axis accelerometer 1240, the multi-axis accelerometer 1250, the IMU 1260 and the magnetometer 1270 may be powered via on-board energy storage. Data from each of the single-axis accelerometer 1240, the multi-axis accelerometer 1250, the IMU 1260 and the magnetometer 1270 may be acquired and logged into on-board memory and accessed and analyzed after sensing is complete.

Figure 99:
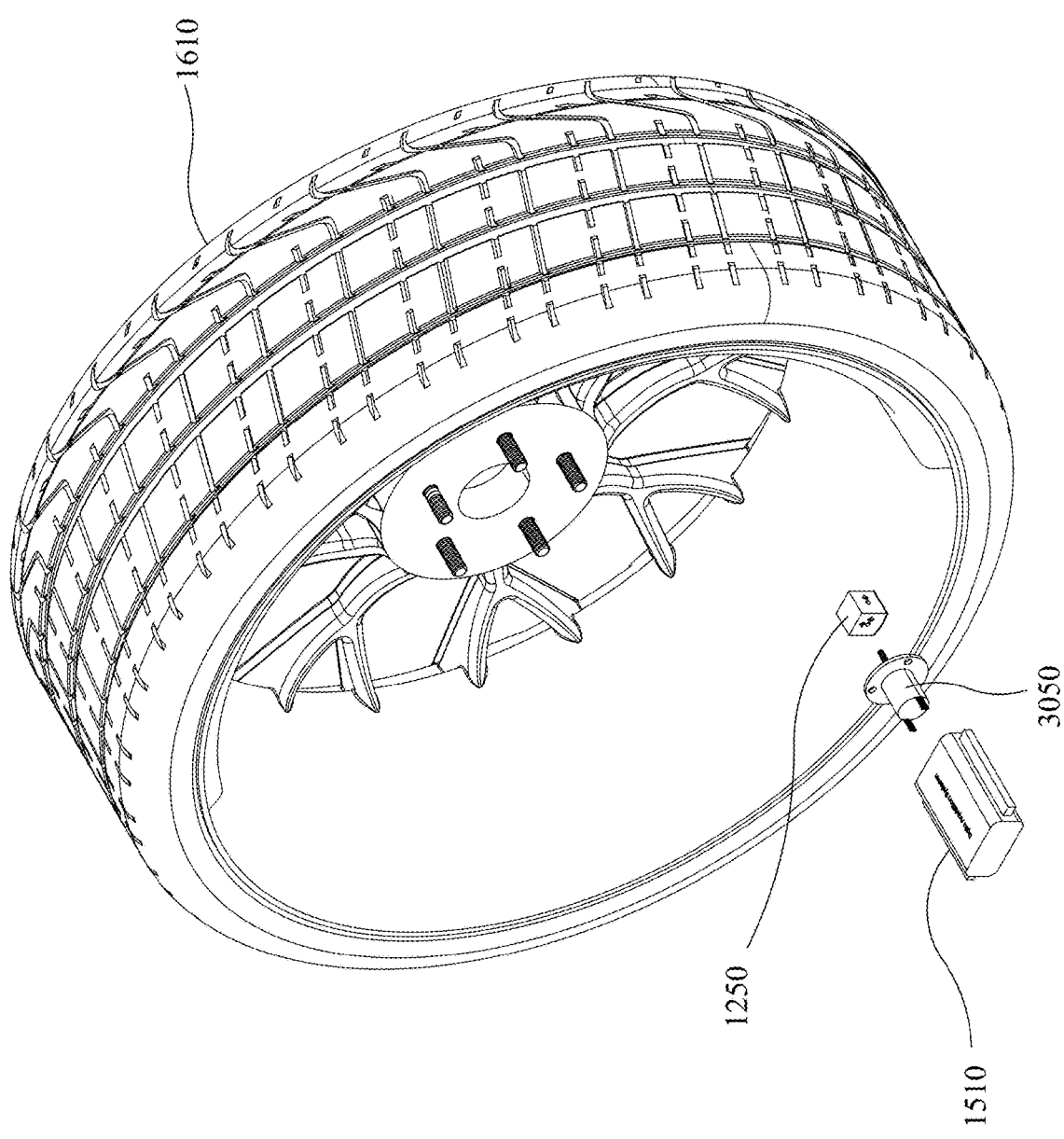
FIG. 99 is another top, rear perspective view of a TWA, showing the multi-axis accelerometer formed in accordance with the present disclosure mounted thereto and in communication with a DAQ.

Alternatively, as shown in FIG. 99 of the drawings, a slip ring 3050 may be used to provide power and connectivity between the multi-axis accelerometer 1250 on the rotating assembly and non-rotating components such as the DAQ 1510. Each of the single-axis accelerometer 1240, the IMU 1260 and the magnetometer 1270 may also be provided power and connectivity in a similar fashion. Other methods exist for providing this power and connectivity, such as over-the-air power and connectivity.

Figure 100:
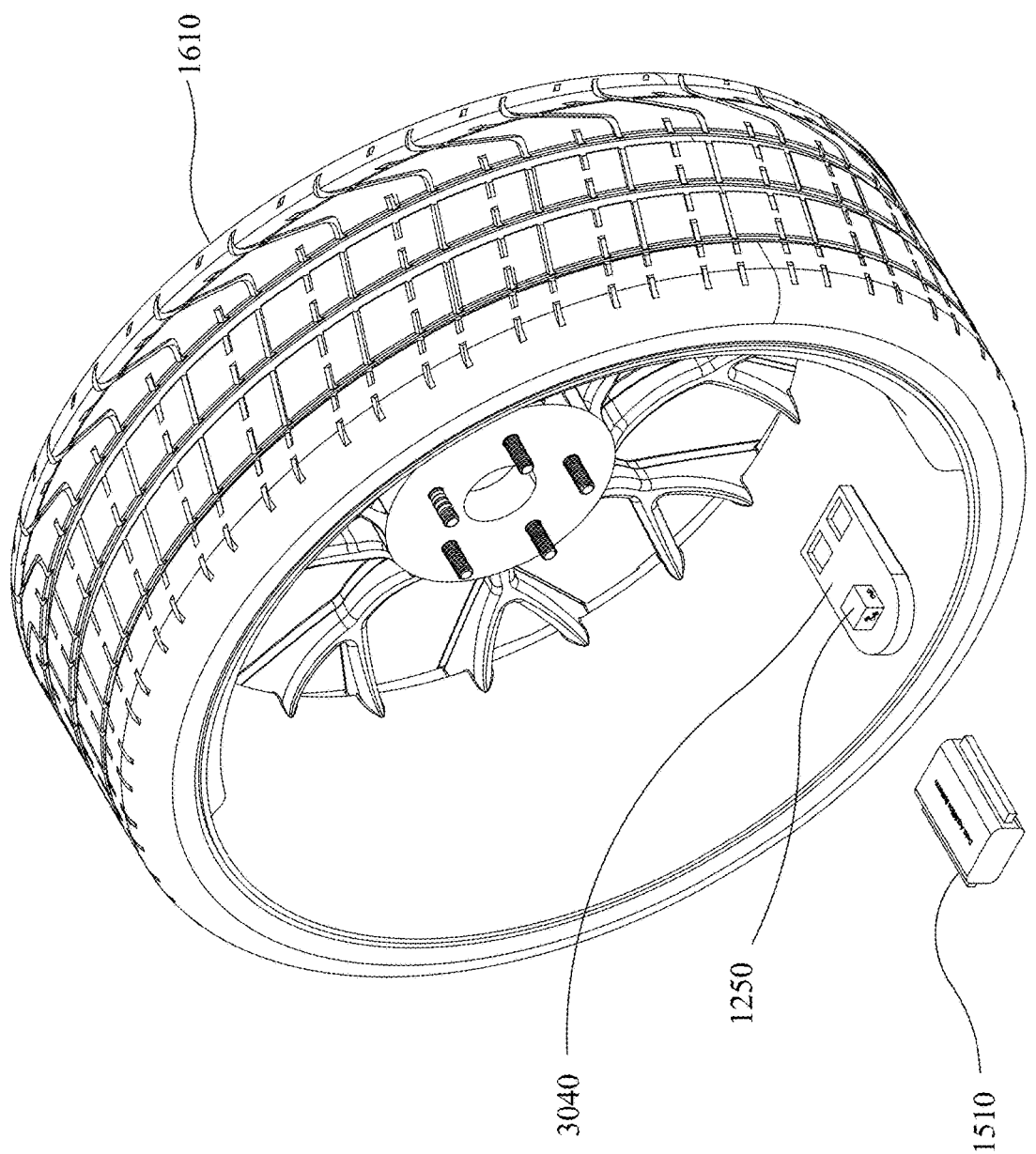
FIG. 100 is a top, rear perspective view of a TWA, showing a sensor mount formed in accordance with the present disclosure mounted thereto.

Alternative of the embodiment of the inventions of FIGS. 98 and 98 of the drawings is shown in FIG. 100 of the drawings. As can be seen in FIG. 100 of the drawings, the multi-axis accelerometer 1250 is mounted to the TWA 1610 via a sensor mount 3040. The sensor mount 3040 may provide support for mounting only or for mounting and orienting. Each of the single-axis accelerometer 1240, the IMU 1260 and the magnetometer 1270 may be mounted in a similar fashion.

Figure 101:
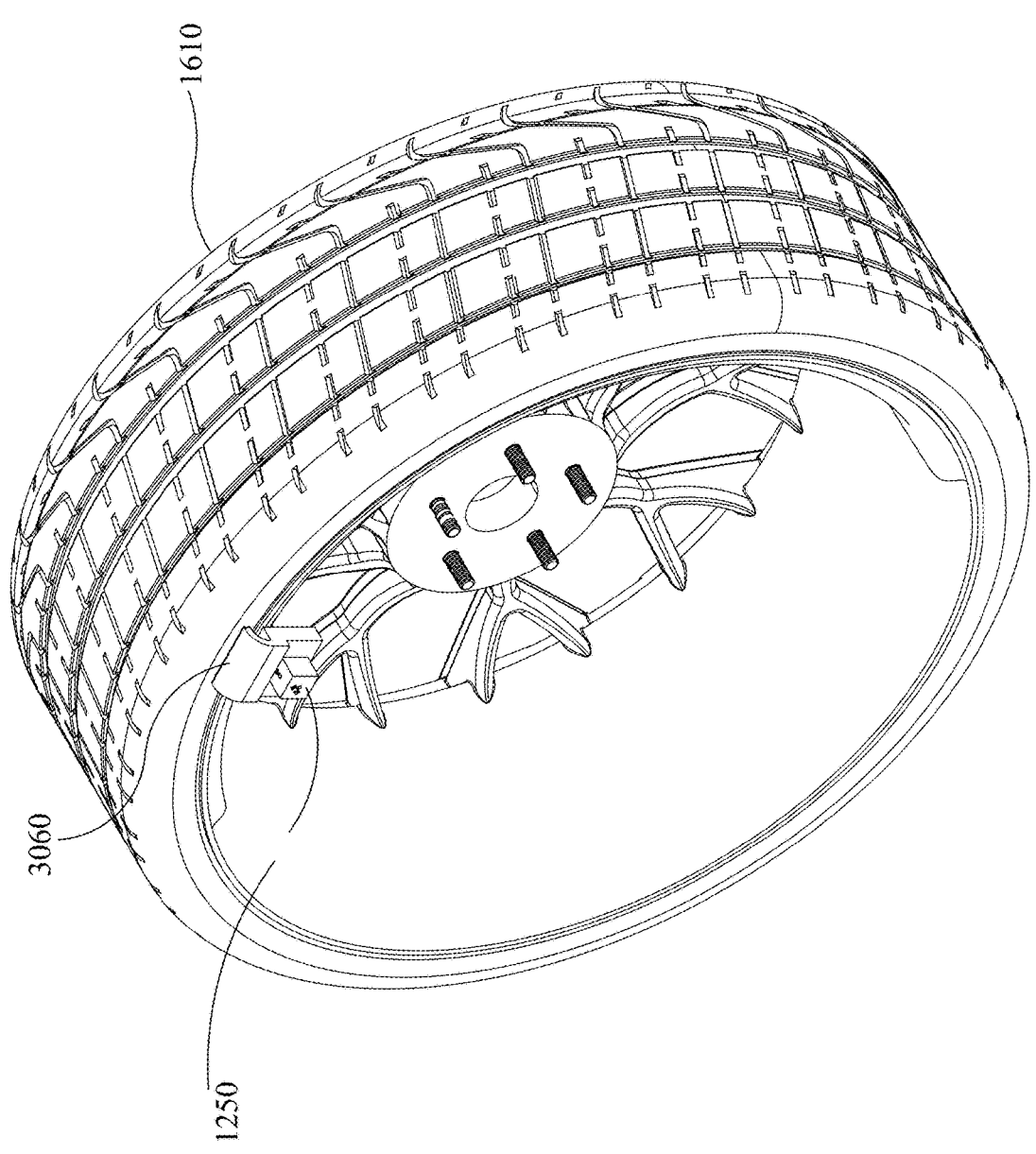
FIG. 101 is a top, rear perspective view of a TWA, showing the multi-axis accelerometer formed in accordance with the present disclosure mounted to the rim of the TWA using a rim clip.

As can be seen in FIG. 101 of the drawings, the multi-axis accelerometer 1250 may mounted to the TWA 1610 via a rim clip 3060. The rim clip 3060 may be universal or may be profiled to math different wheel profiles. The rim clip 3060 may be removable or permanent. Each of the single-axis accelerometer 1240, the IMU 1260 and the magnetometer 1270 may be mounted in a similar fashion.

Figure 102:
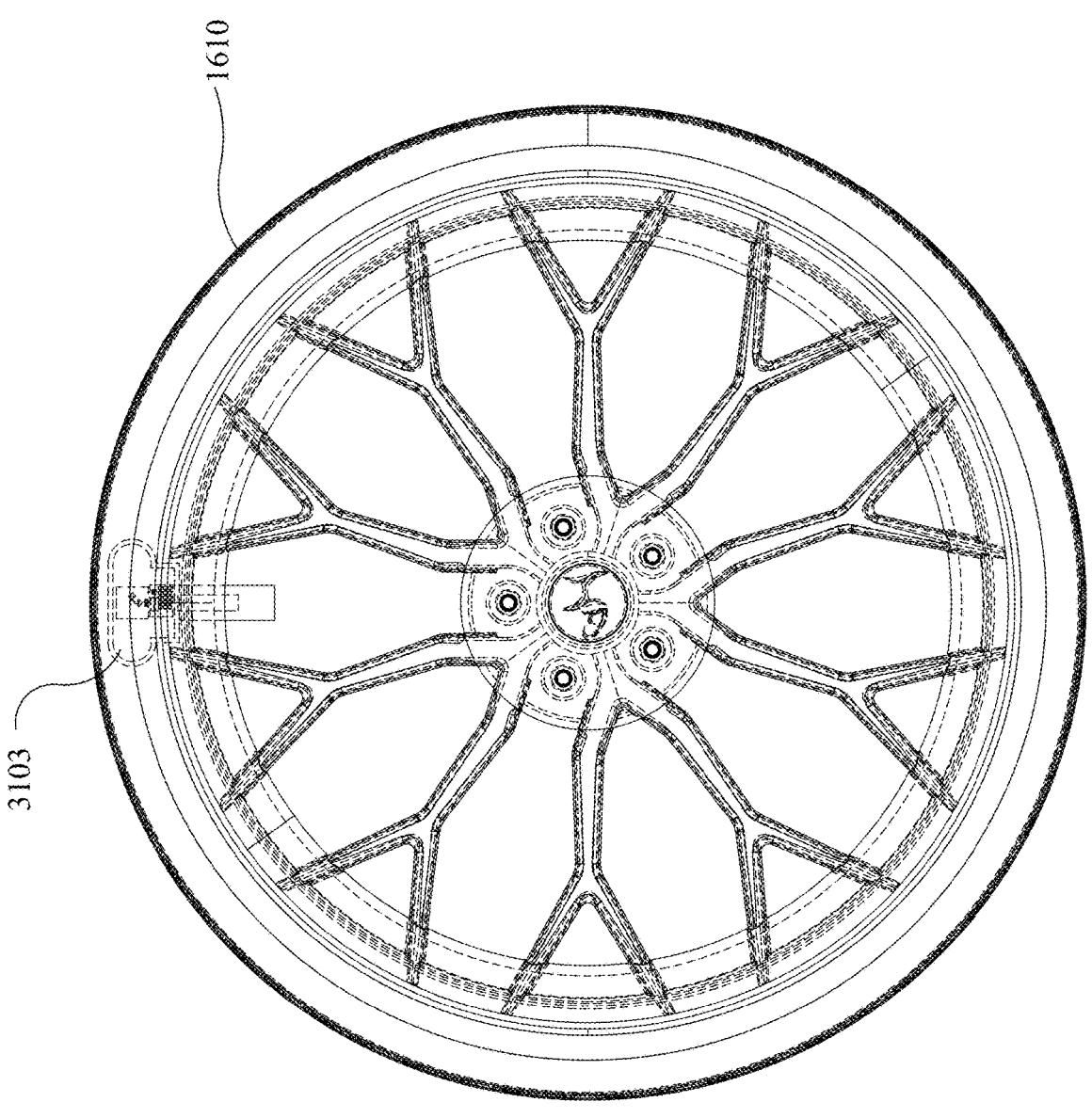
FIG. 102 is a cross-sectional elevational view of the TWA, showing a tire pressure monitoring system (TPMS) assembly formed in accordance with the present disclosure situated therein.

As can be seen in FIG. 102 of the drawings, the multi-axis accelerometer 1250 may be installed or manufactured in tire pressure monitoring system (TPMS) assembly 3103 of the TWA 1610. Additionally, the multi-axis accelerometer 1250 can be powered from a battery, capacitor, or other energy storage device. Furthermore, the multi-axis accelerometer 1250 can be self-powered or powered from the motion of the vehicle. Even furthermore, the multi-axis accelerometer 1250 can be solar powered, or powered by other non-contact means. Each of the single-axis accelerometer 1240, the IMU 1260 and the magnetometer 1270 may be installed or manufactured, and powered, in a similar fashion.

Figure 103:
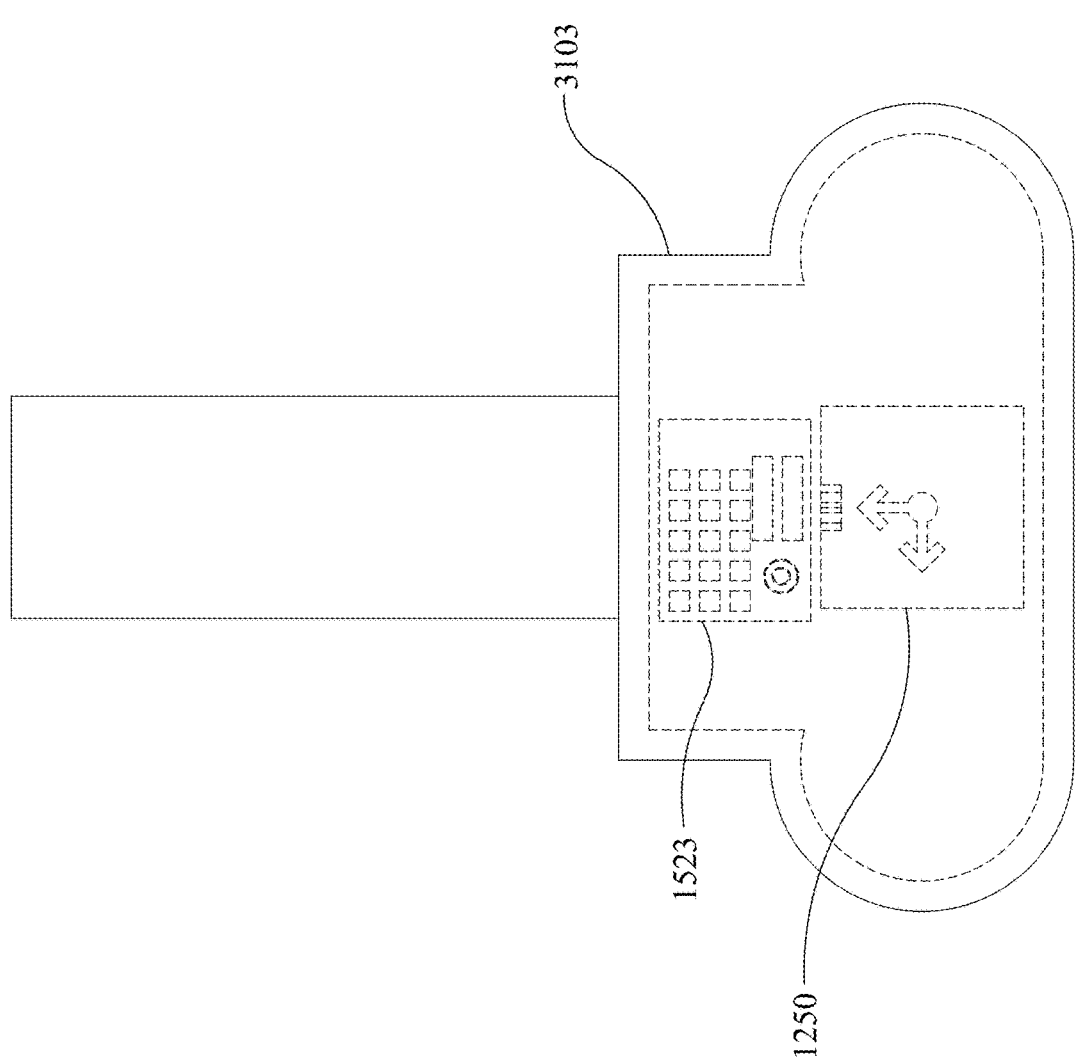
FIG. 103 is a cross-sectional elevational view of the tire pressure monitoring system (TPMS) assembly formed in accordance with the present disclosure.

As can be seen in FIG. 103 of the drawings, an instrumented TPMS assembly 3103 may include a multi-axis accelerometer 1250 with associated amplification, conditioning, logging, and communication functions on an embedded circuit board 1523.

There are various embodiments of the sensor 1200 mounted on the vehicle with or without a mounting component (mounting pad, rim clip, etc.). The orientation of the sensors 1200 and the components thereof relative to the TWA 1610 can be important to adequate sensing of the vibration signal during the balancing process. The orientation of the sensors and the components thereof can be achieved by locking the orientation of the sensors relative to the mounting component and then orienting the mounting component itself relative to the TWA 1610. The orientation of the sensors may also be achieved by attaching the mounting component to the vehicle and then adjusting the orientation of the sensors relative to the mounting component.

Figure 104:
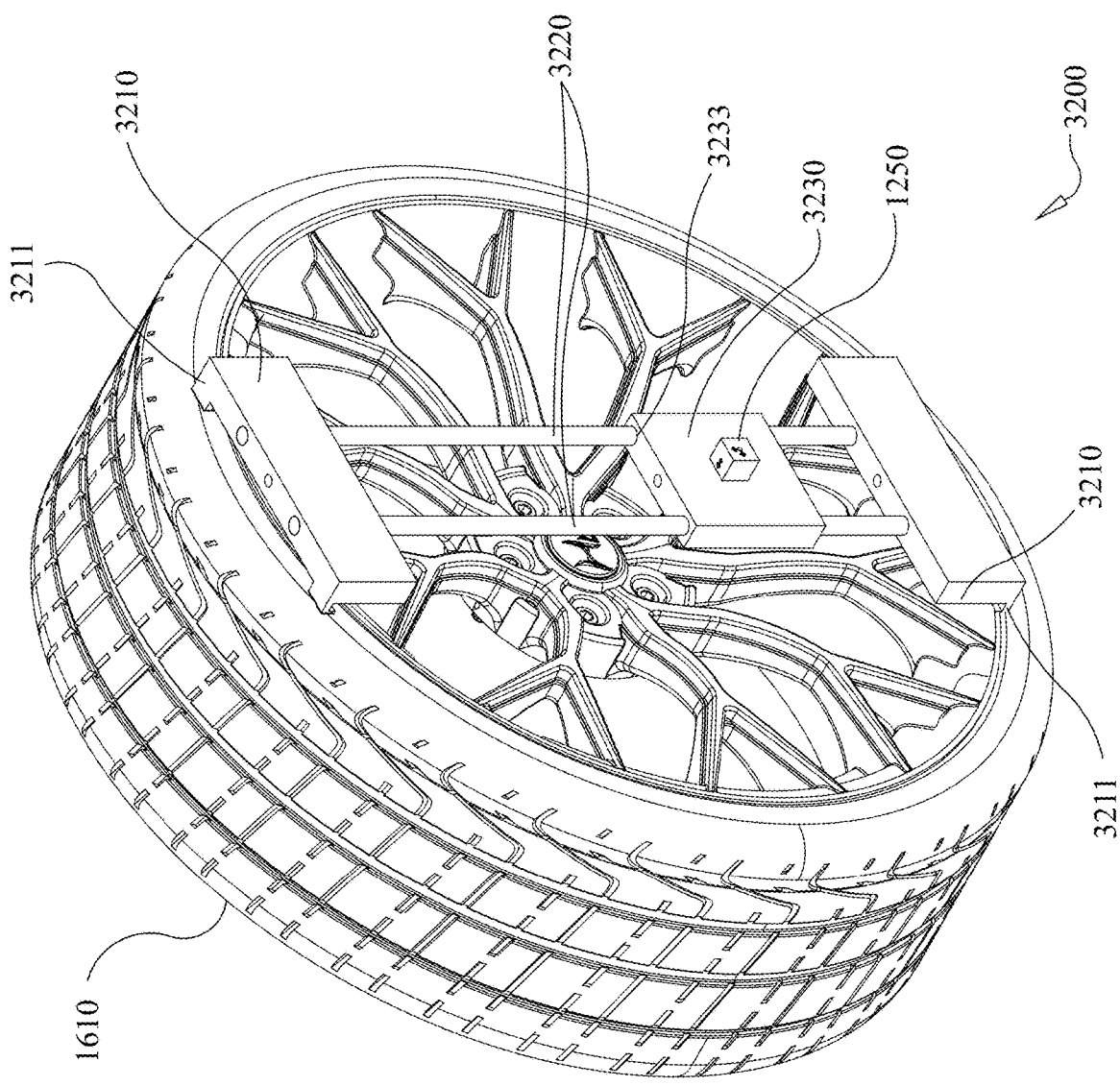
FIG. 104 is a top perspective view of a gantry balancing system formed in accordance with the present disclosure, showing the gantry balancing system mounted to the TWA.

Now making reference to FIG. 104 of the drawings, a gantry system 3200 formed in accordance with the present invention comprises gantry mounting arms 3210, gantry guide rods 3220, one or more sensors 1200 and a gantry carriage 3230. As will be described in greater detail in the forthcoming paragraphs, the gantry system 3200 is mounted to the TWA 1610 and utilized to detect vehicular imbalances caused by the TWA 1610 and other rotational components of the vehicle and to determine the balancing weight magnitude and position required to balance the TWA 1610. The gantry system 3200 is mountable to the TWA 1610 and may operate with the TWA 1610 both on and off the vehicle. As mentioned above, the gantry system 3200 may operated as a component of the robotic automotive service system 1100 formed in accordance with the present invention, as well as used independently therefrom. Furthermore, the gantry system 3200 may be utilized in combination with one or more of the other systems, apparatus and algorithms described herein, such as the roller system 83300 and robotic apparatus 1101.

Figure 105:
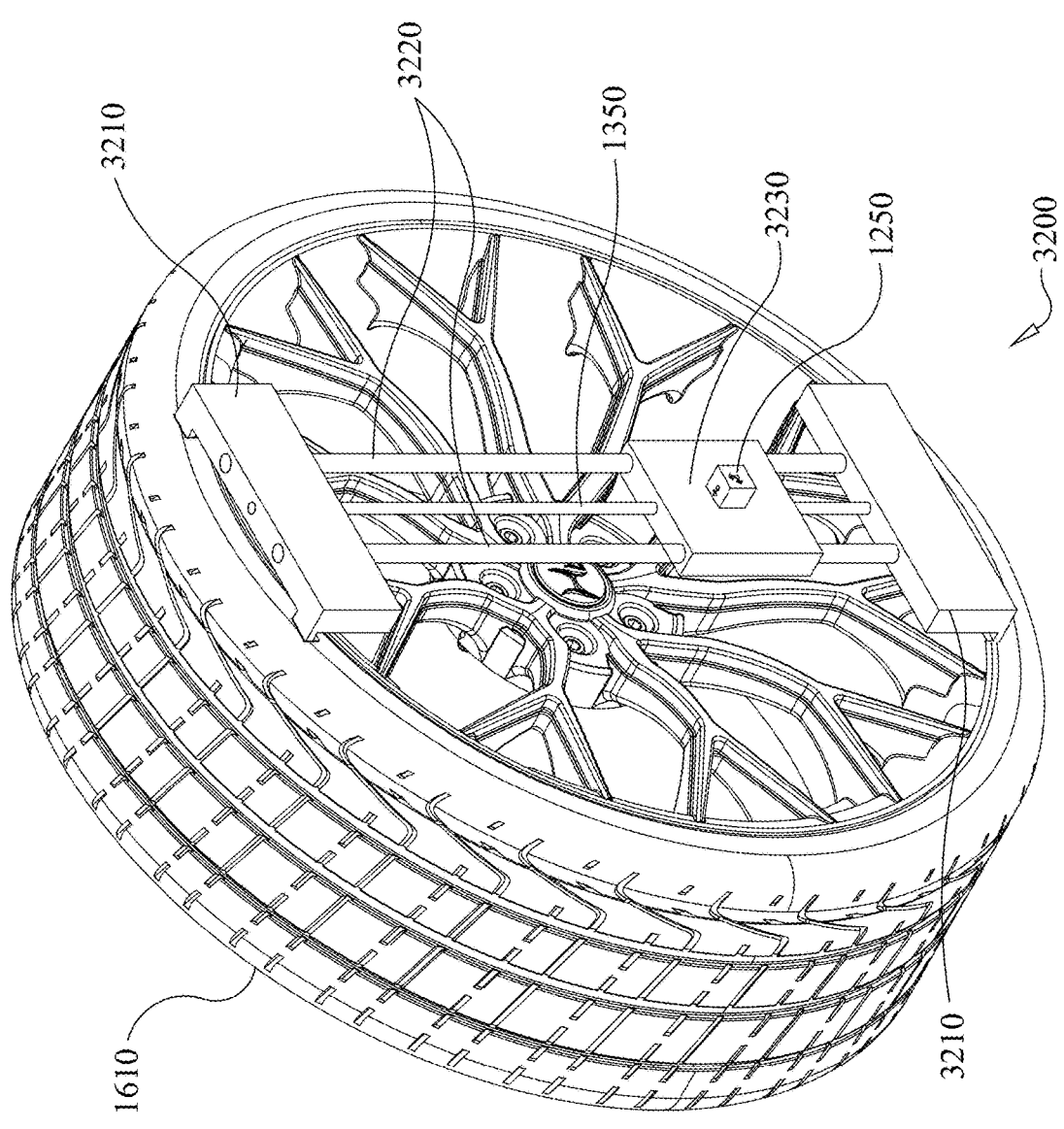
FIG. 105 is a top perspective view of another form of a gantry balancing system formed in accordance with the present disclosure, showing the gantry balancing system mounted to the TWA.

As can be seen in FIGS. 104, 105 and 148 of the drawings, the gantry mounting arms 3210 are disposed opposite from one another and interconnected by the gantry guide rods 3220. Each gantry mounting arm 3210 preferably includes a mount 3211 that extends inwardly therefrom towards the TWA 1610. The mount 3211 is mechanically coupled to a portion of the TWA 1610 to rigidly clamp the gantry system 3200 to the TWA 1610. Preferably, the mount 3211 is formed as a hook-like member which clamps on the edge of the rim 1612. The gantry carriage 3230 includes a plurality of bores 3233 formed through the longitudinal length thereof through which the guide rods 3220 extend such that the gantry carriage 3230 is reciprocatingly slidable on the guide rods 3220. One or more sensors 1200, such as a multi-axis accelerometer 1250, is mounted to the carriage 3230. The sensor 1200 may also be a single-axis accelerometer 1240, load cell 1230, IMU 1260, magnetometer 1270, distance sensor 1221, a position sensor 1222 or any other sensor that is capable of measuring imbalance. The sensor 1200 may also be mounted on a plane adjacent to the TWA 1610 and be aligned to react to imbalances in the system.

The gantry carriage 3230 may be passive, as shown in FIG. 104 of the drawings, wherein its position and orientation shift in response to loads and moments. The gantry carriage 3230 may also be active, as shown in FIG. 105 of the drawings, in which its position and orientation are controlled by one or more linear actuators 1350 directly. For example, as shown in FIG. 105 of the drawings, one or more linear actuators 1350 may be interposed between the gantry mounting arms 3210 and mechanically coupled to the carriage 3230 and may selectively reciprocatingly move the carriage 3230 along the axial length of the guide rods 3220 bidirectionally. The gantry carriage 3230 may be a combination of active and passive, where active control may be per axis and/or can be turned on or off.

With a passive gantry carriage 3230, such as the gantry carriage shown in FIG. 104 of the drawings, as the TWA 1610 is spinning, imbalance will result in the gantry carriage 3230 adjusting relative to the location and magnitude of the imbalance. By measuring the acceleration on the gantry carriage 3230 via the attached multi-axis accelerometer 1250 and/or the position of the gantry carriage 3230, the imbalance may be sensed and calculated.

With an active gantry carriage 3230, such as the gantry carriage 3230 shown in FIG. 54 of the drawings, as the TWA 1610 is spinning, an imbalance moment and/or load will be induced and can be sensed via the attached multi-axis accelerometer 1250 and/or the position of the gantry carriage 3230. By actively adjusting the position/orientation of the gantry carriage 3230, it is possible to minimize the sensed imbalance. This results in a direct measurement of the balancing weight magnitude and position required to balance the TWA 1610 once the gantry system 3200 is removed.

The gantry system 3200 may also be formed with additional gantry carriages 3230, guide rods 3220 and other components to expand the system to more axes of movement. This expansion could feasibly enable balancing in multiple axes using the same methodology and invention as described here. An exemplary two-axis gantry system 3200 is shown in FIG. 148 of the drawings. As can be seen in FIG. 148 of the drawings, the sensor (e.g., the multi-axis accelerometer 1250) is removed from a first gantry carriage 3230. Additional gantry mounting arms 3210 and gantry guide rods 3220 are mounted onto the first gantry carriage 3230. A second gantry carriage with a sensor 1200 (e.g., a multi-axis accelerometer 1250) mounted on it is placed on the second set of guide rods. The first set of guide rods 3220 (i.e., the set that is closer to the TWA 1610) allow the multi-axis accelerometer 1250 to translate in one direction. The second set of guide rods 3220 allow the multi-axis accelerometer 1250 to translate in a second direction. This same principle can be applied to additional directions of motion. The two-axis gantry system 3200 shown in FIG. 148 of the drawings may also include a linear actuator 1350 and be actively adjusted using a linear actuator 1350 in a similar manner to the active carriage 3230 shown in FIG. 105 of the drawings.

Figure 106:
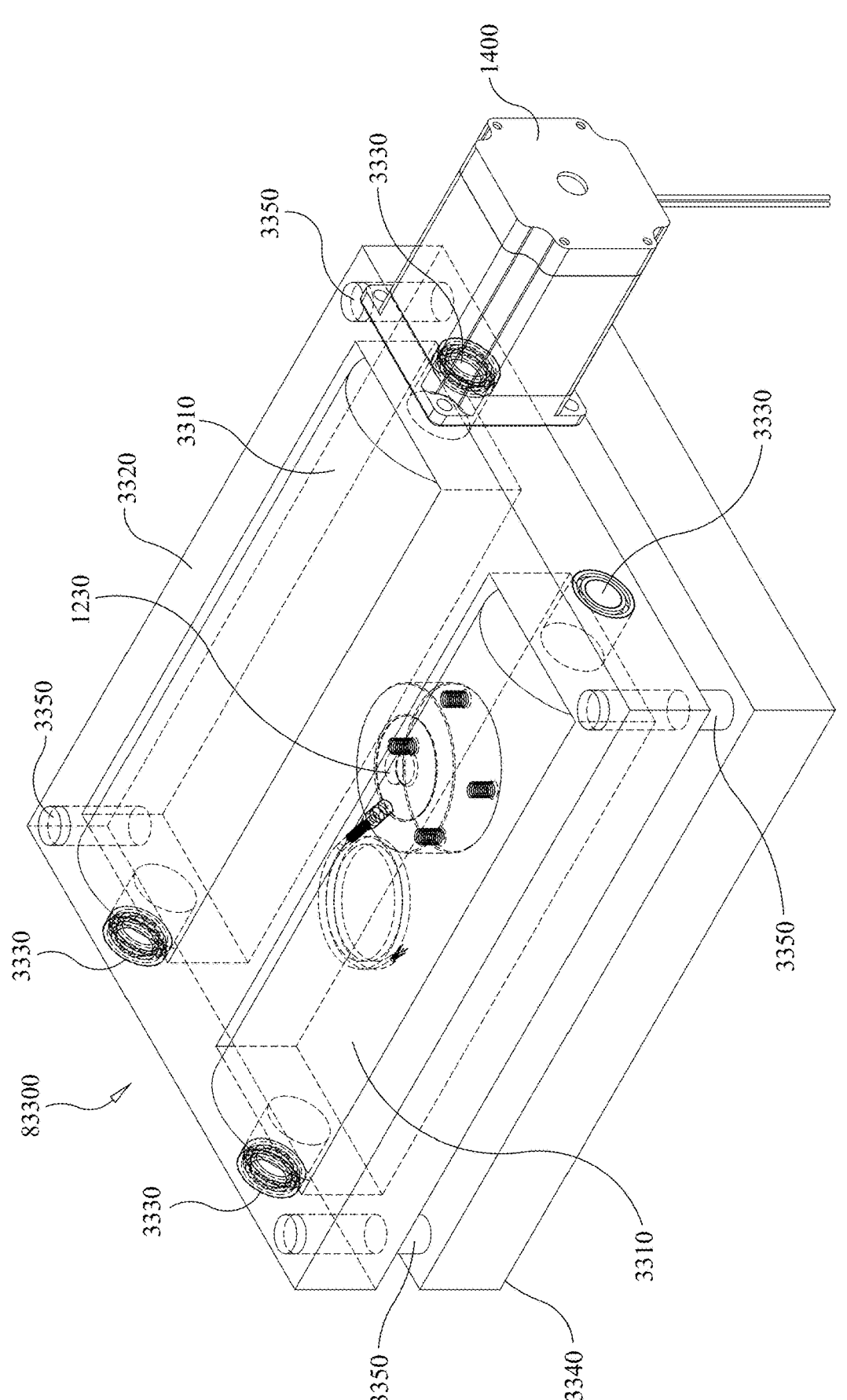
FIG. 106 is a top perspective view of a roller system formed in accordance with the present disclosure.

Now making reference to FIG. 106 of the drawings, a roller system 83300 formed in accordance with the present invention comprises a roller system base 3340, a roller system frame 3320 and one or more rollers 3310. The one or more rollers are mounted between roller system bearings 3330 on the frame 3320, which allows for free rotation about the longitudinal axis of the instrumented roller system rollers 3310, and are at least partially contained within frame 3320. The roller system frame 3320 is mounted on the roller system base 3340. The mounting scheme is such that the roller system frame 3320 can move up and down on the instrumented roller system base 3340, but is prevented from rotating relative to the instrumented roller system base 3340 via the roller system guide rods 3350. Preferably, one roller 3310 is rotated by a motor 1400 that is mechanically coupled thereto.

One or more load cells 1230 may be mounted on the roller system base 3340 such that the roller system frame 3320 sits on the load cells 3230 in normal operation. The roller system frame 3320 is not rigidly fixed to the load cells 1230 or the instrumented roller system base 3340. As the roller system frame 3320 is able to freely move up and down relative to the roller system base 3340, the load cell 1230 becomes the only downward restraint on the roller system frame, causing all force in that direction to pass through and be measured by the load cell 1230.

The roller system rollers 3310 contact with the tire 1611 of the TWA 1610. Friction between the roller system rollers 3310 and the tire 1611 causes the TWA 1610 to rotate when the roller system roller 3310 is rotated by the motor 1400. The position of the roller system is such that there exists a "pre-load" between the roller system rollers 3310 and the tire 1611 when idle. This preload is a compression of the instrumented roller system 83300 into the tire 1611 such that at rest, the load cells 1230 have a load on them. This ensures that the tire 1611 stays in contact with the roller system rollers 3310 and that the load cells 1230 have a non-zero load on them at all times during operation.

Rotating the TWA 1610 with the instrumented roller system rollers 3310 slowly will induce a signal in the load cell 1230 indicative of the variation in pre-load on the system due to a combination of stiffness variations and eccentricity of the TWA 1610. Rotating the TWA 1610 with the instrumented roller system rollers 3310 quickly will induce a signal in the load cells 1230 indicative of the variation in pre-load and the imbalance in the rotating assembly 1620. By subtracting the pre-load signal previously collected from the load cells 1230, the imbalance signal can be isolated.

In one form of the instrumented roller system 83300, the rollers apply a preload to the tire that represents the road force during balancing. This preload is applied in the same way as the normal balancing preload is applied as described above, where the roller system rollers 3310 are pressed into the tire 1611 with some load to apply a preload before balancing. In road force balancing, a load is applied to the tire 1611 that represents the load applied by the road to the tire 1611. This preload can be used during balancing to better represent the balance during the use-case.

In another form of the instrumented roller system 83300, the rolling action of the roller system rollers 3310 against the TWA 1610 is driven by the spokes of the TWA 1610, lug nut related features of the TWA 1610, or by any other useful feature for rotating the TWA 1610. This is accomplished by utilizing a face gripper system 2300 or lug-nut gripper 2350 as described previously, to rotate the TWA 1610. The gripper used would be driven off the motor 1400 already mounted on the instrumented roller system 83300. In other embodiments of the instrumented roller system 83300, the load cells in the roller system are replaced with other sensor types.

It has been found that on-car balancing of the rotational assembly is complicated by the fact that the rotational assembly is dynamically coupled to the suspension 1630 and structure of the vehicle 1600. One such coupling that presents a particular challenge is the suspension hard stop which acts as a limit to how far the suspension springs can extend. The suspension hard stop dampens imbalance vibrations during the balancing procedure by absorbing some of the vibratory energy from the suspension 1630. It has also been found that if the suspension 1630 was lifted off the suspension hard stop during the balancing process, it could increase the strength of an imbalance signal and result in a more successful balancing process.

More specifically, the suspension hard stop preloads the suspension 1630 and provides a lower bound upon which the suspension 1630 rests when the load of the vehicle 1600 is removed from the suspension 1630. As such, when the vehicle 1600 is on a lift, the weight of the vehicle 1600 is lifted off the suspension 1630 such that the suspension 1630 is allowed to "relax" and decompress. The hard stop limits how far the suspension 1630 can decompress. This causes the suspension 1630 to rest on the hard stop. The hard stop can affect the vibration of the suspension 1630 during on-vehicle wheel balancing if the suspension 1630 is allowed to rest on the hard stop during the process.

Figure 108:
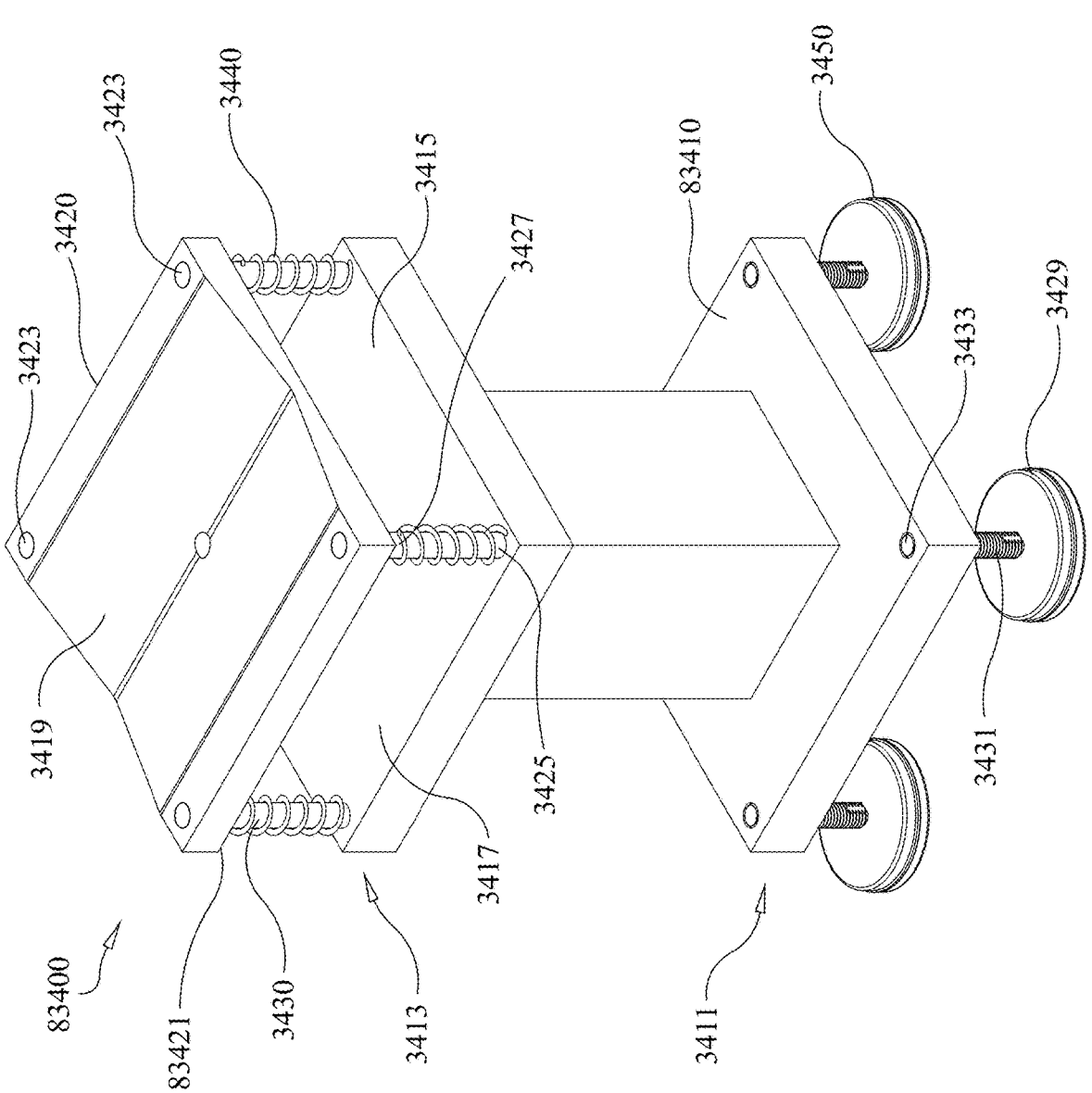
FIG. 108 is a top perspective view of a suspension support structure system formed in accordance with the present disclosure.

As can be seen in FIG. 108 of the drawings, in accordance with another aspect of the present invention, a suspension support structure system 83400 preferably comprises a support system base 83410, which includes a lower portion 3411 and an oppositely disposed upper portion 3413, and a support arm 3420, which is mechanically coupled to the support system base 83410, in particular, to the upper portion 3413 thereof. The upper portion 3413 of the base 83410 preferably includes a guide rod support plate 3415. One or more support guide rods 3430, each having a first end 3425 and an oppositely disposed second end 3427 are interposed between the support plate 3415 and the support arm 3420. More specifically, the first ends 3425 of the guide rods are mounted the guide rod support plate 3415 and extend upwardly and outwardly from a top surface 3417 thereof towards the support arm 3420. A support spring 3440 is disposed around each of the support guide rods 3430.

The support arm 3420 preferably includes a top surface 3419, an oppositely disposed bottom surface 83421 and one or more bores 3423 that extend at least partially through therebetween. The second ends 3427 of the guide rods 3430 are received within the bores 3423 in the support arm 3420 and are receiprocatingly moveable therein. Nevertheless, it is also envisioned to be within the scope of the present invention to have the second ends 3427 of the guide rods 3430 mounted to the bottom surface 83421 of the support arm 3420 and be received within bores formed in the support plate 3415.

The support arm 3420 is constrained to the support system base 83410 along the plane parallel to the ground by the support guide rods 3430 but is free to move up and down on support guide rods 3430. The support springs 3440 tend to push or bias the support arm 3420 upwards along the support guide rods 3430 and into the suspension 1630 of a vehicle or other object.

One or more support adjustable feet 3450 are mounted to the lower portion 3411 of the base 83410 and can be used to raise the support system base 83410, further compressing support springs 3440 while pushing the support arm 3420 against the suspension 1630. For example, the support adjustable foot 3450 may include a generally cylindrical base member 3429 and a threaded rod 3431 that extends upwardly therefrom and is received within a correspondingly threaded bore 3433 formed in the lower portion 3411 of the base 83410. Accordingly, the cylindrical base member 3429 may be selectively rotated to increase or decrease the height of the base 83410.

In the configuration of the suspension support structure system 83400 shown in FIG. 108 of the drawings, the sensor 1200 may also be placed on a moving part of the support structure such as the support arm 3420. Preferably, the sensor 1200 may be a multi-axis accelerometer 1250 which responds to the vibratory acceleration of the suspension 1630 in response to the imbalance induced by rotating the TWA 1610 and the rotational assembly.

Figure 109:
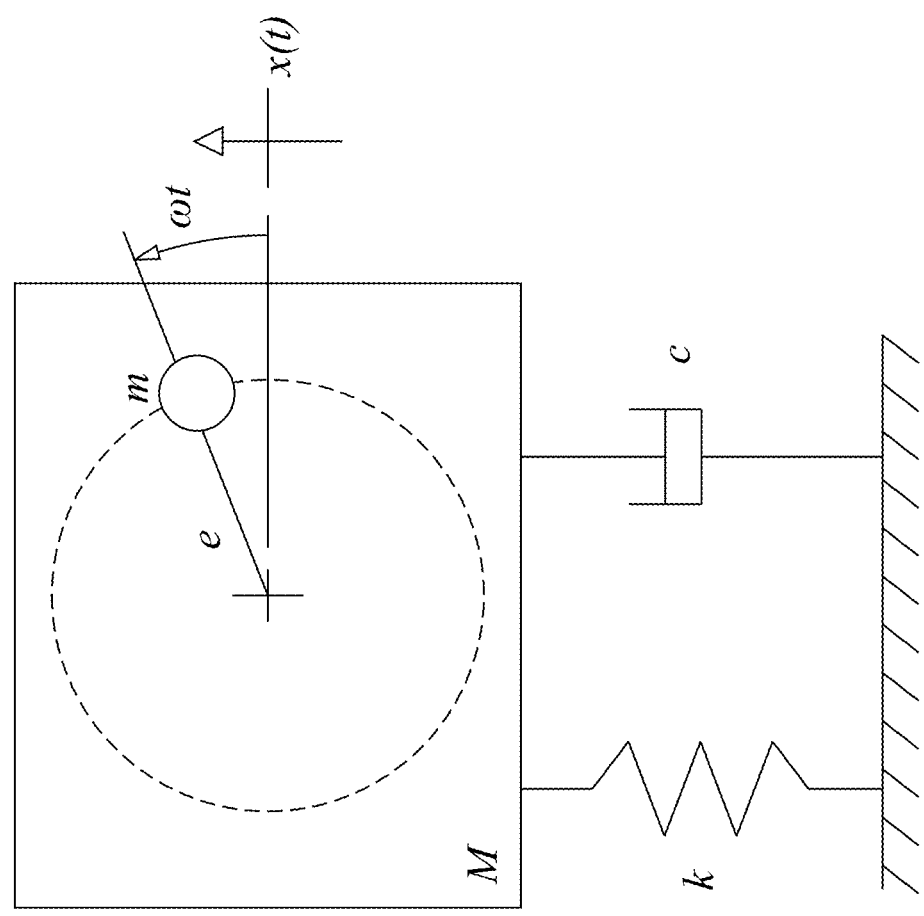
FIG. 109 is an exemplary block diagram of the state of the suspension while the sprung suspension support structure formed in accordance with the present disclosure is engaged FIG. 110 left elevational view of the suspension support structure system formed in accordance with the present disclosure.

An exemplary block diagram of the state of the suspension 1630 while the sprung suspension support structure 3400 is engaged, such as via the support arm 3420, is shown in FIG. 109 of the drawings. The suspension support structure system 83400 may be used singularly, in pairs (e.g., front corners, rear corners, driver's side corners, or passenger side corners), or in any other multiple that makes sense (e.g., all four corners).

It has also been found that, in the case where on-car balancing of the rotational assembly is being accomplished using a sensor that responds to a static signal (i.e., a signal not solely based on the motion of the sensor), a suspension support structure with spring-capability may not provide the most signal strength. For instance, when using a rigid load cell to measure the imbalance signal, very low signal strength will be achieved when the system is able to vibrate. This is because the force of the vibrations will not selectively follow a path through the load cell, but rather distribute among other preferred paths through the vehicle that restrict motion. As such, if a rigid load cell is to be used to measure the imbalance signal, it may be preferred to restrict the motion of the system through the load cell such that the force generated by the imbalance vibrations passes through the load cell, generating a stronger signal.

A rigid embodiment of the suspension support structure system 83400 described above is shown in FIG. 110 of the drawings. More specifically, in the case where on-car balancing of the rotational assembly is being accomplished using a sensor that responds to a static signal (i.e., a signal not solely based on the motion of the sensor), a suspension support structure with spring-capability may not provide the most signal strength. For instance, when using a rigid load cell to measure the imbalance signal, very low signal strength will be achieved when the system is able to vibrate. This is because the force of the vibrations will not selectively follow a path through the load cell, but rather distribute among other preferred paths through the vehicle that restrict motion. As such, if a rigid load cell is to be used to measure the imbalance signal, it may be preferred to restrict the motion of the system through the load cell such that the force generated by the imbalance vibrations passes through the load cell, generating a stronger signal.

Figure 110:
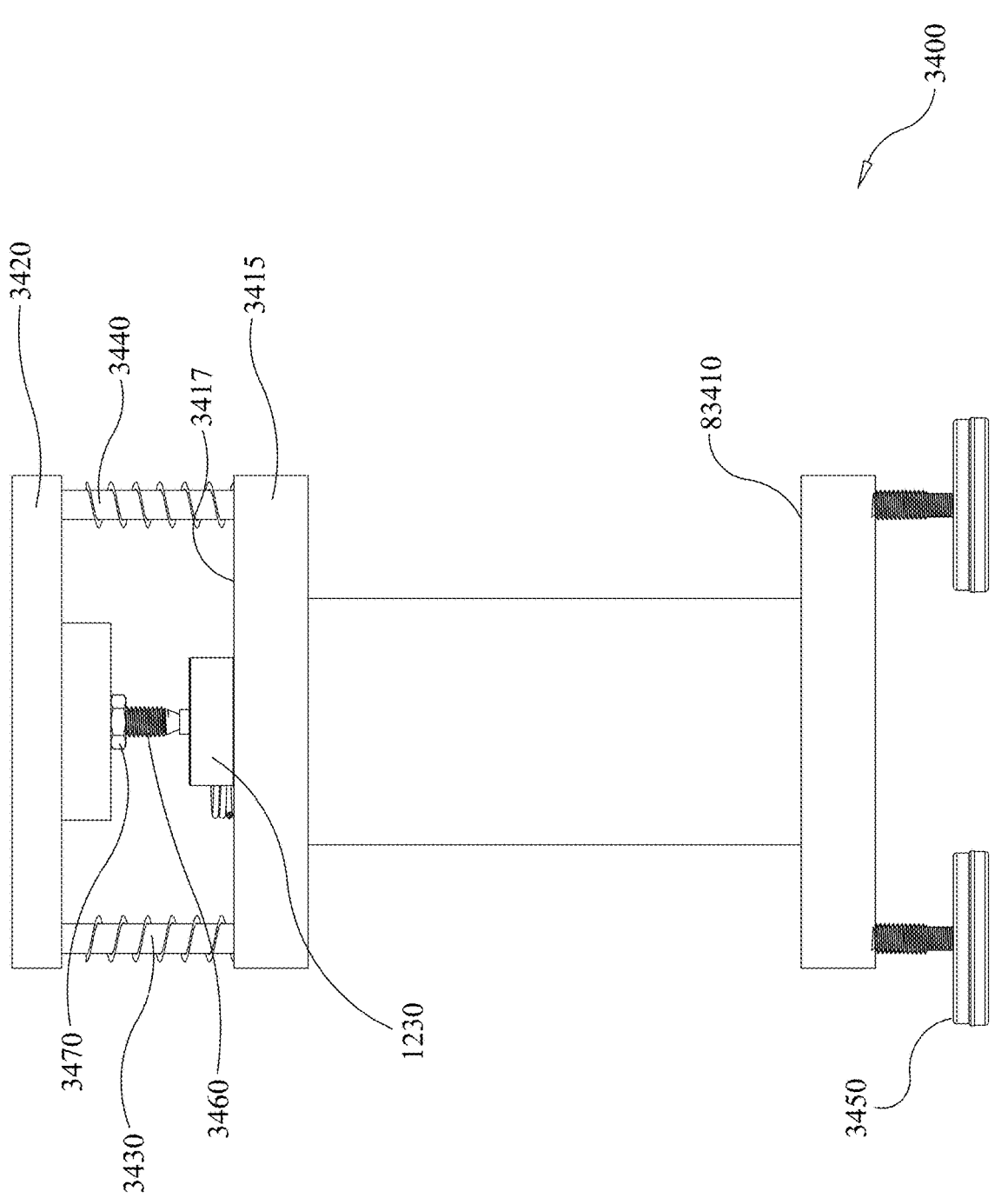

As can be seen in FIG. 110 of the drawings, the rigid embodiment of the suspension support structure system 83400 further includes a sensor, such as a load cell 1230, that is affixed to the guide rod support plate 3415 of the base 83410 and is situated underneath the support arm 3420. A loading screw 3460 is threaded through the support arm 3420 and positioned relative to the sensor 1230 in such a way that it couples the support arm 3420 to the sensor 1230 and can be adjusted to contact the component of the sensor 1230 appropriate for sensing. The loading screw 3460 may be locked into place using jam nut 3470.

As described above, the support springs 3440 tend to push or bias the support arm 3420 upwards along the support guide rods 3430 and against the suspension 1630. The support adjustable feet 3450 can be used to raise the support system base 83410, further compressing support springs 3440 while pushing the support arm 3420 against the suspension 1630. Any imbalance during rotation of the TWA 1610 and/or rotational assembly can manifest in the suspension 1630. Since the hard stop is no longer a pseudo-rigid structure it absorbs less of the vibratory energy of the imbalance. The sensor, which may be a load cell 1230, responds to the vibratory loads of the suspension 1630 in response to the imbalance induced by rotating the TWA 1610 and the rotational assembly.

FIG. 150 of the drawings illustrates an alternate embodiment of the suspension support structure system 83400 shown in FIG. 110 of the drawings. In this embodiment, a support clamping plate 3421A is oriented above the support arm 3420 such that the vehicle suspension 1630 is located between the support clamping plate 3421A and the support arm 3420. As can be seen in FIG. 150 of the drawings, clamping screws 3422 which, when rotated, can advance or retract the support clamping plate 3421A in relation to the support arm 3420. By advancing the support clamping plate 3421A towards the support arm 3420 while a suspension 1630 is between them, the suspension 1630 becomes rigidly captured between the support clamping plate 3421A and the support arm 3420. This action serves to isolate the arm of the suspension 1630 from the springs of the suspension. During the balancing process, assuming the suspension support structure system 83400 is rigid such that the arm of the suspension 1630 is unable to vibrate past the point at which it is clamped in the suspension support structure system 83400, clamping the arm of the suspension 1630 as such causes all vibratory energy in the arm of the suspension 1630 to dissipate via the suspension support structure system 83400 through the support clamping plate 3421A and the support arm 3420. The load cell 1630 produces signals from this vibratory energy which, as previously described, can be used to balance the TWA 1610.

As can be seen in FIG. 110 of the drawings, vibratory energy from the imbalance can be transmitted through the support arm 3420, through the loading screw 3460 and into and through the sensor 1230. A signal is generated by the sensor 1230 in response to the vibratory energy of the imbalance passing through it. That signal is passed to the data acquisition system 1510 and then analyzed by the computer 1500.

Figure 130:
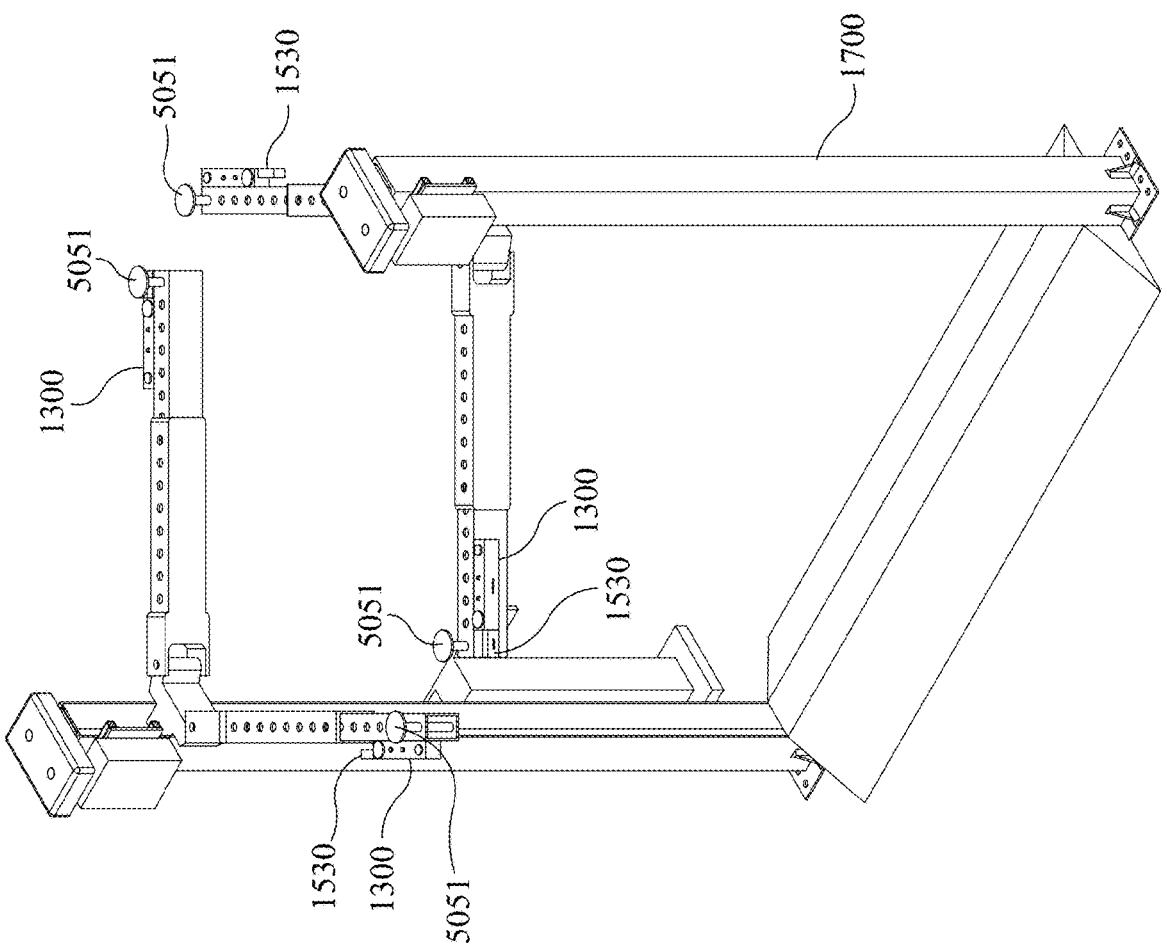

Now making reference to FIG. 130 of the drawings, in a basic form, the camera positioning system (CPS) 5200 preferably comprises a vision system 1300 and a processor 1530. The vision system 1300 is in electrical communication with the processor 1530. The processor 1530 is capable of reading and interpreting the data acquired by the vision system 1300. In a preferred form, a CPS 5200 system may be mounted to every lift point on the commercial lift 1700. Each CPS 5200 on the lift 1700 can be controlled by operator controls 5210. The vision system 1300 is preferably oriented and positioned such that the center of the field of view (FOV) of the vision system 1300 is lined up with the center of the lift pads 5051.

In another form, the CPS 5200 may further comprise an arm actuator 5040 for moving the arms on the commercial lift 1700. The arm actuator 5040 mounts to the arms or lift points of a commercial lift 1700. The vision system 1300 mounts near the lift pads 5051 of the commercial lift 1700, facing in the lifting direction. In a preferred embodiment of the invention shown, arm actuators 040 can move the arms of the commercial lift 1700.

Figure 131:
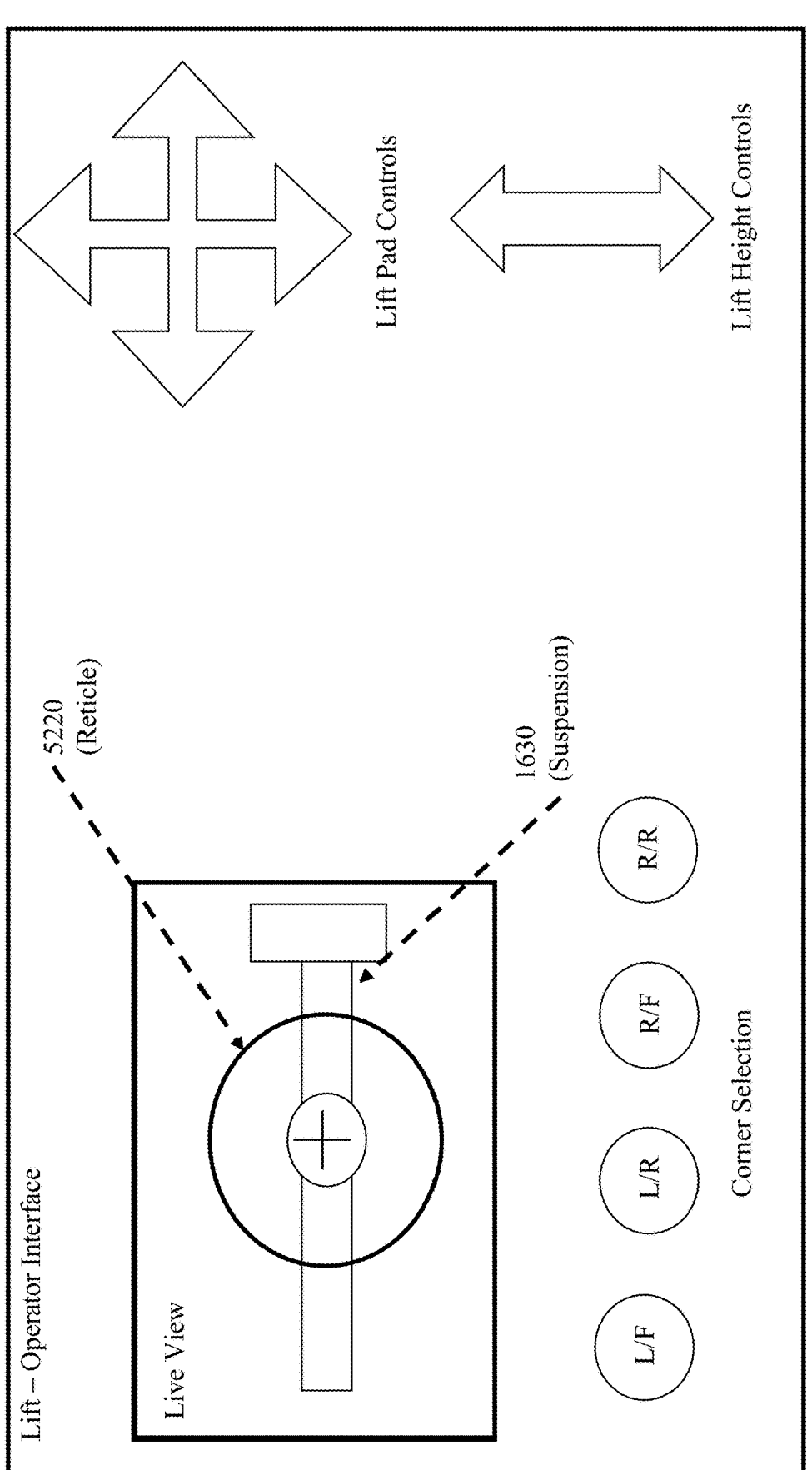

In an alternate embodiment, the operator controls 5210 contain controls to allow the operator to actuate the lift pads 5051 and lift arms 5030. An exemplary display on the operator controls 5210 is shown inf FIG. 131 of the drawings. As can be seen in FIG. 131 of the drawings, the display on the operator controls 5210, which contains a display that shows the output of the vision system 1300, preferably as a live image. The operator controls 5210 display may also display a reticle 5220, crosshairs, or other aiming device intended to aid the operator in understanding where the center of the lift pads 5051 is. As shown in FIG. 131 of the drawings, the vision system 1300 is lined up with the suspension of the vehicle and the reticle 5220 is overlaid below the suspension spring, illustrating that the lift arm is lined up with that point.

The operator uses the operator controls 5210 and output of the vision system 1300 to actuate the lift arms 5030 and lift pads 5051 of the commercial lift 1700 to proper lift points on the vehicle 1600. Once the lift arms 5030 and lift pads 5051 are in the proper location, the operator may use the controls on the commercial lift 1700 or the control adapter 5120 (if compatible and installed) to actuate the commercial lift 1700 up and into the vehicle 1600, causing it to lift.

In an alternate embodiment of the invention, the lift arms 5030 are not actuated or not controllable by the operator controls 5210. In this case, the operator may still use the operator controls 5210 display and vision system 1300 to visualize the lift points under the vehicle 1600, while the lift arms 5030 and lift pads 5051 are moved into position by another method, such as a manual move or other system. In such alternate embodiment, the operator is not required to look underneath the vehicle 1600 when positioning lift points, saving time, and increasing task ergonomics and safety.

Figure 114:
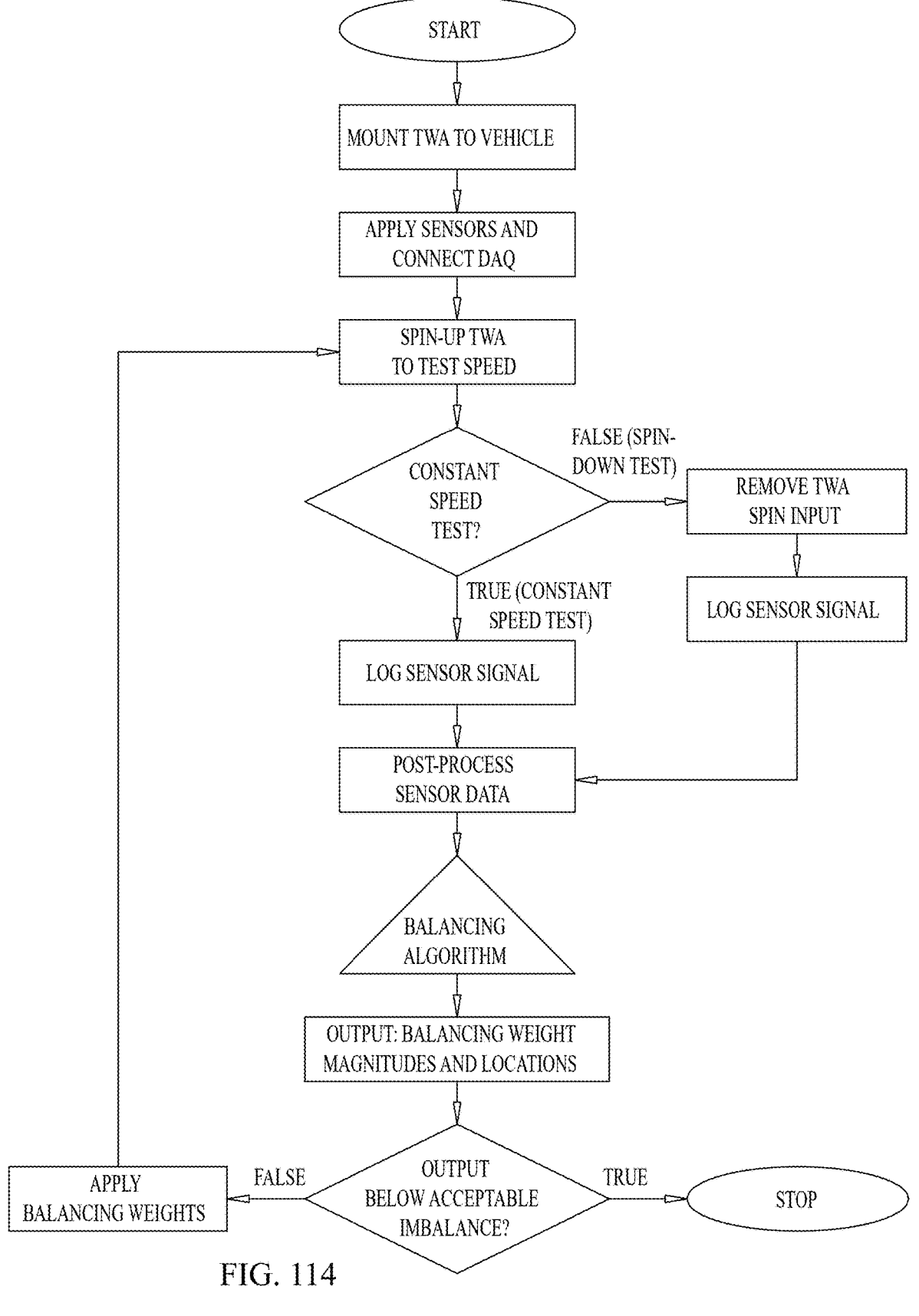
FIG. 114 is a flow diagram of a method for on-car wheel balancing in accordance with the present disclosure.

A method for on-car wheel balancing in accordance with one aspect of the present invention is illustrated in FIG. 114 of the drawings. The method determines balancing weight magnitudes and locations which will offset the imbalance of the TWA 1610 and balance the wheel to below an acceptable threshold. For example, a list of balancing weight magnitudes and locations which will offset the imbalance of the TWA 1610 and balance the wheel to below an acceptable threshold may be generated. The acceptable (or "acceptance") threshold is a bound or set of bounds of sensor data and/or balancing weight mass which indicates that the level of imbalance in the system is below the level that the user states is an acceptable balance. Once a system is below the acceptance threshold, the system is said to be "balanced" or "balanced enough" or "balanced to within tolerance". The method can also generate an imbalance vector, a TWA 1610 displacement reading, or any other suitable output to assist in the balancing process.

The method for on-car wheel balancing generally includes the following steps:

1. Mount the TWA 1610 to the vehicle. This is done in the typical fashion according to the owner's manual of the vehicle.
2. Apply sensors and connect DAQ: the sensors could include any of the sensors or sensor systems previously described including a mounted multi-axis accelerometer 1250, a suspension support structure system 83400 with a load cell 1230, an instrumented roller system 83300 with a load cell 1230, vision system 1300, or any other on-vehicle balancing system.
3. Spin up the TWA 1610 to the test speed. The test speed may vary depending on the condition and size of the TWA 1610 and vehicle 1600, but will generally be between 4 Hz and 20 Hz of rotational speed. Spin-up can be done with a gripper system 82200, commercial tire spinner 4010, or other system.

4. In the case of a constant speed test, the TWA 1610 is kept at a constant speed for the following step. In the case of a spin-down test, the rotational drive input is removed from the TWA 1610, which is allowed to begin de-accelerating (spinning down).

5. The sensor signal is logged. The time for logging depends on the type of test run and other test conditions as previously described, but is generally between 1 s-60 s in length.

6. The sensor data is post processed. This may include filtering of the data, arrangement of the data, reformatting, and other "cleanup steps" before further analysis.

7. The post-processed sensor data is fed into the balancing algorithm. This algorithm will further process the data depending on the type of algorithm being used.

8. Determining the weight magnitudes and locations of tire weights to be added to the TWA 1610 to balance the rotational assembly, which includes the TWA 1610, using a balancing algorithm. These equate to the mass of the weights that, when placed at the prescribed locations on the TWA 1610, will reduce the imbalance sensor data to an acceptable level.

9. Outputting the determined weight magnitudes and locations of the tire weights, preferably, in a list of balancing weight magnitudes and locations.

10. Determining if the weight magnitudes and locations of the tire weights in the list of balancing weight magnitudes and locations are below acceptable levels. In the preferred method shown, this involves determining whether the resultant magnitude of the weights to be placed is below the acceptance threshold. In an alternative embodiment, this could involve determining whether the expected sensor signal during a future test after placing the recommended weights would be below the acceptance threshold. In an alternative embodiment, this involves repeating the spin test, re-sampling and analyzing sensor data to determine if it is below the acceptance threshold.

11. If the weight magnitudes and locations of the tire weights in the list of balancing weight magnitudes and locations are below acceptable levels, then the balancing process ends. If not, in the preferred method shown, the recommended weights are be placed and steps 1-10 are. In an alternative method, the weights could be placed and sensor signal re-analyzed before making a determination (minimum one balancing spin and one verification spin).

An alternative acceptance criteria for the balancing described above is whether the amplitude add/or intensity of the sensor data or the post processed sensor data is within an acceptable level or outside of an acceptable level.

Figure 107:
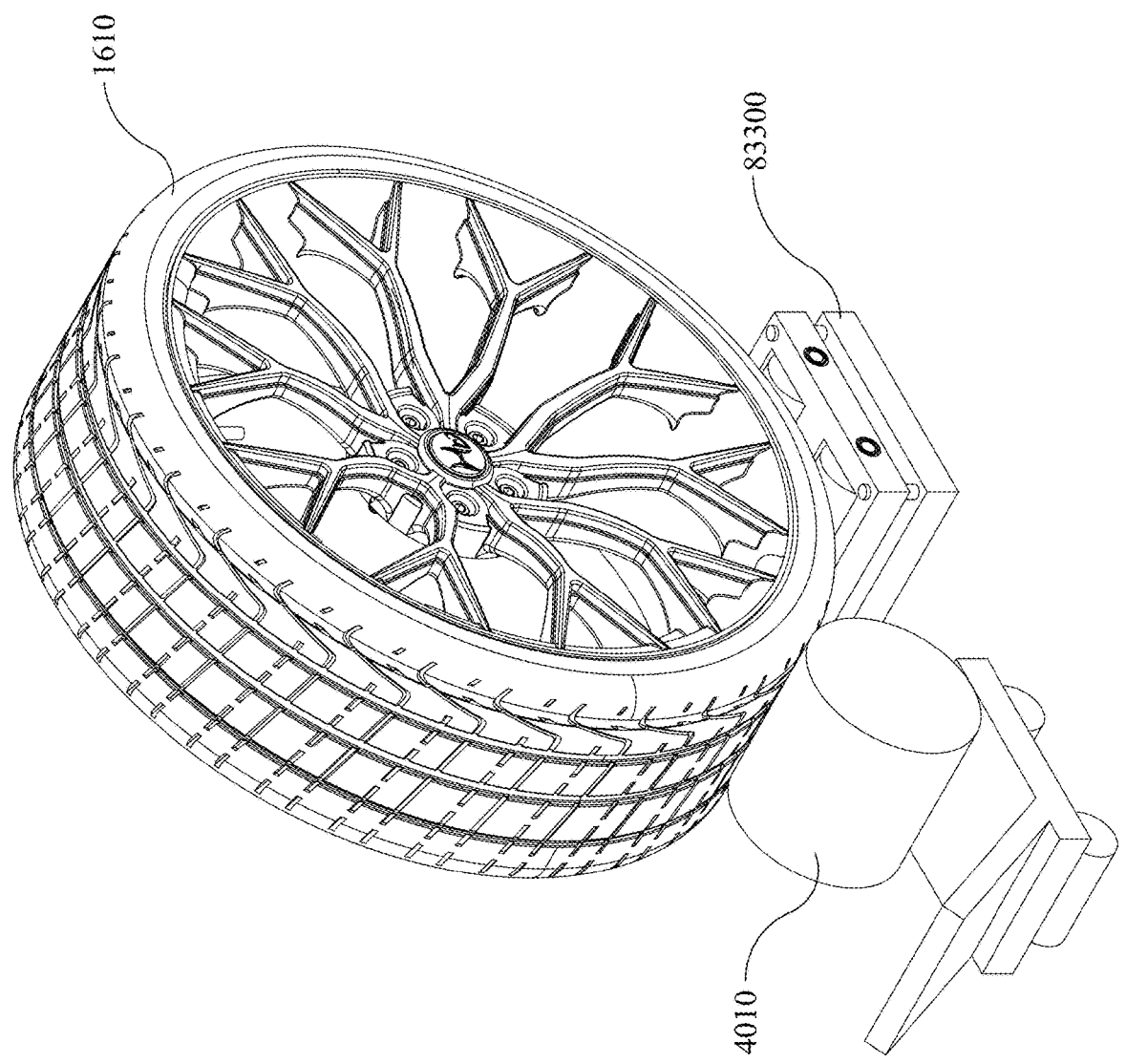
FIG. 107 is a top perspective view of the roller system formed in accordance with the present disclosure, showing the roller system underneath the TWA.

An exemplary tire-balancing sensor system is shown in FIG. 107 of the drawings. As can be seen in FIG. 107 of the drawings, the instrumented roller system 83300 is in contact with the TWA 1610. A commercial tire spinner 4010 is used to spin the TWA 1610 up to the testing angular velocity; however, the TWA 1610 can also be spun with the gripper system 82200, the roller system 83300 or the robotic apparatus 1101.

In a constant speed test, the commercial tire spinner 4010 is kept in contact with the TWA 1610 throughout testing to keep it at a constant angular velocity. In a spin-down test, the commercial tire spinner 4010 might be removed from contact with the TWA 1610 to let it spin-down due to friction during data collection. The spin-down test allows balance data to be collected on the system without interference from the commercial tire spinner 4010. In doing so, a more accurate balance can be achieved.

To perform a spin-down test, the commercial tire spinner 4010 is applied to the TWA 1610 and rotated until the TWA 1610 reaches the test angular velocity. The commercial tire spinner 4010 is then removed, and the TWA 1610 begins to de-accelerate (spin-down) due to friction. Data is collected during this time, while the commercial tire spinner 4010 is not in contact with the TWA 1610 and is therefore not affecting the data.

With respect to FIG. 107 of the drawings, in the context of balancing procedure, the instrumented roller system 83300 is an exemplary tire-balancing sensor system. Other such sensor systems may be used to replace or supplement the instrumented roller system 83300.

Figure 116:
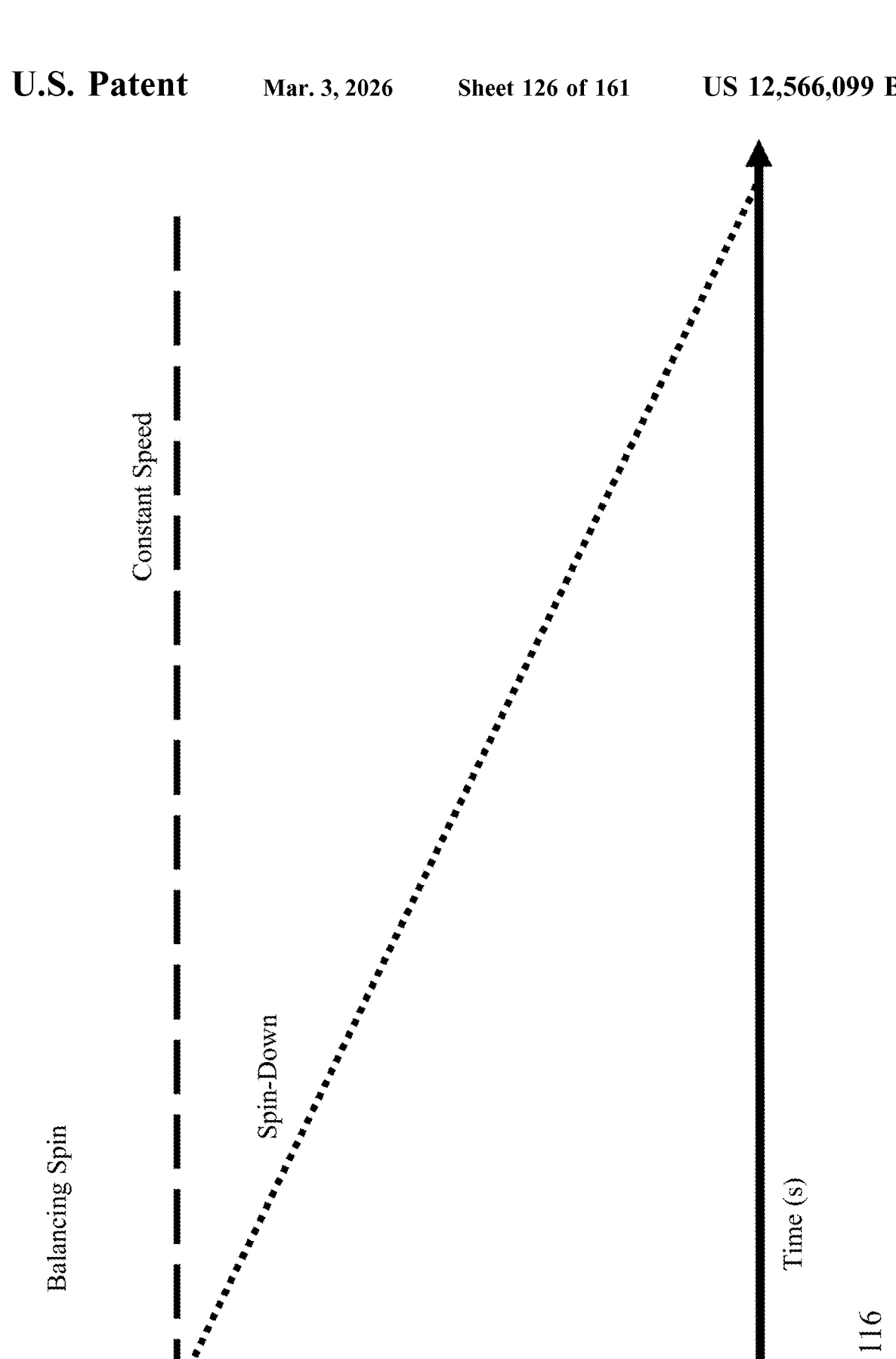
FIG. 116 is a graphical illustration showing the relationship between rotational frequency and time of the TWA during a constant speed vs. spin-down test.

The curves of a typical case of spin-down versus continuous speed testing are shown in FIG. 116 of the drawings. In the spin-down case, the component that spins the TWA 1610, such as the commercial tire spinner 4010 shown in FIG. 107 of the drawings, the roller system 83300, the robotic apparatus 1101 or the gripper system 82200, is removed from contact with the TWA 1610 after the TWA 1610 is brought up to the testing angular velocity such as 10 Hz (test angular velocity may change depending on vehicle 1600 and TWA 1610 size, type, and conditions), at which point friction in the rotating assembly will cause a negative angular acceleration in the TWA 1610 and eventually cause it to cease rotating. This differs from continuous speed testing in which the angular velocity of the TWA 1610 is kept constant, such as through constant contact with the commercial tire spinner 4010.

The method shown in FIG. 114 of the drawings illustrates that the on-car wheel balancing process may be performed using a constant-speed test or a spin-down test. In a constant speed test, the TWA 1610 is driven continuously to maintain a constant speed. In a spin-down test, the driving rotational element is removed from the TWA 1610 and the TWA 1610 is allowed to de-accelerate.

FIG. 116 also illustrates a typical relationship between rotational frequency and time of the TWA 1610 during a constant speed vs. spin-down test. The benefits of a constant speed test are that the data collected by the sensor 1200 represents imbalance at a constant speed. Analyzing the imbalance as such can potentially accent the relevant signals and provide an easier, faster, and/or more complete balancing recommendation. The benefits of a spin-down test are that the TWA 1610 is not influenced by the tire spinner 4010 or other spinning device, or any factors outside of the dynamics of the vehicle 1600, which can provide a more accurate balancing recommendation.

The invention described herein is such that, for any algorithm, sensor type, or other balancing method, a pure constant speed test, pure spin-down test, or combination of the two may be used.

In all balancing methods described herein, the goal is to achieve the minimum imbalance. The gradient descent method for wheel balancing described in detail below does so in two ways: iteratively and using a fit.

Figure 115:
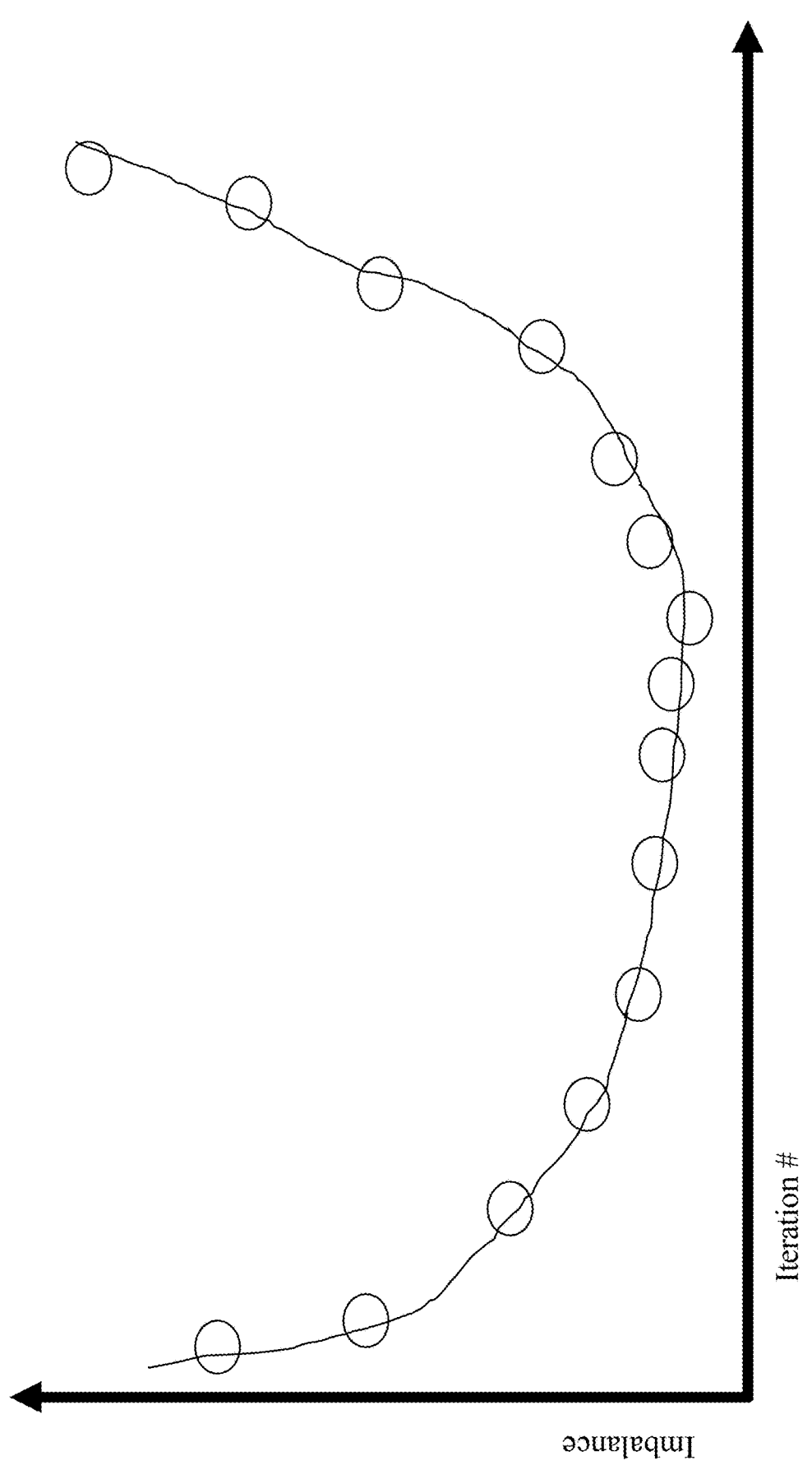
FIG. 115 illustrates an example gradient descent curve for wheel balancing.

FIG. 115 of the drawings illustrates an example gradient descent curve for wheel balancing, in which test weights of varying magnitude are placed at various positions on the TWA 1610 for the purposes of finding a local minimum of imbalance.

In the iterative gradient descent method, the goal is to converge the measured imbalance below some acceptance threshold (e.g., 0.25 oz of total imbalance). The input signal is sent to the data acquisition system 1510 and analyzed by a processor 1530 using the iterative gradient descent method, which outputs a set of balance weight magnitudes and locations that may lower the measured imbalance in the signal. The system may output these values to an automated system such as the robotic automotive service system 1100, or the system may output them to an operator.

Using this output, the recommended weights can be placed, and the process repeated until the measured imbalance drops below the acceptance threshold. An example of the method for recommending weights of the present invention is described below.

For the purposes of this example, the imbalance on the TWA 1610 is assumed to be at 0-degrees.

1. The system has previously determined that the proper balancing weight location is at 180-degrees.
2. Referencing FIG. 115 of the drawings, looking at the iterations from left to right, the magnitudes attempted might be 0, 5, 6, 7, 8, 9, 9.5, 9.6, 9.7, 9.8, 10, 10.4, 11, 12, 13, 15 grams, with 9.7 grams being the optimal magnitude.
3. If the system were to try 8, 9.7, and 11 grams in order, the shape of the curve would form a "bowl". That is, the measured imbalance would drop from 8 to 9.5 and then increase from 9.5 to 11 grams, indicating that the "minimum" is somewhere between 8 grams and 11 grams.
4. The system then attempts 9, 9.6, and 10 grams. Again, a bowl shape is formed, indicating that the minimum is between 9 and 10 grams. Also, the measured imbalance is greater at 9.5 grams than 9.6 grams (results from step 3 and 4), indicating that the minimum is actually somewhere between 9.6 grams and 10 grams.
5. Repeating this process will eventually yield the optimal balance of 9.7 grams.

If an iteration results in an increase in measured imbalance, either the magnitude or location of the recommended weights has advanced past the correct balancing value. Of course, there is an infinite variability in magnitude that may be attempted, so some acceptable resolution (e.g. balanced to 0.2 grams) is needed to limit the criteria for balancing.

Figure 117:
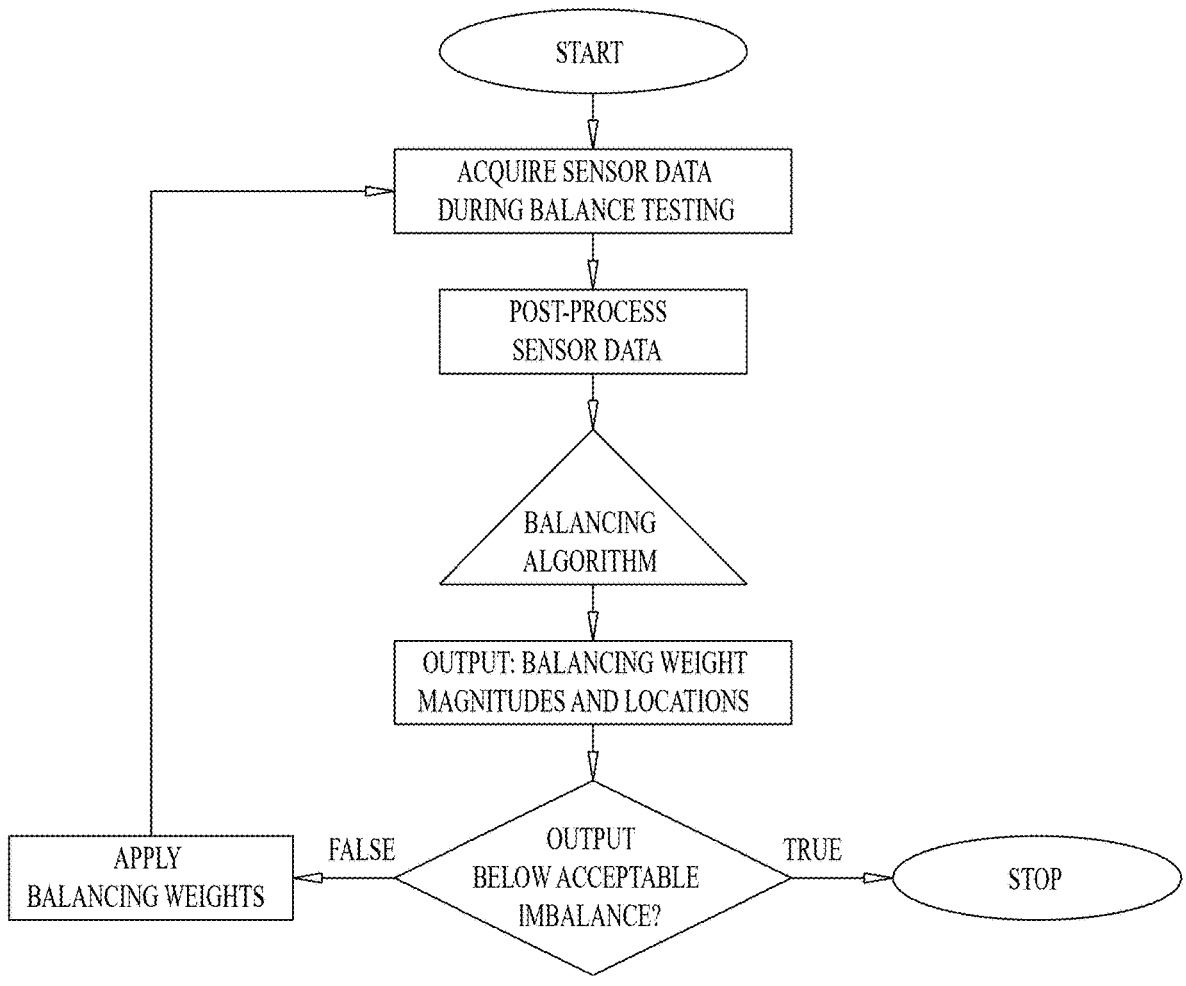
FIG. 117 is a flow diagram of an iterative gradient descent sequence in which an algorithm in accordance with the present disclosure is run.

The same process described above works for balancing weight location. FIG. 117 of the drawings illustrates an iterative gradient descent sequence in which the algorithm is run, and balance weights are applied iteratively until an acceptable imbalance has been reached, the steps of which include:

1. Sensing data is acquired during a previously-described balance data collection process in FIG. 114.
2. The data is post-processed and analyzed by an algorithm as previously described in FIG. 114.
3. If the output is below the acceptable threshold, the gradient descent process is complete.
4. If the output is above the acceptable imbalance threshold, then the gradient descent process repeats. The method of iterating is described above.

Figure 118:
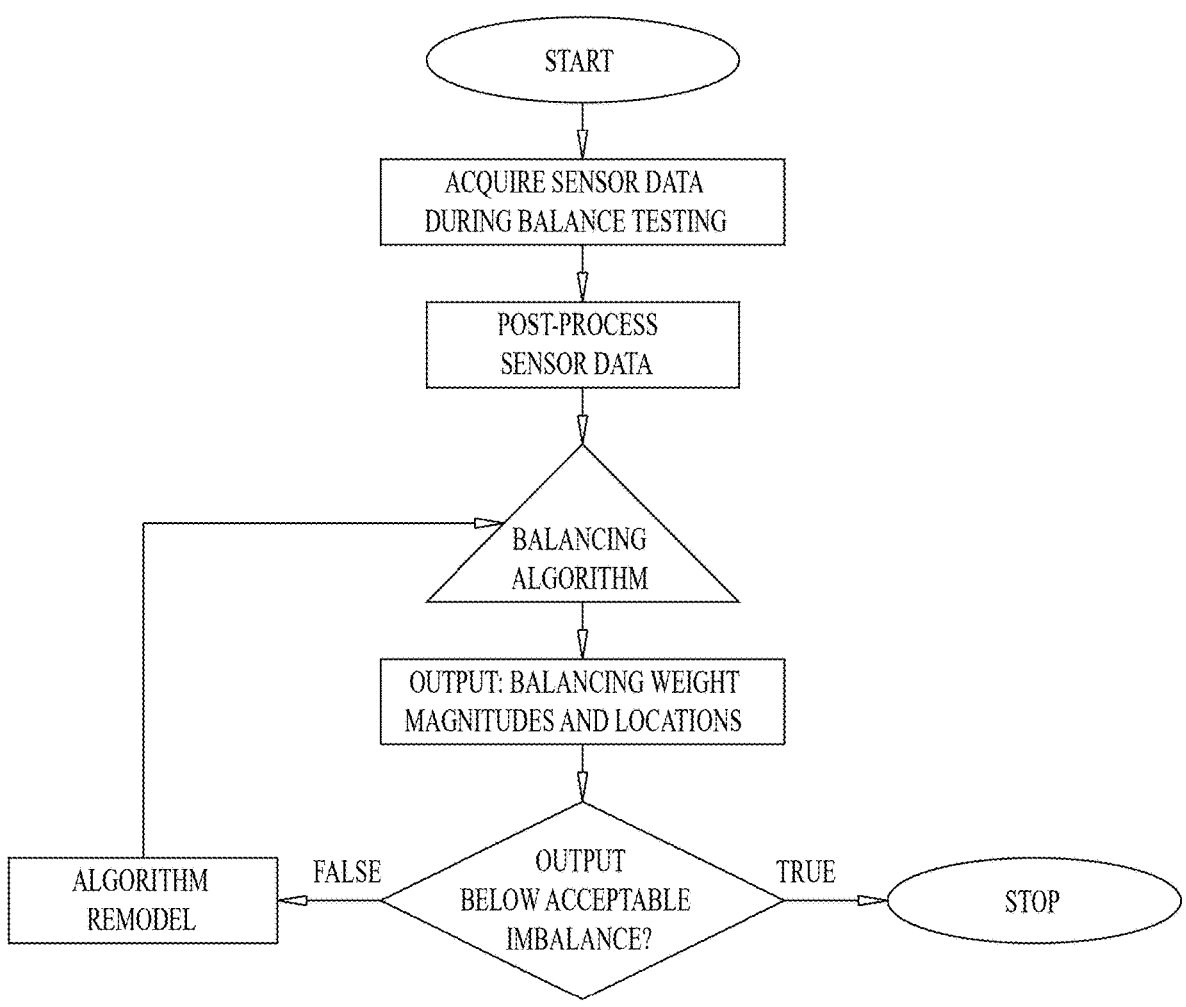
FIG. 118 is a flow diagram of an alternative iterative gradient descent sequence in which the algorithm in accordance with the present disclosure runs iteratively without the application of successive balancing weights.

FIG. 118 of the drawings illustrates an alternative iterative gradient descent sequence in which the algorithm runs iteratively without the application of successive balancing weights. In this embodiment, the algorithm adjusts its model based on the input signal and/or its own output to estimate the effect of placing the recommended balance weights before iterating until an acceptable imbalance has been reached, at which point the balance weights are placed on the vehicle.

Figure 119:
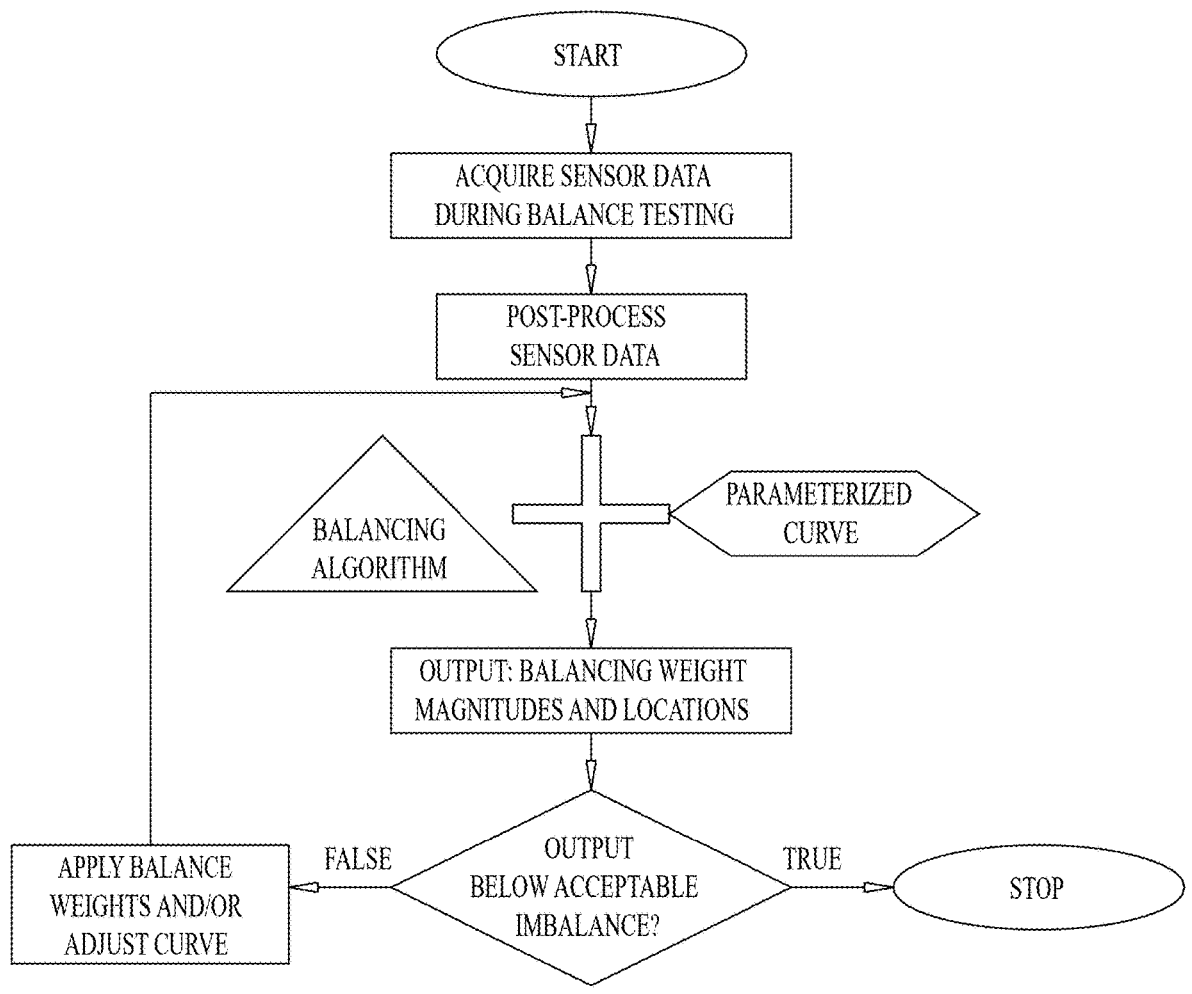
FIG. 119 is a flow diagram of a fit-based gradient descent sequence in which the measured imbalance is compared by the algorithm in accordance with the present disclosure to a parametrized curve.

FIG. 119 of the drawings illustrates a fit-based gradient descent sequence in which the measured imbalance is compared by the algorithm to a parametrized curve. In the fit-based gradient descent algorithm, the concept of minimizing the imbalance signal is the same as in the iterative version. The main difference is that in the fit-based method, the algorithm builds a parameterized, estimated curve of the input signal versus the actual imbalance. Parameters for this curve could include an estimated suspension stiffness, TWA 1610 stiffness, bearing friction, and more. The input signal is compared to this curve by the algorithm, which then outputs a set of balancing weight magnitudes and locations which it estimates will minimize the actual imbalance reading on this curve. The system may output these values to an automated system such as the robotic automotive service system 1100, or the system may output them to an operator. Using various methods, the curve parameters may be adjusted to provide more accurate outputs of the algorithm. Examples of curve parameter adjustments include system identification, curve fitting (to previously generated curves), or simulation. Alternatively, an operator may manually adjust the curve parameters during operation.

Figure 120:
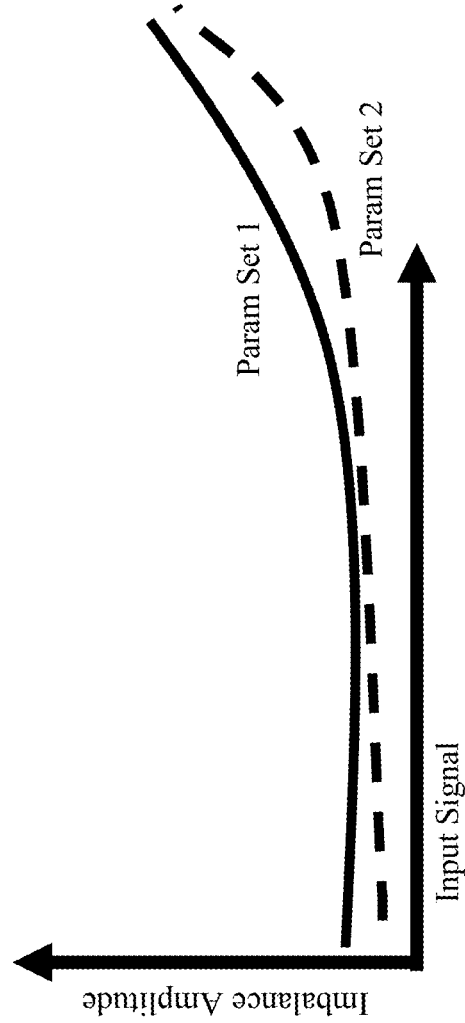
FIG. 120 illustrates a sample curve-fit for the fit-based gradient descent algorithm in accordance with the present disclosure.

FIG. 120 of the drawings illustrates a sample curve-fit for the fit-based gradient descent algorithm.

Discussing FIGS. 119 and 120 in context of on-vehicle wheel balancing, the fit curves may be built using previous iterative balancing methods to form a curve of best fit between the iterations. Alternatively, the fit curves may be built using another algorithm such as system identification or machine learning. Alternatively, the fit curves may be built using physics models based on estimations or the actual system dynamics using known values (e.g., suspension stiffness, dampener curves, etc.)

Fit curves represent idealized, modeled, or known imbalance-to-signal curves. They may be generated using mathematical models or simulations. They may also be generated through iterative balancing processes using many iterations and typical curve-fitting processes in the prior art (e.g., linear regression, polynomial fit)

An example of using curve-fitting with a curve generated by a prior gradient descent is provided below:

1. A 2005 Toyota Rav4 comes to a shop for balancing. An operator performs an iterative gradient descent as previously described.
2. A second 2005 Toyota Rav4 comes into the shop. This vehicle may have different dynamics than the first one (different condition, mileage, aftermarket work, etc.)
3. The balancing system attempts a first iteration for balancing the TWAs of this second Rav4. The point generated by this iteration can be placed on the completed gradient descent curve of the first rav4. Using that completed curve, the system can then estimate what balance weight magnitudes and locations would cause the next iteration point to land on the minimum value of the first, completed curve.
4. After performing this second iteration, the point may not land at the minimum value of the first, completed curve, but it may be below the acceptance threshold and thus considered "balanced." Even if that is not the case, it is possible that that second guess, which was more "educated" than a blind iteration, can accelerate the balancing process compared to the process without access to the first, completed curve. The system may repeat steps 3, 4 to more quickly balance the TWAs 1610.

Figure 121:
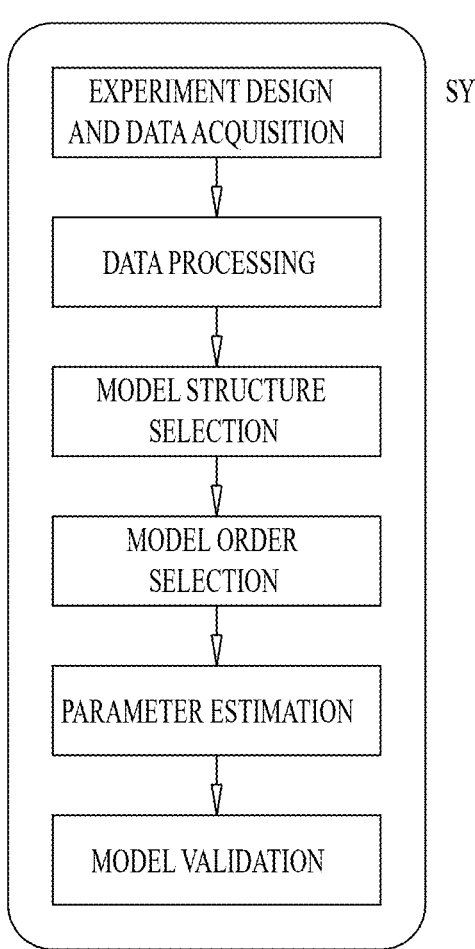

FIG. 121 of the drawings illustrates a system identification (SID) process. SID is the process of constructing a dynamical model from observed data. There are multiple approaches, but in each the user will select the order of the system and potentially also the structure. In the context of on-vehicle wheel balancing, the steps of one embodiment of SID can be described as follows: The sensor 1200 is placed in an appropriate location on the vehicle 1600. Balance-related data is collected by the sensor 1200 using the constant speed or spin-down process described previously. The collected data is sent to and processed for consumption by a system estimator program on the computer 1500. The user or system selects a model structure (ARX, ARMAX, Box-Jenkins, etc.) and order based on additional information. The model structure refers to the structure of the equation used to build the model of the system. The order of the model refers to the largest order polynomial in the model. The data set is split into a modeling portion and a validation portion. The modeling portion is then run through the system estimator. Once the estimation is complete, the validation portion of the collected data is run through the resultant model for validation purposes. If the validation is successful, the model may be used for balancing. Successful validation is determined by how well the output of the identified model predicts the validation data. A successful model will closely predict the validation data.

The model structure selection and model order selection steps of the process may be performed by the system user. In an alternative embodiment, a secondary algorithm may make these selections based on information such as the type of vehicle being balanced, age of the vehicle, type of rims on the TWA 1610, and other such parameters. In yet another alternative embodiment, the selections may be pre-populated in a list which accounts for these parameters (i.e., if a 2007-2015 pick-up truck with a weight over 1000 kg is being balanced, choose selection 7 from the list).

Figure 122:
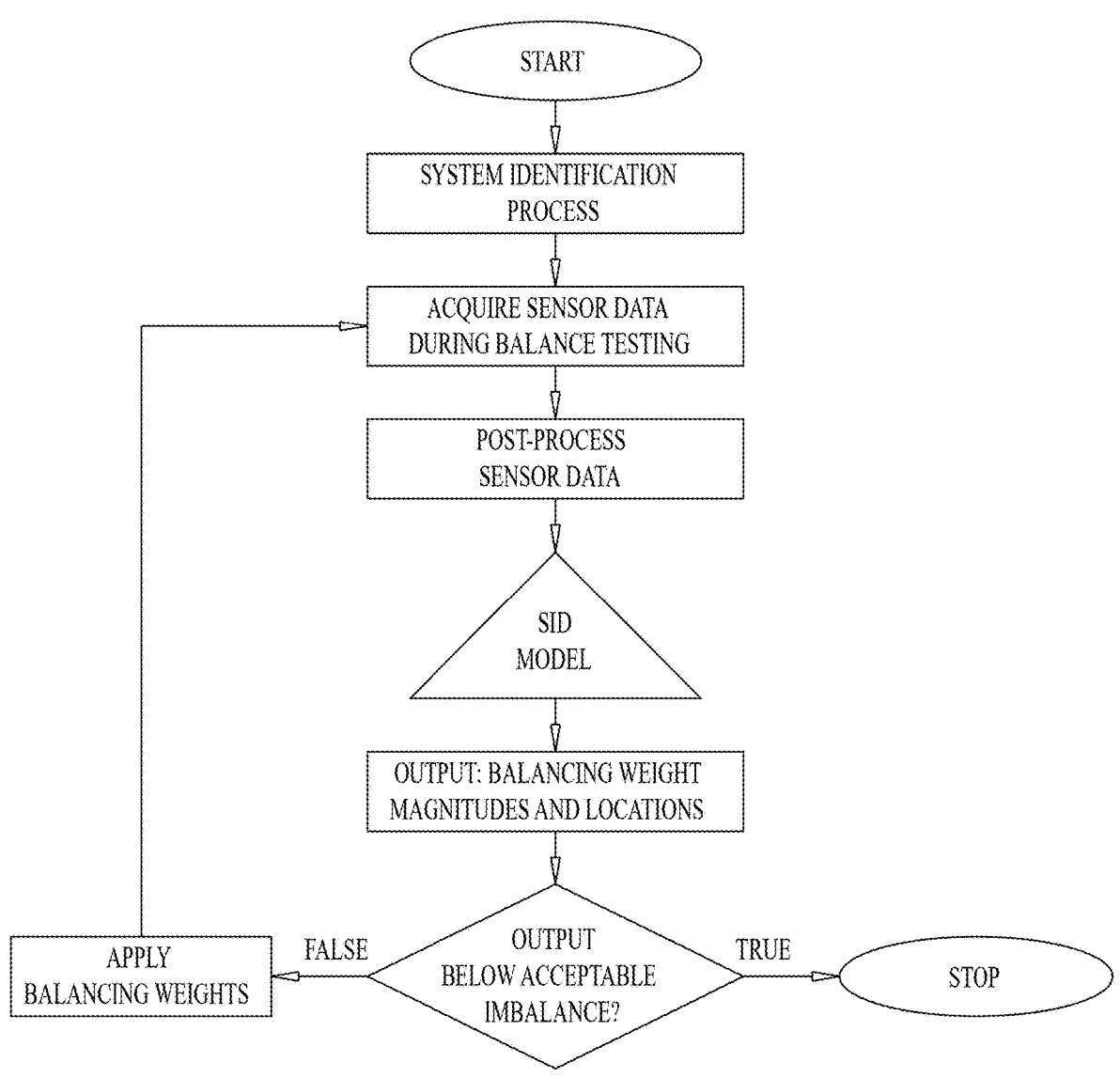

A method of using SID for the on-car wheel balancing process is depicted in FIG. 122 of the drawings. As described previously, one of the main challenges with balancing the TWA 1610 on the vehicle 1600 is that unknown vehicle dynamics are at play in the system, making it difficult to produce a mathematical balancing model from the core physics. These unknown dynamics include the unknown spring constant, mass, and dampening coefficient of the suspension, the vehicle lift, and any other components of the vehicle that vibrate or move in response to the wheel imbalance. SID bridges that gap by estimating the model parameters of the vehicle dynamics, producing an approximate model for the system by which the imbalance signal can be processed. The application of SID therefore represents a potentially critical improvement in on-vehicle wheel balancing.

Further referencing FIG. 122 of the drawings, assuming that the SID model has been completed and validated using the steps previously outlined. FIG. 122 of the drawings outlines a method for using such a model for final on-vehicle balancing. Balance data is collected and post-processed before being fed into the SID model previously produced. The SID model can use this data for calculating the imbalance in the system and recommend balancing weight magnitudes and locations. If the resultant imbalance is below an acceptance threshold, the balancing procedure is done. Otherwise, the balancing weights are applied, and the process is repeated until the resultant imbalance is below the acceptance threshold.

Further referencing FIG. 122 of the drawings, if the resultant imbalance is below the acceptance threshold, the algorithm may use the input signal, its own output, or both to re-model its parameters or other values and re-run, effectively iterating on the sequence without requiring the physical placement of the recommended balancing weights. The output of the SID model may be fed into a secondary algorithm, such as a physics model for additional processing before outputting balancing weight magnitudes and locations.

Figure 123:
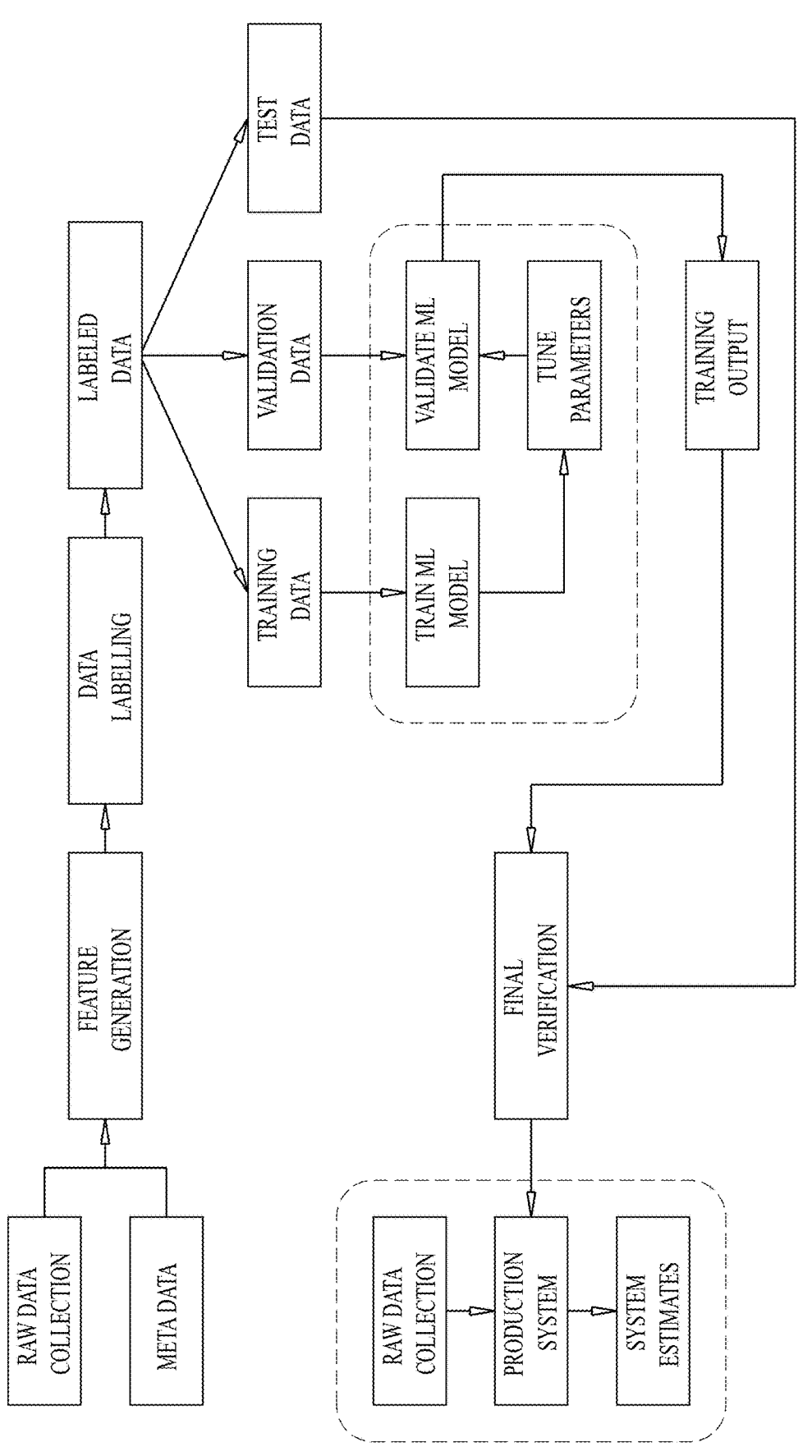

FIG. 123 of the drawings illustrates an example of a machine learning (ML) system architecture for on-vehicle wheel balancing. For this process, meta data is first loaded into the model that contains "ground truth" assertions of a particular model. This metadata is collected by the operator and includes the actual geometry of the TWA 1610, test spin speed, any test weights applied to the system, and other test data. An example of a ground truth in wheel balancing might be the magnitude and location of a balancing weight the operator has applied to the TWA 1610. Metadata and "ground truth" data is used for training the ML system.

In the example of a machine learning (ML) system architecture for on-vehicle wheel balancing shown in FIG. 123 of the drawings, a sensor 1200 is attached to the vehicle 1600. During the balancing procedure, this sensor 1200 collects data related to the balance of the system. This data is used for feature generation. An example of a relevant feature in the data set could be an amplitude spike at a regular frequency which might indicate an imbalance. Feature generation involves the ML model "looking" mathematically through the training data and choosing features of the data that best differentiate the different variables in the test. In balancing, these variables are usually imbalance magnitudes and locations, and the feature selection would select parts of the data set that illustrate different reactions of the sensor due to varying magnitudes and locations. An example of a relevant feature would be if the peak of the curve of sensor amplitude over frequency at 8 hz showed a distinct pattern that was dependent on the magnitude of imbalance weight, such as a linear relationship where sensor amplitude was 2 units at 5 grams of imbalance and 4 units at 10 grams of imbalance. The ML system would be able to choose the sensor amplitude at 8 hz as a relevant feature for determining imbalance magnitude. The ML model can "guess" at and iterate on relevant features in the data set. This would involve choosing a set of features, building an ML model, and testing that model against validation data. If the validation is unsuccessful, the ML model iterates on a new set of features and retries. This process continues until the model is validated.

In the example of a machine learning (ML) system architecture for on-vehicle wheel balancing shown in FIG. 123 of the drawings, the features and ground truth data are labeled with the overall data stream. Ground truth data and other meta data is labeled by the operator. Features are labeled by the model once selected. The entire data stream is then split into three parts: training data, validation data, and test data. An operator may perform the data split, but in general the computer 1500 will perform this operation and train and validate the model over many iterations of splits to reduce the chance of outliers skewing the model. In wheel balancing, this would correspond to imbalance signal data used to train the ML model, different imbalance signal data used to validate that the model can accurately analyze data outside the training set, and a further set of imbalance signal data to verify that the in-use model can recommend the correct balance weight magnitudes and locations for a test system, respectively. In the preferred embodiment, the test data especially (but potentially all data) is taken from a calibrated system where the user can verify that the model outputs are as expected based on the system calibration. An example of this would be to first train the model using a calibrated TWA 1610 with known imbalance masses and locations. If the calibrated TWA 1610 had a known imbalance mass of 20 grams at 90-degrees, the expected output of the ML model would predict that same imbalance (to within some tolerance specified by a model calibration procedure).

In the example of a machine learning (ML) system architecture for on-vehicle wheel balancing shown in FIG. 123 of the drawings, the production ML model represents an estimated relationship between features and the ground truth. In the wheel-balancing case, this is a relationship between the imbalance signal and the actual imbalance magnitude and location.

The steps described in FIG. 123 of the drawings are as follows:

1. Collect raw data and meta data from testing the system the ML model will be trained on. In the case of on-vehicle balancing, this would mean collecting imbalance signals from a balancing system 2000 using a TWA 1610 with a known imbalance and varying that imbalance magnitude and location across many tests. The metadata is the data describing that data (e.g., imbalance mass, imbalance location, TWA geometry, vehicle type).

2. The ML model will generate features as previously described.

3. All the test data streams will be labeled and sorted by the ML system according to the metadata and generated features.

4. The labeled data is split into training data, validation data, and test data by the ML system, such as into an 85%, 10%, 5% respectively. The data split is commonly iterated on many times and the ML model parameters averaged across the splits to reduce the effect of outliers. These iterations involve taking a different 85%, 10%, and 5% of the data for training, testing, and validating respectively in each iteration.

5. The training data is used to tune parameters of the ML model to predict the imbalance. To do so, the ML model compares features in each training data stream to the meta data and ground truth. It then adds weight and coefficients to mathematical parameters (the structure of which depends on the specific ML structure chosen) which form an equation that uses the feature values as inputs to predict the output, which is the imbalance on the system.

6. To validate, the newly trained ML model attempts to predict the output of the validation data sets, which it has never "seen" before and has not trained on.

7. If the training output is good, the mode is inserted into the final verification step.

8. In this verification step, the trained and validated model is checked against the test data to determine how accurately the model can predict this new data.

9. If successful, the model goes into the production system, where it takes in raw data and outputs estimates of the system imbalance.

Figure 124:
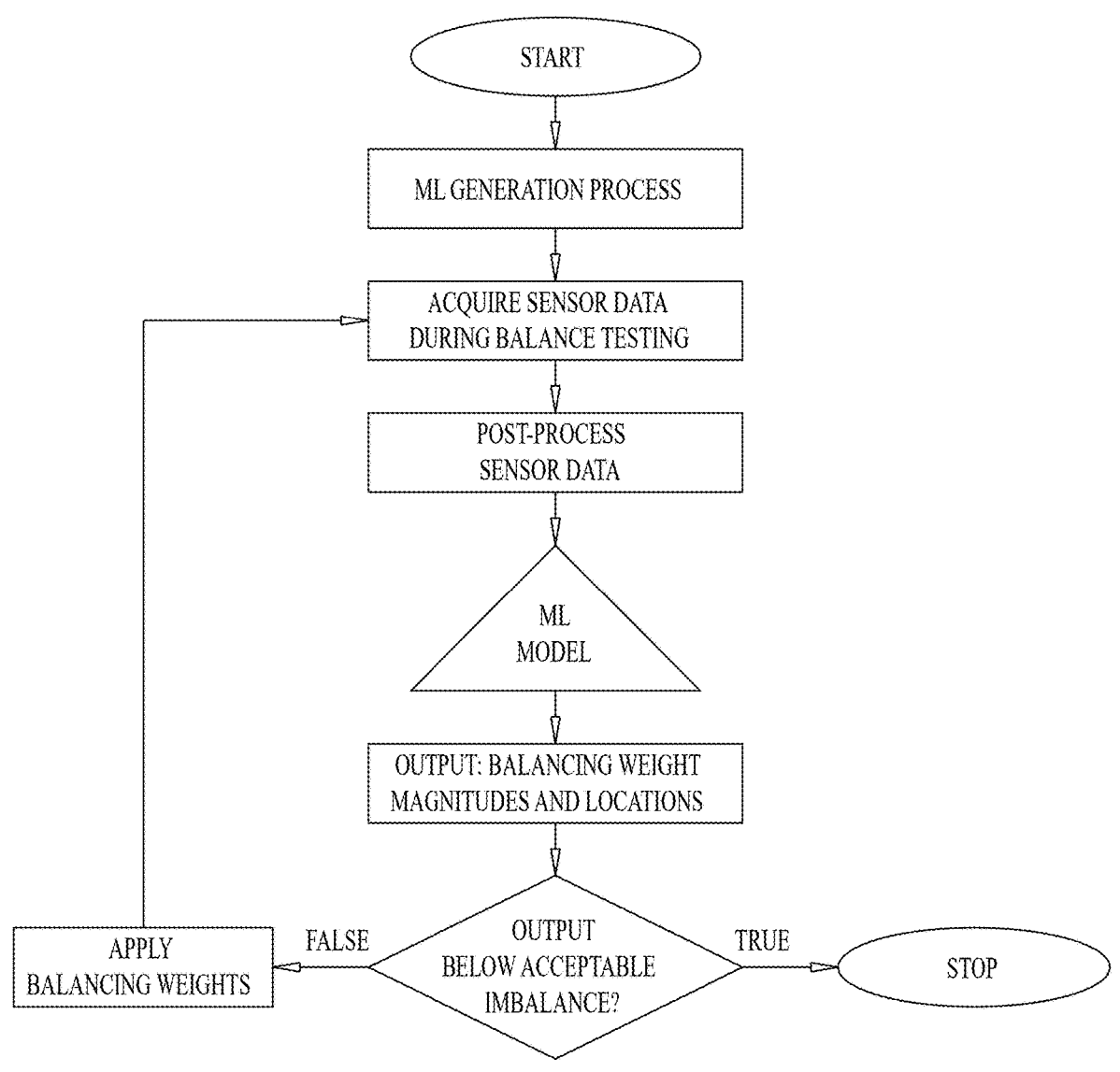

FIG. 124 of the drawings illustrates an exemplary process of wheel balancing using an ML algorithm after the development of a wheel-balancing based ML model using the process shown in FIG. 123 of the drawings. An imbalance signal is acquired from a vehicle 1600 to be balanced, and the signal is post processed by the processor 1530. In the preferred model, the post-processing includes a Fourier transform and a low-pass Butterworth filter of a frequency of at least the TWA 1610 rotating frequency. The data is then fed into the ML model, which outputs balancing weight magnitudes and locations. If the output falls below an acceptance threshold, the balance is sufficient. The acceptance threshold has been previously described and is the upper threshold of imbalance considered "acceptable" by the system. If the resultant imbalance is below the acceptance threshold, the algorithm may use the input signal, its own output, or both to re-model its parameters or other values and re-run, effectively iterating on the sequence without requiring the physical placement of the recommended balancing weights. The output of the ML model may be fed into a secondary algorithm such as a physics model for additional processing before outputting balancing weight magnitudes and locations.

Figure 125:
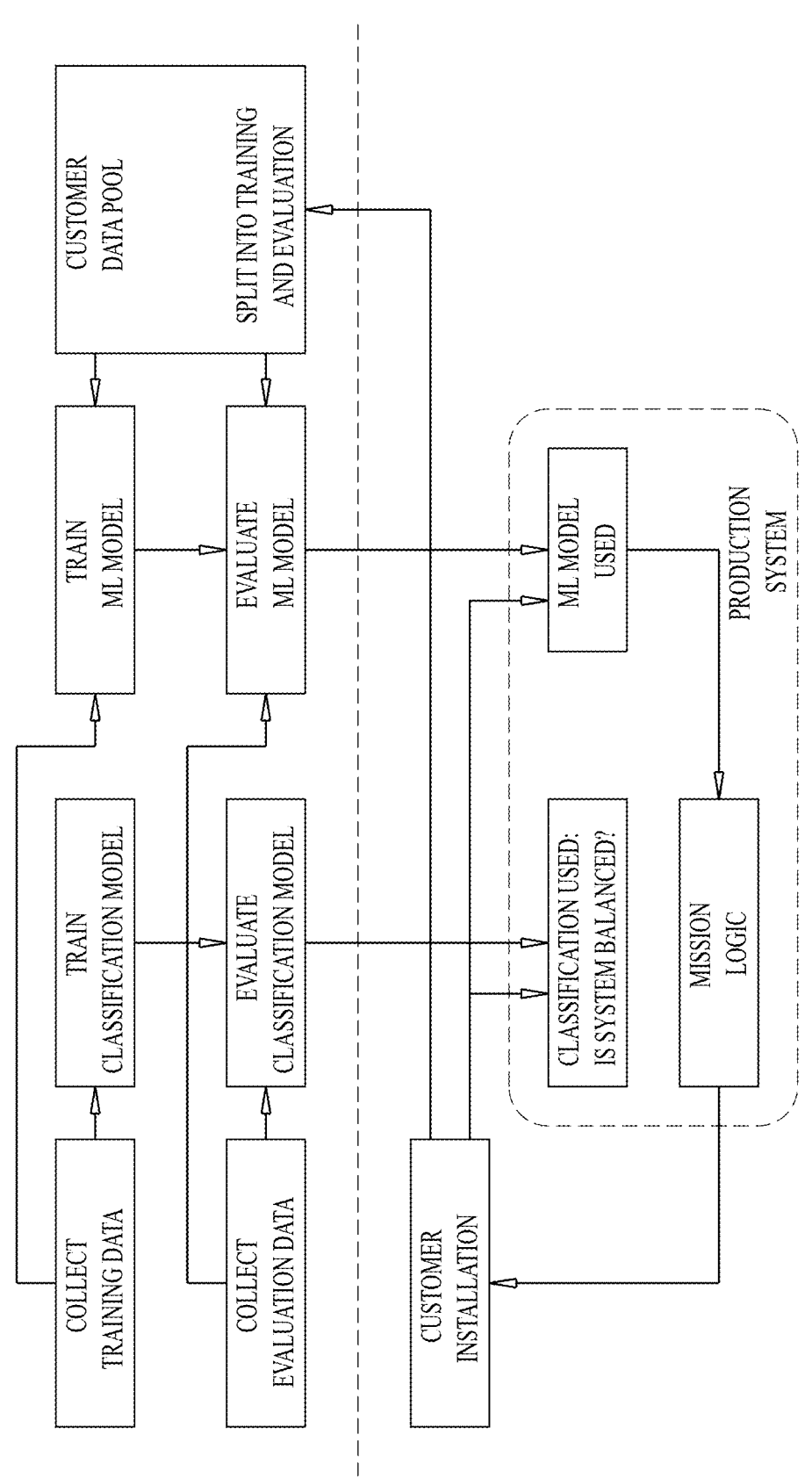

FIG. 125 of the drawings illustrates a method for recovering additional training data for the ML model through customer testing. This allows for continued development and refinement of the ML model while the system is deployed. A key step in this system is the classification model, which is a specialized model that can evaluate whether the system is below the "acceptance" threshold. It is not optimized for determining the absolute value of imbalance or determining the proper balancing procedure, and is specialized for determining whether a system's imbalance is "acceptable".

The steps to this "classification" method are as follows:

1. Collect and train the machine learning model as previously described.

2. Collect evaluation data and train a "classification model" following a similar procedure to the ML training.

3. Deploy ML and classification model to a production environment.

4. Using the ML model, balance TWAs 1610. During this process, the ML model does not have to be perfect and able to balance any TWA 1610. Rather, it just has to be able to improve the balance with each iteration.

5. After running the ML model, perform "mission logic" which is simply the logic for instructing the customer system on where to place balance weights on the TWA 1610 along with other operational steps.

6. After customer installation of the balance weights, the classification model is used to determine if the system is at "acceptable" levels of imbalance. If false, the system repeats steps 4-6. If true:

7. The balance iteration details and ML features are exported to a customer data pool. The data includes the value of the ML features used in balancing, the magnitude and location of each iteration of balance weights, and the output of the classification model after each iteration.

8. The customer data pool is split into training and evaluation data. This data is added to the existing training and evaluation data and is used to train the ML and classification models.

As the customer data pool grows, the ML and classification models will improve (it is typical of mathematical models to improve with larger data sets). Periodically, new versions of the ML and classification models may be released to the customer system to improve the production process.

In one or more of the embodiments of present invention, data from the process may be post-processed before inputting into the balancing algorithm, such as using moving average filters, band-pass filters, or Fourier Transforms. Alternatively, the algorithm may be fed raw (not post-processed) data.

Additionally, in one or more of the embodiments of the present invention, multiple algorithms may be combined in parallel, series or a combination of both. For example, an iterative gradient descent may be used to generate the initial training data for a machine learning algorithm. A system identification and ML algorithm may be used to generate system parameters in parallel to improve the likelihood of good feature generation. An ML model may be generated and used to reduce the number of iterations required in a curve-fit gradient descent.

Furthermore, in one or more of the embodiments of the present invention, the output of the algorithm may be post-processed.

Even furthermore, in one or more of the embodiments of the present invention, the algorithm may be run multiple times on the same data or on each output to iterate on a solution, check the consistency of a solution, for training, or for any other purpose.

Additionally, in one or more of the embodiments of the present invention, a system dynamics modeling system 3600 or similar system dynamics estimation, measuring, or calculation system may be used to supplement the algorithms and methods discussed.

As described above, vehicle dynamics present a challenge to on-vehicle wheel balancing that can be overcome through proper design of sensing methods and analysis algorithms. When acquiring a signal from sensors placed to detect imbalance, it is inherent that some aspect of that signal will be related to the vehicle dynamics since the rotating imbalanced mass is attached to the rest of the vehicle.

Figure 126:
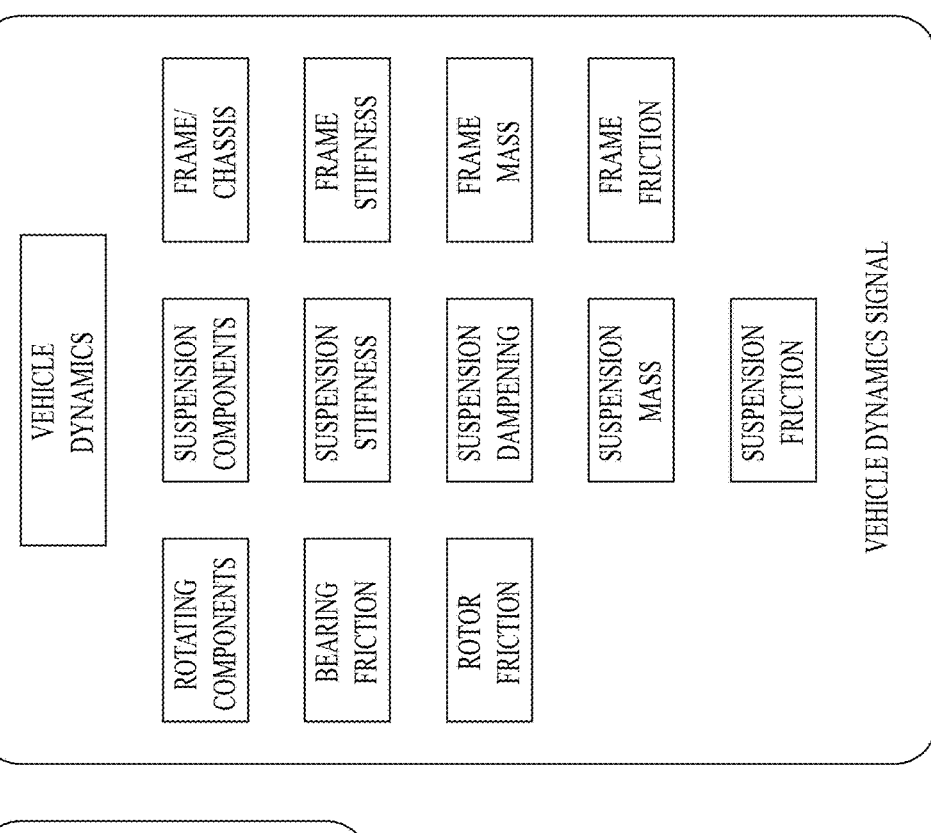

FIG. 126 of the drawings shows an exemplary diagram of the contents of a typical signal acquired during the wheel balancing process. A portion of the signal is representative of the rotational assembly imbalance, the "imbalance signal". Another portion is the "vehicle dynamics signal" and is affected by a myriad of different parameters that influence the physics of the vehicle response to various inputs. FIG. 126 of the drawings is for illustrative purposes only. Additional physical parameters exist in the vehicle dynamics and imbalance signals, and in the acquired signal itself (i.e., electrical noise). Furthermore, the acquired signal is not usually so neatly disambiguated into its parts—there is some coupling between the vehicle dynamics and the associated imbalance signal and vice versa. The embodiment shown in FIG. 126 of the drawings is exemplary, but non-exhaustive or exclusive.

The same methods used to extract useful imbalance data from the acquired signal (SID, ML) can be used to identify other phenomena in the same signal. For exemplary purposes only, a mass imbalance in the TWA 1610 would generally be present in the acquired signal at a frequency equal to that of the wheel speed (e.g., if the wheel was spinning 4 times per second, the imbalance signal would be present at 4 Hz). If the wheel bearing on the rotational assembly of that wheel was wearing out, it might present a vibratory signal, or "chatter", at a higher frequency, such as 20 Hz. These two features, a recurring signal at 4 Hz and one at 20 Hz, can be disambiguated using the algorithmic analysis previously discussed.

Figure 127:
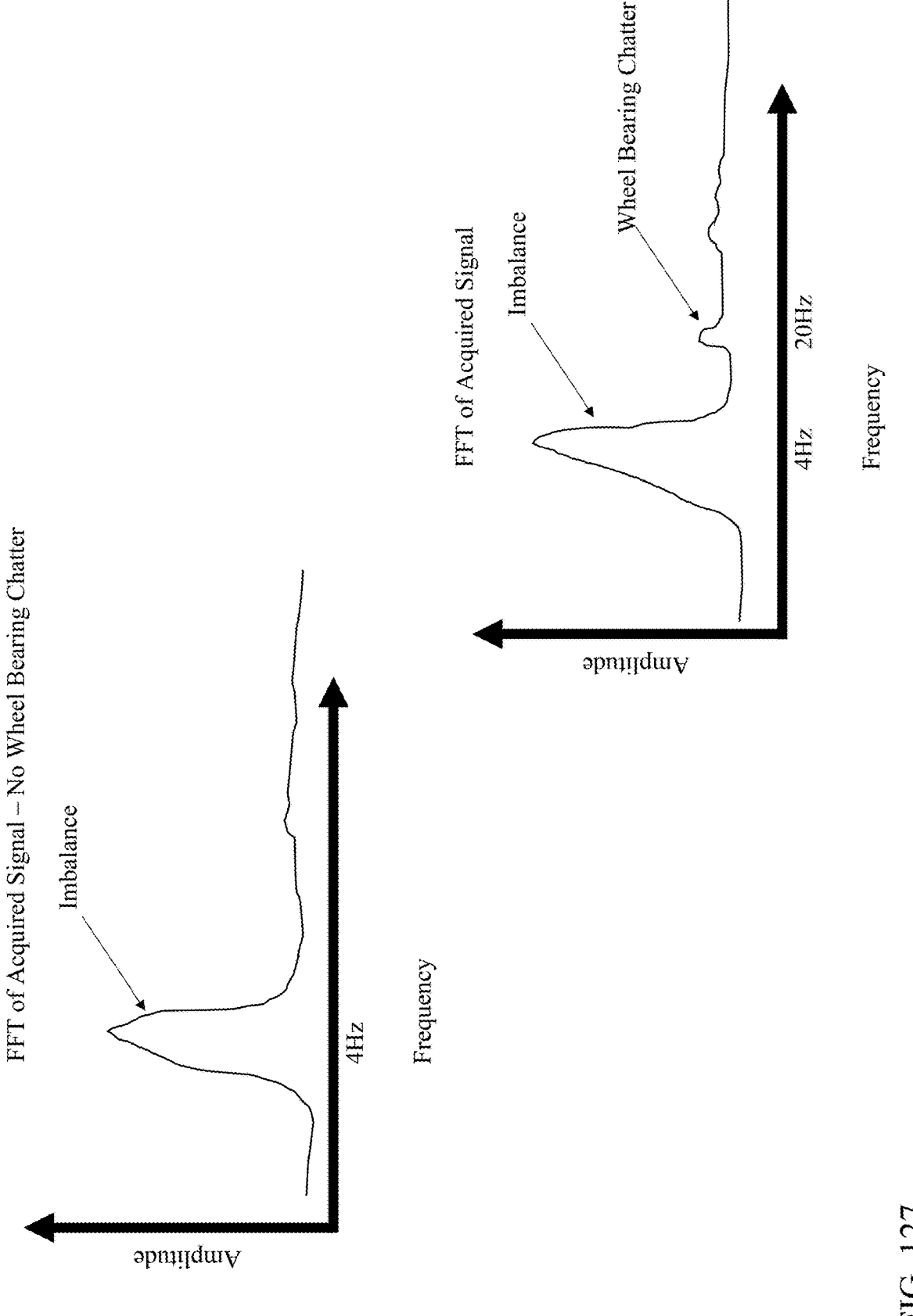

FIG. 127 of the drawings illustrates the above example by showing the fast-Fourier transform (FFT) of an acquired signal. The amplitude spike at 4 Hz represents the imbalance, while the one at 20 Hz represents the wheel bearing chatter. This same disambiguation can be achieved through other algorithmic means and analyzed using the wheel-balancing algorithms discussed above. A conclusion that could be made from the disambiguated signal in FIG. 127 of the drawings is that, in addition to having an imbalance in the rotational assembly, the wheel bearing is likely wearing and requires changing as part of a predictive maintenance plan.

The example in FIG. 127 of the drawings is non-exhaustive. As described in FIG. 126 of the drawings, there are many aspects of the vehicle dynamics that will influence the acquired signal. In accordance with one aspect of the present invention, analyzing the acquired signal through a framework of SID, ML, and other algorithms allows for the disambiguation of aspects of the vehicle dynamics related to maintenance parts. A non-exhaustive list includes:

Wheel bearing chatter-Bearings need to be changed.

Loss/Gain in dampening coefficient-Dampener needs changing or tuning.

Loss in stiffness-Suspension springs are losing their elasticity; Suspension springs need to be changed.

Increase in signal decay; Higher friction in the system-Rotors need to be serviced, suspension elements need service, wheel bearings need to be serviced.

As is apparent, predictive maintenance items may be determined using on-vehicle signal acquisition while animating some aspect of the vehicle. The animation method may be rotating the TWA 1610 either in a continuous speed or spin-down manner; however, rotation can be driven by contact with the rotating assembly 1620 with or without a TWA 1610 present.

Another method of animating the vehicle for use in predictive maintenance is by providing an impulse input (such as a sharp hit with a hammer) to a part of the vehicle 1600 such as the TWA 1610 or the suspension 1630. The response in the acquired signal of this impact (impulse-response testing) can be fed into modified versions of the algorithms previously discussed for the purposes of predictive maintenance.

Another method of animating the vehicle for use in predictive maintenance is by pseudo-linear actuation of the suspension by a linear actuator or jackstand like device. Such a device has already been previously described.

The above methods of animating the vehicle for use in predictive maintenance are non-exhaustive.

Another aspect of the present invention is the use of a database lookup function for predictive maintenance. An autonomous on-vehicle wheel balancing system collects a myriad of data (the acquired signal) about the dynamics of the vehicle. Over time, enough data per vehicle will be collected to make educated assumptions about the conditions of vehicles being balanced. By analyzing this data using the algorithms previously discussed, a database of features sets can be established which predict required maintenance items based on historical data and changes in the acquired signal over time.

More specifically, as the balancing system 2000 is utilized, the available balancing signal data pool will increase in size. This data pool will also include features related to predictive maintenance (an example of which is shown in FIG. 127 of the drawings). As the data pool grows, similar signals will repeat. For example, wheel bearing chatter signals may appear in many vehicles with the same issue. As the data pool grows, the difference between a "normal" signal and a "maintenance required" signal will become clearer for a vehicle or subset of vehicles. Furthermore, the maintenance issues represented by the "maintenance required" signal will be further disambiguated (a "wheel bearing chatter" maintenance required signal will look very different than a "rotor scraping" one). A computer 1500 may collect and analyze these signals. As each maintenance issue signal is disambiguated, the properties of that signal are placed into a table along with other meta data (vehicle type, component mileage (e.g., miles since last bearing replacement), environmental conditions). Once this table is generated by the computer 1500, it is available for use by the system at any time.

By way of example, the system has determined the signal for wheel bearing chatter in 2014 Toyota Rav4s, along with the most common mileage and environmental conditions associated with this wear. The system may compare an acquired signal to the signal for wheel bearing chatter to determine if maintenance on that component is required. Whether or not that signal is acquired, the system may also determine that maintenance is likely to be required on that component soon and alert the customer or operator.

The robotic automotive service system 1100 formed in accordance with the present invention and the individual systems, apparatus and methodology used thereby, by be embodied in various forms, such as a self-service station and a mobile service station, and may perform a variety of tire servicing procedures/operations including but not limited to tire alignment, wheel balancing, tire rotation, cleaning, waxing and buffing.

Making reference to FIG. 135 of the drawings, the robotic automotive service system 1100 formed in accordance with one form of the present invention may be embodied as a self-service station 6200 for tire and vehicle maintenance. The self-service station 6200 preferably comprises a system interface 6210, an enclosure 1710, a lift 170,1700 or lift system 5000, and one or more of the robotic apparatus 1101.

The system interface 6210 communicates with the electrical panel 1103 and computer 1500 to effect changes to the robotic automotive service system 1100.

The enclosure 1710 consists of one or more safety sensors 1290. These safety sensors 1290 may include lockout switches, light curtains, area scanners, or other sensors which may be utilized for detecting an object or person entering the workspace of the robotic automotive service system 1100. The safety sensors 1290 communicate with the electrical panel 1103, computer 1500, and PLC 1540 and preferably powered by the electrical panel 1103.

FIG. 136 of the drawings illustrates an exemplary system interface 6210, which includes a payment portal, a tire selection screen, and a customer and vehicle information screen; however, other screens may also be incorporated into the system interface 6210 for inputting the information necessary for service.

The self-service station 6200 is configured such that a customer may drive their vehicle 1600 into the station and onto the lift 170, 1700 or lift system 5000. The self-service station 6200 may include a vehicle conveyor (not shown). More specifically, the customer may drive their vehicle 1600 onto a vehicle conveyor. Once the self-service station 6200 senses the customer is clear of the vehicle 1600, the vehicle conveyor is actuated to move the vehicle 1600 onto the lift 170, 1700 or lift system 5000.

The self-service station 6200 is configured such that once the vehicle 1600 is on the lift 170, 1700 or lift system 5000, the enclosure 1710 bars the human from entering, either with a physical barrier or via safety sensors 1290, which stop the system motion if they detect the presence of a human in the safety area. The safety sensors 1290 may detect the presence of a human by detecting motion or the thermal signature of a human in the space. A more detailed description of the enclosure and safety components thereof was described above.

Once inside the enclosure 1710, the vehicle 1600 may be serviced by the robotic automotive service system 1100 according to the customer's selections on the system interface 6210. The level of service is dependent on the capabilities of the robotic automotive service system 1100, but may include tire changing, tire rotating, wheel balancing, cleaning, wheel alignment, or any other task of which the Robotic Automotive Service System 1100 is capable.

When service by the robotic automotive service system 1100 is complete, the vehicle 1600 is allowed to exit the enclosure 1710. In alternate embodiments, the vehicle 1600 may be boarded and driven out by the customer or moved out by the vehicle conveyor 1720. The customer's payment method is charged according to the services rendered by the self-service station 6200 and selected by the customer at the system interface 6210.

The self-service station 6200 may further include the tire handling system 9000 described herein. The tire handling system 9000 allows the self-service station 6200 to house tires and dispense them to the robotic automotive service system 1100 depending on the customer selection at the system interface 6210.

While power to the self-service station 6200 may be provided by an external power source, preferably, power is provided by a generator 6220, solar panels 6230, or some other integrated power-production device which allows the station to run without being connected to an external power source. The self-service station 6200 may also be connected to an existing power grid via another structure, a utility pole, underground utility, the main power panel of another facility, wirelessly powered, or any other method of connecting power from one location to another.

Preferably, the self-service station 6200 is fully autonomous; however, the self-service station 6200 may also be operated manually or semi-autonomously. For example, the self-service station 6200 may be operated by hand, via a wired or remote panel on-site, via teleoperation or by any other means.

Now making reference to FIG. 137 of the drawings, the robotic automotive service system 1100 formed in accordance with one form of the present invention may be embodied as a mobile service station 6300 for tire and vehicle maintenance. The mobile service station 6300 is similar to the self-service station 6200. Differences include that the mobile service station 6300 contains additional functionality in the system interface 6210 for maintenance, service, and operation of the robotic automotive service system 1100. Additionally, the mobile service station 6300 has an operator who can perform additional service steps on the vehicle outside of or in addition to the capabilities of the robotic automotive service system 1100. In the mobile service station 6300 the operator may drive the vehicle 1600 in and out of the enclosure 1720.

Preferably, the mobile service station 6300 is powered by a generator 6220, solar panels 6230, or some other integrated power-production device which allows the station to run without being connected to an external power source. Nevertheless, the mobile service station 6300 may also be connected to an existing power grid via another structure, a utility pole, underground utility, the main power panel of another facility, wirelessly powered, or any other method of connecting power from one location to another. FIG. 137 of the drawings shows a preferred embodiment in which the mobile service station 6300 is configured as a vehicle with its own power source and can move between locations without assistance by an external transportation device. In an alternate embodiment, the mobile service station 6300 is configured to be fit onto a flat-bed truck, moving fan, forklift, or other transportation device, and moved to various locations.

Preferably, the mobile service station 6300 is fully autonomous; however, the mobile service station 6300 may also be operated manually or semi-autonomously. For example, the mobile service station 6300 may be operated by hand, via a wired or remote panel on-site, via teleoperation or by any other means.

An alternate embodiment of the invention shown in FIG. 135, is a secondary service bay, which is similar in principle and operation to the self-service station 6200 and the mobile service station 6300.

The secondary service bay preferably comprises consists of a point-of-sale interface (POS), an enclosure 1710, lift 170, 1700 or lift system 5000, a system interface 6210 and one or more of the robotic automotive service system 1100. The enclosure 1710 may be freestanding or part of an existing structure such as a main shop wall or bay. The secondary service bay is used to expand the capabilities of a main shop by adding an additional bay to the main shop operations and also adding an autonomous system to the shop equipment.

In a preferred form, the secondary service bay is configured to function separately from its main shop and contains its own power panel, safety infrastructure, lighting, heating, ventilation, and cooling. In this way, the secondary service bay only requires a power connection from the main shop or existing utility and doesn't otherwise impose a burden on the main shop infrastructure.

The secondary service bay can provide any service that the robotic automotive service system 1100 is capable of, such as tire-changing, tire rotation, wheel balancing, wheel alignment, cleaning, or other services. The secondary service bay is also able to accept an operator who can perform additional service steps on the vehicle outside of or in addition to the capabilities of the robotic automotive service system 1100.

In a preferred form, the secondary service bay is a freestanding structure that can act as a shop bay outside of the main shop in which the robotic automotive service system 1100 can be installed without taking up an existing bay in the main shop, allowing the main shop to expand on its autonomous operations according to the capabilities of the robotic automotive service system 1100 without having to expend one of its bays to do so.

In alternate forms, the secondary service bay may be contained in a sea-crate or similar, attached to the main shop, partially attached to the main shop or in any other useful configuration.

Preferably, the secondary service bay, it is powered by a generator 6220, solar panels 6230, or some other integrated power-production device which allows the station to run without being connected to an external power source. Nevertheless, the secondary service bay may be connected to an existing power grid via another structure, a utility pole, underground utility, the main power panel of another facility, wirelessly powered, or any other method of connecting power from one location to another.

Preferably, the secondary service bay is fully autonomous; however, the secondary service bay may also be operated manually or semi-autonomously. For example, the secondary service bay may be operated by hand, via a wired or remote panel on-site, via teleoperation or by any other means.

As describe above, the robotic automotive service system 1100 and/or a combination of the individual systems, apparatus and components thereof, as well as the methods and algorithms used thereby, may perform tire servicing operations/procedures, such as tire rotation.

Making reference to FIG. 132 of the drawings, the robotic automotive service system 1100 includes tooling capable of removing tires 1611 from rims 1612 while the rims 1612 remain on the vehicle 1600. Expanding the capability of the robotic automotive service system 1100 shown in FIG. 132 of the drawings, a procedure may be provided in which the tires 1611 on the vehicle 1600 are removed from the rims 1612 and rotated in a process similar to wheel rotation in a typical shop. The same tires 1611 may be removed from the rims 1612 and placed on different rims 1612 on the vehicle. This is analogous to a traditional tire rotation in which each entire TWA 1610 is removed from the vehicle 1600 and rotated to different locations and reinstalled. The effect of the rotation is the same-evening out wear on the tires 1611 themselves. The benefits to performing tire rotations using the robotic automotive service system 1100 versus the traditional method are these: the robotic automotive service system 1100 is autonomous and requires much less human effort, labor costs. The provided method is faster as it uses a robotic automotive service system 1100 and the rims 1612 do not have to be removed from the vehicle for rotation, allowing a shop to perform more rotations.

As describe above, the robotic automotive service system 1100 and/or a combination of the individual systems, apparatus and components thereof, as well as the methods and algorithms used thereby, may perform tire servicing operations/procedures, such as wheel alignments.

FIG. 133 illustrates an alignment tool 2800, which may be a component of the robotic automotive service system 1100. For example, alignment tool 2800 may comprise or be mounted to a linear actuator 1350 which is in turn mounted on the robotic apparatus 1101. As can be seen in FIG. 143 of the drawings, the robotic apparatus 1101, which may be a component of the robotic automotive service system 1100 formed in accordance with the present invention, contains sensors 1200 such as a vision system 1300. The vision system 1300 measures the orientation of the TWA 1610 relative to the vehicle 1600, the robotic apparatus 1101, and the surrounding environment. By scanning the TWAs 1610 with the sensors comprising the robotic apparatus 1101, measurements of TWA 1610 orientation may be established.

As can be seen in FIGS. 133 and 134 of the drawings, the robotic apparatus 1101, in combination with the alignment tool 2800, can adjust the wheel alignment by sensing the alignment with sensors 1200 or the vision system 1300, adjusting the alignment with the tire alignment tool 2800, and iterating until the alignment is within acceptable bounds. Alternatively, the robotic apparatus 1101 can sense the wheel alignment with sensors 1200 or vision system 1300, and an operator can operate a wrench or tire alignment tool 2800 to manually modify the alignment. The robotic automotive service system 1100 makes the alignment status available to the operator for judging when the alignment is within acceptable bounds.

Exemplary process steps for utilizing the robotic apparatus 1101 and alignment tool 2800 to align the TWA 1610 of a vehicle 1600 are as follows:

1. Using the vision system 1300, scan the vehicle 1600 to determine the orientation of the TWAs 1610 to the vehicle 1600. If the orientation (alignment) is out of spec, continue.

2. Position the robotic apparatus 1101 such that, when extended, the alignment tool 2800 passes the TWA 1610 and gains access to the alignment screw 1650 of the vehicle 1600.

3. Using the linear actuator 1350 extend the alignment tool 2800 in the transverse direction of the vehicle 1600 until the alignment end effector 2820, mounted to the alignment arm 2810, is positioned in front of the alignment screw 1650.

4. Shift the position of the robotic apparatus 1101 in the longitudinal direction such that the alignment end effector 2820 engages the alignment screw 1650.

5. Using the alignment drive system 2830, rotate the alignment screw 1650 with the alignment end effector 2820.

6. Using the vision system 1300, scan the vehicle 1600 to determine the orientation of the TWAs 1610 to the vehicle 1600. If the orientation (alignment) is out of spec, repeat steps 2-6 on the current TWA 1610.

7. If the orientation (alignment) is within spec, repeat steps 2-6 on the other TWA's 1610 of the vehicle 1600.

As describe above, the robotic automotive service system 1100 and/or a combination of the individual systems, apparatus and components thereof, as well as the methods and algorithms used thereby, may perform tire servicing operations/procedures, such as cleaning. More specifically, the robotic automotive service system 1100 may utilize the cleaning tool system 2500. As described above, the cleaning tool system 2500 generally comprises a cleaning arm 2513, a cleaning end effector 2520, a cleaning drive system 2530 and a linear actuator 1350. Preferably, the robotic automotive service system 1100 formed in accordance with the present invention may use sensors 1200 or the vision system 1300 to scan the vehicle 1600 and determine locations on the vehicle 1600 in need of cleaning or buffing. These locations may be determined by color, IR signature, or other means. The robotic automotive service system 1100 may apply the cleaning tool system 2500 at these locations to clean, wax, or buff the vehicle 1600.

An exemplary method of using the robotic automotive service system 1100 formed in accordance with the present invention and the individual systems, apparatus and components thereof, as well as the methods and algorithms used thereby, to replace the tire 1611 on a TWA 1610 and then balance the TWA 1610 on a vehicle 1600 is provided below:

Initial Setup

1. A technician drives the vehicle 1600 onto the lift 170, 1700 or lift system 5000.

2. The technician ensures the enclosure 1710 is clear of personnel and that the robotic automotive service system 1100 is in functional condition.

3. The technician activates the robotic automotive service system 1100 and the components thereof.

4. If the robotic automotive service system 1100 is connected to the shop sales infrastructure, it pulls the service information (e.g., service type, vehicle make, model) from that infrastructure. Otherwise, the operator types these values in to the operator interface.

5. The robotic apparatus 1101 moves to a TWA 1610 and scans it with the vision system 1300. The control system uses this information to calculate the position and orientation of the TWA 1610.

6. The robotic apparatus 1101 aligns with the TWA 1610.

Valve Stem Removal

7. The gripper system 82200 grips the TWA 1610.

8. The robotic apparatus 1101 aligns the valve tool system 2700 with the valve stem 1614, using the gripper system 82200 to rotate the TWA 1610 accordingly.

9. The valve tool system 2700 removes the valve stem 1614, de-inflating the TWA 1610.

Tire Removal

10. The gripper system 82200 grips the TWA 1610.

11. The lubrication tool system 2600 lubricates the TWA 1610 at the curve where the tire 1611 and rim 1612 meet.

12. The bead breaker system 2000 engages the TWA 1610, pushing the bead 1609 of the tire 1611 into the rim from both sides. The gripper system 82200 rotates the tire 1611 relative to the bead breaker system 2000 to affect breaking of the entire front and rear bead 1609 of the tire 1611.

13. The bead breaker system 2000 retracts.

14. The bead tool system 82100 engages the TWA 1610, pulling the tire 1611 from the rim 1612. The gripper system 82200 rotates the tire 1611 relative to the bead tool system 82100 to affect removal of the entire front bead 1609 of the tire 1611.

15. The bead tool system 82100 retracts.

16. The robotic apparatus 1101 retracts with the gripper system 82200 still gripping the tire 1611, shifting the tire 1611 on the rim 1612 such that the rear bead 1609 of the tire 1611 is pressing against the front edge of the rim 1612.

17. The vehicle-side bead breaker system 2000 pushes the rear of the tire 1611 such that the rear bead 1609 of the tire 1611 is pushed over the front edge of the rim 1612. The gripper system 82200 rotates the tire 1611 relative to the bead tool system 82100 to affect removal of the entire rear bead 1609 of the tire 1611.

18. The bead tool system 82100 retracts.

19. At this point, the tire 1611 is removed from the rim 1612.

20. The robotic apparatus 1101 retracts, bringing the tire 1611 with it inside the grippe system 82200.

21. The tire handling system 9000 removes the old tire 1611 from the robotic apparatus 1101.

Tire Installation

22. The tire handling system 9000 loads a new tire 1611 into the robotic apparatus 1101.

23. The robotic apparatus 1101 re-aligns with the TWA 1610.

24. The robotic apparatus 1611 tilts away from the vehicle 1600 in the pitch direction (across the longitudinal vehicle axis).

25. The robotic apparatus advances, slipping the bottom of the tire 1611 onto the rim 1612.

26. The robot-side bead breaker system 2000 engages the tire 1611, pushing it forward against the rim 1612 at the bottom edge.

27. The gripper system 82200 rotates the tire 1611 which, with the continued force from the bead breaker system 2000, pushes the rear bead 1609 of the tire 1611 over the front edge of the rim 1612.

28. The bead breaker system 2000 retracts.

29. The robotic apparatus 1101 tilts to align with the TWA 1610.

30. The robotic apparatus 1101 advances towards the rim 1612, pushing the tire 1611 towards the rear of the rim until the front edge of the tire 1611 contacts the rim 1612.

31. The robot-side bead breaker system 2000 engages the tire 1611, pushing it forward against the rim 1612 at the bottom edge.

32. The gripper system 82200 rotates the tire 1611 which, with the continued force from the bead breaker system 2000, pushes the front bead 1609 of the tire 1611 over the front edge of the rim 1612.

33. The bead breaker system 2000 retracts.

34. The inflation tool system 2401 inflates the TWA 1610 via the valve stem 1614.

Wheel Balancing

35. The wheel weight application tool removes the wheel weights from the rim 1612.

36. The robotic apparatus 1101 moves the suspension support structure system 83400 underneath the suspension 1630 of the vehicle 1600.

37. The suspension support structure system 83400 engages and compresses the suspension 1630.

38. The gripper system 82200 rotates the TWA 1610 to balancing speed.

39 Following the process shown in FIG. 114, the wheel balance is sensed via the load cell 1230 in the suspension support structure system 83400.

40. If needed, the wheel weight application tool applies wheel weights to the rim 1612.

41. Steps 39-40 are repeated until the balancing process is complete.

Wheel Alignment

42. Using the vision system 1300, scan the vehicle 1600 to determine the orientation of the TWAs 1610 to the vehicle 1600. If the orientation (alignment) is out of spec, continue.

43. Position the robotic apparatus 1101 such that, when extended, the alignment tool 2800 passes the TWA 1610 and gains access to the alignment screw 1650 of the vehicle 1600.

44. Using the linear actuator 1350 extend the alignment tool 2800 in the transverse direction of the vehicle 1600 until the alignment end effector 2820, mounted to the alignment arm 2810, is positioned in front of the alignment screw 1650.

45. Shift the position of the robotic apparatus 1101 in the longitudinal direction such that the alignment end effector 2820 engages the alignment screw 1650.

46. Using the alignment drive system 2830, rotate the alignment screw 1650 with the alignment end effector 2820.

47. Using the vision system 1300, scan the vehicle 1600 to determine the orientation of the TWAs 1610 to the vehicle 1600. If the orientation (alignment) is out of spec, repeat steps 43-47 on the current TWA 1610.

48. If the orientation (alignment) is within spec, repeat steps 43-47 on the other TWA's 1610 of the vehicle 1600.

Vehicle Removal

49. A technician lowers the lift 1700 and drives the vehicle 1600 out of the enclosure 1710.

A transmission 8000 formed in accordance with another aspect of the present invention, which may be used in conjunction with one or more of the apparatus and/or components described above, such as the robotic apparatus 1101 and the gripper system 82200, is disclosed below and generally shown in FIG. 138 of the drawings. For example, the transmission 8000 may mechanically coupled to be inline with the gripper drive 2260.

As can be seen in FIG. 138 of the drawings, the transmission 8000 preferably comprises four gears 8010A-D, two one-way roller bearings 8020A-B, a drive shaft 8030, a driven shaft 8040 and a transmission drive system 8050. Gears 8010A and 8010C are aligned with each other. Gears 8010B and 8010D are aligned with each other. Gears 8010C and 8010D are pressed onto the driven shaft 8040 such that they rotate as one unit. Gears 8010C and 8010D cannot move axially relative to the driven shaft 8040. One-way roller bearings 8020 are pressed into gears 8010A and 8010B. The one-way roller bearings 8020A and 8020B are positioned on the drive shaft 8030 such that they cannot move axially along the shaft. The one-way roller bearings 8020A and 8020B are arranged such that one-way roller bearings 8020A pressed into gear 8010A can rotate freely relative to the shaft in the clockwise direction and locks to the shaft in the counterclockwise direction. The one-way roller bearings 8020A and 8020B are arranged such that one-way roller bearings 8020B pressed into gear 8010B can rotate freely relative to the shaft in the counterclockwise direction and locks to the shaft in the clockwise direction.

The transmission drive system 8050 can rotate the drive shaft 8030. When rotating the drive shaft 8030, gears 8010A and 8010C are driven together, and gears 8010B and 8010D are driven together. Rotating gear 8010A clockwise causes gear 8010C to rotate counterclockwise, rotating gear 8010B clockwise causes gear 8010D to rotate counterclockwise, and vice versa.

When rotating the drive shaft 8030 clockwise, reaction forces from gear 8010A tend to try to rotate it counterclockwise. The one-way roller bearing 8020A pressed into gear 8010A locks in the counterclockwise direction, causing the drive shaft 8030 to apply torque to gear 8010A and rotate gear 8010C counterclockwise, causing the driven shaft to rotate counterclockwise.

When rotating the drive shaft 8030 clockwise, reaction forces from gear 8010B tend to try to rotate it counterclockwise. The one-way roller bearing 8020B pressed into gear 8010B is free to rotate relative to the shaft in the counterclockwise direction, allowing gear 8010B to freely rotate relative to the drive shaft 8030 and not apply significant torque to gear 8010D.

When rotating the drive shaft 8030 counterclockwise, reaction forces from gear 8010B tend to try to rotate it clockwise. The one-way roller bearing 8020B pressed into gear 8010B locks in the clockwise direction, causing the drive shaft 9030 to apply torque to gear 8010B and rotate gear 8010D clockwise, causing the driven shaft to rotate clockwise.

When rotating the drive shaft 8030 counterclockwise, reaction forces from gear 8010A tend to try to rotate it clockwise. The one-way roller bearing 8020A pressed into gear 8010A is free to rotate relative to the shaft in the clockwise direction, allowing gear 8010A to freely rotate relative to the drive shaft 8030 and not apply significant torque to gear 8010C.

The design of the transmission 8000 is such that rotating the drive shaft 8030 clockwise causes one-way roller bearing 8020A to lock, causing gear 8010A to drive gear 8010C, causing the driven shaft 8040 to rotate counterclockwise. At the same time, gear 8010B is able to freewheel on the one-way roller bearing 8020B and not provide significant torque to gear 8010D, preventing the transmission from locking up.

The design of the transmission 8000 is such that rotating the drive shaft 8030 counterclockwise causes one-way roller bearing 8020B to lock, causing gear 8010B to drive gear 8010D, causing the driven shaft 8040 to rotate clockwise. At the same time, gear 8010A is able to freewheel on the one-way roller bearing 8020A and not provide significant torque to gear 8010C, preventing the transmission from locking up.

In the two-speed transmission 8000, gears 8010A-D may configured such that they are not the same size, producing a mechanical advantage between the gears 8010A-D and altering the torque-speed relationship between the drive shaft 8030 and the driven shaft 8040.

In a preferred form, gears 8010A and 8010D are the same size and gears 8010B and 8010C are the same size, for example where gears 8010A and 8010D are twice the diameter of gears 8010B and 8010C. In this configuration, rotating the drive shaft 8030 clockwise, the net gear ratio from the drive shaft 8030 to the driven shaft 8040 is 2:1, causing the driven shaft 8040 to rotate at twice the speed and with half the torque of the drive shaft 8030. Rotating the drive shaft 8030 counterclockwise, the net gear ratio from the drive shaft 8030 to the driven shaft 8040 is 1:2, causing the driven shaft 8040 to rotate at half the speed and with twice the torque of the drive shaft 8030.

In an alternative form of the transmission 8000 shown in FIG. 138, which is shown in FIG. 139 of the drawings, the gears 8010A and 8010D may be of any size. More specifically, one-way roller bearings 8020A and 8020B are replaced with electromagnetic locking shaft collars 8060A and 8060B.

Electromagnetic locking shaft collars 8060A and 8060B are configured such that when they receive an electrical signal, they lock onto the drive shaft 8030. When the signal is released, they spin freely on the drive shaft. The electromagnetic locking shaft collars 8060A and 8060B can be actuated separately or together.

In the invention shown in 107, the electromagnetic locking shaft collars 8060A and 8060B may be actuated to cause one set of gears 8010A and 8010C or 8010B and 8010D to mesh, engage, and drive while the other set spins freely. This produces the same style of motion described in FIG. 138 with a selectable signal, rather than having the motion be controlled by the direction of rotation of the drive shaft 8030. This allows any direction of rotation to be used while selecting a gear drive from gears 8010A and 8010D.

In other forms of the transmission 8000 formed in accordance with the present invention, gears 8010A and 8010D may be replaced with pulleys, magnets, wheels, friction clutches, shafts, pins, balls, or any component able to adequately drive torque between the drive shaft 8030 and the driven shaft 8040.

In additional alternative forms of the transmission 8000 formed in accordance with the present invention, one-way roller bearings 8020A and 8020B may be clutches, magnets, springs, or any component which is able to lock rotation to the drive shaft 8030 in one direction while rotating relatively freely in the opposite direction.

In other alternative forms of the transmission 8000 formed in accordance with the present invention, the electromagnetic locking shaft collars 8060A and 8060B may be clutches, magnets, springs, or any component which is able to selectively lock and unlock rotation to the drive shaft 8030.

In other alternative forms of the transmission 8000 formed in accordance with the present invention, one-way roller bearings 8020A and 8020B and electromagnetic locking shaft collars 8060A and 8060B may be installed on the drive shaft 8030 or the driven shaft 8040 or any combination of the two.

In other alternative forms of the transmission 8000 formed in accordance with the present invention, the electromagnetic locking shaft collars 8060A and 8060B may be normally locking, normally free, or any combination of the two.

In other alternative forms of the transmission 8000 formed in accordance with the present invention, the electromagnetic locking shaft collars 8060A and 8060B and the one-way roller bearings 8020A and 8020B may have a torque limit at which they begin to slip, limiting torque to the drive shaft 8030, driven shaft 8040, or both.

In other alternative forms of the transmission 8000 formed in accordance with the present invention, any number of gears 8010 may be installed on the drive shaft 8030 and driven shaft 8040.

In other alternative forms of the transmission 8000 formed in accordance with the present invention, multiple gear drives and one-way roller bearings 8020A and 8020B or electromagnetic locking shaft collars 8060A and 8060B combinations may be used which allow the transmission to provide a wider selection of gear ratios.

In other alternative forms of the transmission 8000 formed in accordance with the present invention, the gears 8010, one way roller bearings 8020, and electromagnetic locking shaft collars 8060 may be axially positioned on the drive shaft 8030 and driven shaft 8040 via retaining rings, grooves, shaft collars, pins, set screws, shoulders, or any other component or feature sufficient to prevent movement in the axial direction.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A system for balancing a tire wheel assembly of a vehicle while the tire wheel assembly is mounted to a wheel hub of the vehicle, the tire wheel assembly having an axis of rotation and being rotatable about the axis of rotation, the system comprising:

a tire wheel assembly spinner, the tire wheel assembly spinner being selectively engageable with at least a portion of the tire wheel assembly, the tire wheel assembly spinner being configured to selectively effect rotation of the tire wheel assembly about its axis of rotation;

one or more sensors, at least one of the one or more sensors being configured to measure an imbalance condition of the vehicle while the tire wheel assembly is rotated about its axis of rotation by the tire wheel assembly spinner, the imbalance condition being indicative of a static imbalance and a dynamic imbalance of the tire wheel assembly, the one or more sensors generating an imbalance signal in response to the measured imbalance condition of the vehicle; and a controller, the controller being in communication with the tire wheel assembly spinner and the one or more sensors, the controller being configured to process the imbalance signal to determine a respective magnitude and direction of each of the static imbalance and the dynamic imbalance of the tire wheel assembly.

2. A system as defined by claim 1, wherein the tire wheel assembly spinner includes a roller system, the roller system comprising:

one or more rollers that are selectively engageable with the at least portion of the tire wheel assembly, each of the one or more rollers having a respective axis of rotation and being rotatable about their respective axis of rotation; and at least one drive unit, the at least one drive unit being operatively coupled to at least one of the one or more rollers and being configured to selectively effect rotation of the at least one of the one or more rollers about their respective axis of rotation.

3. A system as defined by claim 2, wherein the roller system further comprises:

a base; and a frame joined to the base;

wherein the one or more rollers are disposed on the frame and rotatable about their respective axis of rotation thereon.

4. A system as defined by claim 3, wherein at least one of the one or more sensors is a force sensor, and wherein the force sensor is interposed between a portion of the frame and a portion of the base.

5. A system as defined by claim 1, wherein the tire wheel assembly spinner includes a gripper system, the gripper system comprising:

one or more grippers that are engageable with the at least portion of the tire wheel assembly, each of the one or more grippers having a respective axis of rotation and being rotatable about their respective axis of rotation; and at least one drive unit, the at least one drive unit being operatively coupled to at least one of the one or more grippers, the at least one drive unit being configured to effect rotation of the at least one of the one or more grippers about their respective axis of rotation;

wherein the rotation of the at least one of the one or more grippers about their respective axis of rotation effects rotation of the tire wheel assembly about its axis of rotation.

6. A system as defined by claim 5, wherein the at least one of the one or more grippers comprises:

a housing, the housing having an open front end, a back end situated opposite the open front end and a sidewall extending between the open front end and the back end, the back end and the sidewall of the housing defining a cavity;

a plurality of gripper pins, the plurality of gripper pins being at least partially situated in the cavity; and a plurality of gripper springs, the plurality of gripper springs being at least partially situated in the cavity, each gripper spring of the plurality of gripper springs being operatively coupled to a respective gripper pin of the plurality of gripper pins and biasing the respective gripper pin outwardly from the open front end of the housing;

wherein the housing is operatively coupled to the at least one drive unit.

7. A system as defined by claim 6, wherein at least one gripper pin of the plurality of gripper pins is engageable with the at least portion of the tire wheel assembly.

8. A system as defined by claim 6, wherein the tire wheel assembly includes a wheel, wherein at least some gripper pins of the plurality of gripper pins interface with the wheel of the tire wheel assembly.

9. A system as defined by claim 6, wherein the tire wheel assembly includes a wheel, wherein the wheel includes a plurality of spaced-apart spokes, wherein at least one gripper pin of the plurality of gripper pins is at least partially insertable into a space between the spaced-apart spokes.

10. A system as defined by claim 5, wherein the at least one of the one or more grippers further comprises:

a main body, the main body having a first end and an oppositely disposed second end, the second end of the main body being operatively coupled to the at least one drive unit; and a plurality of lug pins, the plurality of lug pins being disposed on the first end of the main body and extending outwardly therefrom.

11. A system as defined by claim 10, wherein at least one lug pin of the plurality of lug pins is engageable with the at least portion of the tire wheel assembly.

12. A system as defined by claim 10, wherein the tire wheel assembly includes a wheel, wherein the wheel includes a plurality of spaced-apart spokes, wherein at least one gripper pin of the plurality of gripper pins is at least partially insertable into a space between the spaced-apart spokes.

13. A system as defined by claim 10, wherein the tire wheel assembly includes a wheel having a plurality of lug receptacles formed axially therethrough, wherein the vehicle includes a plurality of lug bolts, each lug bolt of the plurality of lug bolts extending outwardly from the wheel hub and having a free end, wherein each lug bolt of the plurality of lug bolts extends through a respective lug receptacle, wherein the free end of each lug bolt of the plurality of lug bolts is engaged with a respective lug nut, and wherein at least one gripper pin of the plurality of gripper pins is engageable with one of the respective lug nuts.

14. A system as defined by claim 1, wherein at least one of the one or more sensors is mounted to a portion of the tire wheel assembly.

15. A system as defined by claim 1, wherein the vehicle includes a suspension, and wherein at least one of the one or more sensors is mounted to the suspension of the vehicle.

16. A system as defined by claim 1, which further comprises:

at least one mass moving gantry, the at least one mass moving gantry including at least a first mounting arm and a second mounting arm, at least one connecting member extending between and interconnecting the first mounting arm and the second mounting arm, the first mounting arm and the second mounting arm being mountable on the tire wheel assembly of the vehicle, and a carriage coupled to the at least one connecting member and being moveable thereon;

wherein at least one of the one or more sensors is mounted to the carriage.

17. A system as defined by claim 16, wherein the carriage includes at least one bore formed therein and extending through a longitudinal length thereof into which the at least one connecting member is at least partially received, wherein the carriage is reciprocatingly moveable on the at least one connecting member at least partially between the first mounting arm and the second mounting arm.

18. A system as defined by claim 16, wherein the at least one mass moving gantry further comprises:

one or more actuators, the one or more actuators being operatively coupled to the carriage and effecting movement of the carriage on the at least one connecting member.

19. A system as defined by claim 1, wherein the vehicle is supportable by a vehicle lift, wherein at least one of the one or more sensors is disposed on a portion of the vehicle lift.

20. A system as defined by claim 1, wherein the vehicle is supportable by a lift plate that is mountable to a vehicle lift, wherein at least one of the one or more sensors is disposed on a portion of the lift plate.

21. A system as defined by claim 1, wherein at least one of the one or more sensors includes one or more of a single-axis accelerometer, a multi-axis accelerometer, an inertial measurement unit, a force sensor, an optical sensor and a magnetometer.

22. A system as defined by claim 1, wherein at least one of the one or more sensors includes at least one vision sensor.

23. A system as defined by claim 22, wherein the tire wheel assembly, when static, resides in one of multiple static angular positions, and wherein the at least one vision sensor is configured to detect the static angular position of the tire wheel assembly.

24. A system as defined by claim 22, wherein the at least one vision sensor is configured to detect positional changes of the axis of rotation of the tire wheel assembly.

25. A system as defined by claim 24, which further comprises:
one or more fiducials;

wherein at least one of the one or more fiducials is disposed on a portion of the vehicle; and wherein the at least one vision sensor is configured to detect the at least one of the one or more fiducials disposed on the vehicle.

26. A system as defined by claim 25, wherein the at least one of the one or more fiducials is affixed to a portion of the tire wheel assembly.

27. A system as defined by claim 22, wherein the at least one vision sensor includes one or more of a camera, a structured light sensor, a LiDAR sensor and an infrared sensor or array.

28. A system as defined by claim 1, wherein at least one of the one or more sensors includes a wheel speed sensor.

29. A system as defined by claim 1, which further comprises:
one or more vehicle supports, each vehicle support of the one or more vehicle supports extending at least partially between the ground and a portion of the vehicle;

wherein at least one of the one or more sensors is disposed between at least one of the one or more vehicle supports and the portion of the vehicle.

30. A system as defined by claim 1, which further comprises:
at least one emitter, the at least one emitter being configured to one or more of project and overlay a marking on the tire wheel assembly.

* * * * *